United States Patent
Jenkins

(10) Patent No.: US 9,472,019 B2
(45) Date of Patent: Oct. 18, 2016

(54) SYSTEM AND METHOD OF FROM-REGION VISIBILITY DETERMINATION AND DELTA-PVS BASED CONTENT STREAMING USING CONSERVATIVE LINEARIZED UMBRAL EVENT SURFACES

(75) Inventor: Barry Lynn Jenkins, Pottsville, PA (US)

(73) Assignee: PRIMAL SPACE SYSTEMS, INC., Raleigh, NC (US)

(*) Notice: Subject to any disclaimer, the term of this patent is extended or adjusted under 35 U.S.C. 154(b) by 543 days.

(21) Appl. No.: 13/807,824

(22) PCT Filed: Jun. 29, 2011

(86) PCT No.: PCT/US2011/042309
§ 371 (c)(1),
(2), (4) Date: Mar. 20, 2013

(87) PCT Pub. No.: WO2012/012161
PCT Pub. Date: Jan. 26, 2012

(65) Prior Publication Data
US 2013/0207976 A1    Aug. 15, 2013

Related U.S. Application Data

(60) Provisional application No. 61/360,283, filed on Jun. 30, 2010, provisional application No. 61/382,056, filed on Sep. 13, 2010, provisional application No. 61/476,819, filed on Apr. 19, 2011, provisional (Continued)

(51) Int. Cl.
*G06T 15/40* (2011.01)
*G06T 15/20* (2011.01)
*G09G 5/00* (2006.01)

(52) U.S. Cl.
CPC .............. *G06T 15/40* (2013.01); *G06T 15/20* (2013.01); *G06T 2200/16* (2013.01); *G06T 2200/28* (2013.01); *G06T 2200/36* (2013.01)

(58) Field of Classification Search
None
See application file for complete search history.

(56) References Cited

U.S. PATENT DOCUMENTS 5,553,206 A   9/1996 Meshkat
5,914,721 A   6/1999 Lim
(Continued)

FOREIGN PATENT DOCUMENTS

CN   1305619 A   7/2001
CN   1691069 A   11/2005
(Continued)

OTHER PUBLICATIONS

Bittner, Jiří, Vlastimil Havran, and Pavel Slavík. "Hierarchical visibility culling with occlusion trees." Computer Graphics International, 1998. Proceedings. IEEE, 1998.*

(Continued)

*Primary Examiner* — Jacinta M Crawford
*Assistant Examiner* — Diane Wills
(74) *Attorney, Agent, or Firm* — Oblon, McClelland, Maier & Neustadt, L.L.P

(57) ABSTRACT

A method determines a set of mesh polygons or fragments of the mesh polygons visible from a view region having a plurality of view region vertices, the mesh polygons forming polygon meshes. The method includes determining at least one supporting polygon between the view region and the polygon meshes. The method further includes constructing at least one wedge from the at least one supporting polygon, the at least one wedge extending away from the view region beyond at least the polygon meshes. Further, the method includes determining one or more intersections of the wedges with the mesh polygons. Also, the method includes determining the set of the mesh polygons or fragments of the mesh polygons visible from the view region using the determined one or more intersections of the at least one wedge with the polygon meshes.

20 Claims, 119 Drawing Sheets

Related U.S. Application Data application No. 61/452,330, filed on Mar. 14, 2011, provisional application No. 61/384,284, filed on Sep. 19, 2010, provisional application No. 61/474,491, filed on Apr. 12, 2011.

(56) References Cited

U.S. PATENT DOCUMENTS

| | | | |
|---|---|---|---|
| 5,999,187 | A | 12/1999 | Dehmlow et al. |
| 6,028,608 | A | 2/2000 | Jenkins |
| 6,057,847 | A | 5/2000 | Jenkins |
| 6,111,582 | A | 8/2000 | Jenkins |
| 6,782,130 | B2 | 8/2004 | Guo |
| 6,933,946 | B1 | 8/2005 | Silva et al. |
| 2002/0167518 | A1 | 11/2002 | Migdal et al. |
| 2006/0001974 | A1 | 1/2006 | Uehara et al. |
| 2006/0082571 | A1 | 4/2006 | McDaniel |
| 2007/0206008 | A1 | 9/2007 | Kaufman et al. |
| 2008/0180440 | A1 | 7/2008 | Stich |
| 2009/0207169 | A1 | 8/2009 | Wakayama |
| 2009/0276541 | A1 | 11/2009 | Lock et al. |
| 2010/0045670 | A1 | 2/2010 | O'Brien et al. |
| 2010/0060640 | A1 | 3/2010 | Melikian et al. |
| 2012/0229445 | A1 | 9/2012 | Jenkins |

FOREIGN PATENT DOCUMENTS

| | | |
|---|---|---|
| CN | 1696978 A | 11/2005 |
| CN | 1806260 A | 7/2006 |
| CN | 101145245 A | 3/2008 |
| CN | 101149842 A | 3/2008 |
| JP | 2004-45266 A | 2/2004 |

OTHER PUBLICATIONS

Coorg et al.. "Real-time occlusion culling for models with large occluders." Proceedings of the 1997 symposium on Interactive 3D graphics. ACM, 1997.*
Durand, Frédo. "A multidisciplinary survey of visibility." ACM SIGGRAPH Course Notes: Visibility, Problems, Techniques, and Applications (2000).*
Leyvand ("Ray Space Factorization for From-Region Visibility") Citation: Leyvand, Tommer. Ray Space Factorization for From-Region Visibility. Diss. Tel-Aviv University, 2005.*
Worrell, Adam, "Dynamic Discontinuity Meshing", Dissertation, University of Bristol, 1998.*
Yoon, Sung-Eui, Brian Salomon, and Dinesh Manocha. "Interactive view-dependent rendering with conservative occlusion culling in complex environments." Proceedings of the 14th IEEE Visualization 2003 (VIS'03). IEEE Computer Society, 2003.*
El-Sana, J., et al., "Integrating Occlusion Culling with View-Dependent Rendering," Presented at IEEE-Visualization 2001, Total 9 pages, (Oct. 26, 2001).
Lloyd, B. et al., "Horizon Occlusion Culling for Real-time Rendering of Hierarchical Terrains," IEEE Visualization 2002, Total 7 pages, (Nov. 1, 2002).
Diepstraten, J. et al., "Remote Line Rendering for Mobile Devices," Computer Graphics International, 2004 Proceedings, Total 8 pages, (Jun. 19, 2004).
International Search Report Issued Jan. 5, 2012 in PCT/US11/42309 Filed Jun. 29, 2011.
Combined Office Action and Search Report issued Oct. 29, 2015 in Chinese Patent Application No. 201180042082.0 (with English language translation).
Combined Chinese Office Action and Search Report issued Dec. 19, 2014 in Patent Application No. 201180042082.0 (with English language translation).
Aila, Timo. "SurRender Umbra: A Visibility Determination Framework for Dynamic Environments." MS thesis. Helsinki U of Technology, 2000. Print.
Aila, Timo, and Ville Miettinen. "dPVS: An Occlusion Culling System for Massive Dynamic Environments." IEEE Computer Graphics and Applications 24.2 (2004): 86-97.
Aila, Timo, Ville Miettinen, and Otso Makinen. "DPVS Reference Manual." Aug. 2006. PDF file.
Aliaga, Daniel, et al. "MMR: An Interactive Massive Model Rendering System Using Geometric and Image-Based Acceleration." Proceedings of the 1999 Symposium on Interactive 3D Graphics . Proc. of Symposium on Interactive 3D Graphics, Apr. 1999, Atlanta. New York: ACM, 1999. 199-206. ACM Portal. Web. Jun. 9, 2010. <http://portal.acm.org>.
Aliaga, Daniel G., et al. "Sea of Images." Proceedings of the Conference on Visualization '02. Washington, DC: IEEE Computer Society, 2002. 331-38. ACM Portal. Web. Jun. 20, 2010. <http://portal.acm.org>.
Amanatides, John, and Andrew Woo. "A Fast Voxel Traversal Algorithm for Ray Tracing." Paper presented at Eurographics 1987. PDF file.
Bajaj, Chandrajit, "Computational Visualization." N.d. PDF file. Dec. 11-15, 2002.
Banerjee, Raja, and Jarek R. Rossignac. "Topologically Exact Evaluation of Polyhedra Defined in CSG with Loose Primitives." Computer Graphics Forum 15.4 (1996): 205-17. Print.
Batagelo, Harlen Costa, and Shin-Ting Wu. "Dynamic Scene Occlusion Culling using a Regular Grid." Proceedings of the 15th Brazilian Symposium on Computer Graphics and Image Processing. Washington, DC: IEEE Computer Society, 2002. 43-50. ACM Portal. Web. Jun. 21, 2010. <http://portal.acm.org>.
Bernardini, Fausto, Jihad El-Sana, and James T. Klosowski. "Directional Discretized Occluders for Accelerated Occlusion Culling." Eurographics '2000. Ed. M. Gross and F. R. A. Hopgood. vol. 19. N.p.: n.p., n.d. N. pag. Print.
Bittner, Jiri. "Efficient Construction of Visibility Maps using Approximate Occlusion Sweep." Proceedings of the 18th Spring Conference on Computer Graphics . New York: ACM, 2002. 167-175. ACM Portal. Web. Jun. 24, 2010. <http://portal.acm.org>.
"Hierarchical Techniques for Visibility Computations." Diss. Czech Technical U in Prague, 2002. Print.
Bittner, Jiri, Vlastimil Havran, and Pavel Slavik. "Hierarchical Visibility Culling with Occlusion Trees." Proceedings of the Computer Graphics International 1998. Washington, DC: IEEE Computer Society, 1998. 207. ACM Portal. Web. Jun. 19, 2010. <http://portal.acm.org>.
Bittner, Jiri, and Michael Wimmer. Report on Visibility Algorithms. N.p.: n.p., 2005. Print.
Bittner, Jiri, et al. "Coherent Hierarchical Culling: Hardware Occlusion Queries Made Useful." Eurographics 2004. Ed. M.-P. Cani and M. Slater. vol. 23. Oxford: Blackwell Publishing, 2004. N. pag. Print.
Blythe, David. "The Direct3D 10 System." ACM Transactions on Graphics (TOG) 25.3 (2006): 724-34. ACM Portal. Web. Jun. 20, 2010. <http://portal.acm.org>.
Bronnimann, H., et al. "Lines Tangent to Four Triangles in Three-Dimensional Space." Discrete & Computational Geometry 37.3 (2007): 369-80. ACM Portal. Web. Jun. 27, 2010. <http://portal.acm.org>.
Bronnimann, H., et al. Transversals to Line Segments in R3. N.p.: n.p., 2003. Print.—. Transversals to Line Segments in R3. N.p.: n.p., 2003. Print.
Brunet, Pere, and Isabel Navazo. "Solid Representation and Operation Using Extended Octrees." ACM Transactions on Graphics (TOG) 9.2 (1990): 170-97. Print.
Brunet, Pere, et al. "Hoops: 3D Curves as Conservative Occluders for Cell-Visibility." Eurographics 2001. Ed. A. Chalmers and T.-M. Rhyne. vol. 20. N.p.: n.p., n.d. N. pag. Print.
Butchart, J. H. "The Altitude Quadric of a Tetrahedron." The American Mathematical Monthly 47.6 (1940): 383-84. Print.
Campbell, A. T., III, and Donald S. Fussell. "Adaptive Mesh Generation for Global Diffuse Illumination." Proceedings of the 17th Annual Conference on Computer Graphics and Interactive Techniques . New York: ACM, 1990. 155-64. ACM Portal. Web. Jun. 24, 2010. <http://portal.acm.org>.

(56) References Cited

OTHER PUBLICATIONS

Cano, Pedro, and Juan Carlos Torres. Representation of Polyhedral Objects using SP-Octrees. Granada: n.p., n.d. Print. (created Jan. 5, 2002.).

Cano, Pedro, Juan Carlos Torres, and Francisco Velasco. "Progressive Transmission of Polyhedral Solids using a Hierarchical Representation Scheme." Journal of WSCG 11.1 (2003): n. pag. PDF file.

Chan, Timothy. "A Minimalist's Implementation of the 3-d Divide-and-Conquer Convex Hull Algorithm." Jun. 4, 2003. University of Waterloo School of Computer Science. Timothy M. Chan's Publications. Web. May 30, 2010. <http://www.cs.uwaterloo.ca/~tmchan/.html>.

Charneau, Sylvain, Lillian Aveneau, and Laurent Fuchs. "Exact, Robust and Efficient Full Visibility Computation in Plucker Space." The Visual Computer 23 (Jun. 2007): 773-82. Print.

Chen, Wei-Chao, et al. "Light Field Mapping: Hardware-Accelerated Visualization of Surface Light Fields." ACM Transactions on Graphics (TOG) 21.3 (2002): 447-56. ACM Portal. Web. Jun. 20, 2010. <http://portal.acm.org>.

Chhugani, Jatin. "High Fidelity Walkthroughs of Large Virtual Environments." Diss. The Johns Hopkins U, 2004. Print.

Chhugani, Jatin, et al. "vLOD: High-Fidelity Walkthrough of Large Virtual Environments." IEEE Transactions on Visualization and Computer Graphics 11.1 (2005): 35-47. ACM Portal. Web. Jun. 8, 2010. <http://portal.acm.org>.

Chin, Norman, and Steven Feiner. "Fast Object-Precision Shadow Generation for Area Light Sources Using BSP Trees." Proceedings of the 1992 Symposium on Interactive 3D Graphics . Proc. of Symposium on Interactive 3D Graphics, 1992, Cambridge, Massachusetts. New York: Association for Computing Machinery, 1992. 21-30. ACM Portal. Web. May 30, 2010. <http://portal.acm.org>.

Chin, Norman, and Steven Feiner, "Near Real-Time Shadow Generation Using BSP Trees." ACM SIGGRAPH Computer Graphics 23.3 (1989): 99-106. ACM Portal. Web. May 31, 2010. <http://portal.acm.org>.

Chrysanthou, Yiorgos, Daniel Cohen-Or, and Dani Lischinski. "Fast Approximate Quantitative Visibility for Complex Scenes." Proceedings of the Computer Graphics International 1998 . Washington, DC: IEEE Computer Society, 1998. 220. ACM Portal. Web. Jun. 20, 2010. <http://portal.acm.org>.

Chrysanthou, Yiorgos, and Mel Slater. "Shadow Volume BSP Trees for Computation of Shadows in Dynamic Scenes." Proceedings of the 1995 Symposium on Interactive 3D Graphics . Proc. of Symposium on Interactive 3D Graphics, 1995, Monterey, California. New York: Association for Computing Machinery, 1995. 45-50. ACM Portal. Web. May 30, 2010. <http://portal.acm.org>.

Chrysanthou, Yiorgos, and Mel Slater. "Incremental Updates to Scenes Illuminated by Area Light Sources." Proceedings of the Eurographics Workshop on Rendering Techniques '97 . London: Springer-Verlag, 1997. 103-14. ACM Portal. Web. May 29, 2010. <http://portal.acm.org>.

Cohen, Jonathan. "Rendering Software Acceleration." Spring 2000. PDf file.

Cohen-Or, Daniel, et al. "A Survey of Visibility for Walkthrough Applications." IEEE Transactions on Visualization and Computer Graphics 9.3 (2003): 412-31. Print.

Cohen-Or, Daniel, et al. "Conservative Visibility and Strong Occlusion for Viewspace Partitioning of Densely Occluded Scenes." Eurographics '98. Comp. N. Ferreira and M. Gobel. vol. 17. N.p.: n.p., n.d. N. pag. Print. vol. 17, (1998) No. 3.

Cohen-Or, Daniel, and Eyal Zadicarlo. "Visibility Streaming for Network-Based Walkthroughs." Proceedings of Graphics Interface, 1998. N.p.: n.p., 1998. N. pag. Print.

Comba, Joao, and Bruce Naylor. "Conversion of Binary Space Partitioning Trees to Boundary Representation." Geometric Modeling: Theory and Practice: The State of the Art (Focus on Computer Graphics). Ed. Wolfgang Strasser, Reinhard Klein, and Rene Rau. N.p.: Springer Verlag, 1997. 286-301. Print.

Coorg, Satyan, and Seth Teller. "Temporally Coherent Conservative Visibility." Computational Geometry: Theory and Applications 12.1-2 (1999): 105-124. ACM Portal. Web. Jun. 19, 2010. <http://portal.acm.org>.

Coorg, Satyan, and Seth Teller. "Real-Time Occlusion Culling for Models with large Occluders." Proceedings of the 1997 Symposium on Interactive 3D Graphics . Symposium on Interactive 3D Graphics, Providence, RI. New York: ACM, 1997. 83-ff. ACM Portal. Web. Jun. 19, 2010. <http://portal.acm.org>.

Correa, Wagner T., James T. Klosowski, and Claudio T. Silva. "Fast and Simple Occlusion Culling." Game Programming Gems 3. Ed. Dante Treglia. N.p.: Charles River Media, 2002. N. pag. Print. Game Programming Gems ser. 3.

Correa, Wagner T., James T. Klosowski, and Claudio T. Silva. !Walk: Interactive Out-Of-Core Rendering of Large Models. N.p.: n.p., n.d. N. pag. Print. (modified Sep. 4, 2013).

Correa, Wagner T., James T. Klosowski, and Claudio T. Silva. "Out-of-Core Sort-First Parallel Rendering for Cluster-Based Tiled Displays." Proceedings of the Fourth Eurographics Workshop on Parallel Graphics and Visualization . vol. 29. Aire-la-Ville: Eurographics Association, 2002. 89-96. ACM Portal. Web. Jun. 20, 2010. <http://portal.acm.org>.

Correa, Wagner T., James T. Klosowski, and Claudio T. Silva. "Visibility-Based Prefetching for Interactive Out-Of-Core Rendering." Proceedings of the 2003 IEEE Symposium on Parallel and Large-Data Visualization and Graphics. Washington, DC: IEEE Computer Society, 2003. N. pag. ACM Portal. Web. Jun. 20, 2010. <http://portal.acm.org>.

Cozzi, Patrick John. "Visibility Driven Out-of-Core HLOD Rendering." MS thesis. U of Pennsylvania, 2008. Print.

Dachsbacher, Carsten, et al. "Implicit Visibility and Antiradiance for Interactive Global Illumination." ACM Transactions on Graphics (TOG) 26.3 (2007): n. pag. ACM Portal. Web. Jun. 20, 2010. <http://portal.acm.org>.

Decoret, Xavier, Gilles Debunne, and Francois Sillion. "Erosion Based Visibility Preprocessing." Proceedings of the 14th Eurographics Workshop on Rendering. Proc. of ACM International Conference Proceeding Series; vol. 44. Aire-la-Ville: Eurographics Association, 2003. 281-88. ACM Portal. Web. Jun. 8, 2010. <http://portal.acm.org>.

Demouth, Julien, et al. "Between Umbra and Penumbra." Proceedings of the Twenty-Third Annual Symposium on Computational Geometry . New York: ACM, 2007. 265-74. ACM Portal. Web. Jun. 29, 2010. <http://portal.acm.org>.

Drettakis, George, and Eugene Fiume. "A Fast Shadow Algorithm for Area Light Sources Using Backprojection." Proceedings of the 21st Annual Conference on Computer Graphics and Interactive Techniques . New York: ACM, 1994. 223-30. ACM Portal. Web. Jun. 27, 2010. <http://portal.acm.org>.

Drettakis, Georgios. Structured Sampling and Reconstruction of Illumination for Image Synthesis. Diss. U of Toronto, 1994. Toronto: UMI, 1994. AAINN92651. ACM Portal. Web. Jun. 24, 2010. <http://portal.acm.org>.

Durand, Fredo. "3D Visibility: Analytical Study and Applications." Diss. U of Grenoble, 1999. Print.

Durand, Fredo. "Some Thoughts on Visibility." N.d. PDF file. (created Oct. 18, 2000).

Durand, Fredo, George Drettakis, and Claude Puech. "The 3D Visibility Complex: A New Approach to the Problems of Accurate Visibility." Proceedings of the Eurographics Workshop on Rendering Techniques '96 . London: Springer-Verlag, 1996. 245-56. ACM Portal. Web. Jun. 30, 2010. <http://portal.acm.org>.

Durand, Fredo, et al. "Conservative Visibility Preprocessing using Extended Projections." Proceedings of the 27th Annual Conference on Computer Graphics and Interactive Techniques. Proc. of International Conference on Computer Graphics and Interactive Techniques. New York: ACM Press/Wesley Publishing Co., 2000. 239-48. ACM Portal. Web. Jun. 8, 2010. <http://portal.acm.org>.

Edelsbrunner, Herbert. "Triangulations and Meshes in Computational Geometry." Cambridge Journals 9 (Mar. 2001): 133-213. Cambridge Journals. Web. Jun. 20, 2010. <http://journals.cambridge.org>.

(56) References Cited

OTHER PUBLICATIONS

Eppstein, David. "Asymptotic Speed-Ups in Constructive Solid Geometry." Algorithmica 13.5 (1995): 462-471. Print.
Fogel, Efi, et al. "A Web Architecture for Progressive Delivery of 3D Content." Proceedings of the Sixth International Conference on 3D Web Technology. Proc. of Virtual Reality Modeling Language Symposium, Paderbon, Germany, 2001. New York: ACM, 2001. 35-41. ACM Portal. Web. Jun. 20, 2010. <http://portal.acm.org>.
Funkhouser, Thomas A. "Visibility." Spring 2006. PDF file.
Funkhouser, Thomas A. "A Visibility Algorithm for Hybrid Geometry-and Image-Based Modeling and Rendering." Computers and Graphics 23.5 (1999): 719-28. Print.
Funkhouser, Thomas A. "Database Management for Interactive Display of Large Architectural Models." Proceedings of the Conference on Graphics Interface '96. Toronto: Canadian Information Processing Society, 1996. 1-8. ACM Portal. Web. Jun. 20, 2010. <http://portal.acm.org>.
Ghali, Sherif. "A Geometric Framework for Computer Graphics Addressing Modeling, Visibility, and Shadows." N.d. HTML file. (Created Jun. 8, 1999).
Ghali, Sherif. "A Survey of Practical Object Space Visibility Algorithms." N.d. MS. Max Planck Institute for Computer Science, Saarbrucken. (Created May 14, 2001).
Ghali, Sherif. "Object Space Visibility." Paper presented at SIGGRAPH 2001. PDF file.
Ghali, Sherif, and Chris Smith. "Computing the Boundary of a Class of Labeled-Leaf BSP Solids." Proceedings of the 17th Canadian Conference on Computational Geometry (CCCG'05). Proc. of Canadian Conference on Computational Geometry, 2005, Windsor, Ontario. N.p.: n.p., 2005. 302-5. The Canadian Conference on Computational Geometry. Web. May 29, 2010. <http://www.cccg.ca/>.
Gigus, Ziv, John Canny, and Raimund Seidel. Efficiently Computing and Representing Aspect Graphics of Polyhedral Objects. Berkeley: U of California, Berkeley, n.d. Print. (Created Sep. 13, 2002).
Gigus, Ziv, and Jitendra Malik. "Computing the Aspect Graph for Line Drawings of Polyhedral Objects." IEEE Transactions on Pattern Analysis and Machine Intelligence 12.2 (1990): 113-22. ACM Portal. Web. Jun. 27, 2010. <http://portal.acm.org>.
Goodrich, Michael T. "A Polygonal Approach to Hidden-Line and Hidden-Surface Elimination." CVGIP: Graphical Models and Image Processing 54.1 (1992): 1-12. ACM Portal. Web. Jun. 27, 2010. <http://portal.acm.org>.
Gorjanc, Sonja. Some Examples of using Mathematica in Teaching Geometry. Zagreb: U of Zagreb, n.d. N. pag. Print. (Created Aug. 29, 2013).
Gotsman, Craig, Oded Sudarsky, and Jeffrey A. Fayman. "Optimized Occlusion Culling Using Five-Dimensional Subdivision." Computers & Graphics 23.5: 645-54. Print. (1999).
Gran, Carlos Andujar. "Octree-Based Simplification of Polyhecral Solids." Diss. Polytechnical U of Catalunya, 1999. Print.
Gu, Xianfeng, Steven J. Gortler, and Michael F. Cohen. "Polyhedral Geometry and the Two-Plane Parameterization." Proceedings of the Eurographics Workshop on Rendering Techniques '97. London: Springer-Verlag, 1997. 1-12. ACM Portal. Web. Jun. 29, 2010. <http://portal.acm.org>.
Gueziec, Andre, et al. "Cutting and Stitching: Converting Sets of Polygons to Manifold Surfaces." IEEE Transactions on Visualization and Computer Graphics 7.2 (2001): 136-151. Print.
Haines, Eric. "An Introductory Tour of Interactive Rendering." IEEE Computer Graphics and Applications 26.1 (2006): 76-87. ACM Portal. Web. Jun. 20, 2010. <http://portal.acm.org>.
Hardt, Stephen, and Seth J. Teller. "High-Fidelity Radiosity Rendering at Interactive Rates." Proceedings of the Eurographics Workshop on Rendering Techniques '96 . London: Springer-Verlag, 1996. N. pag. ACM Portal. Web. Jun. 29, 2010. <http://portal.acm.org>.
Haumont, D., O. Makinen, and S. Nirenstein. "A Low Dimensional Framework for Exact Polygon-to-Polygon Occlusion Queries." Proceedings of the Eurographics Symposium on Rendering. Ed. Kavita Bala and Philip Dutre. N.p.: n.p., 2005. N. pag. Print.
Havemann, Sven, and Deiter W. Fellner. Generative Mesh Modeling. Braunschweig: U of of Technology Muhlenpfordtstr, 2003. Print.
Heckbert, Paul S. "Discontinuity Meshing for Radiosity." Eurographics '92. N.p.: n.p., 1992. 203-16. Print.
Hedley, David. Discontinuity Meshing for Complex Environments. Bristol: U of Bristol, 1998. ACM Portal. Web. Jun. 27, 2010. <http://portal.acm.org>.
Hertzmann, Aaron, and Denis Zorin. "Illustrating Smooth Surfaces." Proceedings of the 27th Annual Conference on Computer Graphics and Interactive Techniques. New York: ACM Press/Wesley Publishing Co., 2000. 517-26. ACM Portal. Web. Jun. 29, 2010. <http://portal.acm.org>.
Hey, Heinrich, and Werner Purgathofer. "Occlusion Culling Methods." Paper presented at Eurographics 2001. Print.
Hoffmann, Christoph M. "The Problems of Accuracy and Robustness in Geometric Computation." IEEE Transactions on Visualization and Computer Graphics (Mar. 1989): 31-41. Print.
Hoffmann, Christoph M. Robustness in Geometric Computations. N.p.: n.p., 2001. Print.
Hosseini, Mojtaba, and Nicolas D. Georganas. "MPEG-4 BIFS Streaming of Large Virtual Environments and their Animation on the Web." Proceedings of the Seventh International Conference on 3D Web Technology . Proc. of 3D Technologies for the World Wide Web conference, Tempe, AZ, 2002. New York: ACM, 2002. 19-25. ACM Portal. Web. Jun. 20, 2010. <http://portal.acm.org>.
Hubbard, Philip M. Constructive Solid Geometry for Triangulated Polyhedra. Providence: Brown University, 1990. Print.
Hudson, T., et al. "Accelerated Occlusion Culling using Shadow Frusta." Proceedings of the Thirteenth Annual Symposium on Computational Geometry . New York: ACM, 1997. 1-10. ACM Portal. Web. Jun. 19, 2010. <http://portal.acm.org>.
Keyser, John, et al. "ESOLID—A System for Exact Boundary Evaluation," Paper presented at Proceedings of the Seventh ACM Symposium on Solid Modeling and Applications, 2002, Saarbrucken, Germany. ACM Symposium on Solid and Physical Modeling. Web. May 23, 2010.
Kirsanov, D., P. V. Sander, and S. J. Gortler. "Simple Silhouettes for Complex Surfaces." ACM International Conference Proceeding Series. Proc. of the 2003 Eurographics/SIGGRAPH Symposium on Geometry Processing. vol. 43. Aire-la-Ville: Eurographics Association, 2003. 102-6. ACM Portal. Web. Jun. 17, 2010. <http://portal.acm.org>.
Kleinberg, Jon, and Eva Tardos. "Algorithm Design." N.d. PDF file. Copyright 2005.
Klosowski, James T., and Claudio T. Silva. "Efficient Conservative Visibility Culling Using the Prioritized-Layered Projection Algorithm." IEEE Transactions on Visualization and Computer Graphics 7.4 (2001): 365-79. ACM Portal. Web. Jun. 9, 2010. <http://portal.acm.org>.
Koltun, Vladen, Yiorgos Chrysanthou, and Daniel Cohen-Or. "Virtual Occluders: An Efficient Intermediate PVS Representation." Proceedings of the Eurographics Workshop on Rendering Techniques 2000. London: Springer-Verlag, 2000. 59-70. ACM Portal. Web. Jun. 19, 2010. <http://portal.acm.org>.
Koltun, Vladlen, Yiorgos Chrysanthou, and Daniel Cohen-Or. "Hardware-Accelerated from-Region Visibility Using a Dual Ray Space." Proceedings of the 12th Eurographics Workshop on Rendering Techniques . London: Springer-Verlag, 2001. 205-16. ACM Portal. Web. Jun. 19, 2010. <http://portal.acm.org>.
Krishnan, Shankar. "Efficient and Accurate Boundary Evaluation Algorithms for Sculptured Solids." Diss. U of North Carolina at Chapel Hill, 1997. Print.
Krishnan, Shankar, and Dinesh Manocha. Global Visibility and Hidden Surface Removal Algorithms for Free Form Surfaces. Chapel Hill: U of North Carolina at Chapel Hill, 1994. Print.
Laidlaw, David H., W. Benjamin Trumbore, and John F. Hughes. "Constructive Solid Geometry for Polyhedral Objects." ACM SIGGRAPH Computer Graphics 20.4 (1986): 161-170. ACM Portal. Web. May 31, 2010. <http://portal.acm.org>.

(56) References Cited

OTHER PUBLICATIONS

Laine, Samuli. "A General Algorithm for Output-Sensitive Visibility Preprocessing." Proceedings of the 2005 Symposium on Interactive 3D Graphics and Games. New York: ACM, 2005. 31-40. ACM Portal. Web. Jun. 21, 2010. <http://portal.acm.org>.
Laurentini, Aldo. "The Visual Hull Concept for Silhouette-Based Image Understanding." IEEE Transactions on Pattern Analysis and Machine Intelligence 16.2 (1994): 150-62. ACM Portal. Web. Jun. 27, 2010. <http://portal.acm.org>.
Leyvand, Tommer, Olga Sorkine, and Daniel Cohen-Or. "Ray Space Factorization for From-Region Visibility." ACM SIGGRAPH 2003 Papers. Proc. of International Conference on Computer Graphics and Interactive Techniques, San Diego, CA, 2003. New York: ACM, 2003. 595-604. ACM Portal. Web. Jun. 29, 2010. <http://portal.acm.org>.
Lim, Hong Lip. "Toward a Fuzzy Hidden Surface Algorithm." Proceedings of the 10th International Conference of the Computer Graphics Society on Visual computing: Integrating Computer Graphics with Computer Vision: Integrating Computer Graphics with Computer Vision . New York: Springer-Verlag New York, Inc, 1992. 621-35. ACM Portal. Web. Jun. 8, 2010. <http://portal.acm.org>.
Lischinski, Dani, Filippo Tampieri, and Donald P. Greenberg. "A Discontinuity Meshing Algorithm for Accurate Radiosity." IEEE Computer Graphics and Applications 12.6 (1997): 25-39. Print.
Lorensen, William E., and Harvey E. Cline. "Marching Cubes: A High Resolution 3D Surface Construction Algorithm." ACM SIGGRAPH Computer Graphics 21.4 (1987): 163-69. ACM Portal. Web. Jun. 20, 2010. <http://portal.acm.org>.
Luebke, David. Collection of various lecture slides. N.d. Microsoft PowerPoint file. (Last printed Jul. 27, 1998).
Luebke, David, and Chris Georges. "Portals and Mirrors: Simple, Fast Evaluation of Potentially Visible Sets." Proceedings of the 1995 Symposium on Interactive 3D Graphics . Proc. of Symposium on Interactive 3D Graphics, 1995, Monterey, CA. New York: ACM, 1995. N. pag. ACM Portal. Web. Jun. 9, 2010. <http://portal.acm.org>.
Luka, Peter. "Generalized Conservative Visibility Algorithms." May 30, 2003. MS. Massachusetts Institute of Technology, Cambridge.
Mantyla, Martti. "Boolean Operations of 2-Manifolds through Vertex Neighborhood Classification." ACM Transactions on Graphics 5.1 (1986): 1-29. ACM Portal. Web. May 31, 2010. <http://portal.acm.org>.
Mattausch, Oliver, Jiri Bittner, and Michael Wimmer. "CHC++: Coherent Hierarchical Culling Revisited." Eurographics 2008. Ed. G. Drettakis and R. Scopigno. vol. 27. N.p.: Blackwell Publishing, 2008. 221-30. Print.
McKenna, Michael. "Worst-Case Optimal Hidden-Surface Removal." ACM Transactions on Graphics (TOG) 6.1 (1987): 19-28. ACM Portal. Web. Jun. 29, 2010. <http://portal.acm.org>.
Meyer, Tom. "Introduction to Time-Critical Scheduling." Oct. 5, 1995. PostScript file.
Mora, F., L. Aveneau, and M. Meriaux. "Coherent and Exact Polygon-to-Polygon Visibility." Journal of WSCG (Jan.-Feb. 2005): n. pag. Print.
Moreira, Fabio O., Joao Comba, and Carla Maria Dal Sasso Freitas. "Smart Visible Sets for Networked Virtual Environments." Proceedings of the 15th Brazilian Symposium on Computer Graphics and Image Processing . Washington, DC: IEEE Computer Society, 2002. 373-80. ACM Portal. Web. Jun. 20, 2010. <http://portal.acm.org>.
Mount, David M. "CMSC 754 Computational Geometry." Fall 2002. U of Maryland Dept. of Computer Science, College Park. CMSC 754 Computational Geometry. Web. May 31, 2010. <http://www.cs.umd.edu/~mount//>.
Myllarniemi, Varvana. "Dynamic Scene Occlusion Culling." Paper presented at Computer Graphics Seminar, Spring 2003. Print.
Naylor, Bruce F. "Partitioning Tree Image Representation and Generation from 3D Geometric Models." Proceedings of the Conference on Graphics Interface '92 . San Francisco: Morgan Kaufmann Publishers, Inc., 1992. 201-12. ACM Portal. Web. Jun. 20, 2010. <http://portal.acm.org>.
Nehab, Diego, Joshua Barczak, and Pedro V. Sander. "Triangle Order Optimization for Graphics Hardware Computation Culling." Proceedings of the 2006 Symposium on Interactive 3D Graphics and Games . New York: ACM, 2006. 207-11. ACM Portal. Web. Jun. 30, 2010. <http://portal.acm.org>.
Nirenstein, S., E. Blake, and J. Gain. "Exact From-Region Visibility Culling." Proceedings of the 13th Eurographics Workshop on Rendering. Proc. of ACM International Conference Proceeding Series, Pisa, Italy, 2002. vol. 28. Aire-la-Ville: Eurographics Association, 2002. 191-202. ACM Portal, Web. Jun. 24, 2010. <http://portal.acm.org>.
Nishita, Tomoyuki, Isao Okamura, and Eihachiro Nakamae. "Shading Models for Point and Linear Sources." ACM Transactions on Graphics (TOG) 4.2 (1985): 124-46. ACM Portal. Web. Jun. 29, 2010. <http://portal.acm.org>.
"NVIDIA GPU Programming Guide." N.d. PDF file. (Created Oct. 12, 2007).
Panne, Michiel Van de, and A. James Stewart. "Effective Compression Techniques for Precomputed Visibility." Paper presented at Eurographics 1999. Print.
Petitjean, Sylvain. "A Computational Geometric Approach to Visual Hulls." International Journal of Computational Geometry and Applications 8.4 (1998): 407-36. Print.
Plantinga, Harry. "Conservative Visibility Preprocessing for Efficient Walkthroughs of 3D Scenes." Proceedings of Graphics Interface 93. Toronto: Canadian Information Processing Society, 1993. 166-73 Print.
Plantinga, Harry, and Charles R. Dyer. "Visibility, Occlusion, and the Aspect Graph." International Journal of Computer Vision 5.2 (1990): 137-60. ACM Portal. Web. Jun. 29, 2010. <http://portal.acm.org>.
Poulin, Pierre, and John Amanatides. "Shading and Shadowing with Linear Light Sources." Paper presented at Eurographics 90. Print. Comput. & Graphics vol. 15, No. 2, pp. 259-265. 1991. Printed in Great Britain.
Rege, Ashu. "Occlusion (HP and NV Extensions)." N.d. Microsoft PowerPoint file. (Created Sep. 25, 2013).
Requicha, Aristides A. G., and Herbert B. Voelcker. "Boolean Operations in Solid Modelling: Boundary Evaluation and Merging Algorithms." File last modified on Jan. 1984. U of Rochester Coll of Engineering and Applied Science. UR Research. Web. May 31, 2010. <https://urresearch.rochester.edu/action?institutionalItemId=990>.
Rusinkiewicz, Szymon, and Marc Levoy. "Streaming QSplat: A Viewer for Networked Visualization of Large, Dense Models." Proceedings of the 2001 Symposium on Interactive 3D Graphics . New York: ACM, 2001. 63-8. ACM Portal. Web. Jun. 20, 2010. <http://portal.acm.org>.
Samet, Hanan. "Spatial Data Structures." Modern Database Systems: The Object Model, Interoperability, and Beyond. Reading: Addison Wesley/Press, 1995. N. pag. Print.
Sander, Pedro V., et al. "Silhouette Clipping." Proceedings of the 27th Annual Conference on Computer Graphics and Interactive Techniques. Proc. of International Conference on Computer Graphics and Interactive Techniques, 2000. New York: ACM Press/Wesley, 2000. 327-34. ACM Portal. Web. Jun. 19, 2010. <http://portal.acm.org>.
Saona-Vasquez, Carlos, Isabel Navazo, and Pere Brunet. "Data Structures and Algorithms for Navigation in Highly Polygon-Populated Scenes." N.d. PDF file. (Created Nov. 7, 2007).
Saona-Vasquez, Carlos, Isabel Navazo, and Pere Brunet. "The Visibility Octree. A Data Structure for 3D Navigation." Computers & Graphics 23.5 (1999): 635-43. Print.
Schaufler, Gernot, et al. "Conservative Volumetric Visibility with Occluder Fusion." Proceedings of the 27th Annual Conference on Computer Graphics and Interactive Techniques. New York: ACM Press/Wesley Publishing Co., 2000. 229-38. ACM Portal. Web. Jun. 27, 2010. <http://portal.acm.org>.
Schrocker, Gerald. "Visibility Culling for Game Applications." Diss. Graz U of Technology, 2001. Print.

(56) References Cited

OTHER PUBLICATIONS

Seidel, Raimund. "Small-Dimensional Linear Programming and Convex Hulls Made Easy." Discrete & Computational Geometry 6.5 (1991): 423-434. ACM Portal. Web. May 31, 2010. <http://portal.acm.org>.
Sharman, James. "The Marching Cubes Algorithm." N.d. HTML file. (Created Sep. 11, 2013).
Sigueira, Marcelo, et al. "A New Construction of Smooth Surfaces from Triangle Meshes Using Parametric Pseudo-Manifolds." Computers and Graphics 33.3 (2009): 331-40. ACM Portal. Web. Jun. 17, 2010. <http://portal.acm.org>.
Soler, Cyril, and Francois X. Sillion. "Fast Calculation of Soft Shadow Textures Using Convolution." Proceedings of the 25th Annual Conference on Computer Graphics and Interactive Techniques. Proc. of International Conference on Computer Graphics and Interactive Techniques. New York: ACM, 1998. 321-32. ACM Portal. Web. Jun. 8, 2010. <http://portal.acm.org>.
Staneker, D. "An Occlusion Culling Toolkit for OpenSG PLUS." Paper presented at OpenSG Symposium, 2003. PDF file. OpenSG Symposium (2003).
Stewart, A. James, and Sherif Ghali. "Fast Computation of Shadow Boundaries Using Spacial Coherence and Backprojections." Proceedings of the 21st Annual Conference on Computer Graphics and Interactive Techniques. New York: ACM, 1994. N. pag. ACM Portal. Web. Jun. 29, 2010. <http://portal.acm.org>.
Takusagawa, Ken. "Representing Smooth Surfaces." Oct. 23, 2001. HTML file.
Teller, Seth, and John Alex. Frustum Casting for Progressive, Interactive Rendering. Computer Graphics Group Publications. Massachusetts Institute of Technology, Jan. 1998. Web. Jun. 9, 2010. <http://groups.csail.mit.edu//.html#Technical_Reports>.
Teller, Seth J. "Computing the Antipenumbra of an Area Light Source." ACM SIGGRAPH Computer Graphics 26.2 (1992): 139-48. ACM Portal. Web. Jun. 29, 2010. <http://portal.acm.org>.
Teller, Seth J. "Computing the Antipenumbra of an Area Light Source." 1992. PDF file.
Teller, Seth J. Visibility Computations in Densely Occluded Polyhedral Environments. Diss. U of California at Berkeley, 1992. Berkeley: U of California at Berkeley, 1992. GAX93-30757. ACM Portal. Web. Jun. 29, 2010. <http://portal.acm.org>.
Teller, Seth J., and Pat Hanrahan. "Global Visibility Algorithms for Illumination Computations." Proceedings of the 20th Annual Conference on Computer Graphics and Interactive Techniques . New York: ACM, 1993. 239-46. ACM Portal. Web. Jun. 29, 2010. <http://portal.acm.org>.
Teller, Seth J., and Michael E. Hohmeyer. Stabbing Oriented Convex Polygons in Randomized O(n2) Time. ACM Portal. N.p., n.d. Web. Jun. 29, 2010. <http://portal.acm.org>.
Thibault, William C., and Bruce F. Naylor. "Set Operations on Polyhedra Using Binary Space Partitioning Trees." ACM SIGGRAPH Computer Graphics 21.4 (1987): 153-162. ACM Portal. Web. May 31, 2010. <http://portal.acm.org>.
Vlachos, Alex. "Preparing Sushi: How Hardware Guys Write a 3D Graphics Engine." 2001. PDF file.
Wald, Ingo, Andreas Dietrich, and Philipp Slusallek. "An Interactive Out-of-Core Rendering Framework for Visualizing Massively Complex Models." ACM SIGGRAPH 2005 Courses . Proc. of International Conference on Computer Graphics and Interactive Techniques . New York: ACM, 2005. N. pag. ACM Portal. Web. Jun. 20, 2010. <http://portal.acm.org>.
Wang, Yigang, Hujun Bao, and Qunsheng Peng. "Accelerated Walkthroughs of Virtual Environments Based on Visibility Preprocessing and Simplification." Computer Graphics Forum 17.3 (1998): 187-94. Print.
Wang, Yusu, Pankaj K. Agarwal, and Sariel Har-Peled. "Occlusion Culling for Fast Walkthrough in Urban Areas." Eurographics 2001. N.p.: n.p., 2001. N. pag. Print.
Weiler, Kevin, and Peter Atherton. "Hidden Surface Removal using Polygon Area Sorting." Proceedings of the 4th Annual Conference on Computer Graphics and Interactive Techniques. New York: ACM, 1977. 214-22. ACM Portal. Web. Jun. 30, 2010. <http://portal.acm.org>.
Weiler, Kevin, and Peter Atherton. Slides explaining polygon clipping. N.d. PDF file. (Created Oct. 23, 2006).
Wloka, Matthias. "Batch, Batch, Batch: What Does it Really Mean?" N.d. Microsoft PowerPoint file. (Created Mar. 12, 2003).
Wonka, Peter. "Occluder Shadows for Fast Walkthroughs of Urban Environments." Eurographics 1999. vol. 18, No. 3. Oxford: Blackwell Publishers, 1999. N. pag. Print.
Wonka, Peter, Michael Wimmer, and Dieter Schmalstieg. "Visibility Preprocessing with Occluder Fusion for Urban Walkthroughs." Proceedings of the Eurographics Workshop on Rendering Techniques 2000. London: Springer-Verlag, 2000. 71-82. ACM Portal. Web. Jun. 8, 2010. <http://portal.acm.org>.
Wonka, Peter, Michael Wimmer, and Francois X. Sillion. "Instant Visibility." Eurographics 2001. Ed. A. Chalmers and T.-M. Rhyne. vol. 20. Oxford: Blackwell Publishers, 2001. N. pag. Print.
Wood, Zoe Justine. "Computational Topology Algorithms for Discrete 2-Manifolds." Diss. California Institute of Technology, 2003. Print.
Worrall, Adam. "Dynamic Discontinuity Meshing." Diss. U of Bristol, 1998. Print.
Yoon, Sung-Eui, Brian Salomon, and Dinesh Manocha. "Interactive View-Dependent Rendering with Conservative Occlusion Culling in Complex Environments." Proceedings of the 14th IEEE Visualization 2003 (VIS'03). Washington, DC: IEEE Computer Society, 2003. N. pag. ACM Portal. Web. Jun. 9, 2010. <http://portal.acm.org>.
Zhang, Hongxin, and Jieqing Feng. "Preliminary Mathematics of Geometric Modeling (2)." Nov. 23, 2006. PDF file.
Zheng, Wenting, et al. "Rendering of Virtual Environments Based on Polygonal & Point-Based Models." Proceedings of the ACM Symposium on Virtual Reality Software and Technology. New York: ACM, 2002. 25-32. ACM Portal. Web. Jun. 20, 2010. <http://portal.acm.org>.
Zhou, Kaichi, et al. "Visibility-Driven Mesh Analysis and Visualization through Graph Cuts." IEEE Transactions on Visualization and Computer Graphics 14.6 (2008): 1667-74. Print.
Office Action issued in Chinese Patent Application No. 201180042082.0 dated May 3, 2016 with English Translation.

* cited by examiner

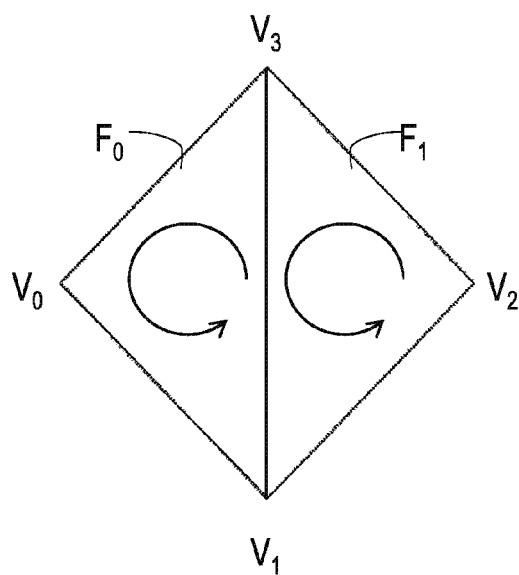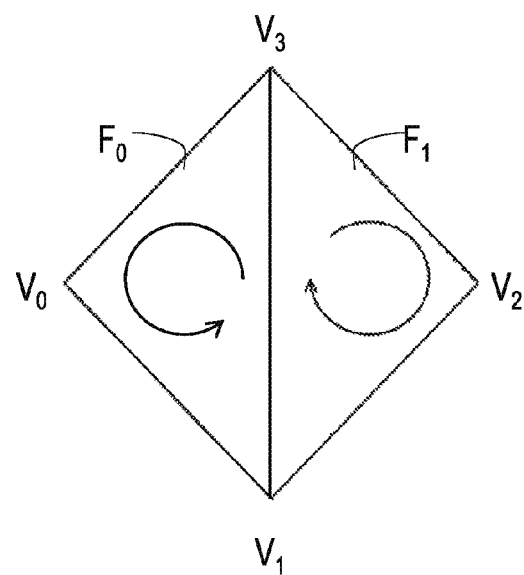
FIG. 4D
PRIOR ART
FIG. 4E
PRIOR ART

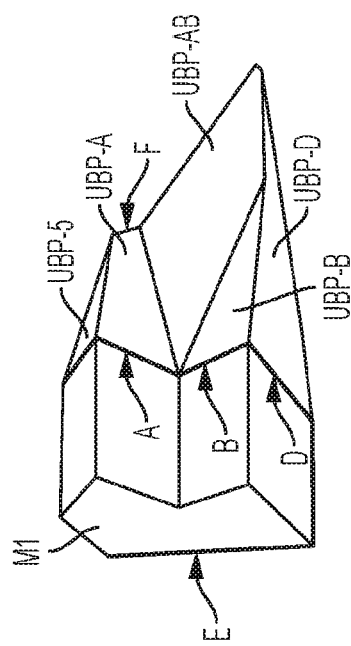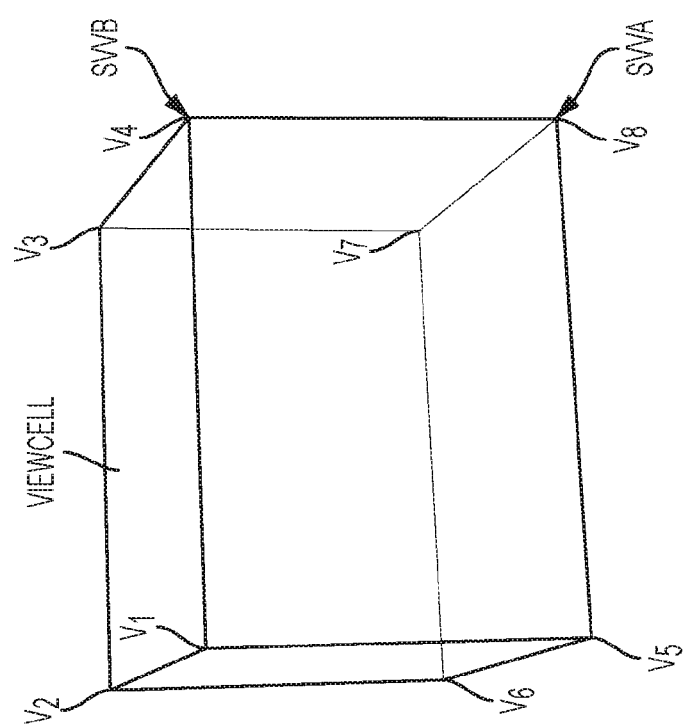
FIG. 10B

```
struct Contour
{
int mesh;          // index to mesh
int edge;          // index to edge of mesh
int vertex;        // index to starting vertex of contour
int node_array;    // index to array of Contour_Nodes
int num_nodes;     // length of coutour_node array
Int VMinfo;        // index to VM_Info array
int last_contour;  // index to next connected contour, head connected
int next_contour;  // index to last connected contour, tail connected
char next_edge_type // if ==1 then next edge is next connected silhouette edge
                    // if ==0 then next edge is next previously labeled edge
char contour_type   // if == 1 dynamically occluding, if == 0 dynamically exposing
                    // if==2 hybrid contour, If==3 simple dynamically occluding
};

struct Contour_Node
{
char node_type; // 1 = outside corner, 2=simple inside corner, 3=CSV
char span_type; // 1= run of outside corners only
                // 2= run may contain outside and inside corners
                // 3=skip span_length segments & connect to next vertex-
                // forming simplified silhouette contour edge
                // 4= construct SE-MV on all inside corners of run using pivot and sweep
                // 5= construct all inside corner event surfaces by intersection adjacent SV-ME planes
int span_length; // number of umbral event surfaces (UBPs) generated on contour until next node
int ninfo;       // if node_type==1 then ninfo is index to OC_Info array
                 // if node_type==2 then ninfo is index to IC_Info array
                 // if node_type==3 then ninfo is index to CSV_Info array
};

struct VM_Info
{
int mesh;          // index to mesh containing OB_SEG corresponding to first silhouette element in run
                   // if associated with dynamically exposing contour, mesh refers to deltaG+submesh
int triangle;      // index to triangle containing OB_SEG corresponding to first silhouette element in run
int retriangulate_hint // bitmask indicating if mesh triangles intersected by OB_SEGS for 31 -
                   // Contour_Nodes of Contour should be retriangulated at runtime 0=no, 1=yes
                   // Last Bit indicates VM dynamic boundary type: 0==occluding 1==exposing
float point[3];    // x,y,z value of initial vertex if it is formed by intersection with other OB_SEG
};
```

FIG. 31A

```
struct IC_Info
{
char ic_type;    //(optional)1= form SE-MVs by pivot and sweep
                 //(optional)2= intersect planes of adjacent SV-MEs
char SVSC[4];    // (optional) hints for specific viewcell edges forming SVSC
};

struct CSV_Info
{
int mesh;        // (optional) index to mesh containing intersected edge
Int edge;        // (optional) index to intersected edge
char ic_type;    //(optional)1= hint-form SE-MVs by pivot and sweep
                 //(optional)2= hint- intersect planes of adjacent SV-MEs
char SVSC[4];    // (optional) hints for specific viewcell edges forming SVSC
double point[3]; // (optional) precomputed x,y,z values of vertex of CSV
};

struct tri_seed // index/pointer to specific triangles of model used to initiate
                // simplified mesh traversal (FIG. 37) to construct viewcell B visibility
                //map from viewcell A visibility map
{
int tri_count;    // number of triangles in seed
int* mesh_array;  // sequence of mesh ids
int* tri_array;   // sequence of triangle ids
};

struct DeltaGplussubmesh_attach_polyline
                // precomputed list of mesh edges for attaching submesh and original mesh
{
int contour;       // reference to a specific Contour
char attach_type;  // if ==0 free edges of submesh attached to free edges of mainmesh
                   // if ==1, free edges of submesh attached to listed edges of mainmesh
                   // if ==2, free edges of submesh linked to free edges of mainmesh
                   // if == 3, free edges of submesh lined to listed edges of mainmesh
int submesh;       // reference to attaching submesh
Int edgenumber;// number of edges in the attaching polyline
Int* submesh_edgelist;      // ordered list of edges in submesh which attach
int* mainmesh_edgelist;     // ordered list of edges in mainmesh to which attaches
};
struct OC_Info  // information for an outside corner node of
{
char svsc;    // (optional) hint for specific viewcell vertex forming UBP
};
```

FIG. 31B

```
struct DeltaGplussubmesh
{
int trianglecount;    // number of triangles in the submesh
int vertexcount;      // number of vertices in the submesh
int edgecount;        // number of edges in the submesh Triangle* trianglep;  // array of trianglecount triangles which indexes vertex and edge arrays below
Vertex* vertexp;      // array of vertexcount vertices
Edge* edgep;          // array of edgecount edges
};

struct Triangle
{
int global_id;        // global_id
int vertex[3];        // index of 3 vertices in DeltaGplussubmesh.vertexp array
int edge[3];          // index of 3 edges in DeltaGplussubmesh.edgep array
};

Struct Edge
{
int global_id;        // global id
int vertex[2];        // index of two vertices in DeltaGplussubmesh.vertexp array
};

struct vertex
{
int global_id;        // global id
float point[3];       // x,y,z value of vertex
};

struct Starting_Sil_Edge_UBP_Intersection_Hint
{
Mesh_triangle* INTERSECTED_TRIANGLE
char INTERSECTION_RUNLENGTH   // If > 0 Number of adjacent triangles intersected by UBP
                              // if < 0 Number of adjacent UBPs intersecting same triangle
};

struct Sil_Edge_UBP_Intersection_Hint
{
char INTERSECTION_RUNLENGTH   // If > 0 Number of adjacent triangles intersected by UBP
                              // if < 0 Number of adjacent UBPs intersecting same triangle
};
```

FIG. 31C

```
struct DeltaGplus_Header
{
int viewcell_start;              // unique viewcell number of starting viewcell
int viewcell_end;                // unique viewcell number of ending viewcell
char transition_face;            // indicator of which face of starting viewcell is penetrated
int packet_size;                 // byte size of visibility event packet
DeltaGplus* deltaGplus_array;    // pointer to an array of DeltaGplus meshes
Int deltaGplus_count;            // number of deltaGplus structures in array
};

struct DeltaGplus
{
int trianglecount;   // number of triangles in the mesh
int vertexcount;     // number of vertices in the mesh
int edgecount;       // number of edges in the mesh Triangle* trianglep; // array of trianglecount triangles which indexes vertex and edge arrays below
Vertex* vertexp;     // array of vertexcount vertices
Edge* edgep;         // array of edgecount edges
};

struct Triangle
{
int global_id;       // global_id
int vertex[3];       // index of 3 vertices in DeltaGplus.vertexp array
int edge[3];         // index of 3 edges in DeltaGplus.edgep array
int global_material; // index to array of material data structures;
};

Struct Edge
{
int global_id;       // global id
int vertex[2];       // index of two vertices in DeltaGplussubmesh.vertexp array
};

struct vertex
{
int global_id;       // global id
float point[3];      // x,y,z value of vertexf
float tex[2];        // texture map values
};
```

FIG. 31D

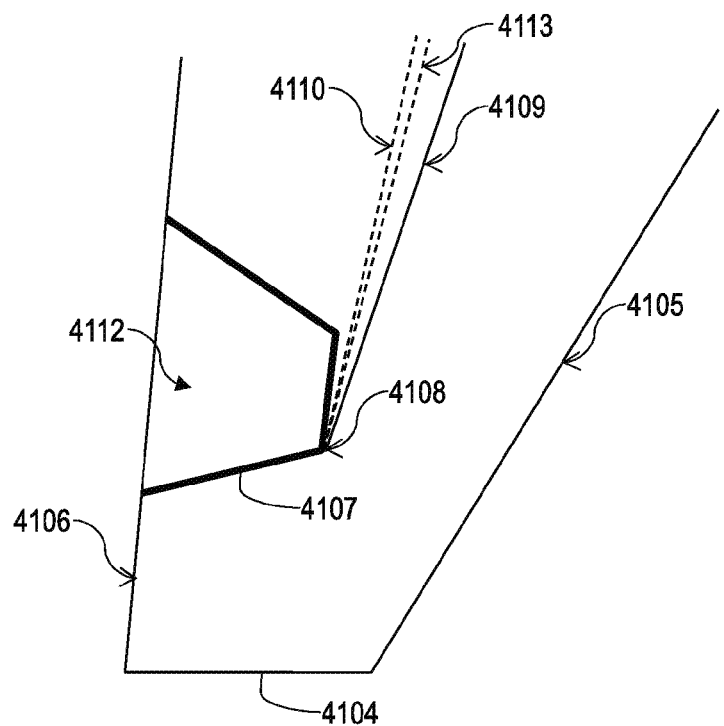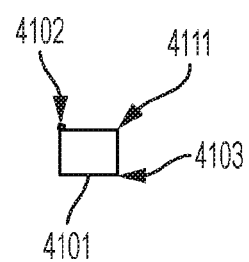
FIG. 41A

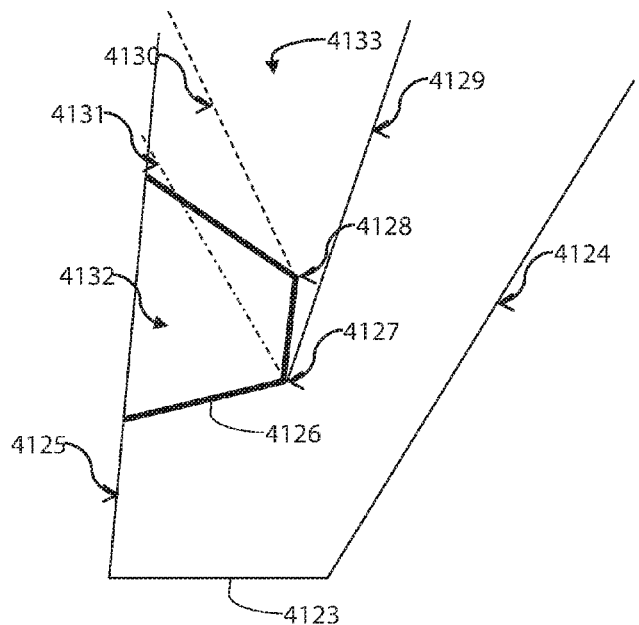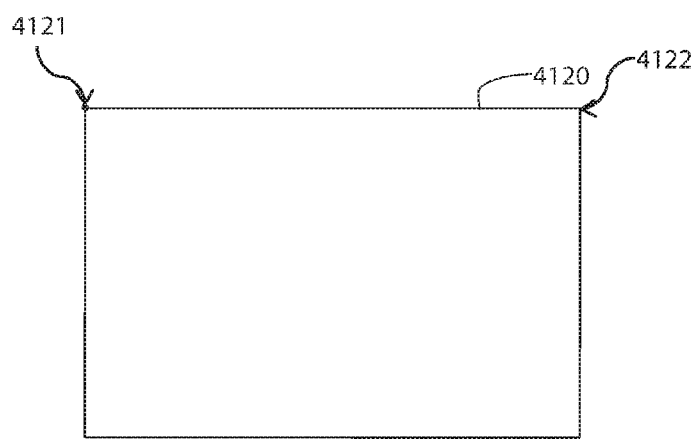
FIG. 41B

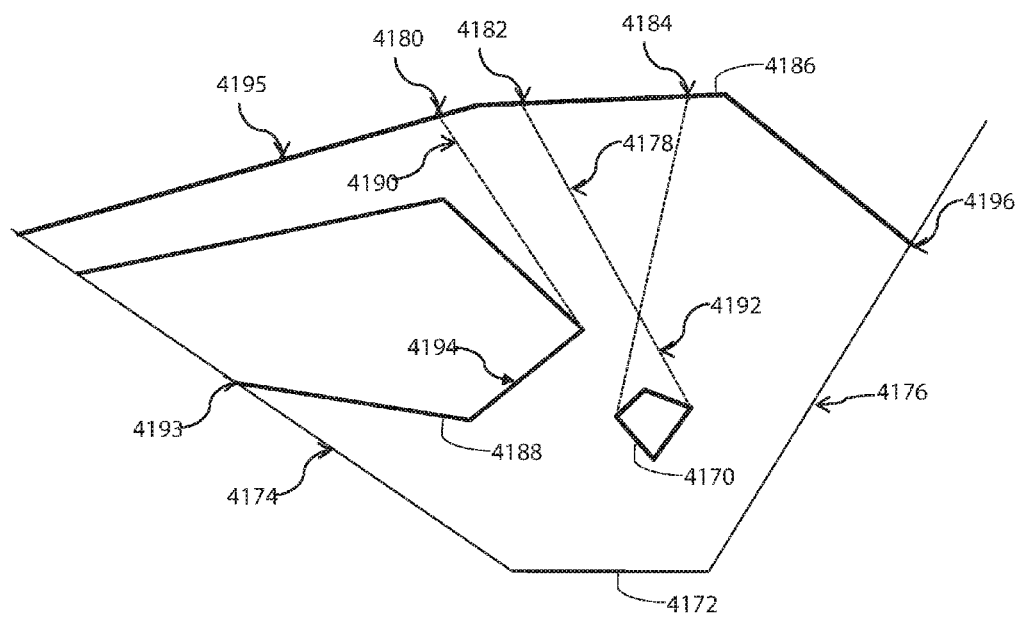
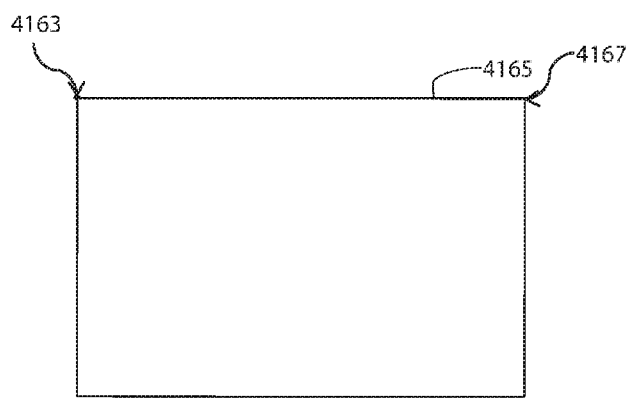
FIG. 41C

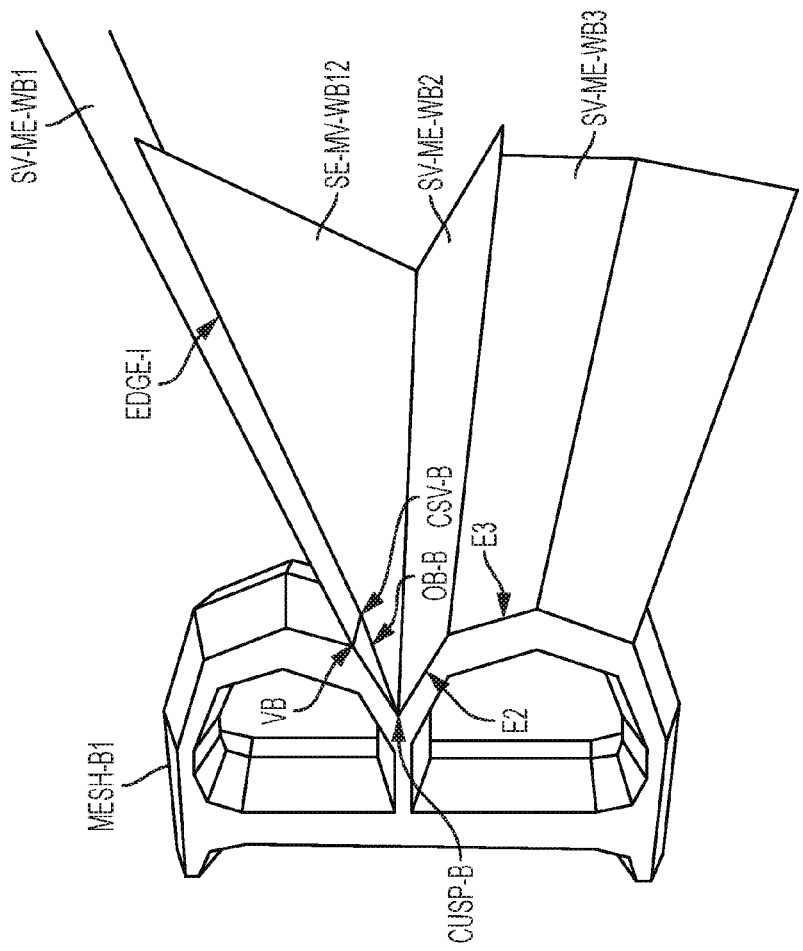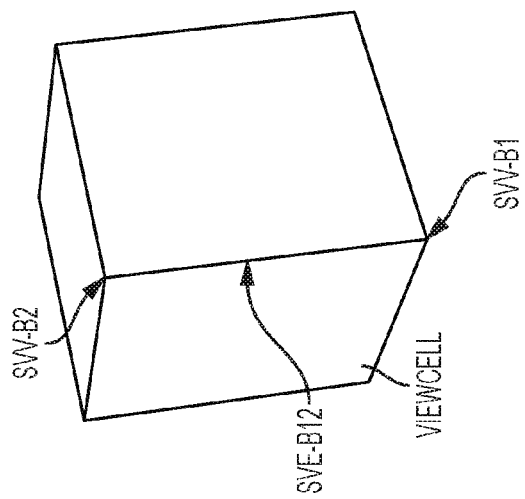
FIG. 41D

```
struct DDL_Edge
{
int ddl_vertex[2];  // indices to 2 elements of array of Local_Vertex structures
char num_using;     // number of local VM/PVS referencing this edge
};

struct DDL_Vertex
{
float point[3];     // x,y,z value of vertex
char num_using;     // number of local VM/PVS referencing this vertex
};

struct DDL_Tri
{
int ddl_edge[3];    // indices to 3 elements of array of DDL_Edge structures
int neighbor_triangles[3]; // indices to 3 edge-adjacent triangles in array of DDL_Tri structures
char num_using;     // number of local VM/PVS referencing this triangle
};

struct Global_to_DDL_Linkmap_Edge
{
int ddl_edge_index;  // index of edge in DDL_Edge array for a particular
};

struct Global_to_DDL_Linkmap_Vertex
{
int ddl_vertex_index; // index of vertex in DDL_Vertex array
};

struct Global_to_DDL_Linkmap_Tri
{
int ddl_tri_index;  // index of tri in DDL_Tri array
};

struct Global_to_DDL_Linkmap_Mesh
{
int ddl_tri_index;  // index of tri in DDL_Mesh array
};
```

FIG. 43A

```
struct DDL_Mesh
{
Int ddl_tri;      // indices to starting triangle in array of DDL_Tri structures
char num_using    // number of local VM/PVS referencing this mesh
};

struct PVS
{
int tricount;      // number of triangles in the DDL/PVS
int triarray;      // index of of DDL_Tri  array comprising the PVS int edgecount;     // number of edges in the DDL/PVS
int edgearray;     // index of of DDL_Edge  array comprising the PVS int vertexcount;   // number of vertex in the DDL/PVS
int vertexarray;   // index of of DDL_Vertex array comprising the PVS

.
  .
  .

};
```

FIG. 43B

SYSTEM AND METHOD OF FROM-REGION VISIBILITY DETERMINATION AND DELTA-PVS BASED CONTENT STREAMING USING CONSERVATIVE LINEARIZED UMBRAL EVENT SURFACES

CROSS REFERENCE TO RELATED APPLICATIONS

This application claims the benefit of the earlier filing date of U.S. Provisional Application 61/360,283 entitled "System and Method of From-Region Visibility Determination and Delta-PVS Based Content Streaming Using Conservative Linearized Umbral Event Surfaces" and filed on Jun. 30, 2010, the entirety of which is incorporated herein by reference. This application further claims the benefit of the earlier filing date of U.S. Provisional Application 61/382,056 entitled "System and Method of Delivering and Controlling Streaming Interactive Media Comprising Predetermined Packets of Geometric, Texture, Lighting and Other Data Which are Rendered on a Receiving Device" and filed on Sep. 13, 2010, the entirety of which is incorporated herein by reference. This application further claims the benefit of the earlier filing date of U.S. Provisional Application 61/384,284 entitled "System and Method of Recording and Using Clickable Advertisements Delivered as Streaming Interactive Media" and filed on Sep. 19, 2010, the entirety of which is incorporated herein by reference. This application further claims the benefit of the earlier filing date of U.S. Provisional Application 61/452,330 entitled "System and Method of Controlling Visibility-Based Geometry and Texture Streaming for Interactive Content Delivery" and filed on Mar. 14, 2011, the entirety of which is incorporated herein by reference. This application further claims the benefit of the earlier filing date of U.S. Provisional Application 61/474,491 entitled "System and Method of Protecting Game Engine Data Formats and Visibility Event Codec Formats Employing an Application Programming Interface Between the Game Engine and the Codec" and filed on Apr. 12, 2011, the entirety of which is incorporated herein by reference. This application also claims the benefit of the earlier filing date of U.S. Provisional Application 61/476,819 entitled "System and Method of Delivering Targeted, Clickable, Opt-Out or Opt-In Advertising as a Unique, Visibility Event Stream for Games and Streaming Interactive Media" and filed on Apr. 19, 2011, the entirety of which is incorporated herein by reference.

BACKGROUND OF THE INVENTION

1. Field of the Invention

This invention relates to a method and system for generating images using precomputed visibility information.

2. Description of Background

Real-time 3-D graphics display hardware has become increasingly powerful and affordable. The availability of this hardware has enabled computer and game-console applications to routinely display scenes containing tens of thousands of graphic primitives in each frame. With few exceptions these hardware display systems employ a Z-buffer based hidden surface removal algorithm.

The z-buffer hidden-surface removal algorithm solves visibility per-pixel by computing the Z (depth) value of each rasterized pixel (or fragment) of every primitive in the view frustum. During rasterization the Z value of the current fragment is compared to the existing Z value in the frame buffer and the color of the fragment is written to the frame buffer only if it is has a lower Z value than the existing value in the Z-buffer.

While this approach provides acceptable performance for relatively simple scenes, it can fail to provide adequate real-time performance for complex, realistic scenes. Such scenes tend to have high depth complexity which typically forces each element of the Z-buffer to be compared multiple times during the rendering of a single frame. Essentially all hidden surface samples that lie within the view frustum must be Z-rasterized and compared to the Z-buffer values to find the closest visible samples.

In some Z-buffer implementations the rasterizer often performs not only the Z determination and Z-buffer compare for all hidden fragments but also computes the complete rendering of hidden fragments, writing the resulting color to the frame buffer only if the corresponding Z value was closer than the existing Z-buffer value. For scenes of even modest depth complexity, this can result in wasted computation and diminished performance.

Other z-buffer implementations includes some type of "early-Z" rejection in which the color value of the fragment is not computed if its Z value is greater than the corresponding Z-buffer value. This can reduce rendering of hidden fragments but is only maximally effective if the graphic primitives are rendered in a back-to-front order.

Another improvement to the hardware Z-buffer is the integration of certain elements of the "Hierarchical Z-buffer" algorithm (Greenet al 1993) (Green N., Kass, M., Miller, G "hierarchical Z-Buffer Visibility" Proceedings of ACM Siggraph 1993 pp. 231-238, the entirety of which is incorporated herein by reference) This algorithm employs a hierarchical representation of the Z-buffer to perform rapid visibility rejections tests. The complete hierarchical Z-buffer algorithm has proven difficult to implement in hardware although basic versions of the hierarchical Z-buffer pyramid itself has been implemented in some systems (e.g., Nvidia, ATI). In these implementations a low resolution version of the Z-buffer is maintained in memory that is local to the individual rasterizer units. These local representations are used in the previously described "early-Z" rejection test. If an individual fragment can be rejected by comparing it to the low resolution, locally stored Z-buffer element, then a slower access of the high resolution (non-local) Z-buffer is avoided.

In these accelerated hardware z-buffer systems "early-Z" rejection can sometimes prevent rendering of hidden fragments and hierarchical-Z pyramid can speed the "early-Z" rejection test. Nevertheless such accelerated systems still require that all primitives within the view frustum are processed through the geometry phase of the graphics pipeline and all fragments, including occluded surfaces, in the view frustum are processed through at least the Z generation/rejection test phase. Consequently, these systems can still perform poorly when rendering scenes of high depth complexity.

Given the relatively poor performance of Z-buffer systems for scenes of high depth complexity, algorithms have been developed which identify occluded geometry and exclude such geometry from both the geometry and rasterization stages of the hardware graphics pipeline. These occlusion culling techniques can be performed either at run-time or in a preprocessing stage. A review of visibility culling techniques is published in Cohen-Or et. al. (2003) (Cohen-Or, Daniel, et al. "A Survey of Visibility for Walkthrough Applications." *IEEE Transactions on Visualization and Computer Graphics* 9.3 (2003): 412-31. Print., the entirety of which is incorporated herein by reference.) Visibility culling refers to any method which identifies and rejects invisible geometry before actual hidden surface removal (i.e. by Z-buffer) is performed. The well established methods of backface culling and view frustum culling using hierarchical techniques are routinely employed by applications to cull graphics primitives from the hardware pipeline. Occlusion culling is a type of visibility culling approach which avoids rendering primitives that are occluded in the scene. Occlusion culling involves complex interrelationships between graphic primitives in the model and is typically far more difficult to perform than view frustum culling.

In general, run-time occlusion culling techniques determine what geometry is visible from a single viewpoint. These are called "from-point" culling techniques. In contrast, preprocessing approaches to occlusion culling determine the subset of geometry that is visible from any viewpoint in a specified region. The latter methods are referred to as "from-region" visibility techniques.

The survey of Cohen-Or et. al. (2003) focuses on "walk-through" type applications which are characterized by a relatively large amount of static geometry and high potential depth complexity. Many computer games, simulators, and other interactive applications fall into this category. These applications tend to benefit substantially when "from-region" occlusion culling techniques are applied to the geometric database in a preprocessing step. These techniques partition the model into regions or cells. These viewcells are navigable regions of the model which may contain the viewpoint. During preprocessing the subset of graphics primitives that are potentially visible from anywhere within a viewcell (potentially visible set or PVS) is determined. The principal advantage of from-region visibility techniques is that the considerable computational cost of occlusion culling is paid in a preprocessing step rather than at runtime.

In general, from-region visibility preprocessing techniques aim to compute a conservative overestimate of the exact PVS for a view cell. The first from-region visibility methods were developed for interactive viewing of architectural models. Architectural models are naturally subdivided into cells (eg. rooms, halls) and the visibility between cells occurs through connecting openings (doorways, windows) called portals. Airey (1990) exploited this structure in simple, axially aligned models. He demonstrated a method of identifying polygons visible through portals using an approximate, but conservative, shadow umbra calculation.

Teller (1992) (Teller, Seth, *Visibility Computations in Densely Occluded Polyhedral Environments*. Diss. U of California at Berkeley, 1992. Berkeley: U of California at Berkeley, 1992. GAX93-30757. *ACM Portal*., the entirety of which is incorporated herein by reference) and Sequin extended the method of cell-and-portal from-region visibility to non-axis aligned polygonal models which do not require user defined walls and portals. Teller employed a BSP tree defined by the polygons of the model (autopartition). The leafs of the BSP tree are necessarily convex polyhedra which may not be completely closed. These convex polyhedra are the visibility cells (or viewcells) of the model. Using cell adjacency information available in the BSP graph, the open regions on the boundary between adjacent cells are identified and enumerated as portals between visibility cells.

Thus, Teller exploited the structure of the BSP autopartition to reduce the from-region visibility problem to a more restricted and simplified problem of visibility through a sequence of polygonal portals. Teller showed that even for this relatively restricted visibility problem, the visibility event surfaces separating from-cell visible volumes and from-cell occluded volumes are usually quadric surfaces.

Teller determined cell-to-cell visibility by employing a test for the existence of extremal stabbing lines between cells through a portal or sequence of portals. In this method cell-to-cell visibility is determined by establishing the existence of at least one ray that originates in the source cell and penetrates a sequence of portals to connecting cells. For example, the existence of such a ray through four portals is given by an extremal stabbing ray which is incident on any four edges of the relevant portals. Such a ray is identified using a Plucker mapping in which lines in three space are mapped to planes in 5-space. The intersection of these four planes form a line in 5-space which is intersected with the Plucker quardic to produce at most two non-imaginary results. Each of these intersections corresponds to a line in 3-space which intersects the four portal edges, i.e. an extremal stabbing line. The cost of locating an extremal stabbing ray is $O(n^2)$ in the number of edges in the portal sequence. Because the stabbing is performed incrementally the overall cost is $O(n^3)$. The method employs singular value matrix decomposition which can exhibit numerical instability as a consequence of geometric degeneracies encountered in the stabbing sequence.

Teller also developed a method of computing the exact visible volume through a portal sequence: the antipenumbra volume. As previously noted this volume is, in general, bounded by both planar and quadric surfaces. In this method the edges of the portals are once again dualized to Plucker coordinates, with each line in 3-space representing the coordinates of a plane in 5-space. The planes corresponding to all edges in a portal sequence are intersected with each other, using higher dimensional convex hull computation, to form a polyhedron in 5-space. The intersection of the faces of this polyhedron with the Plucker quadric correspond to the extremal swaths, or visibility event surfaces between the portal edges. The intersection of the 5D faces with the Plucker quadric are not computed directly. Instead the intersection of the 5D edges with the Plucker quadric are computed. The intersection of the edges of the 5D polyhedron with the Plucker quadric correspond to extremal stabbing lines which bound the swaths. The intersections of these 5D edges with the Plucker quadric are identified by finding the roots of a quadratic equation. The swaths are identified indirectly by computing the intersections of the 5D edges with the Plucker quadric and examining the faces of the 5D polytope (edges in 3D) that share the 5D edge.

Each swath may be a component of the boundary of the antipenumbra or, alternatively may be entirely within the antipenumbra volume. A containment test is used to identify boundary swaths.

Teller found that the antipenumbra computation is difficult to implement robustly. This method requires high-dimensional linear programming computations and root finding methods which, together, are not sufficiently robust to be used for complex models.

Teller (1992) and Teller and Hanrahan (1993) (Teller, Seth J., and Pat Hanrahan. "Global Visibility Algorithms for Illumination Computations." *Proceedings of the 20th Annual Conference on Computer Graphics and Interactive Techniques*. New York: ACM, 1993, the entirety of which is incorporated herein by reference) also developed a simpler technique to determine cell-to-cell visibility and cell-to-object visibility through a portal sequence. In this implementation the antipentumbra is conservatively approximated by a convex polyhedron. This "linearized" antipenumbra is bounded by separating planes of the portal sequence effectively forming a convex hull of the antipentumbra. The planes defining the boundary of the linearized antipentumbra are intersected with each other and with the bounding planes of the bsp leaf cell to determine visibility through the portal sequence.

Although the linearized antipentumbra method overestimates the cell-to-cell visibility through a portal sequence it is amenable to a robust implementation.

In 1996 John Carmack employed a method of precomputing cell-to-cell visibility for the computer game Quake. Carmack's method of visibility precomputation in Quake is somewhat similar to the linearized antipenumbra method described by Teller. In both Teller's and Carmack's method the geometric database is subdivided by a BSP tree in which large occluders (e.g. walls, floors) acted as splitting planes. The terminal leafs of such a subdivision are convex polyhedra which may have one or more non-closed boundaries, or portals. In both methods the portals between leaf cells are identified and cell-to-cell visibility is established using a linearized overestimate of the antipentumbra between the portals.

In Teller's method the linearized antipenumbra is constructed by pivoting from each portal edge to two specific extremal or "separating" vertices in the portal sequence: one in each halfspace of the portal. (An extremal vertex of a portal is a vertex that together with the original portal edge form separating planes between the two portals.) The extremal vertices chosen result in planes which have the portal and all other extremal vertices in the same halfspace.

In Carmack's implementation this pairwise, sequential intersection of linearized antipentumbra is used to establish the existence of cell-to-cell visibility in a portal chain. The actual intersection of the antipentumbra with objects in each cell is not performed. The results are stored as a cell-to-cell PVS for each leaf cell.

Carmack's 1996 implementation of Teller's algorithms established BSP spatial subdivision with through-portal cell-to-cell visibility as the preferred method of visibility precomputation for computer games. Subsequent 3-D computer game systems either derived directly from Carmack's Quake Code (e.g. Quake II, Quake III, and Valve Software's "Source" game engine) or unrelated to it (e.g. Epic Game's Inc. "Unreal" game engine) have adopted this method of precomputed occlusion culling for densely occluded polyhedral environments.

In all of these systems the modeled environments of the game are constructed using "level editing" tools to create the geometry of the walls, floors, ceilings and other stationary, potentially occluding elements of the environments. This geometry is then submitted to a preprocess that constructs a BSP tree from this geometry using conventional BSP algorithms. Typically a second preprocess is then invoked to calculate the cell-to-cell PVS for each leaf cell of the BSP tree using the previously described through-portal visibility method. The PVS for a particular leaf cell is typically stored as an efficient compressed bit vector which indicates the other the bsp leaf cells that are visible from the source cell.

During runtime display the specific leaf cell containing the current viewpoint, the viewpoint leaf cell, is established using a simple BSP algorithm. The PVS for the viewpoint leaf cell is read and the corresponding (potentially visible) leaf cells are then hierarchically culled with respect to the current view frustum using standard hierarchical view frustum culling methods. Those graphic primitives from PVS leaf cells that are within the view frustum are then sent to the hardware graphics pipeline. During runtime display various from-point occlusion culling methods such as from-point portal and anti-portal culling may also be employed to further limit which primitives are sent to the hardware graphics pipeline. Nevertheless the precomputed PVS is typically the working set of primitives on which runtime from-point culling is performed. Consequently the precomputed PVS is central to the runtime performance not only because its own occlusion-culling costs have already been paid in a preprocess but also because an accurate PVS can lower the cost of runtime from-point occlusion culling methods by limiting the amount of geometry on which they must operate.

Although the BSP/portal-sequence method of PVS precomputation is widely employed to enhance the performance of computer games and similar applications current implementations of the method have a number of shortcomings. As previously discussed, the use of a linearized approximation of the portal sequence antipentumbra can cause the method to significantly overestimate the size of the PVS.

Another limitation of the method is that it requires construction of a BSP from the potentially occluding geometry of the model (an autopartition). Spatial subdivision using a BSP tree which is well-balanced and space-efficient is known to be an inherently difficult problem (see pg. 96 TELLER (1992)). The best bounds on time complexity for tree construction tends is $O(n^3)$ for a tree of worst case size $O(n^2)$. With well chosen splitting heuristics BSPs of reasonable size can be produced for models of moderate complexity. However for larger models these time and space cost functions can make practical BSP construction and storage prohibitive. Consequently when employing the method users must often limit the number of primitives used to construct the BSP. Complex objects which contain large numbers of non-coplanar primitives are typically deliberately excluded as potential occluders because they would increase the time and space cost of BSP construction. Such objects are typically managed separately by the method which requires that the user (i.e. the level designer) designate the objects as "detail" objects which do not contribute BSP planes and do not function as occluders during the PVS precomputation. These detail objects can still function as potential occludees in the method. If a detail object is completely contained within a PVS leaf cell and the leaf cell is determined not to be part of the cell-to-cell PVS for a given viewpoint leaf cell then the detail object can be excluded from the PVS of the viewpoint leaf cell. Nevertheless by eliminating objects from consideration as potential occluders based on their geometric complexity instead of their occluding potential, the method can significantly overestimate the actual from-region PVS.

A related weakness of the BSP/portal-sequence method is that it can perform poorly for modeled environments other than architectural interiors. When applied to architectural interior models the method tends to naturally construct BSP leaf cells that correspond to rooms having portals which correspond to doors or windows. In contrast for open, outdoor scenes as well as many complex interior scenes visibility is less clearly governed by a closed-cell, open-portal relationship. In such scenes visibility is often limited primarily by freestanding occluders not associated with a relatively closed cell; or by the aggregation or fusion of multiple smaller occluders. The BSP/portal-sequence does not effectively account for the fusion of individual freestanding occluders when culling occluded geometry. Applying the BSP/portal-sequence method to such scenes can produce a very large BSP and very long portal sequences. Under these conditions the method tends to take a very long time to compute PVS's that are highly overestimated and inefficient at runtime. Applications that employ the BSP/portal-sequence method will typically avoid PVS precomputation for such scenes and may instead rely on from-point occlusion culling methods such as from-point portal culling, such as the dynamic antiportal method used by Valve Software's Source® game engine, which must be computed during runtime.

Teller's initial description of the portal sequence method included a technique of computing cell-to-primitive PVS by intersecting the linearized antipenumbra with individual primitives in bsp leaf cells. In practice this technique has not been adopted by Carmack or other existing systems in part because the storage costs of a cell-to-primitive PVS would be much higher than a cell-to-cell PVS.

Despite the variety of approximations that have been employed to simplify and expedite BSP/portal-sequence visibility preprocessing, it remains a computationally expensive process. Because the BSP/portal-sequence method overestimates the PVS, completely occluded graphic primitives may undergo expensive runtime processing despite being invisible in the scene. The computational cost of processing occluded primitives during runtime may be paid by the CPU, the GPU, or both. CPU processing may include view frustum culling, from-point portal culling, from-point anti-portal culling, as well as the CPU cost of batch primitive submission to the GPU. On the GPU side, occluded primitives may undergo both vertex processing and rasterization phases of the hardware graphics pipeline. One measure of the efficiency of precomputed occlusion culling is the degree of overdraw that occurs during runtime. Overdraw may occur during rasterization whenever a rasterized fragment must be compared to a non-empty entry in the Z-buffer. This non-empty entry in the Z-buffer resulted from earlier rasterization of a fragment at the same image-space coordinates. The earlier entry may be in front of or behind (occluded by) the current fragment. The situation must be resolved by a Z-buffer read and compare operation. The earlier entry is overwritten if its Z value is more distant than that of the current fragment. As previously described, modern hardware Z-buffer systems can sometimes prevent actual shading of occluded fragments using an "early-Z" rejection test which may include a hierarchical Z compare mechanism. Nevertheless completely occluded primitives that make it to the rasterization stage of the graphics pipeline will, at a minimum, have each of their rasterized fragments compared to a corresponding Z-buffer and/or its hierarchical equivalent. We adopt the convention that overdraw includes any "overlap" of fragments in image-space which will at least require a Z-compare operation.

When the BSP/portal-sequence method was applied to the architectural interiors of the game Quake it was found that an average overdraw of 50% but ranging up to 150% in worst cases. (Abrash 1997, pg. 1189, Abrash, Michael "*Michael Abrash's Graphics Programming Black Book Special Edition*", 1997 The Corilois Group, the entirety of which is incorporated herein by reference). This level of overdraw was encountered for relatively simple models which have a maximum depth complexity on the order of 10 and in which the visible depth complexity is often intentionally minimized by carefully selecting the position of occluding walls and portals.

A later implementation of Carmack's visibility precomputation method is employed in ID Software's Quake III computer game. In this game the simulated environments have significantly more geometric detail than the original Quake game (approximately 40,000 polygons per level). As in the original game, levels are carefully designed to contain a variety of obstacles including right-angled hallways, walls behind doorways, stairways with U-turns, and other visibility barriers. These obstacles are intentionally arranged to limit visibility within the model and thereby reduce the size of the PVS for the model's visibility cells. Even with these visibility barriers the approximate cell-to-cell portal visibility calculation results in considerable overdraw during runtime display. When applied to Quake III levels the BSP/portal-sequence precomputation method generally results in typical overdraws of 80% with worst cases exceeding 300%. These results are obtained by measuring depth complexity during run-time walkthrough of typical Quake III levels using the -dc command line option. During these measurements care must be taken to control for the effect of multipass shading.

Thus even when the BSP/portal-sequence method is applied to modeled environments for which it is best suited, it is a computationally expensive and relatively ineffective method of from-region occlusion culling. Consequently more recent work has focused on from-region occlusion culling methods which can be applied to general scenes and which produce a more precise PVS at a reasonable computational cost.

Early conservative methods of general from-region occlusion culling were described in Cohen-Or et al. (1998) (Chrysanthou, Yiorgos, Daniel Cohen-Or, and Dani Lischinski. "Fast Approximate Quantitative Visibility for Complex Scenes." *Proceedings of the Computer Graphics International* 1998. Washington, D.C.: IEEE Computer Society, 1998. 220, the entirety of which is incorporated herein by reference). In these methods, objects are culled only if they are occluded by a single, large, convex occluder. Unfortunately the presence of large, convex occluders is rarely encountered in actual applications.

More recently, methods of from-region visibility precomputation have been developed which attempt to account for the combined occlusion of a collection of smaller occluders (occluder fusion).

Durand et al. (2000) (Durand, Fredo, et al. "Conservative Visibility Preprocessing using Extended Projections." *Proceedings of the 27th Annual Conference on Computer Graphics and Interactive Techniques*. Proc. of International Conference on Computer Graphics and Interactive Techniques. New York: ACM Press/Wesley Publishing Co., 2000. 239-48, the entirety of which is incorporated herein by reference) proposed a method of from-region visibility precomputation that employs a conservative, image-space representation of occluders and occludees called the extended projection. In this method a conservative, pixel based, representation of a convex occluder is constructive by rasterizing the occluder primitives from eight different viewpoints corresponding to the vertices of the viewcell. The extended projection of the convex occluder is the intersection of its projection from these views. This intersection can be computed by rasterizing the occluder into a hardware Z-buffer and stencil buffer data structure, which together form the "extended depth buffer". Occludees are conservatively represented as the union of the projections of their bounding boxes from the same viewcell vertices. Occludees are culled as invisible from the region if they are completely covered by an occluder in the extended depth buffer. The extended projections of multiple occluders aggregate on the extended depth buffer, which accounts for occluder fusion.

The method may use extended depth buffers corresponding a single set of six planes which surround the entire environment. Alternatively, consecutive sets of surrounding planes at increasing distances from the viewpoint cell can be employed. In this case aggregated occluders on a near plane can be reprojected, using a conservative convolution operator, to subsequent planes. This "occlusion sweep" reprojection approach is more effective in capturing the fusion of multiple, small occluders at varying distances from the viewpoint cell. This arrangement was used, for example, to account for occluder aggregation in a forest scene of high depth complexity.

The extended projection method employs a number of approximations which result in overestimation of the PVS. First, the size of potential occludees is always overestimated since the method does not use the projection of the occludee itself. Instead the bounding box of the occludee is projected. In addition a second approximation, the bounding rectangle of this projection, is used to compute the extended projection of the occludee. These consecutive approximations result in an overestimate of the size of the occludee and consequently reduce the precision of the PVS. Moreover, the requirement to use occludee bounding boxes effectively limits the precision of the method to producing to a cell-to-object (rather than cell-to-primitive) PVS.

The extended projection method can directly rasterize only convex occluders into the extended depth buffer. Concave occluders must first be converted to a convex representation by intersecting the concave occluder surface with the projection plane. This is an additional step requiring a object-space calculation that, depending on the characteristics of the occludee surface, may be computationally expensive. In addition, if the location of the projection plane is not ideal, the intersection calculation can significantly underestimate the actual occluding effect of the concave occluder.

Another approximation employed by the extended projection method is the technique for reprojecting an occluder from one projection plane to a more distant one. The goal of this reprojection is effectively to identify the umbra of a planar occluder (with respect to a light source represented by the viewcell) and find the intersection of this umbra with a more distant plane. The extended projection method conservatively estimates this intersection by convolving the image of the occluder with an inverse image of rectangle that functions as an overestimate of a light source formed by the viewpoint cell. This technique can significantly underestimate the umbra of occluders which are similar in size to the viewpoint cell. By significantly underestimating the size of reprojected occluders the method will tend to overestimate the PVS.

A principal motivation of the extended projection method is to detect occlusion caused by the combined effects of multiple small occluders. Durand et al (2000). acknowledge that the method only detects fusion between occluders where the umbra (occluded region) of the occluders intersect and when this intersection volume itself intersects one of the arbitrarily chosen parallel projecting planes. Since relatively few projection planes are used in the occlusion sweep implementation, the method can frequently fail to detect occluder fusion caused by umbra which intersect outside the vicinity of a projection plane.

Schaufler et al. (2000) (Schaufler, Gernot, et al. "Conservative Volumetric Visibility with Occluder Fusion." *Proceedings of the 27th Annual Conference on Computer Graphics and Interactive Techniques*. New York: ACM Press/Wesley Publishing Co., 2000. 229-38, the entirety of which is incorporated herein by reference) developed a method of precomputing a conservative, from-region PVS that requires a volumetric representation of the modeled environment. In this method modeled objects must be bounded by closed surfaces. The closed bounding surface must produce a well defined interior volume for each object. The interior volume of an object is assumed to be opaque and is represented with convex voxels that are generated by a volumetric decomposition of the interior. The voxels act as occluders for the method. Occlusion is computed by finding a shaft which connects the viewpoint cell and a voxel. The extension of this shaft is an umbra within which all geometry is occluded. The method accounts for occluder fusion by combining adjacent voxels and by combining voxels and adjacent regions of occluded space. The implementation presented calculates a cell-to-cell PVS for 2D and 2.5D environments (e.g. cities modeled as heightfields). While the extension to full 3D environments is discussed by the authors, the computational and storage costs of a detailed volumetric representation of a 3D model are a real limitation of the method. While the volumetric visibility method of Schaufler et al. does not require occluders to be convex it does require them to be well-formed manifolds with identifiable solid (water-tight) interior volumes. This allows an individual occluder to be conservatively approximated by a box-shaped structure that is completely within the interior of the original occluder. This approximate occluder is generated by decomposing the interior into voxels and recombining the voxels in a process of blocker extension which attempts to maximize the size of the contained box-shaped approximate occluder. The method requires that the approximate occluders retain a box shape to facilitate the construction of the shaft used to determine occlusion. A principal limitation of this approach is that many occluders are poorly approximated by a contained box-shaped structure. In particular, concave objects or objects with topological holes (manifolds with genus greater than zero) present an ambiguous case to the blocker extension algorithm and significantly underestimate the occlusion caused by the object. A 2.5D implementation of the method described by Schaufler et al. to compute a PVS for viewcells in a city model was tested using primarily convex objects of genus zero. These objects tend to be reasonably well approximated using a box-shaped interior occluder. For more realistic models containing concave elements and holes (e.g. doors and windows) the method would be less effective in approximating occluders and consequently less efficient in culling occluded geometry.

The volumetric visibility method detects occluder fusion in cases where the linearized umbra of the occluders intersect. However, as with individual occluders, the blocker extension algorithm ultimately produces a simplified box-shaped approximation to the aggregate region of occlusion that can significantly underestimate the effect of occluder fusion.

Both the extended projection method and the volumetric visibility method effectively treat the viewcell as an area light source and respectively employ image-space and object-space techniques to compute a conservative, linearized approximation to the umbrae of polygon meshes. Algorithms for computing the shadow boundaries (umbra and penumbra) of a polygonal area light source, Nishita, Nakame (1985) (Nishita, Tomoyuki, Isao Okamura, and Eihachiro Nakamae. "Shading Models for Point and Linear Sources." *ACM Transactions on Graphics (TOG)* 4.2 (1985): 124-46, the entirety of which is incorporated herein by reference) and Chin-Finer (1992) (Chin, Norman, and Steven Feiner. "Fast Object-Precision Shadow Generation for Area Light Sources Using BSP Trees." *Proceedings of the 1992 Symposium on Interactive 3D Graphics*. Proc. of Symposium on Interactive 3D Graphics, 1992, Cambridge, Mass. New York: Association for Computing Machinery, 1992, the entirety of which is incorporated herein by reference) have also employed a conservative, linearized umbra boundaries.

These shadow boundary methods employ only the linear umbral event surfaces that form between a single convex polygonal light source and single convex polygons. The use of these methods on non-convex polygon meshes for instance would result in a discontinuous umbral event surface that would not accurately represent an umbral volume. Consequently their utility is practically limited to very simple models.

In 1992 Heckbert (Heckbert, P *"Discontinuity Meshing for Radiosity"*, *Third Eurographics Workshop on Rendering*, Bristol, UK, May 1992, pp 203-216, the entirety of which is incorporated herein by reference) used a different approach called incomplete discontinuity meshing to construct the exact linear visibility event surfaces (umbral and penumbral) cast by simple polygon models from an area light source. In this technique the linear event surfaces, or wedges, are formed between the edges of the light source and the vertices of the occluder and between the vertices of the light source and the edges of the occluders. The wedges are intersected with all of the model polygons and the segments of the polygons that are actually visible on the wedge are subsequently determined using a 2D version of the Weiler-Atherton object-space from-point visibility algorithm (Weiler, Kevin, and Peter Atherton. "Hidden Surface Removal using Polygon Area Sorting." *Proceedings of the 4th Annual Conference on Computer Graphics and Interactive Techniques*. New York: ACM, 1977. 214-22, the entirety of which is incorporated herein by reference).

The primary motivation of the discontinuity meshing method is to identify discontinuity boundaries within the penumbra. These boundaries can be used to increase the precision of illumination calculations within the penumbra. Unfortunately because the incomplete discontinuity meshing method constructs only the exact linear umbral event wedges, it generally fails to produce the complete, continuous umbral event surface. This is because for all but the simplest models, the continuous umbral event surface (for example incident on the silhouette contour of a polygon mesh) is formed by both planar and quadric visibility event surfaces. Consequently the method of incomplete discontinuity meshing is unsuited to identify mesh polygon or mesh polygon fragments that are visible or occluded from an area light source (or viewcell).

In the prior-art method of incomplete discontinuity meshing, all of the visibility event surfaces are formed by a vertex and an edge. FIG. 53 is from the prior-art method of incomplete discontinuity meshing by Heckbert. The figure shows an exact linear visibility event surface, or wedge, as the shaded triangular structure WEDGE R. The wedge labeled WEDGE R is incident on an edge e of a polygon and also incident on a vertex v, which may be a vertex of a light source. In the method of incomplete discontinuity meshing, the linear event surfaces are not defined over segments of an edge which are not visible from the vertex. In the case of FIG. 53, WEDGE R is not defined over the segment of edge e labeled GAP E, because polygon O occludes vertex v from GAP E. Because the wedge is not defined over this segment, the wedge's intersection with polygon P causes a corresponding gap between SEG1 and SEG2. If wedge R was an umbral wedge, its intersection with P would produce an incomplete umbral boundary. As a result of these gaps, the linear visibility event wedges constructed by the method of incomplete discontinuity meshing cannot be used alone to define umbral boundaries (or from-region visibility boundaries).

Drettakis and Fiume (1994) (Drettakis, George, and Eugene Fiume. "A Fast Shadow Algorithm for Area Light Sources Using Backprojection." *Proceedings of the 21st Annual Conference on Computer Graphics and Interactive Techniques*. New York: ACM, 1994. 223-30, the entirety of which is incorporated herein by reference) completely characterized the visibility event surfaces that arise between a polygonal light source and objects in a polyhedral environment. In the method, called complete discontinuity meshing, both umbral and penumbral event surfaces are identified and intersected with model polygons. These intersections partition the model geometry into a "complete discontinuity mesh" such that in each face the view of the light source is topologically equivalent. The discontinuity mesh is shown to be a useful data structure for computing global illumination within the penumbra.

In the complete discontinuity meshing method four types of event surfaces between an area light source (called the "emitter") and polyhedral mesh objects are identified. Two of these event surfaces are planar and two are quadrics.

The first type of visibility event surface identified is formed between a vertex or edge of the emitter and specific edges or vertices of the polyhedral model. These polygons are called an emitter-VE or (E-EV) wedges. The authors emphasize that not all vertices of a polyhedral mesh support an E-EV wedge. Only those mesh edges which are from-point silhouette edges (which they call "shadow edges") for any point on the emitter surface will support a wedge. By defining "from-region silhouette edge" in this way all mesh edges which support an umbral or penumbral E-EV wedge are identified.

The other type of planar visibility event surface employed in complete discontinuity meshing is the Non-emitter-EV (NonE-EV) wedge. This type of wedge is potentially formed between any edge of the polyhedral mesh and any other edge such that the formed wedge intersects the emitter. For any edge of the polyhedral mesh the supported NonE-EV wedges occur only in a shaft formed between the edge and the emitter. This fact is used to construct identify the NonE-EV wedges.

A third type of visibility event surface is a quadric formed from an edge of the emitter and two edges of the polyhedral meshes. This is called a Emitter-EEE event or $E_e$EEE surface. Such a surface is identified wherever two non-adjacent skew edges of the discontinuity mesh intersect. [This intersection actually corresponds to the intersection of a planar wedge with a from-region silhouette edge to form a compound silhouette contour]. The continuous visibility event surface at this point is a quadric surface.

The fourth and final type of visibility event surface formed between an area emitter and polyhedral mesh objects is the NonE-EEE. This is a quadric event surface formed between three skew edges of the polyhedral mesh such that the resulting quadric intersects the viewcell.

In the present specification the classification of from-region visibility event surfaces based on Drettakis and Fiume (1994) is adopted with some modification of the nomenclature to accommodate further subclassification. Table Ia includes the four types of visibility event surfaces originally proposed by Drettakis and Fiume (1994), renamed for clarity.

TABLE Ia

Prior Art Nomenclature of From-Region Visibility Event Surfaces

| Visibilty Event Surface | Drettakis et al. Naming |
|---|---|
| Planar Event Surface Containing a Feature of the Emmitter/Viewcell/Source | E-EV (Emitter-Edge Vertex) |
| Planar Event Surface Not Containing a Feature of the Emitter/Viewcell/Source | NonE-EV |
| Quadric Event Surface Containing a Feature of the Emitter/Viewcell/Source | Emitter-EEE, $E_eEE$ |
| Quadric Event Surface Not Containing a Feature of the Emitter/Viewcell/Source | Non-EmitterEEE |

Any of the four types of visibility event surfaces may ultimately contribute to the actual from-emitter (from-region) umbral boundary which separates the volume of space that is occluded from all points on the emitter from the volume of space visible from any point on the emitter. Unfortunately, using existing discontinuity mesh methods there is no a-priori way to determine which event surfaces will contribute to this umbral boundary that defines from-region visibility. Consequently, in order to use discontinuity meshing methods to identify the conservative, from-region umbral visibility event boundaries, all visibility event surfaces would first have to be generated and the resulting discontinuity mesh would have to be post-processed to determine which of the event surface-mesh polygon intersections represent true from-region umbel boundaries.

Several other problems limit the use of discontinuity meshing methods to compute conservative from-region visibility. The quadric event surfaces make a robust implementation of the event surface casting difficult. Event surfacing casting is required to find visible quadratic curve segments visible from the emitter edge (in the case of Emitter-EEE wedge). This on-wedge visibility is typically solved using a 2D implementation of Weiler-Atherton visibility algorithm which is difficult to implement robustly when using quadric surfaces.

As previously discussed, if the quadric surfaces are simply omitted (as in the method of incomplete discontinuity meshing) then continuous from-region umbral surfaces are not guaranteed, making determination of the from-region visible mesh polygons impossible.

Another important limitation of conventional discontinuity meshing methods is that they do not exhibit output-sensitive performance. This is because existing discontinuity meshing algorithms begin by generating all visibility event surfaces on all (from-region) silhouette edges of the polyhedral meshes. This includes silhouette edges that are actually occluded from the emitter/source. These event surfaces are then intersected with potentially each polygon of the polyhedral meshes, and the on-wedge visible segments are subsequently identified, using 2D Weiler-Atherton visibility, as a post-process. Since there is no depth-prioritization at any stage of theses algorithms they perform very poorly in densely occluded environments, where the majority of the boundaries generated would be inside the conservative from-region umbral boundary and therefore not contribute to the from-region visibility solution.

As shown later in this specification, the present method of visibility map construction using conservative linearized umbral event surfaces generated using an output-sensitive algorithm addresses many of the limitations of existing discontinuity meshing methods when applied to the problem of conservative from-region visibility.

Using the classification of from-region visibility event surfaces described by Drettakis and Fiume (1994) it is clear that the volumetric visibility method (Schauffler 2000) employs only E-EV surfaces to represent umbra boundaries. The extended projection method (as well as other projective methods) also implicitly use E-EV umbra boundaries.

A number of image-space techniques of conservative from-region visibility precomputation employ "shrunk occluders" to conservatively approximate visibility from a region using visibility from a single point in the region. The method of Wonka et al. (2000) (Wonka, Peter, Michael Wimmer, and Dieter Schmalstieg. "Visibility Preprocessing with Occluder Fusion for Urban Walkthroughs." *Proceedings of the Eurographics Workshop on Rendering Techniques* 2000. London: Springer-Verlag, 2000. 71-82, the entirety of which is incorporated herein by reference) uses this approach to conservatively compute visibility from a region surrounding a viewpoint placed on the surface of a viewcell. Using multiple viewpoints placed on the surface of the viewcell, the visibility from the viewcell is computed as the combined visibility from the points. The distance between the viewpoints determines the magnitude of occluder shrinkage that must be applied to insure a conservative result. Since this method does sample visibility at multiple locations on the viewcell it does not a priori assume that all unoccluded elements are completely visible from the entire viewcell In contrast to many of the previously described methods (including volumetric visibility and extended projection), the Wonka et al method does not assume that all unoccluded elements are completely visible from everywhere on the viewcell surface. Since it samples visibility from multiple locations on the viewcell it can approximate a backprojection which accounts for the partial occlusion of the viewcell from the unoccluded elements. The authors refer to this as penumbra effects, since elements in the penumbra of the viewcell/lightsource may give rise to planar (NonE-EV) umbra boundaries as well as quadric umbra boundaries (Emitter-EEE and Non-Emitter-EEE surfaces) that are more precise than the E-EV boundaries generated by assuming that the entire viewcell is visible from unoccluded elements. An implementation of the method is presented for 2.5D models in which the viewcells are rectangles. This greatly reduces the complexity of occluder shrinkage process and substantially reduces the number of viewpoint samples required compared to a full 3D implementation. Unfortunately, because the implementation is limited to 2.5D models it cannot be employed in most walkthrough applications.

Another method of visibility precomputation which employs "shrunk occluders" to approximate from-viewcell visibility using the visibility from a single point within the viewcell is described by Chhugani et al. (2005) (Chhugani, Jatin, et al. "vLOD: High-Fidelity Walkthrough of Large Virtual Environments." *IEEE Transactions on Visualization and Computer Graphics* 11.1 (2005): 35-47, the entirety of which is incorporated herein by reference). This method employs a combination object-space and image-space approaches. In object-space the "supporting planes tangential to the viewcell and an object" are constructed. A viewpoint contained within these supporting planes is selected and for each supporting plane, an offset plane passing through the viewpoint and parallel to the original plane is constructed. According to the authors the intersection of the positive halfspaces of these offset planes comprises a frustum that is within the actual umbra of the original object. For each object polygon that generated a supporting plane, the shrinkage of the polygon is determined by the offset of the corresponding polygon to the chosen viewpoint. Occlusion behind an occluder object is determined by rendering the shrunk version from the viewpoint and then drawing the occludees using the occlusion query extension of the depth buffer. The query returns zero for occludees that are not visible. The method performs limited occluder fusion by rendering the shrunk occluders prior to occludees. The same viewpoint must be used to generate and render all shrunk occluders. This viewpoint must lie in the frusta of all the occluders. The location of the viewpoint is selected to maximize the sum of the volumes of the shrunk frusta using a convex quadratic optimization to achieve a local minimum solution.

The precision of the shrunk occluders is largely determined by the size and distribution of occluders being considered. Consequently the precision is not easily controlled in this method.

While the method admits non-convex occluders, including individual polygons and connected polygon meshes, it does not accommodate occluders that have holes. This is because the method depends upon each occludee having a single polyline "boundary" which is actually a type of from-region silhouette contour. This is a significant limitation since some large polygon meshes (e.g. buildings) which generally produce significant from-region occlusion also have multiple topological holes (e.g. doors and windows).

From the preceeding analysis it is clear that many existing methods of PVS precomputation employ conservative, linearized approximations to umbral boundaries based on simple E-EV event surfaces (e.g. extended projection, volumetric visibility) which assume that unoccluded elements are visible from everywhere on the viewcell (i.e. that the entire viewcell is visible from the unoccluded element).

Although existing primal-space methods of from-region visibility precomputation do not employ exact, quadric visibility event boundaries; other visibility applications do compute quadric visibility event surfaces in the primal-space. One of these applications, the Visibility Skeleton Durand (1997), is a data structure for answering global visibility queries. The other application, discontinuity meshing, is a method of computing illumination in the presence of area light sources. The discontinuity meshing method will be examined first.

As previously described, in the complete discontinuity meshing method of Drettakis and Fiume (1994), all of the visibility event surfaces arising between a polygonal light source and a polyhedral model are identified and intersected with model's polygons. These intersections comprise the "complete discontinuity mesh" of the model with respect to the source. The discontinuity mesh partitions the model geometry into a mesh of faces, such that in each face the view of the source is topologically equivalent. The complete discontinuity mesh is a useful data structure for computing global illumination near umbra and penumbra boundaries.

In the complete discontinuity meshing method four types of event surfaces are identified (see Table Ia and Ib). Two of these event surfaces are planar and two are quadrics. The two planar event surface types discussed previously, E-EV and NonE-EV, are used by the conservative from-region visibility event methods to conservatively contain the from-region umbral boundary surfaces. In some cases these planar surfaces are actually components of the exact umbra boundary formed by a silhouette edge and an a viewcell-as-lightsource.

The two types of quadric surfaces: Emitter-Edge-Edge-Edge (Emitter-EEE or $E_eEE$) and Non-Emitter-Edge-Edge-Edge (Non-Emitter-EEE) are components of certain visibility event surfaces between the area light source and model polygons. For example, in some cases these quadric surfaces may be components of the exact umbra boundary formed by a silhouette edge and a viewcell-as-lightsource. In most cases these event surfaces are components of the penumbra. The discontinuity mesh methods describe techniques for identifying all of the quadric event surfaces that arise between the area light source and the model polygons.

For example in Drettakis and Fiume (1994) both Emitter-EEE and Non-Emitter-EEE event surfaces can be identified by forming a shaft between a generator edge and the convex hull of the emitter polygon. Emitter-EEE event surfaces are formed by the original edge, an edge of the emitter, and other edges in this shaft. Non-Emitter-EEE event surfaces are formed by the original edge and pairs of non-parallel edges in the shaft. Non-Emitter-EEE surfaces are those that intersect the emitter polygon. In both cases the ruled quadric event surface is identified using the parametric equation of the first generator edge:

$$P_t = a_1 + t(b_1 - a_1)$$

where $a_1$ and $b_1$ are the endpoints of $e_1$.

The value of t for a point $P_t$ on the ruled quadric is found by forming the two planes containing point P and $e_2$ and P and $e_3$. The intersection of these two planes forms a line that is intersected with $e_1$ The valid interval of the ruled quadric on the generator edge is found by computing t for the endpoints $a_2$ and $b_2$ of edge $e_2$ and for the endpoints $a_3$ and $b_3$ of edge $e_3$. The intersection of the intervals is the valid region on the first generator edge. (This parametric representation of the ruled quadric was also suggested by Teller to represent the surfaces in 3D. However in Teller's method the ruled quadric visibility event surfaces are not actually identified in primal space. Instead their delimiters, the extremal stabbing lines, are identified in 5D line space.)

In the discontinuity meshing method once a quadric surface is identified by finding the valid intervals of its generator edges, the coefficients of the corresponding quadric equation:

$$Ax^2 + By^2 + Cz^2 + Dyz + Exz + Fxy + Gx + Hy + Iz + J = 0$$

are determined. The intersection of this quadric surface with a model polygon is a quadratic curve. It is determined by transforming the three generating edges such that the polygon is embedded in the plane z=0. The quadratic curve is defined by the coefficients of the corresponding quadric equation minus all terms containing z. To generate the discontinuity mesh elements the quadratic curve is intersected with the edges of the model polygons and checked for visibility using a line sweep visibility processing algorithm.

In the discontinuity meshing method all visibility event surfaces involving an area light source and model polygons are identified. These visibility event surfaces include not only the umbral and extremal penumbra boundaries but many other event surfaces across which the topological view or "aspect" of the light source from the model geometry changes. In discontinuity meshing the visibility event surfaces are identified and intersected with the model polygons but specific bounding volumes of these surfaces, such as the umbra volume are not computed. These intersections in general produce forth degree space curves which can be difficult to solve robustly. Fortunately, the illumination calculations in which the discontinuity mesh is employed do not require the umbra volume to be represented.

The construction of the complete discontinuity mesh does require the event surfaces to be intersected with the model polygons, forming lines or quadratic curves on the surfaces of the polygons. These intersections are performed by casting the surfaces through the model. A regular grid-based spatial subdivision data structure is used to limit the number intersections performed. After all of the intersections are calculated a visibility step determines visible subsegments on the wedge. Consequently the construction of the discontinuity mesh is not output sensitive. and the cost of E-EV processing is expected $O(n^2)$ in the number of polygons. Quadric surfaces are also processed by finding first finding all of the quadratic curves formed by intersections of the quadric with model polygons, visibility on the quadric is resolved by a line sweep algorithm that is applied later, the cost of quadric processing is $O(n^6)$ in the number of polygons.

Like the complete discontinuity mesh, the visibility skeleton (Durand et al 1997) (Durand, Fredo; Drettakis, George; Puech, Calude; "*The Visibility Skeleton: a Powerful and Efficient Multi-Purpose Global Visibility Tool, SIGGRAPH 1997 Proceedings*, the entirety of which is incorporated herein by reference) is a data structure that accounts for quadric visibility event boundaries using primal space methods. The visibility skeleton is a complete catalog of visibility events that arise between edges in a polyhedral environment. In the visibility skeleton the visibility information of a model is organized as a graph structure in which the extremal stabbing lines are nodes of the graph and the visibility event surfaces are the arcs of the graph. The visibility skeleton can be used to answer visibility queries in the scene such as those that arise during global illumination calculations.

Unlike complete discontinuity meshing, the visibility skeleton avoids direct treatment of the line swaths that comprise the quadric visibility event surfaces. Instead the skeleton is constructed by directly computing only the extremal stabbing lines which bound the event surfaces themselves and which correspond to the nodes of the visibility skeleton graph structure.

In the general case of an extremal stabbing lines incident on four edges (EEEE nodes) the nodes are identified using the sets of tetrahedral wedges formed between the four edges. In this method an extended tetrahedron is formed between two of the edges as shown in FIGS. 8*a*, 8*b* and 8*c* of Durand et al (1997). The figures mentioned in this paragraph refer to the Durand et al (1997) paper. In FIG. 8*a* the extended tetrahedron formed by edge ei and ej is shown. In FIG. 8*b* a third edge ej is shown along with the segment of ej inside the extended tetrahedron formed by ei and ej. [The component of ej inside this extended tetrahedron will form a quadric visibility event (EEE) surface with ei and ej.] In FIG. 8*c* a fourth edge el is shown. This fourth edge el is similarly restricted by the three other extended tetrahedra which it may intersect: ekej, ekei, and ejei. The segment of el that is within all of these tetrahedral wedges could form three quadric surfaces with the other three edges. Only one line will actually intersect el and the other lines. This is the extremal Emitter-EEE line or node of the visibility skeleton involving these four edges. It is found by a simple binary search on the restricted segment of el. In this binary search an initial estimate of the intersection point P on el is chosen. The plane formed by this point and ei is then intersected with ej and e, giving two lines originating at P. The estimated intersection point P on el is refined by binary search until the angle between the two lines originating at P approaches zero. This occurs when the lines are congruent and therefore intersect ei, ej, ek, and el. The extremal lines so identified are intersected with model polygons using ray casting to determine if any scene polygons occlude the extremal line between its generating edges. If the line is so occluded no extremal stabbing line is recorded.

Other nodes of the visibility skeleton such as EVE, VEE, and EEV nodes form the limits of planar visibility event surfaces (eg. VE) and are also found by intersecting the relevant edges with corresponding extended tetrahedra.

The extremal stabbing lines so identified are stored explicitly as the nodes of the visibility skeleton. The visibility event surfaces (polygons or quadrics) that are bounded by these lines are not directly computed but instead stored implicitly as arcs in the graph. The component edges of the event surface are inferred from the nodes connected to the corresponding arc. Later use of the visibility skeleton for global visibility queries, such as discontinuity meshing in the presence of an area light source, may require the quadric surfaces to be generated directly using, for example, the parametric form of the quadric as described by Teller (1992).

From the preceeding analysis it is clear that both the discontinuity meshing and visibility skeleton methods include primal space techniques for identifying planar and quadric visibility event surfaces produced by area light sources. Both effectively employ the extended tetrahedral wedge test to identify quadric surfaces and the segments of the edge triples that support them. Both methods produce all of the visibility event surfaces between the relevant edges. Neither method is structured to efficiently generate only the from-region umbral boundary surfaces that are relevant in computing from-region visibility.

Another approach to computing from-region visibility is to transform the problem to line space and compute the umbra boundary surfaces using Plucker coordinates.

As previously described, the method of Teller (1992) developed the computational machinery necessary to compute the exact planar and quadric elements of an antipenumbra boundary of a portal sequence. This method transformed the problem to 5D line space.

The portal sequence is a significantly more restricted visibility problem than the general problem of visibility from an area lightsource (or equivalently a viewcell) in the absence of distinct portals. Moreover, to identify the quadric elements of the antipenumbra boundary Teller had to transform the problem to line space using Plucker coordinates and perform hyperplane intersections in 5D. This transformation increases the algorithmic complexity of the process and introduces potential robustness issues that are not present when working in the primal space.

Beginning in 2001 two groups of investigators Bittner (2001) (J. Bittner and J. Prikryl. Exact Regional Visibility using Line Space Partitioning. Tech. Rep. TR-186-2-01-06, Institute of Computer Graphics and Algorithms, Vienna University of Technology, March 2001) and Nierenstein (2002) (Nirenstein, S., E. Blake, and J. Gain. "Exact From-Region Visibility Culling." *Proceedings of the 13th Eurographics Workshop on Rendering*. Proc. of ACM International Conference Proceeding Series, Pisa, Italy, 2002. Vol. 28. Aire-la-Ville: Eurographics Association, 2002. 191-202, the entirety of which is incorporated herein by reference) developed methods to compute the exact viewcell to polygon PVS. Like Teller's exact antipenumbra calculation these methods require a transformation of the problem to Plucker coordinates and depend upon a combination of numerical techniques including singular value decomposition, robust root finding, and high-dimensional convex hull computations. Unlike Teller's approach these methods do not require an autopartition of the model into a BSP tree with enumerated portals.

In general, both of these exact methods, Niernstein (2002) and Bittner (2001), are structured as a visibility query which determines whether an unoccluded sightline exists between two convex graphic primitives (i.e. polygons). One of the tested polygons is a face of the viewcell, the other tested polygon is a mesh polygon of the modeled environment. The query determines if other polygons in the model, alone or in combination, occlude all the sightlines between the tested polygons. This occlusion query represents the linespace between the polygons by a 5-D Euclidean space derived from Plucker space. This mapping requires singular value matrix decomposition. In a subsequent step the method employs constructive solid geometry operations performed in 5 dimensional space. These processes, which form the basis of the visibility query, have a high computational cost. Moreover, because the fundamental organization of the method uses a polygon-to-polygon query, the cost on a naive implementation is $O(n^{2.15})$ in the number of polygons (Nirenstein 2002).

The scalability of the method is improved over this worst-case by employing trivial acceptance and trivial rejection tests. Trivial acceptance of polygon-to-polygon visibility is established using a polygon-to-polygon ray casting query. If a ray originating at one test polygon reaches the other test polygon without intersecting any intervening polygons in the database then the visibility query can be trivially accepted. While this query has a lower computational cost than the exact Plucker space visibility query, it is itself a relatively expensive test for trivial acceptance. Trivial rejection of clusters of polygons can be accelerated by using a hierarchically organized database. If a query determines that the bounding box of an object is occluded with respect to a viewpoint cell then all of the polygons contained by the bounding box are also occluded. Furthermore, the method treats the occluded bounding box itself as a simple "virtual occluder." (Koltun et al 2000) (Koltun, Vladen, Yiorgos Chrysanthou, and Daniel Cohen-Or. "Virtual Occluders: An Efficient Intermediate PVS Representation." *Proceedings of the Eurographics Workshop on Rendering Techniques* 2000. London: Springer-Verlag, 2000. 59-70, the entirety of which is incorporated herein by reference). As defined by Koltun et al. (2000), a virtual occluder is not part of the original model geometry, but still represents a set of blocked lines. If the bounding box of an object is occluded then it can be used as an occluder for any geometry behind it. None of the polygons within the occluded bounding box need be considered as occluder candidates, as the bounding box itself is more than sufficient to test for occlusion of objects behind it. By employing these virtual occluders in conjunction with a front to back processing of scene objects Nirenstein et al (2000). significantly improved the scalability of the method from $O(n^{2.5})$ to $O(n^{1.15})$ for some tested scenes. Nevertheless, the method was shown to have a large constant computational overhead. For a densely occluded forest scene consisting of 7.8 million triangles preprocessing required 2 days 22 hrs on a dual Pentium IV 1.7 GHz multiprocessor. This compared to only 59 minutes preprocessing the same database using the extended projection method of Durand et al. implemented on a 200 MHz MIPS R10000 uniprocessor with SGI Onyx2 graphics hardware. The exact method culled an average of 99.12% of the geometry compared to 95.5% culling achieved with the conservative extended projection method.

One reason for the exact method's high computational cost is that the polygon-to-polygon occlusion query treats the occlusion caused by each polygon separately and does not explicitly consider the connectivity relationships between polygons to compute an aggregate occlusion. The exact method accounts for the combined occlusion of connected polygons only by the expensive 5-D constructive solid geometry process in which each polygon in processed separately. For this exact method the combined occlusion of connected polygons is determined only by the separate subtraction of individual 5-D polyhedra (representing the candidate occluding polygons) from a 5-D polytope (representing the cell-to-polygon sightlines). In the case of a connected mesh, the shared edges represent a trivial case of occluder fusion but for the exact method the fusion of these occluders must be explicitly computed and represent a degenerate case for the algorithm since the resulting polyhedra intersect exactly along the shared edges. In this sense the Niernstein et al. (2002) method completely neglects the important problem of identifying those specific edges of the polygon model which potentially support from-region visibility event surfaces (the potential from-region silhouette edges) and instead conducts the visibility query using all polygon edges.

In a later implementation, Nirenstein et al (2005) (Nirenstein, S., Haumont, D., Makinen, O., *A Low Dimensioinal Framework for Exact Polygon-to-Polygon Occlusion Queries*, Eurographics Symposium on Rendering 2005, the entirety of which is incorporated herein by reference) addressed this shortcoming of the method by identifying potential from-viewcell silhouette boundaries and constructing blocker polyhedra in 5D only along these boundaries. The definition of from-region silhouette edges employed in this method is essentially the same as that used in the earlier complete discontinuity meshing method of Drettakis et al. (1994) Although one test-bed implementation using this improvement accelerated the method by a factor of 30, the method still has a high constant computational overhead.

Besides being computationally expensive, the exact method is difficult to implement robustly. The singular value decompositions, robust root finding, and higher dimensional constructive solid geometry computations of the method tend to be very sensitive to numerical tolerances and geometric degeneracies.

Another shortcoming of the exact from-region method is that current implementations generally do not identify and remove occluded parts of partially occluded polygons. Current implementations of the method employ a polygon-to-polygon visibility query between the faces of the viewcell and the model polygons. The query is specifically structured to identify unoccluded regions between the tested polygon and to terminate early if any such regions are detected. Such implementations include an entire polygon in the PVS even if only a small part of it is visible from the viewcell. Consequently, although the PVS computed by these implementations may be the "exact" set of polygons visible from the region; the PVS may considerably overestimate the exposed surface area visible from the viewcell for large polygons. This can result in considerable overdraw at runtime. Modifying the exact from-region implementations to determine unoccluded fragments would substantially increase the computational cost and complexity of the implementation because: 1) the benefit of early termination would be lost, and 2) the boundaries between unocccluded and occluded fragments are quadratic.

Because these line-space methods compute the quadric umbra boundaries between source and target polygon they can provide an exact solution to this visibility query. In contrast, conservative methods of visibility precomputation employ less precise linearized umbra boundaries either explicitly (volumetric visibility) or implicitly (projective methods). However since these conservative methods operate in the primal space they are amenable to simpler, more robust implementations than the line space methods which require robust root finding and higher dimensional constructive solid geometry.

In both the extended projection method and the volumetric visibility method, as well as the exact from-region methods, a PVS is computed for parallelepiped viewcells that comprise a subdivision of navigable space. The use of parallelepiped viewcells has several advantages over the general convex polyhedral viewcells used by the BSP/portal sequence methods. The spatial subdivision defining the parallelepiped viewcells can easily be arranged as a spatial hierarchy (e.g. k-d tree) which facilitates a hierarchical approach to PVS determination. In this approach, used by both the extended projection and volumetric visibility methods, the PVS is determined for a viewcell at a high level in the hierarchy and is used as a working set to recursively determine the PVS of child viewcells lower in the hierarchy.

Another advantage of parallelepiped cells is that they have a simple cell adjacency relationship to neighboring cells. This relationship was exploited in the extended projection implementation, Durand et al. (2000) to implement a delta-PVS storage scheme. In this scheme the entire PVS for a number of key viewcells is stored. For most other viewcells, sets representing the differences of the PVS of adjacent viewcells are stored. This storage scheme substantially reduces the storage requirements for PVS data.

In the extended projection implementation the computed PVS encodes conservative viewcell-to-scene-graph-cell visibility at a coarse level of granularity. For this approximate solution the delta-PVS storage for 12,166 viewcells (representing $\frac{1}{12}$th of the street area of a city model comprising 6 million polygons required 60 MB storage. Extrapolated, the storage of the delta-PVS data for the viewcells comprising all of the streets would be 720 MB. In the run-time portion all geometry is stored in main memory but the deltaPVS data is fetched from disk.

Another from-region visibility method which employs a delta-PVS storage scheme is the vlod method of Chhugani et al. (2005) In this implementation the from-region visibility solution provides a conservative viewcell-to-object PVS using a variation of the "shrunk occluder" method.

The delta-PVS is a list of object Ids referring to newly visible or newly invisible objects for a viewcell transition. In contrast to the extended projection method, the vlod implementation does not require all model geometry to be stored in main memory. Instead geometry is stored on disk and the current and predicted viewpoint locations are used to guide a speculative prefetch process which dynamically loads delta-PVS data and model geometry data. The model geometry is stored on disk using an object reordering scheme that reduces the number of disk accesses by storing together objects on the disk that tend to be fetched together. The delta-PVS data is also stored on disk. For a powerplant model of 13 million triangles and 500,000 viewcells, 7 GB is required to store the delta-PVS object ids.

At runtime the vlod implementation allows real-time rendering of models that are too large to be stored in main memory. Since the models rendered in the vlod implementation are not textured, the method does not address the storage and dynamic prefetch of texture information. In most modern walkthrough applications such as games, the amount of texture information for a model is typically much greater than the amount of geometry information.

The vlod system is an example of out-of-core, real-time rendering system that uses geometry prefetch based on precomputed from-region visibility. An earlier example by Funkhouser (Database Management for Interactive Display of Large Architectural Models, Proceedings of the conference on Graphics interface '96 Toronto, Ontario, Canada Pages: 1-8 Year of Publication: 1996 ISBN: 0-9695338-5-3, the entirety of which is incorporated herein by reference) of this approach used geometry PVS data computed using the portal sequence method. This implementation also used untextured geometry and, like vlod, does not address the prefetch of texture information.

Other out-of-core methods use geometry prefetch based on a run-time, conservative, from-point visibility method (e.g. prioritized layered projection or PLP) which is used to determine a conservative subset of the model visible from the viewpoint (IWALK, MMR). In one variation of this approach the process of primitive reprojection is used to directly identify model geometry that becomes newly exposed as a result of viewpoint motion (U.S. Pat. No. 6,111,582 Jenkins). These from-region visibility methods must be computed at runtime and therefore contribute to the overall runtime computational cost.

The goal of out-of-core rendering systems is to allow uninterrupted exploration of very large, detailed environments that cannot fit in core memory. Implemented effectively, this streaming approach can eliminate the frequent interruptions caused by traditional loading schemes in which entire sections (e.g. levels) of the environment are loaded until the next level is reached. Subdividing a complex 3D model into distinct "levels" drastically simplifies the loading and display of the graphics information while it forces the user to experience a series of disjoint locations, separated by load times that often disrupt the coherence of the experience.

The available data transfer rate between secondary storage and the core is a significant limiting factor for streaming implementations (Brad Bulkley, "The Edge of the World" Game Developer Magazine June/July 2006 pg. 19, the entirety of which is incorporated herein by reference). A delta-PVS storage scheme can substantially reduce the transfer rate required to stream prefetched data. Current delta-PVS implementations do not provide methods to manage texture information. Moreover they employ coarse-grained cell-to-object or cell-to-scenegraph-cell PVS data that is computed using imprecise from-region visibility computations which results in overestimated PVS/delta-PVS data. If the size of the delta-PVS data causes the prefetch process to exceed the available transfer rate between secondary storage and core memory then visibility errors can result.

A from-region visibility precomputation method capable of determining occluded polygon fragments and textures could produce a more precise cell-to-polygon PVS/delta-PVS than existing methods. This would reduce the transfer rate required to support streaming prefetch and also enhance the performance of the display hardware by reducing overdraw.

CONCLUSIONS OF BACKGROUND

From the preceding analysis of the prior art it is clear that existing methods of from-region visibility precomputation use either, a) imprecise visibility event boundaries which produce imprecise PVS solutions, or b) exact visibility event surfaces which must be computed in five dimensional line space. Such line space computations incur high computational cost and algorithmic complexity and are difficult to implement robustly. Moreover, for a single collection of polyhedral objects, some exact from-region visibility event surfaces are well approximated by simpler, linearized extremal umbra boundaries; while others are not. This makes exact approaches overly sensitive to detailed input in the sense that in some regions of a typical polyhedral model much computation can be expended to compute a very small amount of occlusion.

Consequently a general method of PVS determination that identifies conservative linearized umbral event surfaces in the primal space; estimates the deviation of these surfaces from the exact event surfaces, and adaptively refines these surfaces to more precisely approximate the exact surfaces, would enable from-region visibility precomputation with improved precision and reduced computational cost compared to existing methods.

Such a practical method of precision-controlled PVS determination could be used in conjunction with delta-PVS and intermediate representation schemes which reduce storage costs and facilitate visibility-based streaming prefetch. This visibility-based streaming prefetch method would allow the user to quickly begin interacting with a massive textured 3D model because initially only the geometry, texture, and other graphic elements visible in the vicinity of the user's initial location would be delivered. This initial data is typically a small fraction of the entire graphical database for the modeled environment. This method would significantly decrease the waiting time for interactivity when compared to existing methods, such as MPEG-4 part 11 (VRML or X3D), which do not specify an efficient, visibility-based prefetch streaming approach. Such existing methods typically either require the entire database to be downloaded before interactivity begins or, alternatively, are subject to visibility errors (e.g., the sudden appearance of objects) during user navigation.

SUMMARY OF THE INVENTION

In exemplary embodiments, a method determines a set of mesh polygons or fragments of the mesh polygons visible from a view region having a plurality of view region vertices, the mesh polygons forming polygon meshes. The method includes determining at least one supporting polygon between the view region and the polygon meshes. The method further includes constructing at least one wedge from the at least one supporting polygon, the at least one wedge extending away from the view region beyond at least the polygon meshes. Further, the method includes determining one or more intersections of the wedges with the mesh polygons. Additionally, the method includes determining the set of the mesh polygons or fragments of the mesh polygons visible from the view region using the determined one or more intersections of the at least one wedge with the polygon meshes.

In exemplary embodiments, a method of receives a set of mesh polygons or fragments of said mesh polygons visible from a view region having a plurality of view region vertices, said mesh polygons forming polygon meshes. The method includes receiving said set of mesh polygons or fragments of said mesh polygons visible from said view region, said set of mesh polygons determined according to one or more intersections of at least one wedge with said mesh polygons, said at least one wedge incident on a first order silhouette edge, and said at least one wedge constructed from at least one supporting polygon between said view region and said polygon meshes. The method further includes displaying said received set of mesh polygons or fragments of said mesh polygons visible from said view region.

In exemplary embodiments, a system determines a set of mesh polygons or fragments of said mesh polygons visible from a view region having a plurality of view region vertices, said mesh polygons forming polygon meshes. The system includes an encoder having a processor configured to determine at least one supporting polygon between said view region and said polygon meshes. The processor is further configured to construct at least one wedge from said at least one supporting polygon, said at least one wedge extending away from said view region beyond at least said polygon meshes. The processor is further configured to determine one or more intersections of said wedges with said mesh polygons. The processor is also configured to determine said set of said mesh polygons or fragments of said mesh polygons visible from said view region using said determined one or more intersections of said at least one wedge with said polygon meshes. The system also includes a client device to display said set of mesh polygons or fragments of said mesh polygons visible from said view region.

In exemplary embodiments, a non-transitory computer readable storage medium has executable instructions stored therein, which when executed by a processor causes the processor to perform a method of determining a set of mesh polygons or fragments of said mesh polygons visible from a view region having a plurality of view region vertices, where the mesh polygons form polygon meshes. The method includes determining at least one supporting polygon between the view region and the polygon meshes. The method further includes constructing at least one wedge from the at least one supporting polygon, the at least one wedge extending away from the view region beyond at least the polygon meshes. Further, the method includes determining one or more intersections of the wedges with the mesh polygons. Additionally, the method includes determining the set of the mesh polygons or fragments of the mesh polygons visible from the view region using the determined one or more intersections of the at least one wedge with the polygon meshes.

In exemplary embodiments, a method determines a set of mesh polygons or fragments of the mesh polygons visible from a view region, the mesh polygons forming polygon meshes. The method includes determining at least one from view region occlusion boundary incident on the mesh polygons, the at least one from view region occlusion boundary having an unoccluded side and an occluded side. The method further includes determining a number of mesh polygons added to the set of mesh polygons or fragments of the mesh polygons visible from the view region, the mesh polygons added by repartitioning, at an intersection between a polygon mesh and the at least one from view region occlusion boundary on the unoccluded side, a surface of the intersected polygon mesh. Further, the method includes determining a number of mesh polygons occluded by the at least one from view region occlusion boundary. Also, the method includes removing the at least one from view region occlusion boundary upon determination that the number of mesh polygons added exceeds the number of mesh polygons occluded by a predetermined threshold.

In exemplary embodiments, a method receives a set of mesh polygons or fragments of said mesh polygons visible from a view region having a plurality of view region vertices, said mesh polygons forming polygon meshes. The method includes receiving said set of mesh polygons or fragments of said mesh polygons visible from said view region. The set of mesh polygons excludes at least one from view region occlusion boundary removed from said set of mesh polygons or fragments of said mesh polygons visible from said view region, said at least one from view region occlusion boundary having an unoccluded side and an occluded side. The at least one occlusion boundary is removed from said set of mesh polygons or fragments of said mesh polygons visible from said view region upon determination that a number of mesh polygons added to said set of mesh polygons or fragments of said mesh polygons exceeds a number of mesh polygons occluded by said at least one from region occlusion boundary by a predetermined threshold. The number of added mesh polygons are added by repartitioning, at an intersection between a polygon mesh and said at least one from view region occlusion boundary on said unoccluded side, a surface of said intersected polygon mesh. The method further includes displaying said set of mesh polygons or fragments of said mesh polygons visible from said view region.

In exemplary embodiments, a system determines a set of mesh polygons or fragments of said mesh polygons visible from a view region, said mesh polygons forming polygon meshes. The system includes an encoder having a processor configured to determine at least one from view region occlusion boundary incident on said mesh polygons, said at least one from view region occlusion boundary having an unoccluded side and an occluded side. The processor is further configured to determine a number of mesh polygons added to said set of mesh polygons or fragments of said mesh polygons visible from said view region, said mesh polygons added by repartitioning, at an intersection between a polygon mesh and said at least one from view region occlusion boundary on said unoccluded side, a surface of said intersected polygon mesh. The processor is further configured to determine a number of mesh polygons occluded by said at least one from view region occlusion boundary. The processor is further configured to remove said at least one from view region occlusion boundary upon determination that said number of mesh polygons added exceeds said number of mesh polygons occluded by a predetermined threshold. The system also includes a client device to display said set of mesh polygons or fragments of said mesh polygons visible from said view region.

In exemplary embodiments, a non-transitory computer readable storage medium has executable instructions stored therein, which when executed by a processor causes the processor to perform a method of determining a set of mesh polygons or fragments of said mesh polygons visible from a view region, said mesh polygons forming polygon meshes. The method includes determining at least one from view region occlusion boundary incident on the mesh polygons, the at least one from view region occlusion boundary having an unoccluded side and an occluded side. The method further includes determining a number of mesh polygons added to the set of mesh polygons or fragments of the mesh polygons visible from the view region, the mesh polygons added by repartitioning, at an intersection between a polygon mesh and the at least one from view region occlusion boundary on the unoccluded side, a surface of the intersected polygon mesh. Further, the method includes determining a number of mesh polygons occluded by the at least one from view region occlusion boundary. Also, the method includes removing the at least one from view region occlusion boundary upon determination that the number of mesh polygons added exceeds the number of mesh polygons occluded by a predetermined threshold.

In exemplary embodiments, a method determines a set of mesh polygons or fragments of the mesh polygons visible from a view region having a plurality of vertices, the mesh polygons forming polygon meshes. The method includes traversing at least one mesh polygon from the set of mesh polygons and suspending the traversing upon encountering at least one first-order silhouette edge. The method further includes constructing at least one wedge on the first-order silhouette edge. Further, the method includes determining at least one intersection of the at least one wedge with another mesh polygon from the set of mesh polygons. The method further includes determining if the at least one intersection is a from view region occlusion boundary. The method also includes continuing, upon determination that the at least one intersection is a from view region occlusion boundary, the traversing on an unoccluded side of the from view region occlusion boundary.

In exemplary embodiments, a method receives a set of mesh polygons or fragments of said mesh polygons visible from a view region having a plurality of vertices, said mesh polygons forming polygon meshes. The method includes receiving, at a client device, said set of mesh polygons or fragments of said mesh polygons visible from said view region. The received set is determined, by an encoder, according to a traversal method including traversing at least one mesh polygon from said set of mesh polygons, suspending said traversing upon encountering at least one first-order silhouette edge, constructing at least one wedge on said first-order silhouette edge, determining at least one intersection of said at least one wedge with another mesh polygon from said set of mesh polygons, determining if said at least one intersection is a from view region occlusion boundary, and continuing, upon determination that said at least one intersection is a from view region occlusion boundary, said traversing on an unoccluded side of said from view region occlusion boundary. The method further includes displaying, by said client device, said set of mesh polygons or fragments of said mesh polygons visible from said view region In exemplary embodiments, a system to determine a set of mesh polygons or fragments of said mesh polygons visible from a view region having a plurality of vertices, said mesh polygons forming polygon meshes. The system includes an encoder having a processor configured to traverse at least one mesh polygon from said set of mesh polygons. The processor is further configured to suspend said traversing upon encountering at least one first-order silhouette edge. The processor is further configured to construct at least one wedge on said first-order silhouette edge. The processor is further configured to determine at least one intersection of said at least one wedge with another mesh polygon from said set of mesh polygons. The processor is further configured to determine if said at least one intersection is a from view region occlusion boundary. The processor is further configured to continue, upon determination that said at least one intersection is a from view region occlusion boundary, said traversing on an unoccluded side of said from view region occlusion boundary. The system also includes a client device to display set of mesh polygons or fragments of said mesh polygons visible from a view region.

In exemplary embodiments, a non-transitory computer readable storage medium has instructions stored therein, which when executed by a processor causes the processor to perform a method of determining a set of mesh polygons or fragments of said mesh polygons visible from a view region having a plurality of vertices, said mesh polygons forming polygon meshes The method includes traversing at least one mesh polygon from the set of mesh polygons and suspending the traversing upon encountering at least one first-order silhouette edge. The method further includes constructing at least one wedge on the first-order silhouette edge. Further, the method includes determining at least one intersection of the at least one wedge with another mesh polygon from the set of mesh polygons. The method further includes determining if the at least one intersection is a from view region occlusion boundary. The method also includes continuing, upon determination that the at least one intersection is a from view region occlusion boundary, the traversing on an unoccluded side of the from view region occlusion boundary.

In exemplary embodiments, a method determines and stores information describing a first set of mesh polygons, the mesh polygons forming polygon meshes, the first set of mesh polygons visible from a first view region. The method includes determining and storing a second set of mesh polygons visible from a second view region, the second view region containing the first view region. The method further includes determining and storing information indicating at least one mesh polygon, the at least one mesh polygon belonging to a set of connected mesh polygons, the set of connected mesh polygons being visible from the first view region. The method also includes determining and storing information indicating at least one boundary edge of the at least one set of connected mesh polygons.

In exemplary embodiments, a method of using stored information to determine a first set of mesh polygons, said mesh polygons forming polygon meshes, a first set of mesh polygons from said mesh polygons visible from a first view region. The method includes retrieving a second set of mesh polygons visible from a second view region, said second view region containing said first view region. The method further includes retrieving information indicating at least one first mesh polygon, said at least one first mesh polygon belonging to a set of connected mesh polygons, said set of connected mesh polygons being visible from said first view region. The method further includes retrieving information indicating at least one boundary edge of said at least one set of connected mesh polygons. The method also includes traversing said at least one set of connected mesh polygons belonging to said second set of mesh polygons. The traversing includes beginning said traversing at said at least one first mesh polygon, and interrupting said traversing upon encountering said at least one boundary edge during said traversing.

In exemplary embodiments, a system determines and stores information describing a first set of mesh polygons, said mesh polygons forming polygon meshes, said first set of mesh polygons visible from a first view region. The system includes an encoder having a processor configured to determine a second set of mesh polygons visible from a second view region, said second view region containing said first view region. The processor is further configured to determine information indicating at least one mesh polygon, said at least one mesh polygon belonging to a set of connected mesh polygons, said set of connected mesh polygons being visible from said first view region. The processor is also configured to determine information indicating at least one boundary edge of said at least one set of connected mesh polygons. The system also includes a database to store said second set of mesh polygons, said information indicating said at least one mesh polygon, and said information indicating said at least one boundary edge.

In exemplary embodiments, a non-transitory computer readable storage medium has executable instructions stored therein, which when executed by a processor causes the processor to perform a method of determining and storing information describing a first set of mesh polygons, said mesh polygons forming polygon meshes The method includes determining and storing a second set of mesh polygons visible from a second view region, the second view region containing the first view region. The method further includes determining and storing information indicating at least one mesh polygon, the at least one mesh polygon belonging to a set of connected mesh polygons, the set of connected mesh polygons being visible from the first view region. The method also includes determining and storing information indicating at least one boundary edge of the at least one set of connected mesh polygons.

In exemplary embodiments a method is conducted on a server for controlling navigation-based pre-fetch sending of graphics information to a client device, the graphics information including a first set of graphics information visible from a second view region and not visible from a first view region, and the graphics information including a second set of graphics information visible from the second view region and not visible from the first view region, the second set of graphics information having a lower level-of-detail than the first set of graphics information. The method includes determining a first period during which the first set of graphics information will arrive after the client device is scheduled to access the first set of graphics information on the client device. The method further includes sending the second set of graphics information during the first period.

In exemplary embodiments, a method, conducted on a client device, controls navigation-based pre-fetch receiving of graphics information from a server device, said graphics information including a first set of graphics information visible from a second view region and not visible from a first view region. The method includes determining a first period during which said first set of graphics information will arrive after said client device is scheduled to access said first set of graphics information on said client device. The method further includes receiving, during said first period, regulating information, said regulating information used to decrease viewpoint velocity.

In exemplary embodiments, a system controls navigation-based pre-fetch sending of graphics information, said graphics information including a first set of graphics information visible from a second view region and not visible from a first view region, and said graphics information including a second set of graphics information visible from said second view region and not visible from said first view region, said second set of graphics information having a lower level-of-detail than said first set of graphics information. The system includes a server having a processor configured to determine a first period during which said first set of graphics information will arrive after said client device is scheduled to access said first set of graphics information on said client device. The processor is further configured to send said second set of graphics information during said first period. The system further includes a client device to display said second set of graphics.

In exemplary embodiments, a non-transitory computer readable storage medium has executable instructions stored therein, which when executed by a processor in a server causes the processor to perform a method for controlling navigation-based pre-fetch sending of graphics information to a client device, said graphics information including a first set of graphics information visible from a second view region and not visible from a first view region, and said graphics information including a second set of graphics information visible from said second view region and not visible from said first view region, said second set of graphics information having a lower level-of-detail than said first set of graphics information. The method includes determining a first period during which the first set of graphics information will arrive after the client device is scheduled to access the first set of graphics information on the client device. The method further includes sending the second set of graphics information during the first period.

Accordingly, at least one embodiment has the following objects and advantages. The following list of objects and advantages is not inclusive but serves to emphasize only some of the objects and advantages of one embodiment.

It is an object to provide a method of determining: a) the set of graphic primitives that are that are potentially visible from each cell of a set of viewcells and, b) the portion of partially occluded primitives that are potentially visible from each cell of a set of view cells.

It is an advantage that by determining the occluded portions of partially visible primitives the resulting potentially visible set (PVS) is more precise than cell-to-cell or cell-to-primitive PVS determined by existing methods of visibility precomputation.

It is another object to provide a method of PVS determination which does not require a BSP autopartition of the represented database.

It is an advantage of the present invention that it can be applied to complex, models for which a BSP autopartition is impractical.

It is yet another object to provide a method of PVS determination which does not require transformation of the problem to line space.

It is an advantage that by solving in primal space the method avoids the computational cost and robustness issues of higher dimensional constructive solid geometry operations and quadratic programming required by line space methods of visibility precomputation.

It is yet another object to provide a method of PVS determination using a from-viewcell visibility precomputation technique which employs conservative linearized umbral event surfaces which are either exact event surfaces or which conservatively approximate the exact event surfaces (which may be quadrics).

It is an advantage that simple tests can be used to determine the deviation of a particular linearized umbral event surface from the corresponding exact umbral event surface. It is a further advantage that the present method includes a technique of first-order backprojection which can be used to adaptively refine a conservative linearized umbral event surface so that it converges on the exact event surface which may be a quadric. It is a further advantage that this precision can be achieved without incurring the computational complexity of explicitly computing quadric surfaces.

It is yet another object to provide a method of PVS determination which employs polygonal approximations to quadric edge-edge-edge visibility event surfaces.

It is an advantage that embodiments produce a PVS that is more precise than the PVS produced by shadow-based methods of visibility precomputation which employ only planar vertex-edge visibility event surfaces.

It is yet another object to provide a method of PVS determination in which conservative linearized umbral event surfaces are identified, the deviation of these surfaces from the exact event surfaces are estimated, and the conservative linearized umbral event surfaces are refined to more precisely approximate the exact ones.

It is an advantage that by refining an approximate conservative solution only when it deviates significantly from the exact solution, the precision of the method is comparable to that of current exact from-region visibility methods, while the cost is lower.

It is yet another object to provide a method of PVS determination in which the precision of polygonal approximations to quadric visibility event surfaces is controlled by estimating the maximal difference in umbra volume produced by the quadric and the polygonal event surfaces and refining the polygonal approximation to achieve the desired precision.

It is an advantage that the complexity of the polygonal approximation to the quadric surfaces directly reflects the nonlinearity or "skewness" of the quadric being approximated.

It is yet another object to provide a method of organizing visibility calculations as an efficient front-to-back polygon mesh traversal algorithm which limits the processing of occluded geometry.

It is an advantage of the present method that by enforcing a front-to-back traversal of meshes, constructing occlusion boundaries as they are encountered and terminating traversal at occlusion boundaries, the method achieves output sensitive performance for densely occluded environments.

It is yet another object to provide a method of PVS determination that does not depend on the presence of convex occluders, but rather directly exploits the occlusion coherence inherent in the connectivity of a manifold mesh, irrespective of the mesh's shape.

It is an advantage that it is more efficient at identifying occlusion than algorithms such as Volumetric Visibility, Extended Projection, and Weiler-Atherton visibility which depend on large convex occluders which are unusual in realistic models.

It is yet another object to represent PVS information for each visibility cell by encoding the differences in the PVS of adjacent cells.

It is an advantage that representing PVS information as the differences in the PVS of adjacent cells (delta-PVS) exploits the natural spatial visibility coherence of 3-D scenes and thereby significantly reduces both the storage requirements for PVS information and the data transfer rate required to support streaming prefetch.

It is yet another object to employ an intermediate delta-PVS representation which encodes the difference in the PVS between viewcells by storing information that indicates which (from-viewcell silhouette) edges produce umbral boundaries that lead to significant occlusion or exposure during the viewcell transition.

It is an advantage that storing information for significantly occluding/exposing silhouette edges reduces the delta-PVS storage requirement and allows rapid runtime construction of the delta-PVS data or the PVS data directly by traversal of an existing (from a contiguous or containing viewcell).

It is yet another object to provide a client-server method of graphics display in which the server stores all of the graphics primitives and associated surface information (e.g. texture information) comprising the model as well as the PVS and delta-PVS data; and the client stores only the subset of the model information required for display from a set of viewcells reachable from the current viewpoint. The client model information is maintained by dynamic prefetch of newly visible/invisible geometry and texture information encoded as delta PVS packets which correspond to viewcell boundaries.

It is an advantage that it provides a method of visibility-based, on-demand streaming delivery of graphics content during interactive walkthrough applications without the need for a low latency connection that is required by prior-art method of streaming delivery based on image compression.

It is further an advantage that it provides a method of visibility-based, on-demand streaming delivery of graphics content during interactive walkthrough applications which requires significantly less bandwidth to deliver interactivity at high resolution than required by prior-art method of streaming delivery based on image compression.

It is yet another object to substantially reduce the bandwidth required to supply delta PVS data to the client by maintaining, on the server, the set of geometry and surface information already present on the client and by checking this information during prefetch in order to eliminate redundant transmission.

It is yet another object to substantially reduce the bandwidth required to supply delta-PVS data to the client by storing the model information on the server at several levels of geometric and surface detail and transmitting lower level-of-detail information during periods of low spatiotemporal visibility coherence (e.g. high rate of newly visible surface exposure) and higher level-of-detail information during periods of higher spatiotemporal visibility coherence.

It is an advantage that transmitting newly visible model information at a relatively low level-of-detail during periods of low spatiotemporal visibility coherence substantially reduces the bandwidth required to supply delta PVS information during these otherwise "peak" bandwidth-requiring periods and simultaneously produces a perceptually lossless image stream since human visual acuity is generally reduced during periods of low spatiotemporal coherence and specifically reduced for newly exposed surfaces.

It is an advantage that transmitting newly visible model information at relatively high level-of-detail during periods of high spatiotemporal visibility coherence makes efficient use of available bandwidth during these otherwise "trough" bandwidth-requiring periods and simultaneously produces a perceptually lossless image stream by replacing low level-of-detail information with higher level-of-detail information over a time period that matches the time required by the human visual system to fully resolve the added detail.

It is yet another object to provide an out-of-core method of graphics display in which the secondary storage stores all of the graphics primitives and associated surface information (e.g. texture information) comprising the model as well as the PVS data; and the core memory stores only the subset of the model information required for display from a set of viewcells reachable from the current viewpoint. The core memory model information is maintained by dynamic prefetch of newly visible/invisible geometry and texture information encoded as delta PVS packets which correspond to viewcell boundaries.

It is an advantage that embodiments provide a general method of visibility-based streaming prefetch that obviates the need to arbitrarily manually partition modeled databases into distinct levels which must be loaded one at a time, or sublevels which are streamed to in core memory based on event or location triggers manually placed in the model by level designers.

It is a further advantage of the method that by providing a method of fine-granularity, visibility-based prefetched streaming, the method facilitates the design of game and simulation model databases that are more continuous and unencumbered by intentionally constructed visibility "choke points" and which do not result in user-experienced pauses caused by streaming coarse-granularity sublevel data.

It is yet another object to substantially reduce the bandwidth required to transfer delta-PVS data to the core memory in an out-of-core rendering system, by storing the model information in secondary storage at a plurality of levels of geometric and surface detail and transferring lower level-of-detail information during periods of low spatiotemporal visibility coherence (e.g. high rate of newly visible surface exposure) and higher level-of-detail information during periods of higher spatiotemporal visibility coherence.

It is an advantage that transferring newly visible model information at a relatively low level-of-detail during periods of low spatiotemporal visibility coherence substantially reduces the bandwidth required to supply delta PVS information during these otherwise "peak" bandwidth-requiring periods and simultaneously produces a perceptually lossless image stream since human visual acuity is generally reduced during periods of low spatiotemporal coherence and specifically reduced for newly exposed surfaces.

Other advantages are apparent from the specification of the invention.

BRIEF DESCRIPTION OF THE DRAWINGS

FIG. 3 shows details of the step 110 in FIG. 1.

FIG. 4A gives additional detail of the process shown in step 116 of FIG. 1.

FIG. 4D is an exemplary diagram showing two mesh polygons having a consistent vertex ordering.

FIG. 4E is an exemplary diagram showing two mesh polygons having an inconsistent vertex ordering.

FIG. 7G is a hidden-diagram which shows the same polygon mesh and viewcell as FIG. 7I and shows two pivoted wedges intersecting at an outside corner vertex of a first-order silhouette contour.

FIG. 8D is an exemplary diagram showing the first-order wedges incident on silhouette edges A and B, including two SV-ME wedges and a single SE-MV wedge, all intersecting at the inside corner silhouette vertex labeled ICSV. Perspective view looking in the general direction from the polygon mesh object toward the viewcell.

FIG. 10B is a view of the same polygon mesh as FIG. 10A and the same viewcell, but showing a set of UBPs forming a PAU.

FIG. 27A illustrates that a first-order, from-region, SV-ME umbral wedge may be inexact on segments where the corresponding supporting polygon intersects geometry between the viewcell and the supporting first-order silhouette edge.

FIG. 31A shows exemplary data structures employed by the method of labeled silhouette edges.

FIG. 31B is a continuation of FIG. 31A.

FIG. 31C is a continuation of FIG. 31B.

FIG. 31D is a diagram showing data structures for an exemplary embodiment employing deltaG+ data.

FIG. 41A is an exemplary diagram showing the use of the on-wedge visibility method (FIG. 14, FIG. 15, and FIG. 16) to identify CSVs and construct wedge lines for a SV-ME wedge. FIG. 41A shows the case of a simple CSV no cusp.

FIG. 41B is an exemplary diagram showing the use of the on-wedge visibility method (FIG. 14, FIG. 15, and FIG. 16) to identify CSVs and construct wedge lines for a SV-ME wedge. FIG. 41B shows case of degenerate CSV forming a cusp of the first-order silhouette contour.

FIG. 41C is an exemplary drawing showing a SE-ME wedge incident on a first-order silhouette edge intersecting 3 polygon mesh objects, the first-order from-viewcell-edge wedge lines (WLs) and their intersection with mesh polygons are shown. The figure is used to illustrate the operation of the 2D mesh traversal process for constructing an on-wedge visibility map (FIG. 15 and related figures).

FIG. 41D is a perspective view diagram showing a polygon mesh, a viewcell, and a portion of a first-order silhouette contour including a cusp and a compound silhouette vertex.

FIG. 43A is an exemplary diagram and FIG. 43B data structures for incremental VM/PVS maintenance using delta VM/PVS data.

FIG. 43B is a continuation of FIG. 43A.

DETAILED DESCRIPTION OF THE EMBODIMENTS

Figure 1:
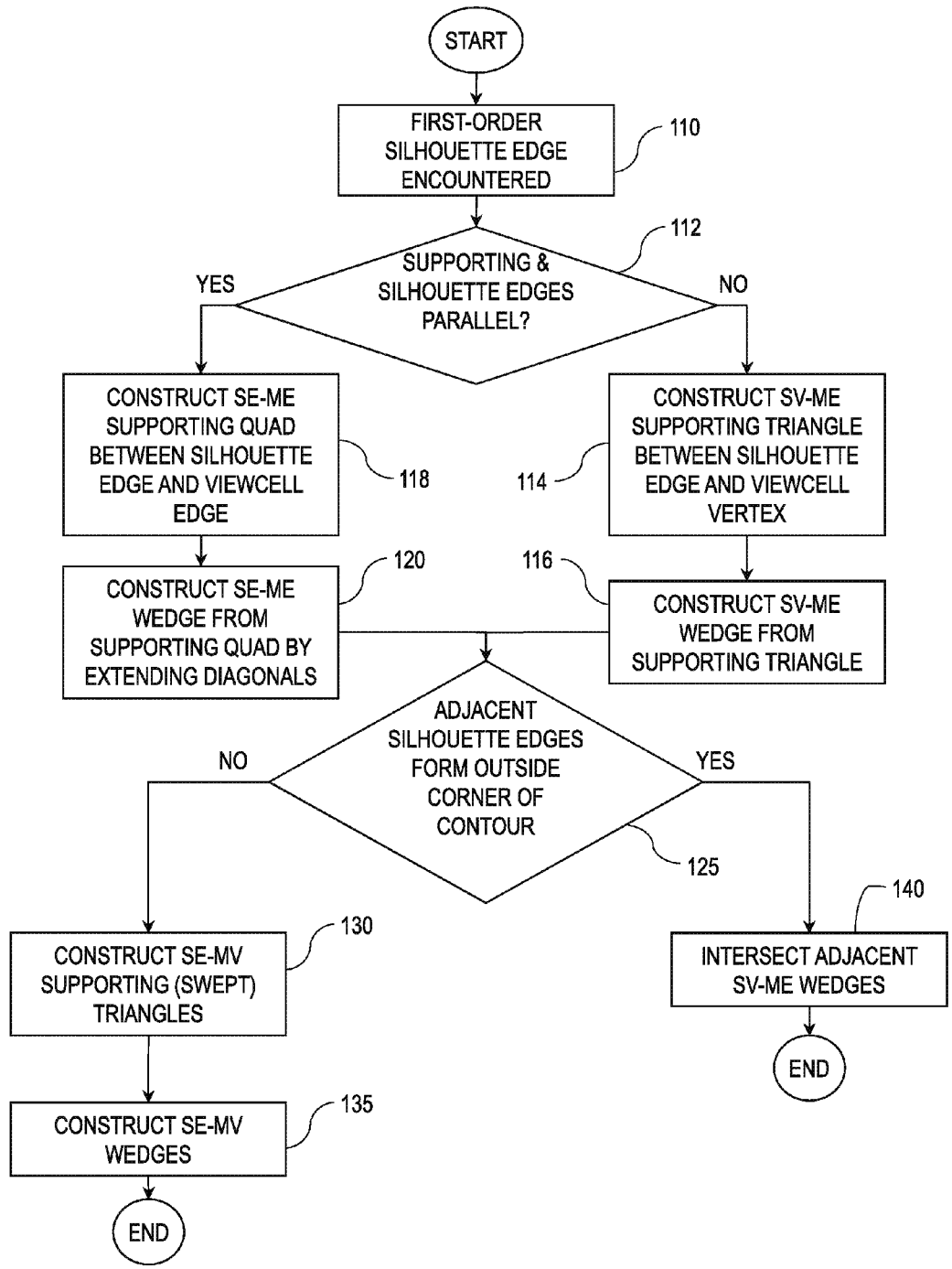
FIG. 1 is an exemplary flowchart showing a top-down organization of constructing conservative linearized umbral event surfaces or wedges at first-order silhouette mesh silhouette edges or vertices using the pivot and sweep method. This flowchart shows the degenerate case of parallel supporting viewcell edge and silhouette edge being explicitly identified and managed by constructing the corresponding SE-ME wedge.

In exemplary embodiments, the terminology ESO (Effective Static Occlusion) refers to a metric that is in some direct proportion to the number of (original mesh) polygons and/or surface area of these polygons inside an occluded region of a visibility map. The ESO is also in some inverse proportion to the number of new polygons introduced in the visible region surrounding the occluded region as a result of retriangulation caused by the edges of the occlusion boundary. The metric is used in conservative simplification of a VM or unified VM.

In exemplary embodiments, the terminology EDO (Effective Dynamic Occlusion) refers to a metric that is in some direct proportion to the number of polygons and/or surface area of polygons occluded in a delta region (DR) of occlusion wherein the DR represents the region of occlusion produced during a specific viewcell transition. The ESO is also in some inverse proportion to the number new polygons introduced in the visible region surrounding the DR as a result of retriangulation caused by the edges of the occlusion boundary.

In exemplary embodiments, the terminology EDV (Effective Dynamic Visibility) refers to a measure of the effectiveness of a delta region (DR) of a unified visibility map. If the DR is a $DR_O$ (delta region of occlusion) for the specific viewcell transition then the EDV corresponds to the EDO of the DR.

If the DR is a $DR_E$ (delta region of exposure) then the EDV is determined by examining the ESO of the surrounding occlusion regions. Simplification of the $DR_E$ proceeds by simplification of the surrounding OR and extending the polygons of the $DR_E$ into the OR or $DR_O$.

In exemplary embodiments, the terminology Unified Visibility Map refers to a visibility map including from-viewcell occlusion boundaries generated from two viewcells (e.g. A and B) wherein the viewcells are related in one of two ways: 1) one viewcell is completely contained in the other, or 2) the viewcells completely share a common face. The unified visibility map is an arrangement of VM regions such that some regions contain newly occluded mesh triangles/fragments and other regions contain newly exposed mesh triangles/fragments for the transition from viewcell A to viewcell B. The unified visibility map is used to construct delta-PVS data for direct storage. Alternatively the unified visibility map can be used to identify significantly occluding or significantly silhouette contours which can be labeled and used to generate the deltaG/delta-PVS data later.

In exemplary embodiments, the terminology wedge (see also CLUES) refers to a visibility event surface formed by a feature (vertex or edge) of a viewcell and vertices or edges of the mesh polygons. In general a wedge defines the visibility from the viewcell's feature, and across the mesh polygon's vertex or edges.

The wedges employed in the prior-art method of discontinuity meshing are exact. These edges may be planar or quadric surfaces. The planar wedges described in the discontinuity mesh literature are of two types renamed here as:

1) SV-ME wedge-Formed by a vertex of the viewcell (or "source") and an edge of the mesh. Also called a pivoted wedge or a supporting vertex wedge.

2) SE-MV wedge-Formed by an edge of the viewcell and a vertex of the polygon mesh. Also called a swept wedge or supporting edge wedge.

3) SE-ME wedge-Formed in the special case where the mesh silhouette edge is parallel to a supporting viewcell silhouette edge.

These definitions assume frontprojection (i.e. using the viewcell as the lightsouce). In the backprojection method a silhouette edge or segment of a silhouette edge is used as the "source" and various silhouette edges in the shaft between the source edge and the viewcell support the backprojection event surfaces. The definitions are otherwise identical for the backprojection case.

Since the wedges employed in discontinuity meshing are typically used to identify components of the sources penumbra they are constructed on a relatively large number of edges of the polygon meshes, called from viewcell silhouette edges.

Since the planar wedges used in discontinuity meshing are exact event surfaces they are not defined on regions for which the wedge's viewcell feature (vertex or edge) is occluded from the wedge's polygon mesh feature. This definition of a wedge creates "gaps" in the planar event surfaces that cause the surfaces to be discontinuous. In the method of complete discontinuity meshing these gaps are filled with higher-order visibility event surfaces which may be quadric wedges. The gaps are filled by these higher-order event surfaces the and resulting visibility event surfaces, in general, continuous.

See Table Ia and Ib for wedge nomenclature.

Embodiments also employ planar from-feature event surfaces, the conservative linearized umbral event surfaces (CLUES) which are similar to the planar wedges employed in discontinuity meshing but differ from these wedges in important respects.

One difference between the planar wedges used in discontinuity meshing and the CLUES (also called first-order wedges, or simply wedges in the present specification) is that the wedges employed in the present method are only those wedges that could form from-viewcell umbral event surface, penumbral events per se are not considered in from-viewcell visibility. The wedges of the present method are constructed on fewer polygon mesh edges (called the first-order silhouette edges) and they are constructed using a pivot-and-sweep technique which generates only potential umbral event wedges. This means that the number of wedges constructed in the present method is far less than the number of wedges generated in discontinuity meshing.

Another difference between discontinuity meshing wedges and the wedges of the present method is that the wedges of the present method are defined and constructed using only by the wedge's viewcell feature and the wedge's polygon mesh feature. Any intervening geometry between these two features is ignored.

This method of wedge construction is based on the first-order model of visibility propagation in polyhedral environments which insures that conservative, continuous umbral boundaries are constructed.

In actuality, intervening geometry may cause regions for which the viewcell feature is occluded from the polygon mesh feature. These are regions of the wedge in which the corresponding discontinuity mesh wedge would not be defined (thereby producing a gap or discontinuity in the event surface which is normally filled by a higher-order wedge or quadric). By ignoring this intervening geometry the present method constructs wedges which define a continuous event surface without gaps. Since the wedges of the present method are constructed by ignoring this type of higher order occlusion they conservatively represent the actual from-feature umbral event surface. For regions of the wedge in which there is no intervening geometry, the wedges constructed by the present method are exact.

In regions where the wedge is inexact the wedge may be optionally replaced by other wedges constructed using a modified method of wedge construction which accounts for higher-order occlusion caused by the intervening geometry.

The present method includes three types of (first-order) wedges:

1) SV-ME wedge-formed by extending the edges of a corresponding pivoted supporting polygon. The corresponding pivoted supporting polygon is formed by a supporting vertex of the viewcell (SVV) and a first-order silhouette edge of the polygon mesh by the process of pivoting from the edge to the viewcell. The pivoted supporting polygon is also called a SV-ME supporting polygon or a vertex supporting polygon. This type of visibility event surface reflects containment at a point on the viewcell and occlusion by an (silhouette) edge of the mesh. Also called a pivoted wedge. The pivoting process is described as a process that identifies the supporting plane between the first-order silhouette edge and a viewcell. While the process may appear to a human being to be an actual continuous rotation of a plane about the silhouette edge until it touches the viewcell, in fact embodiments can measure specific discrete angles formed by each candidate supporting plane (formed by corresponding viewcell vertex) and another polygon. Comparing these angle measurements in one embodiment allows determination of the actual supporting polygon from a number of candidate supporting polygons.

2) SE-MV wedge-formed by extending the edges of a corresponding swept supporting polygon (also simply called a swept polygon or an edge supporting polygon), which is a supporting polygon formed by a supporting edge of the viewcell and an inside corner mesh silhouette vertex by the process of sweeping along the supporting viewcell silhouette contour (SVSC) between the SVVs supporting the adjacent SV-ME wedges. This type of visibility event surface reflects containment on a (boundary) edge of the viewcell restricted at an (inside corner) mesh silhouette vertex. An SE-MV wedge is also called a swept wedge.

3) SE-ME wedge-formed only where the supporting viewcell edge and the supported mesh silhouette edge are parallel. Formed by extending the edges of the corresponding SE-ME supporting polygon formed between the parallel supporting viewcell edge and the supported mesh silhouette edge. Unlike the other types of planar wedges the determination of on-wedge visibility for an SE-ME wedge is a from-region, not a from-point visibility problem. This type of visibility event surface reflects containment on a (boundary) edge of the viewcell and occlusion by an (silhouette) edge of the mesh.

Another important difference between the wedges used in prior-art discontinuity meshing and those used in the present invention is that in the present method on-wedge visibility is determined using a conservative method in which on-wedge silhouette vertices are constrained to occur on first-order, from-viewcell silhouette edges. This insures that each on-wedge silhouette vertex is a compound silhouette vertex (CSV), a point of intersection of two wedges (one corresponding to the current wedge). In contrast, in prior-art discontinuity meshing methods, on-wedge visibility is determined exactly, typically using from-point object space visibility methods like the Weiler-Atherton algorithm.

In exemplary embodiments, the terminology pivoted wedge refers to an SV-ME wedge formed by extending the edges of a pivoted supporting polygon.

In exemplary embodiments, the terminology CLUES (Conservative Linearized Umbral Event Surface) (See Wedge) refers to another name for the first-order umbral wedges constructed using the pivot-and-sweep method of the present invention. These wedges may be refined to reflect higher-order visibility interactions using the backprojection method of the present invention.

In exemplary embodiments, the terminology Umbra Boundary Polygon (UBP) refers to a polygon that is part of the surface of the from-viewcell umbral volume. In the present method the from-viewcell umbral volumes (called the polyhedral aggregate umbrae, or PAU) may be constructed using conservative UBPs that are derived from the corresponding (first-order) wedges.

The wedges employed by the present method are from-viewcell-feature umbral event surfaces that are guaranteed to be from-viewcell umbral event surfaces (from the entire viewcell) only in the immediate vicinity of the mesh silhouette edge that supports the wedge. This is because the wedge may intersect another wedge beyond the supporting silhouette edge in a way that restricts the from-viewcell umbral boundary on the wedges. That is to say that the wedge itself, which is tangentially visible from the supported viewcell feature, may become visible from other parts of the viewcell.

Higher-order UBPs may be constructed from the corresponding higher-order wedges.

In exemplary embodiments, the terminology polygon mesh refers to a finite collection of connected vertices, edges, and faces (also called polygons) formed from the vertices and edges. If two polygons of a mesh intersect, the edge or vertex of intersection must be a component of the mesh. No interpenetration of faces is allowed. Also called a polygon mesh object, triangle mesh or simply mesh. If each edge of the mesh is shared by at most two polygons it is a manifold polygon mesh. If each edge is shared by exactly two faces then the mesh is a closed manifold polygon mesh. Polygon meshes in this specification are assumed to be closed manifold meshes unless otherwise indicated.

In exemplary embodiments, the terminology viewcell or view region refers to a polyhedron, which may be represented as a polygon mesh, which describes a region to which the viewpoint is restricted. Viewcells and view regions in this specification are assumed to be convex unless otherwise indicated. A viewcell may be constrained to be a parallelpiped or box, while a view region may not necessarily be so constrained.

In exemplary embodiments, the terminology PVS (potentially visible set) refers to a set of polygons or fragments of polygons that are visible from a viewcell. Generally a PVS is computed to be conservative, including all polygons or polygon fragments that are visible as well as some that are not.

In exemplary embodiments, the terminology Polyhedral Aggregate Umbrae (PAU) refers to the volume of space occluded by a mesh object from a viewcell, assuming the first-order model of visibility propagation, is called the first-order polyhedral umbra volume. Since individual umbral volumes may intersect to aggregate the occlusion we call these volumes the first-order polyhedral aggregate umbra (PAU).

First-order PAU, also simply called PAU, are bounded by polygons called umbra boundary polygons or UBP. These polygons are formed by the intersection of the first-order wedges with triangle mesh polygons and with other first-order wedges. The PAU are also bounded by the first-order visible mesh polygon fragments (the fragments comprising the from-viewcell visibility map). Together the UBPs and the visible mesh polygon fragment form continuous (though not necessarily closed) umbral surfaces that define the boundaries of the PAU.

As described in detail in conjunction with the 3D 2-manifold traversal method (FIG. 20 and related figures); the construction of the visibility map involves a step in which it is determined if a point on an on-wedge visible polyline segment is actually within a PAU volume, and therefore occluded from the entire viewcell. The method includes a modified point-in-polyhedron test which can answer this query for first-order PAU without explicitly constructing the entire PAU.

In exemplary embodiments, the terminology Discontinuity Mesh (DM) refers to a mesh formed by the intersection of visibility event surfaces with mesh polygons. A discontinuity mesh formed from visibility event surfaces incident on a viewcell partitions the mesh polygons into partitions (called regions) of uniform qualitative visibility or "aspect" with respect to the viewcell.

In the prior-art method of complete discontinuity meshing all event surfaces, umbral and penumbral, incident on the light source are constructed.

In some embodiments, from-viewcell discontinuity meshes are constructed from first-order, from-viewcell umbral visibility event surfaces or from first-order umbral visibility event surfaces which have been refined, by a backprojection technique, to account for higher-order visibility interactions.

Despite the fact that only umbral event surfaces are employed; not all regions of the umbral DM bordered by the occluded side of oriented DM polylines are actually occluded from the entire viewcell. This is because the from-viewcell status of a region (its actual inclusion as part of a PAU) is determined by wedge-wedge intersections in R3 that may not be reflected in the corresponding wedge-polygon mesh intersection.

In exemplary embodiments, the terminology Visibility Map (VM) refers to a partitioning of mesh polygons into regions that are occluded from the entire viewcell and other regions that are visible from some point on the viewcell. In prior-art methods of exact from-region visibility (Nierenstein et al. 2000, 2005) these partitions are constructed using exact visibility event surfaces which are generally, quadrics.

Embodiments construct conservative, linearized, umbral discontinuity meshes using the corresponding CLUES. The resulting DM is conservative partitioning of mesh polygons into regions that are occluded from the entire viewcell and other regions that are visible from some point on the viewcell. The boundaries of the VM are a subset of the boundaries of the corresponding DM, since not all regions of the umbral DM bordered by the occluded side of oriented DM polylines are actually occluded from the entire viewcell. In contrast the corresponding VM contains only regions that are guaranteed to be occluded from the entire viewcell (umbral regions of the VM) and other regions that are visible from some point on the viewcell, wherein the occlusion may be conservatively underestimated and the visibility consequently overestimated.

In exemplary embodiments, the terminology silhouette edge refers to an edge of a polygon mesh which has one component polygon that is front facing from a particular location and another component polygon that is backfacing from the same location.

In exemplary embodiments, the terminology From-Point Silhouette Edge refers to an edge of a polygon mesh which has one component polygon that is front facing from a particular point and another component polygon that is backfacing from the same point.

In exemplary embodiments, the terminology From-Region Silhouette Edge (also called general from-region silhouette edge) is defined with respect to a region such as a viewcell (or an polygon mesh edge in the case of backprojection) acting as a light source. If the location is a viewcell the from-region silhouette edge may be called a from-viewcell silhouette edge. If the region is an edge then the from-region silhouette edge may be called a from-edge silhouette edge. In the present specification any of type of silhouette edge (from-point, from-viewcell, from-edge) may simply be called a silhouette edge, with the type of silhouette edge being implied by the context.

A from-viewcell general silhouette edge is any edge of a polygon mesh that is a from-point silhouette edge for any point on a viewcell (or area lightsource). This is the definition of from-viewcell silhouette edge employed by Nierenstein et. al. 2005 and in the complete discontinuity meshing method of Drettakis et. al. 1994.

In general such edges support from-region penumbral event surfaces but a subset actually support from-region umbral event surfaces which are typically quadric surfaces.

From-region silhouette edges may be defined exactly, when higher-order visibility interactions of edge triples are considered. Alternatively from-region silhouette edges may be defined, as in the present method, conservatively by considering only visibility event surfaces that arise as a result of interactions between edge pairs; as in the first-order visibility model of visibility propagation.

In exemplary embodiments, the terminology First-Order Silhouette Edge refers to a first-order from-viewcell silhouette edge (also called simply a first-order silhouette edge) is an edge of a polygon mesh that has one component polygon that is backfacing for the entire viewcell, and the other component polygon that is front facing for at least one vertex of the viewcell, wherein the component polygons are backfacing with respect to each other.

This definition is based on a simple, conservative model of visibility propagation in polyhedral environments called first-order visibility, which considers only the visibility event surfaces that arise as a result of interactions between edge pairs.

One embodiment of the present invention employs polygon meshes that are manifold triangle meshes. In a manifold triangle mesh, each edge is completely shared by exactly two triangles. The specification of first-order silhouette edges is simplified by using manifold triangle meshes.

A first-order silhouette edge of a polygon mesh with respect to a viewcell is a locally supporting edge of the polygon mesh with respect to the viewcell. A locally supporting edge supports a polygon between the viewcell and the edge if only the viewcell and the two component polygons (triangles) sharing the edge are considered in the test for support. (See definition of test for support)

Generally first-order from-region silhouette edges are a small subset of the exact from-region silhouette edges of any polygon mesh.

In the present specification, any type of first-order silhouette edge (from-viewcell, from-edge) may simply be called a first-order silhouette edge, or simply a silhouette edge with the type of silhouette edge being implied by the context.

The present invention includes a method of identifying (by adaptive refinement and backprojection) where a first-order silhouette edge is inexact and "retracting" the silhouette edge to a closer edge that belongs to the set of exact from-region silhouette edges of the polygon mesh.

In exemplary embodiments, for the terminology Locally Supporting Edge, see First-Order Silhouette Edge.

In exemplary embodiments, the terminology supporting polygon refers to a supporting polygon that is "supported" by two structures. In the present method, a supporting polygon between a first-order silhouette edge of a polygon mesh and a viewcell is, in one case, formed by the first-order silhouette edge and a vertex of the viewcell (SV-ME supporting polygon). The vertex of the viewcell supporting this polygon is called the supporting viewcell vertex (SVV). It can be identified by pivoting the plane of the backfacing component polygon of the silhouette edge, wherein the pivoting occurs about the silhouette edge and in a direction of the normal of the backfacing component polygon of the edge toward the viewcell until the plane of the supporting polygon intersects the viewcell. This intersection will, in the general case, occur at the supporting viewcell vertex, which together with the first-order silhouette edge, forms a supporting polygon that is a triangle. If the supporting viewcell vertex is a vertex of an edge of the viewcell that is parallel to the silhouette edge of the mesh then the pivoting plane will intersect the edge of the viewcell, not just a single vertex, and the supporting polygon will be a quadrangle formed by the mesh silhouette edge and the intersected viewcell edge. This second type of supporting polygon is called a SE-ME supporting polygon.

In another case of the present method a different type of supporting polygon is formed between an inside corner vertex of a first-order silhouette edge and an edge of the viewcell (SE-MV supporting polygon also called a supporting triangle).

In the context of the present invention, supporting polygons are conservatively defined as being supported by a first-order silhouette edge (also called a locally supporting edge), or vertex thereof, and the corresponding viewcell, neglecting any occlusion or interference between the first-order silhouette edge and the viewcell. If a supporting polygon, as defined by the present invention, intersects geometry between the first-order edge and the viewcell, then the supporting polygon is not a supporting polygon as defined in the prior art (which does not generally allow a supporting polygon to be defined if such interference exists).

As defined in prior-art a polygon would pass a "test for support" (i.e. be a supporting polygon) between two structures if the polygon is supported by a vertex or edge of one structure and a vertex or edge of the other structure without intersecting anything else. The test for support also requires that the extension of the supporting polygon (e.g. this extension is the "wedge") in the direction away from the first supported object (e.g. the viewcell) also does not intersect the other supported structures (e.g. the polygon meshes) in a way that causes it to be "inside" the other supported structure (e.g. on the topological "inside" of a manifold mesh). This test for support effectively requires a supporting edge to be an "outside" edge of the structure (e.g. a polygon mesh) which will support a supporting polygon tangentially to the structure, as opposed to an "inside" or reflex edge of a structure such as a polygon mesh which will not.

In the present method this test for support is used in a more limited way by including only the polygons sharing an edge of a mesh in the determination of whether the edge supports a conservative supporting polygon between the viewcell and the mesh (i.e., whether the edge is a "locally supporting" or first-order silhouette edge, see definition of first-order silhouette edge and locally supporting edge).

In cases where the difference between the present, conservative, definition of the supporting polygon is distinguished from the prior-art definition of the supporting polygon is to be emphasized, a supporting polygon as defined by the present invention may be called a conservative supporting polygon. Otherwise a conservative supporting polygon as defined in the present invention is simply called a supporting polygon.

As defined in the present invention, wedges derived from (conservative) supporting polygons always form continuous conservative linearized umbral event surfaces that can be intersected with mesh polygons to conservatively determine the set of mesh polygons (or fragments thereof) that are visible from a viewcell, without the need for quadric surfaces that usually dominate (and complicate) exact solutions.

In exemplary embodiments, for the terminology Conservative Supporting Polygon see the above terminology for supporting polygon In exemplary embodiments, the terminology Test for Support refers to a polygon that would pass a "test for support" (i.e. be a supporting polygon) between two polygonal structures if the polygon is supported by a vertex or edge of one structure and a vertex or edge of the other structure without intersecting anything else. The test for support also requires that the extension of the supporting polygon (e.g. this extension is the "wedge") in the direction away from the first supported object (e.g. the viewcell) also does not intersect the other supported structures (e.g. the polygon meshes) in a way that causes it to be "inside" the other supported structure (e.g. on the topological "inside" of a manifold mesh). This test for support effectively requires a supporting edge to be an "outside" edge of the structure (e.g. a polygon mesh) which will support a supporting polygon tangentially to the structure, as opposed to an "inside" or reflex edge of a structure such as a polygon mesh which will not.

In the present method this test for support is used in a more limited way by including only the polygons sharing an edge of a mesh in the determination of whether the edge supports a conservative supporting polygon between the viewcell and the mesh (i.e., whether the edge is a "locally supporting" or first-order silhouette edge, see definition of first-order silhouette edge and locally supporting edge).

In cases where the difference between the present, conservative, definition of the supporting polygon is distinguished from the prior-art definition of the supporting polygon is to be emphasized, a supporting polygon as defined by the present invention may be called a conservative supporting polygon. Otherwise a conservative supporting polygon as defined in the present invention is simply called a supporting polygon.

In exemplary embodiments, the terminology Conservative Supporting Hull refers to a polygonal structure formed by the conservative supporting polygons between one polyhedron (e.g. a viewcell) and one or more other polyhedra (e.g. polygon mesh objects). The pivot-and-sweep method is a method of constructing a specific subset of the conservative supporting hull polygons between a viewcell and non-convex polygon mesh objects.

The supporting hull is a generalization of the "convex hull" which is important prior-art in computational geometry and linear programming. The convex hull between two convex polyhedral is a polygonal structure that contains all of the "sightlines" of visibility between the two convex polyhedral. Prior art methods of forming the convex hull between one convex polyhedron (e.g. a viewcell) and another convex polyhedron (e.g. a convex polygon mesh) are well known and important. These prior-art methods employ the construction of supporting polygons between the two convex objects. (See O'Rourke, Computational Geometry in C Second edition Cambridge University Press 1998).

There is no apparent prior-art description for forming the supporting hull between a convex polyhedron and one or more non-convex polyhedra (e.g. polygon mesh objects used in the present invention and which are ubiquitous in computer graphics). An exact supporting hull would include not only polygons but also quadric surfaces incident on compound silhouette vertices.

In contrast, the set of conservative supporting polygons that can be constructed using the pivot-and-sweep method of the present invention can be easily supplemented (by adding swept wedges incident on outside-corner vertices of the polygon meshes) to form a continuous, conservative approximation to the exact supporting hull between a convex polyhedron (e.g. the viewcell) and a one or more non-convex polyhedral.

The pivot-and-sweep method as specified in one embodiment of the present invention constructs the subset of the conservative supporting hull polygons that, when extended, form wedges that, in combination, form conservative continuous umbral event surfaces which can be used to determine the set of polygons visible from a viewcell without the need for quadric surfaces.

Some polygons that would be included in the complete conservative supporting hull are not constructed in the pivot-and-sweep method in one embodiment because the corresponding wedges (e.g. swept, or SE-MV wedges incident on outside corner vertices of the polygon meshes) do not contribute to the continuous umbral boundary separating what is visible from the viewcell from what is occluded from the viewcell.

In the pivot-and-sweep method these supporting polygons are not identified. Consequently their corresponding wedges are not constructed.

Alternate embodiments of the employing conservative supporting polygons to construct the continuous umbral event surfaces other than the specified pivot-and-sweep method are possible. For example, alternate embodiments can construct the entire complete conservative supporting hull between a viewcell and polygon mesh objects and then extend the edges of all of the supporting hull polygons to form wedges. The wedges so formed include wedges (e.g. wedges formed by extending supporting polygons supported by an edge of the viewcell and an outside corner vertex of the polygon mesh) that do not contribute to a continuous umbral event surface. In such an alternate embodiment these superfluous wedges can be ignored or removed.

In exemplary embodiments, the terminology SVV (supporting viewcell vertex) refers to, for a given mesh silhouette edge, the first viewcell vertex that is encountered when pivoting a plane through the mesh silhouette edge in the direction of the normal of the backfacing component polygon of the silhouette edge. (see also supporting polygon)

In exemplary embodiments, the terminology Supporting Viewcell Silhouette Contour (SVSC) refers to that portion of the viewcell silhouette contour, as viewed from an inside corner vertex of a mesh silhouette edge, that produces the most extreme umbra boundary. This is the portion of the viewcell silhouette contour which produces the least occlusion when looking through the inside corner mesh silhouette vertex from the viewcell silhouette. It is also the contour that, when subjected to sweep operation, produces SE_MV wedges that have a consistent orientation with the connected SV-ME wedges and form a continuous surface. The supporting viewcell silhouette contour extends between two SVVs that corresponding to the mesh silhouette edges which produce the inside corner vertex.

SE-MV wedges are oriented visibility event surfaces that reflect the restriction of visibility at a mesh silhouette vertex by virtue of containment on the viewcell surface.

In contrast, SV-ME wedges are oriented visibility event surfaces that reflect the restriction of visibility at a mesh silhouette edge by virtue of the (from-viewcell) occlusion caused by the mesh polygon at the silhouette edge.

The SVSC is the set of (from mesh silhouette edge) viewcell silhouette edges that produces corresponding SE-MV wedges having a orientation that is consistent with the orientation of adjacent SV-ME wedges; thus producing a continuous, conservative, consistently oriented umbral event surface at the mesh silhouette vertex.

In exemplary embodiments, for the terminology swept triangle, see swept polygon.

In exemplary embodiments, the terminology swept polygon (also called a swept supporting polygon or a swept triangle) refers to the visibility event boundary at an non-convex (or "inside") corner of a first-order silhouette edge of a polygon mesh is formed not only by extending those supporting polygons supported by the silhouette edges forming the inside corner, but possibly also by one or more swept polygons which are a different type of supporting polygon formed between the inside corner vertex of the mesh silhouette and certain edges of the viewcell that are from-point silhouette edges from the perspective of the inside corner silhouette vertex of the mesh object. These from-point silhouette edges of the viewcell form a contour chain (the extremal or supporting viewcell silhouette contour) between the SVVs corresponding to the inside corner edges of the mesh object. Polygons (triangles) are "swept" out for each edge of this chain, forming the swept polygons. The edges of these swept polygons are extended to form SE-MV or swept wedges that also contribute to the first-order visibility event surface at inside corners of the mesh silhouette contour.

In exemplary embodiments, the terminology swept wedge refers to a SE-MV wedge formed by extension of the edges of a swept supporting polygon.

In exemplary embodiments, the terminology separating polygon refers to a polygon that separates two structures. A separating polygon between a silhouette edge of a polygon mesh and a viewcell is, in the general case, formed by the silhouette edge and a vertex of the viewcell. The vertex of the viewcell supporting this polygon is called the separating viewcell vertex. It can be identified by pivoting the plane of the backfacing component polygon of a silhouette edge, wherein the pivoting occurs about the silhouette edge and in a direction opposite of the normal of the backfacing component polygon of the edge toward the viewcell until the plane intersects the viewcell. This intersection will, in the general case, occur at the separating viewcell vertex, which together with the silhouette edge, forms a separating polygon that is a triangle. If the separating viewcell vertex is a vertex of an edge of the viewcell that is parallel to the silhouette edge of the mesh then the pivoting plane will intersect the edge of the viewcell, not just a single vertex, and the separating polygon will be a quadrangle formed by the mesh silhouette edge and the intersected viewcell edge. Used to determine the maximum deviation between a first-order UBP and a higher-order UBP incident on a silhouette edge.

In exemplary embodiments, the terminology Umbra Boundary Polygon (UBP) refers to a polygon that is part of the umbra boundary formed by a polygon mesh object using the viewcell as an area lightsource. A UBP may correspond to the exact umbra boundary or may conservatively approximate the umbra boundary in a region. Constructed by extension of supporting polygons and swept polygons using the pivot and sweep construction method of the present invention. On initial construction UBPs extend semi-infinitely away from the viewcell. In subsequent steps of constructing PAUs, UBPs are intersected with each other, with mesh polygons, and possibly with a bounding box surrounding all mesh objects.

In exemplary embodiments, the terminology First-Order UBP Refers to a polygon constructed using the pivot and sweep method and alternate embodiments of the method described in this specification.

In exemplary embodiments, the terminology First-Order SV-ME UBP (Source Vertex-Mesh Edge UBP) refers to a polygon constructed by extending the corresponding supporting polygon (SV-ME Supporting Polygon) between a mesh silhouette edge and a viewcell vertex.

In exemplary embodiments, the terminology First-Order SE-MV UBP (Source Edge-Mesh Vertex UBP) refers to a polygon constructed by extending the corresponding swept polygon (SE-MV Swept Polygon) between a mesh silhouette contour vertex inside corner vertex (of a simple or composite silhouette contour) edge and a viewcell vertex.

In exemplary embodiments, for the terminology SV-ME Supporting Polygon, see SV-ME UBP.

In exemplary embodiments, for the terminology SE-MV Swept Polygon, see SE-MV UBP.

In exemplary embodiments, the terminology Higher-order UBP refers to a UBP constructed using a higher-order model of visibility propagation in polyhedral environments. This model accounts for portions of the light source (eg. viewcell) that may be occluded from an exposed silhouette edge. A higher-order UBP may more precisely approximate the actual umbra boundary in a region where the umbra boundary is actually formed by higher order (quadric) surfaces formed by edge-edge-edge (EEE) interactions. In the present method higher-order UBPs are constructed using the method of backprojection.

A higher-order UBP may be incident on a first-order silhouette edge, in which the higher-order UBP is called an adjusted UBP. Alternatively a higher-order UBP may be incident on a higher-order silhouette edge. The higher-order silhouette edge may be computed if the adjusted UBP violates local visibility.

In exemplary embodiments, the terminology backprojection refers to a determination of the portion of a viewcell (light source) visible from a silhouette edge. In the present method this determination employs the pivot and sweep method of PAU construction using a silhouette edge as a light source.

In exemplary embodiments, the terminology VSVV (Visible Supporting Viewcell Vertex) refers to a vertex determined for a mesh silhouette edge or edge segment: the supporting viewcell vertex that is actually visible from the edge. Determined by the method of backprojection. Used to construct adjusted SV-ME UBPs.

In exemplary embodiments, the terminology Visible Extremal Viewcell Contour refers to the extremal viewcell contour that is actually visible from an inside corner vertex of a mesh silhouette. Used to construct the swept polygons that are extended to form higher-order SE-MV UBPs.

In exemplary embodiments, the terminology Simple Silhouette Contour refers to a chain of silhouette edges connected by shared vertices belonging to a single mesh object. Also called a simple contour.

In exemplary embodiments, the terminology Compound Silhouette Contour refers to a chain of silhouette edges comprising silhouette edges connected by shared vertices or connected by vertices formed by the intersection of a wedge/UBP from one contour with a non-adjacent silhouette edge. In the study of smooth manifolds such an intersection is called a t-junction. (See Durand, Fredo PhD thesis University of Grenoble)

In exemplary embodiments, for the terminology T-Junction, also called a compound silhouette vertex (CSV), see Compound Silhouette Contour.

In exemplary embodiments, the terminology PAU (Polyhedral Aggregate Umbra) refers to a polyhedron forming the boundary of an umbra cast by one or more polygon mesh objects using the viewcell as a lightsource. The PAU is represented as a polygon mesh comprising UBPs and visible fragments of polygon mesh objects.

In exemplary embodiments, the terminology TRI-VC SHAFT (Triangle×Viewcell shaft) refers to a shaft (supporting shaft or convex hull) between a mesh triangle and a convex viewcell.

In exemplary embodiments, the terminology SEG-SILE SHAFT refers to a 2D shaft between a MSEGMENT and a silhouette edge. Used in 2D version of mesh traversal to find intersection of UBP with mesh polygons.

In exemplary embodiments, the terminology UBL (Umbra Boundary Line) refers to a 2D equivalent of UBP, formed between a vertex of a silhouette edge and a mesh silhouette vertex.

In exemplary embodiments, the terminology PLAU (Polyline Aggregate Umbra) refers to a 2D equivalent of PAU, restricted to the surface of a UBP.

In exemplary embodiments, the terminology viewcell silhouette contour refers to a Silhouette contour of the viewcell as viewed from some element of the triangle mesh.

In exemplary embodiments, polygon meshes can be represented as directed graphs. In Exemplary embodiments, the terminology mesh traversal refers to a traversal of such a graph is a procedure which visits the nodes of the graph. In exemplary embodiments, mesh traversal may follow a breadth-first order in which the edge-neighboring polygons are examined. Other traversal orders are possible.

In exemplary embodiments, for the terminology Supporting Viewcell Vertex, see SVV.

In exemplary embodiments, the terminology Supporting Viewcell Edge (SVE) refers to an edge of the viewcell which is parallel to corresponding mesh silhouette edge. Supporting polygon between the two edges is a quadrangle.

In exemplary embodiments, the terminology Visible Supporting Viewcell Edge (VSVE) refers to a portion of the SVE that is visible (unoccluded) from the entire corresponding silhouette edge.

In exemplary embodiments, the terminology SOSC (significantly occluding silhouette contour for a viewcell transition.

In exemplary embodiments, the terminology SESC refers to a significantly exposing silhouette contour for a viewcell transition.

In exemplary embodiments, the terminology silhouette contour- of a manifold mesh refers to a fold singularity of the manifold corresponding to a transition between visibility and occlusion. For a polyhedral manifold mesh the silhouette contour is piecewise linear, a polyline.

In exemplary embodiments, the terminology Cusp refers to a point singularity of a silhouette contour representing the terminus of a silhouette contour. Non-convex manifold meshes may have multiple cusps, each corresponding to the terminus of a silhouette contour.

In exemplary embodiments, the terminology CSV (Compound Silhouette Vertex) refers to the point of intersection of a wedge and a silhouette edge. For a first-order implementation the wedge is a first-order wedge and the silhouette edge is a first-order silhouette edge. In topological terms the CSV corresponds to a conservatively defined t-vertex of the from-region compound silhouette contour. Typically an inside corner of the compound mesh silhouette contour occurs at a CSV.

A much less common type of CSV can theoretically occur where a wedge intersects a silhouette vertex. This degenerate case can correspond to an outside corner of a compound silhouette contour.

Corresponds to a t-vertex.

In exemplary embodiments, the terminology Wedge refers to a triangle formed between a supporting vertex of a lightsource/viewcell and a silhouette edge (SE-MV wedge). When the silhouette edge is parallel to an edge of the lightsource/viewcell the wedge is formed between the silhouette edge and the supporting lightsource/viewcell edge. In this case the (SE-ME) wedge is quadrangular.

Wedges used in discontinuity mesh methods are not defined on segments which are occluded between the source and the silhouette. This type of wedge results in planar visibility event surfaces which are exact but which do not necessarily produce continuous umbra boundaries.

In contrast, first-order wedges are defined as an extension of the entire supporting triangle or quadrangle between the viewcell and the silhouette edge. The first-order wedge results in planar visibility event surfaces which may be exact or conservative but which always produces a continuous umbra boundary.

In further embodiments, a wedge is any desired polygon between the viewcell and a polygon mesh.

A wedge is different from a UBP (umbra boundary polygon) in that the extent of a wedge is limited only by intersection with a mesh polygon. The structure of a UBP is determined not only by intersection with mesh polygons but also by intersection with other UBPs. In fact a UBP is formed from a corresponding wedge which is intersected with other wedges and with mesh polygons to form the UBP. The set of UBPs for a manifold defines the umbra boundary of the manifold and is a subset of the wedges for the manifold.

The PAU can be constructed by forming the UBPs directly using wedge-wedge and wedge-mesh polygon intersections. In this case geometry inside a PAU is determined using a point-in-polyhedron test.

Alternatively, the PAU can be constructed indirectly, without wedge-wedge intersections, by traversing only the visible side of the wedge-polygon intersections. In this case geometry inside the PAU is determined using a wedge penetration test of a line between the geometry and the surface of the viewcell.

In exemplary embodiments, the terminology First-Order Visibility (also called first-order model of visibility propagation) refers to a model of from-region visibility propagation in which from-region umbral event surfaces are incident on (first-order) visible, first-order silhouette edges and are constructed (using the pivot and sweep method) which assumes that the entire view region (e.g., viewcell) is visible from the first-order silhouette edge.

In exemplary embodiments, the terminology Higher-Order Visibility refers to a model of visibility propagation which does not assume that the entire view region (e.g., viewcell) is visible from the edges of the model. Where the supporting viewcell element corresponding to a first-order silhouette edge (e.g., SVV or SVE) is not visible from the first-order edge then the corresponding first-order event surface is inexact. In this case a more precise from-region event surface can be constructed by backprojection: using the first-order silhouette edge as a source and determining the corresponding visible supporting viewcell element (vertex or edge). This backprojection process can employ the first-order model or may itself employ higher-order visibility (by finding the SVV of the source silhouette edge). By subdividing first order edges that are inexact and optionally allowing the silhouette contour to retract the process of backprojection produces an umbral event surface that, in the limit, converges on the exact quadric event surface.

In exemplary embodiments, the terminology backfacing refers to an orientation of a polygon. An oriented polygon has one front side and one back side. Each polygon is contained in a plane which also has a corresponding front side and back side. If a polygon is backfacing with respect to a point, then the point is on the back side of the polygon's plane. One test to determine if polygon is backfacing with respect to a point employs the equation of the polygon's plane.

The orientation of a plane is determined by its normal vector which is defined by the coefficients A, B, and C of the plane equation:

$$Ax+By+Cz+D=0$$

A point (xp, yp, zp) is on the back side of this plane if it satisfies the inequality:

$$A(xp)+B(yp)+C(zp)<0$$

Otherwise the point is on the plane or on the front side of the plane.

A polygon may also be oriented with respect to another polygon. If two polygons share an edge, then one method of determining their orientation is to select a vertex of polygon 2 that is not a vertex of the shared edge. Next, determine if the selected vertex is on the back side of the plane of polygon 1, in which case the two polygons are backfacing, otherwise they are front facing (or in the same plane). The aforementioned objects and advantages, as well as other objects and advantages, are achieved in accordance with the present embodiments which include a method of conservative, from-region visibility precomputation in which polygon fragments potentially visible from a polyhedral viewcell are determined by constructing a conservative, linearized, from-viewcell visibility map.

In one embodiment the mesh objects are comprised of closed manifold triangle meshes (in which each edge is shared by exactly two triangles) although embodiments using other polygon meshes are possible. The method also accommodates non-closed manifold polygon/triangle meshes in which each edge is shared by one or two triangles.

The conservative visibility map is constructed from the mesh triangles using conservative linearized umbral event surfaces (CLUES) which contain conservative from-viewcell umbral boundaries.

The CLUES, which are also called first-order wedges or simply wedges in this specification, are from-feature visibility event surfaces that are related to the wedges employed in discontinuity meshing methods; although they differ from discontinuity mesh wedges in important respects.

The CLUES are constructed on specific edges (and vertices of these edges) of the triangle meshes (called first-order silhouette edges) using a novel simplified model of visibility propagation in polyhedral environments called first-order visibility. The present invention includes methods for construction of first-order CLUES and for adaptively refining the first-order CLUES to produce more precise conservative linerarized umbral event surfaces. These refined CLUES reflect higher-order visibility effects caused when the entire viewcell is not visible from the supporting silhouette edge. These higher-order refined linear event surfaces tend to conservatively approximate the exact (often quadric) umbral boundaries using conservative polygonal surfaces that are much simpler to employ. According to some embodiments, refinement of the first-order event surfaces is conducted where the maximum deviation between the first-order event surface and the higher-order event surface exceeds a predetermined value.

In some embodiments, the refinement process is conducted by backprojection in which the silhouette edge supporting a CLUES is used as a lineal light source to determine the portion of the view/cell visible from the edge.

The first-order model of visibility propagation is based on the simplifying conservative assumption that if a silhouette edge is visible from a viewcell, then it is visible from all parts of the viewcell. This assumption leads to a simple definition of first-order silhouette edges as those edges for which one component triangle is backfacing for all points on the viewcell and the other component triangle is frontfacing for at least one point on the viewcell, and further that the component triangles are not facing each other. This definition is effectively identical to the definition of a from-point silhouette edge and reflects the fact that the first-order model effectively treats the viewcell as a viewpoint in some important respects.

One type of CLUES, called a source vertex-mesh edge, or SV-ME wedge, is constructed on first-order silhouette edges using a simple pivot from the edge to the supporting point of the viewcell. These SV-ME CLUES are analogous to from-point umbral boundary polygons that are used in shadow algorithms. Unlike from-point umbral boundary polygons, the SV-ME CLUES alone do not necessarily form a continuous umbral boundary surface on non-convex manifolds.

In the first-order method, a second type of CLUES (called a source edge-mesh vertex, or SE-MV wedge) is constructed which join the aforementioned SV-ME wedges (constructed by pivot) into a continuous umbral event surface. This second type of CLUES is formed by a sweep operation at an inside corner mesh silhouette vertex where the previously described SV-ME type of wedge from adjacent silhouette edges do not otherwise form a continuous umbral event surface. In such a case the SV-ME wedges incident on adjacent first-order silhouette edges are connected to form a continuous umbral event surface by the SV-ME wedges incident on the connecting inside corner mesh silhouette vertex.

SE-MV wedges are constructed from supporting polygons formed by a sweep operation anchored at the inside corner mesh silhouette vertex and sweeping across edges of the viewcell which are silhouette edges when viewed from the inside corner mesh silhouette vertex. The inside corner mesh silhouette vertex may be a vertex of a simple silhouette, formed by connected first-order silhouette edges. Alternatively the inside corner mesh silhouette vertex may be a compound silhouette vertex (CSV) formed where a first-order wedge intersects another silhouette edge. These correspond to t-vertices of the from-region visible manifold and typically correspond to quadric event surfaces when using exact from-region visibility solutions. By constructing SE-MV wedges on the CSVs, the present method insures that a continuous, conservative, linearized from-region umbral event surface is generated which reflects the intrinsic occluder fusion of a compound silhouette contour but without using quadric surfaces.

Table Ib shows the four types of visibility event surfaces as employed in the method of complete discontinuity meshing also shown in Table Ia. In table Ib the visibility event surfaces of the present invention, CLUES, are also presented and compared to the visibility event surfaces employed in complete discontinuity meshing. Note that the Jenkins Nomenclature does not include quadric (EEE) surfaces since, in the visibility propagation model of the present invention, these quadric surfaces are replaced with SV-ME and SE-MV planar surfaces in the first-order version of the method and backprojection SV-ME/SE-MV using higher-order refinement embodiment of the method.

TABLE Ib

Nomenclature of From-Region Visibility Event Surfaces

| Visibilty Event Surface | Drettakis et al. Naming | Jenkins CLUES Nomenclature |
|---|---|---|
| Planar Event Surface Containing a Feature of the Emmitter/Viewcell/Source | E-EV (Emitter-Edge Vertex) | SV-ME (Viewcell Vertex - Mesh Edge) SE-MV (Viewcell Edge - Mesh Vertex) SE-ME (Viewcell Edge - Mesh Edge) (Special Case) |
| Planar Event Surface Not Containing a Feature of the Emitter/Viewcell/Source | NonE-EV | Backprojection SV-ME Backprojection SE-MV Backprojection SE-ME |
| Quadric Event Surface Containing a Feature of the Emitter/Viewcell/Source | Emitter-EEE, $E_eEE$ | Approximated By Backprojection Event Surfaces |
| Quadric Event Surface Not Containing a Feature of the Emitter/Viewcell/Source | Non-EmitterEEE | Approximated By Backprojection Event Surfaces |

In one embodiment, the construction of the from-viewcell visibility map using CLUES can employ the prior-art methods of discontinuity mesh construction in which the CLUES are substituted for the linear and quadric "wedges" that are used in discontinuity meshing. This embodiment is not optimal since the discontinuity meshing approach is not output-sensitive. In the prior art method of discontinuity meshing, event surfaces are generated on all silhouette edges even though many of these silhouette edges may be occluded from the viewcell. In this approach, the visibility of the discontinuity mesh regions is determined after all of the discontinuity mesh regions have been constructed. For densely occluded environments many of these constructed regions are completely occluded from the viewcell. As a result, the complexity of the arrangement of the discontinuity mesh regions can be much higher than the complexity of the visible component of the discontinuity mesh (which corresponds to the visibility map).

In another embodiment, the CLUES are used to construct the actual from-viewcell umbra volumes, called polyhedral aggregate umbrae (PAU), which are comprised of the CLUES and the unoccluded mesh triangle fragments. The purpose of the method is to determine only the unoccluded mesh triangle fragments (which comprise the potentially visible set or PVS). The construction of the entire PAU (which requires potential intersection of all of the CLUES) is typically not necessary to determine the unoccluded triangle mesh fragments. Instead, the unoccluded mesh triangle fragments can be more efficiently determined by the direct construction of a from-region visibility map.

Therefore, the present invention includes an output-sensitive method of conservative linearized visibility map construction, which is based on the traversal of triangle mesh 2-manifolds (embedded in R3). In this method, a breadth-first traversal of the unoccluded triangle mesh manifolds is conducted. Traversal of a triangle is suspended if any potentially occluding triangles (those triangles in the shaft between the triangle and the viewcell) have not been traversed and the traversal is jumped to the closer, unprocessed triangles. This approach enforces a front-to-back order. Manifold mesh traversal proceeds to the silhouette contours of the mesh or to from-viewcell occlusion boundaries. The from-viewcell silhouette contours are treated as the catastrophic visibility event curves of the manifold. At these contours, the corresponding CLUES are constructed and cast into the environment to determine their intersection with the mesh triangles. This casting is itself an on-surface (e.g., on wedge) visibility problem encountered in discontinuity meshing and has previously been solved using conventional techniques such as Weiler-Atherton algorithm, which is not output-sensitive. Alternatively, the present method includes a technique in which this on-wedge visibility problem is solved using a simplified version of the 2-manifold traversal (now being described) applied to the 1-manifolds encountered in the on-wedge or on-CLUES visibility problem. For simplicity, the present specification frequently uses the terms wedge, first-order wedge, and CLUES interchangeably, although it is shown that the first-order wedge, which is used in the present method, differs in important respects from the wedge constructed in the prior-art method of discontinuity meshing.

The on-wedge visible intersections of the umbral event surfaces and the manifold mesh triangles correspond to the segments of the from-viewcell umbral discontinuity mesh but may not be actually segments of the corresponding from-viewcell visibility map occlusion boundaries. This is because a wedge represents the visibility of triangle segments from a specific feature (vertex or edge) of the viewcell, not necessarily an umbral boundary from the entire viewcell. In one embodiment of the present method, each umbral discontinuity mesh segment is tested to determine if it is a from-viewcell occlusion boundary at the time it is constructed.

By enforcing a front-to-back processing order and constructing occlusion boundaries when they are encountered, the mesh traversal largely avoids the traversal of occluded triangles and thereby tends to achieve output-sensitive performance. In this output-sensitive method, the manifold traversal effectively cascades off the silhouette contours, flowing onto other manifolds intersected by the occlusion boundaries corresponding to visibility event surfaces. Traversal is continued only on the unoccluded side of an occlusion boundary in a manner that realizes an output-sensitive visibility cascade.

The resulting output-sensitive performance is achieved at the cost of having to test each unoccluded mesh element for unprocessed, potentially occluding elements using a triangle-viewcell shaft. In the present method, the cost of these shaft inclusion tests is greatly reduced by employing a hierarchical spatial subdivision and intersecting the shaft with these hierarchical containing structures. This results in an overall cost for all shaft inclusion tests that tends towards O(N Log(M)), where N is the number of visible mesh elements traversed and M is the average number of potentially occluding mesh elements.

Mesh polygons are processed by mesh traversal initiated at strongly visible polygon fragments and continuing traversal to either a) origin of the conservative linearized umbral boundary wedges at silhouette edges or b) intersection of the wedges (forming a true from-viewcell occlusion boundary) with the mesh polygons. To insure proper depth order the mesh traversal algorithm identifies any unprocessed, potentially occluding mesh elements and immediately shifts mesh traversal to the closer untraversed elements. Ambiguous depth-order between mesh elements is detected by maintaining a directed graph representing the triangle overlap relationships and identifying cycles in this graph using a linear-time algorithm such as Tarjan's algorithm. Where cycles exist the triangles in the viewcell-triangle shaft of the offending triangle are intersected with the shaft to identify portions of these overlapping triangles that are completely within the shaft. These components cannot form a cycle with the offending triangle since they are completely within the shaft. Reinitiating the traversal using these components breaks the cycle.

By enforcing a front-to-back traversal of meshes, terminating traversal at occlusion boundaries, and employing hierarchical spatial subdivision, the algorithm is designed to achieve output sensitive performance even for densely occluded environments.

One advantage of the mesh traversal/visibility map construction method is that it is more efficient at identifying occlusion than algorithms such as Volumetric Visibility, Extended Projection, and Weiler-Atherton. All of these other methods depend on large convex occluders which are unusual in realistic models. For example, the Weiler-Atherton algorithm, which is a from-point visibility algorithm, can combine the occlusion of connected polygons (a process they call consolidation) only if the connected polygons form a convex polyhedra. Likewise, the Volumetric Visibility (Schuaffler et al. 2000) method depends on simple shafts formed between the viewcell and a single convex box shaped blocker that is inside the actual occluder. If the actual occluder is concave and or has topological holes then it can be difficult to identify such a simplified convex blocker that accurately represents the occlusion of the actual occluder.

In contrast, the present invention does not depend on the presence of convex occluders, but rather directly exploits the occlusion coherence inherent in the connectivity of a manifold mesh, irrespective of the mesh's shape.

The present method includes a technique of determining the "effective static occlusion" (ESO) of occluded regions of the visibility map. The effective occlusion of a region is a ratio reflecting the number and surface area polygons occluded in an occlusion region divided by the additional geometry created during the remeshing caused by the region.

The precision of the visibility maps produced by the present method can be decreased by a conservative convex simplification of the silhouette contours employed. This can be useful when the occlusion boundary surrounding an occluded visibility map region contains too much detail, especially if the effective occlusion of the region is low. The effective static occlusion is used as a heuristic to control the simplification of the silhouette contours and therefore the precision of the corresponding visibility map/PVS.

The precision of the visibility map can also be selectively increased, using the backprojection approach to higher-order refinement previously discussed. The control of this adaptive refinement toward the exact quadric event surfaces is also determined, in part, by the ESO metric.

Storage requirements are reduced by using an intermediate delta-PVS representation wherein important silhouette edges, those which produce significant occlusion or exposure, are identified during the precomputation by identifying the corresponding regions of coherent occlusion or exposure.

The present invention includes a method of directly identifying the polygons or polygon fragments of a model that are exposed or occluded during a specific viewcell transition. The list of newly visible polygons or polygon fragments for a viewcell transition is called the deltaG+ submesh. The list of newly occluded polygons or polygon fragments for a viewcell transition is called the deltaG− submesh.

The present invention includes a method of identifying coherent regions of newly occluded and newly exposed regions for a viewcell transition by computing the visibility maps for each viewcell and traversing the resulting visibility map for one viewcell to the occlusion/exposure boundaries of the other viewcell. This approach is used to identify connected regions of exposure/occlusion. The effective occlusion of these regions is measured using the same approach as the effective static occlusion previously described. In the case of these deltaG regions, the effective occlusion is called the effective dynamic occlusion (EDO). The EDO is used to identify regions of coherent effective differential visibility.

The visibility PVS data for one viewcell can be generated, in the usual way, from an existing PVS and the stored deltaG+ and deltaG− data for the viewcell transition.

Alternatively, silhouette contours which form such regions of high EDO are identified and labeled during an offline precompute phase. These labeled silhouette contours are the basis of an intermediate representation of the delta-PVS which substantially reduces the storage requirements compared to directly storing all deltaG+ and deltaG− submesh data for each viewcell transition.

In this intermediate visibility map/PVS representation, the dynamically exposing or dynamically occluding silhouette contours (bounding regions of high EDO) are labeled. The regions of coherent, high EDO are identified, in an offline preprocess, using a simple traversal of a unified visibility map which contains occlusion boundaries for both viewcells of a particular transition.

The silhouette labels are stored with the triangle mesh data along with occlusion boundary intersection hints for each viewcell transition. The occlusion boundaries are boundaries of the from-region visibility map produced by the umbral event surfaces incident on a labeled silhouette contour. Both the labeled silhouette contour and the corresponding occlusion boundary form polylines. The complete silhouette contour (and corresponding occlusion boundaries) can be constructed at runtime from a few labeled silhouette edges (and corresponding occlusion boundary segments) using simple algorithms for finding connecting silhouette edges and polygon-polygon intersections.

According to some embodiments, for simple silhouette contours, an entire labeled silhouette contour can often be stored by labeling only a single starting edge of the contour. The remaining connecting first-order silhouette edges that form the contour can be rapidly identified at runtime. This scheme makes the intermediate representation using labeled silhouette contours very storage efficient.

According to some embodiments, for compound silhouette contours (formed where the umbral event surfaces incident on one simple silhouette contour intersect another silhouette contour) the storage scheme is similar except that the compound silhouette vertices (CSVs) representing the intersection points of the simple contours are also stored.

Using the intermediate representation, the visibility map/PVS for one viewcell can be generated from the visibility map of a previously constructed, parent (containing) viewcell using a simplified traversal. This traversal of a parent visibility map proceeds to labeled occluding silhouette contours which support umbral event surfaces that produce new occlusion boundaries which effectively bypass newly occluded mesh elements. This approach obviates the need for storing deltaG− information and deltaG+ information for viewcell transitions between child viewcells having a common parent. This method of incrementally generating visibility map/PVS at runtime using only labeled significantly occluding silhouette contours is particularly useful in a distributed client-server implementation, since the client can use it to remove newly occluded geometry for a viewcell transition without receiving explicit deltaG− information from the server.

In addition to being used to directly generate the visibility map/PVS for a viewcell, the labeled silhouette contours can also be used to generate delta-PVS data when needed. Using this approach, according to some embodiments, the delta-PVS data (e.g., deltaG+ and deltaG− submesh data) is not stored but generated when needed using the labeled silhouette contour information, an existing visibility map, and (for deltaG+ submesh data) a superset of the current visibility map/PVS that is guaranteed to contain the newly visible geometry for a viewcell transition. In some embodiments, the latter superset information can be provided as stored deltaG+ submesh data for a parent viewcell that contains the child viewcells for which the specific parent-to-child viewcell transitions occur.

Using these three data sets, the parent-to-child deltaG+ and deltaG− data for a specific viewcell transition is generated by a simplified traversal of a previously constructed visibility map corresponding to a parent viewcell. The labeled silhouette contours (and associated occlusion boundary hints) are used to quickly construct the visibility map/PVS of the child viewcell from that of the parent. Alternatively, the deltaG+ and deltaG− data can be explicitly generated by traversal of the newly exposed and newly occluded regions respectively. The latter method is useful in a client-server implementation in which the server is a visibility event server which delivers deltaG+ and/or deltaG− submesh data to the client using navigation-based prefetch.

Alternatively, only the deltaG+ data for a viewcell transition may be stored explicitly, and the deltaG− data generated by the simplified traversal of a parent viewcell. In this implementation, a simplified (and fast) traversal of a parent visibility map proceeds to labeled occluding silhouette contours which support umbral event surfaces that produce new occlusion boundaries which effectively bypass newly occluded mesh elements.

This delta-PVS method represents an efficient codec for visibility-based streaming of out-of-core geometry and texture information in which the dynamic occluding or exposing silhouette contours (for the viewcell-to-viewcell transitions) are identified and labeled in an off-line, precomputed encoding; and the resulting labeled contours, along with other hint information, are used to rapidly construct a PVS/visibility map (or deltaG submesh data) from an existing PVS/visibility map at runtime. This codec allows for a distributed client-server implementation in which the storage/transmission costs can be selectively decreased at the expense of increased runtime compute costs.

In addition, a perception-based encoding strategy is used to encode low level-of-detail (LOD) geometric and texture information during periods when the deltaG+ submesh information is not delivered to the client in time to generate a complete PVS for the current viewcell/viewpoint. This strategy exploits the fact that the human visual system cannot fully resolve information that it presented to it for less than approximately 1000 milliseconds. This approach allows a relatively perceptually lossless performance degradation to occur during periods of low spatiotemporal visibility coherence: a situation which challenges the performance of both the codec and the human visual system in similar ways.

Details of this codec and its use in a client-server method streaming content delivery employing navigation-based prefetch are disclosed in the specification.

Table Ic summarizes a number of the prior-art methods of PVS determination and shadow calculation which employ the various visibility event surfaces characterized in Table Ia. The last row of the table includes the current method of from-viewcell delta-PVS determination using the methods of the present invention including first-order and higher-order conservative, linearized, umbral event surfaces (CLUES).

contrast, the first-order model of considers visibility event surfaces which arise as a result of visibility interactions between pairs of edges. Using the methods disclosed herein, first-order visibility model produces continuous, conservative umbral event surfaces which can be used to construct conservative from-viewcell visibility maps and related from-viewcell potentially visible sets (PVS).

The first-order model of visibility propagation is based on the simplifying conservative assumption that if a silhouette edge is visible from a viewcell then it is visible from all parts of the viewcell. This assumption leads to a simple definition of first-order silhouette edges as those edges for which one component triangle is backfacing for all points of the viewcell and the other component triangle is frontfacing for at least one point of the viewcell, and further that the component triangles are not facing each other. This definition is effectively identical to the definition of a from-point silhouette edge and reflects the fact that the first-order model treats the viewcell as a viewpoint in some important respects.

In first-order visibility, any segment of a silhouette edge is assumed to be either completely occluded from the viewcell or completely visible from the viewcell (visible from all parts of the viewcell). That is, in first-order visibil- TABLE Ic PVS and Shadow Methods

| Method | Purpose | Model | Umbral Event Surfaces | Solution Space | PVS Precision |
|---|---|---|---|---|---|
| Teller(1992) | PVS | BSP/Portals | E-EV, NonE-EV | Object | Cell-to-Object |
| Carmack(1996) | PVS | BSP/Portals | E-EV | Object | Cell-to-Cell |
| Chin-Feiner | Shadow | General 3D | E-EV | Object | NA |
| Koltun(2000) | PVS | 2.5D | E-EV, NonE-EV | Object | Cell-to-Object |
| Discontinuity Mesh, Drettakis (1994) | Umbra & Penumbra Shadows | General 3D | E-EV, NonE-EV, E-EEE, NonE-EEE | Object | NA |
| Extended Projection Durand(2000) | dPVS | Convex Occluders (Non-Convex = Special) | E-EV (Effectively Sampled on Planes) | Image | Cell-to-Polygon |
| Volumetric Visibility Schauffler (2000) | PVS | 2.5D Voxelized | E-EV (Approximate) | Object | Cell-to-Cell |
| Shrunk Occluders Wonka(2000) | PVS | 2.5D | All (Sampled, Approximated) | Image | Cell-to-Object |
| Vlod Chhugani(2005) | d-PVS & Streaming | Simple 3D Occluders, Genus 0 | E-EV (Approximated, Sampled) | Object/ Image | Cell-to-Polygon |
| Exact From-Viewcell Nirenstein (2005), Bittner (2002) | PVS | General 3D | All Exact | 5D Line Space | Cell-to-Polygon |
| CLUES Jenkins (2010) | d-PVS & Streaming | General 3D | E-EV, NonE-EV, E-EEE (linearized approximation) | Object | Cell-to-Polygon Fragment |

Theory of Operation: Model of First-Order Visibility Propagation

According to some embodiments, the present method from-region visibility precomputation uses from-region visibility surfaces that are constructed using a simplified, conservative model of visibility propagation called first-order visibility.

The exact visibility in polyhedral environments is dominated by quadric visibility event surfaces which arise as a result of visibility interactions among triples of edges. In ity, if a silhouette edge is visible from any part of the viewcell, it is assumed to be visible from all parts of the viewcell.

The first-order model does not account for the effects of varying occlusion along a silhouette edge segment that is caused by an edge intervening between the silhouette edge and the viewcell to produce a quadric triple edge (or EEE) visibility event surface. Instead the first-order visibility model produces planar visibility event surfaces which either correspond to the exact, planar from-region umbral event surfaces or conservatively lie within the exact quadric from-region umbral boundaries, which are often quadric surfaces. The first-order model of visibility propagation employs only planar visibility event surfaces that arise from visibility interactions between pairs of edges. Further, often the first-order, planar visibility event surfaces are very close to the exact event surfaces, which may be quadrics, and in many cases the first-order event surfaces are the exact from-region visibility (umbra) boundaries.

According to some embodiments, first-order visibility event surfaces are generated using a simple pivot and sweep algorithm. In one embodiment, the viewcell is assumed to be convex. This assumption simplifies the pivot and sweep construction method. Alternate embodiments of the pivot and sweep method allow construction of first-order visibility event surfaces from a non-convex viewcell. Any non-convex viewcell can be decomposed into convex components for example by tetrahedralization.

In some embodiments, first-order mesh silhouette edges, which give rise to the first-order visibility event surfaces, are identified using three criteria. In some embodiments, first-order silhouette edges are defined as those edges of a manifold triangle mesh which pass the following tests:

1) one triangle sharing the edge is back facing for all vertices of the viewcell, 2) the other triangle sharing the edge is front facing for at least one of the vertices of the viewcell, 3) the component triangles sharing the edge are backfacing with respect to each other.

The first-order conservative linearized umbral event surfaces (CLUES), also called wedges, are of two types. In some embodiments, the viewcell is also conceptually treated as a "source" or lightsource.

According to some embodiments, one type of wedge is formed by a vertex of the viewcell and a first-order silhouette edge of the mesh (SV-ME). Another type of wedge is formed by an edge of the viewcell and an inside-corner silhouette vertex of the mesh (SE-MV). The SV-ME type is discussed first.

According to some embodiments, to construct a SV-ME wedge, the supporting triangle between a first-order silhouette edge and the viewcell is identified. This triangle is formed between the silhouette edge and a specific vertex of the viewcell called the supporting viewcell vertex (SVV). The supporting viewcell vertex corresponding to a first-order silhouette edge is identified by testing the angle between the backfacing triangle of the edge, and the triangles formed between each viewcell vertex and the silhouette edge. The vertex which produces a vertex-edge triangle forming the smallest angle with the backfacing triangle (i.e., most negative cosine value) is the first vertex encountered in a "pivot" of the plane of the backfacing triangle through the silhouette edge. This viewcell vertex is the supporting viewcell vertex for the corresponding mesh silhouette edge.

The first-order wedge incident on the first-order mesh silhouette edge is formed by the edge itself and two other edges, each of which is a line through a vertex of the edge and the supporting viewcell vertex (SVV) corresponding to the silhouette edge. These two edges extend semi-infinitely from the SVV, through the silhouette vertices in the direction away from the viewcell source. This wedge can be seen as an extension of the supporting triangle formed between the silhouette edge and the corresponding supporting viewcell vertex (SVV). As previously indicated, since this type of wedge is formed from a silhouette edge of the mesh and a vertex of the viewcell, it is called a SourceVertex-MeshEdge (SV-ME) wedge.

A degenerate case may occur in which the pivot from the mesh silhouette edge to the viewcell encounters two or more supporting viewcell vertices (SVVs) producing the same pivot angle. This occurs when an edge of the viewcell containing the SVV(s) is parallel to the mesh silhouette edge. In this case, the supporting triangle between the mesh silhouette edge and the viewcell is actually a supporting quadrangle. The present method handles this degenerate case by constructing a special SE-ME wedge.

In some embodiments, the pivot operation produces a SV-ME wedge for each mesh first-order silhouette edge. However, the visibility event surface at the shared vertex of two first-order silhouette edges is not necessarily completely defined entirely by the intersection of the two adjacent SV-ME wedges. While adjacent SV-ME wedges always intersect at the shared silhouette vertex, at inside corners of the silhouette contour these SV-ME wedges can intersect only at the single point shared by their two supporting silhouette edges. In this case, their intersection does not form a continuous umbral surface across the portion of the silhouette contour. The structure of the visibility event surface spanning the silhouette contour at the shared silhouette vertex depends on how the adjacent SV-ME wedges intersect.

According to some embodiments, a conceptual reverse sweep operation can be used to determine whether adjacent SV-ME wedges intersect to form a continuous umbra surface. A reverse sweep operation in which a line segment anchored at the SVV is swept along the corresponding mesh silhouette edge from vertex to vertex generates the same supporting triangle formed in the previously described pivot operation. Conceptually, however the reverse sweep operation can be used to identify discontinuities of the visibility event surface that may occur at the shared vertex of adjacent silhouette edges.

If two adjacent mesh silhouette edges form an "outside corner" or convex corner of a mesh manifold, then such a reverse sweep operation would not encounter any restriction to the sweep (i.e., occlusion) at the shared vertex. Consequently, the SV-ME wedges corresponding to the adjacent "outside corner" silhouette edges will intersect to form a continuous visibility event surface which spans the two silhouette edges. SV-ME wedges incident on adjacent outside corner first-order silhouette edges will intersect to form such a continuous visibility event surface even if the supporting triangles for the adjacent silhouette edges pivot to different SVVs on the viewcell.

Conversely, if two adjacent mesh silhouette edges form an "inside corner" or non-convex corner of a mesh manifold, then the SV-ME wedges incident on these two edges may not intersect at the shared silhouette vertex in such a way as to form a continuous visibility event surface which spans the adjacent mesh silhouette edges. Supporting polygons corresponding to adjacent "inside corner" silhouette edges may pivot to different SVVs on the viewcell. In such a case, the adjacent SV-ME wedges will still intersect at the shared silhouette vertex but their intersection will not form a continuous visibility event surface spanning the adjacent silhouette edges. A reverse sweep operation anchored at the SVV and sweeping through the silhouette edge would encounter a restriction (occlusion) at such an inside corner vertex. This restriction results in a discontinuity in the visibility event surface formed by the adjacent inside corner SV-ME wedges.

The continuous visibility event surface at such an inside corner can be constructed by reversing the previously described reverse sweep operation at the inside corner. The sweep is now anchored at the shared inside corner mesh silhouette vertex and sweeping occurs along the silhouette edges of the viewcell, edges which are from-point silhouette edges with respect to the inside corner mesh silhouette vertex, starting at the SVV for one of the mesh silhouette edges and ending at the SVV for the neighboring mesh silhouette edge. Each swept viewcell silhouette edge forms a swept triangle with the inside corner vertex. The edges of this triangle, extended through the corresponding mesh silhouette edge, defines a wedge. Since such wedges are formed from an edge of the viewcell and a vertex of the mesh they are called SE-MV wedges. Such a sweep operation conducted along the (from-point) silhouette contour of the viewcell will produce a set of SE-MV wedges that form a continuous visibility event surface which connects the (otherwise disconnected) SV-ME wedges of the adjacent mesh silhouette edges.

Conceptually, then, when the conceptual reversed sweep operation anchored at the SVV encounters a restriction (occlusion) at an inside corner of a first-order silhouette contour, the reversed sweep operation is reversed. This reversal produces the actual sweep operation which constructs the swept triangles and the corresponding SE-MV wedges that form a continuous visibility event surface (first-order umbral event surface) which connects the SV-ME wedges from the adjacent first-order mesh silhouette edges. This sweep operation generates SE-MV wedges that are incident on a vertex of the mesh silhouette contour and which reflect a visibility event boundary that is primarily determined by a combination of "occlusion" at the silhouette edges, reflected in the SV-ME wedges, and containment of the viewpoint on the viewcell surface, reflected in the SE-MV wedges incident on the silhouette vertex.

It should be noted that, for a convex viewcell, two paths of connected viewcell silhouette edges will generally connect one SVV to the other. Only one of these paths will sweep out a chain of SE-MV wedges that connect the adjacent SV-ME wedges to form a continuous visibility event surface having a consistent face orientation. In some embodiments, this particular path is called the supporting viewcell silhouette contour (SVSC). A test do identify the SVSC is presented elsewhere in this specification.

According to some embodiments, for the construction of first-order wedges, the conceptual reverse sweep operation which would detect an occlusive restriction to visibility at the inside corner mesh vertex can be replaced by another test. This test involves comparing the normals of the adjacent mesh silhouette edges. If the two connected mesh silhouette edges have their normals oriented such that they are mutually front facing, then the shared vertex is called an outside corner of the mesh.

According to some embodiments, when an inside corner mesh silhouette vertex is encountered, then the first-order wedges through this vertex are generated by the sweep operation, wherein the sweep is anchored at the inside corner mesh silhouette vertex is swept along the supporting viewcell silhouette contour (SVSC), from the SVV corresponding to one silhouette edge to the SVV corresponding to the other silhouette edge, generating SE-MV wedges.

The sweep operation to generate SE-MV wedges is conducted only at inside corners of the silhouette contour. Conducting this sweep at outside corner silhouette vertices would generate superfluous SE-MV wedges that intersect the adjacent SV-ME wedges only at the silhouette vertex and therefore, they do not contribute to the continuous umbral event surface of the supported silhouette contour.

As previously described, SE-MV wedges may arise at an "inside corner" of the silhouette contour formed by connected silhouette edges of a single mesh, called a simple contour. More generally, SE-MV wedges may be incident on any "inside" or non-concave edge of a polyhedral aggregate umbra (PAU) surface. Such "inside corner" features can also be formed where the wedge from two silhouette contours (belonging to the same mesh or different meshes) intersect. The intersection of a wedge from one contour with a non-adjacent silhouette edge is called a composite or compound silhouette vertex (CSV). In the study of smooth manifolds such an intersection is called a t-junction. At a t-junction intersection, the wedge of one silhouette edge intersects a non-adjacent silhouette edge (from the same or different contour). This t-junction intersection generally occurs in such a way that the intersecting SV-ME wedges do not intersect with each other at the t-junction to form a continuous event surface. The resulting degenerate point of intersection of the two SV-ME wedges at a first-order silhouette edge represents an CSV.

At such CSV's the present method employs the same sweep operation previously described, anchored now at the CSVs to generate the set of SE-MV wedges that connect the otherwise disjoint SV-ME wedges into a continuous, conservative umbral event surface. As will be discussed in detail in another part of this specification, in general the exact umbral event surface is a higher-order surface (e.g., a quadric). The present invention includes a method of conducting the previously described sweep operation on CSVs in such a way that the constructed wedges conservatively approximate the actual higher-order surfaces incident on the CSV.

Theory of Operation: Relationship Between First-Order Visibility Event Surfaces and the Supporting Hull According to some embodiments, the first-order model of visibility propagation employs a new geometric construct which is referred to as the supporting hull.

According to some embodiments, the supporting hull between a polyhedral viewcell and a polyhedral mesh object is a polyhedral volume that contains all of the possible sight lines between the viewcell and the mesh object. The supporting hull is a polyhedron bounded by the supporting polygons between the viewcell and the mesh object. If the viewcell and the mesh object are both convex, then the supporting hull is identical to the convex hull and it can be constructed using familiar gift wrapping algorithms (O'Rourke, Computational Geometry in C Second edition Cambridge University Press 1998). In some embodiments, if the viewcell is convex but the mesh object is not necessarily convex, then the supporting polygons can be formed using the following algorithm.

Identify each first-order, from-region silhouette edge of the mesh object as those edges which have one component triangle that is backfacing for all vertices of the viewcell and the other component triangle that is frontfacing for at least one vertex of the viewcell, and for which the component triangles are backfacing with respect to each other. For each of these first-order silhouette edges, construct the supporting polygon incident on the edge by pivoting from the edge, in the direction of the normal of the backfacing component triangle, to the vertex of the viewcell which forms the smallest pivot angle. This vertex, called the supporting viewcell vertex or SVV, together with the endpoints of the first-order silhouette edge, form the supporting polygon (generally a triangle) incident on the silhouette edge. This type of supporting polygon is called a SV-ME (source vertex-mesh edge) supporting polygon.

If this viewcell vertex happens to be the endpoint of a viewcell edge that is parallel to the mesh object silhouette edge, then the pivot will encounter two viewcell vertices forming the same angle. In this case, the supporting polygon is a quadrangle formed by the viewcell edge and the mesh object silhouette edge (i.e., an SE-ME supporting polygon). All of the supporting polygons which contain an edge of the mesh object and a vertex of the viewcell are formed by pivoting to the supporting viewcell element.

If adjacent mesh object silhouette edges produce supporting polygons which pivot to the same viewcell vertex then the supporting polygons intersect at the common edge formed by this vertex and the shared mesh object silhouette vertex. In this case, the supporting hull at the mesh object silhouette vertex is completely defined by these two supporting polygons. Adjacent mesh object silhouette edges may also produce supporting polygons which pivot to different vertices of the viewcell. In this case the two supporting polygons do not form a continuous surface at the mesh silhouette vertex. To close the supporting hull surface at this vertex, one or more supporting polygons are constructed between the mesh silhouette vertex and specific edges of the viewcell. This construction proceeds by the previously described "sweep" operation: sweeping along the chain of viewcell silhouette edges between each of the viewcell silhouette vertices to which the adjacent mesh silhouette edges has pivoted. During this sweep, a supporting polygon is formed from each of these viewcell silhouette edges and the mesh silhouette vertex. This construction can be seen as a "sweep" of the viewcell silhouette edge chain such that a swept polygon is generated for each viewcell silhouette edge. In general, the sweep between two viewcell vertices can take more than one path, but only one path will sweep out a set of polygons which connect the two original supporting polygons to form a continuous surface with a consistent face orientation. This path is the supporting viewcell silhouette contour (SVSC).

This algorithm produces a continuous polygonal surface which envelopes or supports both the mesh object and the viewcell. In some embodiments, if both the viewcell and the mesh object are convex the supporting polygons constructed by this algorithm intersect only at their edges and form the convex hull of the viewcell and the mesh object.

If the viewcell is non-convex, then the from-point silhouette contour of the viewcell, as seen from an inside corner vertex of a manifold mesh first-order silhouette, may be a complex contour containing cusps and t-vertices. If the mesh object is also non-convex then the supporting polygons may intersect in their interiors.

However, if the viewcell is restricted to be a convex polyhedron, then the from-point silhouette contour of the viewcell (viewed from an inside corner mesh silhouette vertex) is always a simple contour, without cusps or t-vertices. Consequently, when the viewcell is convex, the sweep operation on the viewcell contour is substantially simplified. According to some embodiments, the sweep operation is substantially simplified by restricting the viewcells to be convex polyhedra.

A first-order wedge incident on a first-order mesh silhouette edge is the extension of the corresponding supporting polygon which is formed between the same mesh silhouette edge and a supporting viewcell vertex (SVV). This type of wedge is constructed from the mesh silhouette edge (i.e., a line segment) and the two extended lines of the supporting polygon that intersect the mesh silhouette edge. Consequently, the wedge, as initially constructed, tends to extend semi-infinitely away from the viewcell, until it intersects a mesh polygon. This type of wedge is formed from the extension of a SV-ME supporting polygon and is called a from a SV-ME wedge.

A first-order wedge incident on a first-order mesh object silhouette inside corner vertex is the extension of the swept triangle (i.e., the SE-MV supporting polygon formed between the mesh silhouette vertex and an edge of the viewcell silhouette contour). This type of wedge is constructed from the mesh silhouette vertex and the two lines of the supporting polygon that intersect this vertex. These two lines are extended semi-infinitely away from the viewcell to form boundaries of the SE-MV wedge. Consequently, the wedge tends to extend semi-infinitely away from the viewcell, until it intersects a mesh polygon. Since this type of wedge is formed from a source (i.e., viewcell) edge and a mesh vertex, it is called a SE-MV wedge.

SE-MV supporting polygons that are incident on an outside corner vertex of a mesh silhouette contour are actual bounding polygons of the supporting hull between a convex viewcell and the mesh silhouette. However the extension of such supporting polygons would produce a SE-MV wedges that intersects the first-order umbral event surface tangentially, only at the point of the outside corner silhouette vertex. Consequently such wedges would not contribute to the first-order umbral event surface/volume and need not be constructed.

A special case occurs in which the first-order mesh silhouette edge pivots to (i.e., is supported by) a SVV which is a vertex of a viewcell edge that is parallel to the mesh silhouette edge. In this case the supporting polygon between the mesh silhouette edge and the viewcell edge is quadrangular. Such a supporting polygon and its corresponding umbral event wedge are called SE-ME supporting polygons, wedges. Embodiments include a method of explicitly identifying SE-ME wedges. Identifying SE-ME wedges is useful because unlike the other types of wedges, finding on-wedge visible intersections for SE-ME wedges is itself a from-region (from-segment) visibility problem. The SE-ME on-wedge visibility solution is somewhat more complex than the from-point, on-wedge visibility solutions used for SV-ME and SE-ME wedges.

The preceding description of the supporting hull between a mesh object, and a viewcell assumed that the supported first-order silhouette contours of the mesh object are simple contours in which each contour is a polyline. In fact, any first-order from-region silhouette contour may actually be a compound contour, in which the entire contour is formed by intersecting contours. The contours intersect where a wedge from one contour intersects another contour (i.e., first-order silhouette edge). This intersection occurs at a compound silhouette vertex (CSV). When higher-order interaction of edge triples is considered, these CSVs in general correspond to quadric surfaces. The present method of pivot-and-sweep construction based on the first-order visibility model effectively treats the CSVs as simple inside corner silhouette vertices; constructing one or more SE-MVs on each CSV, creating a continuous polygonal umbral event surface which conservatively approximates the exact quadric surfaces supported by the first-order silhouette edges.

By using both SV-ME (and SE-ME in the special case) and SE-MV supporting polygons/umbral wedges, embodiments including the present method provide a more precise approximation to the actual from-viewcell umbral event surfaces than the linearized antipenumbra method of Teller, which computes a convex hull of SV-ME planes, which thereby significantly underestimates the occlusion.

Unlike the linearized antipenumbra methods, the pivot and sweep method is not limited to the more restricted problem of visibility through a portal sequence.

In some embodiments, to construct a from-region umbral discontinuity mesh or from-region visibility map, the visible intersections of the first-order wedges and the mesh polygons are be determined. The visible intersection of mesh triangles with a wedge are polylines on the wedge. The identification of the visible intersections of a wedge with mesh triangles is called the "on-wedge" visibility problem. Embodiments include a method of 1-manifold (polyline) traversal in 2D (i.e., on the wedge) in which the construction of visibility event lines (i.e., 1-degree of freedom event surfaces) is interleaved with 1-manifold traversal and interference checks to produce an output-sensitive solution to on-wedge visibility.

This manifold traversal method is extended to a method of traversing 2-manifolds (i.e., the triangle meshes) in 3D to construct from-viewcell visibility maps that include the mesh polygon fragments that are visible from the viewcell. The PVS is derived from the visibility map. This 3D mesh traversal method calls the aforementioned 2D (1-manifold) mesh traversal process to solve on-wedge visibility.

The volume of space occluded by a mesh object from a viewcell, assuming the first-order model of visibility propagation, is called the first-order polyhedral umbra volume. Since individual umbral volumes may intersect to aggregate the occlusion, these volumes are referred to as the first-order polyhedral aggregate umbra (PAU).

First-order PAU, also referred to as PAU, are bounded by polygons called umbra boundary polygons or UBP. These polygons are formed by the intersection of the first-order wedges with triangle mesh polygons and with other first-order wedges. The PAU are also bounded by the first-order visible mesh polygon fragments (i.e., the fragments comprising the from-viewcell visibility map). Together the UBPs and the visible mesh polygon fragment form continuous, though not necessarily closed, umbral surfaces that define the boundaries of the PAU.

As described in detail in conjunction with the 3D 2-manifold traversal method (FIG. 20 and related figures), the construction of the visibility map, according to some embodiments involves a step in which it is determined if a point on a on-wedge visible polyline segment is actually within a PAU volume, and therefore, occluded from the entire viewcell. The method includes a modified point-in-polyhedron test which can answer this query for first-order PAU without explicitly constructing the PAU.

The on-wedge visibility method uses a 1-manifold polyline traversal method in 2D (FIG. 15 and related figures) is a simpler implementation of the 2-manifold traversal method in 3D used to construct the from-viewcell visibility map.

Theory of Operation: Methods of Representing from-Viewcell Visibility

Embodiments accommodate three different representations of from-viewcell visibility. In Table II, features of these three representations are presented and compared with the prior-art method of representing from-region visibility using the complete discontinuity mesh.

In one representation of conservative linearized from-viewcell visibility, using Polyhedral Aggragate Umbrae (PAU), the actual from-viewcell occluded volumes of space are identified. These volumes are bounded by umbra boundary polygons (UBPs) which are formed from the from-viewcell-element umbral wedges. The wedges are effectively intersected with the mesh polygons and with each other to determine the UBPs. This representation is comparable to shadow volume representations, although most shadow volume methods are from-point shadows.

In another representation of conservative linearized from-viewcell visibility, the Conservative Linearized Umbral Discontinuity Mesh (CLUDM), the from-viewcell-element umbral wedges are not intersected with each other, but only with the mesh polygons, to form a conservative discontinuity mesh in which the regions of the mesh correspond to completely visible regions, umbral regions or antumbral regions. The antumbral regions are actually a type of penumbral region from which the viewcell is partially visible. Additional tests are utilized to differentiate between umbral and antumbral regions (e.g., to determine the from-viewcell PVS).

In a third representation of conservative linearized from-viewcell visibility, according to some embodiments, the Conservative Linearized Umbral Discontinuity Visibility Map (CLUVM), only completely visible regions and umbral regions are represented. This is a particularly useful representation since, in this case, the PVS corresponds to the completely visible regions. The construction of the CLUVM proceeds by determining if each potential occlusion boundary, formed by the visible intersection of the from-viewcell-element (i.e., point or edge) umbral wedge, is actually a from-viewcell umbral boundary. Details of this determination, together with an output sensitive method of constructing a CLUVM, are presented elsewhere in the specification.

These three representations of a conservative from-viewcell visibility are compared with the prior-art method of complete discontinuity meshing. In a complete discontinuity mesh the vast majority of boundaries contain penumbral regions, which are regions from which the viewcell is partially visible. Generally, a much smaller number of regions are actual umbral regions from which no part of the viewcell is visible. Both the penumbral regions and the umbral regions of the complete discontinuity mesh may be bounded by line segments and/or quadratic curves. The use of only the linear components, as proposed in the prior-art method of incomplete discontinuity meshing, results in discontinuous umbral boundaries and therefore cannot be used to determine from-region visibility.

For a number of reasons, disclosed elsewhere in this specification, the conservative linearized umbral event surfaces (CLUES) are much less numerous than the exact event surfaces employed by the prior-art method of complete discontinuity meshing. Consequently, the approximate complexity of the arrangement of the CLUDM is much lower than the complexity of the complete discontinuity mesh. In fact, using an output-sensitive construction method of the present invention, the complexity (both construction and storage) is generally only determined by the number of visible silhouette edges, as indicated by $N_v^4$, for the CLUVM in Table II.

Estimates of these complexities are given in Table II, and discussed in detail elsewhere in the specification.

TABLE II

Table Comparing Three Methods of Representing Conservative Linearized From-Viewcell Visibility and Classic Discontinuity Meshing

|  | Polyhedral Aggregete Umbrae (PAU) | Conservative Linearized Umbral Visibility Map (CLUVM) | Conservative Linearized Umbral Discontinity Mesh (CLUDM) | Complete Discontinuity Mesh |
|---|---|---|---|---|
| Event Surfaces | Umbral Boundary Polygons (UBP) | From-Viewcell-Element Umbral Wedges (Polygonal) | From-Viewcell-Element Umbral Wedges (Polygonal) | Umbral and Penumbral Wedges(Polygonal and Quadric) |

TABLE II-continued

Table Comparing Three Methods of Representing Conservative Linearized
From-Viewcell Visibility and Classic Discontinuity Meshing

|  | Polyhedral Aggregete Umbrae (PAU) | Conservative Linearized Umbral Visibility Map (CLUVM) | Conservative Linearized Umbral Discontinuity Mesh (CLUDM) | Complete Discontinuity Mesh |
|---|---|---|---|---|
| Region Boundaries | UBP (Polygons) | Occlusion Boundaries (Polylines) | Occlusion & Antumbral Boundaries (Polylines) | DM Boundaries (Polylines and Quadratics) |
| Region | PAU (Occluded Polyhedral Regions) | Occlusion Region (Polygons) | Occlusion Regions & Antumbral Regions (Polygons) | DM Regions (Polygonal and Quadratic-Bounded Planar Regions) |
| Approximate Complexity of Regions | $N^{4*}$ ($N_v^4$ Using 3D Mesh Traversal) | $N_v^{4*}$ (Using 3D Mesh Traversal) | $N^{4*}$ ($N_v^4$ Using 3D Mesh Traversal) | $N^8$ |

*assumes that number of first-order silhouette edges is O(number of edges)$^{1/2}$ Theory of Operation: Higher-Order Conservative Linear Umbral Event Surfaces by First-Order Backprojection According to some embodiments, the first-order visibility model assumes that for any supporting polygon between the viewcell and the first-order manifold mesh silhouette, the edge of the supporting polygon corresponding to the first-order silhouette edge is completely visible (unoccluded) from the vertex of the supporting polygon corresponding to the supporting viewcell vertex (SVV). That is, for an SV-ME wedge, the corresponding supporting triangle is assumed to intersect no other polygons which would occlude any part of the corresponding mesh silhouette edge when viewed from the corresponding SVV. Likewise, for an SE-MV wedge, the corresponding swept triangle is assumed to intersect no other polygons which would occlude any part of the corresponding viewcell vertex contour edge when viewed from the corresponding inside corner mesh first-order silhouette vertex.

In actuality, the supporting polygon corresponding to a wedge may be completely occluded, completely unoccluded, or partially occluded. If the supporting polygon is completely unoccluded, then the corresponding first-order wedge is the exact visibility event boundary supported by the mesh edge or vertex. If the supporting polygon is completely occluded, then no part of the corresponding wedge is incident on the exact visibility event boundary, but the entire wedge remains a conservative approximation to this boundary. If the supporting polygon is partially occluded, then portions of the wedge corresponding to unoccluded segments of the supporting polygon are the exact visibility event boundary, while the portions of the wedge corresponding to occluded segments of the supporting polygon are conservative approximations to the exact boundary.

The following section summarizes a method using backprojection to adaptively refine first-order wedges to account for higher-order visibility interactions that exist when supporting polygons are completely or partially occluded. Backprojection is the process of determining the portions of a source (i.e., the viewcell) visible from a particular mesh element (i.e., a first-order silhouette edge). According to some embodiments, to compute the backprojection, the first-order visibility model and methods are employed using silhouette edges as lineal light sources.

The methods described thus far have employed a simplified first-order model of visibility propagation which results in linearized visibility event surfaces. These first-order surfaces are bounded by first-order wedges, which are generated by the pivot and sweep method.

These first-order wedges are of two types: SV-ME wedges and SE-MV wedges. The SV-ME wedges, generated by pivoting from a mesh edge to a viewcell vertex, reflect a restriction of visibility that results from the combination of containment of the viewpoint to a point on the viewcell, and the occlusion at the silhouette edge of the mesh. The SE-MV wedges, generated by sweeping from a point on the mesh through an edge of the viewcell, reflect a restriction of visibility that results from the containment on an edge (i.e., boundary) of the viewcell. Under the first-order visibility model SV-ME (i.e., SE-ME in the special case) and SE-MV wedges are the only types of visibility event surfaces that arise in polyhedral environments Both types of first-order wedges can be constructed by extending the corresponding supporting polygons between the mesh and the viewcell. An important assumption of the first order visibility model is that any first-order mesh silhouette edge is either completely visible from the viewcell or completely occluded. This is the same as saying that for any first-order silhouette edge, the viewcell is assumed to be either completely occluded from the edge or completely visible.

Likewise, the first-order model assumes that the supported silhouette edge or vertex is either completely occluded or completely unoccluded when viewed from the corresponding supporting viewcell vertex or edge.

According to some embodiments, using the first-order pivot and sweep method, for example, if a first-order silhouette edge segment is not occluded, then the supporting triangle between the segment and the corresponding SVV is assumed to be completely unoccluded (i.e., not intersected by any other mesh polygons). If, in fact, this supporting triangle is completely unoccluded, then the first-order model is exact and the corresponding SV-ME wedge is an exact component of the from-viewcell umbral event boundary supported by the mesh silhouette edge. If, however, this supporting triangle is partly or completely occluded, then the first-order model is an approximation and the actual visibility event surface incident on the silhouette edge may be composed of intersecting quadric and planar surfaces. Moreover, the first-order silhouette edge (or segments of it) may not even support actual visibility event surfaces. Instead, the actual visibility event surfaces may actually arise from other edges, called higher-order silhouette edges, such that all or parts of a first-order silhouette edge are actually inside the visibility event (i.e., umbra) boundary and therefore occluded.

Embodiments include a method of identifying silhouette edges and vertices for which the first-order assumption is inexact by conducting a sweep of the corresponding supporting triangles to identify occluding elements which induce higher-order visibility event surfaces. These higher-order visibility event surfaces are approximated by computing a backprojection which identifies portions of the viewcell actually visible from the silhouette edge or silhouette vertex. This backprojection is itself a from-region visibility problem that is solved using the first-order pivot and sweep method. Using this method, conservative first-order wedges can be adaptively refined to approximate the corresponding exact higher-order visibility event surfaces to within a desired error tolerance.

In some embodiments, the higher-order method is implemented as a technique to test the exactness of first-order visibility event surface and modify or "adjust" such surfaces to more precisely approximate the relevant higher-order visibility surfaces. First-order visibility event surfaces are incident on first-order from-region silhouette edges. First-order silhouette edges define a conservative silhouette contour of a mesh. Exact higher-order visibility umbral event surfaces are not necessarily incident on first-order silhouette edges and may also arise on other mesh edges, called higher-order silhouette edges. Higher-order visibility event surfaces, which are incident on these higher-order silhouette edges, may produce considerably more occlusion than the corresponding event surface incident on the first-order silhouette edge. In fact, typically the event surfaces emerging from higher-order silhouette edges will actually bound an occlusion volume which contains the corresponding first-order silhouette edge.

Embodiments include a method of approximating higher-order visibility event surfaces by "adjusting" first-order visibility event surfaces in such a way that the adjusted event surfaces remain incident on the first-order silhouette edges. A later section introduces a method of identifying when constraining a higher-order visibility event surface to a first-order silhouette edge significantly decreases the precision of the calculated higher-order event surface. Further embodiments include a method of identifying the specific higher-order silhouette edges that support visibility event surfaces, which more precisely approximates the exact visibility event surface.

The following is a description of where and how higher order-visibility event surfaces arise on polyhedral mesh objects. This framework provides the basis of a novel method of adaptively, progressively approximating these higher-order surfaces using polyhedral surfaces.

To illustrate the concepts, we begin with the simpler case of a linear light source instead of an area light source. Envision a single linear light source comprising a line segment and a single convex polyhedron. Because the polyhedron is convex, there is no self occlusion or inside corners. Consequently, the umbra of the polyhedron is exactly formed using the first-order pivot and sweep algorithm previously described. In this case, each first-order silhouette edge of the mesh supports a single SV-ME wedge formed by pivoting to the corresponding supporting source vertex (SVV) of the source, which in this case is a line segment.

Now, imagine that for a particular first-order silhouette edge of the mesh, the first-order assumption is violated such that from this silhouette edge, the corresponding SVV on the source line segment is not visible (i.e., completely occluded). This occurs if the supporting triangle formed by the silhouette mesh edge and the SVV is intersected by other polygons such that no unobstructed sightlines exist between the SVV and the mesh silhouette edge. Occlusion of this shaft in this case indicates that the first-order wedge is not the exact umbra boundary for the mesh silhouette edge since the corresponding SVV is not even visible from the silhouette edge.

A better approximation to the actual visibility event surface incident on the mesh silhouette edge could be obtained by identifying the point on the linear lightsource that is closest to the supporting viewcell vertex for the edge (i.e., the "pivot to" point) but which is actually visible from the mesh silhouette edge. This point is called the visible supporting viewcell vertex (VSVV) for the mesh silhouette edge. The VSVV is on the surface of the viewcell (i.e., on the line segment representing the viewcell/lightsource). It is the point visible from the mesh silhouette edge to which the SV-ME UBP would pivot. The corresponding SV-ME wedge is an umbral visibility event surface formed by the linear light source and the mesh silhouette edge.

This higher-order SV-ME wedge clearly produces a larger umbra volume than the corresponding first-order SV-ME wedge, since the VSVV provides a less extreme "look" across the mesh silhouette edge, and "behind" the mesh.

According to some embodiments, this visible supporting viewcell vertex (VSVV) for mesh silhouette edge is computed by treating the mesh silhouette edge itself as a linear light source. In this approach, the pivot and sweep method is used to construct a visibility map on the surface of the viewcell using a specific mesh silhouette edge as a light source. In the backprojection process, first-order silhouette edges are identified on intervening mesh polygons between the mesh silhouette edge and the viewcell. First-order wedges are constructed on these silhouette edges in the direction of the viewcell. Theses event surfaces induce a visibility map on the viewcell which partitions it into components that are visible from the mesh silhouette edge and components that are not. The vertex of the visible component of the viewcell to which the SV-ME wedge incident on the original mesh silhouette edge, now being used as a backprojection light source would pivot is the VSVV corresponding to the mesh silhouette edge.

Assume that the linear light source is positioned so that it looks "over the top" of the mesh object at the mesh silhouette edge in question. Assume also that in this particular case the visibility of the line segment light source from the mesh silhouette edge is affected by a single intervening triangle which occludes the supporting triangle (i.e., the 2D shaft between the supporting viewcell vertex and the mesh silhouette edge). Further, assume that a single edge of this intervening triangle spans the entire tetrahedral shaft formed by the line segment light source and the mesh silhouette edge in such a way that the intervening triangle "hangs down" into the tetrahedral shaft. Also, assume the light source edge, the edge of the intervening triangle, and the mesh silhouette edge are mutually skew. This single intervening edge affects the mutual visibility of the other two edges at various points on the source and silhouette edge.

The conjunction of the three skew edges in this way indicates that the actual visibility event surface incident on the mesh silhouette edge includes a quadric surface. This is a classic EEE event TELLER (1992). Nevertheless, the backprojection pivot and sweep algorithm applied in this case will still identify a single conservative VSVV on the light source. Pivoting from the mesh silhouette edge to this VSVV defines a single SV-ME wedge incident on the silhouette edge that conservatively approximates the actual quadric surface incident on the silhouette edge. Moreover, the actual higher-order (quadric) visibility event surfaces incident on the mesh silhouette edge can be more precisely approximated by subdividing the mesh silhouette edge and computing a VSVV for each of the subsegments. During this subdivision process, adjacent silhouette segments may produce different VSVVs during backprojection. The corresponding SV-ME wedges do not share a common edge but are connected by a SE-MV wedges formed by sweeping from the vertex of the adjacent silhouette segments through the linear light source from one VSVV to the other VSVV. In this way, a quadric visibility event surface is conservatively approximated by an alternating sequence of SV-ME and SE-MV wedges.

In some cases the pivot-and-sweep process using a mesh silhouette edge as a lightsource will not produce a single VSVV on the viewcell. For example, if an inside corner of a silhouette contour is encountered during the backprojection, either in single continuous contour or as a CSV, then the resulting visible "extremal" feature on the viewcell may not be a point but a line segment parallel to the mesh silhouette edge as lightsource. This occurs when a backprojection SE-MV wedge is generated by a sweep anchored at the inside corner through the mesh silhouette edge (as lightsource). The resulting SE-MV sedge is parallel to the mesh silhouette edge (as lightsource). This wedge intersects the viewcell such that the intersection is a supporting feature (i.e., both endpoints of the wedge intersection are VSVVs). This case is analogous to the previously described case in the simple forward first-order pivot-and-sweep in which a pivot operation results in a supporting viewcell edge (SE-ME wedge) (e.g., the first-order silhouette edge is parallel to an extremal edge of the viewcell). This higher-order forward SE-ME wedge construction is managed similarly in both cases.

The details of higher-order visibility event surface construction using the backprojection process for the general case of a polyhedral light source are disclosed in the detailed description portion of the specification. In general, the backprojection applies the first-order pivot and sweep method using the mesh silhouette edges or subsegments of these edges as linear light sources to identify VSVVs. These VSVVs are in general connected by visible supporting viewcell contours VSVSCs. Intervening SE-MV higher order wedges are constructed by sweep process on the VSVSCS. Further embodiments include methods to construct higher order SE-MV wedges in the cases where the VSVSCs corresponding to adjacent silhouette edges are disconnected).

According to some embodiments, this backprojection method is used to compute a single higher-order SV-ME wedge for a mesh first-order silhouette edge that conservatively approximates a very complex visibility event surface incident on the mesh silhouette edge, which may include the intersection of multiple quadric and planar surfaces. In such cases, a mesh silhouette edge may be subdivided, and the backprojection applied to subsegments to more accurately approximate an actual event surface that is varying substantially across a single edge. This subdivision can be performed adaptively based on simple tests, which indicate the maximum possible deviation of the linearized event surface from the actual visibility event surface along a particular segment. This method requires less computation than methods such as Teller (1992) and Nirenstein (2005) that first compute the entire set of event surfaces incident on a silhouette edge and then determines which ones are the actual umbra boundary surfaces by using some type of containment test or higher dimensional CSG.

As previously encountered for the first-order visibility map construction, in some cases the SV-ME wedges for adjacent silhouette edges or segments are disjoint and must be connected by SE-MV wedges generated by sweeping from the shared vertex of the edges through the boundary silhouette contour of the viewcell such that the sweep connects the two VSVVs for the connected mesh silhouette edges.

In the first-order case, the two SVVs corresponding to adjacent silhouette edges always lie on the actual boundary of the viewcell and are connected by a single boundary silhouette contour of the viewcell. In the higher-order backprojection case, the two VSVVs may or may not lie on the same contour. If the two portions of the viewcell visible from the adjacent edges are disjoint, then the VSVVs are not connected by a single contour. In this case, the convex hull of the two contours can be used to conservatively connect the two higher-order wedges and the higher-order SE-MV wedges can be conservatively generated from this connected contour.

According to some embodiments, the backprojection method is applied to a mesh silhouette edge only if the corresponding supporting viewcell vertex (SVV) is occluded from the mesh silhouette edge, as indicated by an occlusion of the 2D shaft between these two structures. This occlusion of the 2D shaft for SV-ME wedges is a from point visibility problem that can be computed using the previously described 2D version of the mesh traversal algorithm. Any segments of the silhouette edge for which the EVV is visible do not require application of the backprojection method since, for these segments, the first-order wedge is the exact visibility event surface.

Further, according to some embodiments, subdivision and recursive backprojection for a silhouette segment from which the SVV or VSVV is occluded is guided by a simple test that measures the maximum possible deviation between the currently computed wedge and the actual visibility event surface incident on the segment. This test is performed by pivoting from the silhouette segment to the viewcell in the opposite direction normally used to find the SVV. Pivoting in this direction identifies a separating plane between the silhouette edge and the viewcell. This separating plane corresponds to the maximal possible extent of a higher-order visibility surface incident on the silhouette edge segment. It also corresponds to the extremal penumbra boundary between the segment and the viewcell. In some embodiments, a higher-order occlusion surface would only approach this plane when nearly the entire viewcell is occluded from the corresponding silhouette segment. The angle between this penumbra plane and the current conservative SV-ME wedge for the segment indicates the maximum possible deviation of the current conservative event surface from the actual event surface at this silhouette edge. These two planes, intersecting at the silhouette edge in question, form a wedge supported over the length of the segment. The volume of this wedge reflects the maximum possible deviation of the current conservative occluded volume from the actual occluded volume over the silhouette edge.

It should be noted that this deviation decreases as a function of distance from the viewcell. This reflects the fact that, at greater distances, from-region visibility event surfaces approach from-point visibility event surfaces. Consequently, higher-order visibility effects are less important at greater distances from the viewcell. In some embodiments, silhouette edges are adaptively subdivided depending on the visibility of the corresponding SVV and the value of this umbra/penumbra metric. Using this approach, according to some embodiments, higher-order visibility event surfaces are generated only where they significantly enlarge the occluded volume compared to the simpler first-order event boundaries.

The preceding discussion assumed that the backprojection process is used to refine the wedges that are incident on a first-order silhouette edge of the mesh. In fact, applying the backprojection process to first-order silhouette edges can produce SV-ME wedges which violate local visibility when the triangle formed by the corresponding VSVV and the silhouette edge lies on the backfacing side of both triangles that share the silhouette edge. In embodiments, such a SV-ME wedge is still a conservative representation of the actual visibility event surface incident on the first-order mesh silhouette edge. However, such a violation of local visibility indicates that the corresponding first-order mesh silhouette edge is not actually a from-viewcell silhouette edge. Instead it is on the occluded side of another visibility event surface that arises from the actual from-viewcell silhouette edge, which is closer to the viewcell than the first-order silhouette edge. This type of from viewcell silhouette edge is called a higher-order mesh silhouette edge.

A general from-region silhouette edge may or may not support a higher-order visibility event surface. As defined by Drettakis (1994) and Nierenstein (2005) a general from region silhouette edge is any mesh edge that is a from-point silhouette edge for any point on the viewcell. This generally includes many more edges of mesh polygons than first-order silhouette edges.

General from-region mesh silhouette edges may or may not give rise to from-viewcell umbral visibility event surfaces, depending upon the exact arrangement of intervening geometry between the general from-region silhouette edge and the viewcell. General from-region mesh silhouette edges can be identified using criteria that are slightly different for identifying first-order mesh silhouette edges. According to some embodiments, an edge is a general from-viewcell silhouette edge if it meets three criteria: 1) it must have at least one component triangle that is frontfacing for at least one vertex of the viewcell, 2) it must have at least one component triangle that is backfacing for at least one vertex of the viewcell, and 3) the component triangles must be mutually backfacing.

The previously described 3D mesh traversal algorithm may be modified to include umbral event surfaces that are incident on non-first-order, general from-viewcell silhouette edges. In one modification, the 3D mesh traversal initially proceeds in the usual way: each mesh edge is examined to determine if it is a first-order silhouette edge. Backprojection is performed, using the first-order mesh silhouette edge as a lineal light source, to compute the higher-order wedges incident on the first-order mesh silhouette edge by identifying the VVS and VSVSC on the viewcell surface. If the corresponding higher order SV-ME wedge violates local visibility, then a closer, general from-viewcell silhouette contour is identified by traversing the mesh away from the first-order edge until one or more general from-viewcell silhouette edges are encountered which comprise a silhouette contour that support a higher-order visibility event surface (i.e., by backprojection) that occludes the original first-order mesh silhouette edges. This retraction can be repeated where the higher-order wedges also violate local visibility. This modification begins with a conservative result and refines it to a desired precision based on measurements of the maximum deviation of the current event surface from the actual event surface.

The linearized backprojection method of the present invention provides a more precise approximation of higher-order visibility event surfaces than the linearized antipenumbra method of Teller (1992). Teller's antipenumbra method uses a pivoting strategy from a portal edge to a source portal which effectively identifies a VSVV on the source portal corresponding to the target portal edge. This point, together with the source portal edge, is used to define a plane which bounds the antipenumbra volume.

These planes correspond to the planes of SV-ME wedges/UBPs defined by the present embodiments. As previously indicated for the case of first-order visibility (e.g., between two portal sequences), Teller uses only SV-ME planes to approximate the visibility boundary, whereas the present invention uses both SV-ME and SE-MV polygons (e.g., the UBPs). The present embodiments' use of these polygonal wedges always produces a more precise approximation to the actual visibility event boundary than Teller's antipenumbra, which is based on intersecting planes. Moreover, the present method defines a systematic approach to linearized backprojection including mesh traversal, silhouette edge identification, and adaptive subdivision, which can be applied to the general from-region visibility problem. In contrast, Teller's antipenumbra method depends on a simple pivoting strategy that can only be applied the more limited problem of visibility through a portal sequence.

Figure 55:
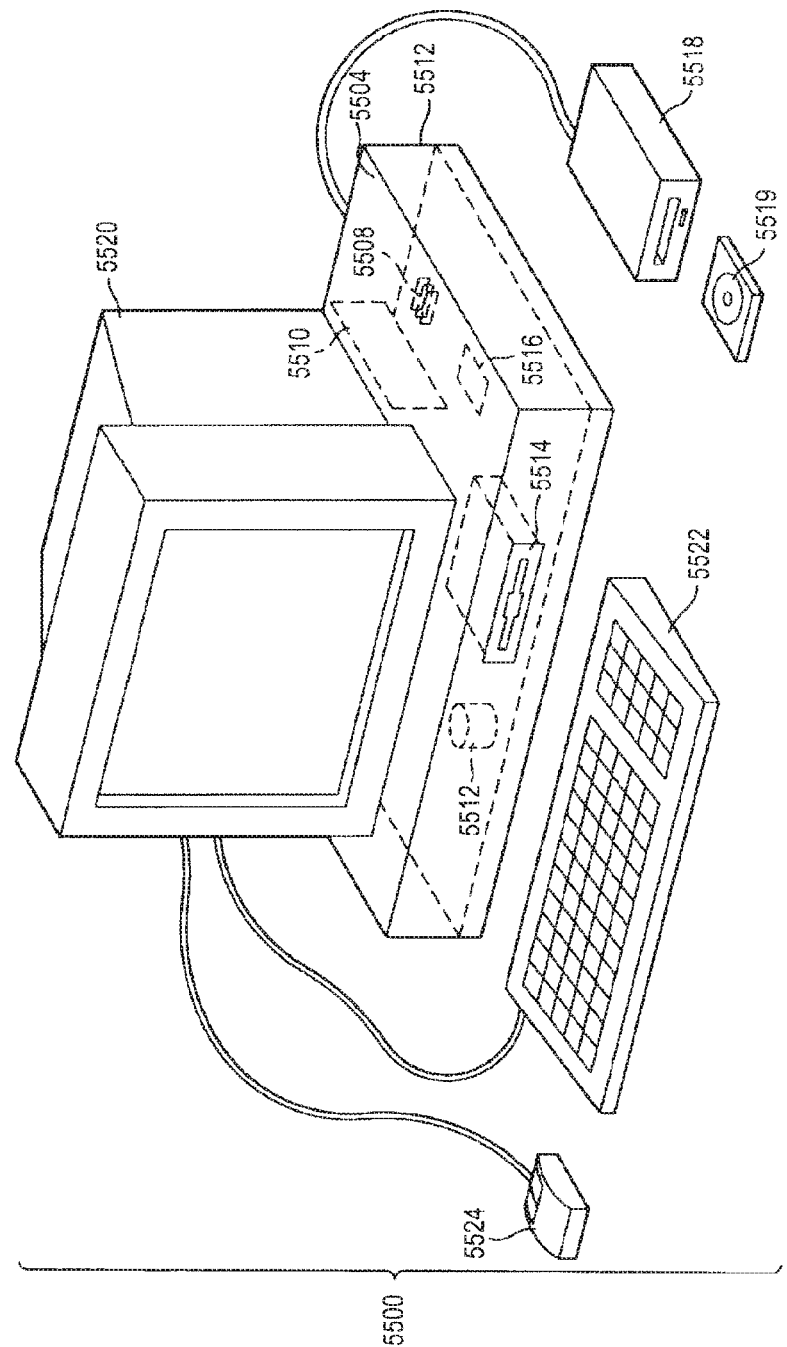
FIG. 55 is an exemplary schematic illustration of a uniprocessor computer system for implementing System and Method of From-Region Visibility Determination and Delta-PVS Based Content Streaming Using Conservative Linearized Umbral Event Surfaces according to the present invention.

Referring now to the drawings, wherein like reference numerals designate identical or corresponding parts throughout the several views, FIG. 55 is a schematic illustration of an exemplary uniprocessor computer system for implementing system and method of from-region visibility determination and delta-PVS based content streaming using conservative linearized umbral event surfaces according to the present invention. A computer 5500 implements the method of the embodiments disclosed herein, wherein the computer housing 5502 houses a motherboard 5504 which contains a CPU 5506 and memory 5508. The computer 5500 also includes plural input devices, e.g., a keyboard 5522 and mouse 5524, and a display card 5510 for controlling monitor 5520. In addition, the computer system 5500 further includes a floppy disk drive 5514 and other removable media devices (e.g., compact disc 5519, tape, and removable magneto-optical media), a hard disk 5512, or other fixed, high density media drives, connected using an appropriate device bus, e.g., a SCSI bus or an Enhanced IDE bus. Although compact disc 5519 is shown in a CD caddy, the compact disc 5519 can be inserted directly into CD-ROM players which do not require caddies. Also connected to the same device bus or another device bus, the computer 5500 may additionally include a compact disc reader/writer 5518 or a compact disc jukebox. In addition, a printer also provides printed lists of image primitives, exposure events, and three-dimensional images.

The system further comprises at least one computer readable media. Examples of such computer readable media are compact discs, hard disks, floppy disks, tape, magneto-optical disks, PROMS (EPROMs, EEPROMs, Flash PROMs), DRAM, SRAM, etc. Stored on any one or on a combination of the computer readable media, the present invention includes software for controlling both the hardware of the computer 5500 and for enabling the computer 5500 to interact with a human user. According to some embodiments, such software includes, but is not limited to, device drivers, operating systems and user applications, such as software development tools. Such computer readable media further includes the computer program product of the embodiments for implementing a method of from-region visibility precomputation and delta-PVS based content streaming employing conservative linearized umbral event surfaces.

Figure 56:
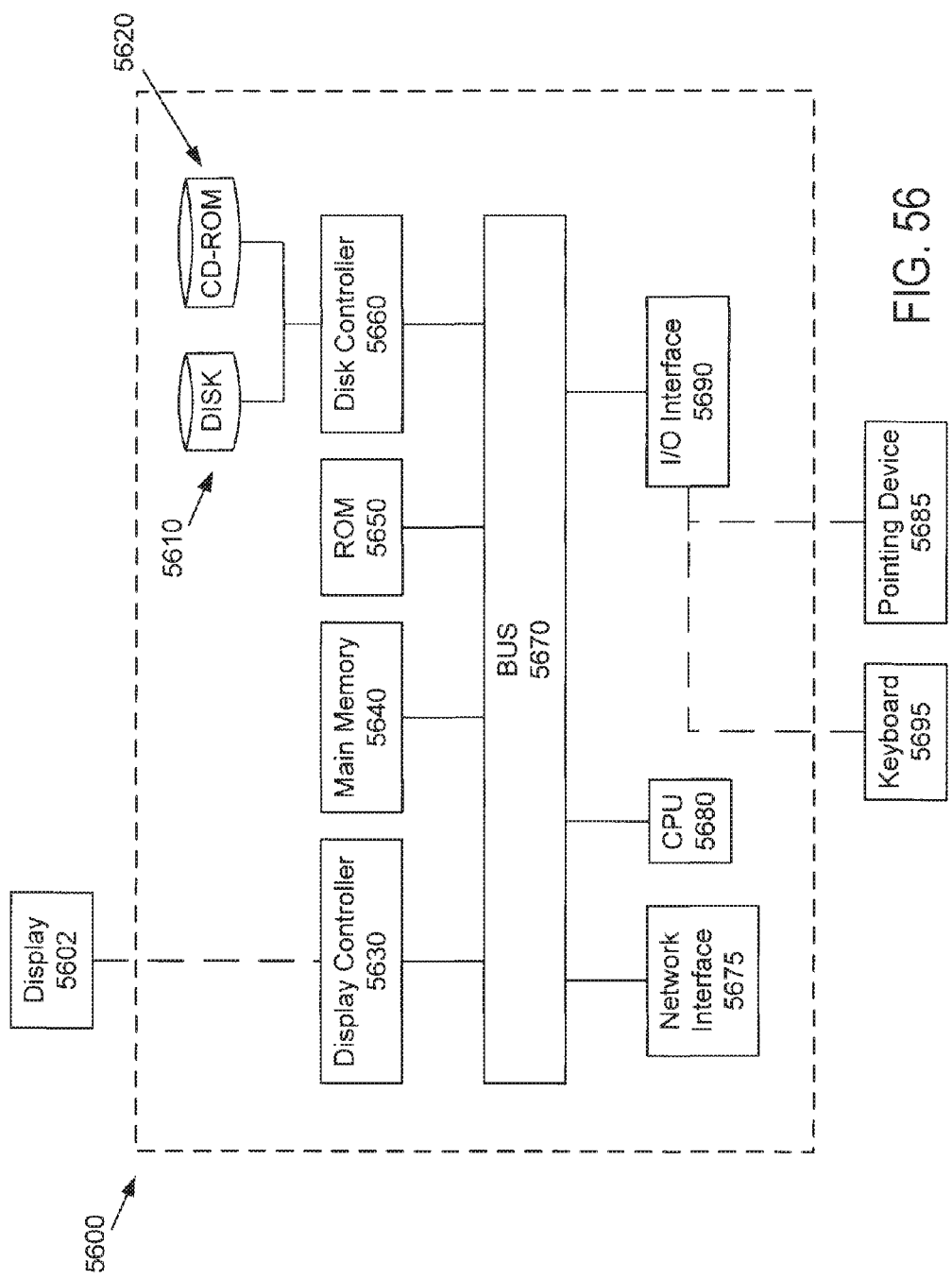
FIG. 56 illustrates an exemplary diagram of a processor.

FIG. 56 is a block diagram of a processor 5600 utilized in computer 5500. In one embodiment, the processor 5600 includes a CPU 5680 which processes data and instructions stored in main memory 5640 and/or ROM 5650. The CPU 5680 also processes information stored on the disk 5610 or CD-ROM 5620. As an example, the CPU 5680 is an IBM System X from IBM of America employing at least one Xenon processor from Intel of America or an Opteron processor from AMD of America. Thus, instructions corresponding to a process in a mobile device is stored on any one of the disk 5610, CD-ROM 5620, main memory 5640 or ROM 5650.

In one embodiment, the processor 5600 also includes a network interface 5675, such as an Intel Ethernet PRO network interface card from Intel Corporation of America, a display controller 5630, such as a NVIDIA GeForce GTX graphics adaptor from NVIDIA Corporation of America for interfacing with a display 5602, such as a Hewlett Packard HP L2445w LCD monitor. The processor 5600 also includes an I/O interface 5690 for interfacing with a keyboard 5695 and pointing device 5685, such as a roller ball or mouse. According to some embodiments, the disk controller 5660 interconnects disk 5610, such as a hard disk drive or FLASH memory drive, and CD-ROM 5620 or DVD drive with bus 5670, which is an ISA, EISA, VESA, PCI, or similar for interconnecting all of the components of the server 5600. A description of the general features and functionality of the display 5602, keyboard 5695 and pointing device 5685, as well as the display controller 5630, disk controller 5660, network interface 5675 and I/O interface 5690 is also omitted for brevity as these features are well known. Of course, other processor and hardware vendors and types are known in the art such as Freescale ColdFire, i.MX and ARM processors from Freescale Corporation of America.

The example processor 5600 of FIG. 56 is a hardware platform of a computing device, such as a PC, and CPU 580 is an Intel Pentium Processor, or any other desired processor known in the art. The computer-readable instructions stored on any one of the main memory 5640, ROM 5650, disk 5610 or CD-ROM 5620 is provided as a utility application, background daemon, or component of an operating system, or combination thereof, executing in conjunction with CPU 5680 and an operating system such as Microsoft VISTA, UNIX, Solaris, LINUX, Apple MAC-OS and other systems known to those skilled in the art.

Main memory 5640 is a random access memory (RAM), FLASH memory, EEPROM memory, or the like, while ROM 5650 is Read Only Memory, such as PROMs. Further descriptions of the main memory 5640 and the ROM 5650 are omitted for brevity as such memory is well known.

Figure 57:
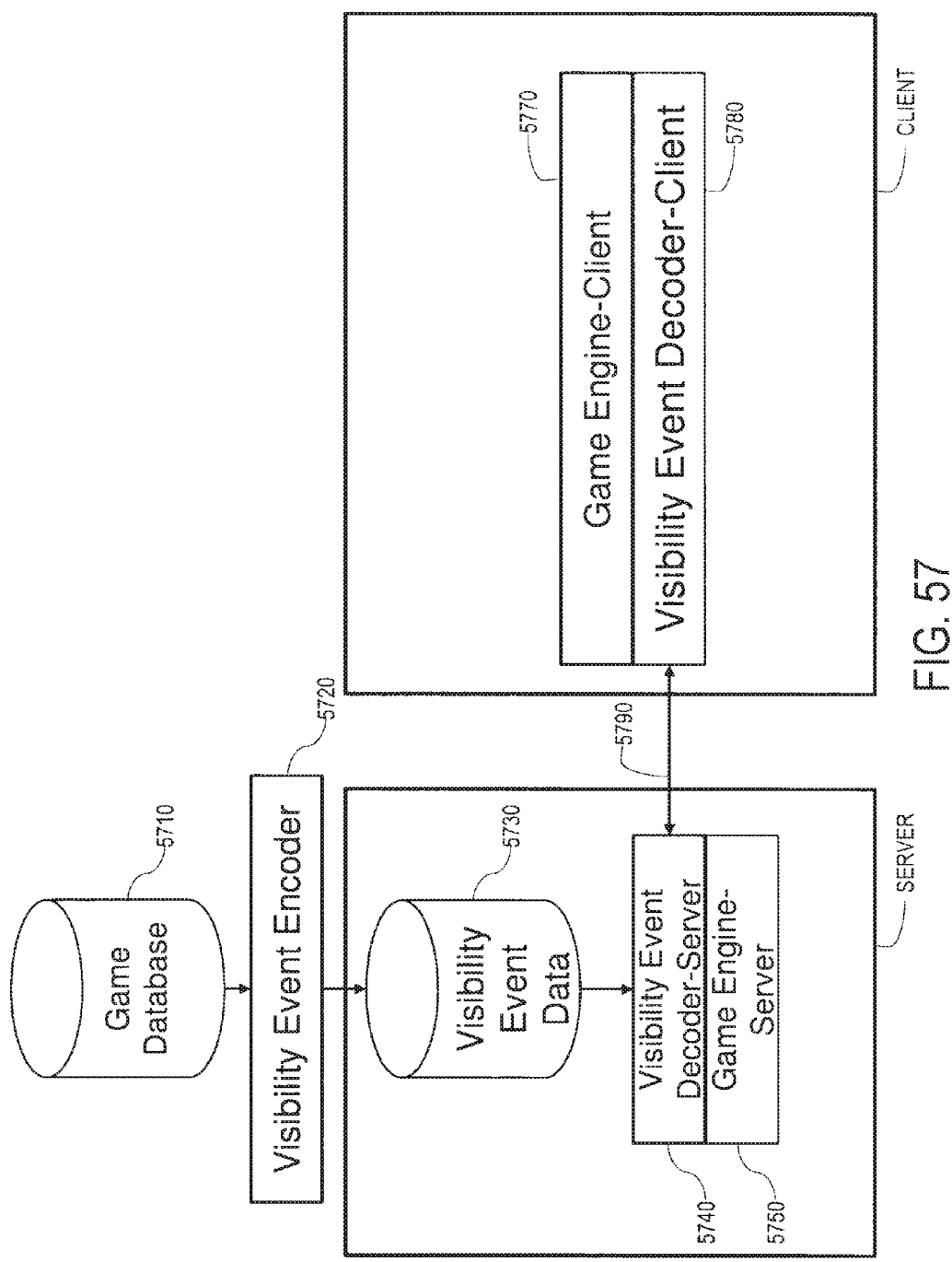
FIG. 57 is an exemplary diagram showing the relationships, in one embodiment, between a visibility event encoder, a visibility event server, and a visibility event client.

FIG. 57 is an exemplary diagram showing the relationships, in one embodiment, between a visibility event encoder, a visibility event server, and a visibility event client.

In some embodiments, a game database or other modeled environment, shown as data 5710, comprising geometry, texture and other information; is processed using conservative linearized umbral event surfaces to produce delta-PVS data stored as Visibility Event Data (5730). This processing is shown in FIG. 57 as being performed by a Visibility Event Encoder, 5720. In one embodiment, this processing/encoding is performed off-line to generate the Visibility Event Data 5730, which is stored for later use. In some embodiments, the visibility event encoder 5720 includes the processor 5600 and performs the processes illustrated in FIGS. 1, 3, 4A, 4C, 5A-5C, 6A, and 6B. In further embodiments, the Visibility Event Encoder employs the 3D mesh traversal process of FIG. 20A and related figures to generate the Visibility Event Data 5730.

In some embodiments, the Visibility Event Data 5730 is delivered at runtime by a server unit labeled SERVER. In some embodiments, the server unit includes stored visibility event data 5730, previously generated by the visibility event encoder. The server unit may also implement a Visibility Event Decoder-Server process 5740. In some embodiments, this Visibility Event Server process may implement server elements of navigation-based prefetch to deliver the Visibility Event Data to a client unit, labeled CLIENT, through a network interconnect labeled 5790. In some embodiments, the Visibility Event Server may implement perception-based packet control methods discussed in conjunction with FIG. 48A, FIG. 49, FIG. 50A, FIG. 50B, and FIG. 51.

In some embodiments Visibility Event Server 5740 is interfaced to a Game Engine-Server process 5750. A Game Engine-Server process is often used in existing multiplayer games, for example to receive the location of players in a multiplayer game and to deliver this data to client units. In contrast, the Visibility Event Server 5740 progressively delivers the geometry, texture and other information that comprises the modeled environment, as visibility event data which is, in some embodiments, prefetched based on a user's movements within the modeled environment.

Visibility Event Data 5730 is delivered to a client unit labeled CLIENT which in some embodiments includes a Visibility Event Decoder-Client process 5780. The Visibility Event Client process 5780 receives Visibility Event Data 5730. Process 5780 processes the Visibility Event Data into PVS information that can be rendered. In some embodiments this rendering is performed by a Game Engine Client, labeled 5770.

In some embodiments the Decoder-Client process 5780 receives visibility event data that has been effectively compressed by the method of identifying and labeling silhouette contours and occlusion boundary regions having high effective dynamic occlusion. This effective compression in some embodiments by the contour identification and labeling process described in conjunction with the exemplary flowchart of FIG. 33A, FIG. 33B, FIG. 33C, and FIG. 33D.

Figure 32A:
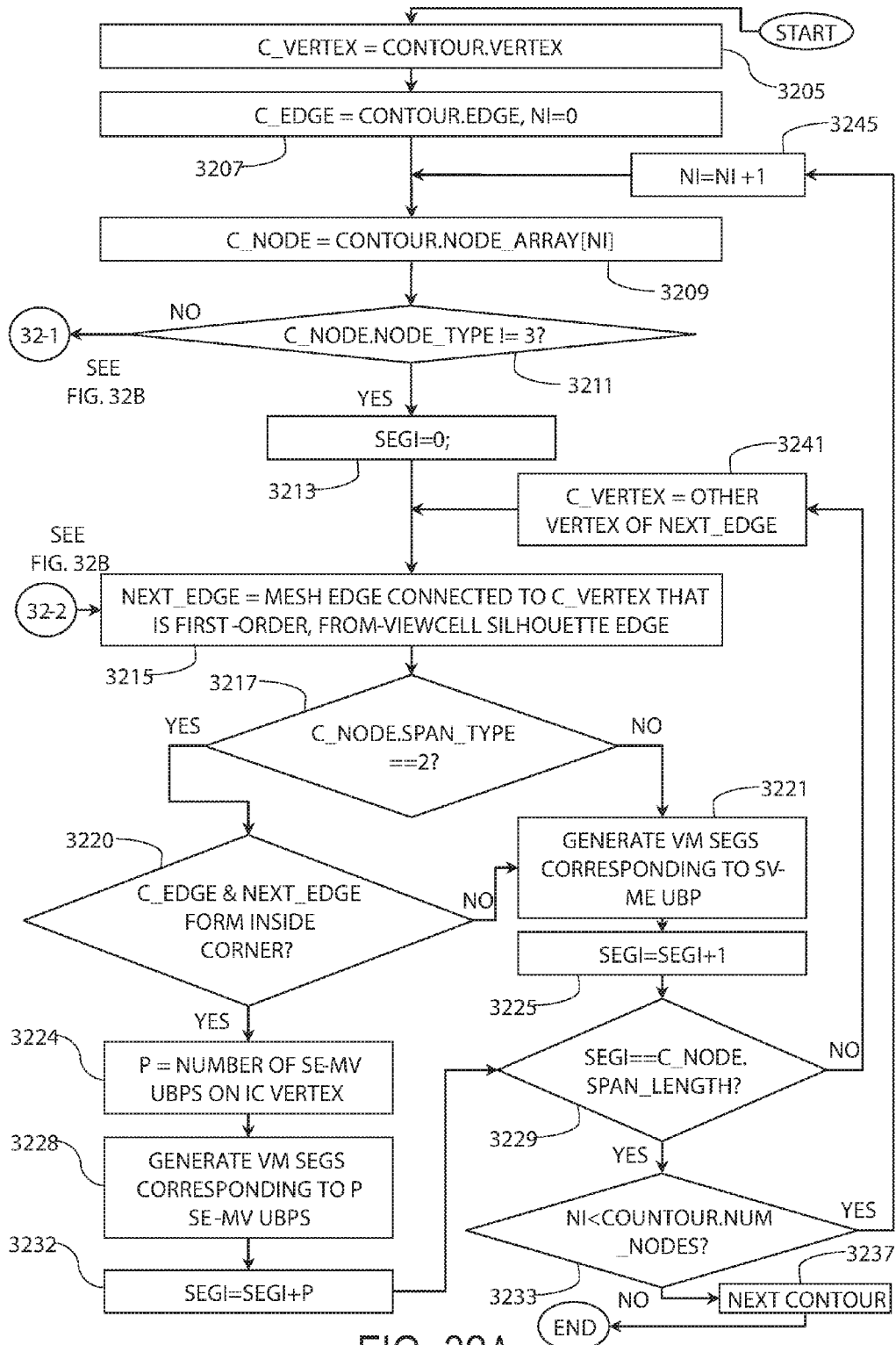
FIG. 32A is an exemplary flowchart showing a method of identifying edges and vertices of a silhouette contour using data structures for labeled silhouette contours.
Figure 32B:
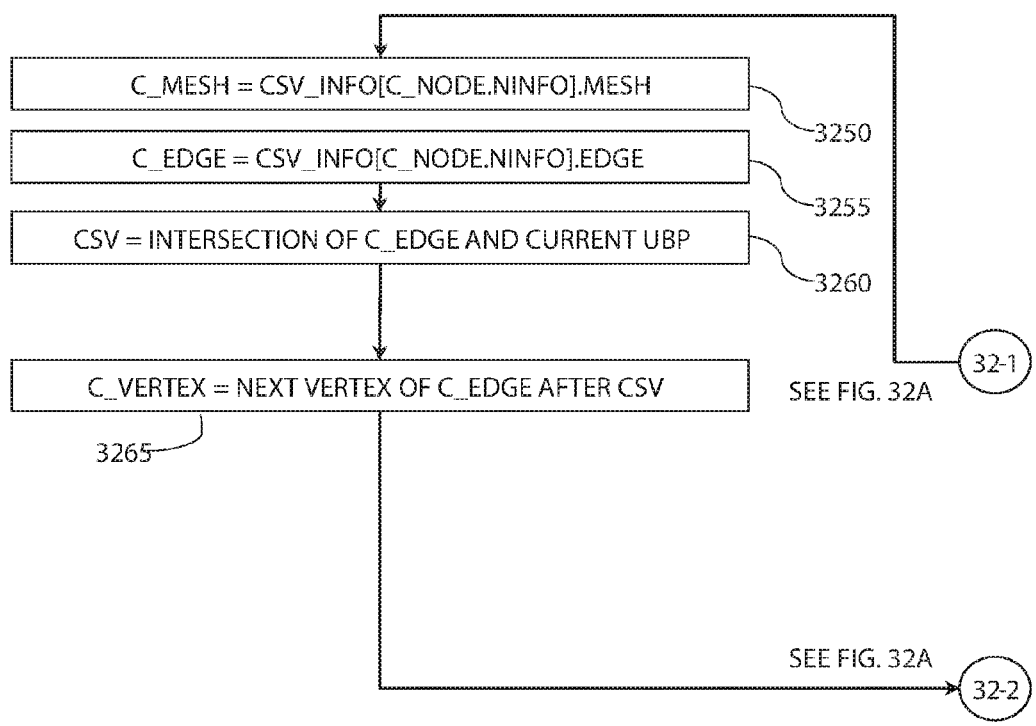
FIG. 32B is a continuation of FIG. 32A.

In such embodiments the Decoder-Client process 5780 can use the labeled contour information provided included in the delivered visibility event data to identify entire contours from a limited number of labeled first-order silhouette edges (see exemplary flowchart of FIG. 32A and FIG. 32B). Embodiments of the Decoder-Client process may also generate entire occlusion boundaries at runtime from labeled silhouette contour data (see FIG. 34A and FIG. 34B as well as FIG. 35A and FIG. 35B).

Figure 36:
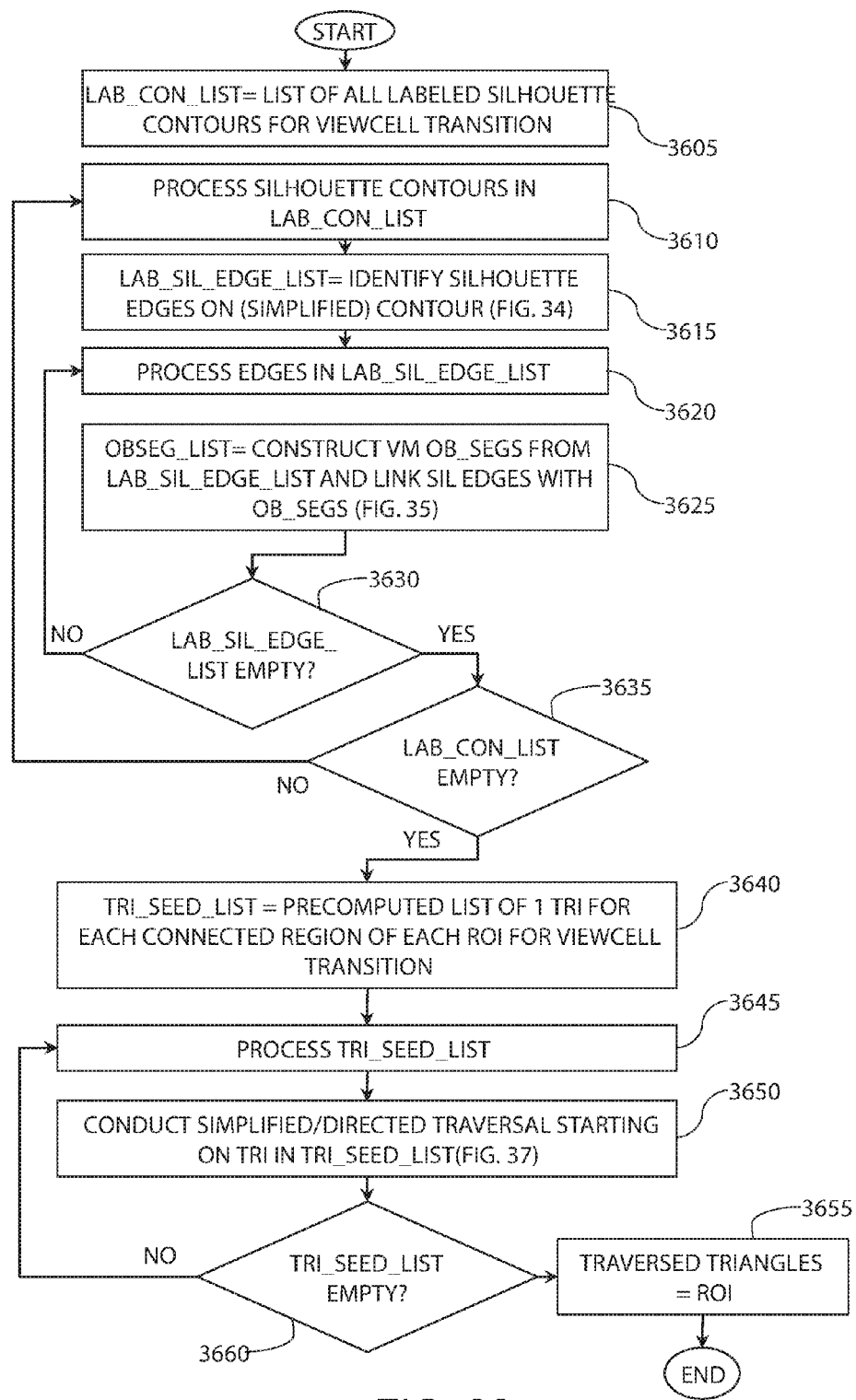
FIG. 36 is an exemplary flowchart showing a process controlling the runtime process of constructing visibility map ROI using ROI boundaries constructed from pre-stored labeled silhouette contours wherein the ROI boundaries define delimit a simplified, hinted, runtime 3D mesh traversal process which traverses the ROI.
Figure 37:
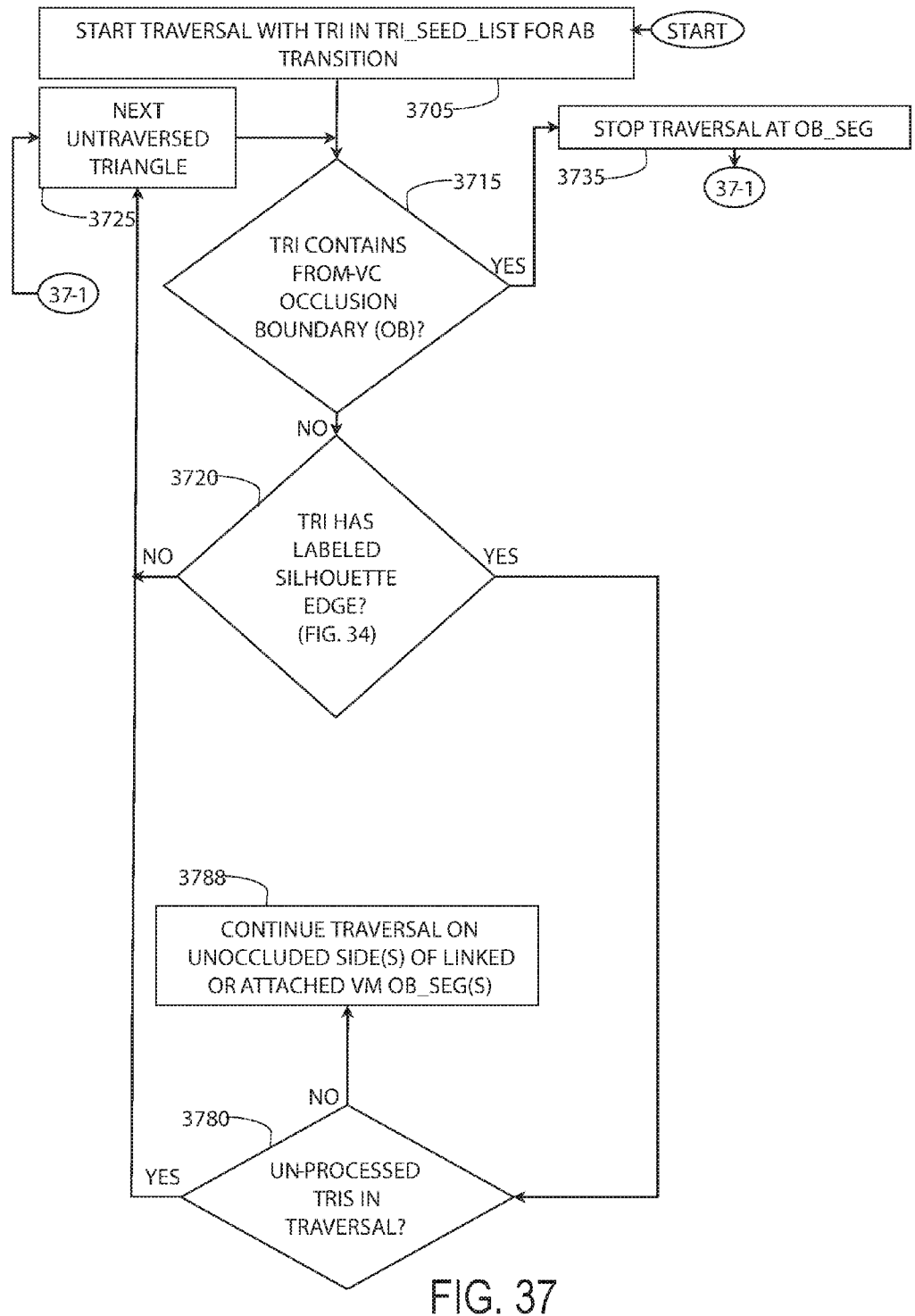
FIG. 37 is the main process of using simplified, hinted, runtime 3D mesh traversal process to construct ROI from pre-stored labeled silhouette contour information and a list of seed triangles for the connected components of the ROI.

Using this contour data generated from the labeled edge information, the Decoder-Client process 5780, in some embodiments, generates a PVS (e.g. one or more child PVSs from parent PVS data), or delta-PVS information at runtime by traversing to the contours from a labeled seed triangle for each connected component of the PVS or delta-PVS being generated (see exemplary flowcharts of FIG. 36 and FIG. 37).

The Decoder-Client process 5780, in some embodiments, interfaces with Game Engine Client (5770). In some embodiments the PVS or delta-PVS data delivered to the Decoder-Client process or generated in the aforementioned decompression sub-processes of the Decoder-Client process, is submitted to rendering, depending on a the location of a user's or other agent's viewpoint location. This rendering may employ standard graphics API such as Microsoft DirectX or OpenGL-ES employed by Sony Corporation's Playstation 3. In some embodiments, these graphics APIs typically interface to graphics hardware through drivers.

In some embodiments, the Decoder-Client process also acquires information indicating a user's or autonomous agent's location in the modeled environment. This viewpoint location information is transmitted, in some embodiments, to the Decoder-Server process using the bidirectional communication interconnect 5790.

FIG. 2 Detailed Description: Identification of First-Order Silhouette Edges and Construction of First-Order Conservative Linearized Umbral Event Surfaces As previously described, two prior-art methods make extensive use of from-region visibility event surfaces: shadow volume algorithms for area light sources, and discontinuity meshing algorithms.

In shadow volume methods, the visibility event surfaces being constructed include umbral and penumbral event surfaces that intersect to form the boundaries of the corresponding shadow volume. In simple cases, the umbral event surfaces are polygons (herein called umbra boundary polygons or UBPs) and form the boundary of the umbral volumes which are polyhedra.

Discontinuity meshing methods also employ visibility event surfaces that are both umbral and penumbral. In discontinuity meshing methods, the visibility event surfaces, called wedges, are not intersected with each other. Consequently, discontinuity mesh methods do not, for example, produce an explicit umbral volume. Instead, in discontinuity meshing methods, the wedges are only intersected with mesh polygons. Following the wedge-polygon intersection step, a 2D visibility process is applied on each wedge to determine visible portions of the intersected polygon segments. These visible segments of the intersected mesh polygons form the discontinuity boundaries of the mesh. The discontinuity boundaries define regions of uniform qualitative visibility (e.g., umbra, antipenumbra, etc.) on the polygon mesh that can be determined after the discontinuity mesh has been constructed.

According to some embodiments, the present method of conservative from-region visibility determination employs conservative linearized umbral visibility event surfaces which are constructed using a novel method of visibility event surface construction.

In one embodiment of the present method, these conservative, linearized, umbral event surfaces are intersected with each other and with mesh polygons to form UBPs that are analogous to the event surfaces used in shadow volume methods.

In another embodiment of the present method, these conservative, linearized, umbral event surfaces are effectively intersected with mesh polygons to form wedges that are analogous to the event surfaces used in discontinuity meshing methods. In a variation of this method, a conservative, linearized, from-region visibility map (VM) is constructed from these wedges.

The following is an overview of the first-order model of visibility propagation which applies to both types of first-order visibility event surfaces: wedges and UBPs (which can be constructed by wedge-wedge intersection).

As is evident from the analysis of the prior art, the exact visibility event surfaces that define from-region visibility in polyhedral environments are often quadric surfaces. These higher-order surfaces present significant computational challenges which have made the development of robust, practical, from-region visibility precomputation methods very difficult.

Embodiments include a method of from-region visibility precomputation that is based on a simplified model of from-region visibility propagation in polyhedral environments. We call this the first-order model. According to some embodiments, this model produces visibility event surfaces that are always planar, always conservative, and frequently exact. Tests are used to determine if the first-order surface is exact and to measure the maximum deviation of the first-order surface from the exact result. A higher-order method can be used to refine the first-order event surface in regions where the first-order method is imprecise. In some embodiments, the higher-order method is an implementation of the first-order method in the reverse direction: computing the portion of the viewcell visible from an edge.

Unlike the planar visibility event surfaces used in the discontinuity meshing methods (Heckbert et. al. 1992), the conservative, first-order, from-region visibility event surfaces employed by the present method are guaranteed to form continuous umbral surfaces. These continuous umbral surfaces produce continuous discontinuity mesh boundaries that partition the discontinuity mesh into regions visible from the viewcell and regions occluded from the viewcell. Consequently, these regions form a conservative, linearized umbral discontinuity mesh. Methods of constructing a conservative linearized umbral from-viewcell visibility map are disclosed. Methods for deriving a conservative from-region PVS from the corresponding from-region visibility map are also specified.

According to some embodiments, it is assumed that a polygon mesh is a closed manifold triangle mesh (i.e., a set of triangles that are connected by their common edges or corners) with each edge having exactly two component polygons. Additionally, it is assumed that the view region is a convex viewcell. In some embodiments, these assumptions are not required by the method of first-order visibility determination, but they do enhance the simplification of the implementations. For example, the polygon mesh may be manifold but not closed. In this case, each edge has either one or two component triangles.

According to some embodiments, the first-order from-region visibility model is based on the simplifying, conservative assumption that if any element of a polygon mesh is visible from any part of a view region (herein called a viewcell) then it is visible from all parts of the viewcell. This assumption leads to a definition of a first-order from-region silhouette edge.

An edge of a polygon mesh is a first-order from-region silhouette edge if one component polygon sharing the edge is front facing (visible) to any vertex of the region and the other component polygon is backfacing (invisible) to all vertices of the view region. The definition of a first-order silhouette edge further requires that the component polygons are not facing each other.

This is a more restrictive definition than the definition of a general from-region silhouette edge (e.g., used by Dretakis et al, and Nirenstein 2005). An edge is a general from-region silhouette edge if one component polygon is front facing and the other component polygon is backfacing for any vertex of the view region. Stated differently, an edge is a general from-region silhouette edge if the edge is a from-point silhouette edge for any point in the view region.

The following table compares first-order from-region silhouette edges to general from-region silhouette edges and from-point silhouette edges.

TABLE III

Silhouette Edge Definition Table

| Silhouette Definition | Backfacing Polygon | Front Facing Polygon |
|---|---|---|
| From-Point | Backfacing from point | Front facing from point |
| General From-Region | Backfacing from any point on viewcell | Front facing from any point on viewcell |
| First-Order, From-Region (on supporting hull) | Backfacing from all points on viewcell | Front facing from at least one point on viewcell |
| From-Region, Extremal Penumbral (on separating planes) | Backfacing from any point on viewcell. | Front facing from all points on viewcell |

The definition of a first-order from-region silhouette edge is similar to a from-point silhouette edge in that both of these silhouette edges define a boundary between visibility and complete invisibility from the respective "regions", with a viewpoint being a degenerate region. Clearly, if a component polygon is backfacing for all vertices of a convex viewcell, then it is invisible from that viewcell. The first-order silhouette edge definition requires that the other component polygon sharing the edge is visible from any point on the viewcell.

Clearly, on any polygon mesh, there may be many more general from-region silhouette edges than first-order from-region silhouette edges. Every first-order silhouette edge is a general from-region silhouette edge but the converse is not true.

From-region visibility is determined from a view region, which in the present embodiments is a polyhedral viewcell.

From-region visibility event surfaces are incident on from-region silhouette edges. These from-region visibility event surfaces may be penumbral or umbral.

According to some embodiments, as defined here, a from-region umbral visibility event surface (also called simply an umbral surface) is an oriented surface having a from-region occluded side and a from-region unoccluded side. Points on the from-region occluded side of the umbral surface are occluded from any and all points on (or in) the view-region. Points on the from-region unoccluded side of the umbral surface are unoccluded (i.e. visible) from any point on (or in) the view region.

A from-region umbral visibility event surface may be exact or it may be conservative.

In some embodiments, an exact from-region umbral event surface is comprised of quadric and planar components and may be incident on any of the general from-region silhouette edges. In order to determine which of the general from-region silhouette edges support exact umbral event surfaces, an exact solution of the from-region visibility problem is solved. As previously discussed, this is a difficult computational problem that typically requires solving in higher-dimensional spaces.

In contrast, embodiments employ the first-order model of visibility propagation defining a pivot-and-sweep method of constructing conservative umbral event surfaces which are all planar and which are incident only on first-order silhouette edges.

In some embodiments, points on the occluded side of a conservative umbral event surface are actually occluded from the view region, whereas points on the unoccluded side of a conservative umbral event surface may actually be unoccluded or occluded. Consequently, using conservative umbral event surfaces to determine from-region visibility, e.g., using the method of conservative from-viewcell visibility mapping, the geometry visible from a viewcell is never underestimated but may be overestimated.

The planar visibility event surfaces (wedges) employed in the prior-art method discontinuity meshing are exact, but they do not, in general, form continuous visibility event surfaces. This is because the exact visibility event surface is generally comprised of both planar and quadric components. Consequently, the planar visibility event surfaces of the prior-art method of discontinuity meshing cannot be used to determine umbral regions.

In contrast, the first-order visibility event surfaces constructed using the methods of the present embodiments are exact or conservative but are guaranteed to form a continuous umbral event surface that can be employed, for example in the present method of from-region visibility mapping, to determine what geometry is inside umbral regions. From-region penumbral event surfaces are oriented visibility event surfaces that are incident on general from-region silhouette edges. On the unoccluded side of a penumbral event surface a certain subregion or "aspect" of the source view region is visible. Whereas on the occluded side of the same penumbral event surface the same subregion of the view region is occluded. The prior-art method of discontinuity meshing uses penumbral event surfaces to determine the various components of a penumbra cast by polygon mesh objects from an area light source.

According to some embodiments, only umbral event surfaces are employed to determine from-region visibility. In one embodiment, all of these umbral event surfaces are incident on first-order silhouette edges. In an alternate embodiment, the first-order umbral event surfaces may be adaptively refined by a process of backprojection to more precisely approximate the exact umbral visibility event surfaces. These refined or "adjusted" visibility event surfaces are, like first-order umbral event surfaces, planar; but they reflect the "higher-order" visibility effects caused by partial occlusion of the view region from the silhouette edge. These visibility event surfaces are therefore called higher-order visibility event surfaces. In this alternate embodiment, these higher-order visibility event surfaces (umbral) may "retract" to non-first-order, general from-region silhouette edges.

Table IV shows the types of visibility event surfaces incident on various types of silhouette edges and certain characteristics of these visibility event surfaces.

TABLE IV

Visibility Event Surfaces Incident on Types of Silhouette Edges

| Silhouette-Edge Type | Visibility Event Surfaces Supported | Event Surface Type |
|---|---|---|
| From-Point General From-Region | From-Point Umbral From-Region Penumbral and From-Region Umbral | Planar, Exact Planar: Exact, Not Guaranteed Continuous Quadric: Exact, Not Guaranteed Continuous |
| First-Order, From-Region | First-Order, From-Region Umbral Conservative or Exact | First-Order: Planar, Exact or Conservative, Guaranteed Continuous |

Figure 2A:
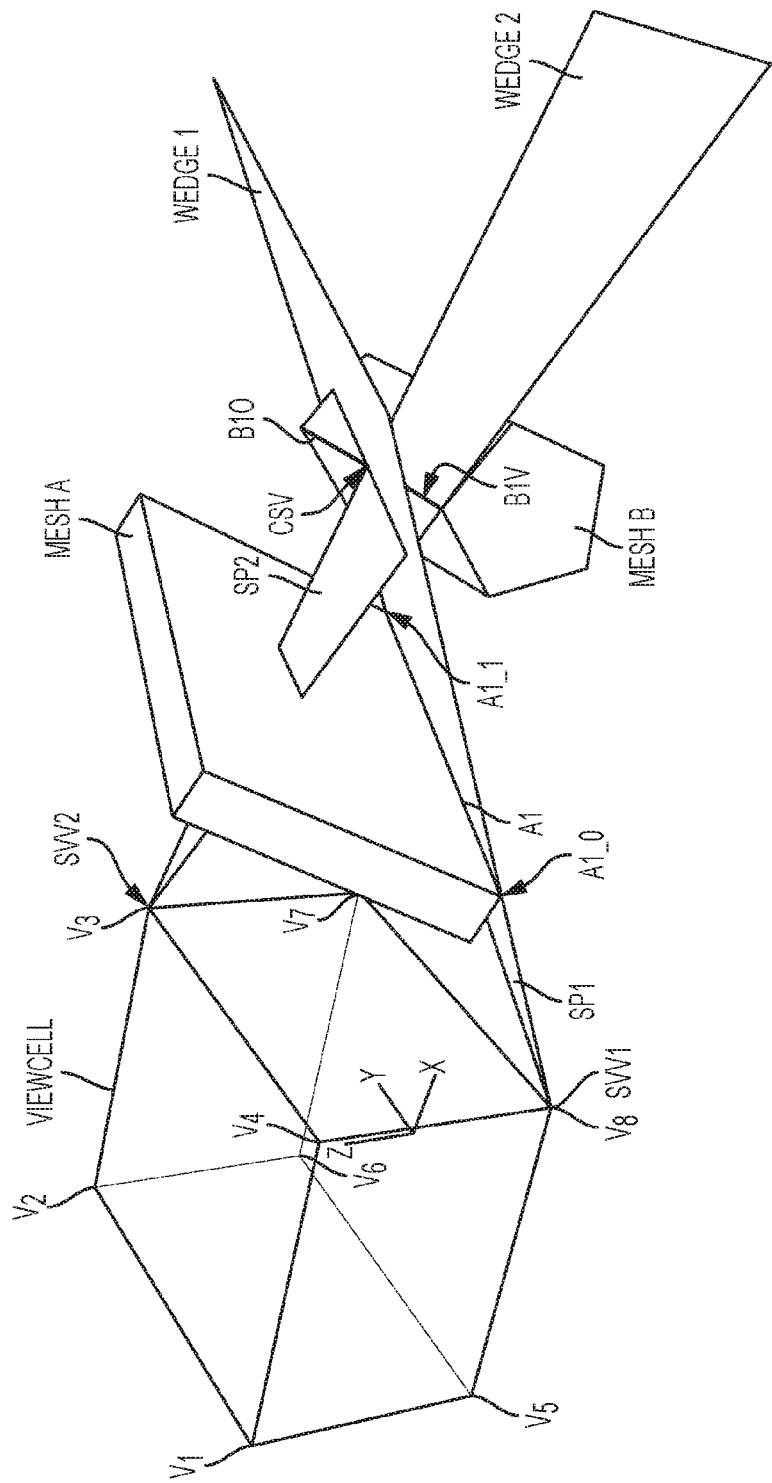
FIG. 2A is an exemplary diagram showing a viewcell and two polygon meshes with first-order wedges incident on two first-order silhouette edges.
Figure 2B:
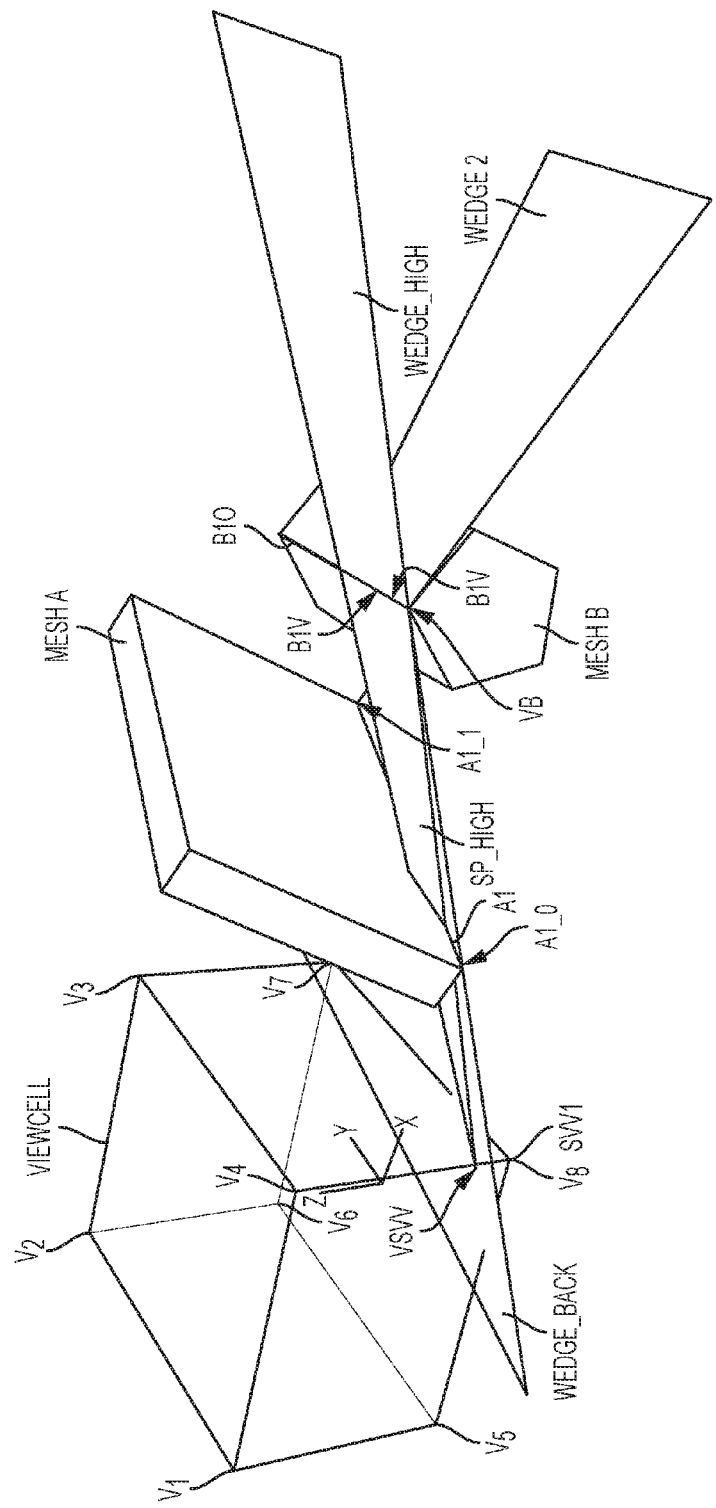
FIG. 2B is an exemplary diagram showing a viewcell and two polygon meshes with a from-silhouette edge (backprojection) first-order wedge and the corresponding higher-order from-viewcell (frontprojection) wedge.

These basic aspects of the first-order model of visibility propagation are illustrated in FIG. 2A and FIG. 2B. Subsequent details are given in the Description-Embodiments sections of the specification.

FIG. 2A is a diagram showing a viewcell and two simple polygon meshes A and B.

FIG. 2A also shows two first-order, from-viewcell silhouette edges: edge A1, and edge B1 (which is subdivided into segments B1O and B1V).

The construction of conservative linearized umbral event surfaces (CLUES) incident on these first-order silhouette edges is now described. In the following discussion, the umbral event surfaces constructed are similar to discontinuity mesh wedges in the sense that they define visibility from a single feature of a viewcell (generally a supporting viewcell vertex or edge). In a subsequent section of this specification, it is shown that these wedges can be used to construct a conservative linearized from-viewcell visibility map (VM) from which a PVS can be derived.

In some embodiments, first-order umbral boundary polygons (UBPs), which define visibility from an entire viewcell, are explicitly constructed by intersecting the corresponding first-order wedges. The construction and use of UBPs is shown as an alternate embodiment in a later part of this specification.

Consequently, the first steps in the construction of first-order wedges and first-order UBPs are identical, which is illustrated with simpler first-order wedges in FIGS. 2A and 2B.

FIG. 2A illustrates a viewcell and mesh objects A and B. In some embodiments, the viewcell is a 3D cube having eight vertices. For example, the viewcell in FIG. 2A is a cube having vertices $V_1$-$V_8$. In further embodiments, the viewcell is any desired convex polyhedron. An edge of mesh A is labeled A1 having edges $A_{1\_0}$ and $A_{1\_1}$. An edge of mesh B is labeled as two segments: B1O and B1V. With respect to first-order silhouette edge A1, segment B1V is visible from supporting viewcell vertex SVV1, as B1V is on the unoccluded side of the event surface WEDGE1 that is formed between edge A1 and the corresponding supporting viewcell vertex SVV1, which corresponds to viewcell $V_8$. In this regard, B1V is on the unoccluded side of WEDGE 1 since a backfacing plane incident on first order silhouette edge A1 pivots in a clockwise direction towards viewcell $V_8$ to determine the corresponding supporting viewcell vertex. Accordingly, in some embodiments, the direction which a backfacing plane incident on a first order silhouette edge pivots toward the viewcell vertex indicates the unoccluded side of an event surface supported by the viewcell vertex. The opposite direction which the backfacing plane pivots indicates the occluded side of the event surface supported by the viewcell vertex.

With respect to first-order silhouette edge A1, segment B1O is occluded from supporting viewcell vertex SVV1, as B1O is on the occluded side of the event surface WEDGE1 that is formed between edge A1 and the corresponding supporting viewcell vertex SVV1.

The first-order visibility event surface, labeled WEDGE1, lies in the supporting plane between edge A1 and the viewcell. The supporting polygon SP1 between edge A1 and the viewcell is the triangle (labeled SP1) formed by the vertices $A_{1\_0}$ and $A_{1\_1}$ of edge A1 and the viewcell vertex labeled SVV1.

According to some embodiments, WEDGE1, the first-order visibility event surface incident on edge A1, is formed by extending the two edges of the corresponding supporting polygon (SP1) that are incident on the vertices $A_{1\_0}$ and $A_{1\_1}$ of edge A1. This extension occurs semi-infinitely starting at the vertices $A_{1\_0}$ and $A_{1\_1}$ of A1, in a direction away from the viewcell. The two extended rays are connected to the vertices $A_{1\_0}$ and $A_{1\_1}$ of edge A1 to form the semi-infinite umbral visibility event surface labeled WEDGE1. Only a portion of WEDGE1 is shown in FIG. 2A, as it actually extends semi-infinitely away from the viewcell. In some embodiments, the plane of an event surface is represented by a 3D planar equation such as $ax+by+cz.=0$ Thus, in some embodiments, to form a (from-viewcell) first-order visibility event surface incident on a first-order silhouette edge and a viewcell vertex, the supporting polygon between the silhouette edge and the viewcell is first constructed. This construction is analogous to a pivot operation on the silhouette edge in the direction away from the backfacing component polygon and toward the viewcell until a supporting viewcell feature (edge or vertex) is encountered. In some embodiments the, wedge is formed by extending the non-silhouette edges of this supporting polygon away from the viewcell.

As illustrated in FIG. 2A, event surface WEDGE1 intersects edge B1, dividing B1 into the two segments B1V, which is first-order visible from the viewcell feature (the viewcell vertex SVV1) with respect to first-order silhouette edge A1, and B1O, which is not first-order visible from SVV1 with respect to first-order silhouette edge A1. Wedge 1 intersects first-order silhouette edge B1 (comprised of segments B1O and B1V) at the point labeled CSV. This point is a compound silhouette vertex.

For the purposes of illustration, assume now that the segment B1V is on the unoccluded side of all first-order visibility event surfaces formed by the edges of mesh A and the features of the VIEWCELL. In this case, B1V is outside (on the unoccluded side) of the first-order polyhedral aggregate umbrae (PAU) formed by the intersection of the first-order wedges with the mesh polygons and with each other. Under these conditions segment B1V is first-order visible from the viewcell.

If the segment B1V is first-order visible from the viewcell, then under the conservative assumptions of the first-order visibility model, segment B1V is assumed to be visible from any part of the viewcell. Consequently, the first-order visibility event surface incident on the segment B1V is constructed, by the previously described pivoting operation, which generates the supporting polygon (SP2), between the segment B1V and the supporting viewcell vertex labeled SVV2. As illustrated in FIG. 2A, the supporting polygon SP2 is defined by viewcell vertex $V_3$ (SVV2) the vertices of segment B1V. The previously described method of extending the supporting polygon is once again employed. The resulting first-order visibility event surface incident on BV1 is labeled WEDGE2.

WEDGE1 is an exact visibility event surface incident on edge A1 because in this case, the corresponding supporting viewcell vertex SVV1 is actually visible from the supported first-order silhouette edge A1.

WEDGE2 is not an exact visibility event surface through edge B1V because the conservative assumption of the first-order visibility model is violated in a very specific way: the corresponding supporting viewcell vertex SVV2 is not actually visible from the supported first-order silhouette edge B1V, it is occluded when viewed from this edge.

The exactness of any first-order visibility event surface (e.g., wedge) incident on a silhouette edge can be determined using a 2D visibility test which tests the visibility of the supporting viewcell vertex from the silhouette edge. In some embodiments, if the supporting viewcell feature is a vertex, then this is a from-point visibility test that is equivalent to testing the visibility of the first-order silhouette edge from the corresponding supporting viewcell vertex (SVV). According to some embodiments, segments of the first-order silhouette edge that are visible from the corresponding SVV support exact visibility event surfaces, and segments of the first-order silhouette edge that are occluded from the corresponding SVV support inexact/conservative visibility event surfaces.

In the special case where the silhouette edge is parallel to a supporting view/cell edge, a special from-edge visibility test is required. This is presented in detail in a later part of the specification.

Embodiments also include a method to increase the precision of inexact visibility event surfaces. In this method, for each segment of a first-order silhouette edge supporting an inexact wedge, a point on the surface of the viewcell is identified that is the visible supporting viewcell vertex (VSVV) for the segment. The VSVV is actually visible from the corresponding silhouette edge segment and forms a supporting polygon with the segment.

According to some embodiments, VSVV is determined by backprojection: using the silhouette edge as a linear light source and constructing the first-order, from-region (in this case from-edge) visibility event surfaces cast by polygon mesh objects from the linear light source back toward the viewcell. The intersection of these first-order wedges with the mesh polygons and with the viewcell comprise a from-silhouette-edge, on-viewcell visibility map. This visibility map contains the components of the viewcell that are visible from the silhouette edge. The VSVV is the supporting vertex of these visible components.

A wedge constructed by pivoting from the inexact silhouette edge segment to the corresponding VSVV is an adjusted or "higher-order" visibility event surface. These higher-order visibility event surfaces reflect the effect of partial occlusion of the viewcell (source) from the silhouette edge, an effect which is not accounted for by the simple, conservative first-order model of visibility propagation.

FIG. 2B shows the results of a backprojection process in which B1V is treated as a linear light source. A wedge labeled WEDGE_BACK incident on vertices $A_{1\_0}$ and $A_{1\_1}$ of edge A1 is constructed from segment B1V, treated as a linear light source. Note that edge A1 is a first-order silhouette edge with respect to the source region B1V. The area below WEDGE_BACK, in this example, is the unoccluded side of WEDGE_BACK, which indicates the portion of the viewcell visible from B1V.

The supporting polygon between B1V and A1 is a triangle with edge A1 and vertex VB of edge B1V. The corresponding wedge, WEDGE_BACK intersects the viewcell, creating a new visible contour of the viewcell which includes vertex VSVV.

In some embodiments, the process of constructing backprojected wedges such as WEDGE_BACK, employs the methods of first-order silhouette edge identification and pivot-and-sweep wedge construction as described in some embodiments in this specification. When these methods are applied using the viewcell as the view region, the resulting first-order wedges extend away from the viewcell and intersect polygon meshes, partitioning them into portions that are first-order visible from the viewcell and portions which are first-order occluded. In contrast, when these methods are applied to backprojection, the corresponding wedges extend away from the first-order silhouette edge (such as B1V), which acts as a lineal view region, and intersect the viewcell, partitioning the viewcell into portions that are first-order visible from the silhouette edge and portions which are first-order occluded from the silhouette edge. This partitioning of the viewcell defines a new visible viewcell boundary or contour (also called the visible supporting viewcell silhouette contour), which is conservatively visible from the first-order silhouette edge used as the lineal view region. The vertices of this contour are then tested to determine which is the supporting vertex (the visible supporting viewcell vertex) for the higher-order wedge to be constructed on the first-order silhouette edge used as a lineal view region.

The "adjusted" or higher order wedge is constructed by pivoting from BV1 to VSVV to form a supporting polygon SP_HIGH that is a supporting vertex between the edge B1V and the visible viewcell contour.

The non-silhouette edges of the higher-order supporting polygon SP_HIGH are extended through the vertices of B1V, as previously described, to form the higher-order wedge WEDGE_HIGH.

Thus, in order to construct higher-order visibility event surface on a from-viewcell, first-order silhouette edge, the first-order method of visibility propagation is applied in the reverse direction to determine the portion of the viewcell visible from the silhouette edge.

As shown in the later parts of the specification, a first-order silhouette edge supporting an inexact visibility event surface can be adaptively subdivided based on error metrics. Higher-order wedges can be constructed on the subdivided segments guided by these error metrics such that the result is a piecewise planar approximation of the corresponding exact quadric event surface. Further, the present method of first-order visibility, so applied realizes a new method of constructing quadric surfaces which insures that the constructed surface conservatively underestimates occlusion even as it converges on the exact result.

The preceding theoretical introduction to first-order visibility employed a single type of visibility event surface for the purposes of illustration. This type of visibility event surface is formed between a source (viewcell) vertex and a silhouette edge. This type of visibility event surface is called a SV-ME wedge. Another type of visibility event surface is used to construct a continuous from-region visibility event surface incident on non-convex polygon meshes. This type of visibility event surface is formed from a viewcell (source) edge and a mesh vertex and is called a SE-MV wedge, which is discussed in detail in other parts of this specification.

In conclusion, first-order wedges are constructed using the simple first-order "pivot-to-viewcell" method from first-order silhouette edges. First-order wedges can be intersected with mesh polygons and other wedges form continuous from-viewcell visibility maps or continuous first-order PAU.

Both of these data structures conservatively underestimate the from-viewcell occlusion. Embodiments include implementations in which conservative, from-viewcell PVS is derived from either first-order visibility maps or first-order PAU.

Higher-order visibility event surfaces can be constructed by a backprojection process in which first-order visibility methods are applied to determine portions of a viewcell visible from a silhouette edge.

The above detailed description introduces the first-order visibility model of visibility propagation and a general overview of some methods for constructing first-order visibility event surfaces. The details of first-order silhouette edge identification and first-order wedge construction are provided in further detail in the specification.

FIG. 1-FIG. 6 Detailed Description: First Embodiment Employing Conservative Linearized Umbral Event Surfaces Constructed Using Pivot-and-Sweep Method.

One embodiment includes a method of conservative, linearized visibility map construction that is based on a simplified first-order model of visibility propagation in polyhedral environments. As previously described in embodiments, the first-order visibility model is based on the conservative assumption that if a silhouette edge of a polygon mesh is visible from any part of a viewcell, then it is visible from all parts of the viewcell. According to embodiments of this model, silhouette edges (called first-order silhouette edges) are limited to those triangle mesh edges that have one component polygon that is backfacing for all vertices of the viewcell and another component polygon that is front facing for at least one vertex of the viewcell. Additionally, to be a first-order silhouette edge, the component polygons is backfacing with respect to each other.

This model also leads to a method in which first-order conservative linearized umbral event surfaces (called CLUES, or also called first-order wedges or simply wedges) are formed either by pivoting from the (first-order) silhouette edge to a vertex of the viewcell (SV-ME wedge derived from the pivoted supporting polygons) or by sweeping from an (first-order) inside corner silhouette vertex through viewcell silhouette edges (SE-MV wedges derived from swept supporting triangles). The method also employs SE-ME wedges generated in the special case where the supported silhouette edge is parallel to a supporting viewcell edge. The first-order embodiment always produces a conservative umbra boundary, and in some cases, it is the exact umbra boundary.

Other embodiments are based on a higher-order model of visibility propagation in polyhedral environments. This model does not assume that if a silhouette edge is visible from any part of a viewcell then it visible from all parts of the viewcell. Rather, this model accounts for portions of the viewcell that are occluded from a silhouette edge. The higher-order model forms the basis of alternate embodiments which can produce a more precise approximation to the exact umbra boundaries in cases where the first-order method is imprecise.

The first-order embodiment of the method is described first.

FIG. 1 Construction of First-Order Wedges

FIG. 1 shows a flowchart disclosing the general organization of the construction of first-order wedges formed by a polygon mesh object and a convex viewcell using the pivot and sweep method. According to some embodiments, process flow starts at step 110, where polygons of the polygon mesh object are individually examined for first-order silhouette edges. The method of identifying first-order silhouette edges is disclosed in detail in FIG. 3. Embodiments disclosing the order in which the polygons are examined is illustrated in FIG. 20, that illustrates an algorithm enforcing a strict front to back order.

Process flow proceeds to step 112 to determine if the first-order silhouette edge encountered in step 110 is parallel to the supporting viewcell edge.

Figure 4A:
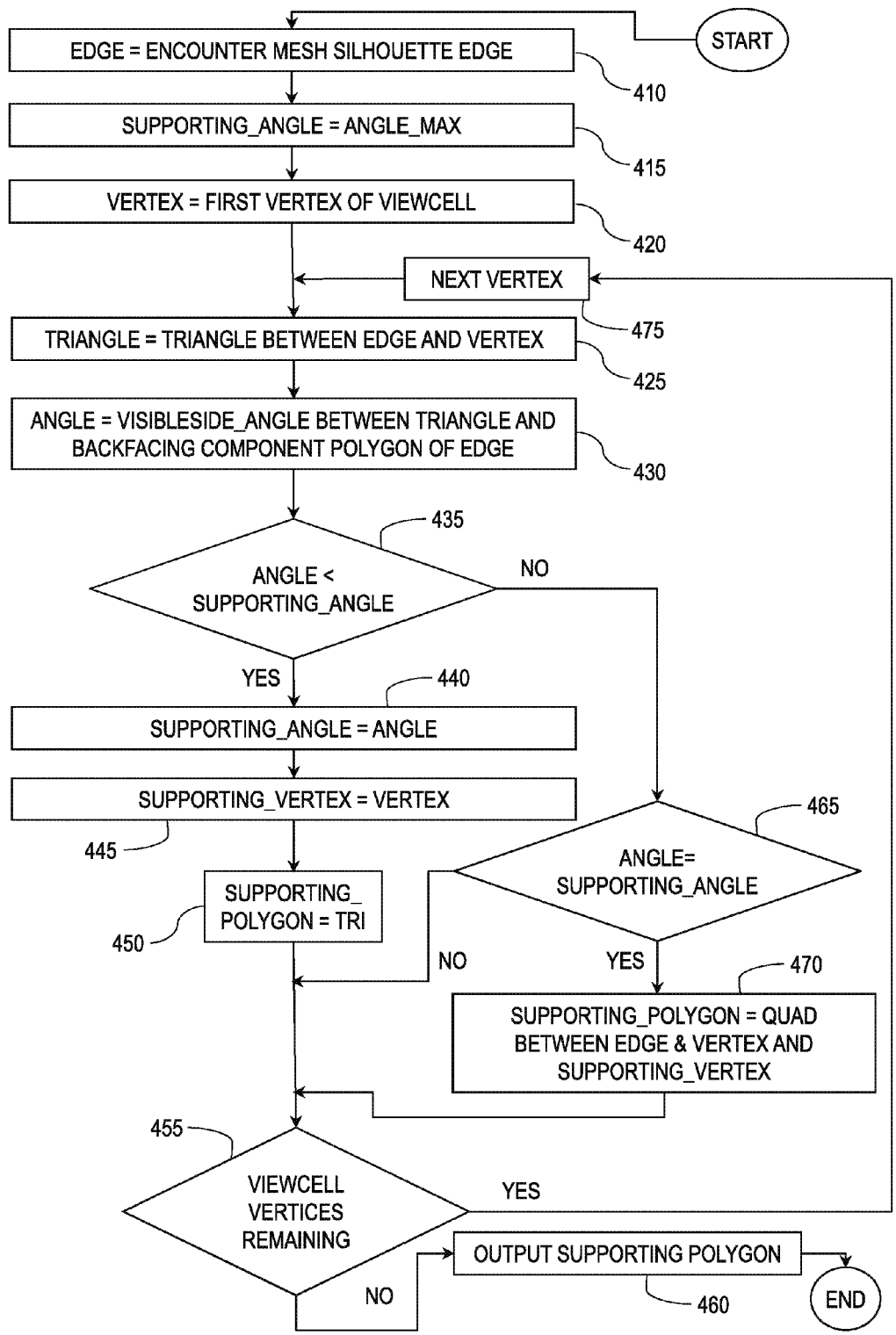
FIG. 4A is an exemplary flowchart showing the method of constructing a SV-ME supporting polygon incident on mesh silhouette edge.

If, in decision step 112, it is determined that the first-order silhouette edge is not parallel to the supporting viewcell vertex, then process flow proceeds to step 114 to construct a supporting polygon between the silhouette edge and the viewcell. FIG. 4A illustrates the details of this construction.

Process flow proceeds to step 116 to construct the SV-ME wedge incident on the first-order silhouette edge by extending specific edges of the corresponding pivoted supporting polygon incident on vertices of the first-order silhouette edge. Additional details of step 120 are disclosed in FIG. 6A.

If the first-order silhouette edge is parallel to a supporting silhouette then process flow proceeds from 112 to step 118.

In step 118, the supporting quadrangle, called a SE-ME (source edge-mesh edge) quadrangle is constructed by pivoting from the viewcell edge to the viewcell as previously described.

Process flow proceeds to step 120 to construct the SE-ME wedge corresponding to the SE-ME supporting quadrangle by extending the line segments formed by diagonal vertices of the SE-ME supporting quad. The edges of the SE-ME wedge are comprised of the supported silhouette edge and the two lines formed by extending the diagonal line segments through the silhouette edge vertices and away from the viewcell.

Process flow proceeds from steps 116 or 120 to decision step 125 to determine if adjacent silhouette edges form an outside corner of the first-order silhouette contour. In some embodiments, this determination is made using a simple test for the relative orientation of adjacent silhouette edges. Each edge, being on the boundary of a polygon mesh, has a natural orientation in which one normal to the edge is facing outside the polyhedron (outfacing normal) and the opposite normal is facing inside the polyhedron. If the two outfacing normals for adjacent silhouette edges are facing away from each other, then the shared silhouette vertex is an inside corner of the silhouette contour. Otherwise the shared silhouette vertex forms an outside corner.

If it is determined, in decision step 125, that the adjacent silhouette edges form an outside corner of the silhouette contour, then process flow proceeds to step 140 to intersect the wedges incident on the adjacent silhouette edges with each other. In some embodiments, if the adjacent SV-ME wedges were generated by pivoting to the same supporting viewcell vertex (SVV), then they exactly intersect at a common edge. Otherwise, the adjacent SV-ME wedges intersect each other in their polygon interiors and an explicit polygon-polygon intersection determination is made. In either case, the intersecting SV-ME wedges produce continuous umbral event surface spanning portion of the first-order silhouette contour formed by the two supported silhouette edges. In some embodiments, adjacent SV-ME wedges are not intersected. In these embodiments the step 140 is optional. A SV-ME wedge which is not intersected with an adjacent SV-ME wedge can still be intersected with mesh polygons and the resulting wedge-mesh polygon intersection tested to determine if it is a from-viewcell occlusion boundary. Additional discussion of intersecting adjacent SV-ME wedges is given in conjunction with FIG. 7J and FIG. 7K.

If it is determined, in decision step 125, that the adjacent silhouette edges do not form an outside corner of the silhouette contour, then process flow proceeds from step 125 to step 130. This case corresponds to an inside corner of a first-order silhouette contour.

In some embodiments, such inside corners formed by two silhouette edges that are connected by a vertex are simple silhouette vertices. Using the first-order model of visibility propagation inside corners can also form on compound silhouette contours in which the component silhouette edges do not share a vertex in the original manifold mesh. These are called compound silhouette vertices (CSVs), they correspond to from-region t-vertices of the manifolds and are discussed in detail in a later part of this specification.

In step 130, one or more supporting swept triangles are formed between the inside corner mesh silhouette vertex and certain edges of the viewcell that are from-point silhouette edges with respect to the inside corner mesh silhouette vertex. Additional details of this process are disclosed in FIG. 5A and FIG. 5B.

Process flow proceeds to step 135, the corresponding SE-MV wedges are generated from the swept triangles by extending the edges of the swept triangles through the inside corner mesh silhouette vertex. Additional details of this process are disclosed in FIG. 6B.

Alternate embodiments are possible in which the set of first-order wedges are constructed using a different method. For example, in one alternate embodiment, the entire conservative supporting hull between the viewcell and the polygon mesh objects may be constructed, and the first-order wedges selected as a subset of the conservative supporting hull polygons.

Figure 3:
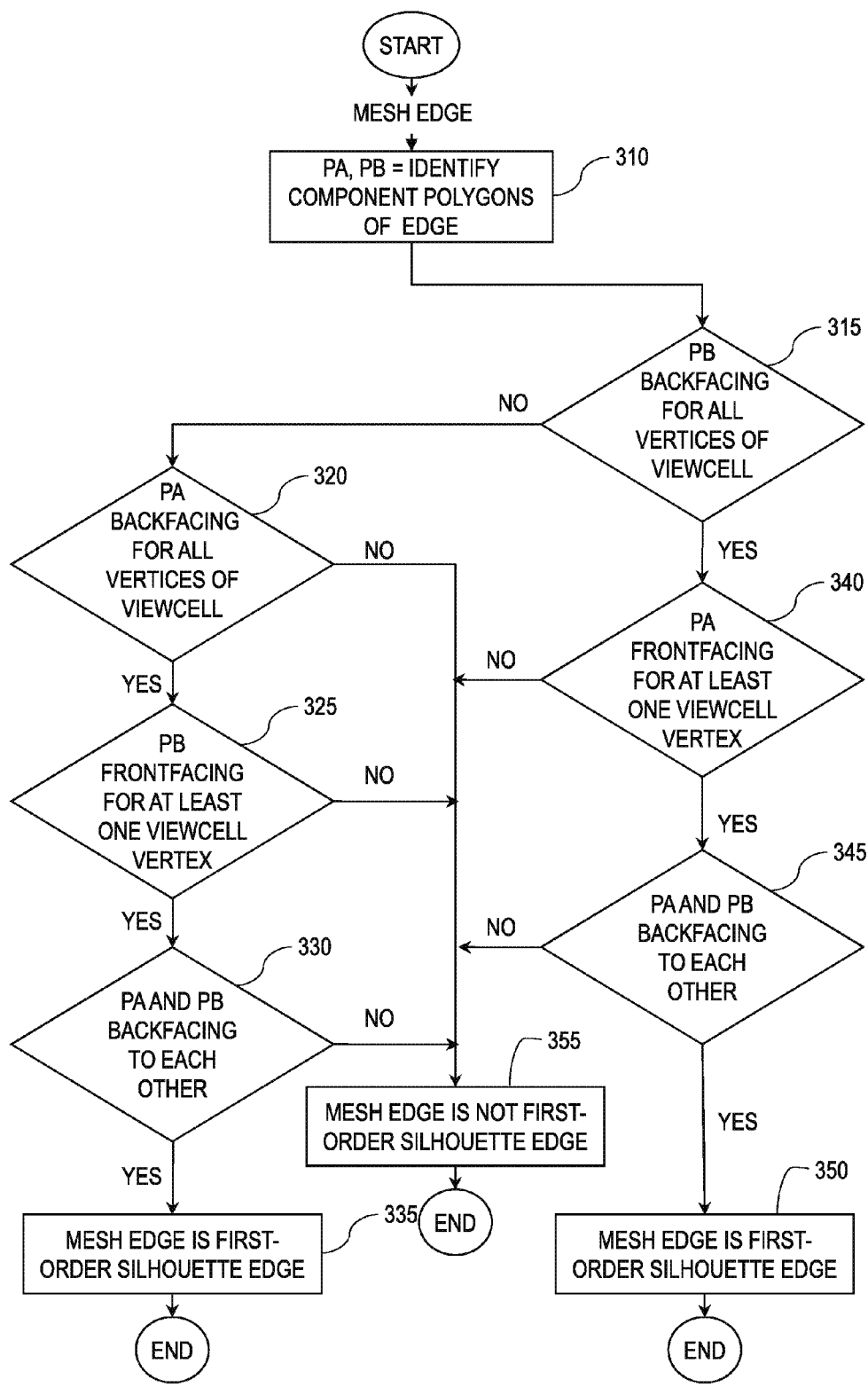
FIG. 3 is an exemplary flowchart showing the method of identifying first-order from-region (in this case from-viewcell) silhouette edges.

FIG. 3 shows details of the step 110 in FIG. 1, the identification of first-order silhouette edges. According to some embodiments, the process illustrated in FIG. 3 is entered at step 110 of FIG. 1. In some embodiments, the process of identifying first-order silhouette edges starts at step 310 to identify the component polygons of the edge. In some embodiments, this process is facilitated by storing the polygon mesh as a linked data structure such as a winged-edge data structure, in which a reference to the component polygons for each edge is stored. In other embodiments, any desired data structure is used to represent the polygon mesh. In one implementation, the polygon mesh is a closed manifold mesh in which each edge is shared by exactly two component polygons.

Process flow proceeds to decision step 315 to test one component polygon, called polygon B or PB, to determine if the component is backfacing for all vertices of the viewcell. In this case, all vertices of the viewcell would be on the backfacing side of the plane that contains the component polygon.

If, in decision step 315 it is determined that PB is not backfacing for all viewcell vertices, then process flow proceeds from step 315 to step 320 to test the other component polygon, called PA, as described in step 315.

If, in decision step 320, it is determined that PA is backfacing for all vertices of the viewcell, then process flow proceeds to step 325 to determine if component triangle PB is front facing for at least one viewcell vertex.

If, in decision step 325, it is determined that PB is front facing for at least one viewcell vertex then process flow proceeds to decision step 330 to test PA and PB to determine if they are backfacing with respect to each other.

If, in decision step 330, it is determined that PA and PB are backfacing relative to each other, then process flow proceeds to step 335, where the edge being tested is a first-order silhouette edge.

If, in decision step 330, it is determined that PA and PB are not backfacing relative to each other, then process flow proceeds to step 355 which returns a result that the edge being tested is not a first-order silhouette edge.

If in step 315, if PB is backfacing for all vertices of the viewcell, process flow proceeds to step 340 to determine if PA is frontfacing for at least one viewcell vertex. If PA is frontfacing for at lest one viewcell vertex, process flow proceeds to step 345 to determine if PA and PB are backfacing to each other as functionally described in step 330.

If PA and PB are backfacing with respect to each other, process flow proceeds to step 350 which returns a result that the edge being tested is a first-order silhouette edge. If PA and PB are not backfacing to each other, process flow proceeds from 345 to 355. If PA is not frontfacing for at least one viewcell vertex, process flow proceeds from 340 to 355. If any of the tests in steps 320, 325, 330, 340, or 345 fail, then the mesh edge is not a first-order silhouette edge, as indicated in step 355.

FIG. 4A Method of Constructing of SV-ME and SE-ME Supporting Polygons

FIG. 4A is a flowchart showing the method of constructing a SV-ME supporting polygon incident on a (first-order) mesh silhouette edge. FIG. 4A gives additional detail of the process shown in step 116. According to some embodiments, the process illustrated in FIG. 4A is entered from step 116 in FIG. 1.

In some embodiments, the process of constructing supporting polygons starts at step 410 upon encountering a silhouette edge of the polygon mesh. In the present embodiment this is a first-order silhouette edge, although other embodiments may potentially use higher order silhouette edges.

Process flow proceeds to step 415 to set a SUPPORTING_ANGLE between the first-order silhouette edge and the viewcell to a MAX value (e.g., 180 degrees). According to some embodiments, the supporting angle is defined as the angle formed when pivoting a plane through the first-order silhouette edge, starting in the plane of the backfacing component polygon and pivoting toward the viewcell (in the general direction of the normal of the backfacing component polygon) until the first vertex or edge of the viewcell is encountered. The position of the pivoting plane on contact with the viewcell is the plane of the supporting polygon between the silhouette edge and the viewcell. The angle traversed during the pivot is called the supporting angle or the pivot angle, and it is measured between the supporting plane and the plane of the backfacing component polygon of the silhouette edge. The viewcell vertex, or edge if the supporting polygon is SE-ME type, that results in the smallest pivot angle is the supporting vertex or supporting edge.

The remainder of FIG. 4A shows the process of identifying the supporting viewcell vertex and constructing the supporting polygon. Process flow proceeds to step 420 to set the VERTEX to the first vertex of the viewcell. In embodiments, the VERTEX is a candidate vertex that is tested to determine if the candidate vertex is a supporting vertex. Process flow proceeds to step 425 to construct a triangle between the mesh silhouette edge EDGE and VERTEX. Process flow proceeds to step 430 to measure the angle between the visible sides of the plane of the TRIANGLE and the plane of the backfacing component polygon of the silhouette edge using a standard method for measuring the angle between planes at their line of intersection. Process flow proceeds to step 435 to compare this ANGLE to the current value of the SUPPORTING_ANGLE. If the ANGLE is less than the current value of the SUPPORTING_ANGLE, then process flow proceeds to step 440 to set the SUPPORTING_ANGLE to ANGLE. Process flow proceeds to 445 to set the SUPPORTING_VERTEX to the current VERTEX.

Process flow proceeds to step 450, where the supporting polygon is set to the triangle formed by the silhouette edge and the supporting vertex.

Process flow proceeds to step 455 to determine if unprocessed viewcell vertices remain. If, in decision step 455, it is determined that no unprocess viewcell vertices remain, then process flow proceeds to step 460, where the supporting polygon is output.

If, in decision step 455, it is determined that unprocessed viewcell vertices remain, then process flow proceeds to step 475, where the next viewcell vertex is selected for processing.

If, in decision step 435, it is determined that the ANGLE (pivot angle) measured is not less than the current SUPPORTING_ANGLE, then process flow proceeds to step 465 to determine if the pivot angle (ANGLE) equals the current value of SUPPORTING_ANGLE. If this condition is true, then two vertices of the viewcell form the same pivot angle with the silhouette edge, corresponding to a SE-ME supporting polygon, and process flow proceeds to step 470 to set the quadrangle between both viewcell vertices and the viewcell edge (an SE-ME supporting polygon).

A quadrangular supporting polygon is constructed in step 470 only in the special case when the supporting angle between the silhouette edge and two viewcell vertices is equal. For a convex viewcell, which is assumed in the present embodiment, this occurs only when the two supporting viewcell vertices lie on an edge of the viewcell that is parallel to the mesh silhouette edge. In this case, the visibility from the viewcell "across" the silhouette edge is not determined by the usual from-point visibility triangle but instead by a from-segment visibility quadrangle.

Other embodiments are possible which deal with this special case differently, for example by constructing two supporting triangles and a swept triangle incident on the parallel supporting viewcell edge. Using this approach, the resulting corresponding adjacent UBPs will not intersect only at an edge, but instead, they will overlap on their planes, causing a local degeneracy of the bounded polyhedral umbra volume. The present method of identifying quadrangular supporting polygons avoids such degeneracies in later steps.

Regardless of whether the candidate supporting polygon is a triangle or a quadrangle, the process flow proceeds from step 470 to step 455 to determine if any unprocessed vertices remain as described above. If viewcell vertices remain, then process flow returns to step 475, where the next viewcell vertex is selected. Subsequently the process follows the previously described steps.

At the final step 460, the process outputs a supporting polygon that is either a triangle, formed by the mesh silhouette edge and a vertex of the viewcell, or a quadrangle that is formed between the mesh silhouette edge and a viewcell edge.

Alternate embodiments of the method of constructing SV-ME supporting polygons are possible. In one alternate embodiment, the SUPPORTING_VERTEX corresponding to one first-order silhouette edge is limited to those viewcell vertices directly connected to the SUPPORTING_VERTEX for an adjacent first-order silhouette edge, wherein the adjacent edges form an outside corner (convex feature) of the mesh. This method is similar to the method employed in the classic prior-art method of divide-and-conquer method of constructing a convex hull in 3D. In the present application the viewcell is a very simple polyhedron and the speedup afforded by this method is very limited.

Figure 4B:
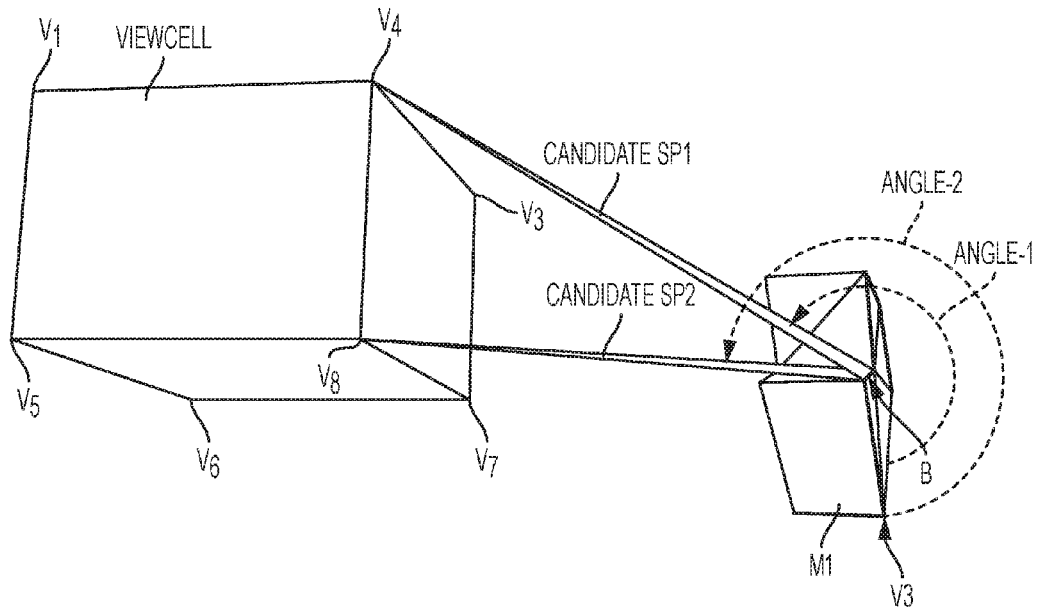
FIG. 4B shows a mesh object M1 a viewcell, and two candidate supporting polygons with their respective pivot angles.

FIG. 4B shows a mesh object M1 and a viewcell. The VIEWCELL and polygon mesh M1 are the same objects shown in FIG. 7A and FIG. 7B. In FIG. 4B the viewpoint is between that of FIG. 7A and FIG. 7B. A first-order silhouette edge labeled B also appears in all three figures. The view direction in FIG. 4B is very close to being parallel to edge B. Thus edge B is seen nearly edge-on as a point. A vertex of the polygon mesh M1 is shown as vertex V3 in FIG. 4B and FIG. 7B.

Two candidate supporting polygons are shown as CANDIDATE SP1 and CANDIDATE SP2. A candidate supporting polygon is identified for first-order silhouette edge B by constructing a triangle formed by edge B and a vertex of the viewcell. The angle of that the plane of this supporting polygon forms with the plane of the backfacing component polygon sharing edge B is measured. This angle corresponds to the variable SUPPORTING_ANGLE determined in step 425 of FIG. 4A and used in steps 435 and 465 of the same figure. In the example shown in n FIG. 4B the backfacing component polygon of first-order silhouette edge B is the triangle formed by edge B and vertex V3.

In this example, the angle formed by CANDIDATE SP1 (corresponding to viewcell vertex V4 is indicated by a dashed arc labeled ANGLE-1.

In this example, the angle formed by CANDIDATE SP2 (corresponding to viewcell vertex V8 is indicated by a dashed arc labeled ANGLE-2.

From the two arcs, it is apparent that ANGLE-1 is less than ANGLE-2. According the exemplary flowchart of FIG. 4A, CANDIDATE SP1 would be retained as a candidate for the actual supporting polygon on first-order silhouette. If all the vertices of VIEWCELL are tested by the process shown in the exemplary flowchart of FIG. 4A it will be found that vertex V4 results in the supporting polygon (CANDIDATE SP1) giving the smallest supporting angle. CANDIDATE SP1 is shown as the actual supporting polygon SPB in FIG. 7D.

Standard angle measures can be employed to determine the angle including the cross product between the normal vectors of the plane of the backfacing polygon and the candidate supporting polygon.

Figure 4C:
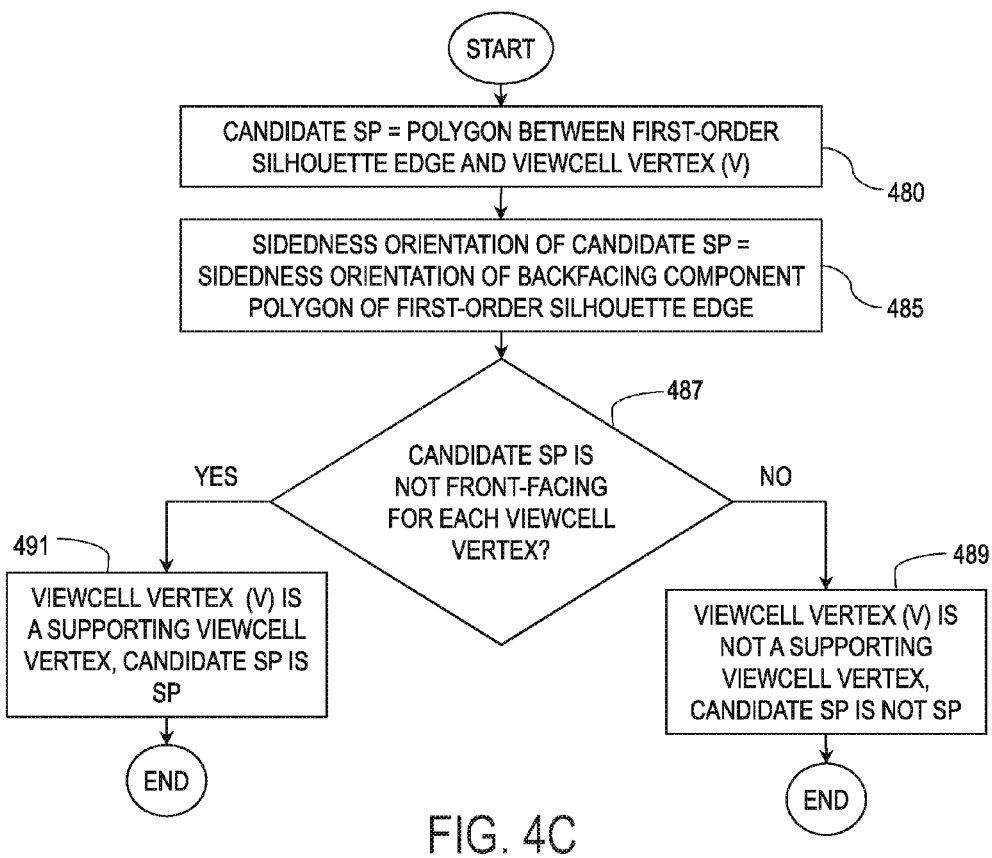
FIG. 4C is an exemplary flow diagram showing a test for determining if a polygon formed between a first-order silhouette edge and a viewcell vertex is a supporting polygon.

FIG. 4C is a flow diagram showing a test for determining if a polygon formed between a first-order silhouette edge and a viewcell vertex is a supporting polygon.

Alternate embodiments are possible in which SV-ME supporting polygons are identified by considering both the "sidedness orientation" of the candidate supporting polygon (relative to the interior of the polygon mesh) and the orientation of the candidate supporting polygon relative to the viewcell vertices.

In one embodiment, mesh polygons are all assumed to be "outside" polygons which have their normal vector locally oriented away from the "inside" of the region contained by the polygon mesh. In such embodiments, all mesh polygons of a polygon mesh consistently have this same "sidedness" orientation.

A polygon is a planar structure which can have two sides, corresponding to the two sides of the plane containing the polygon. Exemplary embodiments include polygon meshes which are manifold or closed. Manifold meshes divide the volume of space in which they are embedded into an inside and an outside. In computer graphics, it is useful to employ manifold meshes in which the normal vector of each polygon in the mesh is locally oriented to face away from the inside of this enclosed volume. This can be called the "outside" side of the polygon. The opposite side can be called the "inside" side of the polygon. If all polygons have this consistent sidedness orientation in a mesh, then no inside side of a polygon should ever be visible from the outside.

In exemplary embodiments, it can be established that polygons of a mesh have the same sidedness orientation by examining the vertex orderings of adjacent polygons i.e., polygons which share an edge. (See Schneider (2003) Schneider, Philip J., Eberely, David H., "Geometric Tools for Computer Graphics" Morgan Kaufmann 2003 pp. 342-345, the entire contents of which are incorporated herein by reference). Let $F_0$ and $F_1$ be two adjacent polygons sharing an edge comprised of two vertices $V_1$ and $V_3$. If vertices $V_1$ and $V_3$ occur in the order $V_1$ followed by $V_3$ for polygon $F_0$, then they must occur in polygon $F_1$ in the order $V_3$ followed by $V_1$. Adjacent polygons in which shared edges have this ordering are said to have a consistent vertex ordering. Polygons with a consistent vertex ordering have the same sidedness orientation. The vertex ordering reflects the order in which the vertices are stored for each triangle. Vertices accessed in this same order for a triangle defines vectors (triangle edges) whose cross products are the coefficients A, B, C of the plane equation or normal vector of the triangle. In some embodiments, all mesh triangles have consistent vertex orderings and all will have normal vectors that point away from the inside of the mesh, i.e. they are all outside facing triangles. Embodiments may employ known algorithms to identify and repair inconsistent vertex orderings in a polygon mesh prior to processing (See MakeConsistent procedure of Schneider (2003), pp 345).

FIG. 4D is an exemplary diagram showing two adjacent polygons $F_0$ and $F_1$ in which the polygons have a consistent vertex ordering. Note that for polygon $F_0$ the shared edge is accessed in $V_1$-$V_3$ order while for the adjacent polygon and $F_1$ the same shared edge is accessed in $V_3$-$V_1$, thus meeting the definition of consistent ordering. Adopting a right-hand rule convention, the normal of both polygons points out of the plane of the image.

FIG. 4E is an exemplary diagram showing two adjacent polygons $F_0$ and $F_1$ in which the polygons do not have a consistent vertex ordering.

In one embodiment, a candidate SV-ME supporting polygon for a first-order silhouette edge is formed between a viewcell vertex and the first-order silhouette edge. The candidate supporting polygon is given the same sidedness orientation as the backfacing mesh polygon sharing the first-order silhouette edge. (Using this consistent sidedness orientation, for example, a person walking across the first-order silhouette edge on the "outside" surface of the backfacing mesh polygon would encounter the "outside" surface of the candidate supporting polygon). The orientation of the plane of each candidate supporting polygon is then examined relative to the viewcell vertices. If the plane of the candidate supporting polygon is not front-facing with respect to each viewcell vertex, then the viewcell vertex forming the candidate supporting polygon is a supporting viewcell vertex, and the candidate supporting polygon is a supporting polygon.

According to some embodiments, the employed definition of front-facing with respect to a viewcell vertex excludes viewcell vertices which are in the plane of the candidate supporting polygon (i.e. admitting a supporting viewcell vertex as not front-facing). Alternate embodiments can employ variations of the definitions of backfacing and front facing to determine that a candidate supporting polygon is not front-facing with respect to each viewcell vertex. In at least one exemplary embodiment, the test includes establishing that the candidate supporting polygon is backfacing with respect to each viewcell vertex, where the definition of a plane that is backfacing to a vertex includes vertices which are in the plane (i.e. admitting a supporting viewcell vertex as backfacing to a supporting polygon).

According to some embodiments, the process illustrated in FIG. 4C is entered from step 480. In step 480 a candidate supporting polygon is formed between the first-order silhouette edge and a viewcell vertex (V).

Process flow proceeds to step 485 to set the sidedness orientation of the candidate supporting polygon formed in step 480 to be the same as the backfacing component polygon sharing the first-order silhouette edge.

Process flow proceeds to step 487 to determine if the candidate supporting polygon is not front-facing for each of the viewcell vertices. If, in decision step 487, it is determined that the candidate supporting polygon is not front-facing with respect to each viewcell vertex then process flow proceeds to step 491 to identify the viewcell vertex (V) as a supporting viewcell vertex and to identify the candidate supporting polygon as a supporting polygon.

If, in decision step 487, it is determined that the candidate supporting polygon is front-facing for any viewcell vertex then process flow proceeds to step 489 to identify the viewcell vertex (V) as not a supporting viewcell vertex and to identify the candidate supporting polygon as not a supporting polygon.

The test illustrated by exemplary flowchart of FIG. 4C can also be employed to identify SE-ME type supporting polygons.

Figure 5A:
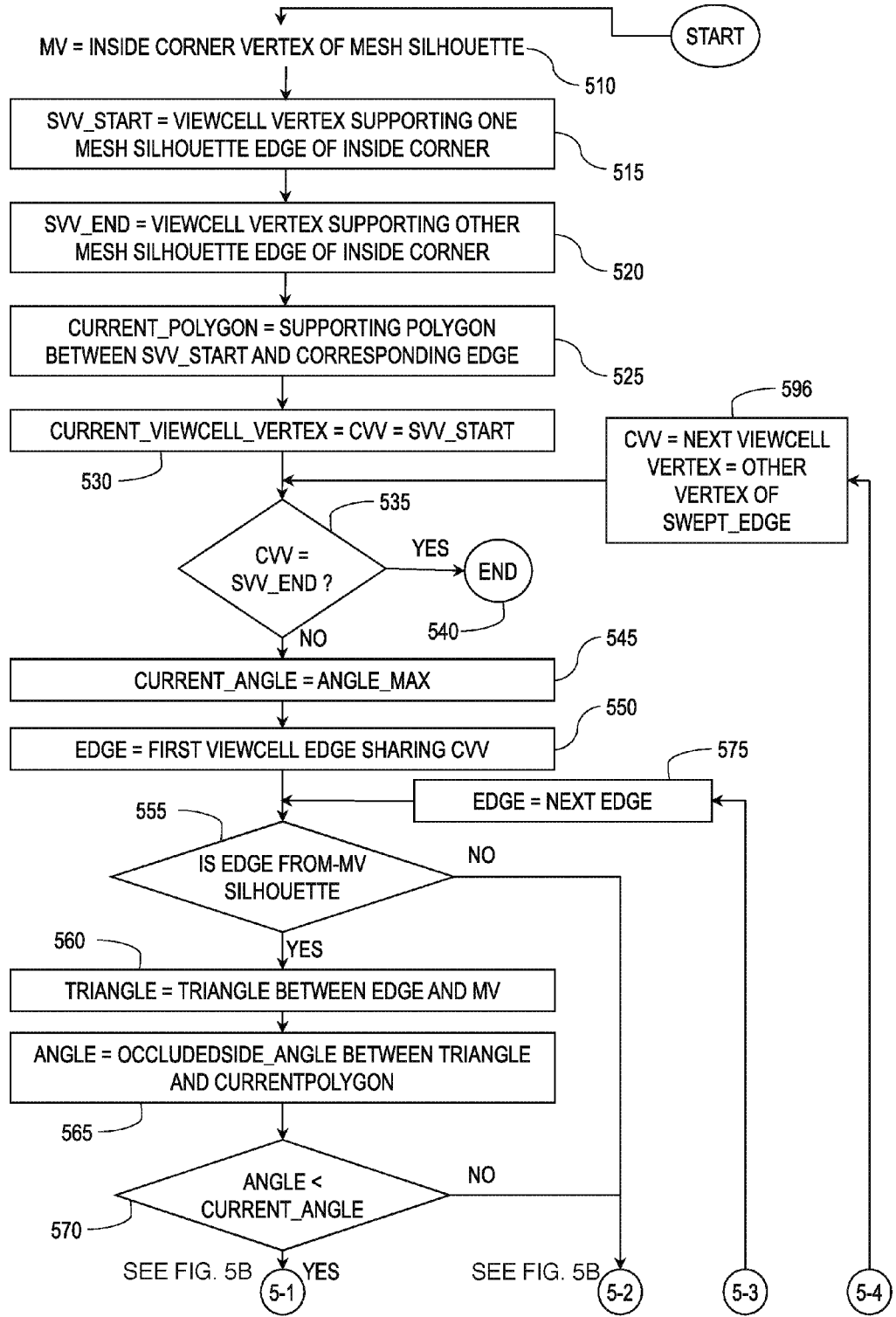
FIG. 5A is an exemplary flowchart showing the method of constructing SE-MV swept triangle incident on an inside corner mesh silhouette vertex.
Figure 5B:
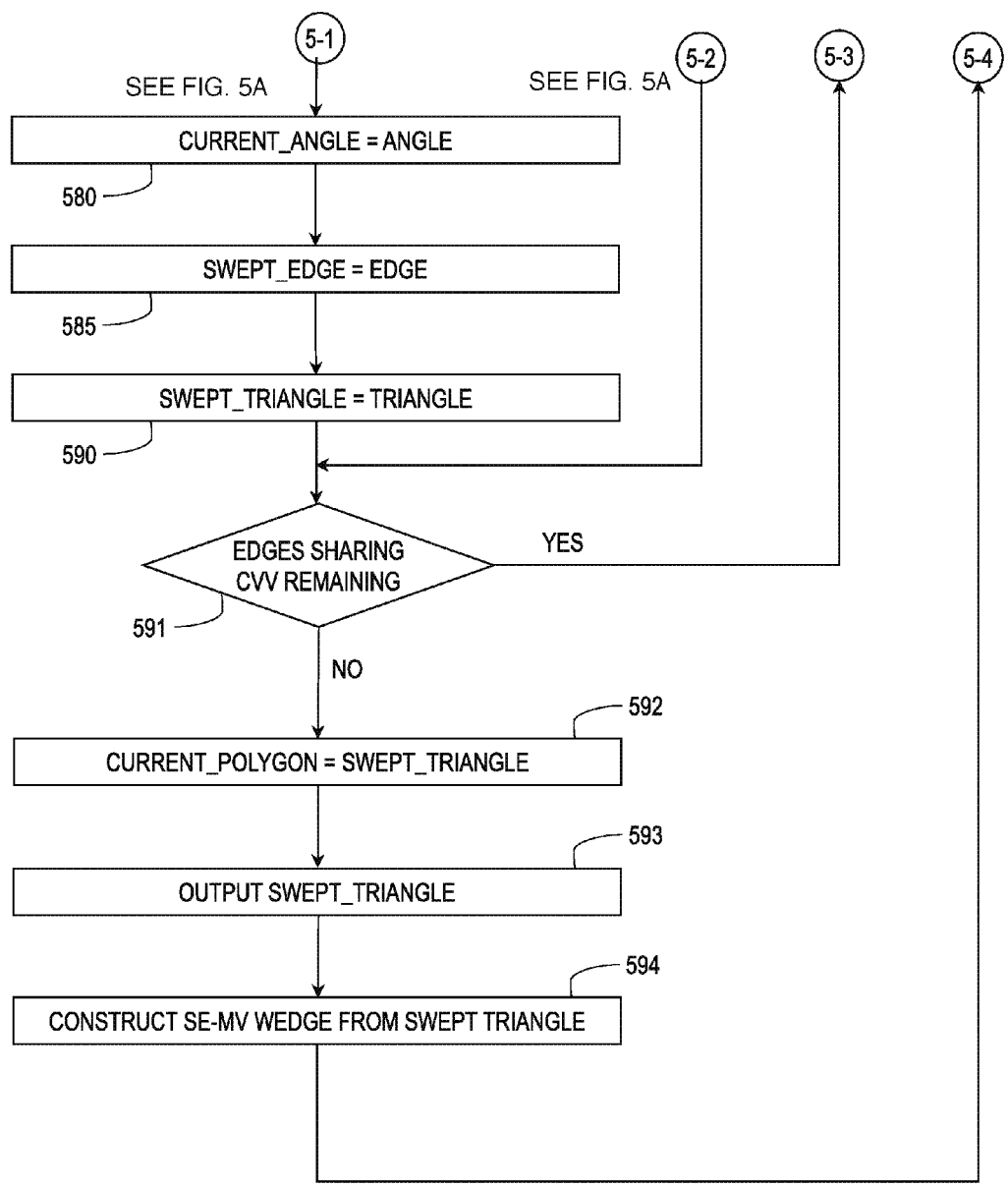
FIG. 5B is a continuation of FIG. 6A.

FIG. 5A and FIG. 5B Flowchart Showing a Method of Constructing SE-MV Supporting (Swept) Triangles FIG. 5A and FIG. 5B comprise a flowchart showing the method of constructing SE-MV supporting swept triangles incident on an inside corner mesh silhouette vertex. This is additional detail of the step 130 of FIG. 1. According to some embodiments, the process illustrated in FIGS. 5A and 5B is entered from step 130 in FIG. 1.

In some embodiments, the process of constructing SE-MV supporting swept triangles starts at step 510 upon encountering an inside corner of a first-order silhouette contour of a polygon mesh. This inside corner may be formed from a simple first-order silhouette contour in which two first-order silhouette edges share a vertex. If the normals of the silhouette edges forming the intersection (with normal direction assumed to be facing away from the interior of their component polygons) are facing each other, then the intersection is an inside corner vertex.

Alternatively, the inside corner may be a vertex of a compound silhouette contour formed by the intersection of a wedge with a first-order silhouette edge. In the latter case, the inside corner silhouette mesh silhouette vertex is called a compound silhouette vertex (CSV).

Process flow proceeds to step 515 to identify the supporting viewcell vertex (SVV) for one of the silhouette edges forming the vertex using, for example, the process disclosed in FIG. 4A. The identity of this vertex is stored as the variable SVV_START. Process flow proceeds to step 520, were the process for step 515 is repeated for the other edge of the inside corner, and the result is stored as the variable SVV_END.

If either supporting polygon of the inside corner is a quadrangle (generated in FIG. 4A, step 470) then the supporting polygon has two SVVs. In this special case, care must be taken to select, in steps 515 and 520, the initial (SVV_START) or terminal (SVV_END) viewcell vertex in the chain as the vertex that is farthest removed from the other end of the chain.

Process flow proceeds to step 525, where the variable CURRENT_POLYGON is set to identify the supporting polygon between the viewcell vertex SVV_START and the corresponding supported edge of the polygon mesh.

Process flow proceeds to step 530, where an initial point for the sweep of the viewcell silhouette contour, which ultimately occurs between the viewcell vertices SVV_START and SVV_END, is set to be the viewcell vertex SVV_START and stored as the variable CVV, which holds the current vertex of the sweep.

Process flow proceeds to decision step 535 to compare CVV to SVV_END to determine if the sweep should be terminated.

If, in decision step 535, it is determined that the current viewcell vertex being processed (CVV) is the same as the last vertex in the sweep (SVV_END), then process flow proceeds to step 540 and terminates. If both edges of the inside corner have the same supporting point on the viewcell then the corresponding SV-ME wedges intersect along a common edge and there is no swept triangle corresponding to the inside corner vertex. This situation would be identified on the initial execution of step 535 and the sweep would be terminated without producing a swept triangle.

If, in decision step 535, it is determined that CVV is not SVV_END, then process flow proceeds to step 545 to set a variable CURRENT_ANGLE to a maximum value.

Process flow proceeds to step 550, where a first viewcell edge sharing the viewcell vertex CVV is selected and referenced by the variable EDGE.

Process flow proceeds to decision step 555 to determine if the edge EDGE is a (from-point) silhouette edge with respect to the inside corner mesh silhouette vertex MV.

If in decision step 555, it is determined that EDGE is a from-MV silhouette edge, then process flow proceeds to step 560 to form the triangle between the point MV and the edge EDGE. This triangle is a candidate swept triangle between MV and the viewcell, but it must be compared to other swept triangle candidates that share the same viewcell edge.

Process flow proceeds to 565, where the comparison of these other swept triangle candidates begins. In this regard, the angle between the current swept triangle candidate TRIANGLE and the CURRENT_POLYGON (supporting polygon) incident on MV is measured. The value is stored in the variable ANGLE. Since TRIANGLE and CURRENT_POLYGON share a common edge, the angle can be measured at the edge, adopting the convention that the angle is the angle between the occluded sides of each polygon. The occluded side of a supporting polygon is the side that connects to the interior of the mesh polygon at the silhouette edge. The occluded side of the candidate swept triangle is the side that connects to the interior of the mesh polygons at the vertex MV. This angle is stored in the variable ANGLE.

Alternate embodiments are possible in which the orientation of the swept triangle and corresponding SE-MV wedge relative to neighboring wedges is examined. All wedges are oriented surfaces having a "visible" side and an "invisible" side. For SE-MV wedges the visible side is the unoccluded side (visible on this side as a result of being not occluded by mesh polygon beyond the corresponding first-order silhouette edge). For SV-ME wedges the visible side is the "contained" side (visible as a result of being contained in the viewcell when looking through and beyond the corresponding inside-corner first-order silhouette vertex.

In one embodiment the SWEPT_TRIANGLE is constructed from MV viewcell edges which produce a SWEPT_TRIANGLE that has a containment orientation that is consistent with the occlusion orientation of an adjacent SE-MV wedge and consistent with the containment orientation of neighboring SV-ME wedges. SV-ME wedge which do not have this consistent orientation do not contribute to the continuous, conservative linearized umbral event surface.

The orientation of an SV-ME wedge is opposite to the orientation of the corresponding SV-ME supporting polygon. This inversion occurs as a result of the edges of the SV-ME supporting polygons being effectively "projected" through the inside-corner first-order silhouette vertex to form the corresponding SV-ME wedge. (e.g. a particular SE-MV supporting polygon which has the containment shaft between the viewcell and the inside-corner first-order silhouette vertex "below" the supporting polygon in the negative Y direction will produce a corresponding SE-MV wedge which has its "contained" or visible side in the positive Y direction.

Process flow proceeds to decision step 570, to determine if this angle (ANGLE) is less than the current value of CURRENT_ANGLE.

If, in decision step 570, it is determined that the current value of ANGLE is less than the value of CURRENT_ANGLE, then TRIANGLE is a candidate swept triangle and process flow proceeds to process 5-1, which starts at step 580 in FIG. 5B.

In step 580, the variable CURRENT-ANGLE is set to the value of ANGLE.

Process flow proceeds to step 585 to set the variable SWEPT_EDGE to refer to the edge EDGE.

Process flow proceeds to step 590 to set the variable SWEPT_TRIANGLE to reference the triangle TRIANGLE.

Process flow proceeds to decision step 591 to determine if any other edges sharing the current viewcell vertex CVV have been unprocessed.

If, in decision step 591, it is determined that unprocessed edges sharing the viewcell vertex remain, then process flow proceeds to process 5-3, which returns the process flow to step 575 (FIG. 5A), where the variable EDGE is set to reference the next viewcell edge sharing the vertex CVV. Process flow then returns to step 555 to generate the next candidate swept triangle and test it.

If, in decision step 591, is determined that no other unprocessed viewcell edges share the vertex, then process flow proceeds to step 592, where the CURRENT_POLYGON variable is set to reference the triangle SWEPT_TRIANGLE.

Process flow proceeds to step 593 to output the swept triangle SWEPT_TRIANGLE.

Process flow proceeds to step 594 to construct a SE-MV wedge from the swept triangle. Further details of this step is disclosed in FIG. 6B.

Process flow then proceeds to process 5-4, which starts at step 594 (FIG. 5A) to advance to the next connected viewcell vertex. Process flow then returns to step 535.

If, in decision step 555, it is determined that the viewcell edge is not a from-point silhouette edge from the point MV, then process flow proceeds to process 5-2, which starts at step 591 (FIG. 5B) to select a remaining viewcell edge for processing.

Figure 5C:
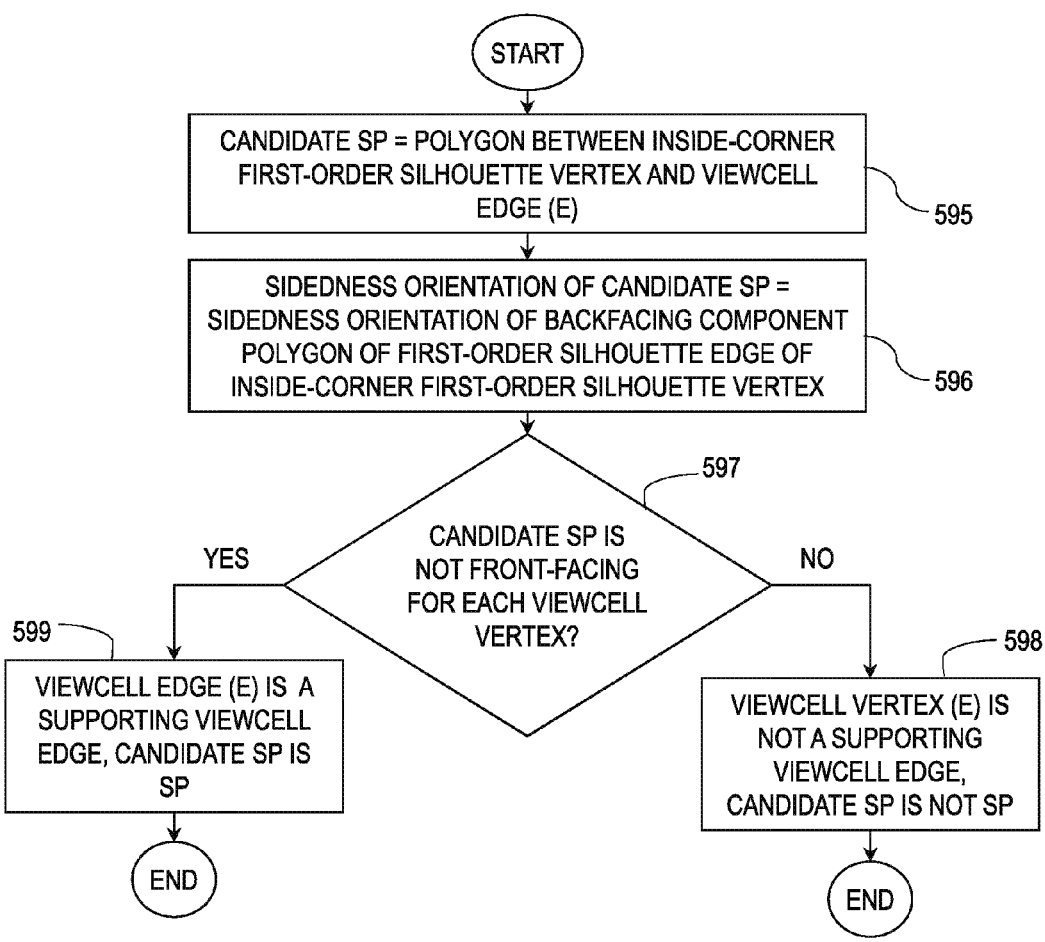
FIG. 5C is an exemplary flow diagram showing a test for determining if a polygon formed between an inside-corner first-order silhouette vertex and a viewcell edge is a supporting polygon.

FIG. 5C is a flow diagram showing a test for determining if a polygon formed between an inside-corner first-order silhouette vertex and a viewcell edge is a supporting polygon.

Alternate embodiments are possible in which SE-MV supporting polygons are identified by considering both the "sidedness orientation" of the candidate supporting polygon (relative to the interior of the polygon mesh) and the orientation of the candidate supporting polygon relative to the viewcell vertices.

In one embodiment, mesh polygons are all assumed to be "outside" polygons which have their normal vector locally oriented away from the "inside" of the region contained by the polygon mesh. In such embodiments, all mesh polygons of a polygon mesh consistently have this same "sidedness" orientation.

As previously described, a polygon is a planar structure which can have two sides, corresponding to the two sides of the plane containing the polygon. Exemplary embodiments include polygon meshes which are manifold or closed. Manifold meshes divide the volume of space in which they are embedded into an inside and an outside. In computer graphics, it is useful to employ manifold meshes in which the normal vector of each polygon in the mesh is locally oriented to face away from the inside of this enclosed volume. This can be called the "outside" side of the polygon. The opposite side can be called the "inside" side of the polygon. If all polygons have this consistent sidedness orientation in a mesh, then no inside side of a polygon should ever be visible from the outside.

In exemplary embodiments, it can be established that polygons of a mesh have the same sidedness orientation by examining the vertex orderings of adjacent polygons i.e., polygons which share an edge. (See Schneider, Philip J., Eberely, David H., "Geometric Tools for Computer Graphics" Morgan Kaufmann 2003 pp. 342-345, the entire contents of which are incorporated herein by reference). Let $F_0$ and $F_1$ be two adjacent polygons sharing an edge comprised of two vertices $V_1$ and $V_2$. If vertices $V_1$ and $V_2$ occur in the order $V_1$ followed by $V_2$ for polygon $F_0$, then they must occur in polygon $F_1$ in the order $V_1$ followed by $V_1$. Adjacent polygons in which shared edges have this ordering are said to have a consistent vertex ordering. Polygons with a consistent vertex ordering have the same sidedness orientation.

In one embodiment, a candidate SE-MV supporting polygon for an inside-corner first-order silhouette vertex is formed between a viewcell edge and the inside-corner first-order silhouette vertex. The candidate supporting polygon is given the same sidedness orientation as a backfacing mesh polygon sharing a first-order silhouette edge of the inside-corner first-order silhouette vertex. (Using this consistent sidedness orientation, for example, a person walking across the first-order silhouette edge on the "outside" surface of the backfacing mesh polygon would encounter the "outside" surface of the candidate supporting polygon). The orientation of the plane of each candidate supporting polygon is then examined relative to the viewcell vertices. If the plane of the candidate supporting polygon is not front-facing with respect to each viewcell vertex then the viewcell edge forming the candidate supporting polygon is a supporting viewcell edge, and the candidate supporting polygon is a supporting polygon.

According to some embodiments the process illustrated in FIG. 5C is entered from step 595. In step 595 a candidate supporting polygon is formed between the inside-corner first-order silhouette vertex and a viewcell edge (E). Process flow proceeds to step 596 to set the sidedness orientation of the candidate supporting polygon formed in step 595 to be the same as the backfacing component polygon sharing a first-order silhouette edge of the inside-corner first-order silhouette vertex. In exemplary embodiments, the sidedness orientation of the SE-MV supporting polygon can be set to be consistent with a previously determined adjacent SV-ME or SE-MV supporting polygon. Because the SE-MV supporting polygon shares an edge with these adjacent polygons the sidedness orientation can be set by insuring that the adjacent polygons have consistent vertex ordering.

Process flow proceeds to step 597 to determine if the candidate supporting polygon is not front-facing for each of the viewcell vertices. If, in decision step 597, it is determined that the candidate supporting polygon is not front-facing with respect to each viewcell vertex then process flow proceeds to step 599 to identify the viewcell edge (E) as a supporting viewcell edge and to identify the candidate supporting polygon as a supporting polygon.

If, in decision step 597, it is determined that the candidate supporting polygon is front-facing for any viewcell vertex then process flow proceeds to step 598 to identify the viewcell edge (E) as not a supporting viewcell edge and to identify the candidate supporting polygon as not a supporting polygon.

Figure 6A:
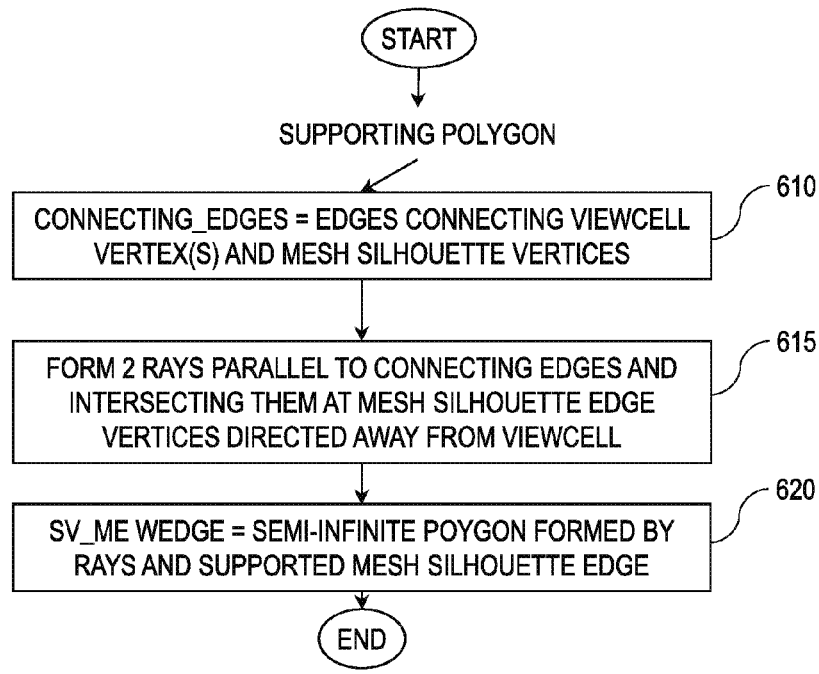
FIG. 6A is an exemplary flowchart showing a method of constructing SV-ME and SE-ME wedges from the corresponding SV-ME and SE-ME supporting polygons

FIG. 6A Flowchart Showing a Method of Constructing SV-ME and SE-ME Wedges From the Corresponding SV-ME and SE-ME Supporting Polygons FIG. 6A is a flowchart showing the process of constructing a SV-ME wedge from the corresponding supporting polygon. This provides additional detail to the step 116 in FIG. 1. According to some embodiments, the process illustrated in FIG. 6A is entered from step 116 in FIG. 1.

In some embodiments, the process to construct SV-ME and SE-ME wedges from corresponding SV-ME and SE-ME supporting polygons starts at step 610, where the connecting edges of the supporting polygon are identified as those edges which have one vertex that is a vertex of the viewcell and another vertex that is a vertex of the polygon mesh.

Process flow proceeds to step 615, to construct rays from the connecting edges by extending the connecting edges in a semi-infinite fashion away from the viewcell starting at the corresponding vertices of the supported silhouette edge. If the supporting polygon is a triangle, then the two edges that connect the viewcell and the silhouette edge are extended. If the supporting polygon is a quadrangle (from FIG. 4A, step 470), then the diagonals connecting the viewcell edge and silhouette edge can be extended. Extending the diagonals produces a larger wedge that actually reflects the visibility from the viewcell edge through the silhouette edge.

Process flow proceeds to step 620 to connect the extended edges to the corresponding (supported) polygon mesh silhouette edge to form the semi-infinite SV-ME (or SE-ME) wedges.

Figure 6B:
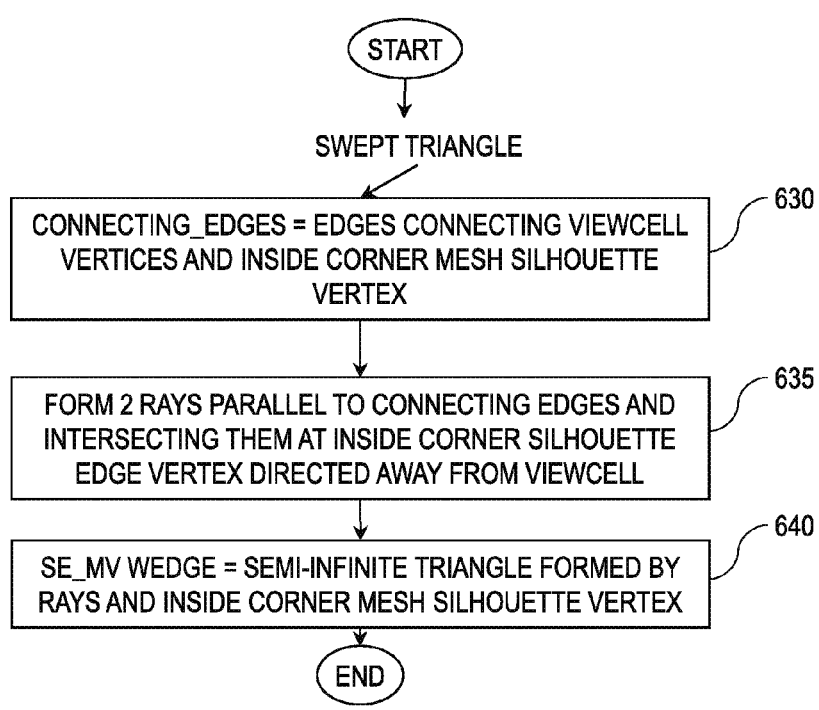
FIG. 6B is an exemplary flowchart showing a method of constructing SE-MV wedges from the corresponding SE-MV supporting polygons

FIG. 6B Flowchart Showing a Method of Constructing SE-MV Wedges From the Corresponding SE-MV Supporting Polygons FIG. 6B is a flowchart showing the process of constructing a SE-MV wedge from the corresponding swept triangle. This provides additional detail to the step 135 in FIG. 1. According to some embodiments, the process illustrated in FIG. 6B is entered from step 135 in FIG. 1.

In some embodiments, the process of constructing a SE-MV wedge from the corresponding swept triangle starts at step 630, where the connecting edges of the swept triangle are identified as those edges which have one vertex that is a vertex of the viewcell and another vertex that is a vertex of the polygon mesh.

Process flow proceeds to step 635 to construct rays from the connecting edges by extending the these edges in a semi-infinite fashion away from the viewcell starting at the corresponding mesh silhouette vertex.

Process flow proceeds to step 640 to connect the extended edges to the corresponding polygon mesh inside corner silhouette vertex to form the semi-infinite wedge.

The process of FIGS. 6A and 6B describe the construction of first-order wedges that are only restricted by their intersection with adjacent wedges on the silhouette contour. These may be called the initial wedges.

According to some embodiments, in subsequent processing, for example in the construction of first-order visibility maps, these initial wedges may later be intersected with mesh polygons and with other wedges. Initial wedges may also be explicitly intersected with other wedges to form umbral boundary polygons (UBPs), which bound the conservative from-viewcell polyhedral aggregate umbral volumes that contain (conservatively) occluded regions.

FIG. 7-FIG. 11 Detailed Description—Output of First Embodiment

Figure 7A:
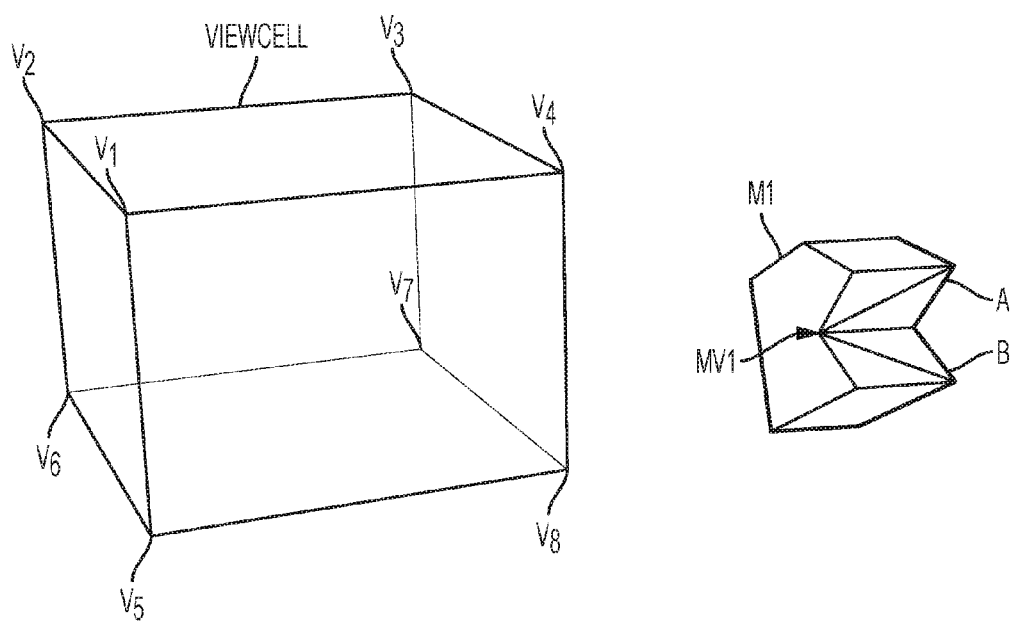
FIG. 7A is an exemplary diagram showing a convex viewcell and a non-convex polygon mesh, First-order, from-viewcell silhouette edges of the mesh are shown in heavy lines, perspective view looking in general direction from the viewcell toward the polygon mesh.

FIG. 7A is a diagram showing a convex viewcell having vertices $V_1$-$V_8$ and a non-convex polygon mesh M1. First-order, from-viewcell silhouette edges of the mesh are shown in bold lines. Two of the first-order silhouette edges are labeled A and B. This is a perspective view looking in general direction from the viewcell toward the polygon mesh.

Figure 7B:
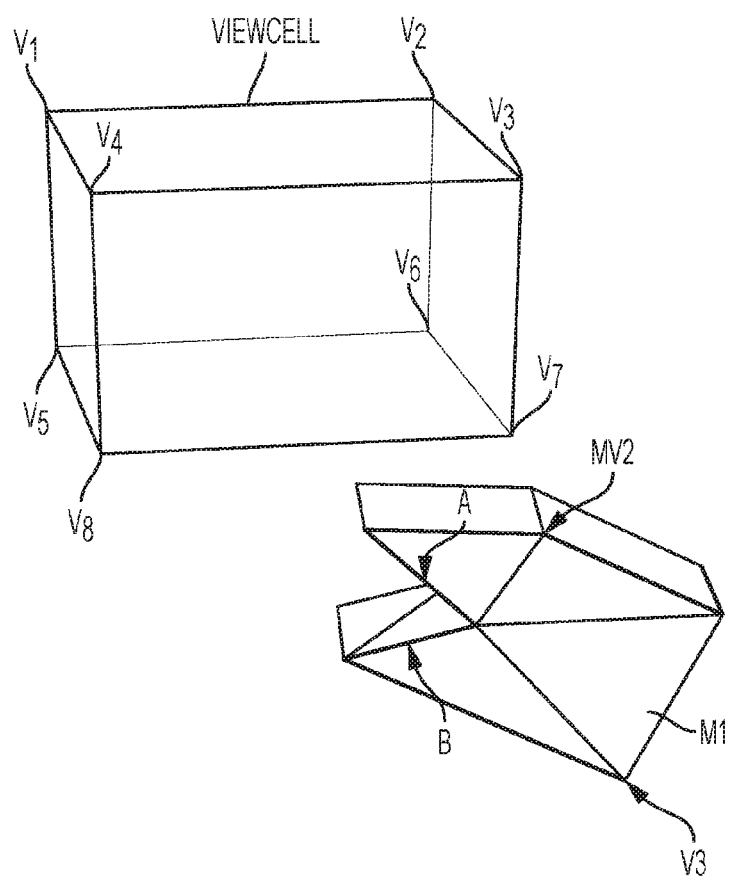
FIG. 7B is an exemplary diagram showing the same objects as FIG. 7B, but from a perspective view looking in a general direction from the polygon mesh toward the viewcell.

First-order silhouette edge A has one component polygon that is front facing for at least one viewcell vertex. This component polygon is the triangle formed by edge A and the mesh vertex labeled MV1. The other component polygon for edge A is the triangle formed by edge A and the mesh vertex MV2 which is shown in FIG. 7B. This component polygon is backfacing for all vertices $V_1$-$V_8$ of the viewcell. Note that these two component polygons sharing edge A are backfacing with respect to each other, making the edge A a locally supporting edge of the polygon mesh M1 and a first-order silhouette edge. It can be determined that the two component polygons sharing edge A are backfacing by selecting a first component polygon, e.g. the triangle formed by edge A and vertex MV2, and determining if a vertex of the other component polygon which is not part of the shared edge, e.g. vertex MV1 in this case, is on the front side or the back side of the plane containing the first polygon. If the unshared vertex is on the back side of the other component polygon's plane then the two component polygons are backfacing, as in this case. This determination can be made using the plane equation as described in the definition of "backfacing" provided in the glossary of terms. In some embodiments, the process illustrated in FIG. 3 is repeated for each edge included in polygon mesh M1 to identify each first order silhouette edge of polygon mesh M1.

FIG. 7B is a diagram showing the same polygon mesh object M1 as FIG. 7A, but from a perspective view looking in a general direction from the polygon mesh toward the viewcell. From this view, edge B has one component triangle (formed by edge B and mesh vertex MV3) that is backfacing for all vertices $V_1$-$V_8$ of the viewcell. As illustrated in FIG. 7A, edge B has another component triangle formed by edge B and mesh vertex MV1 that is front facing to at least one viewcell vertex. Further, these two component polygons sharing edge B are backfacing with respect to each other, making the edge B a locally supporting edge of the polygon mesh M1 and a first order silhouette edge.

Figure 7C:
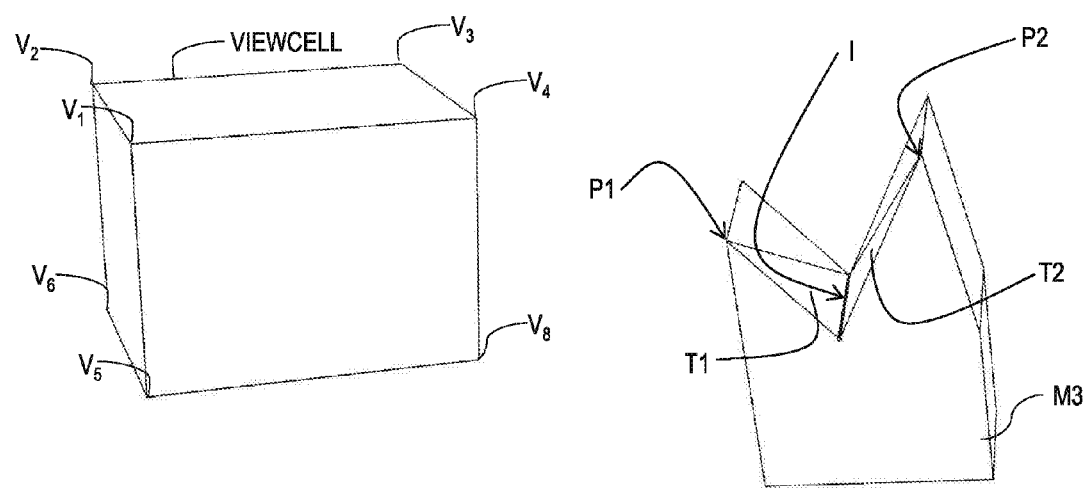
FIG. 7C shows a different polygon mesh than the one shown in FIG. 7B and shows an inside-corner edge of the mesh which is not a first-order silhouette edge.

FIG. 7C shows a different polygon mesh than the one depicted in FIG. 7B. This polygon mesh is labeled M3. One edge of polygon mesh M3 is shown bolded and labeled I. This edge has one component polygon which is a triangle labeled T1, and another component polygon which is a triangle labeled T2.

Component polygon T1 is backfacing for all vertices of the viewcell labeled VIEWCELL since all of the viewcell vertices are on the back side of the plane containing triangle T1.

Component triangle T2 has at least one viewcell vertex that is on the front side of the plane containing triangle T2, that is T2 is front facing with respect to at least one viewcell vertex.

Consequently, component triangles T1 and T2 meet two of the criteria required to make their shared edge a first-order silhouette edge with respect to the viewcell.

However the shared edge I, is not a first-order silhouette edge because the two component triangles are not backfacing with respect to each other. This can be determined by selecting triangle T1 and identifying a vertex of the other component triangle (T2) that is not a vertex of the shared edge. In this case the vertex is P2. The vertex P2 is on the front side of the plane containing the other component triangle T1. This fact can be established using the plane equation of triangle T1 as described in the glossary of terms description for "backfacing".

Since T1 and T2 are not backfacing with respect to each other they would, in one embodiment, fail the decision test shown in the exemplary flowchart of FIG. 3 at steps 345 OR 330.

Figure 7D:
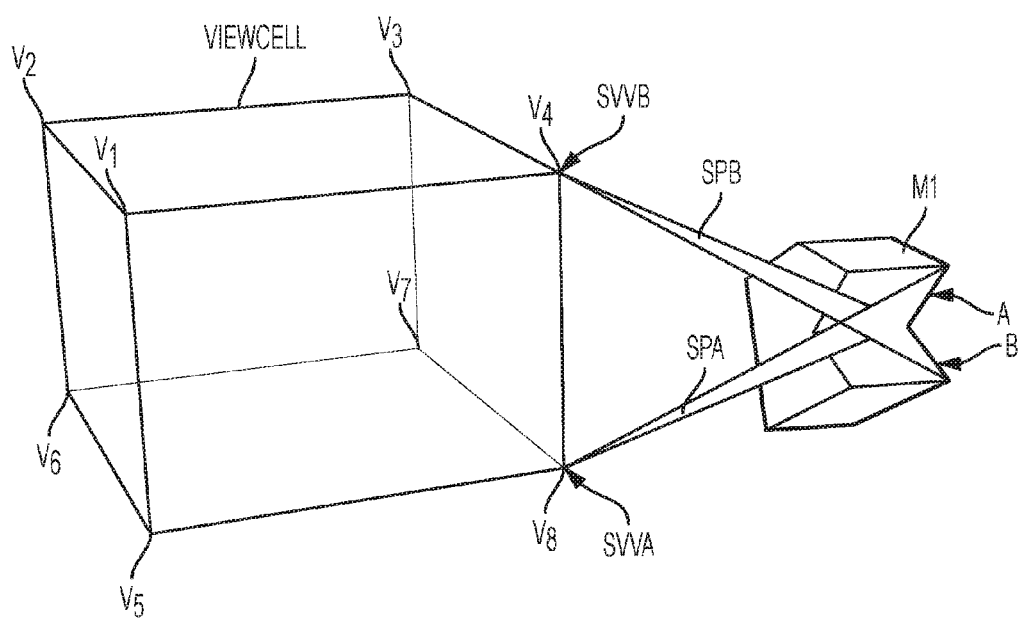
FIG. 7D is an exemplary diagram showing the supporting polygons for first-order silhouette edges A and B, perspective view looking in a general direction from viewcell toward mesh object.

FIG. 7D is a diagram showing the supporting polygons for the first-order silhouette edges A and B. The supporting polygon for first-order silhouette edge A is labeled SPA, and the supporting polygon for the first-order silhouette edge B is labeled SPB. The corresponding supporting viewcell vertices (SVVs) are labeled, respectively SVVA and SVVB, which correspond to viewcell vertices $V_4$ and $V_8$, respectively. This is a perspective view looking in a general direction from viewcell toward mesh object.

Figure 7E:
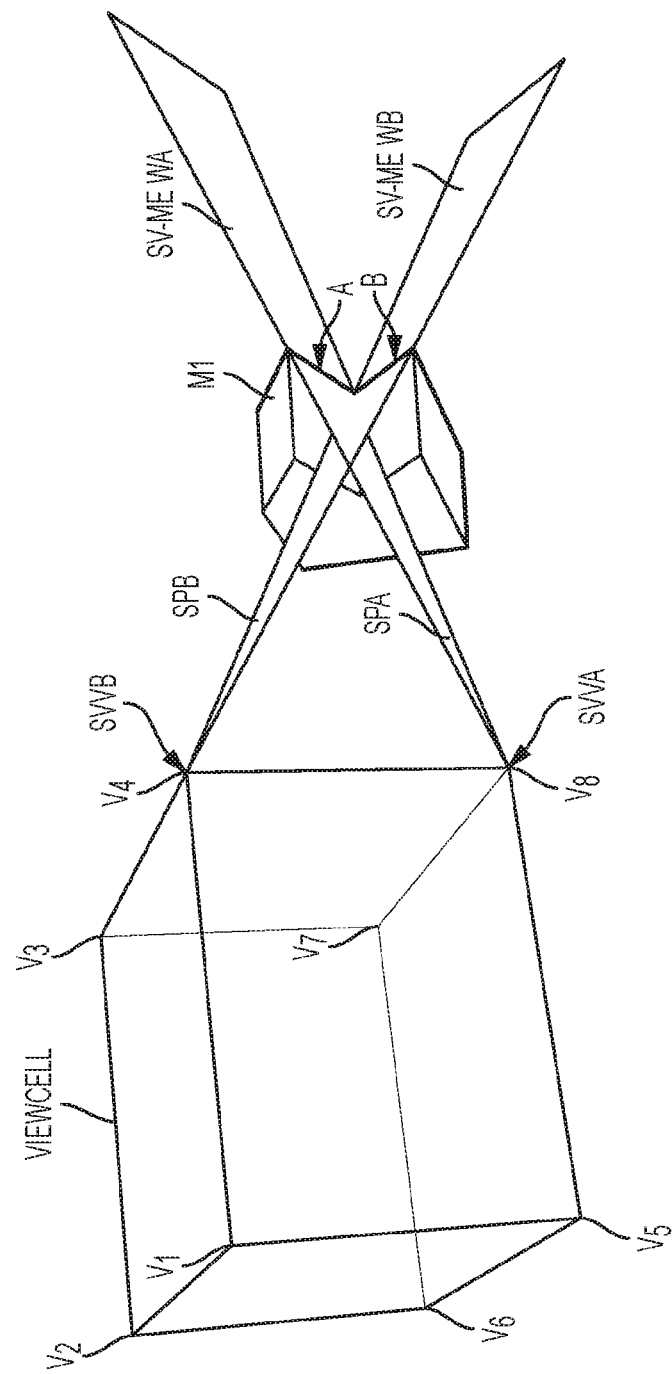
FIG. 7E is an exemplary diagram showing the supporting polygons for the first-order silhouette edges A and B and the corresponding source-vertex mesh-edge (SV-ME) wedges, perspective view looking in a general direction from viewcell toward mesh object.

FIG. 7E is a diagram showing the supporting polygons SPA and SPB for the first-order silhouette edges A and B, respectively, and the corresponding source-vertex mesh-edge (SV-ME) wedges. The supporting polygon for first-order silhouette edge A is labeled SPA, and the supporting polygon for the first-order silhouette edge B is labeled SPB. The corresponding supporting viewcell vertices (SVVs) are labeled, respectively SVVA and SVVB. The SV-ME wedge is formed by extension of supporting polygon SPA is labeled SV-ME WA. The SV-ME wedge is formed by extension of supporting polygon SPB is labeled SV-ME WB. According to some embodiments, the SV-ME wedges WA and WB are constructed according to the processes illustrated in FIGS. 1, 4, and 6A. This is a perspective view looking in a general direction from viewcell toward mesh object.

Figure 7F:
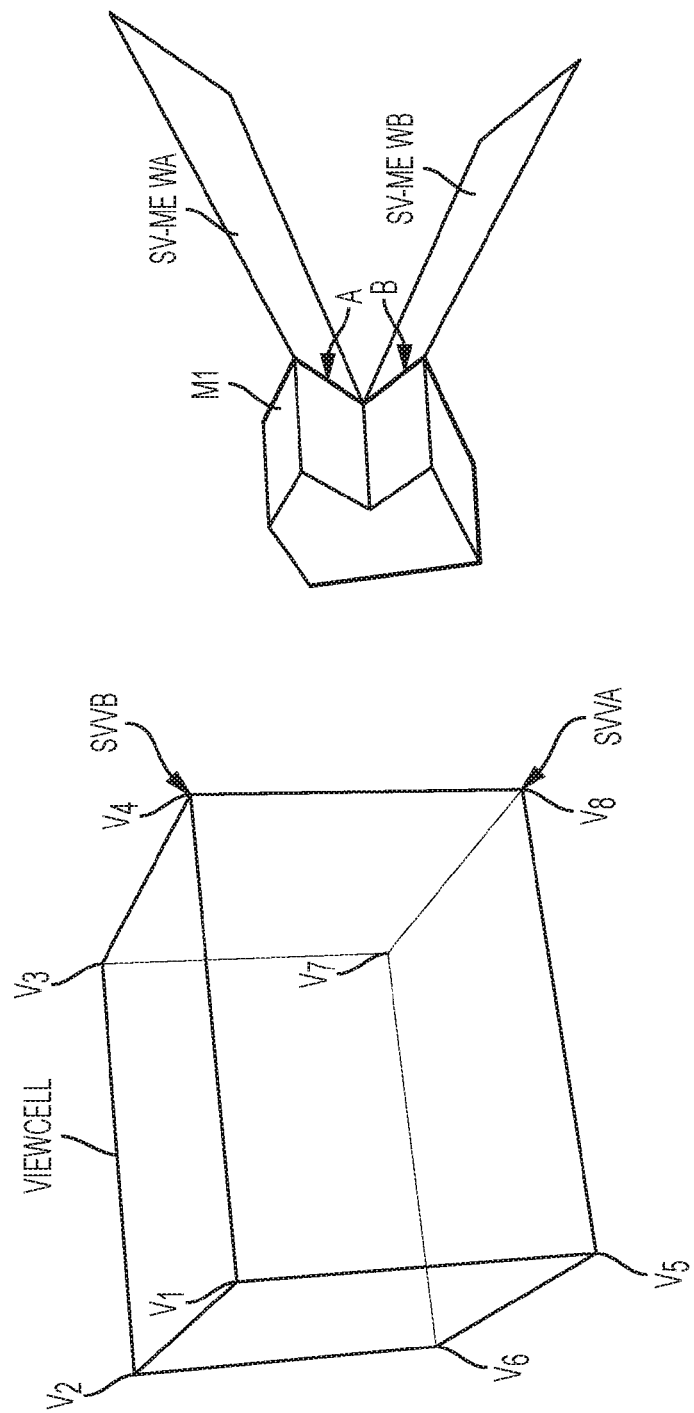
FIG. 7F is an exemplary diagram showing only the SV-ME wedges formed from the extension of the edges of the corresponding supporting polygons.

FIG. 7F is a diagram showing only the SV-ME wedges formed from the extension of the edges of the corresponding supporting polygons. The SV-ME wedge formed by extension of supporting polygon SPA is labeled SV-ME WA. The SV-ME wedge formed by extension of supporting polygon SPB is labeled SV-ME WB. The corresponding supporting viewcell vertices (SVVs) are labeled, respectively SVVA and SVVB. This is a perspective view looking in a general direction from viewcell toward mesh object.

Although FIGS. 7C1-7C3 show wedges incident on first order silhouette edges A and B, further embodiments construct wedges for each first order silhouette edge included in the first order silhouette contour included in mesh M1 according to the processes illustrated in FIGS. 1 and 3-6B.

Figure 7G:
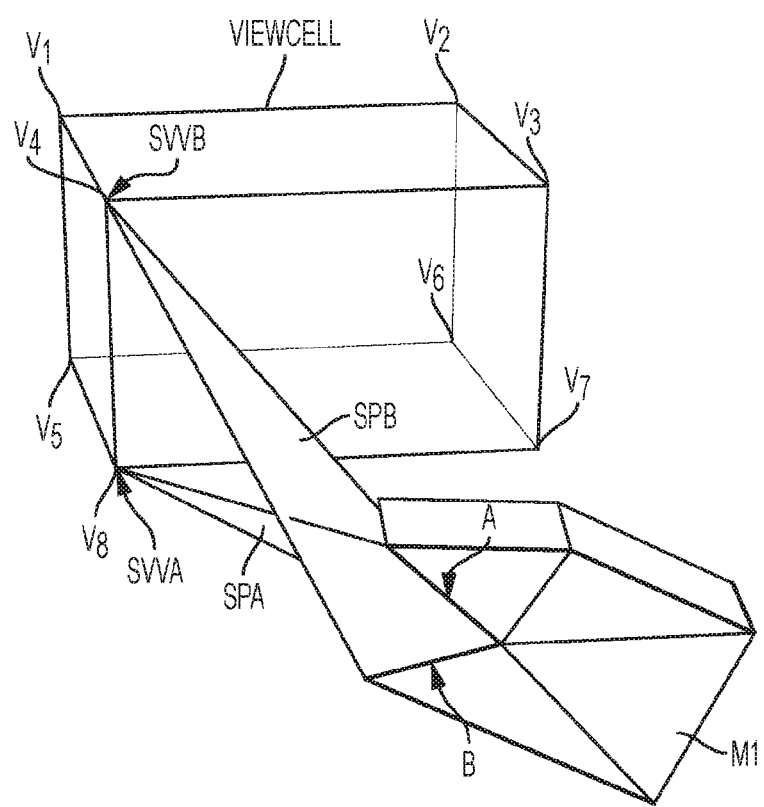
FIG. 7G is an exemplary diagram showing the same objects as FIG. 7D but from a perspective view looking a general direction from mesh object toward viewcell.

FIG. 7G is a diagram showing the same objects as FIG. 7D, but from a perspective view looking in a general direction from mesh object M1 toward the viewcell.

Figure 7H:
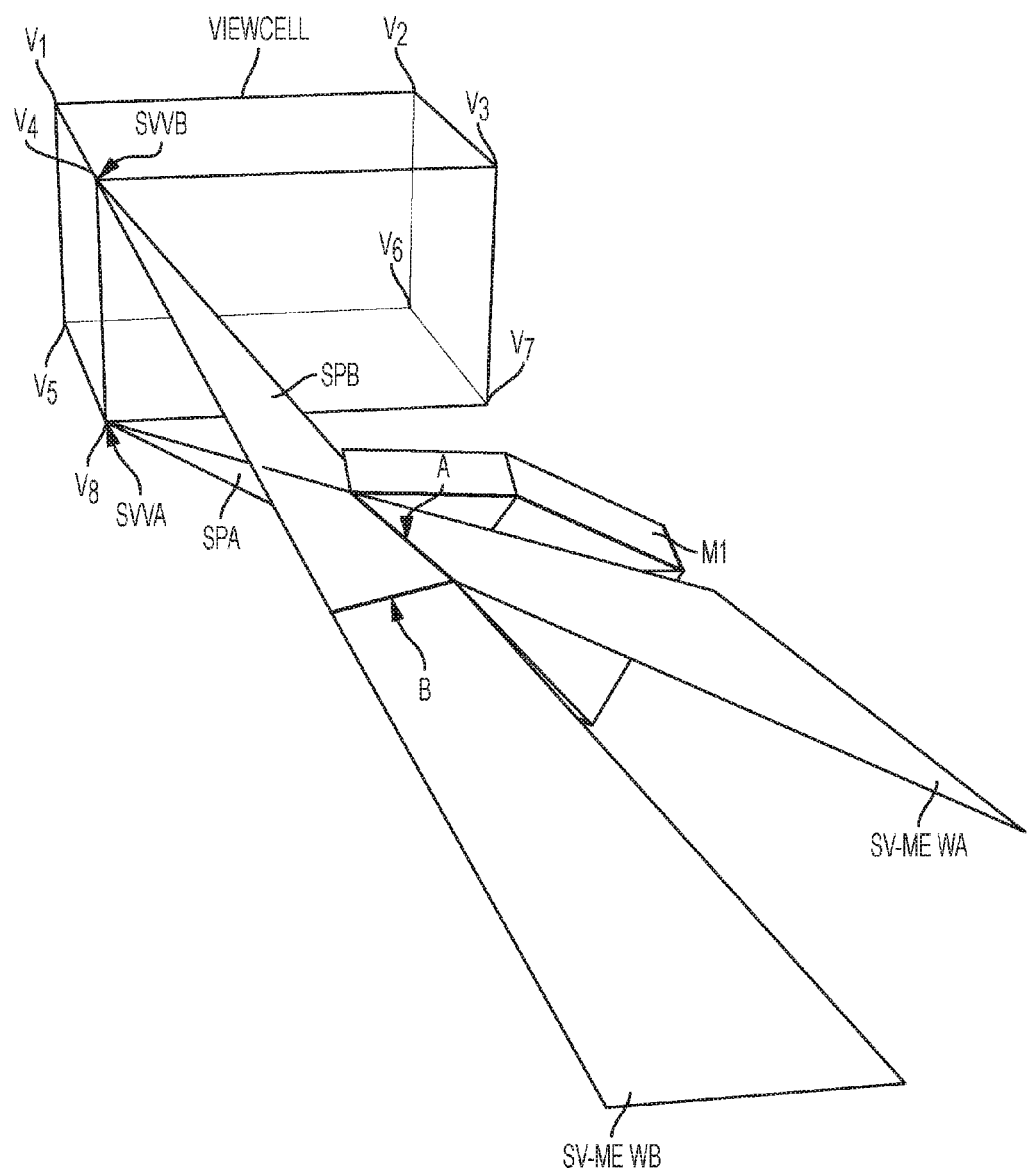
FIG. 7H is an exemplary diagram showing the same objects as FIG. 7D, but from a perspective view looking a general direction from mesh object toward viewcell.

FIG. 7H is a diagram showing the same objects as FIG. 7E, but from a perspective view looking a general direction from mesh object M1 toward viewcell.

Figure 7I:
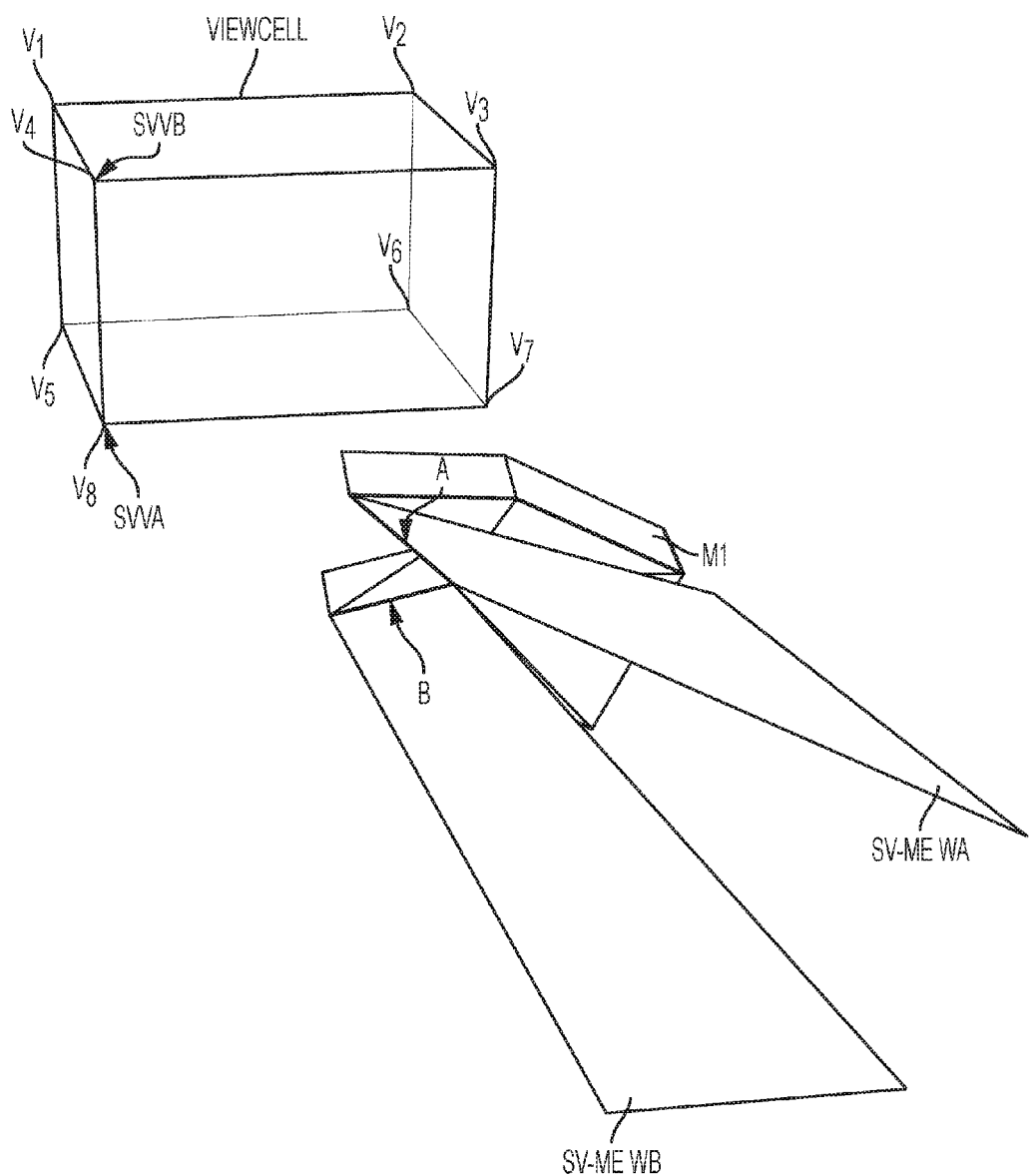
FIG. 7I is a diagram showing the same objects as FIG. 7E but from a perspective view looking a general direction from mesh object toward viewcell.

FIG. 7I is a diagram showing the same objects as FIG. 7E, but from a perspective view looking a general direction from mesh object M1 toward viewcell.

Figure 7J:
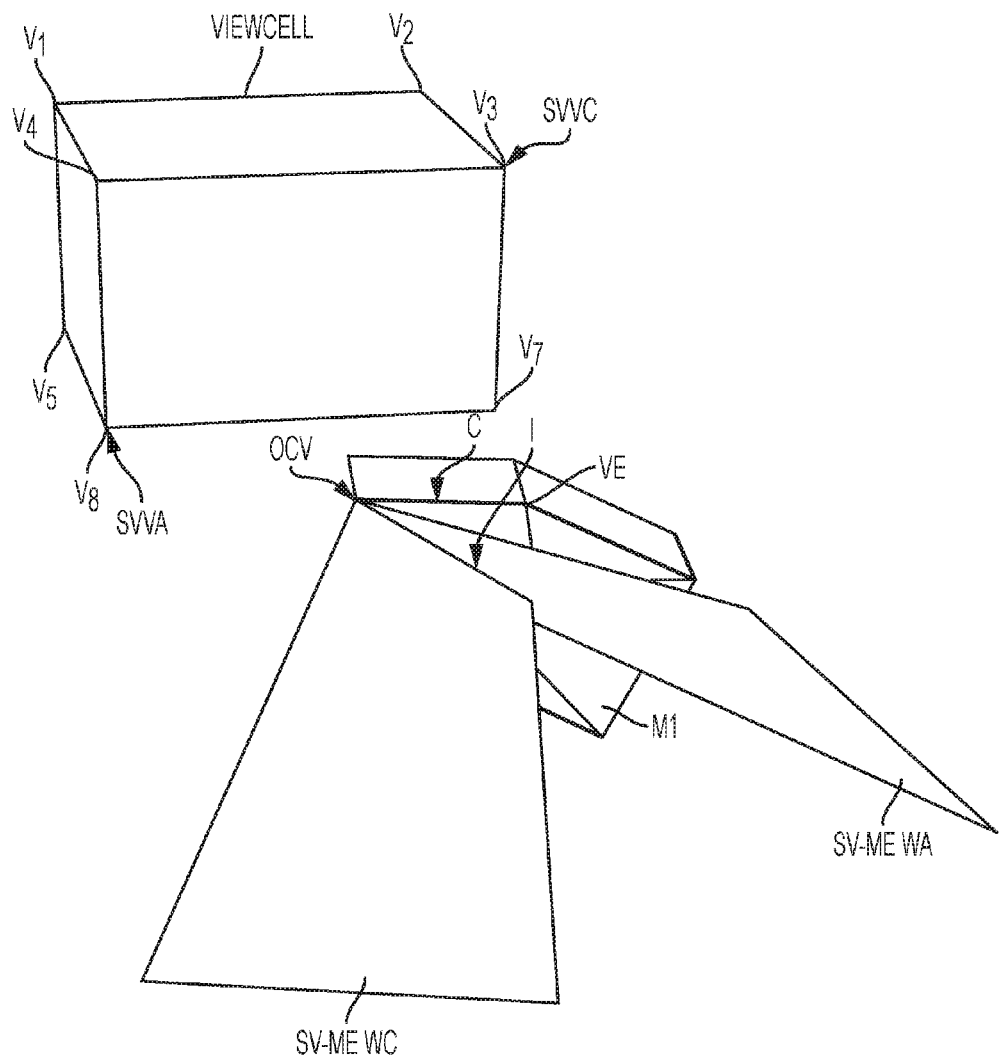
FIG. 7K is a hidden-diagram which shows the same polygon mesh and viewcell and restricted pivoted wedge as FIG. 7J but from a different perspective.

FIG. 7J shows the same polygon mesh and viewcell as FIG. 7I, from the same perspective. FIG. 7J shows two pivoted wedges intersecting at an outside corner vertex of a first-order silhouette contour.

One of the pivoted wedges is labeled SV-ME WA, which is also seen in FIG. 7I. In FIG. 7J an additional pivoted wedge SV-ME WC is shown. This wedge is supported by the first-order silhouette edge labeled C, and the supporting viewcell vertex labeled SVVC.

The two pivoted wedges SV-ME WA and SV-ME WC share an outside corner vertex of a first-order silhouette edge. This vertex is labeled OCV. As prescribed in steps 125 and 140 of the exemplary flowchart of FIG. 1, in one embodiment pivoted polygons which share an outside corner vertex are intersected with each other.

Pivoted polygons which share an outside corner silhouette vertex and which pivot to the same supporting viewcell vertex will intersect each other exactly at a shared edge. In this case the shared edge is a ray extending from the shared vertex and on the line formed by the supporting viewcell vertex and the shared outside corner vertex. In this special case the two pivoted wedges restrict each other on the shared edge.

(Pivoted polygons which share an inside corner silhouette vertex and which pivot to the same supporting viewcell vertex also intersect each other exactly at the shared edge. In this case no swept supporting polygon exists and the corresponding swept wedge is not generated.)

In the general case, pivoted wedges sharing an outside corner vertex can pivot to different supporting viewcell vertices. In FIG. 7J wedge SV-ME WA is supported by viewcell vertex $V_4$, while SV-ME WC is supported by SVVC. In this case, the intersection of wedge SV-ME WA and SV-ME WC is the line segment labeled I. Line segment I divides wedge SV-ME WC into two parts. The proximal part of the subdivided wedge SV-ME WC is bounded by line segment I and the vertex labeled VE. A portion of this proximal part is occluded in this view.

Figure 7K:
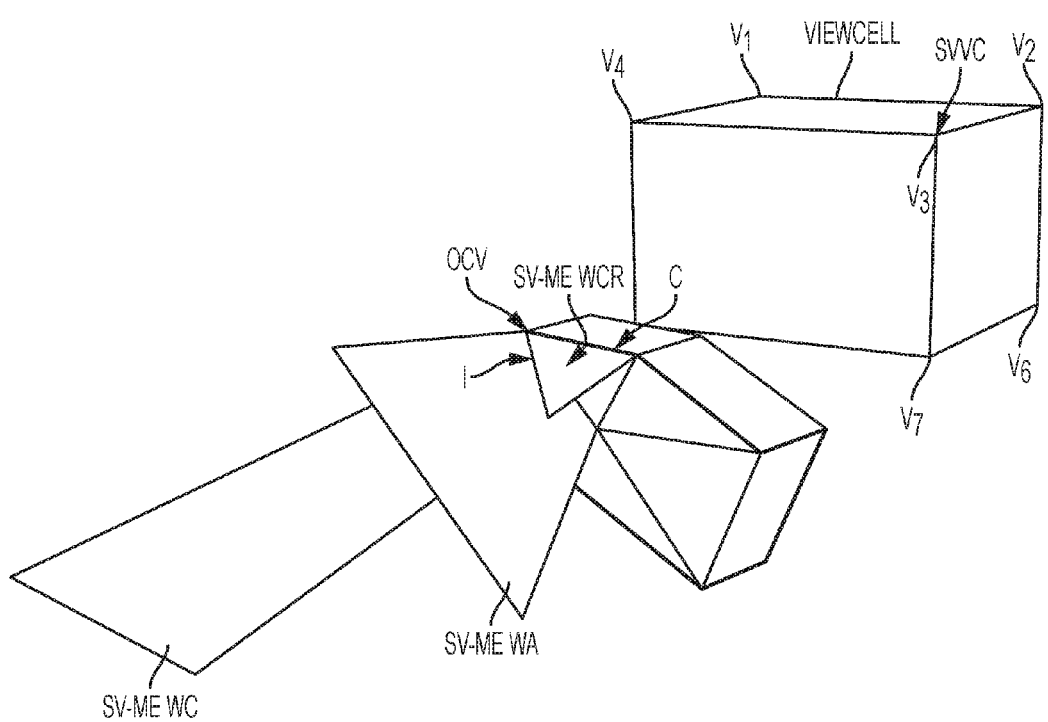

This proximal part of wedge SV-ME WC is completely seen in FIG. 7K, which shows the same objects as FIG. 7J, from a different perspective. This proximal part is labeled SV-ME WCR in FIG. 7K.

In general, the intersection of two pivoted wedges sharing an outside-corner vertex and pivoting to different supporting viewcell vertices will result in one of the wedges being restricted into a proximal portion [e.g., SV-ME WCR (indicating wedge C restricted)] and a distal portion. Only the proximal portion of such a locally restricted wedge is actually a from-viewcell umbral event surface. [Only this proximal portion is a polygon of the corresponding polyhedral aggregate umbra (PAU).] The distal portion, beyond the restriction and in a direction away from the viewcell does not represent a from-viewcell umbral event surface, since it is entirely on the unoccluded side of the adjacent wedge. In the example shown in FIG. 7J and FIG. 7K, mesh polygons on both the unoccluded and the occluded side of the distal portion of SV-ME WC are actually unoccluded from viewcell vertex SVVA, and are therefore not occluded from the viewcell.

This local restriction of a pivoted wedge by an adjacent pivoted wedge sharing an outside corner silhouette vertex in some instances produces a substantially smaller wedge. This smaller, locally restricted wedge can require substantially less processing when it is submitted for the determination of on-wedge visibility since it has an additional containment boundary that limits processing (e.g. at step 1515 in one embodiment using 2D mesh traversal process shown in exemplary flowchart FIG. 15).

The local restriction process can therefore accelerate the determination of on-wedge visibility. Alternate embodiments which do not use this local restriction process can also be employed. Any wedges that have not been restricted by other wedges still intersect mesh polygons to produce discontinuity mesh segments. The determination of whether such a discontinuity segment is actually a from-viewcell umbral boundary is then made using the modified point-in polyhedron test described in the exemplary flowcharts of FIG. 25. This test accommodates both locally restricted and unrestricted wedges.

The preceding discussion assumes that the wedges employed are first-order wedges. Higher-order wedges are subjected to wedge-wedge intersection (restriction by other wedges) as described in one embodiment for example in step 2155 of the exemplary flowchart showing a method for determining if a DM_SEG is an actual from-viewcell occlusion boundary segment.

Figure 8A:
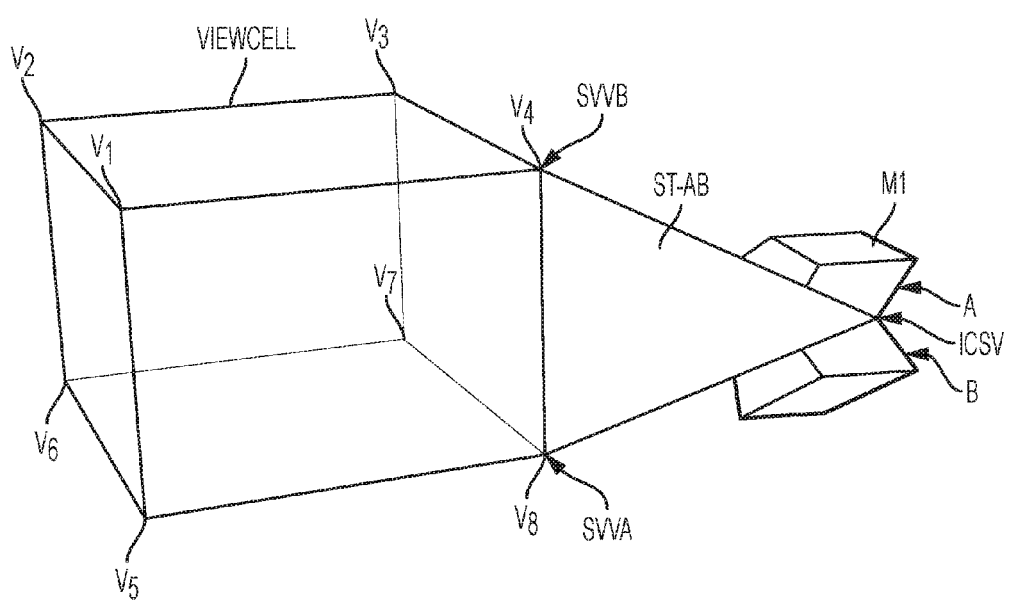
FIG. 8A is an exemplary diagram showing a swept triangle (a SE-MV supporting polygon) on the inside corner vertex shared by first-order silhouette edges labeled A and B. Perspective view looking in the general direction from the viewcell to the polygon mesh object.

FIG. 8A is a diagram showing a swept triangle (a SE-MV supporting polygon) on the inside corner vertex shared by first-order silhouette edges labeled A and B of mesh object M1. The swept triangle is labeled ST_AB. In some embodiments, the swept triangle ST_AB is generated using the sweep process shown in FIG. 5A and FIG. 5B, with the sweep occurring from SVVA ($V_4$) to SVVB ($V_8$) and anchored on the inside-corner silhouette vertex labeled ICSV. In this case, the inside-corner mesh silhouette vertex is a simple inside-corner of the first-order silhouette contour (i.e., the contour formed by all the first-order silhouette edges of mesh object M1), formed where two first-order silhouette edges share a vertex. This is a perspective view looking in a general direction from viewcell toward mesh object similar to the view shown in FIG. 7A and FIG. 7D.

Figure 8B:
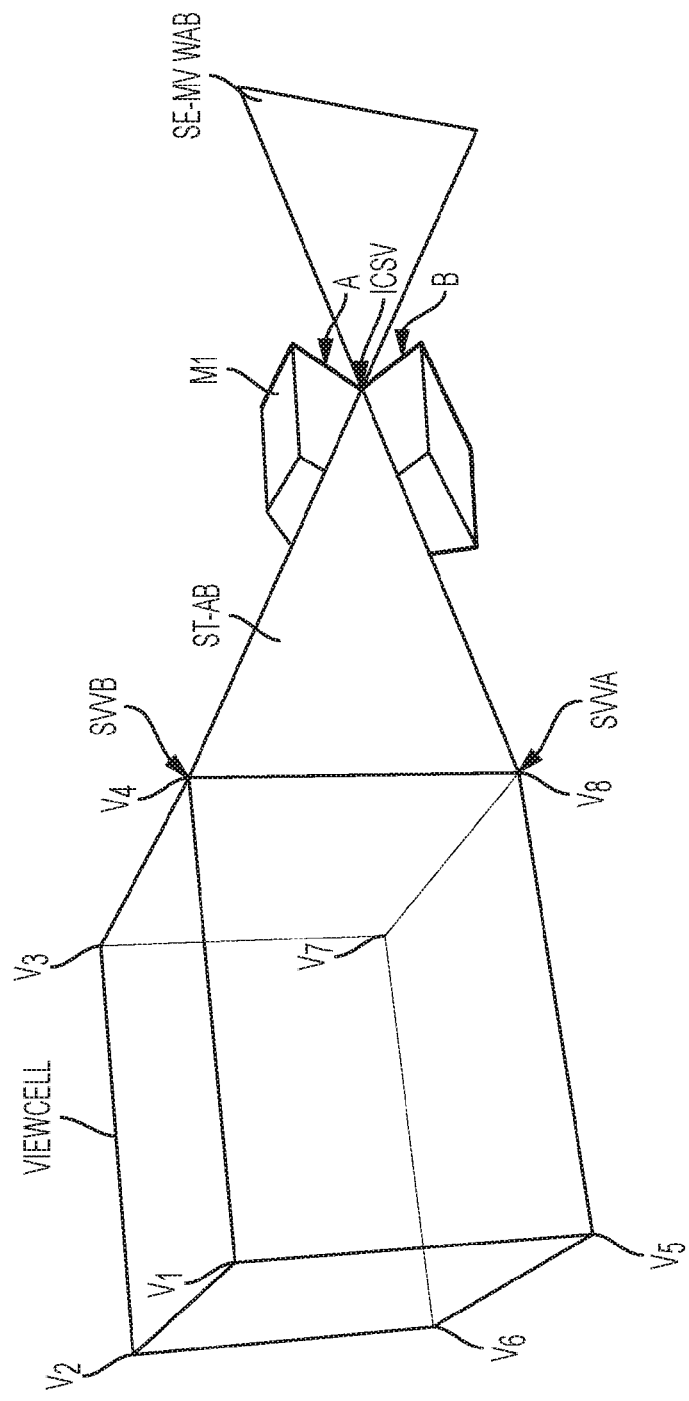
FIG. 8B is an exemplary diagram showing a swept triangle (a SE-MV supporting polygon) on the inside corner vertex shared by first-order silhouette edges labeled A and B and the corresponding SE-MV wedge. Perspective view looking in the general direction from the viewcell to the polygon mesh object.

FIG. 8B is a diagram showing a swept triangle (a SE-MV supporting polygon) on the inside corner vertex shared by first-order silhouette edges labeled A and B. The swept triangle is labeled ST_AB, and is generated, according to some embodiments, using the sweep process shown in FIG. 5A and FIG. 5B, with the sweep occurring from SVVA ($V_4$) to SVVB ($V_8$) and anchored on the inside-corner silhouette vertex labeled ICSV. In this case, the inside-corner mesh silhouette vertex is a simple inside-corner of the first-order silhouette contour, formed where two first-order silhouette edges share a vertex. The corresponding SE-MV wedge, formed by extension of the swept triangle, is labeled SE-MV WAB. According to some embodiments, the SE-MV wedge WAB is formed according to the process illustrated in FIG. 6B. In this regard, the edges of the polygon ST-AB are extended through the inside corner vertex to form SE-MV WAB. This is a perspective view looking in a general direction from viewcell toward mesh object similar to the view shown in FIG. 7A and FIG. 7E.

Figure 8C:
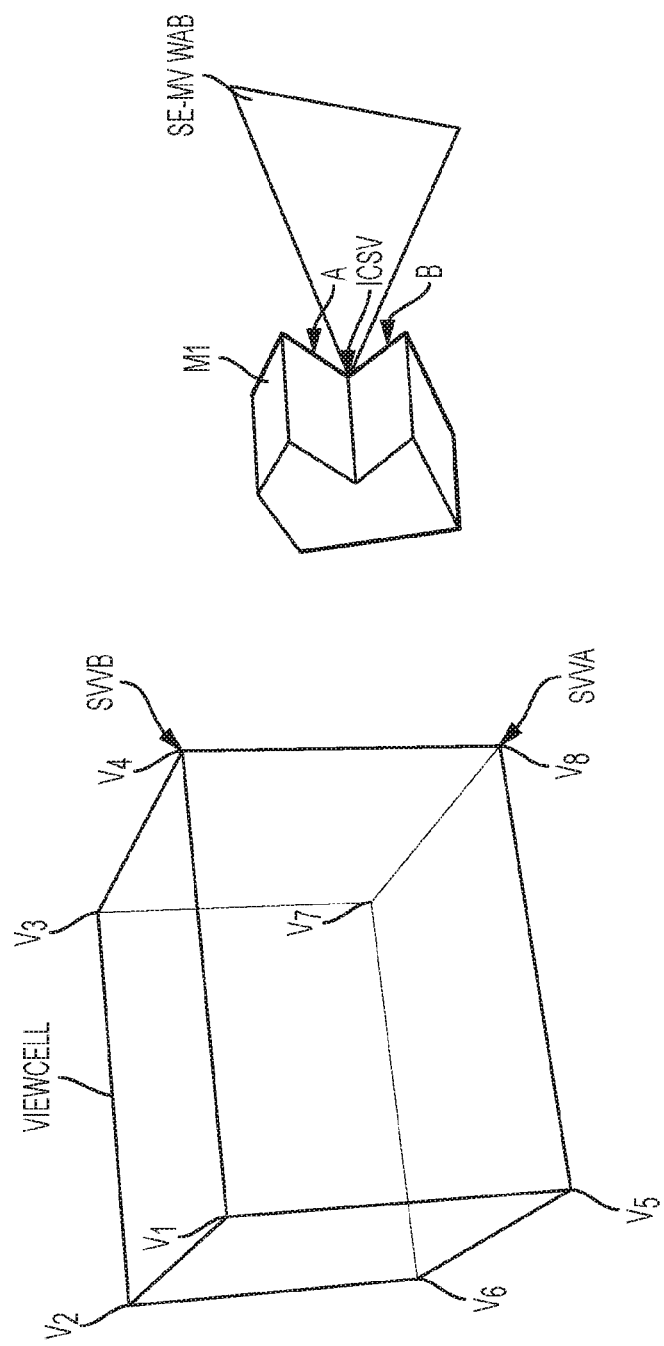
FIG. 8C is an exemplary diagram showing the inside corner vertex shared by first-order silhouette edges labeled A and B and the corresponding SE-MV wedge. Perspective view looking in the general direction from the viewcell to the polygon mesh object.

FIG. 8C is a diagram showing the inside-corner silhouette vertex labeled ICSV. The corresponding SE-MV wedge, formed by extension of the swept triangle is labeled SE-MV WAB. This is a perspective view looking in a general direction from viewcell toward mesh object similar to the view shown in FIG. 7A and FIG. 7F.

Figure 8D:
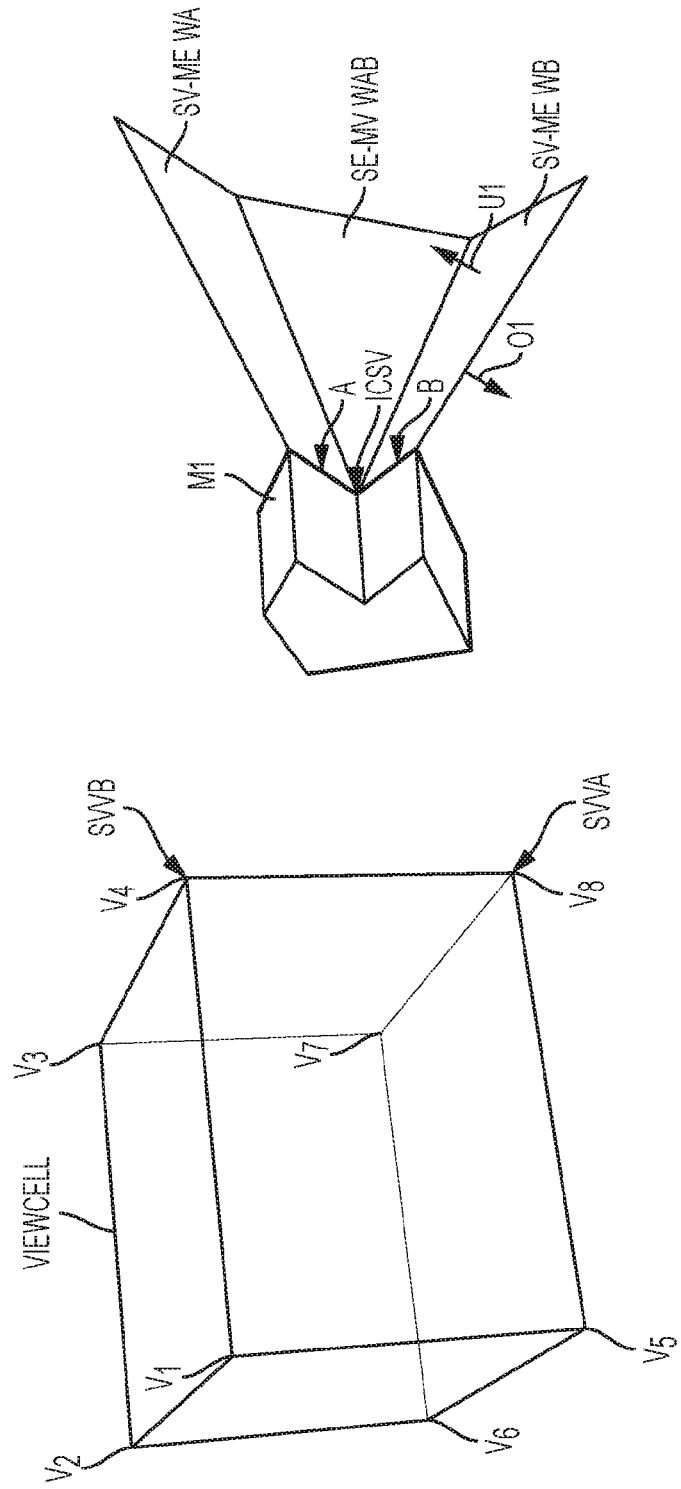
FIG. 8D is an exemplary diagram showing the first-order wedges incident on silhouette edges A and B, including two SV-ME wedges and a single SE-MV wedge, all intersecting at the inside corner silhouette vertex labeled ICSV. Perspective view looking in the general direction from the viewcell to the polygon mesh object

FIG. 8D is a diagram showing the first-order conservative linearized umbral event surface (CLUES) incident on the silhouette edges A and B. As illustrated in FIG. 8D, a continuous umbral event surface is comprised of the two SV-ME wedges (labeled SV-ME WA and SV-ME WB) and, in this case, the single SE-MV wedge (labeled SE_MV WAB). The corresponding supporting viewcell vertices SVVA and SVVB are labeled as is the inside corner first-order silhouette vertex labeled ICSV. This is a perspective view looking in a general direction from viewcell toward mesh object. As illustrated in FIG. 8D, the CLUES comprised of SV-ME WA, SE-MV WAB, and SV-ME WB form an occlusion boundary, where the unoccluded side of the boundary is in the direction of arrow U1, and the occluded side is in the direction of arrow O1.

Figure 8E:
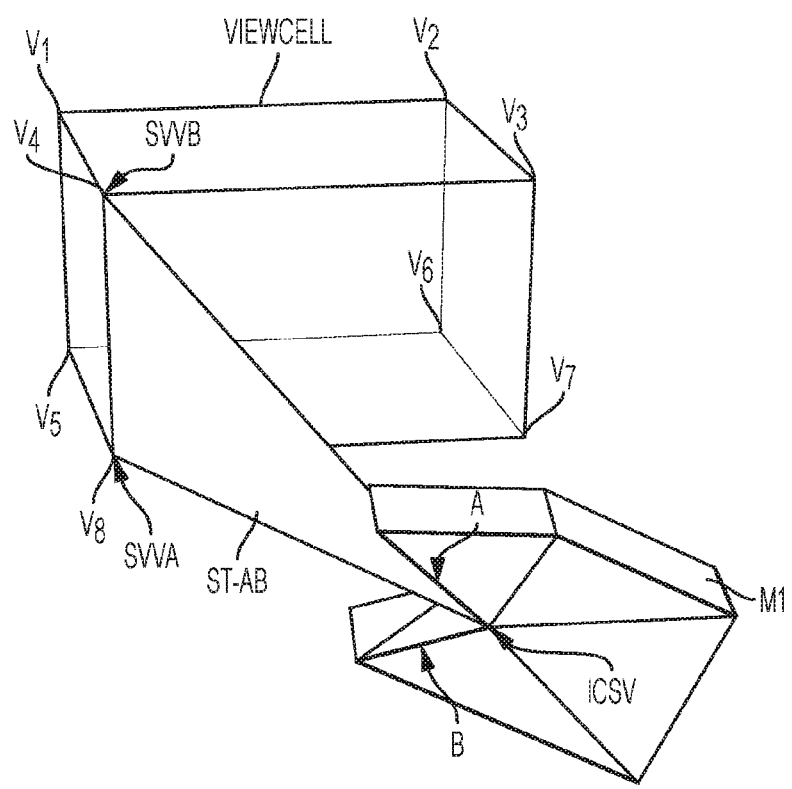
FIG. 8E is an exemplary diagram showing the same objects as FIG. 8A but from a perspective view looking in a general direction from mesh object toward viewcell.

FIG. 8E is a diagram showing the same objects as FIG. 8A, but from a perspective view looking in a general direction from mesh object M1 toward the viewcell.

Figure 8F:
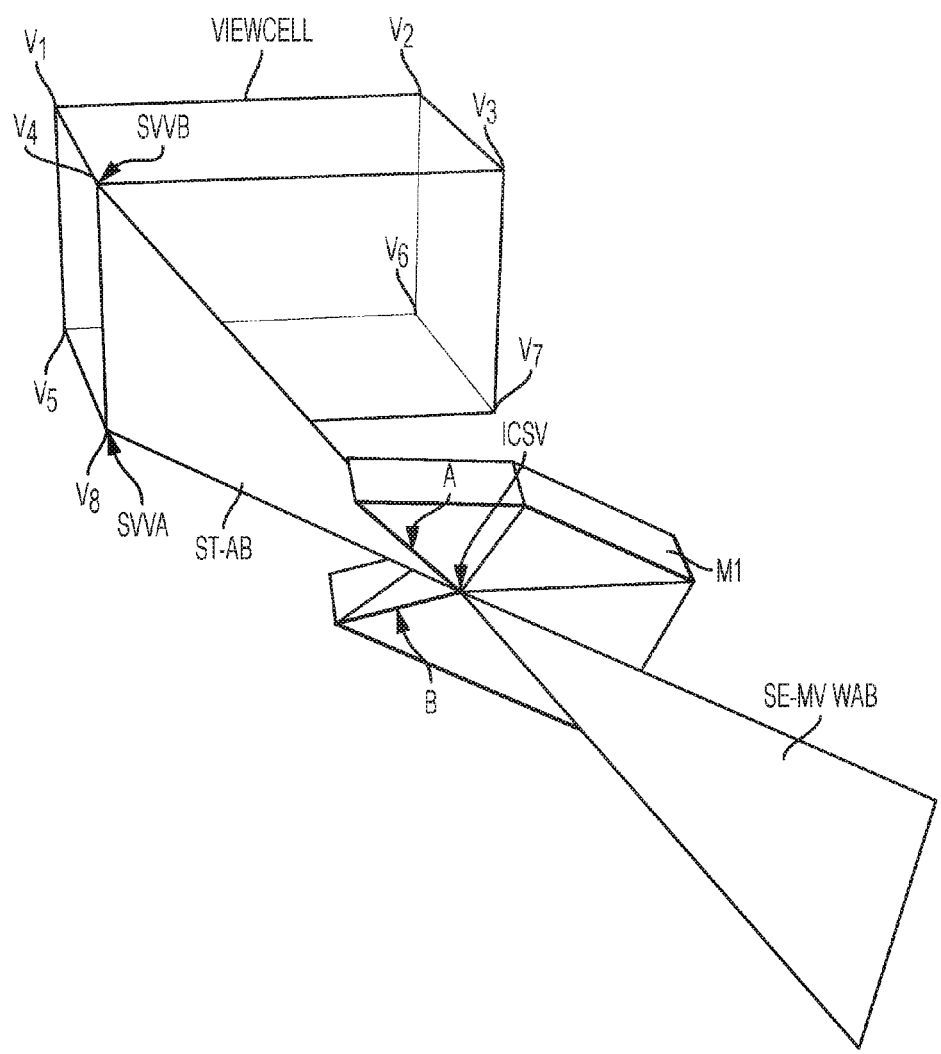
FIG. 8F is an exemplary diagram showing the same objects as FIG. 8B but from a perspective view looking in a general direction from mesh object toward viewcell.

FIG. 8F is a diagram showing the same objects as FIG. 8B, but from a perspective view looking in a general direction from mesh object toward the viewcell.

Figure 8G:
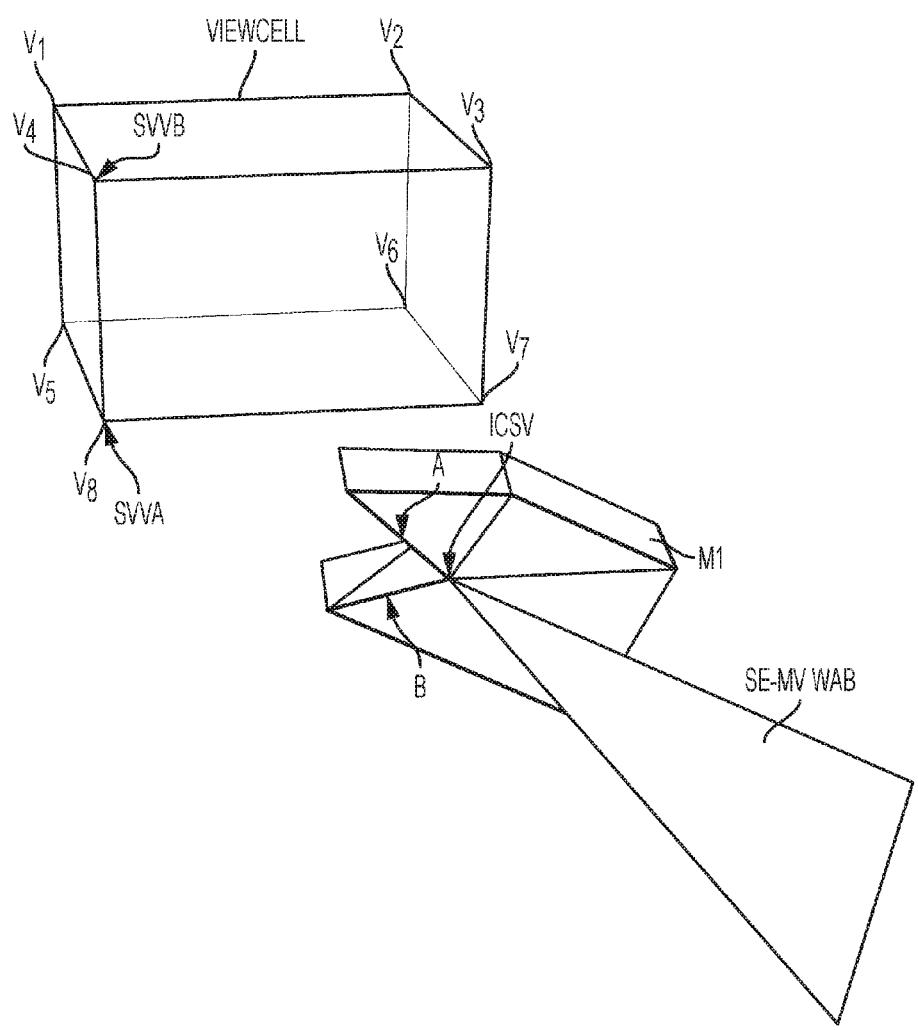
FIG. 8G is an exemplary diagram showing the same objects as FIG. 8C but from a perspective view looking in a general direction from mesh object toward viewcell.

FIG. 8G is a diagram showing the same objects as FIG. 8C, but from a perspective view looking in a general direction from mesh object M1 toward the viewcell.

Figure 8H:
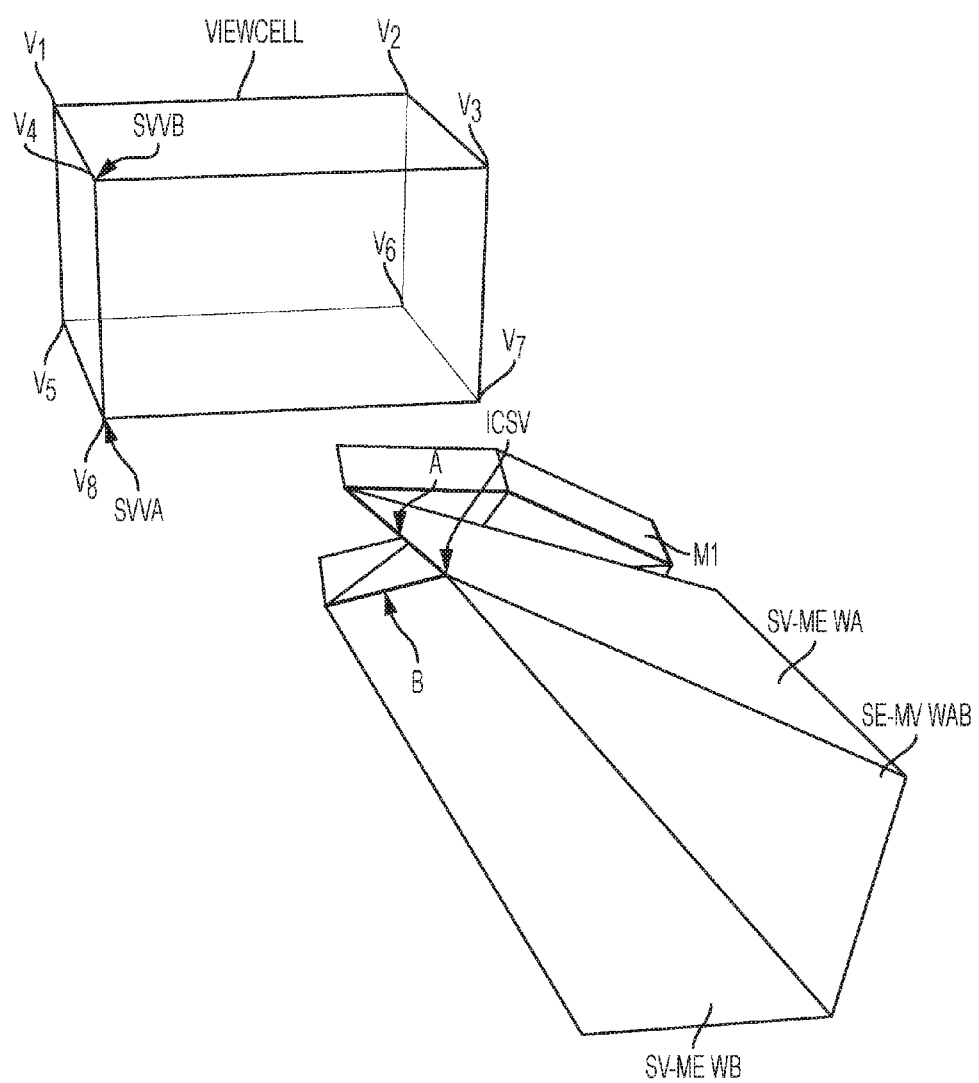
FIG. 8I is an exemplary diagram showing the first-order umbra boundary incident on the silhouette edges A and B, perspective view looking in a general direction from viewcell toward mesh object.

FIG. 8H is a diagram showing the same objects as FIG. 8D, but from a perspective view looking in a general direction from mesh object M1 toward the viewcell.

Figure 8I:
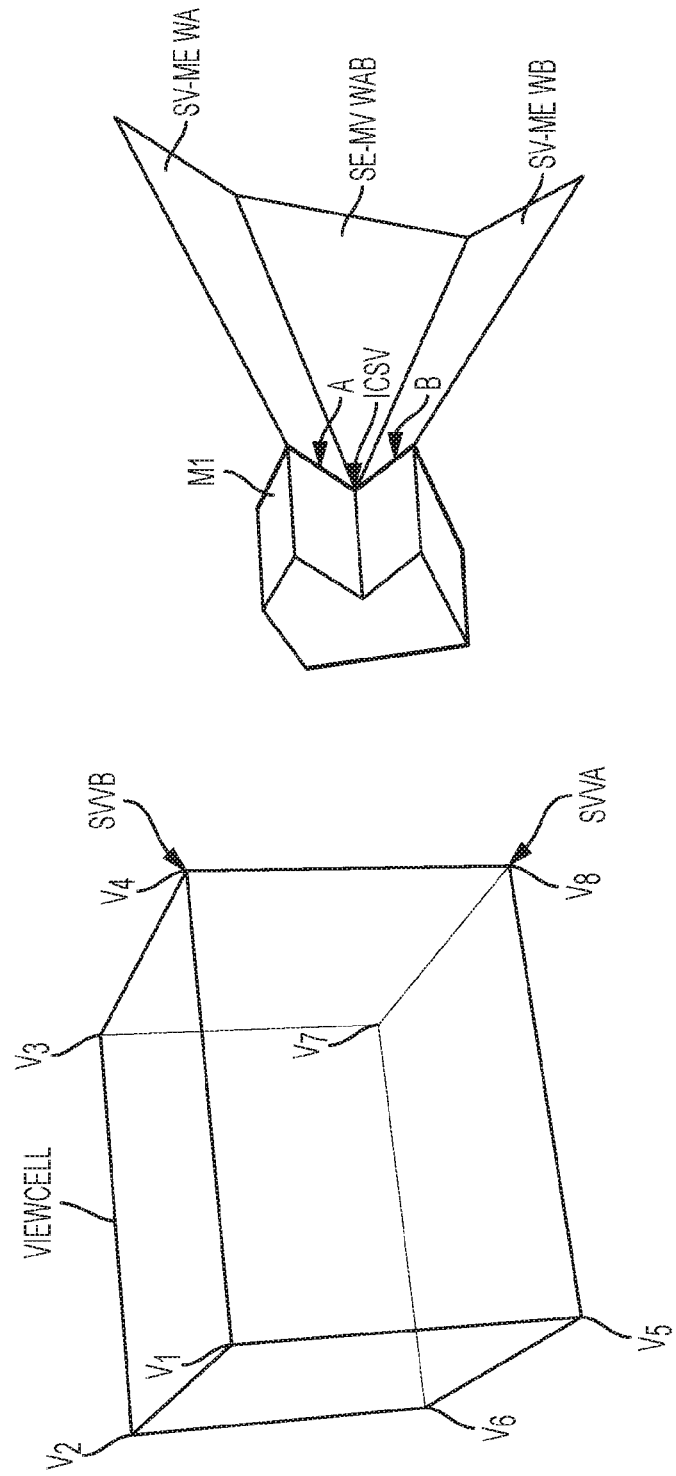

FIG. 8I, the same as FIG. 8D, is a diagram showing the first-order conservative linearized umbral event surface (CLUES) incident on the silhouette edges A and B. This continuous umbral event surface is comprised of the two SV-ME wedges (labeled SV-ME WA and SV-ME WB) and, in this case, the single SE-MV wedge (labeled SE_MV WAB). This is a perspective view looking in a general direction from viewcell toward mesh object.

Figure 9A:
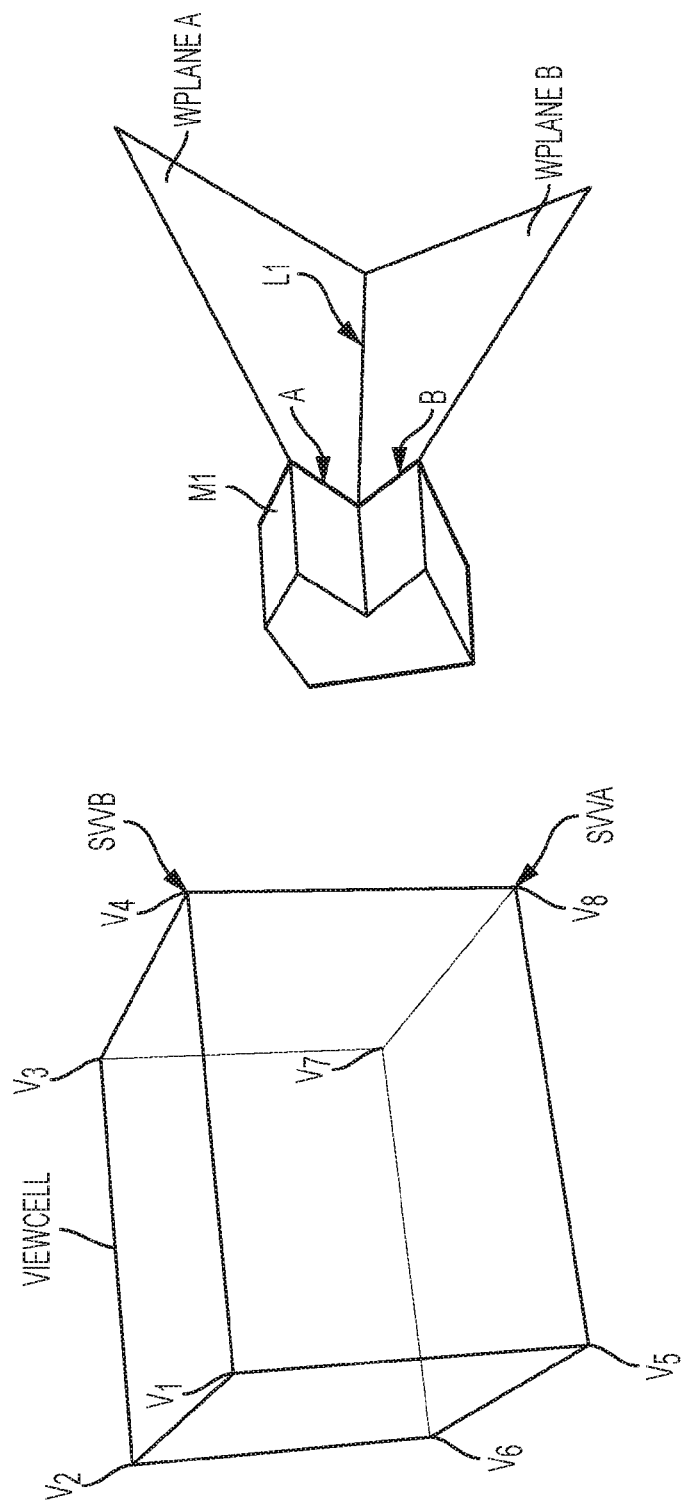
FIG. 9A is an exemplary diagram showing the first-order umbra boundary incident on silhouette edges A and B constructed by the prior art method of Teller (1992) perspective view looking in a general direction from viewcell toward mesh object.

FIG. 9A is a diagram showing the umbral event surfaces incident on silhouette edges A and B constructed by the prior art approach of the linearized antipenumbra described by Teller (1992). In this prior art method, which was used only for the limited problem of portal sequence visibility, the umbral event surface is constructed entirely from the planes of the supporting polygons. Portions of these supporting planes incident on silhouette edges A and B are shown and labeled WPLANE_A and WPLANE_B. These planes intersect at line L1 to form a continuous visibility event surface incident on silhouette edges A and B.

In Teller's prior-art method of linearized antipenumbra, Teller (1992), visibility event surfaces are approximated by intersecting only the planes of supporting polygons incident on portal edges and supported by source vertices wherein the source is an earlier portal in a sequence of portals. Theses supporting polygons correspond to the SV-ME supporting polygons (using the nomenclature of the present embodiments). Teller's method does not employ the corresponding SE-MV supporting polygons in the construction of umbral event surfaces, but the planes of these polygons.

In contrast, SV-ME wedges, as constructed by the present embodiments, are semi-infinite polygons, restricted laterally by the semi-infinite extension of the supporting polygon edges, which are rays. The SV-ME wedges are also restricted at the corresponding first-order silhouette edge. Teller "wedges" are actually planes that have no lateral restriction. The present embodiments of constructing "Teller Wedges" is to extend the planes of adjacent SV-ME wedges at an inside corner until the planes intersect.

In the following analysis, we show that by using visibility event surfaces constructed from both SV-ME and SE-MV supporting polygons, the present method can provide a significantly more precise from-region visibility solution than by using Teller's approach in which the planes of only one type of supporting polygon are intersected.

It must be emphasized that the method of Teller (1992) is designed only to provide a solution to the restricted visibility problem of visibility through a sequence of polygonal portals. Teller's method does not identify silhouette edges on which to construct visibility event surfaces, because in Teller's method, the edges supporting visibility event surfaces are limited to the edges of the portals. Since Teller's method does not apply the intersecting-planes method to construct visibility event surfaces on silhouette edges of general polygon meshes; the following analysis amounts to a theoretical comparison of Teller's intersecting-planes method if it were applied to the general problem of from-region visibility in polyhedral environments versus the present method of pivot-and-sweep visibility event surface construction, which is actually used in the more general visibility problem.

Figure 9B:
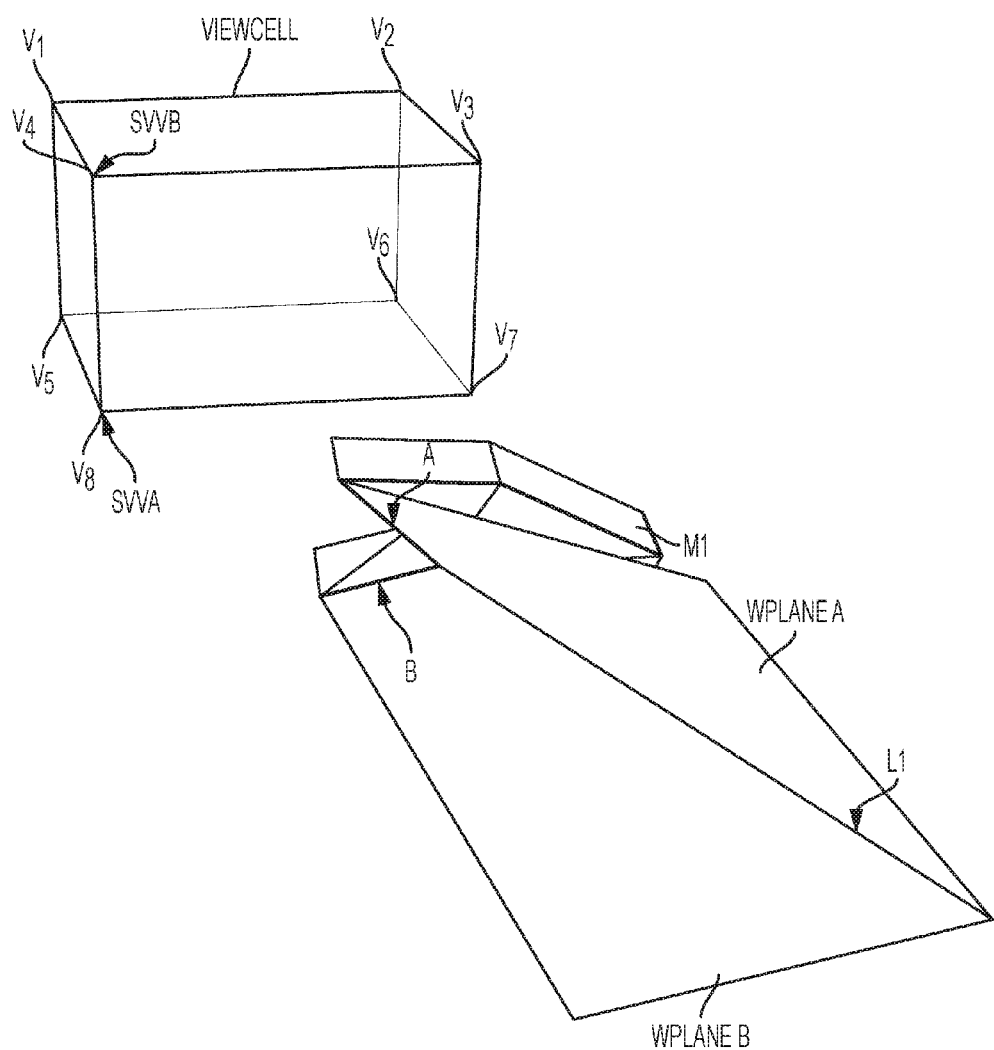
FIG. 9B is an exemplary diagram showing the same objects as FIG. 9A but from a perspective view looking in a general direction from mesh object toward viewcell.

FIG. 9B is a diagram showing the same objects as FIG. 9A, but from a perspective view looking in a general direction from mesh object toward viewcell.

Figure 9C:
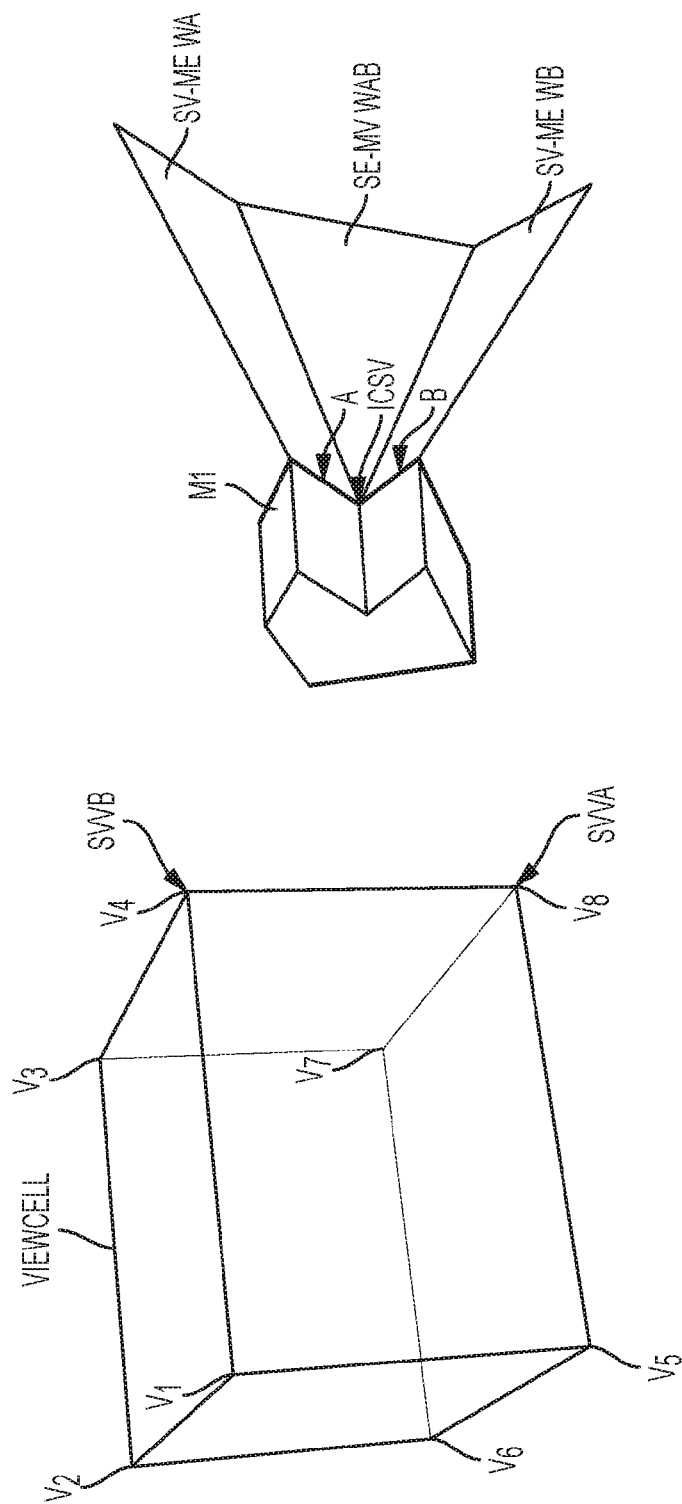
FIG. 9C is an exemplary diagram showing the more precise umbra boundary produced by the present method as compared to the umbra boundary produced by the prior art method of Teller, perspective view looking in a general direction from viewcell toward mesh object.
Figure 9D:
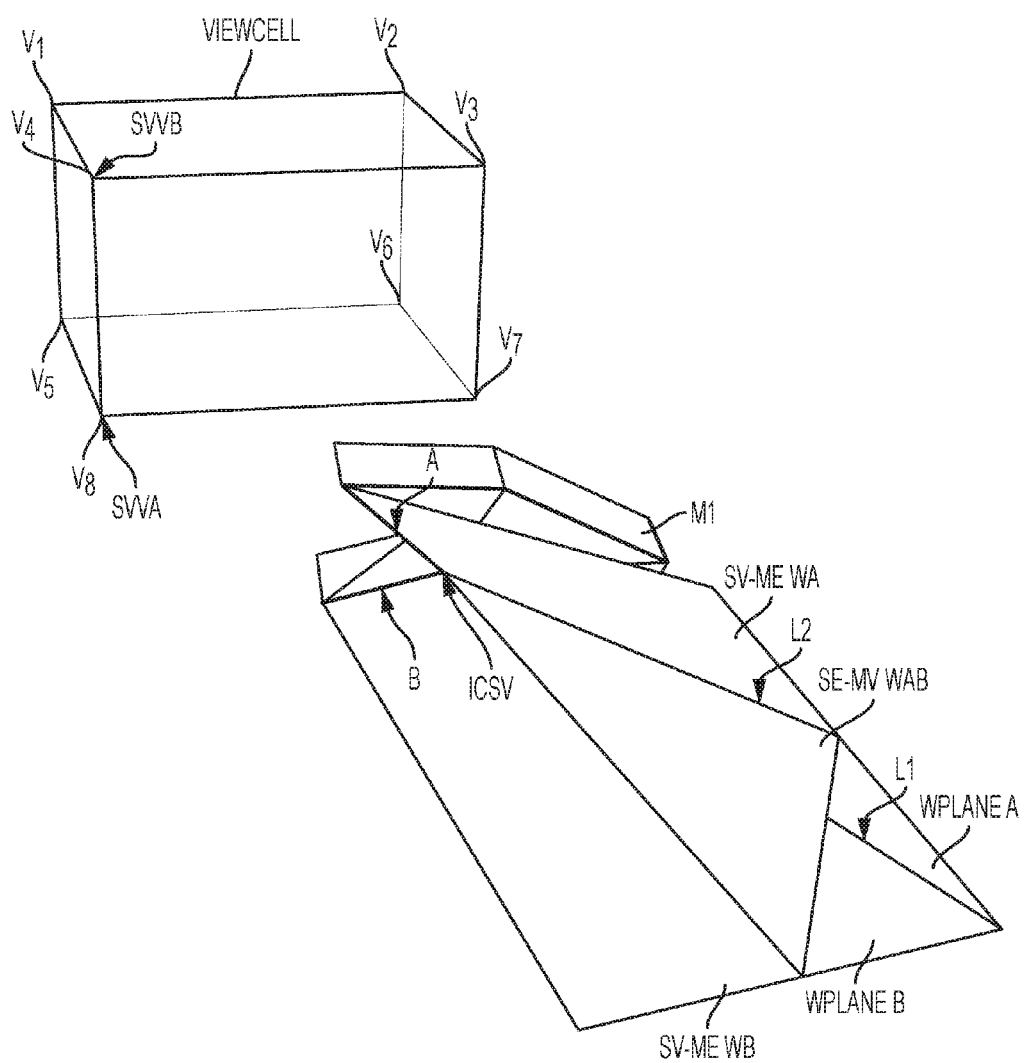
FIG. 9D is an exemplary diagram showing the same objects as FIG. 9C but from a perspective view looking in a general direction from mesh object toward viewcell.

FIG. 9C and FIG. 9D are a diagrams showing the more precise umbral event surface produced by the present method as compared to the umbra event surface that would be produced by the prior art method of intersecting supporting planes. In FIG. 9C and FIG. 9D, the umbral event surface formed by the present method of pivot and sweep construction of wedges is shown superimposed on the umbral event surface formed by the prior-art method of intersecting supporting planes. From the perspective view of FIG. 9D, looking in a general direction from viewcell toward mesh object, it can be seen that the present method produces a larger, more precise, umbra volume than the prior art method. The addition of the SE-MV wedge generated from the swept triangle (SE-MV supporting polygon) produces a larger conservative umbra volume (and hence a more precise potentially visible set) than the intersection of the supporting planes alone. Unlike the prior art method of intersecting planes, the present method of sweeping the viewcell silhouette contour can account for the effect of containment on the viewcell surface on the visibility at inside corner silhouette vertices. Consequently, for any silhouette contour with inside corner vertices in which adjacent supporting polygons pivot to different vertices of the viewcell, the present method will produce a more precise result than the intersecting-planes approach.

FIG. 9D also shows that the deviation between the umbral event surfaces produced by the present pivot-and-sweep method and the prior-art intersecting planes method tends to increase with distance from the supported silhouette edges and vertex. Consequently, for most inside-corner silhouette vertices, the precision of the present method can be much higher than the prior-art method of using intersecting planes.

FIG. 9D is a diagram showing the same objects as FIG. 9C, but from a perspective view looking in a general direction from mesh object toward viewcell.

Flipbook Views of Identifying Conservative Supporting Polygons and Constructing Corresponding Wedges.

Subsets of FIGS. 7-9, when viewed in specific sequences, provide flipbook views of the method of identifying conservative supporting polygons and constructing the corresponding wedges. These sequences are listed below:

Pivoted supporting polygon & wedge: View generally from behind viewcell: 7A, 7D, 7E, Pivoted supporting polygon & wedge: View generally from in front of viewcell: 7B, 7C, 7G, 7H, Swept supporting polygon & wedge: View generally from behind viewcell: 7A, 8A, 8B, (8C showing combination of pivoted wedges and swept wedges).

Swept supporting polygon & wedge: View generally from in front of viewcell: 7B, 8E, 8F, (8G showing combination of pivoted wedges and swept wedges).

Figure 10A:
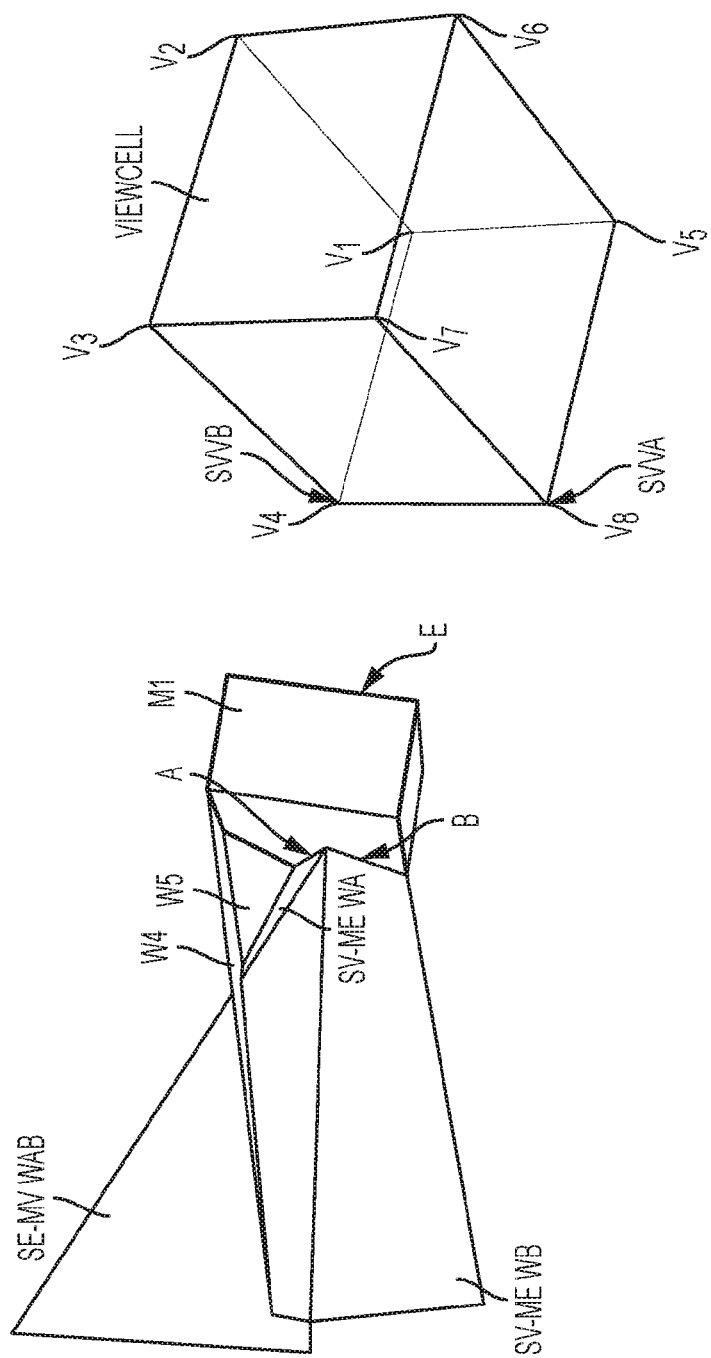
FIG. 10A is an exemplary diagram showing some additional UBPs of the umbra boundary surface formed by the intersection of UBPs for several adjacent first-order silhouette edges, perspective view looking in a general direction from viewcell toward mesh object.

FIG. 10A is a diagram showing the same mesh polygon and viewcell as FIGS. 9A and 9B, but in a perspective view looking in a general direction from beneath the polygon mesh. FIG. 10A shows the same first-order visibility event surfaces (wedges) as shown in FIG. 9C. Specifically SV-ME WA, incident on first-order silhouette edge A, SV-ME WB, incident on first-order silhouette edge B, and SE-MV WAB are shown.

Two additional first-order SV-ME wedges, W4 and W5, are also shown. The supporting viewcell vertex for wedges W4 and W5 is $V_3$. The intersection of these wedges is shown. Wedges intersect each other and other mesh polygons to form umbra boundary polygons (UBPs). These UBPs form the surface of first-order polyhedral aggregate umbrae (PAU). The volume of space enclosed by the PAU is first-order occluded from the corresponding viewcell. The UBPs corresponding to the intersections of the wedges are not explicitly shown in FIG. 10A but can be inferred from the intersection lines that are shown. Some of the wedges that would form the complete PAU are omitted so the interior structure of part of the first-order PAU can be seen (e.g. intersection of wedges W4, W5, SV-ME WA, SE-MV WAB, and SV-ME WB).

FIG. 10B is a view of the same polygon mesh (M1) as shown in FIG. 10A. In FIG. 10B mesh M1 and the viewcell are viewed from a perspective similar to that of FIG. 8I, looking generally at the "top" side of mesh M1, containing the inside corner mesh edge. This view is very different from the view of M1 and the viewcell given in FIG. 10A. Note the same edge of M1 is labeled E in both figures and is on the "bottom" of mesh M1. Edge A and edge B are also labeled in both figures.

In FIG. 10A the occluded side of the wedges is shown.

In FIG. 10B the unoccluded side of the corresponding UPBs is shown.

FIG. 10B shows 5 UBPs that are formed by intersecting the corresponding wedges with other wedges.

UBP-A is formed by the intersection of the corresponding wedge (SV-ME WA) with wedge W5 (shown in FIG. 10A). UBP-A is also restricted by the intersection of SV-ME WA with wedge W4 shown in FIG. 10A. W4 is completely hidden in FIG. 10B, but the intersection of W4 and wedge SV-ME WA is shown as the edge labeled F in FIG. 10B. Edge F is an edge of UBP-A. Additionally, UBP-A shares a common edge with UBP-AB (which is derived from SE-MV WAB, shown in FIG. 10A).

UBP-AB is formed by the intersection of SE-MV WAB with wedge W4 and with the wedge of UBP-D. UBP-AB shares a common edge with both UBP-A and UBP-B as a consequence of the sweep construction of the corresponding wedge SE-ME WAB. UBP-AB is also restricted by its intersection with the pivoted wedge corresponding to UBP-D (which is supported by mesh edge D).

UBP-5 is formed by the intersection of the corresponding pivoted wedge (W5 shown in FIG. 10A, which has corresponding supporting viewcell vertex $V_3$) with W4, and with SV-ME WA.

UPB-D is formed by the intersection of the wedge incident on first-order silhouette edge D (wedge is not shown, but having supporting viewcell vertex $V_8$) with wedges SV-ME B, SE-MV AB, and W4 as well as the wedge supported by edge E (wedge not shown).

The UBPs form the boundary of the PAU for M1. Not all of UBPs forming the PAU of M1 are seen in the view given in FIG. 10B.

FIG. 10B illustrates wedges which are fully restricted by other wedges. Embodiments using such fully restricted wedges (e.g. the output-sensitive construction of PAU in the exemplary flowchart FIG. 26) are possible. Additionally, embodiments using partially restricted wedges (e.g. SV-ME wedges intersecting each other at outside-corner first-order silhouette edges) such as may optionally be employed in the output-sensitive construction of visibility maps shown in exemplary flowchart of FIG. 20A which employs SV-ME wedges that may be optionally locally restricted by intersecting adjacent SV-ME wedges as described in a step 140 of the exemplary flowchart shown in FIG. 1. Additionally, the wedges can be used without such local wedge-wedge restriction because the described methods of determining if an intersection of a wedge with a mesh polygon is actually an occlusion boundary (employing the modified point-in-polyhedron test) do not require the a-priori local or global restriction of a wedge with other wedges prior to making this determination.

Figure 11A:
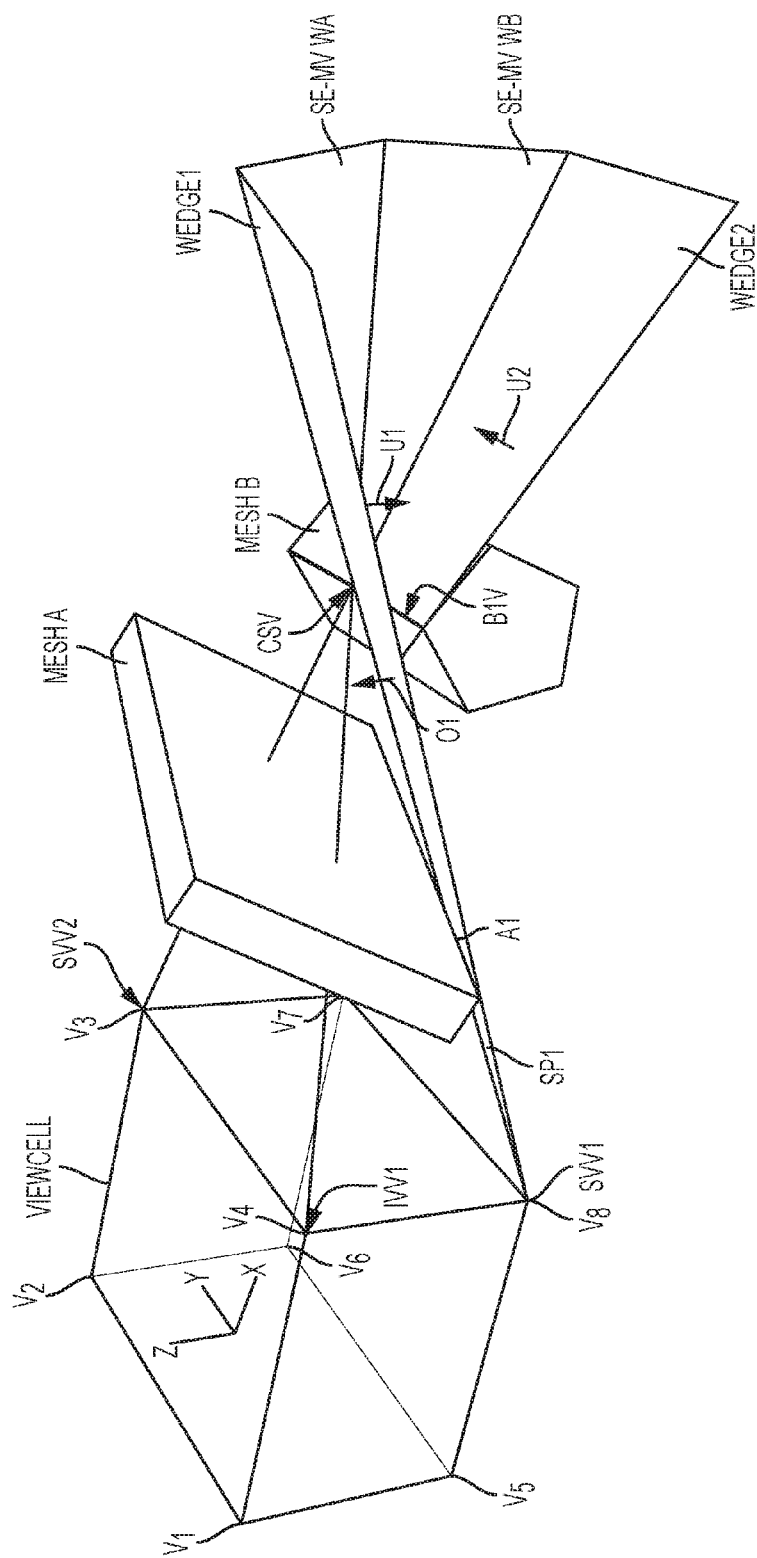
FIG. 11A is an exemplary diagram showing first-order visibility event surfaces (wedges) generated by the present pivot and sweep method in the case of a compound silhouette contour.

FIG. 11A is a diagram showing first-order visibility event surfaces (wedges) generated by the present method in the case of a compound silhouette contour. In this case a SV-ME wedge (WEDGE 1) is incident on (supported by) first-order silhouette edge A1. WEDGE1 intersects a first-order silhouette edge labeled B1. As discussed in FIG. 2A, WEDGE1 divides first-order silhouette edge B1 into an occluded side (B1O) and an unoccluded side (B1V). This view is identical to that of FIG. 2A.

The intersection of the first-order wedge WEDGE1 with the first-order silhouette edge is a compound silhouette vertex labeled CSV. The compound silhouette vertex corresponds to an inside corner of a compound silhouette contour. Using the terminology of catastrophe theory, the CSV corresponds to a t-vertex of the resulting manifold. Catastrophe theory includes the study of point singularities (e.g., CSVs or T-Vertex) and contour singularities (e.g., a first order silhouette edge) on manifold surfaces (e.g., manifold mesh).

Wedge2 is a first-order visibility event surface (a SV-ME wedge) that is supported by (incident on) the segment B1V, which is the visible portion of the first-order silhouette edge B1.

Thus WEDGE1 and WEDGE2 are both SV-ME wedges that intersect at the point CSV. Since WEDGE1 and WEDGE2 are constructed by the pivot process (FIG. 4A and FIG. 6A) of the pivot-and-sweep method using different supporting viewcell vertices (SVV1 and SVV2, respectively) the two wedges do not join on-edge to form a continuous umbral visibility event surface.

The sweep process (FIG. 5A and FIG. 5B, and FIG. 6B) of the present pivot-and-sweep method is used to construct SE-MV wedges (SE-MV WA and SE-MV WB) which join WEDGE1 and WEDGE2 into a continuous umbral visibility event surface. The wedge SE-MV WA is formed from the supporting SE-MV triangle generated between CSV, SVV1, and the intervening vertex IVV1 on the supporting viewcell silhouette contour (SVSC). The extension of the two edges of this supporting triangle through the point CSV forms the semi-infinite wedge SE-MV WA. Similarly, the wedge SE-MV WB is formed from the supporting SE-MV (swept) triangle generated between CSV, SVV2, and the intervening vertex IVV1 on the supporting viewcell silhouette contour (SVSC). The extension of the two edges of this supporting triangle through the point CSV forms the semi-infinite wedge SE-MV WB.

Figure 11B:
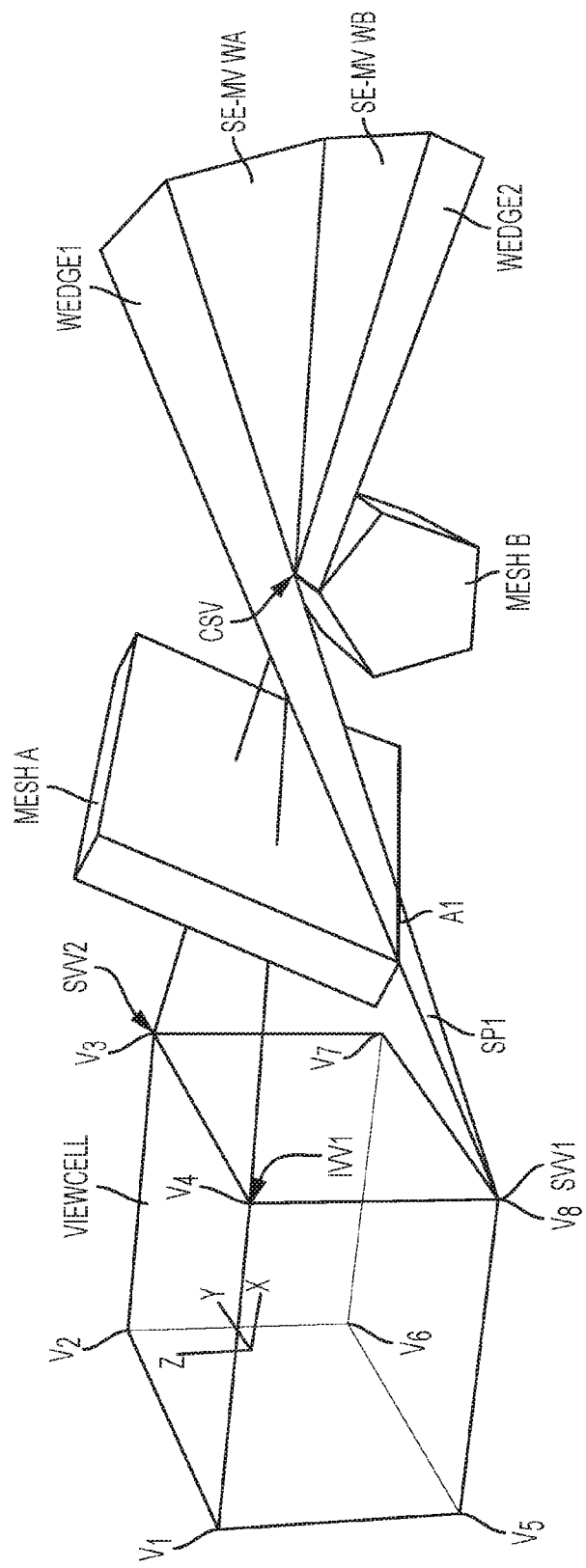
FIG. 11B is a different view of the same structures shown in FIG. 11A.

SE-MV WA and SE-MV WB connect at a common edge. SE-MV WA shares a common edge with WEDGE1. SE-MV WB shares a common edge with WEDGE2. The four connected wedges form part of the continuous first-order umbral visibility event surface incident on the silhouette edges A1 and B1V. The view of FIG. 11A shows the occluded side of WEDGE1 (arrow O1) and the unoccluded (from-viewcell, first-order visible) side of WEDGE2 (arrows U1 and U2). The view of FIG. 11A shows the "contained" (from-viewcell, first-order visible) side of SE-MV WA and SE-MV WB. As illustrated in FIG. 11A the intersection of wedges WEDGE1, SE-MV WA, SE-MV WB, and WEDGE2 forms a continuous event surface with the arrows U1 and U2 indicating the unoccluded side of the even surface. FIG. 11B is a different view of the same structures shown in FIG. 11A. In FIG. 11B, the view is looking up to the occluded side of WEDGE1 and the unoccluded side of WEDGE2. FIG. 11B also shows the "contained" (from-viewcell, first-order visible) side of SE-MV WA and SE-MV WB.

This concludes a description of a first embodiment. In this description, a process for generating first-order visibility event surfaces is presented. Additional embodiments specify the order of processing the polygons and edges of a mesh to generate the first-order visibility event surfaces. Further embodiments detail precisely how the visibility event surfaces are used to determine occluded polygons and polygon fragments. In the following detailed description of an alternate embodiment, a mesh traversal algorithm is disclosed in which first-order wedge construction and from-viewcell visibility determination are efficiently interleaved in a front-to-back visibility map construction algorithm which tends to have output-sensitive performance.

Figure 11C:
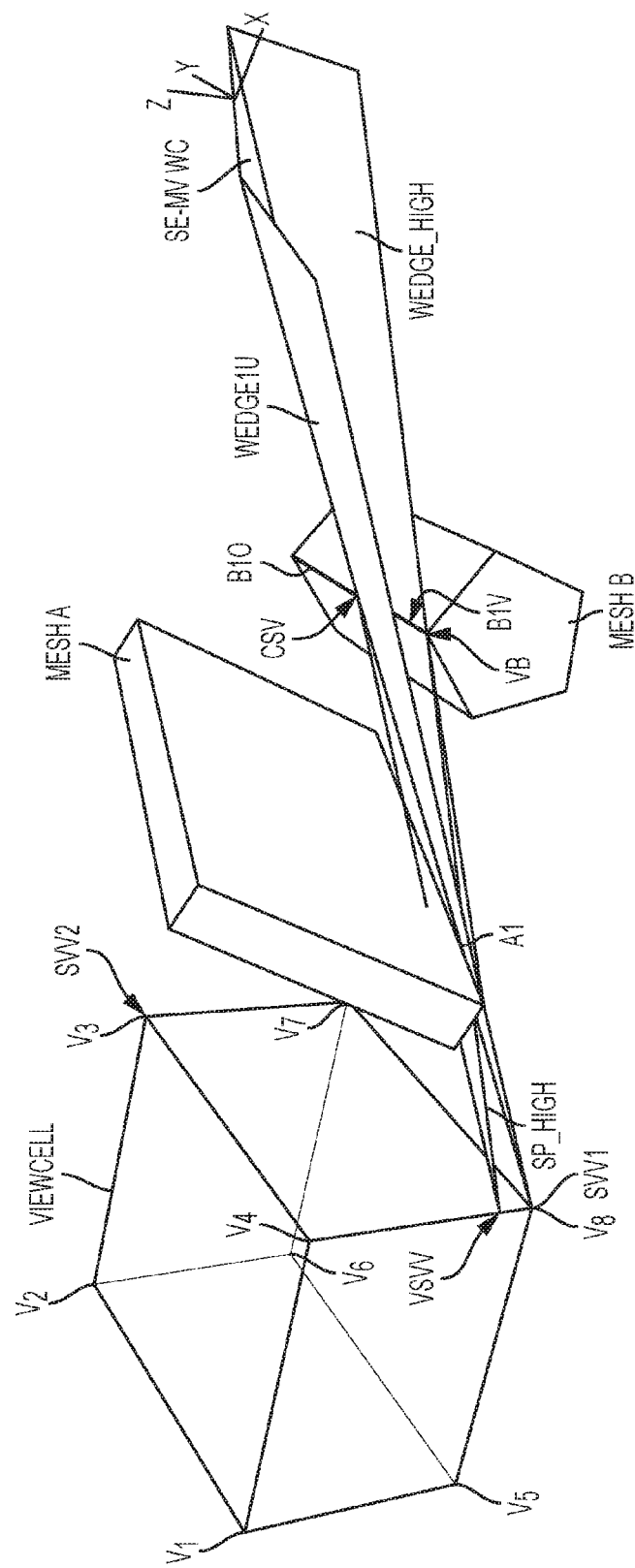
FIG. 11C shows a portion of a continuous linearized umbral event surface formed at a compound silhouette vertex using at least one higher-order pivoted wedge. Same view as FIG. 2B and FIG. 11A.

FIG. 11C shows the same two polygon meshes as depicted in FIG. 2B, FIG. 11A and FIG. 11B. FIG. 2B and FIG. 11C both show a higher-order pivoted wedge labeled WEDGE_HIGH. This wedge is constructed by the backprojection method of identifying a visible supporting viewcell vertex discussed in conjunction with FIG. 2B and related figures. In this case the visible supporting viewcell vertex for the first order silhouette edge segment B1V is labeled VSVV.

FIG. 11A shows that the first-order pivoted wedge incident on B1V is labeled WEDGE2. FIG. 11A shows that a continuous umbral event surface is formed by first-order pivoted wedges and swept wedges all of which intersect at a compound silhouette vertex (CSV).

Similarly FIG. 11C shows that a continuous umbral event surface is also formed by higher-order wedges intersecting first-order wedges at a compound silhouette vertex. In FIG. 11C, the higher-order pivoted wedge labeled WEDGE_HIGH is formed on the visible portion (B1V) of the first-order silhouette edge by the method described in conjunction with FIG. 2B. Since WEDGE_HIGH is formed by an adjusted or higher-order pivot on B1V, it intersects the compound silhouette vertex labeled CSV, which is an endpoint of B1V.

The first-order wedge WEDGE1U is also incident on the point CSV. In fact, the intersection of WEDGE1U with the entire first-order silhouette edge (shown as segments B1V+B1O) is the CSV. In this case, a continuous umbral surface is formed between WEDGE1U (first-order wedge, pivoted to SVV1) and WEDGE_HIGH (higher-order pivoted wedge, pivoted to VSVV); by connecting these two pivoted wedges with a swept wedge labeled SE-MV WC which is formed from the swept supporting polygon constructed by sweeping from SVV1 to VSVV through the CSV. All three of these wedges intersect at the CSV.

Comparing the higher-order umbral event surface of FIG. 11C to the corresponding first-order umbral event surface shown in FIG. 2B it is evident that the higher-order event surface of FIG. 11C produces a larger umbral region, and therefore a smaller visible region. When the higher-order event surfaces are intersected with other mesh polygons and used to determine which mesh polygons and/or fragments of mesh polygons are conservatively visible from the viewcell, the result will be a more precise visibility map and corresponding PVS than if only first-order wedges are employed. In this particular case the use of a higher-order wedge instead of the corresponding first-order wedge does not even increase the geometric complexity of the resulting visibility map, since in this case only one swept (SE-MV) wedge is used to connect the two pivoted wedges, instead of two swept wedges required in the first-order case.

Figure 12:
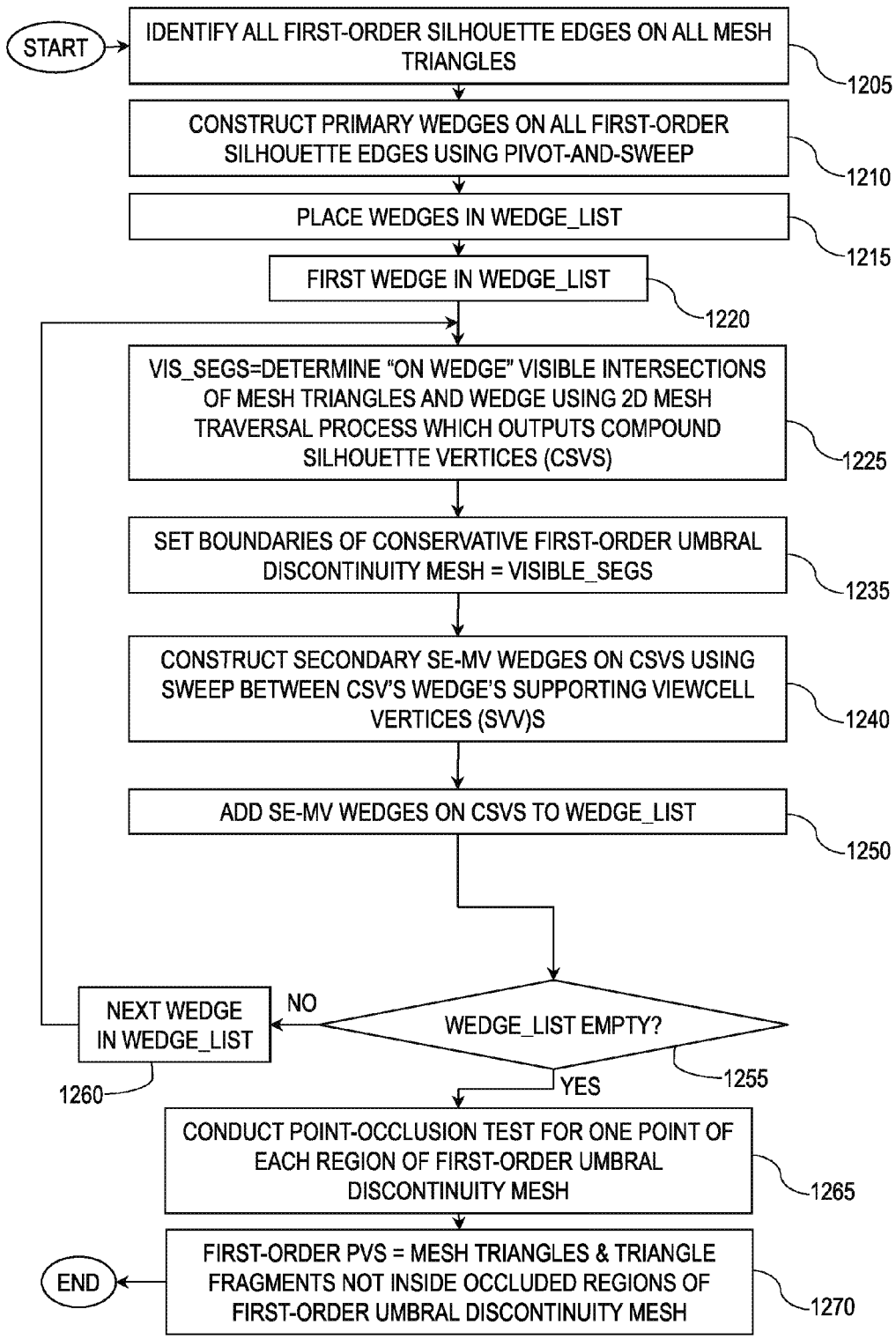
FIG. 12 is an exemplary flowchart showing a method of constructing a conservative, first-order, linearized umbral discontinuity mesh using pivot-and-sweep construction of wedges.

FIG. 12 Detailed Description—Alternate Embodiment Showing a Method of Constructing a Conservative, First-Order, Linearized Umbral Discontinuity Mesh Using Pivot-and-Sweep Construction of Wedges.

FIG. 12 is a flowchart showing a method of constructing a conservative, linearized umbral discontinuity mesh using pivot-and-sweep method of constructing first-order wedges. According to some embodiments, the process illustrated in FIG. 12 starts at step 1205, where the first-order silhouette edges of all mesh triangles are identified. In some embodiments, first-order silhouette edges can be identified using the method detailed in FIG. 3.

Process flow proceeds to step 1210 to construct the initial primary wedges incident on the first-order silhouette edges using the pivot-and-sweep method detailed in FIG. 1 through FIG. 6. In embodiments, the primary wedges are those wedges constructed on encountered first-order silhouette edges using the pivot and sweep method. On initial construction, in some embodiments, all wedges are initial wedges which have not yet been further restricted by an on-wedge visibility step.

In the present method, wedges are defined and constructed differently than in prior-art discontinuity meshing methods. In prior-art discontinuity meshing methods, planar wedges are not defined in regions of the wedge for which the corresponding viewcell supporting structure (vertex or edge) is occluded from the supported mesh silhouette element (vertex or edge). As a result, these prior-art methods compute exact linear wedges which may not form continuous linear umbral event surfaces because parts of the wedge are undefined because of mesh polygons intersecting the corresponding supporting polygon. These "gaps" in the linear umbral event surface are evident when only planar event surfaces are considered, for example in the method of incomplete discontinuity meshing (Heckbert 1992). These gaps actually correspond to higher-order visibility event surfaces (often quadrics) which involve edge-edge-edge events between the silhouette edge, the intervening edge intersecting the supporting polygon, and a viewcell edge. These gaps are actually filled by higher-order event surfaces when complete discontinuity meshing is employed.

In contrast, in the present method of wedge construction according to some embodiments, a wedge is defined only by the supported mesh silhouette structure and the supporting viewcell structure: any intervening geometry does not affect the structure of the wedge.

In the present method of first-order discontinuity meshing, the gaps evident in the umbral boundary produced by the incomplete discontinuity meshing method (Heckbert 1992) are filled by: 1) conservatively defining a wedge during construction of the wedge by ignoring intervening geometry between the wedge's supported silhouette structure (edge or vertex) and the supporting viewcell structure (i.e., ignoring geometry intersecting the wedge's supporting polygon) and, 2) constructing conservative, planar secondary SE-MV wedges at the point of intersection of a wedge with (conservatively) visible mesh silhouette edges. This point is called the compound silhouette vertex (CSV). The result is a continuous, conservative, linear umbral boundary without the "gaps" produced by incomplete discontinuity meshing methods which employ only exact linear event surfaces.

Process flow proceeds from step 1210 to step 1215 to place the initial wedges constructed in step 1210 in a list called the WEDGE_LIST.

Process flow proceeds to step 1220 to subject the first wedge in the WEDGE_LIST to processing comprising the steps 1225 through 1250. In embodiments, the WEDGE_LIST is implemented using any desired data structure such as a linked list or hash table.

Process flow proceeds to step 1225 to determine the on-wedge visible intersections of the mesh triangles with the wedge. The intersection of a mesh triangle and a wedge is a line segment. Those segments (or portions thereof) which are visible on the wedge are the on-wedge visible segments (VIS_SEGS).

In the present method, the on-wedge visible segments are determined, in some embodiments, by a 2D mesh traversal method which determines the conservatively visible segments using an output sensitive 1-manifold (polyline) traversal. This method is detailed in FIG. 14, FIG. 15, and FIG. 16 and related figures and discussed elsewhere in this specification. During the conduct of this method of on-wedge visible segment determination, specific vertices where first-order, from-viewcell silhouette edges intersect the wedge are identified. These vertices are points of intersection between the current wedge and the other wedge incident on the first-order silhouette edge. This type of vertex is called a compound silhouette vertex (CSV) and represents at t-vertices of the silhouette contour, on which secondary conservative connecting SE-MV wedges are later constructed.

Process flow proceeds to step 1235 each VISIBLE_SEG is stored as a bounding segment of the first-order umbral discontinuity mesh. These segments form boundary polylines of the umbral discontinuity mesh that conservatively partition the mesh into regions which are unoccluded from the viewcell and regions which are occluded from the viewcell.

Process flow proceeds to step 1240, the pivot-and-sweep method is used to construct one or more SE-MV wedges incident on the wedge's CSVS identified during the on-wedge visibility step, 1225. As previously defined, each CSV corresponds to the intersection of a current wedge and another wedge which is supported on the from-viewcell, first-order silhouette edge intersecting the current wedge. These wedges intersect at the point of the CSV.

The sweep operation used to generate the SE-MV wedges connecting the two component wedges intersecting at the CSV is the same sweep operation described as part of the pivot-and-sweep method, described in conjunction with FIG. 5A, FIG. 5B, and FIG. 6B. Sweeping occurs between the supporting viewcell vertices (SVVs) corresponding to the CSV's two component wedges. In some embodiments, the SVVs for each wedge are determined either at the time of construction (SV-ME wedge). In other embodiments, the SVVs for each wedge are determined during the on-wedge visibility step 1225 (SE-MV wedge, see step 1553 FIG. 15).

If both wedges intersecting at the CSV pivot to the same viewcell vertex, then the two wedges exactly intersect at their edges and no new SE-MV wedge is constructed.

If the two wedges intersecting at a CSV are formed by pivoting to two vertices of the same viewcell edge, then the result of pivot-and-sweep construction on the CSV is a single SE-MV wedge.

If the two intersecting wedges are SV-ME type then this connecting SE-MV conservatively approximates the quadric formed by the viewcell edge (connecting the two supporting viewcell vertices) and the two SV-ME silhouette edges corresponding to the intersecting wedges of the CSV. The single SE-MV wedge constructed on the CSV in this case conservatively approximates the corresponding quadric formed by the EEE event. In fact, the constructed SE-MV triangle can be interpreted as a degenerate quadric having infinite pitch.

If the two wedges intersecting at the CSV are formed by pivoting to vertices belonging to different viewcell edges then the result of pivot-and-sweep construction on the CSV is an edge-connected sequence SE-MV wedges.

If the two intersecting wedges are SV-ME type then these connecting SE-MV wedges conservatively approximate the quadrics formed by the viewcell edges and the two other silhouette edges corresponding to the intersecting wedges of the CSV. Once again, each of the SE-MV wedges can be considered to be a corresponding degenerate quadric with infinite pitch.

Process flow proceeds from step 1240 to step 1250 to add all secondary initial wedges constructed in step 1240 to the WEDGE_LIST. Which means that they will ultimately be processed by step 1225 to find on-wedge visible segments. In a subsequent step 1250 any SE-MV wedges constructed in step 1240 are added to the WEDGE_LIST.

Process flow proceeds to decision step 1255 to determine if all wedges in the WEDGE_LIST have been processed. If wedges remain in the WEDGE_LIST, then process flow proceeds to step 1260 to process the next unprocessed wedge in the WEDGE_LIST is selected in step 1260, where the process flow returns to step 1225.

If, in decision step 1255, it is determined that all wedges in the WEDGE_LIST have been processed, then process flow continues to step 1265 to determine the visibility of each region of the first-order discontinuity mesh by testing the from-viewcell visibility of a single point in each region. In some embodiments, the from-viewcell visibility of each tested point is determined using the point-occlusion method shown in FIG. 24B. This test, which is described in detail in conjunction with FIG. 24B and related figures, is based on a modified point-in-polyhedron test. It is important that this test employs the same conservative visibility event surfaces (wedges) that were used to construct the conservative.

Process flow proceeds to step 1270, where the first-order PVS is the set of mesh triangles and fragments of mesh triangles not inside umbral (occluded) regions of the conservative first-order umbral discontinuity mesh.

Comparison of Non-Output-Sensitive Method of Conservative Linearized Discontinuity Mesh Construction with Output-Sensitive Method of Conservative Linearized Visibility Map Construction Using 3D and 2D Mesh Traversal As detailed in FIG. 12, the conservative, linearized umbral discontinuity mesh can be constructed using the general prior-art approach to constructing discontinuity meshes. In this prior art approach, a wedge is constructed on each relevant silhouette edge, even those that are completely occluded from the source (viewcell in the present application). Then each wedge, including those constructed on completely occluded silhouette edges, is intersected with all potentially intersecting mesh triangles and the visible segments of mesh triangles on each wedge are later determined as a post-process.

In contrast, the method of constructing from-viewcell conservative linearized umbral visibility maps using 3D mesh traversal (FIG. 20A and related figures), used with 2D mesh traversal for on-wedge visibility (FIG. 15 and related figures), provides a more efficient, output-sensitive method of determining from-viewcell visibility. This method exploits the intrinsic connectedness and occlusion coherence of manifold meshes and solves the visibility problem in a front-to-back order. This method interleaves the processes of visible silhouette edge determination and wedge construction on the visible silhouette edges to achieve output-sensitive performance that is relatively independent of the depth complexity of the model.

In general, an output-sensitive process has a computational cost that is determined primarily by the size of the algorithm's output, as opposed to the size of its input. Since in realistic modeled environments, the size of the visible data set from any view region (output) is typically much smaller than the size of the entire model (input), an output-sensitive from region visibility precomputation process is advantageous.

The differences between the two methods of determining from-region visibility using conservative, linearized, umbral event surfaces, the output-insensitive method of FIG. 12, and the output-sensitive 2D/3D mesh traversal method (FIG. 20 and related figures) are summarized in Table Va.

TABLE Va

Comparison of Non-Output-Sensitive Method of CLUDM Construction With Output-Sensitive Method of CLUVM Construction

Figure 15:
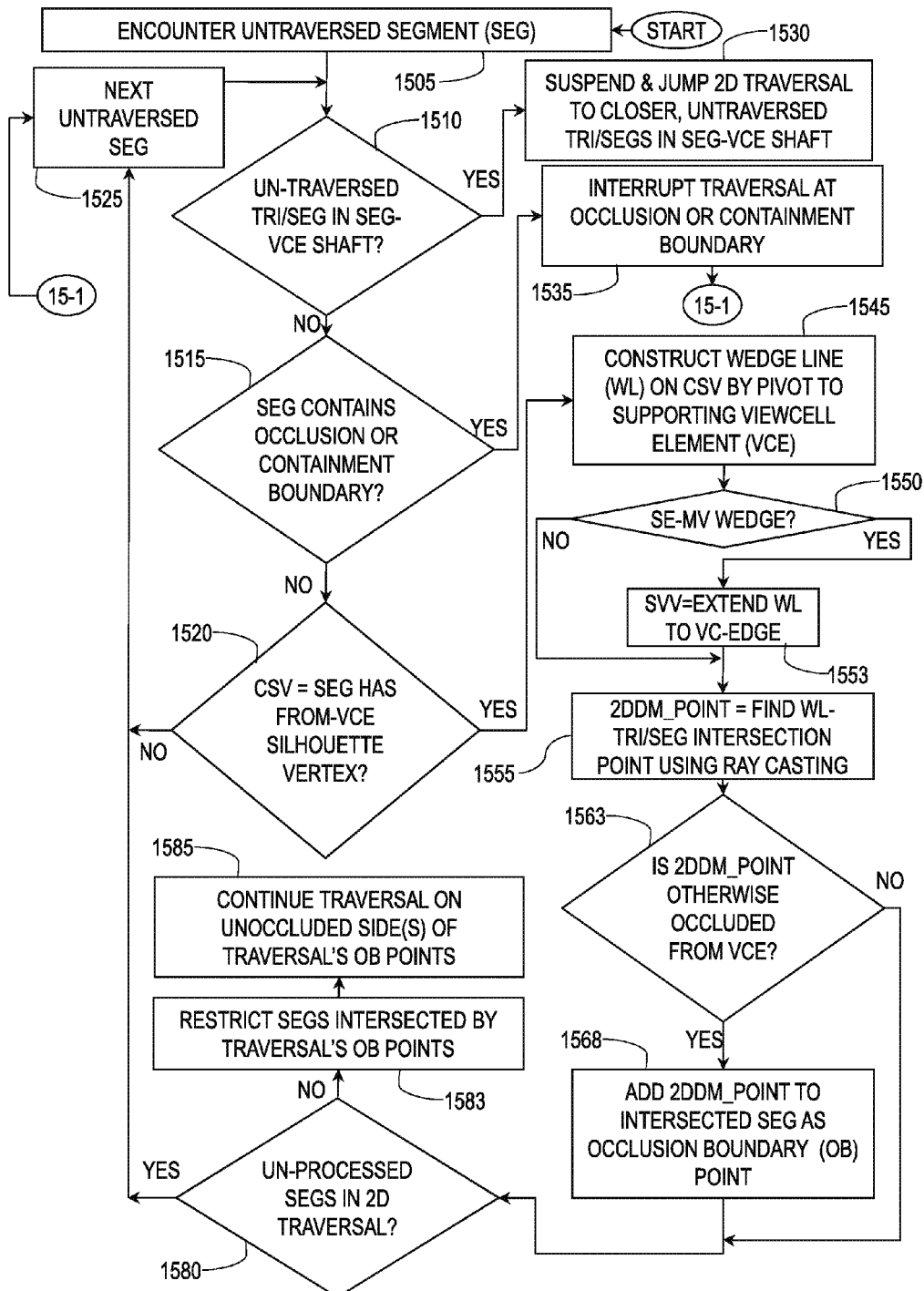
FIG. 15 is an exemplary flowchart showing the main traversal process for a method of constructing on-wedge, from-viewcell element 2D visibility map using 2D mesh traversal.

|  | Conservative Linearized Umbral Discontinuity Mesh (CLUDM) Non-Output-Sensitive Method of FIG. 12 | Conservative Linearized Umbral Visibility Map (CLUVM) Output Sensitive Method of FIG. 20 (3D Traversal) & FIG. 15 (2D Traversal) |
|---|---|---|
| Wedge Construction | 1. Intersect Wedge & All Potentially Intersecting Mesh Triangles 2. 2D visibility post-process to Find Visible Segments | Output-Sensitive 2D Mesh Traversal for On-Wedge Visibility |
| Wedges Generated | Visible + Occluded | Visible |
| Output Sensitive | No | Yes |
| Number of Cells in Region | $M^2 * N^2 * S^2 * S_{Shaft}^2$ (Discontinuity Mesh) | $M_V^2 * N^2 * S_V^2 * S_{VShaft}^2$ |

Where the following terms are used in the table and subsequent equations:

M=number of polygons in the model

N=number of edges in a viewcell

S=number of first-order silhouette edges in environment $S_{Shaft}$=number of first-order silhouette edges in a shaft formed between a single first-order silhouette edge and the viewcell $M_V$=number of visible polygons in the model $S_V$=number of visible first-order silhouette edges in environment $S_{VShaft}$=number of visible first-order silhouette edges in a shaft formed between a single first-order silhouette edge and the viewcell $V_w$=number of vertices of intersection between all polygons and a single wedge $M_w$=number of mesh polygons intersecting a wedge $V_{svw}$=number of visible (from point or from edge) silhouette vertices on a wedge $Seg_{vw}$=number of on-wedge visible segments of intersection between mesh polygons and a wedge The preceding table emphasizes that for the 2D/3D mesh traversal method, visible silhouette edges are identified during the front-to-back traversal of the manifolds. Consequently, only those wedges supported by visible silhouette edge segments are constructed. This results in a more output-sensitive implementation.

Comparison of Prior-Art Discontinuity Mesh Methods and the Present Method of Discontinuity Meshing Using Conservative Linearized Umbral Event Surfaces The prior-art method of discontinuity meshing was discussed in the Description of Background section of this specification. Discontinuity meshing methods construct both umbral and penumbral visibility event surfaces and determine their on-wedge visible intersection with mesh polygons. These intersections re-partition the mesh polygons such that in each face or "region" of the discontinuity mesh the view of the source (the "backprojection instance") is topologically equivalent. The goal of prior-art discontinuity meshing methods is primarily to identify illumination discontinuities that occur in the penumbra region of an area light source.

The present method of from-region visibility precomputation, in some embodiments, does not employ penumbral visibility event surfaces but instead uses only conservative umbral visibility event surfaces to identify mesh polygon fragments that are conservatively visible from a viewcell. These event surfaces can be employed to construct a conservative umbral discontinuity mesh as described in FIG. 12 (non-output-sensitive discontinuity mesh construction) and FIG. 19, FIG. 20, FIG. 21 and related figures (output-sensitive from-viewcell visibility map construction). Alternatively, the conservative umbral wedges can be intersected with each other to form umbral boundary polygons (UBPs) as described in FIG. 26.

Table Vb presents a comparison of the method of conservative linearized umbral visibility map (shown in FIG. 20 and related figures) with prior-art discontinuity meshing methods.

The row labeled "Wedges Generated" illustrates that the present method of 3D mesh traversal (FIG. 20 and related figures) using 2D mesh traversal (FIG. 15 and related figures) together comprise a from-region visibility method which is relatively output sensitive, as visibility event surfaces are generated only on visible (unoccluded) (first-order) silhouette edges. This contrasts to prior-art discontinuity mesh methods in which event surfaces are generated on all (general from-region) silhouette edges.

As shown later in this specification, embodiments also include a technique of higher-order backprojection to adap- TABLE Vb Comparison of Conservative Linearized Umbral Visibility Map (CLUVM) With Prior-Art Methods of Incomplete and Complete Discontinuity Meshing

| | Conservative Linearized Umbral Visibility Map | Incomplete Discontinuity Mesh (Prior Art) | Complete Discontinuity Mesh (Prior Art) |
|---|---|---|---|
| Wedge Type | Planar Exact and Planar Conservative | Planar Exact | Planar Exact & Quadric Exact |
| Event Surfaces | Umbral | Umbral, Extremal Penumbra, and Any Other Penumbral Surface intersecting Viewcell | Umbral, Extremal Penumbra, and Any Other Penubral Surface intersecting Viewcell |
| Silhouette Edges | 1. First-Order Wedges- Only First-Order Edges 2. Higher-Order- May Include other General From-Region Silhouette Edges | All From-Region Silhouette Edges | All From-Region Silhouette Edges |
| Planar Wedge Structure | Planar Conservatively Assumes Entire Supported Silhouette Element is Visible from Entire Supporting Viewcell Element | Wedge Not Defined on Segments of Supported Silhouette Element That Are Occluded from Supporting Viewcell Element | Planar Wedge Not Defined on Segments of Supported Silhouette Element That Are Occluded from Supporting Viewcell Element |
| Wedge Construction | 1. 3D manifold traversal identifies unoccluded silhouette edges. 2. 2D manifold traversal to solve on-wedge visibility | 1. Intersect Wedge & All Potentially Intersecting Mesh Triangles 2. 2D visibility post-process to Find Visible Segments | 1. Intersect Wedge & All Potentially Intersecting Mesh Triangles 2. 2D visibility post-process to Find Visible Segments |
| Wedges Generated | Visible | Visible + Occluded | Visible + Occluded |
| Umbral Boundary | Continuous | Discontinuous, Incomplete | Continuous Only With Addition of Quadrics |
| Precision of Umbral Boundary | 1. First-Order-Conservative 2. Higher-Order Converges on Exact | Incomplete | Exact |
| Performance | Output-Sensitive | Non-Output-Sensitive | Non-Output-Sensitive |

To summarize, the present method of first-order discontinuity meshing eliminates the gaps found in the umbral boundary produced by prior-art incomplete discontinuity meshing methods that consider only linear vertex-edge visibility event surfaces. The first-order method fills these gaps by: 1) conservatively extending the visible portions of the wedge by ignoring on-wedge occlusion in the corresponding supporting polygon and, 2) constructing conservative, planar SE-MV wedges at the points of intersection of a wedge with the (conservatively) visible mesh silhouette edges. These points of intersection of wedges are the CSVs and the construction of SE-MV wedges on these points using the sweep method results in a continuous, linear umbral boundary in the corresponding discontinuity mesh. This boundary is exact except in the gap regions, where it is approximate but always conservative.

The gaps in the umbral boundary that occur in prior-art methods of incomplete discontinuity meshing actually correspond to quadric umbral event surfaces which are represented in complete discontinuity meshing methods. However the use of quadric surfaces substantially increases the complexity the implementation.

Unlike the linear event surfaces used in the prior-art method of incomplete discontinuity meshing, the conservative linearized umbral event surfaces employed in the method of FIG. 12 form a continuous umbral surface which allows the determination of occluded and conservatively visible polygon mesh fragments.

tively refine the precision of the conservative linearized event surfaces in these gap regions. Using this refinement, and only planar wedges, the method can construct conservative umbral event surfaces in the gap regions that converge on the exact quadric event surfaces to within a specified error tolerance.

The use of conservative linearized umbral event surfaces greatly simplifies any implementation compared to prior-art complete discontinuity mesh methods which require quadrics. However, it is interesting to note that while the implementation is simplified, the asymptotic complexity of the linearized umbral surface is comparable to the complexity of the complete discontinuity mesh method using only S-EEE quadrics when viewed in terms of the actual number of event surfaces required.

The Table VIa shows the upper bounds of the number of umbral event surfaces and discontinuity mesh boundaries generated by first-order method compared to the upper bounds on the number of S-EEE surfaces (quadrics) that would be generated in a complete discontinuity mesh implementation assuming that quadrics were generated only on first-order silhouette edges.

M=number of polygons in the model
N=number of edges in a viewcell
S=number of first-order silhouette edges in environment
$S_{Shaft}$=number of first-order silhouette edges in a shaft formed between a single first-order silhouette edge and the viewcell TABLE VIa Estimate of Number of Event Surfaces and Cells/Regions for Discontinuity Meshes Using Various Visibility Propagation Models Assuming Non-Output Sensitive Construction

| Visibility Propagation Model | Number of Event Surfaces Generated | Event Surfaces × Face Intersections | Number of Cells in Discontinuity Mesh |
|---|---|---|---|
| First-Order Pivot & Sweep | $O(N*S*S_{Shaft})$ - The number of possible S-EEE events formed between N viewcell edges and S silhouette edges. SE-MV wedges on CSVs. | $M*N*S*S_{Shaft}$ | $M^2*N^2*S^2*S_{Shaft}^2$ |
| Complete Discontinuity Mesh Method using S-EEE quadrics | $O(N*S*S_{Shaft})$ - S-EEE events between N viewcell edges and S silhouette edges. Quadrics | $M*N*S*S_{Shaft}$ | $M^2*N^2*S^2*S_{Shaft}^2$ |
| Complete Discontinuity Mesh Using NonS-EEE Quadrics | $O(N*S*S_{Shaft}^2)$ - S-EEE events between N viewcell edges and S silhouette edges. Quadrics | $M*N*S*S_{Shaft}^2$ | $M^2*N^2*S^2*S_{Shaft}^4$ |
| Teller Conservative - specified by Teller for simple silhouette vertices but extended in the present method to first-order SV-ME wedges intersecting at CSVs. | $O(N*S)$ No new event surfaces at compound silhouette vertices. Existing SV-ME wedges conservatively extended to intersection. | $M*N*S$ | $M^2*N^2*S^2$ |

The last row of the table shows the expected complexity of the event surfaces and discontinuity mesh boundaries produced if Teller's linearizing method of extending the plane of adjacent SV-ME wedges to intersection were employed at the compound first-order silhouette vertices (CSVs). Unlike the first-order pivot and sweep method and the S-EEE method employing quadrics, the method of extending SV-ME wedges to intersection would introduce no new event surfaces at the CSVs and therefore, produce fewer event surfaces. These extended event surfaces are generally less precise than the corresponding first-order SE-MV wedges (especially close to the viewcell). Consequently, they would tend to actually intersect a greater number of model polygons and significantly underestimate the umbral regions if used close to the viewcell. This fact is used in the present invention which employs a technique of using first-order SE-MV (generated by pivot and sweep) wedges at CSVs close to the viewcell. Farther from the viewcell, SV-ME wedges intersecting at CSVs are extended to intersection. The resulting extended wedges are not as imprecise at greater distances from the viewcell. This technique maintains the conservativeness of the umbral event surfaces while reducing the number of event surfaces required to maintain a desired precision of the resulting umbral discontinuity mesh.

The third row of Table VIa shows that the complete discontinuity mesh including Non-S-EEE event surfaces has a considerably higher complexity.

The conservative estimates of the number of event surfaces for the first-order visibility propagation shown in Table VIa conservatively assumes that the number of silhouette edges is a linear function of the number of polygons in the model. In fact, the first-order model generates event surfaces only on first-order silhouette edges, which are considerably less numerous than general from-viewcell silhouette edges employed by the complete discontinuity meshing methods. For detailed meshes the number of silhouette edges tends to approach the square root of the number of polygons. If this assumption were made, then the number of event surfaces would be reduced by one order of magnitude and the complexity of the discontinuity mesh arrangement would be reduced by two orders of magnitude. This assumption is the basis for the estimate of the complexity of the first-order visibility map given in Table II.

Of course, also contributing to the complexity of the complete discontinuity mesh is the fact that in prior-art (non-output-sensitive) methods of construction, all of the visibility event surfaces are constructed even though many of these are actually completely inside the from-region (e.g., from-viewcell) umbra and hence do not contribute to the actual from-region umbral or penumbral boundaries. In contrast, the output-sensitive method of constructing CLUVM generates a first-order umbral event surfaces which are extremal in the sense that no other (first-order) visible umbral event surfaces are contained within the CLUES, although the CLUES can be refined by backprojection to account for higher-order visibility effects.

Once again, Table VIa assumes non-output-sensitive construction of the discontinuity meshes. Elsewhere in this specification, it is shown that output-sensitive construction of the corresponding visibility map can considerably reduce the number of event surfaces constructed and the corresponding complexity of the arrangement of regions.

From-region visibility methods only compute, in some embodiments, the exact umbral boundary event surfaces or a conservative approximation of these surfaces. In contrast, discontinuity mesh methods must generate all event surfaces (umbral and penumbral), which intersect the polygon mesh such that the mesh is repartitioned into discontinuity mesh faces within which the topological view of the source region is uniform. Consequently, the (exact or conservative) umbral boundary surfaces are generally a small subset of the visibility event surfaces computed in discontinuity meshing methods.

The present methods of computing from-region visibility by constructing umbral discontinuity meshes, from-viewcell visibility maps, or polyhedral aggregate umbrae makes intrinsic use of polygon orientation to construct only umbral event surfaces (either first-order or exact) without the need for a containment function test. In some embodiments, these umbral event surfaces are a small subset of the complete set of visibility event surfaces defining a discontinuity mesh. Consequently, the present methods are a more efficient method of computing from-region visibility than post-processing the complete discontinuity mesh to identify umbral boundaries.

Figure 13:
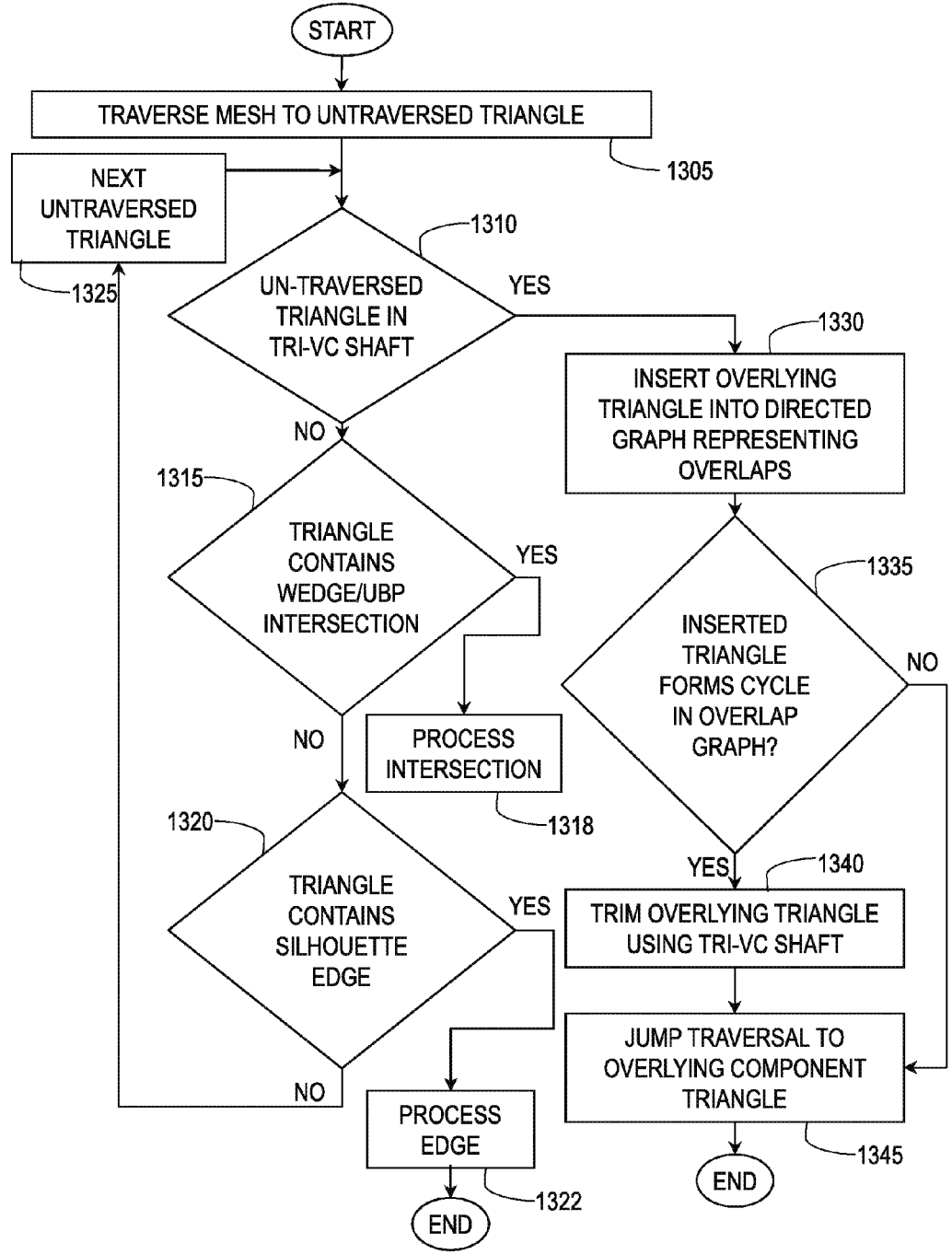
FIG. 13 is an exemplary flowchart showing the process of identifying and resolving overlap cycles during 3D mesh traversal.

FIG. 13 is a flowchart showing the process of identifying and resolving overlap cycles during 3D mesh traversal.

Figure 19:
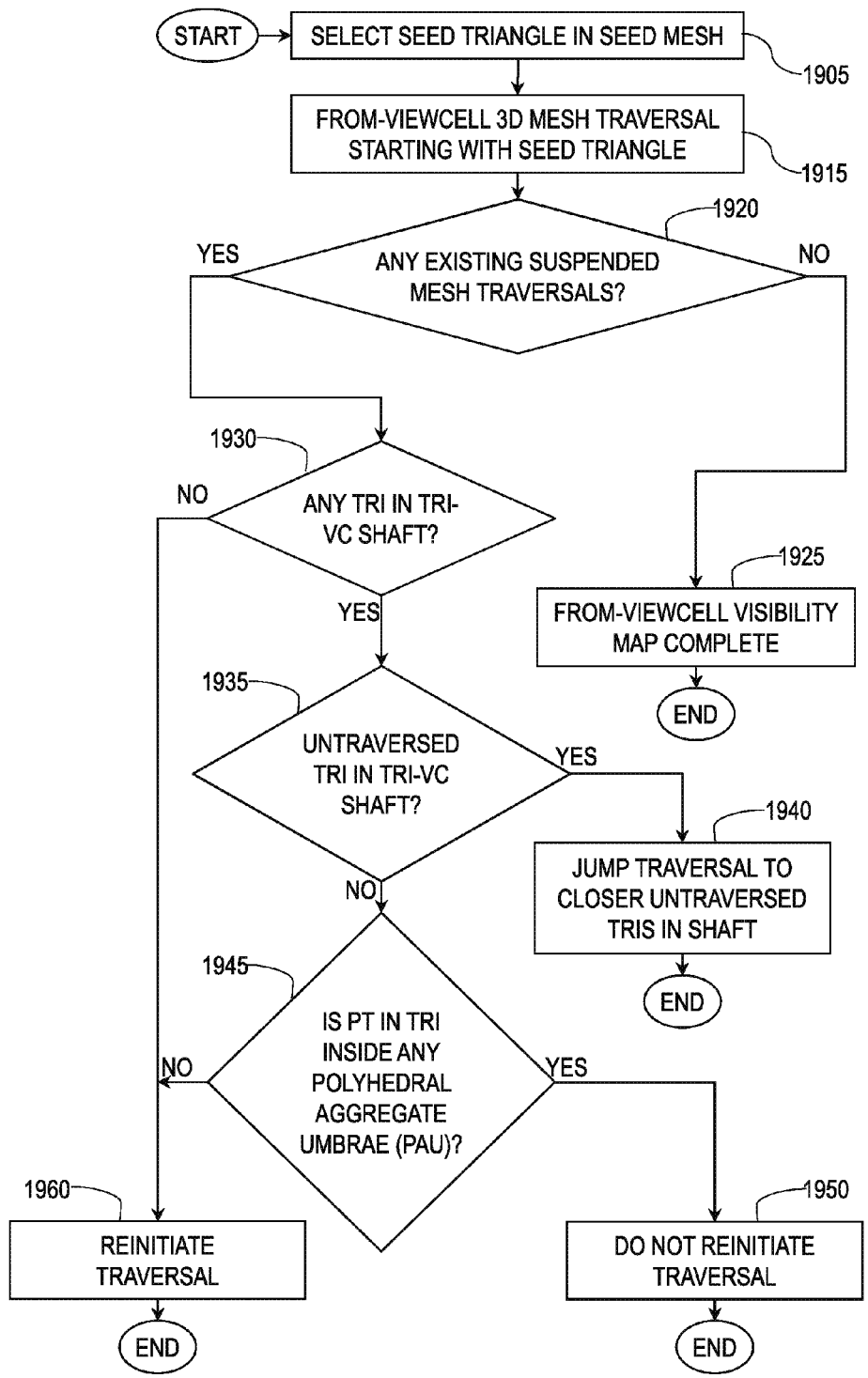
FIG. 19 is an exemplary flowchart showing a controlling process for an output-sensitive method of constructing a from-region visibility map using 3D polygon mesh traversal.
Figure 20A:
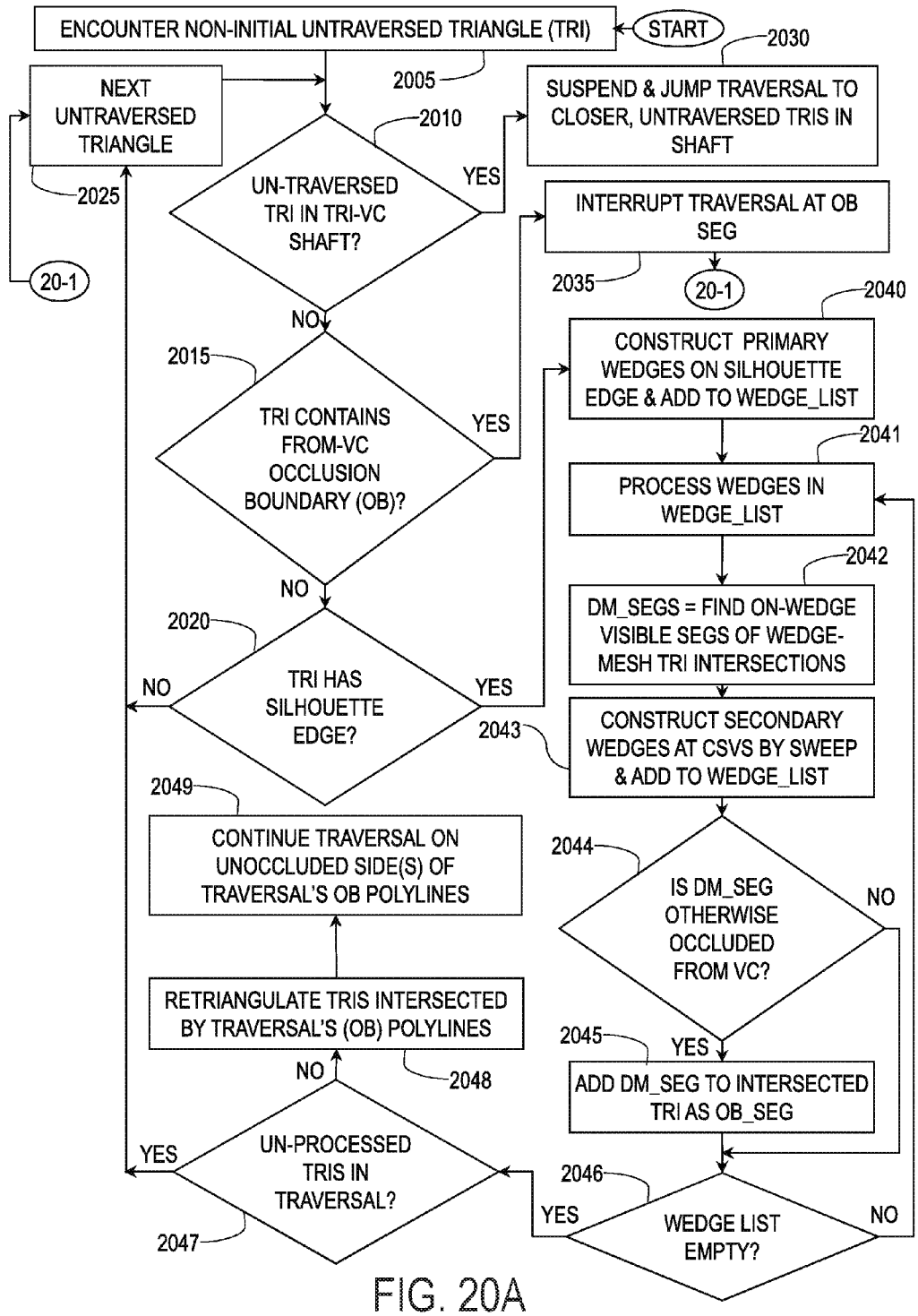
FIG. 20 is an exemplary flowchart showing the main process for output-sensitive method of constructing a conservative, linearized, from-region visibility map using 3D mesh traversal.
FIG. 20B is an exemplary flowchart showing a method of using an estimate of difference in umbral volumes produced by the pivot-and-sweep method and the intersecting planes method, estimated at an inside-corner vertex; and the difference used to determine the method of constructing the continuous umbral event surface at the inside-corner vertex.
FIGS. 20C-20J illustrate steps of a 3D mesh traversal of polygon meshes.
FIG. 20K is a diagram showing a surrounding polygon mesh which contains other polygon meshes.

The output-sensitive method of from-viewcell visibility map construction employing 3D mesh traversal (shown in FIGS. 19-21) may encounter polygon overlap cycles (for example in step 1935 of FIG. 19, and step 2015 of FIG. 20A). Such polygon overlap cycles may also be encountered in the Weiler-Atherton algorithm which is a prior-art method of from-point visibility determination.

Because the mesh traversal method shown in FIGS. 19-21 is biased toward jumping to closer, potentially occluding elements, it is susceptible to an infinite loop that can be caused by the cyclic partial occlusion of mesh elements. For example, consider the case where both potential occludee and potential occluder mesh elements are defined as polygon clusters contained in bounding boxes. It is clear that three (3D) bounding boxes may be arranged in 3-space such that the boxes partially occlude each other in a cyclic fashion. For example consider three boxes, a box A is partially occluded by a box B. Box B is partially occluded by a third box C. If box C is partially occluded by box A, then the three boxes form a cycle of occlusion. If the mesh traversal process employed these bounding box elements in the shaft tests, then an infinite cycle would result between steps 2005, 2010, and 2030 in FIG. 20A.

Two techniques can be employed, in embodiments, to eliminate infinite cycles caused by cyclic occlusion of mesh elements. In one method, the size of the element being used for the shaft tests is decreased. This can be accomplished naturally using hierarchical bounding boxes by using child boxes lower in the hierarchy. Smaller mesh elements are less likely to result in cyclic occlusion. To manage cycles, elements are dynamically redefined from larger to smaller clusters and even to individual triangles. In some embodiments, this technique does not eliminate cyclic occlusion in all cases, since even three individual triangles can cause an occlusion cycle.

In such cases, a second technique effectively eliminates an occlusion cycle. In this technique, the mesh elements are defined as triangles and the overlap relationships between triangles is maintained as a directed graph. Before any jump to a closer triangle, the related part of this directed graph is checked for cycles. This check can employ Tarjan's algorithm or other O(n) time algorithms for identifying cycles (strongly connected components) in a directed graph. Once a triangle overlap cycle is identified, the cycle can be broken by identifying all triangles in the triangle-viewcell shaft of the offending triangle causing the cycle (the root triangle of the cycle). All other triangles in this shaft are intersected with the shaft. This intersection subdivides the triangles into components that are completely inside the shaft and components that are completely outside the shaft. The traversal is then reinitiated using these subdivided triangles, which cannot form a cycle with the offending triangle. This is because any triangle forming a cycle with the offending triangle must be both inside and outside the shaft. This technique can also be employed to resolve occlusion cycles on mesh elements other than individual triangles.

In another technique, to eliminate cycles, the latter approach of trimming triangles in the shaft of other triangles is always employed immediately. This eliminates the need to construct and maintain a directed graph storing overlap relationships. However, it can result in unnecessary intersection/trimming calculations, e.g. where no cycles exist.

Turning now to FIG. 13, FIG. 13 is similar to FIG. 20A, the main part of the 3D mesh traversal algorithm for output-sensitive construction of from-region visibility map. FIG. 13 supplements FIG. 20 by showing the steps of the 3D mesh traversal process in which polygon overlap cycles may be encountered, and adding steps to detect and resolve such overlaps.

In some embodiments, the process illustrated in FIG. 13 starts at step 1305, where a mesh triangle is encountered in the main process of the 3D mesh traversal (step is same as 2005 of FIG. 20A).

Process flow proceeds to decision step 1310 to determine if there are any untraversed triangles in a shaft formed by the current triangle and the viewcell. This is the same as step 2010 in FIG. 20A.

If, in decision step 1310, it is determined that an un-traversed triangle exists within the shaft formed by the viewcell and the current triangle, then process flow proceeds to step 1330 to insert the overlying triangle into a directed graph which represents the overlap relationships among the triangles. Step 1330 and subsequent steps are performed in addition to the corresponding step 2030 in FIG. 20. In step 1330, the.

Process flow proceeds to step 1335 to determine if the triangles form a cycle in the directed graph representing the overlap relationships, then process flow proceeds to step 1340. In some embodiments, the check for cyclicity in a directed graph can be performed in linear time using prior-art algorithms. The presence of a cycle in the graph indicates cyclic overlap involving the current triangle and the overlying triangle in the shaft.

In step 1340, the overlying triangle is trimmed into two components: one component completely inside the shaft and another component completely outside the shaft. This effectively eliminates any potential overlap cycle involving the original overlying triangle.

Following step 1340, process flow proceeds to step 1345, where the 3D mesh traversal is jumped to the overlying component triangle. This is identical to the step 2030 in FIG. 20A.

If, in decision step 1335, it is determined that the overlying triangle does not form a cycle with the current triangle, then process flow proceeds directly to step 1345.

If, in decision step 1310, it is determined that there are no un-traversed triangles in the triangle-viewcell shaft, then process flow proceeds to step 1315. Step 1315 and subsequent steps are identical to the corresponding steps of FIG. 20A.

As previously described, cycles are identified using polygon-viewcell shafts. Care must be taken to construct shafts between the polygon and the portion of the viewcell on the frontfacing side of the plane containing the polygon. In some embodiments, for polygons lying in a plane that bisects the viewcell, only the portion of the viewcell on the frontfacing side of the plane is used. Polygon-viewcell shafts in the present method are defined in this way.

If, in decision step 1310, it is determined that no untraversed triangles exist within the shaft formed by the current triangle and the viewcell, then it is not necessary to check for cyclic overlap and process flow proceeds to step 1315. Decision step 1315 is identical to decision step 2015 of FIG. 20A when the traversal is applied to construct a from-region visibility map as shown in FIG. 20A. In this case Step 1318 labeled PROCESS INTERSECTION corresponds to step 2035 of FIG. 20A, where the traversal is interrupted at an occlusion boundary. Step 1320 in FIG. 13 is identical to step 2020 of FIG. 20A. Step 1322 labeled PROCESS EDGE, corresponds to steps 2045 through 2070 in FIG. 20A.

Both the Weiler-Atherton algorithm and present method of 3D mesh traversal (used to construct either a visibility map, a discontinuity mesh, or PAU) employ a check for cyclic overlap in some embodiments.

The Weiler-Atherton algorithm is an image-space, object precision method of from-point visibility determination that versal method achieves a more output-sensitive performance profile than is possible with Weiler-Atherton.

The cost of enforcing the strict front-to-back traversal for the 3D/2D mesh traversal algorithm is the cost of testing for polygons which potentially occlude the current polygon. This is essentially a type of shaft test, with the shaft formed between the current polygon and the viewcell. Such shaft tests can be accelerated using hierarchical spatial subdivision or bounding volumes in a manner similar to the techniques used to accelerate view frustum culling. Using this approach, the cost of shaft testing tends to O(log N) in the number of potentially occluding elements, N. For N current polygons to be tested the overall cost is N log N. The strict front-to-back order insures that the number of current polygons to be tested, N, is close to the number of visible polygons, thus producing output sensitivity.

TABLE VIb

|  | 3D/2DManifold Traversal (From-Region or From-Point) | Weiler-Atherton Algorithm (From-Point) |
|---|---|---|
| Organization | Wedge/UBP generated only at (first-order) silhouette edges of manifold silhouette contour. | Polygon × Polygon Clip test at each polygon edge (except polygons of convex polyhedron may be clustered) |
| Lateral Order Of Polygon Processing | Breadth-First Manifold Traversal | None |
| Depth Order of Polygon Processing | Enforced dept-first processing. Process overlying first. | Process underlying first. |
| Process Overlying Polygons | 1. Process all, overlying have priority 2. Generate event boundary (Wedge or UBP) only at silhouette edge | 1. Process all, no priority 2. Generate Event boundary for each overlying polygon unless it member of convex group with current polygon |
| Process Underlying Polygons | Only if current polygon contains silhouette edge | Process all (unless underlying polygon is member of convex group with current polygon) |
| Superfluous Event Surface × Mesh Polygon Intersection Tests | None, all Wedges/UBPs are generated only at silhouette edges | Yes, many "event surfaces" (clip edges) generated at non-silhouette edges |
| Mesh Self-Occlusion Tests | Performed only at silhouette edges/ visibility events where self occlusion is possible | Performed at many non-silhouette edges where self occlusion is not possible. |
| Precision/Solution Space | Object/Object (Not projective) | Object/Image (Projective) | has a computational cost which is (except for regions of a mesh that are convex) generally not output-sensitive with respect to the depth complexity of the scene.

The present method of 3D mesh traversal (FIG. 20 and related figures) when used in combination with 2D mesh traversal (FIG. 15 and related figures) is a method of from-region visibility computation that is generally output-sensitive with respect to the depth complexity of the visibility map. (The 3D/2D mesh traversal method can also be applied to the from-point visibility problem by simply using a viewpoint as a degenerate viewcell).

Table VIb illustrates some of the differences between the Weiler-Atherton algorithm and the present method using 3D/2D manifold mesh traversal. The first row of the table emphasizes that the Weiler-Atherton algorithm effectively generates visibility event surfaces (clipping edges) at every edge of every polygon, except for convex occluders where non-silhouette edges can be ignored. In contrast, the 3D/2D manifold mesh traversal method exploits the intrinsic occlusion coherence of the manifold by generating visibility event surfaces only at silhouette edges.

Figure 14:
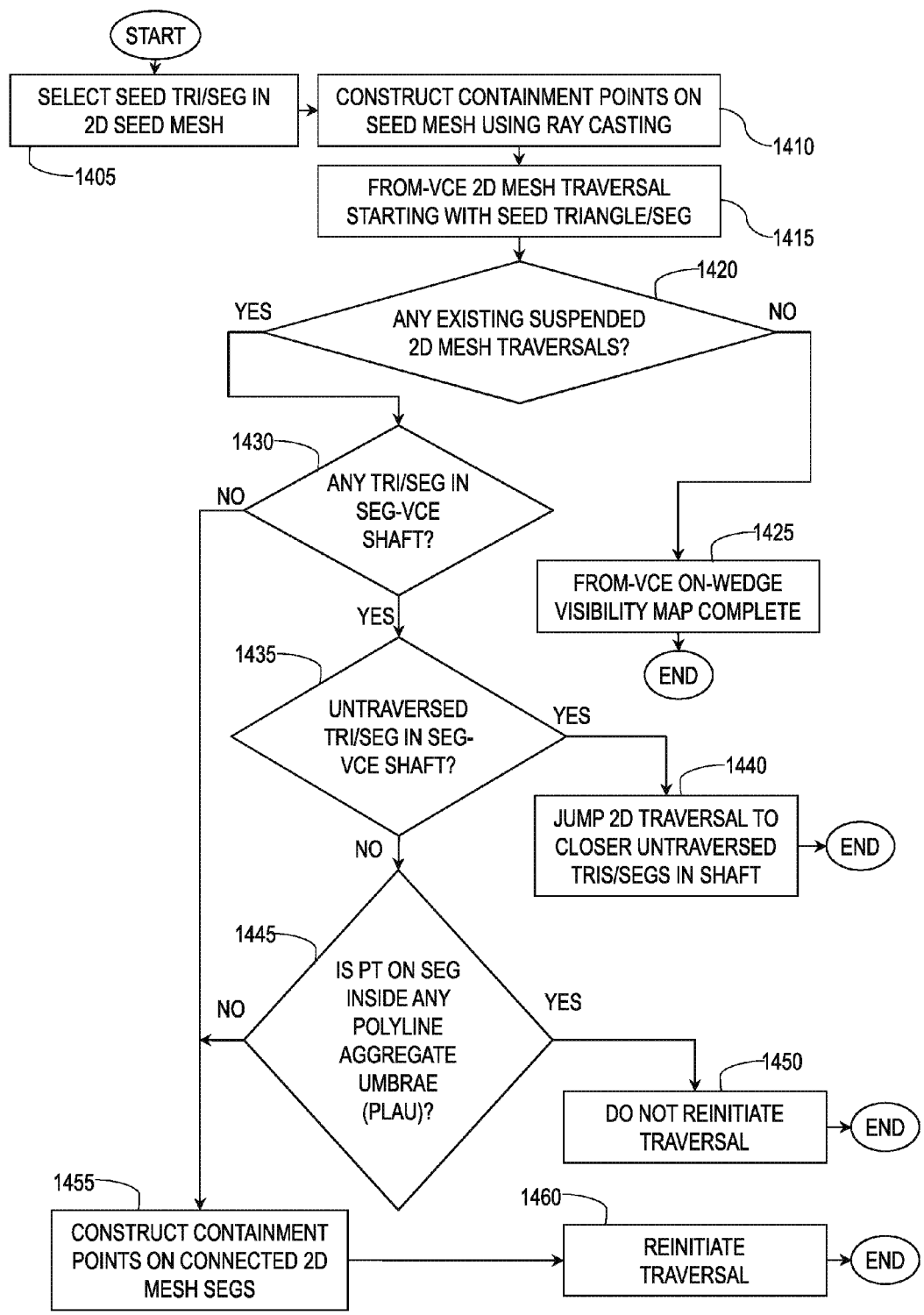
FIG. 14 is an exemplary flowchart showing the control process for a method of constructing on-wedge, from-viewcell element 2D visibility map using 2D mesh traversal.
Figure 16:
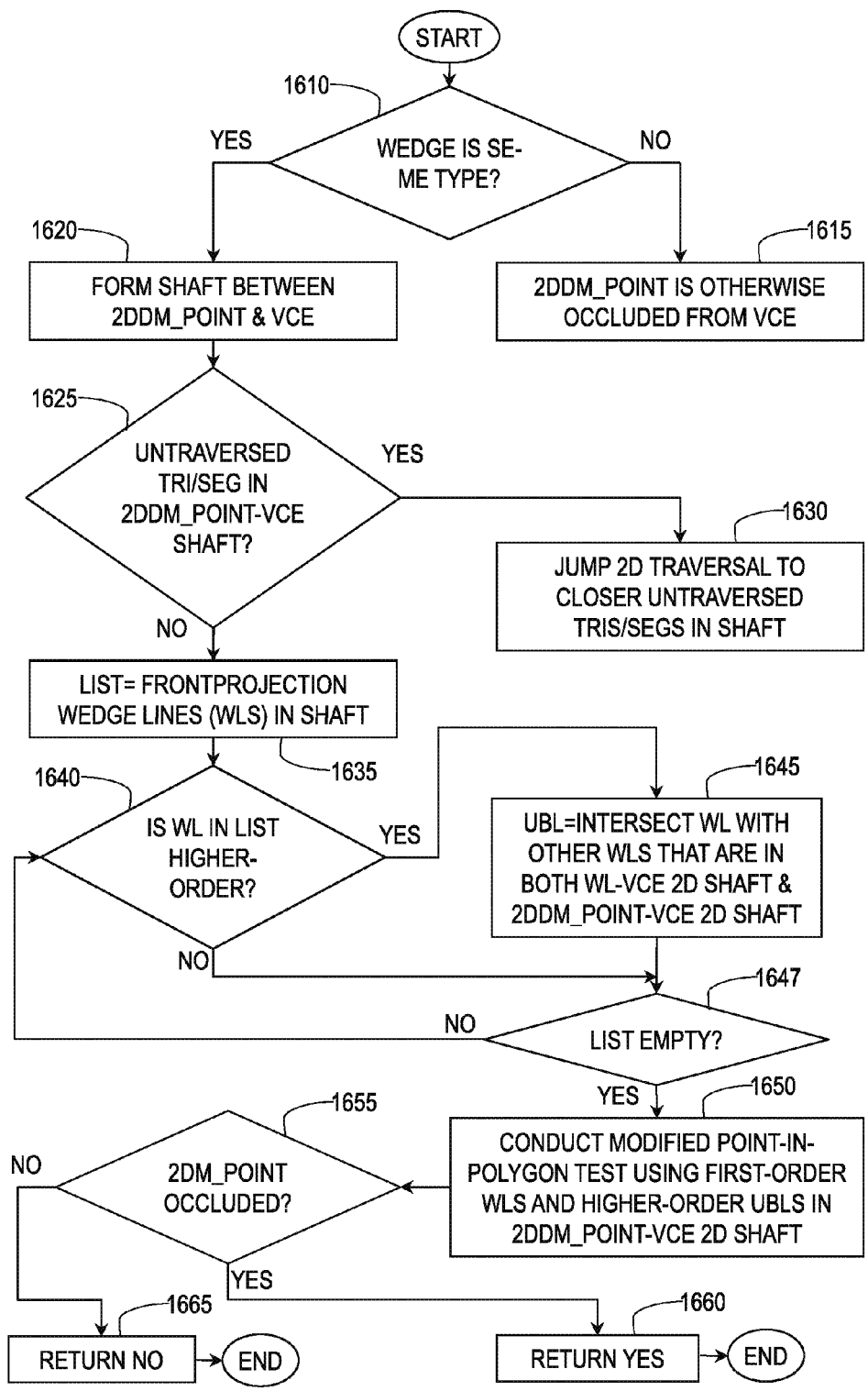
FIG. 16 is an exemplary flowchart showing a process for determining if 2D discontinuity mesh point is otherwise conservatively occluded from the wedge's corresponding viewcell element (VCE).

Moreover, by enforcing a front-to-back depth order and by interleaving the traversal of visible polygons with the construction of occlusion boundaries, the 3D/2D mesh tra- Mesh Traversal Implementation: 2D Mesh Traversal (FIG. 14, FIG. 15, FIG. 16)

Referring now to FIG. 14 and the related FIG. 15 and FIG. 16, the 2D mesh traversal process (traversal of 1-manifolds) for constructing the on wedge-visible 2D visibility maps is described The 3D mesh traversal process (described elsewhere in this specification in conjunction with FIG. 19, FIG. 20, and related FIGS.) solves the 3D, from-viewcell visibility problem. In some embodiments, the output of the 3D mesh traversal process is a conservative linearized umbral visibility map comprised of from-viewcell unoccluded polygon fragments identifying by intersecting conservative linearized umbral event surfaces (CLUES) or wedges, with mesh polygons and determining if a wedge intersection is actually a from-viewcell occlusion boundary.

As described in some embodiments, the CLUES can also be intersected with mesh polygons without determining if the intersection is a from-viewcell occlusion boundary. The resulting partitioning of the mesh polygons in these embodiments is a type of discontinuity mesh that must later be post-processed to determine if the mesh elements are visible from the viewcell. By comparison, the 2D mesh traversal process solves a 2D visibility problem: on-wedge visibility, which is similar to the on-wedge visibility problem found in prior-art discontinuity meshing methods. In prior-art methods, the on-wedge visibility problem is solved in a simple but inefficient way: intersect triangles with the wedge and then determine the visible segments using 2D Weiler-Atherton algorithm (which is not output-sensitive). By exploiting the intrinsic visibility coherence of 1-manifolds, the present method of 2D mesh traversal solves the same problem in a more efficient, output sensitive way.

On-wedge visibility amounts to finding visible segments on a wedge, from an element (viewcell vertex or edge, or inside corner mesh silhouette vertex) and through a polygon mesh element (edge or vertex). In some embodiments, the wedges are conservative linearized umbral event surface (CLUES).

If the wedge is formed by a viewcell vertex and a mesh silhouette edge, the wedge is called a SV-ME wedge. The SV-ME wedge presents a from-point on-wedge visibility problem. If the wedge is formed by a viewcell edge and a mesh vertex it is called a SE-MV wedge. In some embodiments, this type of wedge also presents a from-point, on-wedge visibility problem, since the visibility is solved from the point of view of the mesh silhouette vertex in the direction away from the viewcell.

A third type of wedge (SE-ME) is formed by a viewcell edge and a mesh silhouette edge in the special case in which the two edges are parallel. In this case, the pivoting process to construct the umbral wedge does not encounter a unique supporting viewcell vertex but instead a viewcell edge. Such wedges are not identified in many prior-art discontinuity meshing methods, but certainly can exist especially in architectural environments (in which many edges tend to be parallel or perpendicular to a ground plane) if the viewcell(s) happen to be aligned to the world axes.

Unlike the other two types of wedges, the SE-ME wedge presents a from-region, on-wedge visibility problem: on-wedge visibility from the supporting viewcell edge. In some embodiments, SE-ME wedges are eliminated by a repositioning of the viewcells in the general position or by treating them as pairs of SV-ME wedges specially connected and with a lexicographical ordering.

In the present method, SE-ME wedges and the problem of on-wedge, from line-segment visibility is addressed directly by the 2D manifold traversal method, which solves both from-point visibility (for SV-ME, and SE-MV wedges) and from line-segment visibility (SE-ME wedges).

The from-line segment case is intrinsically more complex than the from-point case, since from-region visibility problems, even in 2D (on-wedge visibility) can involve higher-order visibility event surfaces as suggested by Koltun et al.

The present method of 2D manifold traversal solves the on-wedge visibility problem for both the from-point and from-edge case. For the from-edge case (SE-ME wedges), the method employs, in some embodiments, only first-order umbral event surfaces, called wedge lines (WLs), or higher-order event surfaces called umbral boundary lines (UBLs). FIG. 14, FIG. 15, and FIG. 16 show related flowcharts comprising the method of 2D manifold traversal for solving the problem of on-wedge visibility for both from-point wedges (SV-ME wedge in which the supporting viewcell element is a vertex) and from-edge wedges (SE-ME in which the supporting viewcell element is an edge) cases. The SE-MV case is identical to the from-point, SV-ME case except that the "element" from which visibility is solved is not actually a viewcell vertex but an inside corner mesh silhouette vertex.

Figure 17:
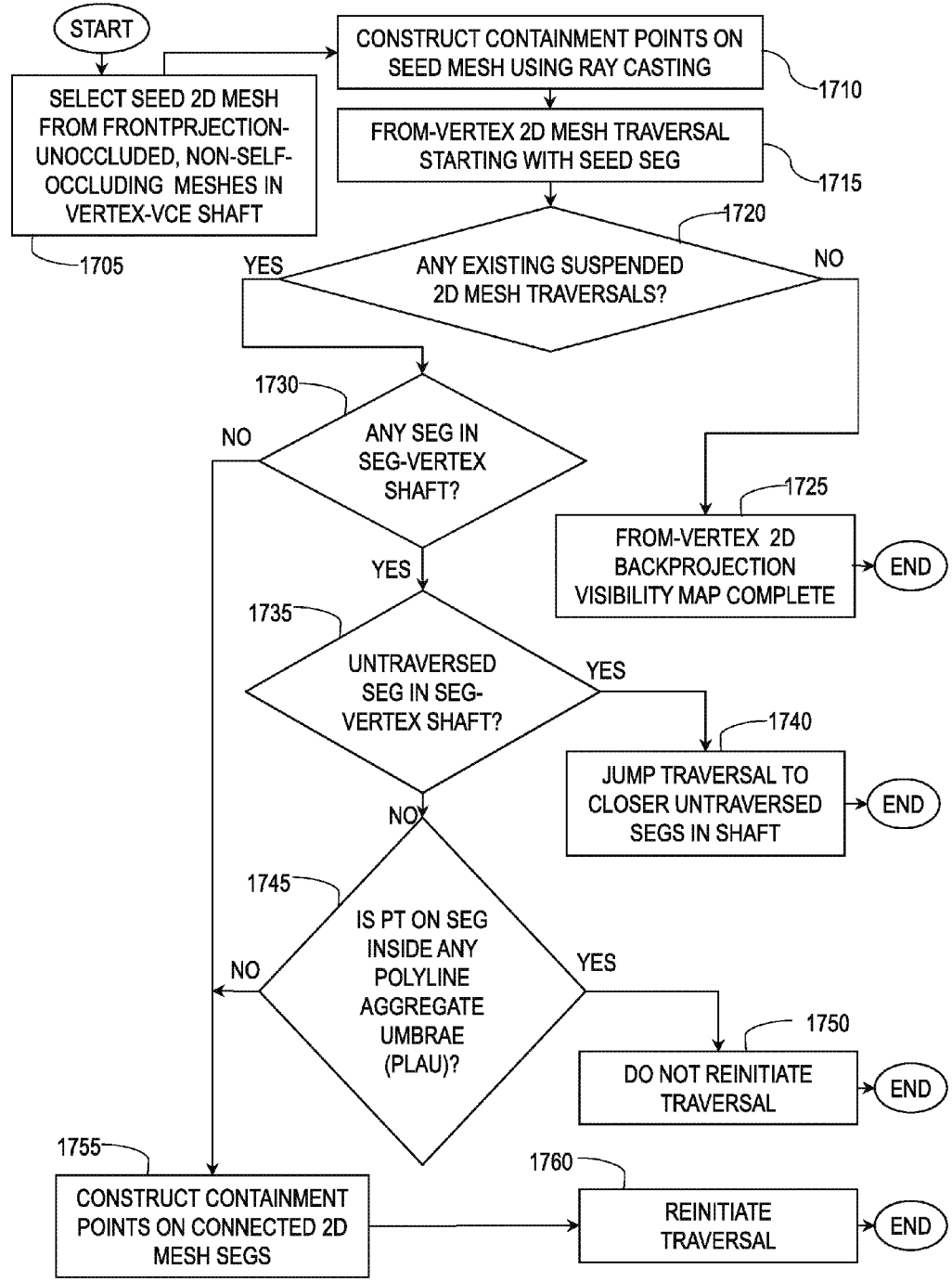
FIG. 17 is an exemplary flowchart showing the control process for a method of constructing higher-order wedge lines for determining an on-viewcell edge visibility map by backprojection.
Figure 18:
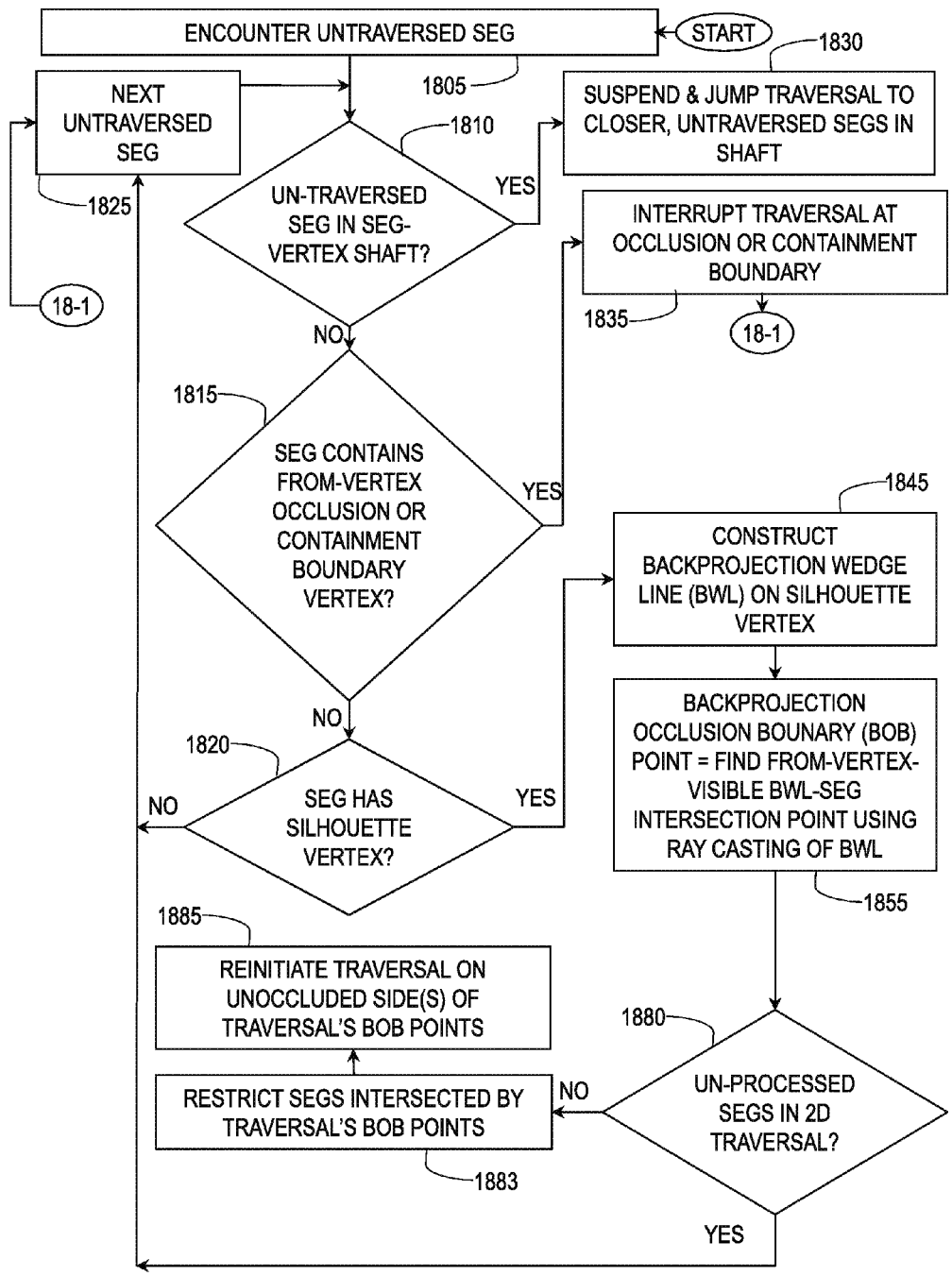
FIG. 18 is an exemplary flowchart showing the main process for backprojection, from-vertex, 2D mesh traversal main process for constructing higher-order wedge lines.

FIG. 17 and FIG. 18 are flowcharts showing the method of "adjusting" the first-order WLS to conservatively approximate higher-order UBLs using backprojection to increase the precision of the on-wedge visibility solution. The details of FIG. 17 and FIG. 18 are presented in a subsequent section of this specification.

The output of the 2D traversal process, as applied to the problem of determining on-wedge-visible mesh triangle intersection, is a conservative 2D visibility map comprised of on-wedge visible mesh polyline segments and conservative one degree of freedom visibility event structures called wedge lines. The polylines are the 1-manifolds being traversed. Segments of the polylines correspond to the on-wedge visible intersection of a mesh triangle with the wedge. In the 2D manifold traversal method, individual 1-manifolds may be "fused" to other 1-manifolds by the WLs, creating polyline aggregate umbrae (PLAU) and thus realizing occluder fusion on the plane.

The flowchart shown in FIG. 14 shows the process of initiating, reinitiating, and halting the main 2D traversal process which is shown in FIG. 15, and which is described in detail in a subsequent part of this specification.

According to some embodiments, the process illustrated in FIG. 14 starts at step 1405, where the selection of a "seed" segment to initiate the 2D mesh traversal process for a single wedge is shown.

In one embodiment of the 2D traversal method, traversal begins with a visible segment formed by a mesh triangle that also intersects a wedge that is connected (adjacent) to the current wedge being processed. In this approach, a mesh triangle that is part of the polyline aggregate umbra (PLAU) of an adjacent wedge is used to initiate the 2D traversal on the current wedge. Since this mesh polygon corresponds to an intersecting visible segment that was closest to the viewcell for the adjacent wedge, it is likely to be a closest segment for the current wedge. Initiating the traversal using a known adjacent, closest intersecting element improves the performance of the process. Segments connected to this initial segment form the 2D seed mesh and are readily identified by determining the intersection of triangles adjacent to the seed triangle which also intersect the wedge.

Process flow proceeds to step 1410, to identify the containment points of the 2D seed mesh by the intersection of the wedge lateral boundaries with the 2D seed mesh.

Once a seed 2D mesh and containment points on the seed mesh are identified, then process flow proceeds to step 1415 to call the main process of the 2D mesh traversal. The main 2D mesh traversal process is shown in FIG. 15. In some embodiments, the main 2D manifold traversal process shown in FIG. 15 is initiated using the seed 2D mesh triangle/segment selected in step 1405 of FIG. 14. Moreover, the main process of 2D mesh traversal shown in FIG. 15 can be suspended at specific segments of the 2D mesh (at step 1530). The process shown in FIG. 14 determines whether any suspended traversals remain in the main 2D manifold traversal process (step 1420), and whether the main process of the 2D mesh traversal should be reinitiated on these suspended segments (steps 1430 and later).

If, in decision step 1420, it is determined that there are no existing segments on which the main part of the 2D mesh traversal has been suspended, then process flow proceeds to step 1425 in which the 2D mesh traversal for the wedge is terminated, thereby completing the construction of the 2D on-wedge visibility map.

If, in decision step 1420, it is determined that there exist segments of the 2D mesh for which the main 2D mesh traversal has been suspended (in step 1530 of FIG. 15), then process flow proceeds to decision step 1430 to determine if any triangles exist in the shaft formed by the suspended segment (SEG) and the viewcell element (VCE), which is either a viewcell vertex (SV-ME wedge) or a viewcell edge (SE-ME wedge). Alternatively, if the wedge is a SE-MV type then the on-wedge visibility is actually solved from the inside corner mesh silhouette vertex which is treated as "VCE" [point] for the purposes of this algorithm.

If, in decision step 1430, it is determined that there are no triangles in the shaft between the seg and the VCE, then processing proceeds to step 1455 to construct containment points on the 2D mesh (polyline) formed by the segments connected to the current suspended segment.

Process flow proceeds to step 1460, where the 2D mesh traversal is reinitiated on the previously suspended segment.

If, in decision step 1430, it is determined that there are triangles in the shaft between the seg and the VCE, then process flow proceeds to step 1435 to determine if any triangles/segments in the SEG-VCE shaft are untraversed.

If, in decision step 1435, it is determined that untraversed triangles/segments exist in the SEG-VCE shaft, then process flow proceeds to step 1440, where the 2D mesh traversal is "jumped" or restarted on the closer untraversed triangles/segments in the SEG-VCE shaft. This step (which also occurs in step 1530 of the main 2D traversal process shown in FIG. 15) insures that all potentially occluding triangles/segments have been processed before the traversal is continued and before a decision to stop the traversal (because the suspended segment is completely occluded from the VCE) is made.

If, in decision step 1435, it is determined that no untraversed triangles exist in the SEG-VCE shaft then process flow proceeds to step 1445 to determine if a point on the current (suspended) segment is inside any polyline aggregate umbrae (PLAU), which represents one or more polygonal subregions of the wedge that are occluded from the wedge's VCE (or inside corner silhouette vertex in the case of a SE-MV wedge). In some embodiments, this test employs a 2D version of the modified point-in-polyhedron test shown in FIG. 25. This modified point in polyhedron test uses first-order event surfaces (first-order wedges), or the corresponding wedge lines (WLS) in the 2D case; and, optionally, higher-order umbral boundary polygons (UBPs), or the corresponding umbral boundary lines (UBLS) in the 2D case. This test allows an implicit solution to the point-in-polyhedron or point-in-polygon problem without necessarily constructing the entire polyhedron/polygon.

If, in decision step 1445, it is determined that a point on the suspended segment is inside a PLAU then the process flow proceeds to step 1450, where the traversal is not reinitiated on the suspended segment and the suspended segment is no longer labeled as suspended.

If, in decision step 1445, it is determined that the suspended segment is not inside any PLAU, then processing proceeds to step 1455, where the containment points of the associated 2D mesh are constructed and the traversal reinitiated as previously described.

2D Mesh Traversal Implementation: Main Process of 2D Traversal (FIG. 15)

As previously described, the process shown in FIG. 14 works to control the initiation, re-initiation, and termination of the main process of the 2D mesh traversal called in step 1415 and shown in detail in FIG. 15.

In some embodiments, the process illustrated in FIG. 15 starts at step 1505, where traversal of the 2D mesh (a polyline) of on-wedge mesh triangle segments begins with traversal of an untraversed segment. The traversal of a polyline from segment to segment is straightforward, proceeding in one of two directions from a segment to neighboring segments. The corresponding 3D traversal of a triangle mesh (detailed in the discussion of FIG. 20) can occur across one of three neighboring boundaries, and proceeds for example in a flood-fill or breadth-first traversal.

Process flow proceeds to decision step 1510 to determine if any untraversed (by the current 2D mesh traversal process) triangles/segments exist in the 2D shaft between the current segment and the supporting viewcell element (segment-viewcell element shaft, or SEG-VCE shaft). The intersection of a single initial wedge with multiple visible mesh triangles can produce multiple polyline segments and potentially multiple corresponding 2D shafts. In one implementation, a 2D shaft (SEG-VCE shaft) is constructed for each of these segments. Alternate embodiments are possible in which a single conservative shaft bounding multiple connected segments is used to accelerate the shaft-containment test of step 1510. If any untraversed triangles/segments exist in the larger containing shaft, then the process can revert to the individual shafts for each segment.

In some embodiments, the shaft inclusion test of step 1510 is further accelerated by employing a hierarchical spatial subdivision (and/or hierarchical bounding box structures) to organize the 3D polygon mesh geometry. Using any hierarchical organization of the database tends to reduce the cost of the shaft inclusion test from approximately N*M to approximately N Log(M), where M is the number of polygons in the model and N is the number of shafts tested.

According to some embodiments, if the initial wedge is a SV-ME wedge, then the corresponding SEG-VCE shafts are formed from the supporting lines between the segment and the supporting viewcell vertex. In further embodiments, if the initial wedge is a SE-MV wedge, then the corresponding SEG-VCE shafts are formed from the supporting lines between the segment and the supported mesh silhouette vertex, since in this case, visibility is from a viewcell edge but through a mesh silhouette vertex. If the original wedge is a SE-ME type, generated in the special case where the supported silhouette edge and the supporting viewcell edge are parallel, then the SEG-VCE shaft is formed by from the supporting lines between the segment and the supporting viewcell edge.

If untraversed segments exist in the SEG-VCE shaft, then process flow continues to step 1530, where the 2D traversal jumps to closer segments in the SEG-SILE shaft. These two steps enforce a front-to-back processing order. As will be described, this is analogous to the steps 2010 and 2030 for the 3D mesh traversal process. Note the similarity between FIG. 15 and FIG. 20. Whereas the 3D traversal uses a 3D mesh triangle-viewcell (TRI-VC) shaft to test for closer untraversed elements, the present 2D traversal employs the 2D SEG-VCE shaft to test for closer untraversed elements.

If, in decision step 1510, it is determined that no untraversed segments exist in the SEG-VCE shaft, then process flow continues to step 1515 to determine if the currently traversed segment contains an occlusion boundary (OB) point or a containment boundary point.

A containment boundary point occurs at the intersection of a polyline segment and the boundary of the wedge.

An OB point represents the boundary between from-VCE visible and from-VCE occluded on the 2D polyline manifold. An OB point may occur at the intersection of a WL with a polygon mesh segment on the wedge. Each intersection of a WL and a polygon mesh segment is 1D element (point) of the corresponding 2D (on-wedge) discontinuity mesh. As with any visibility event surface, a WL represents visibility from a specific source (VCE) feature (vertex in the 2D case). According to some embodiments, if the VCE is a viewcell edge, in the case of SE-ME wedge, then the WL does not necessarily represent a boundary between from-viewcell-edge visible and from viewcell-edge-occluded regions on the wedge, except in the limit at the origin of the WL on the corresponding silhouette vertex.

This is because for any from-region visibility problem the actual portion of space occluded from the region (region being the viewcell edge in the 2D case of a SE-ME wedge) is determined not only by the intersection of the event surfaces (WLS) with the mesh polygons but also by the intersection of the WLS with other WLS. These intersections together form 1-manifold surfaces which bound the from-viewcell-edge umbral regions. These 1-manifold surfaces are called the polyline aggregate umbrae (PLAU). The PLAU are formed from segments called umbra boundary lines (UBLS) which can be constructed from the corresponding WLS.

Consequently, not all 2D discontinuity mesh points (2DDM) points (at the intersection of a WL and an on-wedge triangle segment) are occlusion boundary (OB) points. The identification of actual OB points is made in steps 1563 which is discussed in detail later.

If, in decision step 1515, it is determined that the current segment contains an OB point then process flow proceeds to step 1535 to interrupt the traversal of the current 2D mesh at the OB point. In further embodiments, process flow proceeds from step 1535 to process 15-1, which returns the process flow to step 1525. Similarly, in decision step 1515, it is determined if the current segment of the 2D mesh contains a containment boundary. This boundary point is an intersection of the 2D mesh with a boundary line of the wedge, as determined in steps 1410 or 1455 in FIG. 14 (the process controlling the main 2D traversal process of FIG. 15). If, in decision step 1515, it is determined that the current 2d mesh segment contains a containment point, then process flow proceeds to step 1535, where the traversal of the 2D mesh is interrupted at the containment boundary point. Following step 1535, the traversal of the 2D mesh (polyline) may continue across other non-containment or non-occlusion vertices.

If, in decision step 1515, it is determined that the current segment does not contain an OB point or a containment point, then process flow proceeds to step 1520 to determine if the SEG has a first-order, from-viewcell silhouette vertex. In some embodiments, a vertex is determined to be a silhouette vertex if the vertex corresponds to the intersection of the current wedge with a first-order, from-viewcell silhouette edge. This point is a compound silhouette vertex (CSV) which is a point of intersection of the current wedge with the wedge incident on the from-viewcell silhouette edge.

If, in decision step 1520, it is determined that no silhouette vertex exists on the current segment, then process flow proceeds to step 1525, where the traversal of the 2D mesh proceeds to the next untraversed segment sharing a non-silhouette vertex with the current segment, using a breadth-first or flood-fill traversal of the 2D mesh.

If the current segment has a silhouette vertex, then the normal breadth-first or flood fill traversal of the 2D mesh is not continued at a silhouette vertex. Instead, if in decision step 1520, it is determined that the current segment contains a first-order-silhouette vertex, then process flow proceeds to step 1545 to construct a wedge line (WL) on the silhouette vertex (the CSV) by pivoting to the viewcell element (VCE) that supports the current wedge.

If the current wedge being processed is an SV-ME wedge, then the WL in step 1545 is constructed by pivoting from the CSV to the viewcell vertex on which the current wedge is constructed. The use of this process to identify CSVs and construct wedge lines for a SV-ME wedge is illustrated in FIG. 41A and FIG. 41B and discussed in detail in conjunction with those figures. In some embodiments, if the current wedge being processed is an SE-MV wedge, then the WL in step 1545 is constructed by pivoting from the CSV to the (inside-corner) mesh silhouette vertex (or other CSV) on which the current wedge is constructed.

In other embodiments, if the current wedge being processed is an SE-ME wedge, the special case of mesh silhouette edge parallel to supporting viewcell edge, then the WL is constructed by pivoting from the CSV to the supporting vertex belonging to the supporting viewcell edge on which the current wedge is constructed. The use of this process to identify CSVs and construct wedge lines for a SE-ME wedge is illustrated in FIG. 41C and discussed in detail in conjunction with that figure.

In a subsequent decision step, it is determined if the wedge currently being processed is a SE-MV type. In this case the corresponding WL was constructed, in step 1545, by pivoting to an inside-corner mesh silhouette vertex. If, in decision step 1550, it is determined that the current wedge being processed is a SE-MV wedge, then process flow proceeds to step 1553, otherwise process flow proceeds directly to step 1555.

In step 1553, the WL is extended to the (SE-MV) wedge's supporting viewcell edge. In some embodiments, the intersection of the WL and the wedge's supporting viewcell edge is stored as the SVV for the wedge. This point is used to initiate the sweep which will ultimately construct the SE-MV wedges that connect the current wedge and the wedge intersected by the current wedge at the CSV on which the WL is constructed. If the current wedge being processed is a SV-ME wedge, then the SVV is the wedge's SVV used to construct the wedge. If the current wedge being processed is a SE-ME wedge, then the SVV is one of the vertices of the viewcell edge used to construct the wedge. In both of these, cases the determination of an explicit SVV point supporting the WL is simplified.

This SVV is used as the "starting" SVV for a sweep process that ultimately generates SE-MV wedges, which connect the wedge currently being processed with the wedge incident on the CSV. These "secondary" connecting wedges are generated, for example in step 1240 of FIG. 12 (discontinuity mesh implementation) and in step 2060 of FIG. 20 (direct construction of visibility map by 3D mesh traversal).

In a subsequent step 1555, the WL generated in step 1545 is intersected with mesh triangle/segments (all of which intersect the current wedge) in order to find the closest from-point visible triangle that intersects the current wedge. In one embodiment, this intersection is determined using ray casting, with the WL as the ray. In some embodiments, techniques to accelerate this ray cast determination, including the hierarchical spatial subdivision of the triangle mesh database previously described, are employed.

The point of intersection between the WL and the closest mesh triangle identified in step 1555 is a vertex or point of the 2D conservative umbral discontinuity mesh (2DDM_POINT) corresponding to the visibility from the viewcell vertex (or mesh silhouette vertex in the SE-MV case), which supports the WL. Since the silhouette vertices are from-viewcell and not from-viewcell element, the resulting 2D discontinuity mesh is conservative.

Process flow proceeds from step 1555 to decision step 1563 to determine if the 2DDM_POINT is occluded from all other "parts" of the corresponding VCE except the vertex supporting the WL.

If the wedge on which this 2D discontinuity mesh is being constructed is a SV-ME type, then the 2DDM_POINT is "otherwise occluded" from the corresponding VCE since the VCE itself is a point. Once again, in this context, "otherwise occluded" means that the 2DDM-POINT is occluded from all other parts of the VCE, except the vertex that supports the corresponding WL. This is also true for 2DDM-POINTS corresponding to SE-MV wedges.

In both of these cases, the 2DDM-POINT corresponds to an occlusion boundary (OB) point of the on-wedge from "region" visibility map, since the source "region" is a point.

In the case of an SE-ME wedge, however, the VCE is a true region (a line segment). In this case, a 2DDM-POINT is not necessarily an occlusion boundary (OB) point since an OB point is a point on the corresponding 2D visibility map indicating the boundary between "occluded from the region (VCE)" and "not occluded from the region (VCE).

The details of the process shown in step 1563 are given in FIG. 16 and discussed in conjunction with that figure.

If in decision step 1563, it is determined that the 2DDM_POINT is otherwise occluded from the VCE, then the point is added to the (closest) intersected triangle/segment as an OB point, in step 1568. Otherwise the 2DDM_POINT is not added to the segment as an OB point and process proceeds from step 1563 to step 1580 to determine if any unprocessed/untraversed segments exist in the current "traversal". In this context, a (2D) "traversal" is defined as a set of segments connected to the current segment by non-silhouette vertices.

If, in decision step 1580, it is determined that there are untraversed segments in the traversal then, process flow proceeds to step 1525, where the next untraversed segment is processed.

If, on the other hand, it is determined in decision step 1580 that there are no unprocessed segments in the traversal, then process flow proceeds to step 1583, where the segments containing the OB points generated by the current traversal are restricted such that the portion of the segment on the "from-VCE" occluded side of the OB points are effectively removed and the segment is terminated by the corresponding OB point.

These OB points, added to a segment, are the same occlusion boundaries that are later identified during traversal of a 2D mesh containing the segment for example in step 1515, occlusion boundary.

Process flow proceeds from step 1583 to step 1585 to continue the traversal of the 2D mesh on the unoccluded side of the OB points. Since the WLS from one triangle/seg manifold may produce OB points on a different (disconnected) triangle/seg manifold, this represents a continuation of the traversal on a newly connected manifold (the polyline aggregate umbra, or PLAU) formed by "occluder fusion" of the two manifolds by the WL at the OB point.

In one implementation of the present method, the entire set of triangle mesh objects is contained by an enclosing mesh object. This enclosing mesh object is similar to a "skybox" commonly used to surround mesh objects for interactive visualization applications. The present method of mesh traversal in 2D (and the related 3D mesh traversal method) treat the enclosing skybox mesh as any other triangle mesh manifold. This approach insures that the traversal effects an omnidirectional traversal of the entire database even where other mesh objects are not present in the database. The use of this enclosing mesh makes the current method output-sensitive, since only the encountered unoccluded meshes need to be processed, there is no need to necessarily process each mesh in the database. Moreover, the present method naturally identifies the unoccluded regions of the skybox itself, which, because of its size and position, is typically otherwise a source of significant overdraw.

FIG. 15 and related figures show a method of constructing a from-region visibility map in which each generated segment of the corresponding umbral discontinuity mesh is tested to determine if it is actually a segment of the from-region visibility map (i.e., a from-viewcell occlusion boundary). An alternate embodiment uses the 3D and 2D mesh traversal process to construct the discontinuity mesh segments produced by wedges generated on the encountered silhouette edges. In this alternate embodiment, each of the resulting discontinuity mesh regions are subsequently tested to determine if it is an umbral region, for which traversal is restricted; or an antumbral region, for which traversal is not restricted. This determination can employ the modified point-in-polyhedron test using first-order wedges or higher-order UBPs.

FIG. 41A is a diagram showing the process of on-wedge visibility determination for a simple SV-ME wedge using the method of FIG. 15 and related figures.

FIG. 41B is also a diagram showing the process of on-wedge visibility determination for a SV-ME wedge. In this case, the wedge intersects a polygon mesh in such a way that the resulting compound silhouette vertex is a cusp of the first-order silhouette contour.

FIG. 41C is a diagram showing the process of on-wedge visibility determination for a SE-ME wedge using the method of FIG. 15 and related figures.

Details are presented with the discussion of the related figure.

FIG. 16 Process for Determining if 2D Discontinuity Mesh Point is Otherwise Conservatively Occluded From the Wedge's Corresponding Viewcell Element (VCE).

In the main 2D mesh traversal process shown in FIG. 15, step 1563 is a decision test to determine if a 2DDM_POINT is occluded from all other "parts" of the wedge's VCE. FIG. 16 illustrates one embodiment of implementing the details of this test.

The wedge's VCE is the point or line segment from which on-wedge visibility is determined. By convention, a 2DDM_POINT is occluded from the corresponding supporting point of the VCE. Actually the 2DDM_POINT is on the boundary between being occluded and unoccluded from the corresponding point of the VCE.

If the VCE itself is a single point (SV-ME, or SE-MV type wedge), then the corresponding 2DDM_POINT is occluded from "all parts" of the VCE since, being a point, the VCE has no other parts.

In some embodiments, the process illustrated in FIG. 16 starts at decision step 1610 determines if the wedge corresponding to the 2DDM_POINT to be tested is a SE-ME wedge.

If, in decision step 1610, it is determined that the corresponding wedge is not an SE-ME type, then process flow proceeds to step 1615 to set the 2DDM_POINT to be otherwise occluded from the VCE. As shown in FIG. 15, step 1563 and step 1568, this causes the tested 2DDM_POINT to become an OB point.

If, in decision step 1610, it is determined that the corresponding wedge is an SE-ME wedge, then process flow proceeds to step 1620 to form a 2D shaft (2DDM_VCE shaft) between the 2DDM_POINT being tested and the VCE, which in this case is actually an edge of the viewcell.

Process flow proceeds to decision step 1625 to determine if any untraversed (by the 2D traversal) triangle/segments exist in the 2DDM_VCE shaft constructed in step 1620.

If, in decision step 1625, it is determined that the unprocessed triangles/segments exist in the 2DDM_POINT-VCE shaft, then processing proceeds to step 1630, where the 2D traversal is jumped to the closer unprocessed triangle/segments in the 2DDM_POINT-VCE shaft, and the process illustrated in FIG. 16 terminates.

If, on the other hand it is determined, in decision step 1625, that no untraversed triangle segments are inside the 2DDM_POINT-VCE shaft, then process flow proceeds to step 1635 to identify all WLS in the 2DDM_POINT-VCE shaft and place each identified WLS in a list, which is referred to as LIST. In embodiments, these WLS would have already been constructed in the main 2D traversal step 1545 shown in FIG. 15.

Process flow proceeds from 1635 to decision step 1640, to process each of the wedge lines identified is step 1635, and placed in the LIST, to determine if the WL is a first-order wedge line or higher-order WL. The process of adjusting a first-order WL to form a higher order WL by backprojection is discussed in detail later in this specification in conjunction with FIG. 17 and FIG. 18.

For each of the WLS in the list processed in decision step 1640, if it is determined that the processed WL is a higher-order WL then, process flow proceeds to step 1645, where the higher-order WL identified in step 1640 is intersected with all other WLS that are in the 2DDM_POINT-SHAFT and a shaft formed between the WL and the VCE. In some embodiments, the intersection of this segment of the higher-order WL with other potentially intersecting WLS produces a corresponding portion of the from-VCE umbra boundary line (UBL). Whereas the WL reflects the visibility from a single vertex of the VCE, the corresponding UBL reflects the visibility (occluded or not occluded) from the entire VCE (where the VCE is a viewcell edge in this case). A UBL may have from-VCE occluded and from-VCE unoccluded segments based on the intersection of the UBL's WL with other WLS.

Process flow proceeds from step 1645 to step decision step 1647 to determine if any unprocessed WLS remain in the LIST. If there are unprocessed WLS in the LIST, then process returns to step 1640.

If, in decision step 1640, it is determined that the processed WL is a first-order WL, then process flow proceeds directly to step 1647 to determine if any unprocessed WLS remain in the LIST. If there are unprocessed WLS in the LIST, then process flow returns to step 1640.

If, in decision step 1647, it is determined that the LIST is empty then, process flow proceeds to step 1650, where the 2DDM_POINT is subjected to a modified point-in-polygon test to determine if it is occluded from the VCE. As previously discussed in embodiments, in conjunction with step 1445 in FIG. 14, this test employs a 2D version of the modified point-in-polyhedron test shown in FIG. 25, which is discussed in conjunction with that figure. This modified point-in-polyhedron test uses first-order event surfaces (first-order wedges), or the corresponding wedge lines (WLS) in the 2D case; and, optionally, higher-order umbral boundary polygons (UBPs), or the corresponding umbral boundary lines (UBLS) in the 2D case. This test allows an implicit solution to the point-in-polyhedron or point-in-polygon problem without necessarily constructing the entire polyhedron/polygon.

Process flow proceeds from step 1650 to step 1655 to examine the result of this modified point-in-polygon test of step 1650. If the 2DDM_POINT is occluded then process flow proceeds to step 1660 to return yes, otherwise process flow proceeds to 1665 to return no.

FIG. 17 2D Mesh Traversal: Construction of Higher-Order Wedge Lines by Backprojection, The 2D mesh traversal process for determining on-wedge visibility described in FIG. 14, FIG. 15, and FIG. 16 and related figures employs first-order wedge lines (constructed in step 1545 of FIG. 15).

In the case of SV-ME and SE-MV wedges, the corresponding wedge lines are from-point visibility event surfaces that are exact. In these cases, WL is also a from-region umbra boundary line [UBL] for the "from-region" visibility problem since the source "region" is degenerate it is a point.

However, in the case of an SE-ME wedge, the determination of on-wedge visibility is a true from-region visibility problem in which visibility is determined from a viewcell edge. In this case, in some embodiments, a first-order visibility event surface constructed on a vertex of the viewcell (actually a 1 degree-of-freedom surface: a wedge line) is only guaranteed to conservatively approximate the corresponding exact event surface, they are not necessarily the same line.

This is because the construction of a first-order WL assumes that the entire source or view-region, in this case a viewcell edge, is visible from the silhouette vertex on which the wedge line is constructed. In this sense, the first-order model of visibility propagation in polyhedral/polygonal environments developed in the present embodiments treat a source view region in some respects as a "viewpoint," since this assumption is always true for a single viewpoint.

For a view region, however, this assumption may not be true. In fact, the supporting viewcell vertex (SVV) used to construct the WL may actually be occluded when viewed from the silhouette vertex supporting the WL. In this case, the exact WL and the first-order WL are not the same.

To determine a more precise WL incident on the same first-order silhouette vertex, in some embodiments, the process of from-point backprojection is employed using the first-order silhouette vertex as the viewpoint. In the method of backprojection, a discontinuity mesh or visibility map is constructed on the view region itself (a viewcell edge in this 2D on-wedge visibility case), using some structure of the mesh as the view source (a first-order silhouette vertex in this 2D case).

The present method employs a focused, conservative backprojection approach in order to identify a conservative (from-silhouette vertex) visible supporting viewcell vertex (VSVV) on which to construct the WL. This "adjustment" of the WL is applied only in the case that the supporting viewcell vertex (SVV), used in construction of the original frontprojection first-order WL, is occluded from the supporting silhouette vertex. Otherwise, the first-order event surface (the WL) is exact.

Embodiments employ a method of 2D mesh traversal to compute backprojection, similar to the method shown in FIG. 14, FIG. 15. and FIG. 16 for the case of on-wedge frontprojection (from viewcell element) on-wedge visibility.

The on-wedge backprojection problem of finding the VSVV is always a from-point visibility problem, since the on-wedge from-VCE silhouette structure (the backprojection source) is always a point.

In some embodiments, the process of identifying an on-wedge, from-silhouette-vertex, VSVV in case the SVV is occluded, starts at step 1705 (FIG. 17) to select a seed mesh triangle/segment.

2D Mesh Traversal for Backprojection: Method of Employing Only Frontprojection-Unoccluded Triangle/Segments In one implementation of the method, only those triangles/segments that are visible in the frontprojection (from the viewcell edge) are used in the backprojection. In this method, the triangles/segments visible in the frontprojection have their face orientation reversed for the backprojection calculation. Commonly, the frontprojection silhouette vertex and the backprojection silhouette vertex, when viewed from the mesh silhouette vertex that is the "source" point for the backprojection, are the same vertex. In this case, there are, no frontprojection-unoccluded segments facing the backprojection source point (the first-order silhouette vertex before an orientation reversal is applied.

In other cases, not all of the frontprojection visible mesh elements will be backfacing with respect to the reprojection source point. In these cases, if the triangle's/segment's orientation was reversed, it would become back facing from the backprojection source point. This causes it to be backfacing with respect to the point and therefore create a mesh with triangles/segments having an inconsistent orientation. In this case, the triangles/segments that would develop a backfacing orientation with respect to the backprojection point are removed from the mesh.

The failure to include some potentially occluding geometry in the backprojection may reduce the precision of the computed VSVV and the related adjustment of the WL. However, a conservative result is still insured, since the elimination of any potentially occluding geometry will only make the computed VSVV a more conservative estimate of the SVV. Moreover, by employing only frontprojection-visible triangles/segments, the cost of the backprojection process is significantly reduced, since the relevant frontprojection visible triangles/segments have already been determined by the time the backprojection process is initiated for a specific mesh silhouette vertex.

In this approach, the frontprojection visible mesh elements are effectively used as virtual occluders to compute the backprojection.

Hence in step 1705, the selection of a seed 2D mesh, the selection is made from the set of meshes that are visible (unoccluded) in the frontprojection.

2D Mesh Traversal for Backprojection: Retraction of the Silhouette Vertex Under Higher-Order Visibility In one implementation of the present method, the backprojection is determined only from those backprojection sources, mesh silhouette vertices in this case, that are first-order silhouette vertices in the frontprojection, when viewed from the VCE. In this implementation, only those WLS attached to first-order, frontprojection silhouette vertices are "adjusted" by backprojection to reflect higher-order on-plane visibility. The adjusted WLS remains attached to the original mesh silhouette vertex.

Actually, when any vertex that is a first-order, frontprojection silhouette vertex, when viewed from SVV, is viewed from the VSVV, it may no longer be a silhouette vertex since both triangles/segments sharing the vertex may be backfacing with respect the VSVV. In such a case, the frontprojection silhouette vertex (backprojection source) is actually occluded from the viewcell element (edge in this case). In such a case, the actual (exact) from-region umbral event surface is not supported by this frontprojection silhouette vertex, but by a vertex on the same 1-manifold that is closer to the viewcell. This migration or "retraction" of the first-order from-viewcell silhouette toward the viewcell is a potential effect of higher-order visibility as determined by backprojection. The failure to account for this migration of the silhouette may in some cases reduce the precision of the computed VSVV and the corresponding adjustment of the WL. However, a conservative result is still insured since an adjusted visibility event surface, WL in this case, attached to a frontprojection first-order silhouette vertex will always produce a more conservative umbral event surface than the corresponding event surface attached to the corresponding retracted silhouette.

By keeping an adjusted WL attached to its original first-order frontprojection silhouette vertex, the "supporting segment" of the adjusted WL between the silhouette vertex and the VSVV can potentially violate the "local visibility" of the mesh on which it resides by penetrating the mesh surface. It is precisely in such a case that the silhouette vertex would tend to migrate toward the viewcell such that one of the closer connected vertices of the mesh produce an adjusted WL that does not violate local visibility, and as such becomes the "exact" silhouette vertices.

In order to keep the conservative adjusted WL attached to its original first-order, frontprojection silhouette vertex, the backprojection process is designed to prevent violations of local visibility by an adjusted WL. This occurs when the adjusted WL originates on the frontprojection first-order silhouette vertex in such a way that the WL is on the inside of the mesh triangle 1-manifold (polyline). This is a type of self-occlusion of the 1-manifold that can be prevented by detecting all mesh elements (polyline segments in this case) that form a connected component with the frontprojection silhouette vertex, wherein the connected component is entirely inside the shaft between the VCE edge segment and the vertex. This can be performed using a simple traversal of the polyline, starting at the vertex and ending when a segment intersects the shaft boundary. These mesh elements are the ones that can produce the type of self occlusion that causes retraction of the silhouette vertex. By identifying and eliminating these elements from the backprojection determination, the backprojection will produce a conservative "adjusted" WL that remains attached to the original frontprojection silhouette vertex but which accounts for higher-order visibility effects that cause the SVV to be occluded from the silhouette vertex.

Thus, in step 1705 of FIG. 17, the selection of the seed 2D mesh elements for backprojection, those mesh elements that could potentially cause self-occlusion of the backprojection-source vertex are excluded from consideration.

This approach simplifies the implementation in the present case of on-wedge visibility by 2D mesh traversal. Even greater simplification is achieved when this method is employed in case of from-viewcell visibility by 3D mesh traversal, as discussed in conjunction with FIG. 19, FIG. 20, and FIG. 21. By employing this method in the 3D mesh traversal case, the event surfaces (wedge polygons) remained attached to the original first-order frontprojection silhouette contours such that the construction of a continuous, conservative from-region umbral boundary surface is in insured.

Once again, alternate implementations are possible in which retraction of the silhouette vertex is allowed by accounting for self occlusion. For example, one approach to finding the "retracted" silhouette vertex is to compute the backprojection from the initial frontprojection, first-order silhouette vertex and determine if the WL corresponding to the computed VSVV violates local visibility. If local visibility is violated, then the vertex is not actually visible from the viewcell when higher-order effects are taken into account and the adjacent vertex closer to the VCE edge is then used as source point for the backprojection to determine if the WL corresponding to the new point's VSVV violates local visibility. The process can be repeated until a WL that does not violate local visibility is encountered. This WL is used as the adjusted, higher-order WL.

In general, the amount of additional from-region occlusion that results only from the retraction of the silhouette vertex is usually small whereas the increased complexity of the backprojection can be significant. Keeping the frontprojection WL fixed to the original frontprojection, first-order silhouette vertex and computing an "adjusted" WL corresponding to the VSVV by backprojection is an approach which accounts for most of the higher-order visibility effect with little increased cost.

As previously emphasized, the higher-order backprojection adjustment is only applied when the original SVV is occluded from the first-order silhouette vertex. In some embodiments, simple metrics are employed to determine the maximum possible deviation between the a first-order WL and the corresponding adjusted higher-order WL. For example, the angle formed by the first-order WL (i.e., a supporting line) and the corresponding separating line between the silhouette vertex and the VCE is the maximum angular deviation between the first-order WL and the higher-order WL; since using the present method the higher-order WL can in the limit only equal the separating line if the VSVV is the separating point. This angle naturally tends to decrease with increasing distance from the VCE. That is, the view region appears more "point like" from the backprojection source. Consequently, the higher-order visibility effect determined by the backprojection method become less important at greater distances from the view region. In some embodiments, the angle metric is used to determine if higher-order effects should be computed for any given frontprojection, first-order silhouette vertex.

Returning now to FIG. 17, which illustrates the overall control process for initiating, reinitiating, and terminating the 2D backprojection traversal, a seed triangle/segment of some initial on-wedge 2D mesh is selected to initiate the traversal as shown in step 1705.

As in the frontprojection implementation (step 1405 of FIG. 14), the selection of an initial seed triangle/segment that is likely to be an exposed occluder accelerates the process.

Process flow proceeds from 1705 to step 1710 to construct containment points on the seed mesh using ray casting. The on-wedge backprojection problem is confined to the region inside a 2D shaft formed by the backprojection-source point (a mesh silhouette vertex) and the VCE (a viewcell edge in this case). Thus, in some embodiments, the containment points in step 1710 are identified using the edges of this shaft as the rays for ray casting.

Process flow proceeds to step 1715 to call the main process of the from-vertex 2D mesh traversal method for determining the visible segments in this shaft.

As with the main process of the from-edge 2D mesh traversal method (shown in FIG. 15); the main process of the from-point backprojection mesh traversal can incur suspensions (such as the suspension of step 1830 of FIG. 18. Process flow proceeds to decision step 1720 to determine if there are any existing suspended traversals from the main process of the from-vertex backprojection 2D mesh traversal (FIG. 18).

As the backprojection process involves the construction of visibility map on the original source VCE, the steps shown in FIG. 17 are similar to the steps of FIG. 14 (frontprojection, on-wedge visibility map construction). Likewise the steps shown in FIG. 17 (backprojection, on-wedge visibility map are similar to the steps shown in FIG. 18 (frontprojection, on-wedge visibility map), except that in the backprojection case the source is a vertex, whereas in the frontprojection case, the source may be an edge (SE-ME wedge case)

The flowchart shown in FIG. 17 shows the process of initiating, reinitiating, and halting the main 2D traversal process which is shown in detail in FIG. 18, and which is described in detail in a subsequent part of this specification.

If, in decision step 1720, it is determined that there are no existing segments on which the main part of the 2D mesh traversal has been suspended, then process flow proceeds to step 1725 in which the 2D mesh traversal for the wedge is terminated, thereby completing the construction of the 2D on-wedge visibility map.

If, in decision step 1720, it is determined that there exist segments of the 2D mesh for which the main 2D mesh traversal has been suspended (in step 1830 of FIG. 18), then process flow proceeds to decision step 1730 to determine if any triangles exist in the shaft formed by the suspended segment (SEG) and the backprojection source vertex.

If, in decision step 1730, it is determined that there are no triangles in the shaft between the seg and the source vertex, then process flow proceeds to step 1755 to construct containment points on the 2D mesh (polyline) formed by the segments connected to the current suspended segment.

Process flow proceeds to step 1760 to reinitiate the 2D mesh traversal on the previously suspended segment.

If, in decision step 1730, it is determined that there are triangles in the shaft between the SEG and the source vertex, then process flow proceeds to step 1735 to determine if any triangles/segments in the SEG-VCE shaft are untraversed.

If, in decision step 1735, it is determined that untraversed triangles/segments exist in the SEG-VERTEX shaft, then process flow proceeds to step 1740, where the 2D mesh traversal is "jumped" or restarted on the closer untraversed triangles/segments in the SEG-VERTEX shaft. This step, which also occurs in step 1830 of the backprojection main 2D traversal process shown in FIG. 18, insures that all potentially occluding triangles/segments have been processed before the traversal is continued and before a decision to stop the traversal (because the suspended segment is completely occluded from the source vertex) is made.

If, in decision step 1735, it is determined that no untraversed triangles exist in the SEG-VERTEX shaft, then process flow proceeds to step 1745 to determine if a point on the current (suspended) segment is inside any polyline aggregate umbrae (PLAU) which represents one or more polygonal subregions of the wedge that are occluded from the wedge's source vertex. In some embodiments, this test employs a 2D version of the modified point-in-polyhedron test shown in FIG. 25. This modified point in polyhedron test uses first-order event surfaces (first-order wedges), or the corresponding wedge lines (WLS) in the 2D case; and, optionally, higher-order umbral boundary polygons (UBPs), or the corresponding umbral boundary lines (UBLS) in the 2D case. This test allows an implicit solution to the point-in-polyhedron or point-in-polygon problem without necessarily constructing the entire polyhedron/polygon.

If, in decision step 1745, it is determined that a point on the suspended segment is inside a PLAU, then process flow proceeds to step 1750, where the traversal is not reinitiated on the suspended segment and the suspended segment is no longer labeled as suspended. Process flow terminates at 1750.

If, in decision step 1745, it is determined that the suspended segment is not inside any PLAU, then process flow proceeds to step 1755, where the containment points of the associated 2D mesh are constructed. Process flow proceeds to 1760 to reinitiate the traversal as previously described in conjunction with corresponding step 1460 of FIG. 14.

FIG. 18 Backprojection, From-Vertex, 2D Mesh Traversal Main Process

According to some embodiments, the main process of the on-wedge, from-vertex, backprojection 2D mesh traversal process is similar to the on-wedge, from-vertex, frontprojection 2D mesh traversal process shown in FIG. 15.

In some embodiments, the process illustrated in FIG. 18 starts at step 1805 to begin traversal of the 2D mesh (a polyline) of on-wedge mesh triangle segments with traversal of an untraversed segment. The traversal of a polyline from segment to segment is straightforward, proceeding in one of two directions from a segment to neighboring segments. The corresponding 3D traversal of a triangle mesh (detailed in the discussion of FIG. 20) can occur across one of three neighboring boundaries, and proceeds for example in a flood-fill or breadth-first traversal.

Process flow proceeds to step 1810 to determine if any untraversed (by the current 2D mesh traversal process) triangles/segments exist in the 2D shaft between the current segment and the source vertex. The intersection of a single initial wedge with multiple visible mesh triangles can produce multiple polyline segments and potentially multiple corresponding 2D shafts. In one implementation, a 2D shaft (SEG-VERTEX shaft) is constructed for each of these segments. Alternate embodiments are possible in which a single conservative shaft bounding multiple connected segments is used to accelerate the shaft-containment test of step 1810. If any untraversed triangles/segments exist in the larger containing shaft, then the process can revert to the individual shafts for each segment.

In some embodiments, the shaft inclusion test of step 1810 is further accelerated by employing a hierarchical spatial subdivision (and/or hierarchical bounding box structures) to organize the 3D polygon mesh geometry. Using any hierarchical organization of the database tends to reduce the cost of the shaft inclusion test from approximately N*M to approximately N Log(M), where M is the number of polygons in the model and N is the number of shafts tested.

If untraversed segments exist in the SEG-VERTEX shaft, then process flow continues to step 1830, where the 2D traversal jumps to closer segments in the SEG-VERTEX shaft. These two steps enforce a front-to-back processing order.

If, in decision step 1810, it is determined that no untraversed segments exist in the SEG-VERTEX shaft, then process flow continues to step 1815 to determine if the currently traversed segment contains a backprojection occlusion boundary (BOB) point or a containment boundary point.

According to some embodiments, a backprojection occlusion boundary (BOB) point represents the boundary between from-vertex visible and from-vertex occluded on the 2D polyline manifold. A BOB point occurs at the intersection of a backprojection wedge line (BWL) with a polygon mesh segment on the wedge. Each intersection of a BWL and a polygon mesh segment is 1D element (point) of the corresponding 2D (on-wedge) discontinuity mesh.

If, in decision step 1815, it is determined that the current segment contains an BOB point, then process flow proceeds to step 1835 to stop the traversal of the current 2D mesh at the BOB point, where the process illustrated in FIG. 18 is interrupted. In further embodiments, process flow proceeds from step 1835 to process 18-1, which returns the process flow to step 1825.

Similarly, in decision step 1815, it is determined if the current segment of the 2D mesh contains a containment boundary. This boundary point is an intersection of the 2D mesh with a boundary line of the wedge, as determined in steps 1710 or 1755 in FIG. 17 (the process controlling the main backprojection 2D traversal process of FIG. 17). If, in decision step 1815, it is determined that the current 2D mesh segment contains a containment point, then process flow proceeds to step 1835, where the traversal of the 2D mesh is interrupted at the containment boundary point. In further embodiments, process flow proceeds from step 1835 to process 18-1, which returns the process flow to step 1825. If, in decision step 1815, it is determined that the current segment does not contain an BOB point or a containment point, then process flow proceeds to step 1820 to determine if the current segment contains a silhouette vertex.

Since the backprojection source is a vertex (a point), the determination of step 1820 is equivalent to finding a from-point silhouette at a vertex of the current segment.

If, in decision step 1820, it is determined that no silhouette vertex exists on the current segment, then process flow proceeds to step 1825, where the traversal of the 2D mesh proceeds to the next untraversed segment sharing a non-silhouette vertex with the current segment, using a breadth-first or flood-fill traversal of the 2D mesh.

If the current segment has a first-order silhouette vertex, then the normal breadth-first or flood fill traversal of the 2D mesh is not continued at a silhouette vertex. Instead, if in decision step 1820, it is determined that the current segment contains a first-order-silhouette vertex, then process flow proceeds to step 1845 to construct the backprojection wedge line (BWL) incident on the first-order silhouette vertex by pivoting to the corresponding supporting viewcell.

In step 1845, a wedge line (WL) is formed by pivoting a line, initially colinear with the backfacing segment (as defined above), wherein the pivoting is pivoting in a direction away from the outside surface of the corresponding polygon, to the source vertex.

Process flow proceeds from 1845 to step 1855, where the WL generated in step 1845 is intersected with mesh triangle/segments, all of which intersect the current wedge, in order to find the closest from-point visible triangle that intersects the current wedge. In one embodiment, this intersection of can be determined using ray casting, with the BWL as the ray. In some embodiments, techniques to accelerate this ray cast determination, including the hierarchical spatial subdivision of the triangle mesh database, as previously described, is employed.

The point of intersection between the BWL and the closest mesh triangle identified in step 1855 is a vertex or point (2DDM_POINT) of the 2D conservative umbral discontinuity mesh corresponding to the visibility from the source vertex. Because this is a from-point visibility problem all such 2DDM_points are also BOB points.

Process flow proceeds from step 1855 to decision step 1880 to determine if any unprocessed/untraversed segments exist in the current "traversal." In this context, a (2D) "traversal" is defined as a set of segments connected to the current segment by non-silhouette vertices.

If, in decision step 1880, it is determined that there are untraversed segments in the traversal, then process flow proceeds to step 1825, where the next untraversed segment is processed.

If, on the other hand, it is determined in decision step 1880 that there are no unprocessed segments in the traversal, then process flow proceeds to step 1883, where the segments containing the BOB points generated by the current traversal are restricted such that the portion of the segment on the "from-vertex" occluded side of the BOB points are effectively removed and the segment is terminated by the corresponding BOB point.

These BOB points, added to a segment, are the same occlusion boundaries that may be later identified during traversal of a 2D mesh containing the segment for example in step 1815, occlusion boundary.

In a subsequent step 1885, the traversal of the 2D mesh is continued on the unoccluded side of the BOB points. Since the BWL from one triangle/seg manifold may produce OB points on a different (disconnected) triangle/seg manifold this represents a continuation of the traversal on a newly connected manifold (the backprojection polyline aggregate umbra, or PLAU) formed by "occluder fusion" of the two manifolds by the BWL at the BOB point. (For a description of occluder fusion in 3D, see Durand et al (2000)), the entire contents of which are incorporated herein by reference.)

FIG. 19 3D Mesh Traversal

Referring now to FIG. 19, and the related FIG. 20, and FIG. 21, the 3D mesh traversal process (traversal of 2-manifolds) for constructing first-order from-viewcell visibility maps is described.

The 3D mesh traversal process solves the 3D, from-viewcell visibility problem. The output of the 3D mesh traversal process is a conservative linearized umbral visibility map comprised of from-viewcell unoccluded polygon fragments constructed using conservative linearized umbral event surfaces (CLUES). As described, the CLUES correspond to linearized, conservative visibility event surfaces or "wedges" constructed, in some embodiments according the methods of the exemplary flowcharts of FIG. 1, and FIGS. 3-6.

Unlike wedges used in the prior-art method of discontinuity meshing, the CLUES or first-order wedges employed in the present method are defined based on the conservative model of first-order visibility propagation. In the first-order visibility method, the structure of the wedge itself is defined only by a silhouette feature of a polygon mesh and a viewcell feature; geometry which intervenes between these two structures does not influence the structure of the first-order wedge.

The overall organization of the 3D mesh traversal method is to conduct a traversal of the manifold mesh elements (e.g., triangles of manifold triangle meshes) in a way that insures that, for any mesh element being traversed, all mesh elements that can completely or partially occlude the mesh element being traversed are first identified. These potentially occluding mesh elements are first processed (recursively by 3D mesh traversal) before the traversal of the original mesh element being traversed proceeds. During the 3D mesh traversal process, the umbral event surfaces originating on these potentially occluding mesh elements are constructed on the unoccluded first-order silhouette edges of the potentially occluding elements. These event surfaces may intersect mesh triangles causing umbral discontinuities which may correspond to from-viewcell occlusion boundaries that can restrict the traversal process.

This front-to-back processing order largely limits the construction of visibility event surfaces (wedges) to those wedges incident on visible silhouette edges, which decreases the amount of time perform mesh traversal. This approach also largely restricts traversal to unoccluded mesh triangles, making the process output-sensitive in the number of elements actually visible from the viewcell. According to some embodiments, an unoccluded element is partially occluded.

This is in contrast to the method of first-order conservative umbral discontinuity mesh construction shown in FIG. 12 in which first-order wedges are constructed on all first-order silhouette edges, even first-order silhouette edges that are occluded. In the output-insensitive method of FIG. 12, the discontinuity mesh regions formed by these occluded first-order silhouette edges are ultimately determined to be occluded. However, since event surfaces are formed on all first-order silhouette edges, all possible umbral discontinuity mesh regions are formed and must later be examined for actual from-region visibility in a post processing step in which the arrangement of the discontinuity mesh is actually determined.

In one embodiment of the present method, it is assumed that the viewcell is convex. It is also assumed that the polygon meshes are triangle meshes and that the triangle meshes are manifold (each edge is shared by exactly two triangles). The intersection of mesh triangles with wedges or UBPs may produce more complex mesh polygons. These more complex polygons can be converted to triangles using established methods of polygon triangulation. (See M. de Berg, M. van Dreveld et. al in "Computational Geometry Algorithms and Applications, Springer c. 1997, page 45, the entire contents of which are incorporated herein by reference). The triangle mesh is represented as a directed graph. The method accommodates mesh polygons other than triangles, however the use of triangles simplifies the traversal method. These assumptions simplify the implementation, however, other implementations which relax these assumptions are possible.

The output of the 3D mesh traversal process is a conservative visibility map comprised of from-viewcell visible mesh polygons (and polygon fragments). These polygon fragments, together with the umbral boundary polygons (UBPS) incident on the from-viewcell silhouette edges, comprise the boundary of the polyhedral aggregate umbrae (PAU) which is the volume of space occluded from the viewcell, wherein the occluded volume may be conservatively underestimated. Individual 2-manifolds may be "fused" to other 2-manifolds where UBPS from the closer manifold intersect a more distant manifold, thus realizing occluder fusion.

In the present method of 3D mesh traversal, this type of occluder fusion can be identified without necessarily explicitly constructing the UBPS which correspond to wedges. In the present method, it is only necessary to determine if a discontinuity mesh segment, which corresponds to the intersection of a wedge with a triangle mesh, is otherwise occluded from the viewcell. If so, this discontinuity mesh segment is a segment of the PAU, and is therefore a from-viewcell occlusion boundary. This approach has a lower computational cost than explicitly constructing all the UBPS (which requires wedge-wedge intersections).

Figure 22:
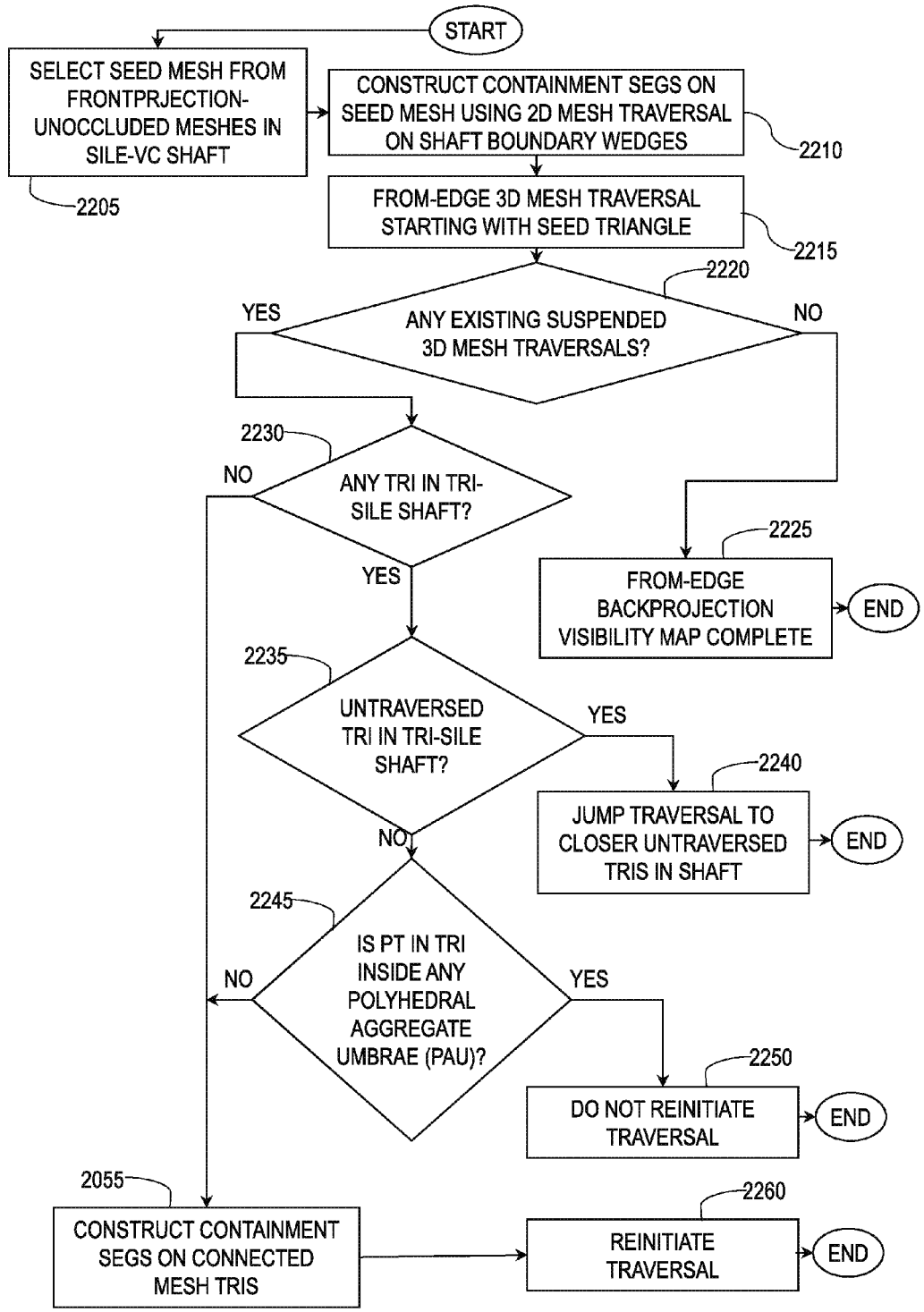
FIG. 22 is an exemplary flowchart showing the controlling process for a method of 3D mesh traversal to construction a backprojection, from-silhouette edge visibility map for determining the from-silhouette-edge visible supporting viewcell vertex (VSVV) and visible supporting viewcell silhouette contour (VSVSC).
Figure 23:
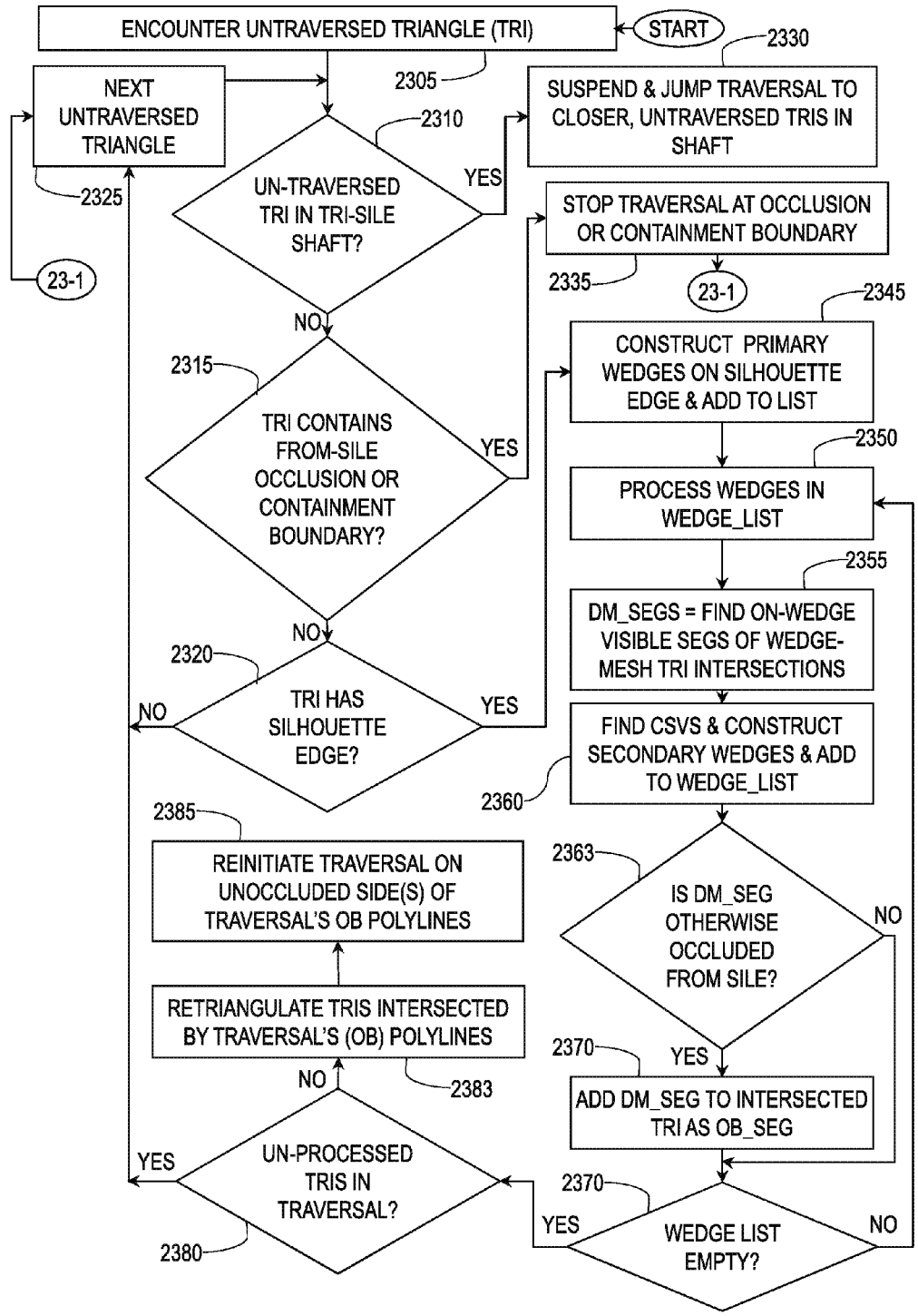
FIG. 23 is an exemplary flowchart showing the main process for a method of 3D mesh traversal to construct a backprojection, from-silhouette edge visibility map for determining the from-silhouette-edge visible supporting viewcell vertex (VSVV) and visible supporting viewcell silhouette contour (VSVSC).

As shown in subsequent FIG. 22, FIG. 23, and FIG. 24, the explicit construction of UBPS corresponding to higher-order or "adjusted" wedges is used to account for higher-order visibility effects.

The process shown in FIG. 19 controls the initiation, reinitiation and halting of the main process of 3D traversal shown in FIG. 20. These processes are similar to the corresponding controlling and main processes of 2D traversal shown in FIG. 14 and FIG. 15 and previously discussed.

According to some embodiments, the process illustrated in FIG. 19 starts at 1905 to select a seed triangle in a seed mesh. The selection of a mesh and/or mesh triangle which is "strongly visible" (no other triangles in the shaft formed by the mesh/triangle and the viewcell) accelerates the overall traversal process, but any mesh/triangle can be selected.

Once a seed triangle is selected, process flow proceeds to 1915 to initiate the main process of the 3D mesh traversal. An embodiment of the main process of the 3D mesh traversal is shown in detail in FIG. 20. Overall, the main 3D traversal process shown in FIG. 20 is initiated by the controlling process shown in FIG. 19. Moreover, in some embodiments, the main process of the 3D traversal process (shown in FIG. 20) can be suspended at specific triangles of the mesh (step 2030). The process shown in FIG. 19 determines whether any suspended traversals remain in the main 3D manifold traversal process (step 1920) and whether the main process of the 9D mesh traversal should be reinitiated on these suspended segments (steps 1930 and later).

If, in decision step 1920, it is determined that there are no existing triangles on which the main part of the 3D mesh traversal has been suspended, then process flow proceeds to step 1925 in which the 3D mesh traversal for the wedge is terminated, thereby completing the construction of the 3D from-viewcell visibility map.

If, in decision step 1920, it is determined that there exist triangles of the 3D mesh for which the main 3D mesh traversal has been suspended (in step 2030 of FIG. 20), then process flow proceeds to decision step 1930 to determine if any triangles exist in the shaft formed by the suspended triangle (TRI) and the viewcell.

If, in decision step 1930, it is determined that there are no triangles in the shaft between the suspended triangle and the viewcell, then process flow proceeds to step 1960 to reinitiate the 2D mesh traversal on the previously suspended segment. The process flow terminates at 1960.

If, in decision step 1930, it is determined that there are triangles in the shaft between the suspended triangle and the viewcell, then process flow proceeds to step 1935 to determine if any triangles in the suspended triangle-viewcell shaft are untraversed.

If, in decision step 1935, it is determined that untraversed triangles exist in the suspended triangle-viewcell shaft, then process flow proceeds to step 1440, where the 3D mesh traversal is "jumped" or restarted on the closer untraversed triangles/segments in the suspended triangle-viewcell shaft. This step (which also occurs in step 2030 of the main 3D traversal process shown in FIG. 20) insures that all potentially occluding triangles have been processed before the traversal is continued and before a decision to stop the traversal, because the suspended triangle is completely occluded from the viewcell, is made.

If, in decision step 1935, it is determined that no untraversed triangles exist in the SEG-VCE shaft, then process flow proceeds to step 1945 to determine if a point on the current (suspended) triangle is inside any polyhedral aggregate umbrae (PAU), and therefore, conservatively occluded from the viewcell. In some embodiments, this test employs a modified point-in-polyhedron test shown in FIG. 25.

This modified point in polyhedron test uses first-order event surfaces (first-order wedges) and, optionally, higher-order umbral boundary polygons (UBPs). This test allows an implicit solution to the point-in-polyhedron problem without necessarily constructing the entire polyhedron. The details of this test are given in conjunction with FIG. 25

If, in decision step 1945, it is determined that a point on the suspended triangle is inside a PAU, then process flow proceeds to step 1950, where the traversal is not reinitiated on the suspended triangle and the suspended triangle is no longer labeled as suspended. Process flow terminates at 1950.

If, in decision step 1945, it is determined that the suspended triangle is not inside any PAU, then process flow proceeds to step 1960, which reinitiates the traversal on the suspended triangle. Process flow terminates at 1960.

If no triangle of a mesh is part of a connected component of visibility map (or PAU), then the entire mesh is either occluded by the VM/PAU or not occluded by the VM/PAU. Consequently, in some embodiments, to determine the visibility of all polygons of such a mesh, the visibility of only one vertex of the mesh with respect to the specific completed VM/PAU or corresponding connected component is determined using the method of FIG. 19 and e.g., FIG. 25. However, as described in detail elsewhere in this specification, by using the 3D mesh traversal method in conjunction with a large bounding box, or enclosing mesh object, containing all of the model geometry, wherein the bounding box polygons may be subdivided into smaller polygons, many of these tests are naturally avoided.

FIG. 20A Is a Flowchart Showing the Main Process of Constructing a Conservative, Linearized, From-Viewcell Visibility Map Using 3D Mesh Traversal.

Turning now to FIG. 20A, the main 3D mesh traversal process begins with a breadth-first, or flood-fill traversal of a manifold triangle or other polygon mesh as shown in the initial step 2005. The initial triangle to seed the entire process is selected in the controlling process shown in the flowchart of FIG. 19.

In one embodiment, the mesh is a manifold triangle mesh in which each edge is shared by exactly two triangles. Other definitions of a mesh are also possible, including meshes which are not closed. The intersection of mesh triangles with wedges or UBPs may produce more complex mesh polygons. These more complex polygons can be converted to triangles using established methods of polygon triangulation. The triangle mesh is represented as a directed graph. The method accommodates mesh polygons other than triangles, however, the use of triangles simplifies the traversal method. The method of FIG. 20A employs a manifold triangle mesh in which each edge is shared by exactly 2 triangles.

In some embodiments, the process flow illustrated in FIG. 20A starts at 2005, where traversal of a triangle of the mesh is indicated. Traversal can proceed in a breadth-first or flood-fill graph traversal order. Using breadth-first traversal of the triangle mesh, traversal spreads from the initiating triangle outward forming layers of traversed triangles. Triangles connected by non-silhouette edges are said to belong to the same "traversal."

Other traversal orders are possible. The triangle selected to initiate the traversal of one or more polygon meshes does not affect the output of the traversal. However, by selecting an initial triangle that is completely visible and close to the viewcell the process tends to perform better. In keeping with the processes of a directed graph traversal, step 2005 indicates that traversal is limited to untraversed triangles in the mesh.

Process flow proceeds to decision step 2010 to determine if any untraversed triangles are within a 3D shaft formed by the current triangle and the viewcell (this shaft is called a TRI-VC shaft). If there is one or more untraversed triangle in this shaft, then process flow continues to step 2030 in which traversal is immediately jumped to the closer untraversed triangle. In one embodiment mesh polygons are organized using hierarchical spatial subdivision structures. This allows the shaft test of step 2010 to rapidly identify large groups of previously traversed mesh polygons, by producing Log N performance for the shaft test.

Step 2030 effectively enforces a strict front-to-back processing of mesh elements for a single mesh or for multiple mesh objects. The process of jumping the traversal to a closer potentially occluding triangle can result in endless cycles caused by cyclic overlap of triangles. Such cycles are also encountered in Weiler-Atherton visibility algorithm and can be detected and eliminated by maintaining a directed graph representation of the overlap relationships. This method is presented in FIG. 13 and discussed in detail in connection with that figure.

Step 2030 insures that the event surfaces originating on closer untraversed triangles in the triangle-viewcell shaft of the current triangle are identified and constructed prior to a traversal of the current triangle. These event surfaces may be from-viewcell occlusion boundaries (determined for these closer silhouette edges in steps 2045-2068) which restricts traversal of the current triangle (steps 2035). By forcing a jump to the closer untraversed triangles/silhouette edges, step 2010 insures that any from-viewcell occlusion boundaries that could restrict traversal of the current triangle are constructed prior to traversal of the current triangle. Process flow suspends at 2030, reinitiating at a closer, untraversed mesh triangle in the triangle-viewcell shaft.

If there are no untraversed triangles in the TRI-VC shaft, then process flow proceeds to decision step 2015 to determine if the current triangle being traversed contains a from-viewcell (FROM-VC) occlusion boundary. Umbral discontinuity mesh (DM) segments generally form polylines at the intersection of a mesh triangle with wedges. Each DM segment is the intersection of a wedge and a triangle wherein the segment is conservatively visible from the wedge's supporting viewcell element (vertex or edge). This is called an "on-wedge" visible intersection. The on-wedge visible segments are conservatively visible because they are determined (in the 2D mesh traversal process of FIG. 15) using from-viewcell silhouette vertices (not "from-wedge's supporting viewcell element" silhouette vertices). Since a segment may actually be backfacing relative to the wedge's supporting viewcell element, but frontfacing (and hence visible) from the viewcell; some segments that are actually backfacing from the wedge's supporting viewcell vertex may be included as DM segments.

On-wedge visible intersections, or discontinuity mesh segments, are identified in the later step 2055 by the 2D mesh traversal described in FIG. 15 and related figures.

The DM_SEGS comprise the polylines of the conservative linearized umbral discontinuity mesh. These polylines may or may not be actual from-viewcell (FROM-VC) occlusion boundaries (the boundary separating polygon fragments that are conservatively visible from the viewcell and polygon fragments that are occluded from the viewcell, wherein the size of the umbral volume is conservatively underestimated). Each DM_SEG may or may not be a from-viewcell occlusion boundary (OB_SEG). An OB_SEG is an actual edge of a from-viewcell umbral boundary polygon (UBP) which is a face of a from-viewcell polyhedral aggregate umbra (PAU).

From-viewcell occlusion boundaries encountered in step 2015 are discontinuity mesh (DM) polyline segments (DM_SEG) that have been determined to be from-viewcell occlusion boundary segments (OB_SEG) in step 2063. The details of step 2063 are presented later. Step 2063 determines which DM polyline segments are from-viewcell occlusion boundaries and is actually performed before a from-viewcell occlusion boundary would be encountered later in step 2015.

The "on-wedge" visible intersection of a mesh triangle with a wedge represents a segment of the umbral discontinuity mesh which may or may not correspond to a from-viewcell occlusion boundary (OB). Each DM polyline is determined to be a from-region occlusion boundary (or not) in step 2063 and the result is stored with the DM polyline. Since each DM polyline is processed by step 2063 prior to it being encountered in steps 2015 the information required for the decision in step 2015 was previously determined and stored for the encountered DM polyline segment in step 2063.

If, in decision step 2015, it is determined that the current triangle does contain an occlusion boundary (OB) segment, then process flow proceeds to step 2035 to interrupt the traversal of the current 3D mesh at the OB segment (OB SEG). Traversal may continue across other non-OB segments of the triangle. Process flow interrupts at 2035. In further embodiments, process flow proceeds from 2035 to process 20-1, which returns the process flow to step 2025. The mesh traversal can then proceed across other mesh triangle edges that are not occlusion boundary segments.

If, in decision step 2015, it is determined that the current triangle does not contain an OB segment, then process flow proceeds to step 2020 to determine if the current triangle has a silhouette edge. This determination is based on the test for a first-order, from-viewcell silhouette edge shown in FIG. 3.

If, in decision step 2020, it is determined that the current triangle does not have a silhouette edge, then process flow proceeds to step 2025, where the next untraversed triangle in the breadth-first traversal of the directed graph corresponding the manifold triangle mesh.

If, in decision step 2020, it is determined that the triangle being processed does contain a silhouette edge, then process flow proceeds to step 2045, where the breadth-first traversal of the directed graph corresponding to the triangle mesh is stopped at the silhouette edge and primary wedges are constructed incident on the silhouette edge using the first-order method of pivot and sweep method of wedge construction (FIG. 1-FIG. 6). The primary wedges so constructed are added to a list called the WEDGE_LIST. The primary wedges are those wedges constructed on encountered first-order silhouette edges using the pivot and sweep method. On initial construction, in some embodiments, all wedges are initial wedges which have not yet been further restricted by an on-wedge visibility step. The construction of the initial primary wedges in step 2045 corresponds to the initial primary wedge construction shown in step 1210 in FIG. 12. The output-insensitive method.

Alternate embodiments are possible in which the first-order wedges (constructed in step 2045 and the later step 2060) are not constructed using the pivot-and-sweep method of the present embodiments but instead using the less precise method of extending the SV-ME wedge planes to intersection (as described by Teller et. al, 1992, where such planes were generated only on portal sequence edges). The present embodiments include a technique in which the difference in the umbral volumes produced by the pivot-and-sweep method and the intersecting planes method can be estimated at an inside-corner vertex. In this technique (discussed in detail in FIG. 20B), the method used to construct the continuous conservative umbral event surface incident on the inside corner vertex is selected based on a heuristic which balances the desired precision against the increased complexity of the resulting visibility map that results from the additional SE-MV occlusion boundary segments.

Process flow proceeds from step 2045 to step 2050, where wedges in the WEDGE_LIST are selected and submitted to subsequent processing steps 2055 through 2068.

Process flow proceeds to step 2055, which is a first step of the processing of wedges in the WEDGE_LIST where the on-wedge visible segments of mesh triangles intersecting the wedge are determined.

An efficient, output-sensitive 2D mesh traversal solution to this on-wedge visibility problem is presented in FIG. 15. The method of FIG. 15 is actually a 2D implementation of the method shown in the current figure FIG. 20. In step 2055, in some embodiments, the on-wedge visible segments are stored as discontinuity mesh segments (DM_SEGS). This method of on-wedge visibility determination also identifies the compound silhouette vertices (CSVS) that are required for the subsequent step 2060.

Process flow proceeds from step 2055 to step 2060, to construct secondary wedges at the CSVs identified on each wedge during the earlier step 2055. A CSV is generated during step 2055 at any on-wedge visible intersection of the wedge with a first-order from-viewcell silhouette edge, as identified in the earlier step 2055. Each CSV is an on-wedge visible point of intersection of a wedge and a first-order silhouette edge. These points correspond to t-junctions of the compound from-region silhouette contour.

In step 2060, according to some embodiments, SE-MV wedges are constructed on each of the CSVs identified. These wedges originating on a CSV are called secondary wedges. These wedges are constructed using the sweep operation of the pivot-and-sweep method of wedge construction. All of these wedges generated in this step are SE-MV type, generated in the sweep process. The sweep is conducted between the SVVS of the original wedges intersecting at the CSV. The wedges constructed by the sweep process form a continuous, conservative umbral surface which connects the original wedges intersecting at the CSV. In alternate embodiments, the two original wedges can be extended to intersection, forming a less precise, but still conservative umbral boundary.

As previously defined, each CSV corresponds to the intersection of a wedge and another wedge which is supported on the intersected silhouette edge. These wedges intersect at the point of the CSV.

If both SV-ME wedges intersecting at the CSV pivot to the same viewcell vertex, then the two wedges exactly intersect at their edges and no new SE-MV wedge is constructed.

If the two wedges intersecting at a CSV are formed by pivoting to two vertices of the same viewcell edge, then the result of pivot-and-sweep construction on the CSV is a single SE-MV wedge. In this case, if the two original wedges intersecting at the CSV are SV-ME type, then the connecting SE-MV wedge constructed at the CSV conservatively approximates the quadric formed by a viewcell edge (connecting the two supporting viewcell vertices) and the two SV-ME silhouette edges corresponding to the intersecting SV-ME wedges of the CSV. The single SE-MV wedge, constructed on the CSV in this case, conservatively approximates the corresponding quadric formed by the S-EEE event. In fact, the constructed SE-MV triangle can be interpreted as a degenerate quadric having infinite pitch.

If the two wedges intersecting at the CSV are formed by pivoting to vertices belonging to different viewcell edges, then the result of pivot-and-sweep construction on the CSV is an edge-connected sequence of SE-MV wedges. In this case, if the two original wedges intersecting at the CSV are SV-ME types, then the set of connecting SE-MV wedges constructed on the CSV conservatively approximates the quadrics formed by the connected viewcell edges and the two other silhouette edges corresponding to the intersecting SV-ME wedges of the CSV. Once again, each of the SE-MV wedges can be considered to be a corresponding degenerate quadric with infinite pitch.

Secondary wedges may also be generated at a CSV corresponding to the intersection of a SE-MV wedge with a from-viewcell silhouette edge.

All secondary wedges (those incident on CSVs) constructed in step 2060 are added to the WEDGE_LIST, which means that they will ultimately be processed by step 2055 to find on-wedge visible segments.

Process flow proceeds from step 2060 to decision step 2063 to determine if the DM_SEG is occluded from all other "parts" of the corresponding viewcell, except the supporting viewcell structure (vertex or edge) supporting the wedge containing the DM_SEG. An embodiment of this test is disclosed in FIG. 21. Briefly, the test involves intersecting the DM_SEG with all potentially intersecting wedges already constructed and then determining, by the modified point-in-polyhedron test, if the resulting subsegments are inside the from-viewcell PAU.

If the DM_SEG is otherwise occluded from all other parts of the viewcell (except the SVV supporting the DM_SEG's wedge), then the DM_SEG is an actual from-viewcell occlusion boundary (OB) corresponding to an edge of the from-viewcell PAU.

Thus, if in decision step 2063, it is determined that the DM_SEG is otherwise occluded from the viewcell (using the process of FIG. 21), then process flow proceeds to 2068, where the DM_SEG is added to the intersected triangle as an OB_SEG.

If, on the other hand, the DM_SEG is not otherwise occluded from all other parts of the viewcell, then the DM_SEG is not an actual from-viewcell occlusion boundary (OB) and process flow proceeds to step 2070 to determine if any unprocessed wedges remain in the WEDGE_LIST. If, in decision step 2070, it is determined that unprocessed wedges remain in the wedge list, then process flow returns to step 2050.

If, on the other hand, it is determined in step 2070 that no unprocessed wedges remain in the wedge list, then process flow proceeds to step 2080 to determine if any unprocessed triangles exist in the current "traversal" (the set of triangles connected to the current triangle by non-silhouette edges). If in decision step 2080 it is determined that un-traversed triangles exist in the traversal (the set of triangles connected to the current triangle by non-silhouette edges), then process flow proceeds to step 2025, where the next untraversed triangle is processed.

If in decision step 2080 it is determined that no un-traversed triangles exist in the traversal, then process flow proceeds to step 2083, where those triangles intersected by the OB segments generated in the current traversal are identified and retriangulated using the intersecting OB segments. This step can effectively restrict the 3D mesh traversal at occlusion boundaries when later encountered in step 2015, and thereby limit the traversal to non-occluded regions, further enforcing the output-sensitive character of the method.

Process flow proceeds to step 2085 to continue the traversal of the 3D mesh i on the unoccluded side of the OB segments generated from the traversal. Process flow terminates at 2085. Since the wedges from one 2-manifold may produce OB points on a different (disconnected) 2-manifold this represents a continuation of the traversal on a newly connected manifold (part of the PAU) formed by "occluder fusion" of the two manifolds by the wedge line at the OB segment.

As previously described, in one embodiment of the present method, the entire set of triangle mesh objects is contained by an enclosing mesh object. This enclosing mesh object is similar to a "skybox" commonly used to surround mesh objects for interactive visualization applications. The present method of mesh traversal in 3D treats the enclosing skybox mesh as any other triangle mesh manifold, except that the viewcells are inside the enclosing mesh object. FIG. 20K shows such an enclosing mesh object, labeled SKYBOX which contains other polygon meshes. The arrows labeled NORMAL indicate that, unlike other polygon meshes, the enclosing mesh has all mesh polygons oriented so that their normals are locally directed toward the inside of the mesh. Other details of FIG. 20K are discussed in conjunction with that figure.

This approach insures that the traversal continues an omnidirectional traversal of the entire database even where other mesh objects are not present in the database. The use of this enclosing mesh helps make the current method output-sensitive. That is, since only the encountered unoccluded meshes are processed, there is no need to process each mesh in the database. Moreover, the present method will naturally identify the unoccluded regions of the skybox itself, which, because of its size and position is typically otherwise a source of significant overdraw.

In summary, the overall structure of the method outlined in FIG. 19, FIG. 20, and the related FIG. 21 is that of a coherent breadth-first manifold traversal, which is interrupted by one of three conditions: 1) untraversed potentially occluding mesh triangles (step 2010), 2) the presence of a from-viewcell occlusion boundary in the triangle (step 2015), or 3) the presence of a first-order silhouette edge on the triangle (step 2020).

Step 2010 insures a strict front-to-back processing of the manifolds. Step 2015 together with step 2085 prevent traversal from proceeding on regions of the mesh that are actually occluded. Together, these steps produce output-sensitive performance by preventing many occluded mesh triangles and their silhouette edges from being processed.

Step 2020 identifies visible silhouette edges and begins the process of generating the primary wedges and associated secondary wedges (at CSVs) and establishing the on-wedge visible segments of intersection between these wedges and the mesh triangles. These visible segments become the segments of the conservative first-order umbral discontinuity mesh that are subsequently tested (step 2063, with the details of the test shown in FIG. 21) to determine if they correspond to from-viewcell occlusion boundaries which are included in the visibility map.

The similarity between the 2D and 3D mesh traversal methods is evident when comparing FIG. 14 to FIG. 19, FIG. 15 to FIG. 20, and FIG. 16 to FIG. 21. These similarities are also detailed in Table VII (aspects of 3D traversal), Table VIIIa (aspects of 2D traversal), and Table VIIIb (aspects of 1D traversal or ray casting).

Comparing Aspects of 3D Mesh Traversal, 2D Mesh Traversal, and 1D Mesh Traversal (Ray Casting)

TABLE VII

Aspects of 3D Mesh Traversal Method Used in From-Viewcell Mesh Traversal, Conservative Point-Occlusion (From-Viewcell) Query, and From-Silhouette Edge Backprojection

| 3D Traversal | Silhouette Edges | Mesh Polygons Used | Output |
| --- | --- | --- | --- |
| From-Viewcell Manifold Traversal | From-Viewcell | Entire Set of Meshes | From-VC Visibility Map |
| Is Point Occluded from Viewcell Query<br>a. Vis_Seg From-Viewcell Backprojection Query<br>b. Initial Triangle in 3D Mesh Traversal Query | From-Viewcell | Conservatively Overestimated From-Viewcell Visible Fragments in Point-Viewcell Shaft | Result: Point Occluded from Viewcell or Not |
| From-Silhouette-Edge/Subsegment (3D Manifold Traversal Backprojection Calculation for Higher-Order Visibility) | From-Viewcell | Conservatively Overestimated From-Viewcell Visible Fragments in Edge-Viewcell Shaft | 2 VSVSCs for adjacent segments (conservatively connected by convex hull) |

TABLE VIII

Aspects of 2D Mesh Traversal Method Used in On-Wedge Visibility, Conservative Point-Occlusion (From-Edge) Query, and From-Silhouette Vertex Backprojection

| 2D Traversal (On-Wedge Visibility) | Silhouette Points | 2D Mesh Polylines Used | Output |
| --- | --- | --- | --- |
| From Viewcell-Vertex | From-Point | Entire Set of Meshes | From Viewcell-Vertex Visible Segments |
| SE-ME From Viewcell-Edge | From-Edge | Entire Set of Meshes | From Viewcell-Edge |

TABLE VIII-continued

Aspects of 2D Mesh Traversal Method Used in On-Wedge Visibility, Conservative
Point-Occlusion (From-Edge) Query, and From-Silhouette Vertex Backprojection

| 2D Traversal (On-Wedge Visibility) | Silhouette Points | 2D Mesh Polylines Used | Output |
|---|---|---|---|
| Is Point Occluded from Edge Query<br>a. Vis_Seg From-Edge Backprojection Query<br>b. Initial Segment in Polyline From-Viewcell Edge Query | From-Edge | Conservatively Overestimated From-Edge Visible Segments in Point-Edge Shaft | Result: Point is Occluded from Edge or Not |
| From Silhouette Vertex 2D Manifold Traversal (2D Backprojection Calculation for Higher-Order Visibility in Plane) | From-Edge | Conservatively Overestimated From-Edge Visible Segments in Point-Edge Shaft | From-Silhouette-Vertex Visible Supporting Vertex on Source Edge |

TABLE VIIIb

Aspects of 1D Mesh Traversal (Ray Casting)

| 1D Traversal (Ray Cast) | Silhouette Points | 2D Mesh Polylines Used | Output |
|---|---|---|---|
| Is Point Occluded From Point Query<br>a. Vis-Point Backprojection Query<br>b. Initial Segment In Polyline From-Viewcell-Point | From-Point | Conservatively Overestimated From-Edge Visible Segments in Point-Edge Shaft | Result: Point is Occluded from Point or Not |

Figure 20B:
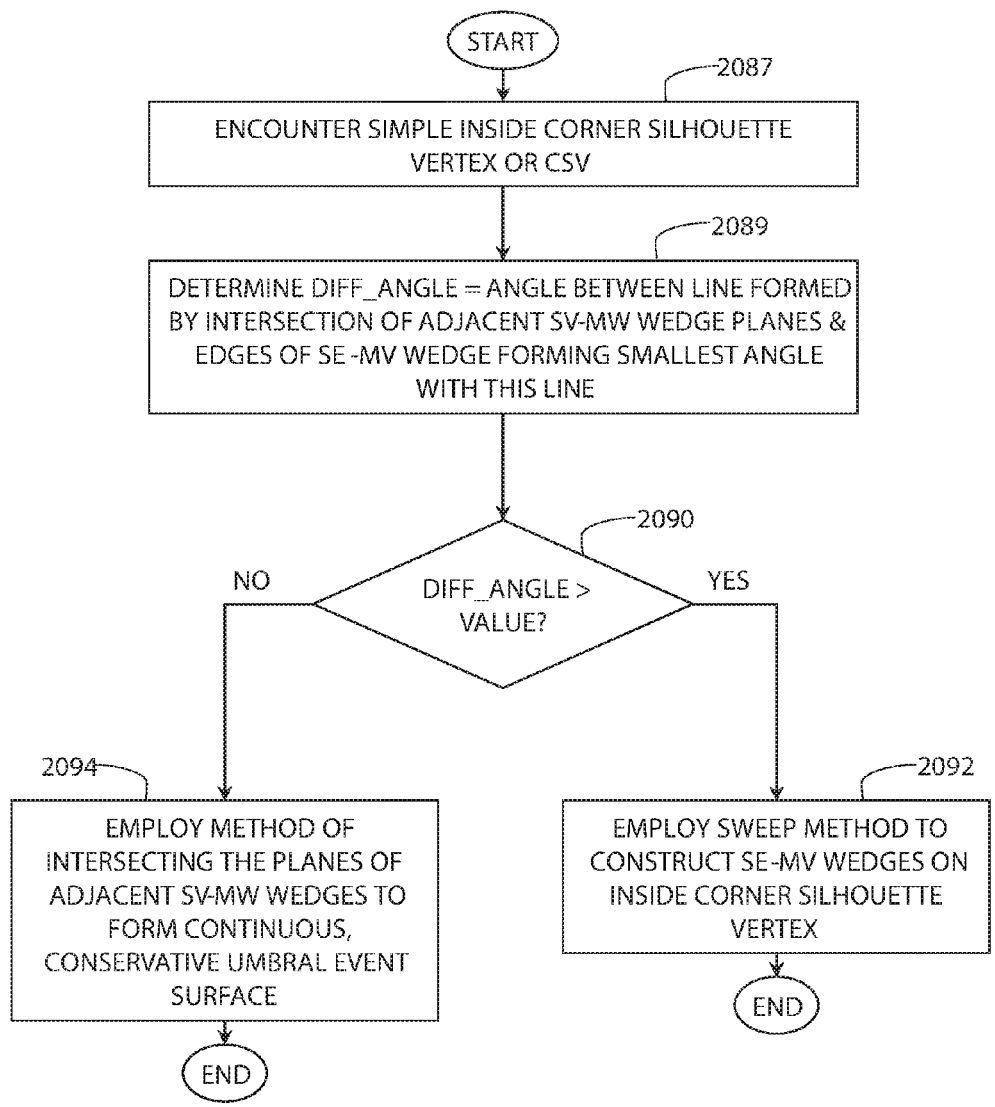

FIG. 20B Method of Using an Estimate of Difference in Umbral Volumes Produced by the Pivot-and-Sweep Method and the Intersecting Planes Method, Estimated at an Inside-Corner Vertex; and the Difference Used to Determine the Method of Constructing the Continuous Umbral Event Surface at the Inside-Corner Vertex.

According to some embodiments, the process illustrated in FIG. 20B starts at step 2087 upon encountering a simple inside corner silhouette vertex or a compound silhouette vertex (CSV). In embodiments, this occurs at step 2020 and 2055 of FIG. 20.

Process flow proceeds to step 2089 to construct a line is by interesting the planes of the SV-ME wedges adjacent to the silhouette vertex. Also in step 2089, the edges of the SE-MV wedges incident the inside-corner silhouette vertex are constructed and the SE-MV edge forming the smallest angle with the intersecting-planes line is determined. In one example, shown in FIG. 9D, this angle is the angle produced by the line L1 (line of intersecting planes) and line L2, which is an edge of the corresponding SE-MV wedge. The angle being measured from the intersection point of these two lines at the vertex ICSV. This smallest angle is stored in the variable DIFF_ANGLE Process flow proceeds to decision step 2090 to determine if the angle DIFF_ANGLE exceeds a predetermined value.

If, in decision step 2090, it is determined that the DIFF_ANGLE is greater than a predetermined value, then process flow proceeds to step 2092 to construct the SE-MV event surfaces incident on the inside-corner simple or compound silhouette vertex. Process flow terminates at 2092.

If, in decision step 2090, it is determined that the DIFF_ANGLE is not greater than a predetermined value, then process flow proceeds to step 2094, where the continuous, conservative umbral event surface incident on the inside-corner simple or compound silhouette vertex is constructed by intersecting the planes of the adjacent SV-ME wedges. Process flow terminates at 2094.

FIG. 20C through FIG. 20J are diagrams of polygon meshes and a viewcell. These diagrams are used to illustrate and example of one embodiment of the process of 3D mesh traversal shown in flowchart FIG. 20A, and related figures.

FIG. 20C through FIG. 20J are diagrams showing two polygon meshes and a viewcell from two different perspectives. In the top figures of each drawing (FIG. 20C, FIG. 20E, FIG. 20G, FIG. 20I), the structures are viewed looking from the polygon meshes toward the viewcell. In the bottom figures (FIG. 20D, FIG. 20F, FIG. 20H, FIG. 20J), the perspective view is generally looking from the viewcell toward the polygon meshes.

Figure 20C:
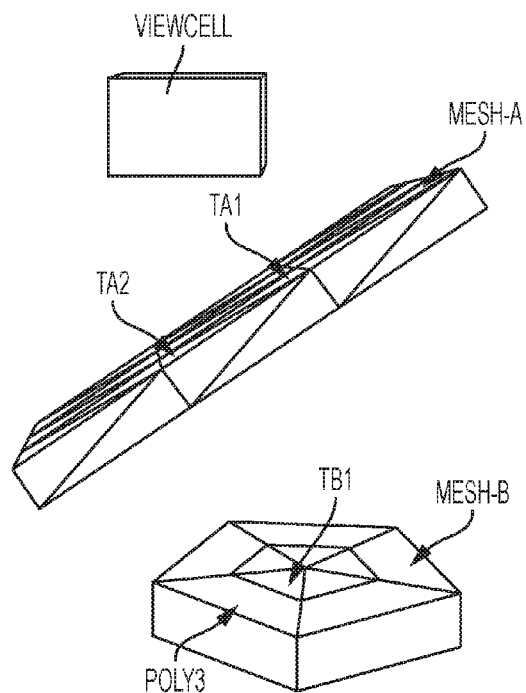
Figure 20D:
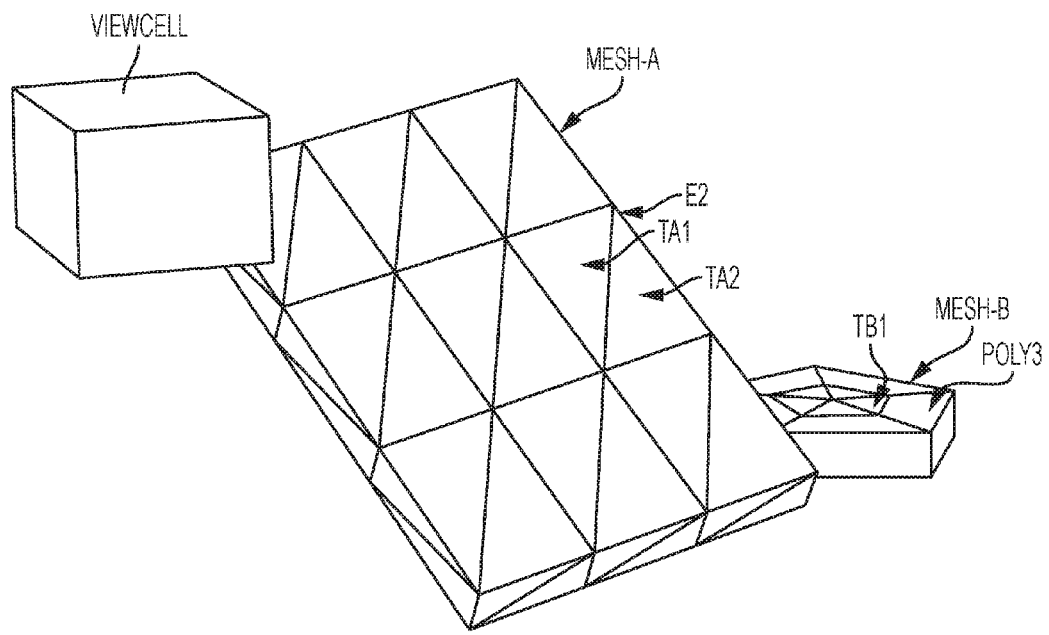

The process of FIG. 20A assumes selection of an initial triangle to start the 3D mesh traversal. FIG. 20C and FIG. 20D show an example in which the triangle labeled TB1 is selected as a starting triangle. TB1 is a mesh polygon of the polygon mesh labeled MESH-B. In this example, the embodiment employs breadth-first traversal, although other traversal orders are possible.

Figure 20E:
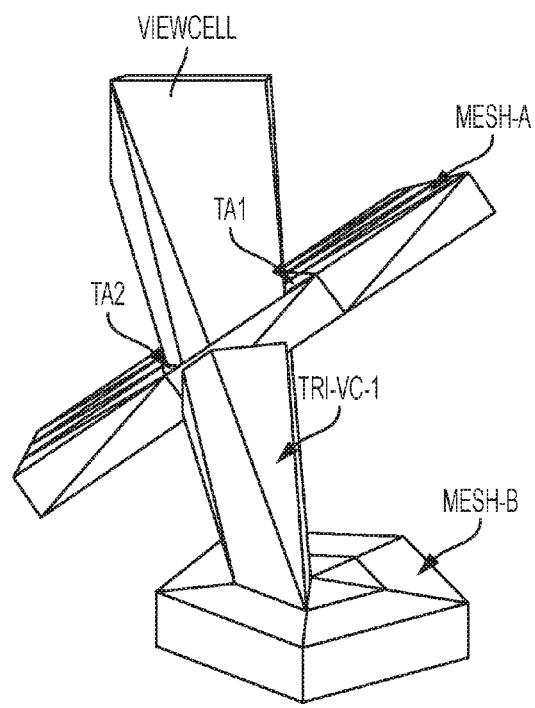
Figure 20F:
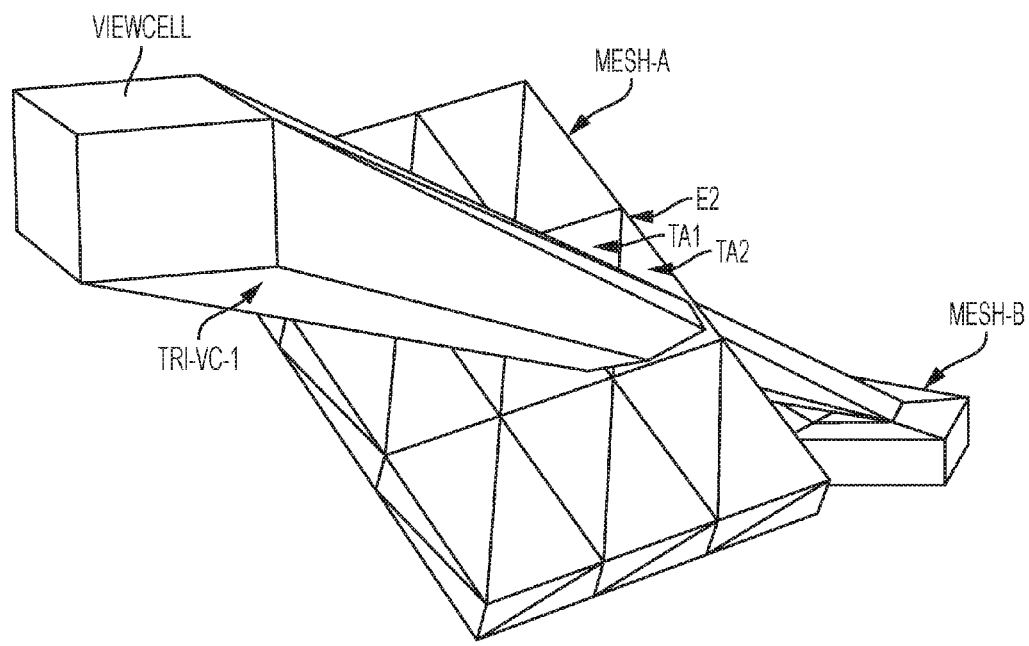

Decision step 2010 of FIG. 20A, determines if any untraversed triangles are within a 3D shaft formed by the current triangle and the viewcell. FIG. 20E and FIG. 20F show a 3D shaft formed between the triangle TB1 and the viewcell. This triangle-viewcell shaft is labeled TRI-VC-1 and shown in darker depiction. In this case, the triangle-viewcell shaft is formed by 8 triangles. In some embodiments, the shaft is the convex hull between the triangle and the viewcell. Prior-art methods of convex hull construction can be employed to construct the shaft between a triangle and a viewcell, or any other convex view region. (See O'Rourke, Computational Geometry in C Second edition Cambridge University Press 1998, the entire contents of which are incorporated herein by reference). In one embodiment, the pivot-and-sweep method described in conjunction with FIGS. 1-5 and related figures is adapted to construct this shaft by additionally constructing SE-MV supporting polygons also on outside corners of the mesh.

FIG. 20E and FIG. 20F show that shaft TRI-VC-1 intersects other mesh triangles including triangle TA1 belonging to MESH-A. In this example, process flow proceeds to step 2030 of FIG. 20A.

In this example, in step 2030 the traversal of MESH-B is suspended and the mesh traversal is reinitiated at triangle TA-1, which intersects the shaft TRI-VC-1.

Having reinitiated the breadth-first traversal at triangle TA1, process flow returns to step 2005, encounter of an untraversed triangle.

Process flow proceeds to decision step 2010 which, in this example, detects any unprocessed mesh triangles in a shaft formed between triangle TA1 and the viewcell. In this example, the shaft between triangle TA1 and the viewcell is empty, allowing process flow to proceed to decision step 2015.

Decision step 2015 determines, in this example, if triangle TA1 contains any from-viewcell occlusion boundaries. Since triangle TA1 does not contain from-view cell occlusion boundaries, process flow proceeds to step 2020 to determine if triangle TA1 has any first-order from-viewcell silhouette edges.

Since, in this example, triangle TA1 does not have any first-order silhouette edges, process flow proceeds to step 2025 to identify the next un-traversed triangle in the polygon mesh.

In this example, the breadth-first traversal proceeding from triangle TA1 in step 2025 encounters edge-connected triangle TA2. Step 2010, determined for triangle TA2 would indicate no mesh polygons in the triangle-viewcell shaft formed between TA2 and the viewcell shaft.

Step 2015, in this example, indicates no occlusion boundary edges incident on triangle TA2 allowing process flow to proceed to step 2020 where it is determined that triangle TA2 has a first-order silhouette edge, labeled E2.

Figure 20G:
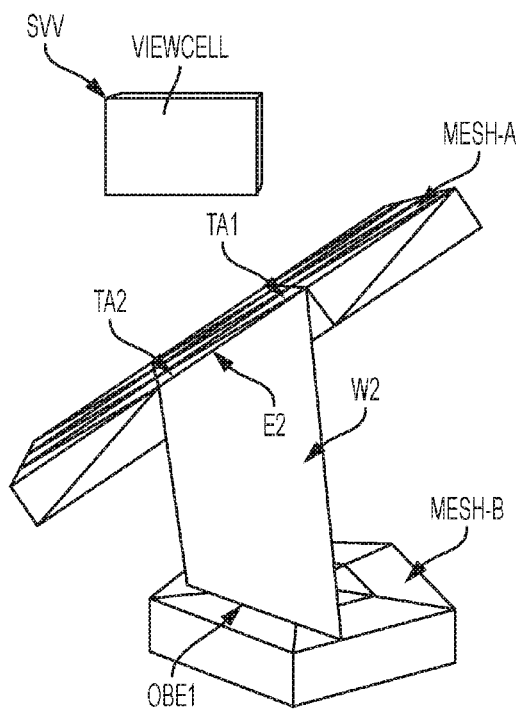
Figure 20H:
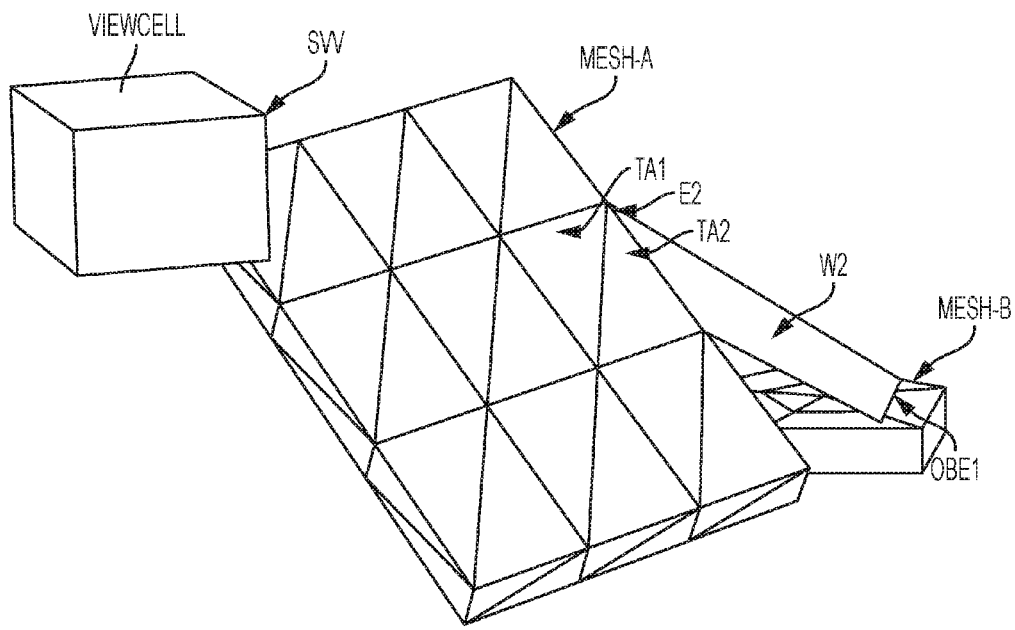
Figure 20I:
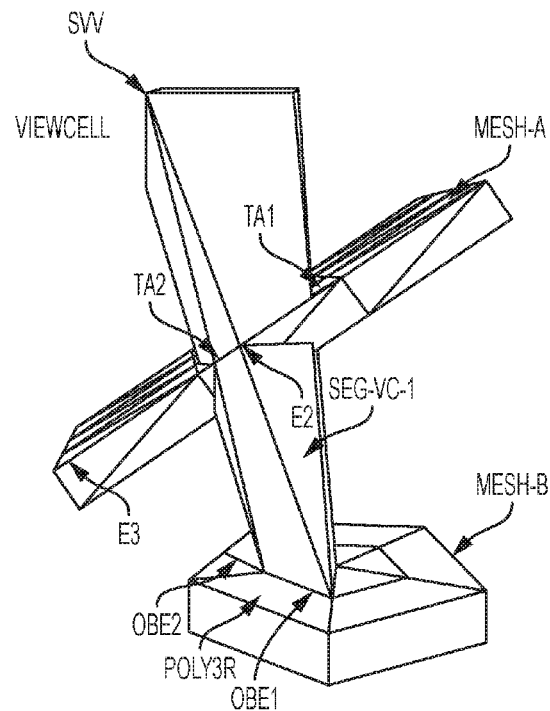
Figure 20J:
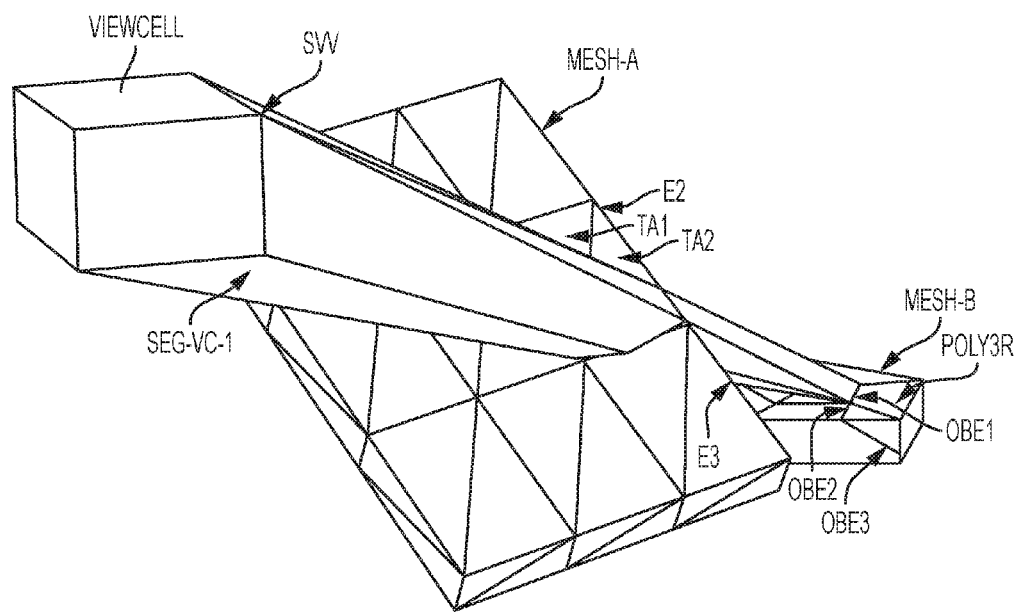
Figure 20K:
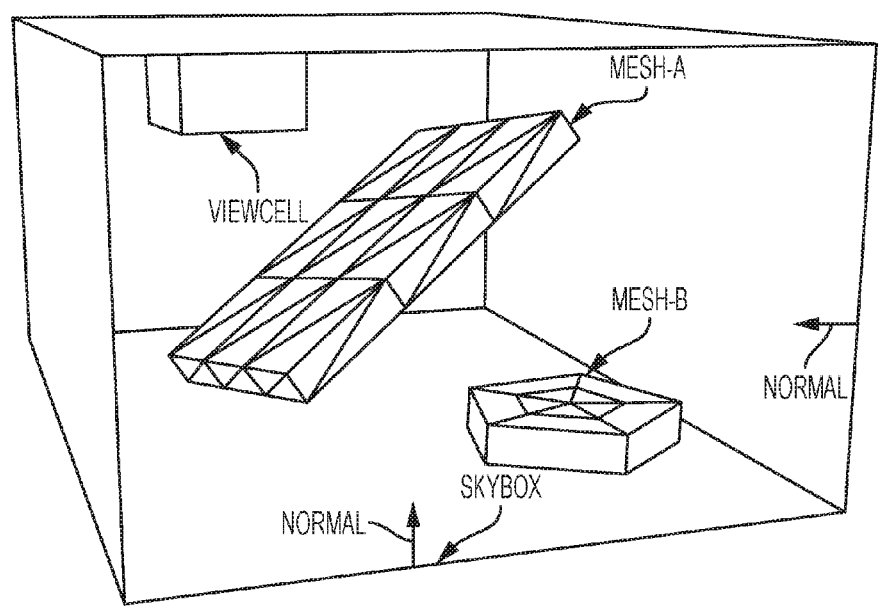

Process flow proceeds to step 2045 in FIG. 20A. In this example, execution of step 2045 results in the construction of a wedge on edge E2. The first-order, pivoted (SV-ME) wedge constructed in step 2045 on first-order silhouette edge E2 in this example is shown in FIG. 20G and FIG. 20H as labeled wedge W2. Wedge W2 is a pivoted (SV-ME) wedge which is constructed in step 2045 using the method for constructing pivoted wedges as described in FIG. 4 and related figures. The supporting viewcell vertex for the construction of W2 in this example is the viewcell vertex labeled SVV.

Process flow proceeds to step 2050 in FIG. 20A, in this example resulting in the processing of wedge W2 in step 2055. In step 2055, the on-wedge visible segments are determined. In one embodiment, this determination employs the 2D version of the mesh traversal method as described in FIG. 15 and related figures. In this example, the result of the on-wedge, from-point (from SVV, in this example) visible segment determination for wedge W2 is the discontinuity mesh segment (DM_SEG) labeled OBE1. OBE1 is, in this example, the only intersection of wedge W2 that is visible from SVV.

Having determined the DM_SEG, OBE1 in this example, process flow proceeds to step 2060 where it is determined, in this example, that the primary wedge W2 does not intersect any first-order silhouette edges. Consequently, in this example no compound silhouette vertex (CSV) is produced and no secondary wedges need to be constructed.

Process flow proceeds to decision step 2063 to determine, in this example, if DM_SEG OBE1 is otherwise visible from the viewcell. This test determines if the DM_SEG OBE1 is an actual from-viewcell occlusion boundary segment. In one embodiment this test employs the process of FIG. 21A and related figures which involves constructing a 3D shaft between the DM_SEG and determining if there are any un-traversed mesh polygons in this shaft as indicated in step 2110. In this example the 3D shaft between OBE1 and the viewcell is shown as labeled shaft SEG-VC-1. Following the process flow of flowcharts FIG. 24A, FIG. 24B, in one embodiment; in the example of OBE1 the process would identify no other wedges in shaft SEG-VC-1 which would potentially subdivide OBE1. Further, conducting the modified point-in-polyhedron test of FIG. 25 using a point on the DM_SEG OBE1, in this example; it would be determined that the DM_SEG OBE1 is actually a from-viewcell occlusion boundary segment and therefore would be added to polygon POLY3, in this example, repartitioning the original polygon POLY3 (a quadrangle in this case), shown in FIG. 20C and FIG. 20D into the polygon POLY3R.

Continuing processing by the embodiment of FIG. 20A, all of the visible triangles of MESH-A will be traversed, in this case the traversed set of mesh triangles of MESH-A corresponding to all mesh triangles that are front facing for at least one view cell vertex. Eventually the breadth-first traversal is interrupted at the first-silhouette contours of MESH-A, which include E2, which induces occlusion boundary OBE1 on MESH-B. First-order silhouette edge E3 (shown in FIGS. 20I and 20J) likewise, in this example induces occlusion boundary edges OBE2 (shown in FIG. 20J) and OBE3 (shown in FIG. 20I and FIG. 20J) on MESH-B.

These occlusion boundary edges comprise a continuous occlusion boundary that subsequently limits the traversal of MESH-B POLY3 (where it has been repartitioned at OBE1) as well as other polygons of MESH-B, at occlusion boundary edge OBE2 and occlusion boundary OBE3. After the retriangulation step 2083, mesh traversal continues on MESH-B only on the unoccluded side of this occlusion boundary, as indicated by step 2085.

FIG. 20K is a perspective diagram showing the same viewcell and polygon meshes MESH-A and MESH-B as in FIGS. 20C-20J. In addition FIG. 20K shows an enclosing polygon mesh labeled SKYBOX. The polygons of the enclosing mesh that are backfacing with respect to the viewpoint in this perspective diagram are not shown so that the viewer can see inside the enclosing mesh labeled SKYBOX. This enclosing mesh contains the viewcell and the other polygon meshes. The arrows labeled NORMAL indicate that, unlike other polygon meshes, an enclosing mesh has all mesh polygons oriented so that their normals are locally directed toward the inside of the mesh. Wedges that intersect no other polygon mesh will ultimately intersect the enclosing mesh. A wedge-enclosing mesh intersection is processed as any other wedge-mesh intersection according to the exemplary flowchart of FIG. 20A, with determination of whether the wedge-mesh intersection is a from view region occlusion boundary (step 2063), and ultimately mesh traversal occurring on the unoccluded side of an occlusion boundary (step 2085), the traversal occurring on the inside facing side of the enclosing mesh, here labeled SKYBOX.

Figure 21A:
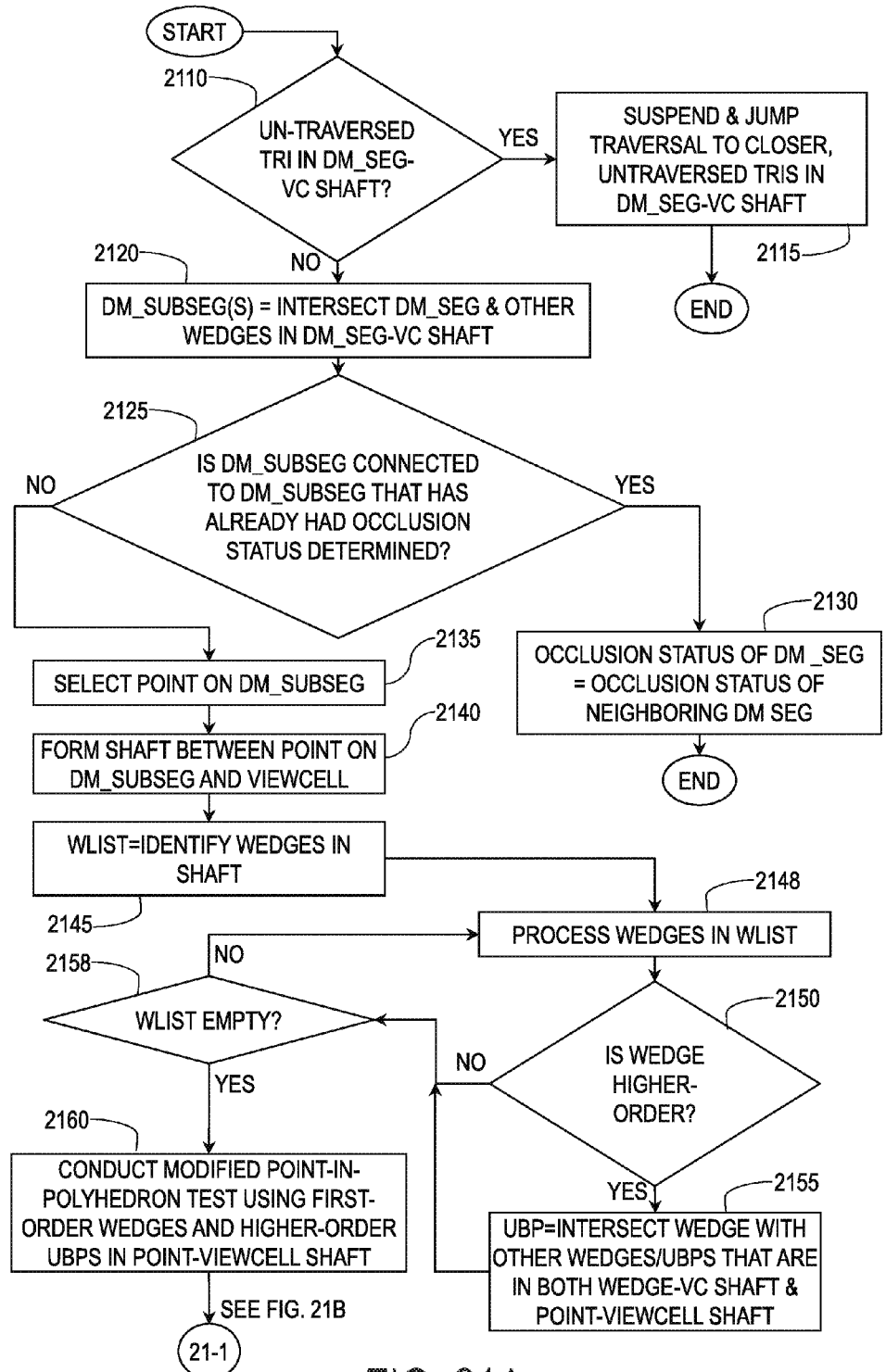
FIG. 21A is an exemplary flowchart of a method to determine if discontinuity mesh segment is otherwise occluded from the viewcell (i.e. is discontinuity mesh segment a from-region occlusion boundary).
Figure 21B:
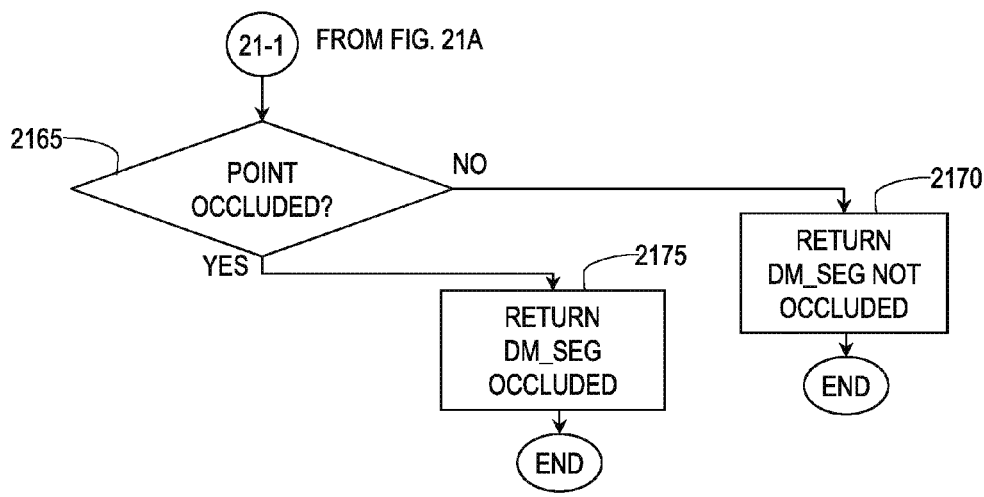
FIG. 21B is a continuation of FIG. 21A.

FIG. 21A, and FIG. 21B is a flowchart of a method to Determine if Discontinuity Mesh Segment is Otherwise Occluded From the Viewcell (i.e. Is Discontinuity Mesh Segment a From-Region Occlusion Boundary)

In the main 3D mesh traversal process shown in FIG. 20, step 2063 is a decision test to determine if a 2DDM_SEG is occluded from all other "parts" of the viewcell. FIG. 21 illustrates an embodiment of this test.

In some embodiments, a discontinuity mesh (DM) segment is a from-viewcell occlusion boundary if no part of the viewcell is visible from the DM segment except the supporting viewcell element used to construct the wedge corresponding to the DM segment. In the present method, the test can be organized as a backprojection-type visibility query using the DM segment as a lineal lightsource and determining the visibility of the viewcell.

This test is shown in FIG. 21.

According to some embodiments, the process illustrated in FIG. 21 starts at decision step 2110 in which a 3D shaft between the DM_SEG being tested and the viewcell is employed (DM_SEG-VIEWCELL shaft).

If, in decision step 2110, it is determined that there are untraversed triangles in the DM_SEG-VC shaft, then process flow proceeds to step 2115 to suspend the process and the main part of the 3D mesh traversal process is jumped to the closer untraversed triangles in the DM_SEG-VC shaft. This jump insures that all of the potentially occluding geometry that can influence the DM_SEGs status as a from-viewcell occlusion boundary is identified and processed prior to conducting the backprojection test which actually determines if the DM_SEG is a from-viewcell occlusion boundary (OB). Process flow terminates at step 2115.

If, in decision step 2110, it is determined that no untraversed triangles exist in the DM_SEG-VC shaft, then process flow proceeds to step 2120, where the DM_SEG is intersected with other wedges in the DM_SEG-VC shaft. This intersection may subdivide the original DM_SEG into a plurality of DM_SUBSEGS, each having a uniform from-viewcell visibility.

Process flow proceeds to decision step 2125 to determine if the current DM_SEG or DM_SUBSEG is directly connected to a DM_SEG or DM_SUBSEG for which the from-viewcell visibility status (otherwise occluded or otherwise unoccluded) has been determined.

If, in decision step 2125, it is determined that the current DM_SEG or DM_SUBSEG is directly connected to a DM_SEG or DM_SUBSEG for which the from-viewcell occlusion status has been definitively determined, then process flow proceeds to step 2130, where the occlusion status of the current DM_SEG or DM_SUBSEG is set to the same status of the DM_SEG or DM_SUBSEG having a known from-viewcell visibility status and to which the current DM_SEG or DM_SUBSEG it is directly connected and this status is returned to the calling function. Process flow terminates at step 2130.

If, in decision step 2125, it is determined that the current DM_SEG or DM_SUBSEG is not directly connected to a DM_SEG or DM_SUBSEG having a known from-viewcell visibility status, then process flow proceeds to step 2135 to select a point on the DM_SUBSEG.

Process flow proceeds to step 2140 a shaft is formed between the point selected in step 2135 and the viewcell and processing proceeds to step 2145, where all wedges in the DM_SEG-VC shaft are identified and placed in a list WLIST for later processing. These are the wedges generated in the steps 2045 and 2060 of FIG. 20, the main 3D mesh traversal process which generates frontprojection, first-order wedges.

Process flow proceeds to step 2148, where each wedge in the WLIST is processed by subsequent steps.

Process flow proceeds to step 2150, where for each wedge in the WLIST, it is determined if the wedge is a first-order-wedge or a higher-order wedge. The main 3D mesh traversal process of FIG. 20 generates first-order wedges using the pivot and sweep construction of wedges at steps 2045 and 2060. Higher-order wedges can optionally be constructed using the backprojection process detailed in a later part of this specification in conjunction with FIG. 22, FIG. 23, and FIG. 24. According to some embodiments, the order of a wedge is determined according to the process used to construct the wedge. For example, a wedge constructed using the backprojection process is a higher order wedge, and a wedge that is not constructed using the backprojection process is a first order wedge. If, in decision step 2150 it is determined that the wedge is a higher-order wedge, then process flow proceeds to step 2155.

If, on the other hand, in decision step 2150 it is determined that the wedge is a not a higher-order wedge then process flow proceeds directly to step 2158.

In step 2155, the actual from-viewcell umbral boundary polygon (UBP) corresponding to the higher-order wedge is constructed by intersecting the higher-order wedge with all other wedges and UBPS that are in both the wedge-viewcell (WEDGE-VC) shaft and the point-viewcell shaft. This process effectively constructs, for a higher-order wedge identified in step 2150, that portion of the corresponding UBP that is inside the point-viewcell shaft. A UBP can be constructed, in some embodiments, from the corresponding wedge by intersecting it with all other wedges/UBPs in the shaft formed between the wedge and the viewcell. After step 2155, process flow proceeds to step decision step 2158 to determine if the WLIST is empty. If the WLIST is empty, then process flow returns to step 2148 where the next wedge in the WLIST is subjected to subsequent processing.

If, in decision step 2150, it is determined that the wedge is a first-order wedge, then process flow proceeds directly to step decision step 2158, described above.

If, in decision step 2158, it is determined that the WLIST is empty, then process flow proceeds to step 2160, where the DM_SUBSEG point selected in step 2135 is subjected to a modified point-in-polyhedron test to determine if it is otherwise occluded from the viewcell.

Figure 25:
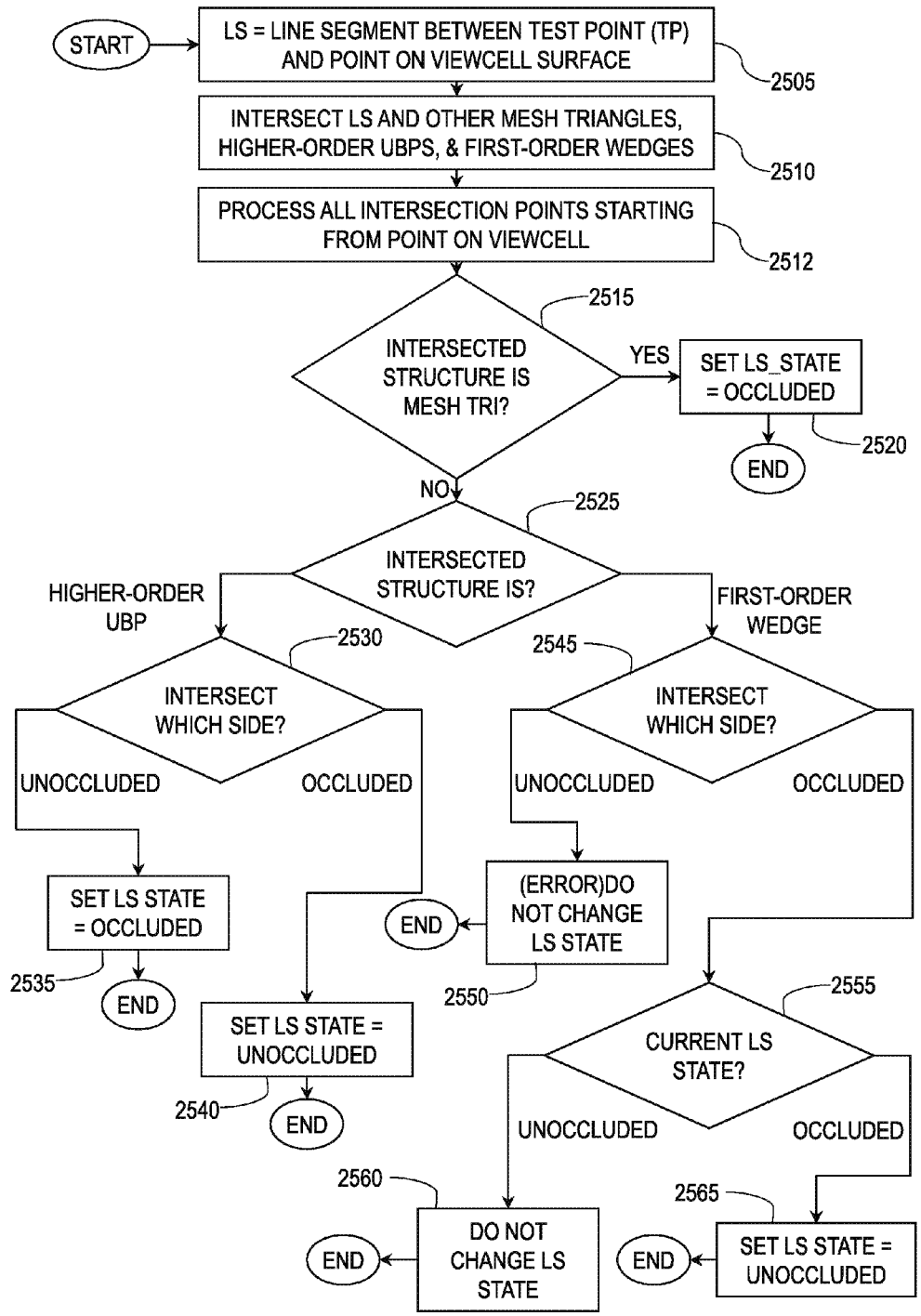
FIG. 25 is an exemplary flowchart showing a method of point-occlusion test using first-order wedges and higher-order wedges.

An embodiment of this modified point-in-polyhedron test is shown in FIG. 25 and discussed in detail in conjunction with that figure. Briefly, this modified point-in-polyhedron test determines if the test-point is inside the from-viewcell PAU. The test is somewhat similar to conventional point-in-polyhedron tests in that a second point known to be outside the PAU is selected, in this case a point on the viewcell surface. A line segment is constructed between the test-point and the outside-point and the line is intersected with the polyhedron's polygons. The status (inside or outside of the polyhedron) of subsegments of the line will change based on intersections with mesh polygon fragments and UBPS that comprise the PAU. The test is simplified somewhat in the case of first-order wedges, which do not have to be intersected with other wedges to form the corresponding UBPS (since they cannot be intersected by other wedges on their unoccluded side). Moreover since only those PAU surfaces inside the test-point-viewcell shaft can be intersected by the test line segment, the entire PAU need not be constructed to complete the test.

Following step 2160, process flow proceeds to process 21-1, which starts at step 2165 (FIG. 21B.)

In decision step 2165, the result of the modified point-in-polyhedron test (step 2160) is examined.

If, in decision step 2165, it is determined that the testpoint is occluded, then process flow proceeds to step 2175, where the overall process returns the result that the tested DM_SEG is occluded. The result is returned to step 2063 in FIG. 20.

If, in decision step 2165, it is determined that the testpoint is not occluded, then process flow proceeds to step 2170, where the overall process returns the result that the tested DM_SEG is not occluded. The result is returned to step 2063 in FIG. 20. Process flow terminates at steps 2170 and 2175.

The method of FIG. 19, FIG. 20, and FIG. 21 constructs a conservative, first-order, from-viewcell visibility map. The method employs conservative linearized umbral event surfaces (CLUES) incident on first-order silhouette edges and determines if the corresponding discontinuity mesh segments are actually from-viewcell occlusion boundaries (segments of the PAU).

In this method, according to some embodiments, the connected structure of the umbral DM boundaries is used to significantly accelerate the determination of whether a DM boundary is a from-viewcell occlusion boundary (an edge of the corresponding VM). The visibility status (from-viewcell occluded or not) of a structure (for example a DM polyline) can only change when the structure intersects a visibility event surface. For a DM polyline this occurs only where the DM polyline intersects another DM polyline. Between such intersections the visibility status of a DM polyline is unchanged. Consequently, to determine the visibility status of multiple segments of a DM polyline between intersection points the status of only one segment needs to be determined. For adjacent segments of the DM polyline between intersection points, only the potentially occluding/exposing event surfaces are generated. This is insured by forming the shaft between each DM polyline segment and the viewcell to determine if any unprocessed potentially occluding geometry exists in the shaft. As with all shaft tests in the present embodiments, a simple hierarchical spatial organization of the geometric database can insure O(n Log n) performance Overall, the output sensitive construction of conservative linearized umbral visibility map employs a method which uses traversal of the polygon mesh 2-manifolds (embedded in 3D) to the catastrophic silhouette contours and occlusion boundaries of the manifolds. The traversal effectively cascades off the silhouette contours, flowing onto other manifolds intersected by the visibility event surfaces (wedges/ UBPS) in a manner that realizes an output-sensitive visibility cascade.

Figure 21C:
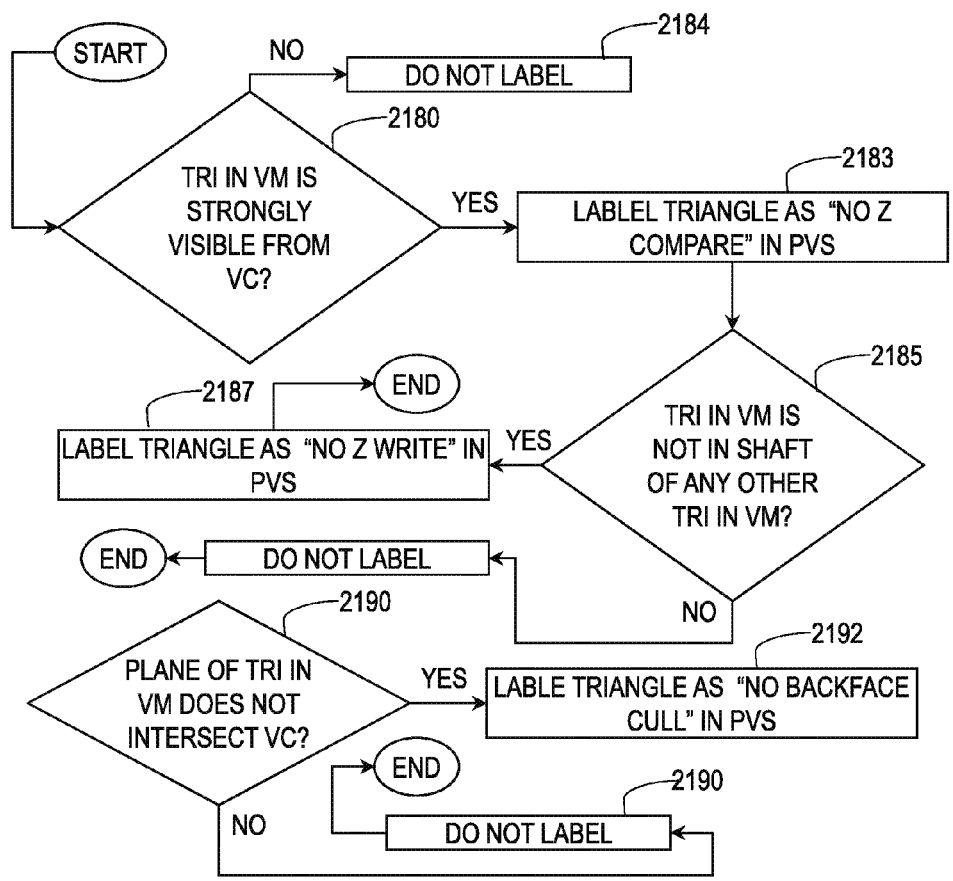
FIG. 21C is an exemplary flowchart showing a method of classifying pvs polygons as strongly visible, non-occluding, and always-frontfacing.

FIG. 21C Method of Classifying PVS Polygons as Strongly Visible, Non-Occluding, or Always-Frontfacing.

Figure 26:
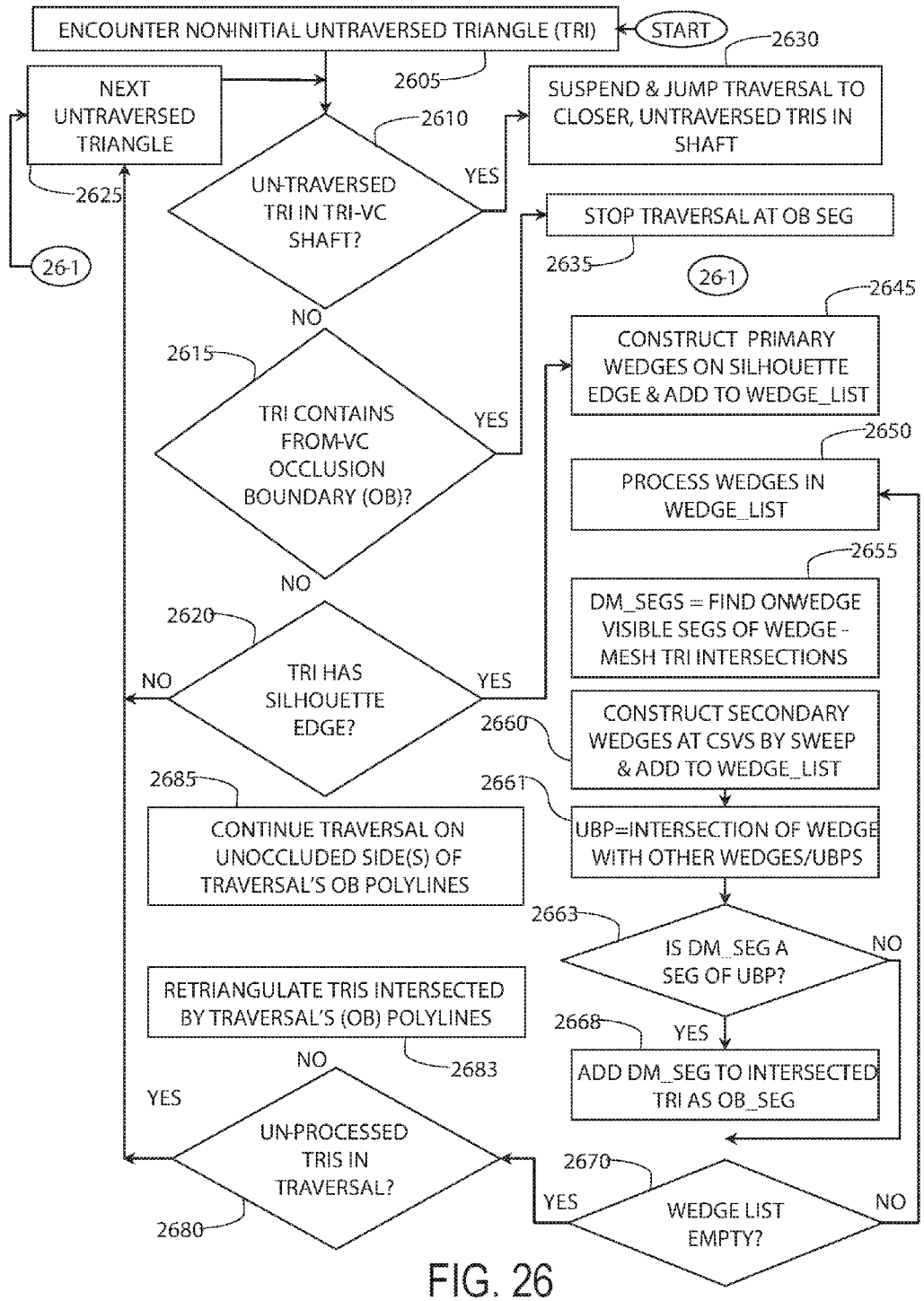
FIG. 26 is an exemplary flowchart showing and alternate embodiment method of constructing polyhedral aggregate umbrae (PAU) from umbral boundary polygons (UBPs) using 3D mesh traversal.

According to some embodiments, the PVS is comprised of the visible polygon fragments of the conservative visibility map generated by the 3D traversal method of FIG. 20 and related figures or by the alternate embodiment method of FIG. 26 using UBPS. Alternatively, the PVS is derived from the umbral discontinuity mesh method of FIG. 12.

Regardless of which of the embodiments is employed, the PVS polygon fragments generated using the object-space from-viewcell visibility of the present method is conveniently classified based on their visibility relationship with the viewcell.

In some embodiments, the process illustrated in FIG. 21C starts at decision step 2180 to determine if the polygon of the visibility map is strongly visible from the viewcell. In some embodiments, a polygon that is strongly visible from the viewcell is defined as a polygon for which the 3D shaft between the polygon and the viewcell contains no other polygons. In some embodiments, this determination is made during the visibility map construction process (FIG. 20) for each polygon fragment. Consequently, a strongly visible can be identified (Step 2180) and labeled during VM construction as "no z compare." if identified as shown in step 2183. If the triangle is not strongly visible then process flow proceeds to step 2184, in which the triangle is not labeled.

Any polygon so labeled can be later rendered without computing a z compare operation in the z buffer for the polygon; since it cannot be occluded from any other polygon as long as the viewpoint is in the viewcell for which the VM/PVS was constructed.

In a subsequent decision/classification step 2185, it is determined if the polygon in the VM is in the polygon-viewcell shaft of any other polygon in the VM. If the current polygon is not in the polygon-viewcell shaft of any other polygon in the VM then processing proceeds to step 2187 in which the polygon is labeled as "no z write". Otherwise, process flow proceeds to step 2186, in which the triangle is not labeled.

A polygon that is not in the polygon-viewcell shaft of any other polygon in the VM cannot occlude any polygon in the VM/PVS and therefore can be rendered without either a z compare or a z write, which can significantly reduce the cost of rendering the polygon.

Finally each polygon in the VM/PVS can be classified by the decision/classification step 2190 in which it is determined if the plane of the polygon intersects the viewcell. If, in decision step 2190, it is determined that the plane of the polygon does not intersect the viewcell, then processing proceeds to step 2190 in which the VM/PVS polygon is labeled as "no backface cull".

Such polygons cannot be backfacing from any viewpoint in the viewcell from which the VM/PVS was constructed. Consequently a backface cull is not required during the rendering of polygons in the PVS with this label, thereby reducing the cost of rendering the polygon. If the test of step 2190 determines that the plane of the triangle intersects the viewcell then process flow proceeds to step 2190, and the triangle is not labeled.

FIG. 22 Is a Flowchart Showing the Controlling Process for a Method of 3D Mesh Traversal to Construct a Backprojection, From-Silhouette Edge Visibility Map for Determining the From-Silhouette-Edge Visible Supporting Viewcell Vertex (VSVV) and Visible Supporting Viewcell Silhouette Contour (VSVSC).

The previously described method of FIG. 19, FIG. 20, and FIG. 21 employs only first-order, conservative, linearized umbral event surfaces (CLUES) incident on first-order, from-viewcell silhouette edges.

In the method of FIG. 22, FIG. 23, and FIG. 24, the first-order CLUES are "adjusted" to more accurately reflect higher-order, from-viewcell visibility interactions.

In some embodiments, the present method employs a focused, conservative backprojection approach in order to identify a conservative (from-silhouette edge) visible supporting viewcell vertex (VSVV) on which to construct the higher-order wedge. In some embodiments, this "adjustment" of the wedge is applied only in the case that the supporting viewcell vertex (SVV), used in construction of the original frontprojection first-order wedge, is occluded from the supported silhouette edge. Otherwise the first-order event surface (the wedge) is exact.

In general, this adjustment is applied only to those portions of first order wedges that are not exact. The portions of a first-order SV-ME wedge that are not exact correspond to those portions of the for which the supported silhouette edge is occluded from supporting viewcell vertex (SVV). These portions are easily determined by examining the supporting triangle formed between the wedge's silhouette edge and the SVV.

Similarly, the portion of a first order SE-MV wedge that are not exact correspond to those portions of the wedge for which the supporting viewcell silhouette contour (SVSC) is occluded from the supported mesh silhouette vertex. This portion is also determined by examining the supporting swept triangle between the wedge's mesh silhouette vertex and the SVSC segment.

In general, in the present method of FIG. 22, FIG. 23, and FIG. 24, adjustment to a first-order SV-ME wedge is determined by a backprojection method in which the wedge's supported silhouette edge is used as a light source and the from-region, 3D mesh traversal, visibility cascade method is applied to construct a conservative from-edge visibility map on the surface of the viewcell. This visibility map may contain a (from-edge) visible supporting viewcell vertex (VSVV) which is used, instead of the SVV, to support the corresponding higher-order wedge. Each from-edge backprojection visibility map on the surface of the viewcell will have a corresponding visible supporting viewcell silhouette contour (VSVSC).

Likewise, in first-order visibility, adjacent SV-ME wedges may be joined by SE-MV wedges which are formed by extending swept supporting triangles supported by the viewcell's supporting viewcell contour (SVC). To "adjust" first-order SE-MV wedges incident on a mesh silhouette vertex, the visible supporting viewcell silhouette contours (VSVSC) are also determined by the backprojection: constructing a from-silhouette-edge, on-viewcell visibility map. This backprojection uses the silhouette edges sharing the mesh silhouette vertex as the lightsource. As detailed in a later part of this specification, the construction of the higher-order SE-MV wedges connecting two adjacent higher-order or "adjusted" SV-ME wedges depends on the relationship of the two VSVCSs corresponding to the SV-ME wedges, as determined in the backprojection process.

Therefore, the purpose of the from-edge backprojection method of FIG. 22, FIG. 23, and FIG. 24 is to construct from-silhouette-edge, on-viewcell visibility maps from which the corresponding higher-order wedges are derived. In some embodiments, this conservative visibility map is constructed using the a variation of the 3D mesh traversal method of the visibility cascade already discussed in conjunction with FIG. 19, FIG. 20, and FIG. 21. Whereas the method of FIG. 19, FIG. 20, and FIG. 21 uses the viewcell as the visibility source, the method of FIG. 22, FIG. 23, and FIG. 24 solves the visibility problem using a specific first-order silhouette edge (or segments of the edge) as a "source" or view region. Since both of these are from-region visibility problems there is significant similarity between the corresponding processes (and the corresponding figures).

An important difference between the from-viewcell frontprojection visibility solution and the from-edge backprojection visibility solution is that while the frontprojection method must solve all from-viewcell visibility; the backprojection method determines only the from-silhouette-edge visibility that potentially affects the visibility of the viewcell from the edge. Thus, the from-silhouette-edge backprojection problem is confined to the shaft formed between the silhouette edge and the viewcell.

3D Mesh Traversal for Backprojection: Method of Employing Only Frontprojection-Unoccluded Triangles In one implementation of the method only those triangles/segments that are visible in the frontprojection (from the viewcell) are used in the backprojection. In this method the triangles visible in the frontprojection have their face orientation reversed for the backprojection calculation. Commonly, the frontprojection silhouette edge and the backprojection silhouette edge (when viewed from the mesh silhouette edge that is the "source" point for the backprojection) are the same edge. In this case there are, in fact, no frontprojection-unoccluded triangles facing the backprojection source edge (the first-order silhouette edge) before an orientation reversal is applied.

In other cases not all of the frontprojection visible mesh elements will be back facing with respect to the reprojection source edge. In these cases, if the triangle's orientation was reversed it would become back facing from the backprojection source edge. This will cause it to be backfacing with respect to the source and therefore create a mesh with triangles having an inconsistent orientation. In this case the triangles that would develop a backfacing orientation with respect to the backprojection point are removed from the mesh.

The failure to include some potentially occluding geometry in the backprojection may reduce the precision of the computed VSVV and the related adjustment of the wedge. However a conservative result is still insured, since the elimination of any potentially occluding geometry will only make the computed VSVV a more conservative estimate of the SVV. Moreover, by employing only frontprojection-visible triangles the cost of the backprojection process is significantly reduced, since the relevant front-projection visible triangle have already been determined by the time the backprojection process is initiated for a specific mesh silhouette edge.

In this approach the frontprojection visible mesh elements are effectively used as virtual occluders to compute the backprojection.

Hence, in step 2205, the selection of a seed 3D mesh, the selection is made from the set of meshes that are visible (unoccluded) in the frontprojection.

3D Mesh Traversal for Backprojection: Retraction of the Silhouette Edge Under Higher-Order Visibility In one implementation of the present method, the backprojection is determined only from those backprojection sources (mesh silhouette edges in this case) that are first-order silhouette vertices in the frontprojection (when viewed from the viewcell). In this implementation only those wedges attached to first-order, frontprojection silhouette vertices are "adjusted" by backprojection to reflect higher-order on-plane visibility. The adjusted wedges remain attached to the original mesh silhouette edge.

Actually when any edge that is a first-order, frontprojection silhouette edge (when viewed from SVV) is viewed from the VSVV it may no longer be a silhouette edge since both triangles sharing the edge may be backfacing with respect the VSVV. In such a case, the frontprojection silhouette edge (backprojection source) is actually occluded from the viewcell. In such a case the actual (exact) from-region umbral event surface is not supported by this frontprojection silhouette edge but by an edge on the same 2-manifold that is closer to the viewcell. This migration or "retraction" of the first-order from-viewcell silhouette edge toward the viewcell is a potential effect of higher-order visibility as determined by backprojection. The failure to account for this migration of the silhouette may in some cases reduce the precision of the computed VSVV and the corresponding adjustment of the wedge. However, a conservative result is still insured since an adjusted visibility event surface (wedge in this case) attached to a frontprojection first-order silhouette edge will always produce a more conservative umbral event surface than the corresponding event surface attached to the corresponding retracted silhouette.

By keeping an adjusted wedge attached to its original first-order frontprojection silhouette edge, the "supporting segment" of the adjusted wedge between the silhouette edge and the VSVV can potentially violate the "local visibility" of the mesh on which it resides by penetrating the mesh surface. It is precisely in such a case that the silhouette edge would tend to migrate toward the viewcell such that one of the closer connected edges of the mesh produce an adjusted wedge that does not violate local visibility, and as such becomes the "exact" silhouette edge.

In order to keep the conservative adjusted wedge attached to its original first-order, frontprojection silhouette edge the backprojection process is designed to prevent violations of local visibility by an adjusted wedge. This occurs when the adjusted wedge originates on the frontprojection first-order silhouette edge in such a way that the wedge is on the inside of the mesh triangle 2-manifold. This is a type of self-occlusion of the 2-manifold that can be prevented by detecting all mesh elements (triangles in this case) that form a connected component with the frontprojection silhouette edge, wherein the connected component is entirely inside the shaft between the viewcell and the edge. In some embodiments, this can be performed using a simple traversal of the triangle mesh, starting at the edge and ending when a triangle intersects the shaft boundary. These mesh elements are the ones that can produce the type of self occlusion that causes retraction of the silhouette edge. By identifying and eliminating these elements from the backprojection determination, the backprojection will produce a conservative "adjusted" wedge that remains attached to the original frontprojection silhouette edge but which accounts for higher-order visibility effects that cause the SVV to be occluded from the silhouette edge.

Thus, in step 2205 of FIG. 22, the selection of the seed 3D mesh elements for backprojection, those mesh elements that could potentially cause self-occlusion of the backprojection-source silhouette edge are excluded from consideration.

This approach also simplifies the implementation in the case of on-wedge visibility by 2D mesh traversal, as discussed in conjunction with FIG. 17. Even greater simplification is achieved when this method is employed in present case of from-viewcell visibility by 3D mesh traversal. By employing this method in the 3D mesh traversal case, the event surfaces (wedge polygons) remained attached to the original first-order frontprojection silhouette contours such that the construction of a continuous, conservative from-region umbral boundary surface is in insured.

Once again, alternate implementations are possible in which retraction of the silhouette edge is allowed by accounting for self occlusion. For example, one approach to finding the "retracted" silhouette edge is to compute the backprojection from the initial frontprojection, first-order silhouette edge and determine if the wedge corresponding to the computed VSVV violates local visibility. If local visibility is violated, then the candidate silhouette edge is not actually visible from the viewcell when higher-order effects are taken into account and the adjacent edge closer to the viewcell is then used as source for the backprojection to determine if the wedge (corresponding to the new candidate edges's VSVV) violates local visibility. The process can be repeated until a wedge that does not violate local visibility is encountered. This wedge is used as the adjusted, higher-order wedge.

In general, the amount of additional from-region occlusion that results only from the retraction of the silhouette edge is usually small whereas the increased complexity of the backprojection process can be significant. Keeping the frontprojection wedge fixed to the original frontprojection, first-order silhouette edge and computing an "adjusted" wedge incident on the same silhouette edge (corresponding to the VSVV) by backprojection is an approach which accounts for most of the higher-order visibility effect with little increased cost.

As previously emphasized, the higher-order backprojection adjustment is only applied when the original SVV is occluded from the first-order silhouette edge or segments thereof. In further embodiments, metrics are employed to determine the maximum possible deviation between the a first-order wedge and the corresponding adjusted higher-order wedge. For example, the angle formed by the first-order wedge (contained on a supporting plane) and the corresponding separating plane between the silhouette edge and the viewcell is the maximum possible angular deviation between the first-order wedge and the higher-order wedge; since using the present method the higher-order wedge can in the limit only lie on the separating plane (if the VSVV is the separating point). This angle naturally tends to decrease with increasing distance from the viewcell (the view region appears more "point like" from the backprojection source). Consequently, the higher-order visibility effect determined by the backprojection method become less important at greater distances from the view region. The angle metric can be used to determine if higher-order effects should be computed for any given frontprojection, first-order silhouette edge.

Returning now to FIG. 22, the controlling process that calls the main part of the backprojection 3D traversal (step 2215), is discussed. In addition to being similar to the method of controlling from-viewcell 3D mesh traversal (FIG. 19); the method shown in FIG. 22 also is very similar to the previously described method of controlling a from-vertex (2D mesh traversal) backprojection shown in FIG. 14.

The flowchart shown in FIG. 22 shows the process of initiating, reinitiating, and halting the main from-silhouette-edge backprojection 3D traversal process which is shown in detail in FIG. 23, and which is described in detail in a subsequent part of this specification.

In some embodiments, the process illustrated in FIG. 22 starts at 2205, where the selection of a "seed" triangle to initiate the, from-silhouette-edge, 3D mesh traversal process for a single silhouette edge source is shown as step 2205. As in the frontprojection process, the selection of an initial seed triangle that is likely to be an exposed occlude accelerates the process.

In step 2205 only those triangle meshes that are in the shaft between the silhouette edge and the viewcell (SILE-VC shaft) are candidates for seed mesh.

Process flow proceeds to step 2210, to identify the containment segments of the 3D seed mesh by the intersection of the edge-viewcell shaft's boundary polygons and triangles of the seed mesh.

Once a seed 3D mesh and containment segments on the seed mesh are identified, then process flow proceeds to step 2215 to call the main process of the backprojection 3D mesh traversal. An embodiment of the main 3D mesh traversal process for the backprojection is shown in FIG. 23.

Process flow proceeds to decision step 2220 to determine if there are any existing triangles on which the main part of the 3D mesh traversal has been suspended. If there are no existing suspended 3D mesh triangles, then process flow proceeds to step 2225 in which the 3D mesh traversal is terminated, thereby completing the construction of the 3D on-viewcell visibility map.

If, in decision step 2220, it is determined that there exist triangles of the 3D mesh for which the main 3D mesh traversal has been suspended (in step 2330 of FIG. 23), then process flow proceeds to decision step 2230 to determine if any triangles exist in the shaft formed by the suspended triangle (TRI) and the source silhouette edge (SILE).

If, in decision step 2230, it is determined that there are no triangles in the shaft between the current triangle and the source silhouette edge (SILE), then process flow proceeds to step 2255 to construct containment segments on the 3D triangle mesh formed by the triangles connected to the current suspended triangle.

Process flow proceeds to step 2260 to reinitiate the 3D mesh traversal on the previously suspended triangle.

If, in decision step 2230, it is determined that there are triangles in the shaft between the current triangle and the source silhouette edge, then process flow proceeds to step 2235 to determine if any triangles in the TRI-SILE shaft are untraversed.

If, in decision step 2235, it is determined that untraversed triangles exist in the TRI-SILE shaft, then process flow proceeds to step 2240, where the 3D mesh traversal is "jumped" or restarted on the closer untraversed triangles in the TRI-SILE shaft. This step (which also occurs in step 2330 of the backprojection main 3D traversal process shown in FIG. 23) insures that all potentially occluding triangles have been processed before the traversal is continued and before a decision to stop the traversal (because the suspended triangle is completely occluded from the source edge) is made.

If, in decision step 2235, it is determined that no untraversed triangles exist in the TRI-SILE shaft, then process flow proceeds to step 2245 to determine if a point on the current (suspended) triangle is inside any polyhedral aggregate umbrae (PAU), which represents one or more polyhedral volumes of space that are occluded from the source silhouette edge. In some embodiments, this test can employ the modified point-in-polyhedron test shown in FIG. 25. This modified point in polyhedron test uses first-order event surfaces (first-order wedges); and, optionally, higher-order umbral boundary polygons (UBPs). This test allows an implicit solution to the point-in-polyhedron without necessarily constructing the entire polyhedron/polygon.

If, in decision step 2245, it is determined that a point on the suspended triangle is inside a PAU, then process flow proceeds to step 2250 to reinitiate the traversal on the suspended triangle, and the suspended triangle is no longer labeled as suspended.

If, in decision step 2245, it is determined that the suspended triangle is not inside any PAU, then process flow proceeds to step 2255, where the containment segments of the associated 3D mesh are constructed and the traversal reinitiated as previously described.

As illustrated in FIG. 22, process flow terminates at steps 2225, 2240, 2250, and 2260.

FIG. 23 Flowchart Showing the Main Process for a Method of 3D Mesh Traversal to Construct a Backprojection, From-Silhouette Edge Visibility Map for Determining the From-Silhouette-Edge Visible Supporting Viewcell Vertex (VSVV) and Visible Supporting Viewcell Silhouette Contour (VSVSC).

The main process of the from-silhouette-edge, backprojection, 3D mesh traversal visibility cascade method is somewhat similar to the from-viewcell 3D mesh traversal process (FIG. 20).

Turning now to FIG. 23, in some embodiments, the main backprojection 3D mesh traversal process begins with a breadth-first, or flood-fill traversal of a manifold triangle or other polygon mesh as shown in the initial step 2305. The initial triangle to seed the entire process is selected in the controlling process shown in the flowchart of FIG. 22.

The from-silhouette edge backprojection process may be applied to entire first-order silhouette edges. Also, each first-order silhouette edge (SILE) may be subdivided and the backprojection calculated for each subsegment. This approach is employed in the adaptive refinement of individual silhouette edges in which a single conservative wedge is refined to produce a conservative linearized visibility event surface, which converges on the exact visibility event surface (typically a quadric surface) that is incident on the silhouette edge. In FIG. 22, FIG. 23 and FIG. 24 the silhouette edge (SILE) can refer to a single first-order silhouette edge or subsegments thereof.

As previously described, in one embodiment the mesh is a manifold triangle mesh in which each edge is shared by exactly two triangles. Other definitions of a mesh are also possible, including meshes which are not closed. The intersection of mesh triangles with wedges or UBPs may produce more complex mesh polygons. These more complex polygons can be converted to triangles using established methods of polygon triangulation. The triangle mesh is represented as a directed graph. The method accommodates mesh polygons other than triangles, however the use of triangles simplifies the traversal method. The method of FIG. 23 employs a manifold triangle mesh in which each edge is shared by exactly 2 triangles.

Step 2305 indicates traversal to a triangle of the mesh. Traversal can proceed in a breadth-first or flood-fill graph traversal order. Using breadth-first traversal of the triangle mesh, traversal spreads from the initiating triangle outward forming layers of traversed triangles. Triangles connected by non-silhouette edges are said to belong to the same "traversal."

Other traversal orders are possible. The triangle selected to initiate the traversal of one or more polygon meshes does not affect the output of the traversal. However, by selecting an initial triangle that is completely visible and close to the viewcell the process tends to perform better. In keeping with the processes of a directed graph traversal, step 2305 indicates that traversal is limited to untraversed triangles in the mesh.

Process flow proceeds from step 2305 to decision step 2310 to determine if any untraversed triangles are within a 3D shaft formed by the current triangle and the source silhouette edge (this shaft is called a TRI-SILE shaft). If there is one or more untraversed triangle in this shaft, then process flow continues to step 2330 in which traversal is immediately jumped to the closer untraversed triangle. In one embodiment, mesh polygons are organized using hierarchical spatial subdivision structures. This allows the shaft test of step 2310 to rapidly identify large groups of previously traversed mesh polygons.

Step 2330 effectively enforces a strict front-to-back processing of mesh elements for a single mesh or for multiple mesh objects. The process of jumping the traversal to a closer potentially occluding triangle can result in endless cycles caused by cyclic overlap of triangles. Such cycles are also encountered in Weiler-Atherton visibility algorithm and can be detected and eliminated by maintaining a directed graph representation of the overlap relationships. An embodiment of this method is presented in FIG. 13 and discussed in detail in connection with that figure.

Step 2330 insures that the event surfaces originating on closer untraversed triangles in the triangle×silhouette-edge (TRI-SILE) shaft of the current triangle are identified and constructed prior to a traversal of the current triangle. These event surfaces may be from-viewcell occlusion boundaries (determined for these closer silhouette edges in steps 2345-2368) which would actually restrict traversal of the current triangle (steps 2335). By forcing a jump to the closer untraversed triangles/silhouette edges, step 2310 insures that any from-silhouette edge occlusion boundaries that could restrict traversal of the current triangle are constructed prior to traversal of the current triangle. Process flow terminates at step 2330.

If there are no untraversed triangles in the TRI-SILE shaft, then process flow proceeds to decision step 2315 to determine if the current triangle being traversed contains a from-silhouette edge (FROM-SILE) occlusion boundary or a containment boundary (indicating containment in the SILE-VC). Umbral discontinuity mesh (DM) segments generally form polylines at the intersection of a mesh triangle with wedges. Each DM segment is the intersection of a wedge and a triangle, wherein the segment is visible from the wedge's supporting source element (points or edges) and through the wedge's supported silhouette element (point or edge). This is called an "on-wedge" visible intersection. This intersection is a segment of the conservative umbral discontinuity mesh and may or may not be an edge of the polyhedral aggregate umbra (PAU). These on-wedge visible segments comprise the polylines of the conservative linearized umbral discontinuity mesh. These polylines may or may not be actual from-source (from-silhouette edge in this case) occlusion boundaries (the boundary which separates polygon fragments that are conservatively visible from the source (SILE) and polygon fragments that are occluded from the source, wherein the size of the umbral volume is conservatively underestimated).

From-source occlusion boundaries encountered in step 2315 are discontinuity mesh (DM) polyline segments that have been determined to be from-viewcell occlusion boundaries in step 2363. The details of step 2363 are presented later. Step 2363 determines which DM polyline segments are from-silhouette edge occlusion boundaries and is actually performed before a from-viewcell occlusion boundary would be encountered later in step 2315.

The "on-wedge" visible intersection of a mesh triangle with a wedge represents a segment of the umbral discontinuity mesh which may or may not correspond to a from-silhouette edge occlusion boundary (OB). Each DM polyline is determined to be a from-region occlusion boundary (or not) in step 2363 and the result is stored with the DM polyline. Since each DM polyline is processed by step 2363 prior to it being encountered in steps 2315 the information used for the decision in step 2315 was previously determined and stored for the encountered DM polyline segment in step 2363.

If, in decision step 2315, it is determined that the current triangle does contain an occlusion boundary (OB) segment or containment boundary segment, then process flow proceeds to step 2335 to interrupt the traversal of the current 3D mesh at the OB segment (OB SEG) or occlusion boundary. Traversal may continue across other non-OB segments of the triangle. Process flow proceeds to step 2335. In further embodiments, process flow proceeds from 2335 to process 23-1, which returns the process flow to step 2325.

If, in decision step 2315, it is determined that the current triangle does not contain an OB segment, then process flow proceeds to step 2320 to determine if the current triangle has a silhouette edge. In some embodiments, this determination is based on the test for a first-order, from-edge silhouette edge shown in FIG. 3.

If, in decision step 2320, it is determined that the current triangle does not have a silhouette edge, then process flow proceeds to step 2325 to process the next untraversed triangle in the breadth-first traversal of the directed graph corresponding the manifold triangle mesh.

If, in decision step 2320, it is determined that the triangle being processed does contain a silhouette edge, then process flow proceeds to step 2345, where the breadth-first traversal of the directed graph corresponding to the triangle mesh is stopped at the silhouette edge, and primary wedges are constructed incident on the silhouette edge using the first-order method of pivot and sweep method of wedge construction (FIG. 1-FIG. 6). In embodiments, the constructed primary wedges are added to a list called the WEDGE_LIST. The primary wedges are those wedges constructed on encountered first-order silhouette edges using the pivot and sweep method. On initial construction, all wedges are initial wedges which have not yet been further restricted by an on-wedge visibility step. In some embodiments, the construction of the initial primary wedges in step 2345 corresponds to the initial primary wedge construction shown in step 1210 in FIG. 12. (the output-insensitive method).

Alternate embodiments are possible in which the first-order wedges (constructed in step 2345 and the later step 2360) are not constructed using the pivot-and-sweep method of the present invention but instead using the less precise method of extending the SV-ME wedge planes to intersection (as described by Teller et. al, 1992).

Process flow proceeds from step 2345 to step 2350, where wedges in the WEDGE_LIST are selected and submitted to subsequent processing steps 2355 through 2368.

In a first step of the processing of wedges in the WEDGE_LIST, step 2355, the on-wedge visible segments of mesh triangles intersecting the wedge are determined. In some embodiments, this determination uses the process of intersecting all mesh triangles with each wedge and later determining the 2D on-wedge visibility using Weiler-Atherton. This approach is used in prior-art discontinuity meshing methods and in the simpler output-insensitive conservative umbral discontinuity mesh method of FIG. 12. Alternatively, a more efficient output-sensitive 2D mesh traversal solution to this on-wedge visibility problem is presented in FIG. 15. Process flow proceeds from step 2355 to step 2360, where the compound silhouette vertices (CSVs) incident on the wedge being processed are identified as any on-wedge visible intersection of the wedge with a first-order from-viewcell silhouette edge.

Each CSV is an on-wedge visible point of intersection of a wedge and a first-order silhouette edge. These points correspond to t-junctions of the corresponding compound from-region silhouette contour. A compound silhouette contour is formed by silhouette edges that may not be directly connected by a vertex on the original manifold.

Also in step 2360, SE-MV wedges are constructed on each of the CSVs identified. These wedges originating on a CSV are called secondary wedges. These wedges are constructed using the sweep operation of the pivot-and-sweep method of wedge construction. In some embodiments, all of these wedges generated in this step are SE-MV type, generated in the sweep process. These wedges form a continuous, conservative umbral surface which connects the SV-ME wedges that intersect at the corresponding CSV. Alternatively, the two SV-ME wedges can be extended to intersection, forming a less precise, but still conservative umbral boundary.

Alternate embodiments employing the construction of wedges by the method of extending the planes of adjacent SV-ME wedges to intersection are possible. In such an implementation SE-MV wedges are not constructed.

As previously defined, each CSV corresponds to the intersection of a wedge and another wedge which is supported on the intersected silhouette edge. These wedges intersect at the point of the CSV.

Also, if both SV-ME wedges intersecting at the CSV pivot to the same silhouette edge vertex then the two wedges exactly intersect at their edges and no new SE-MV wedge is constructed.

All secondary wedges (those incident on CSVs) constructed in step 2360 are added to the WEDGE_LIST. Which means that they will ultimately be processed by step 2355 to find on-wedge visible segments.

Process flow proceeds from step 2360 to decision step 2363 to determine if the DM_SEG is occluded from all other "parts" of the corresponding silhouette edge (SILE) except the vertex supporting the wedge containing the DM_SEG. An embodiment of this test is disclosed in FIG. 21. Briefly, the test involves intersecting the DM_SEG with all potentially intersecting wedges already constructed, and then determining, by the modified point-in-polyhedron test, if the resulting subsegments are inside the from-source (from-silhouette edge in this case) PAU.

If the DM_SEG is otherwise occluded from all other parts of the silhouette edge (except the SVV supporting the DM_SEG's wedge), then the DM_SEG is an actual from-silhouette edge occlusion boundary (OB) corresponding to an edge of the from-edge PAU.

Thus, if in decision step 2363, it is determined that the DM_SEG is otherwise occluded from the SILE (using the process of FIG. 21), then process flow proceeds to 2368, where the DM_SEG is added to the intersected triangle as an OB_SEG.

If, on the other hand, the DM_SEG is not otherwise occluded from all other parts of the SILE, then the DM_SEG is not an actual from-edge occlusion boundary (OB) and process flow proceeds directly to step 2370 to determine if any unprocessed wedges remain in the WEDGE_LIST. If, in decision step 2370, it is determined that unprocessed wedges remain in the wedge list, then process flow returns to step 2350.

If, on the other hand, it is determined in step 2370 that no unprocessed wedges remain in the wedge list, then process flow proceeds to step 2380 to determine if any unprocessed triangles exist in the current "traversal" (the set of triangles connected to the current triangle by non-silhouette edges). If in decision step 2380 it is determined that un-traversed triangles exist in the traversal (the set of triangles connected to the current triangle by non-silhouette edges), then process flow proceeds to step 2325, where the next untraversed triangle is processed.

If in decision step 2380 it is determined that no untraversed triangles exist in the traversal, then process flow proceeds to 2383, where the triangles intersected by the OB segments generated in the current traversal are identified and retriangulated using the intersecting OB segments. This step can effectively restrict the 3D mesh traversal at occlusion boundaries when later encountered in step 2315, and thereby limit the traversal to non-occluded regions, further enforcing the output-sensitive character of the method.

Process flow proceeds to step 2385 to continue the traversal of the 3D mesh on the unoccluded side of the OB segments generated from the traversal. Since the wedges from one 2-manifold may produce OB points on a different (disconnected) 2-manifold, this represents a continuation of the traversal on a newly connected manifold (part of the PAU) formed by "occluder fusion" of the two manifolds by the wedge line at the OB segment. Process flow terminates at step 2385.

As previously described, in one embodiment of the present method, the entire set of triangle mesh objects is contained by an enclosing mesh object. This enclosing mesh object is similar to a "skybox" commonly used to surround mesh objects for interactive visualization applications. In the from-silhouette edge to viewcell backprojection method of FIG. 23, the viewcell itself is treated as a triangle manifold in a fashion similar to the skybox object. The use of the viewcell as a triangle manifold keeps the current method output-sensitive, since only the encountered unoccluded meshes (in the SILE-VC shaft) are processed, every mesh in the shaft is processed. Of course, the present method naturally identifies the unoccluded regions of the viewcell itself from which the VSVV and VSVSC are determined.

An alternate embodiment of the backprojection process employs only SV-ME backprojection (from-mesh-silhouette edge) wedges. In this method, the plane of the backprojected SV-ME wedges are extended to intersection, simplifying the resulting on-viewcell backprojected visibility map.

In addition, just as first-order SE-MV wedges can be selectively eliminated by extending the plane of adjacent SV-ME wedges to intersection; higher-order wedges can be conservatively selectively eliminated by extending the plane of adjacent higher-order SV-ME wedges to intersection.

Figure 24A:
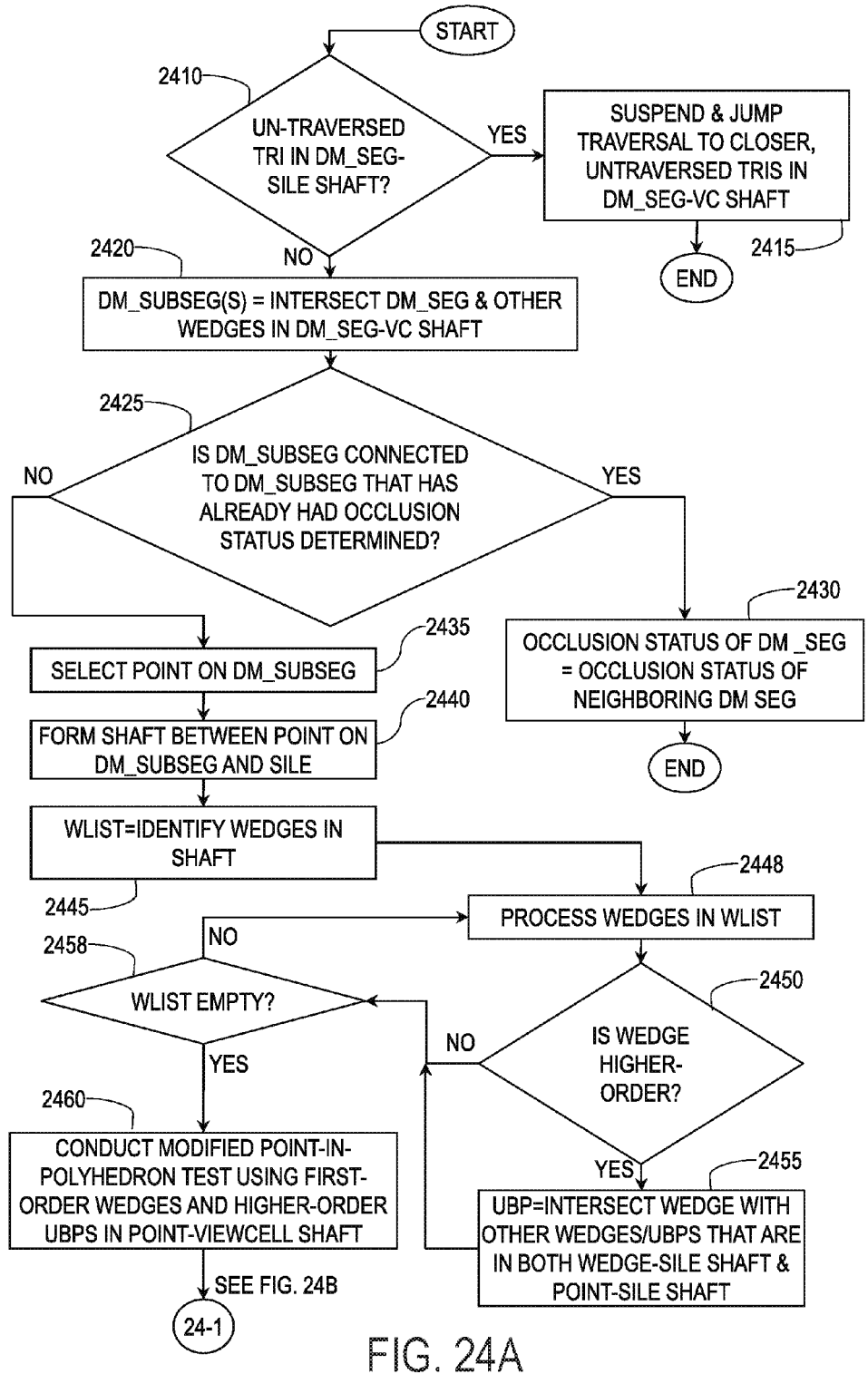
FIG. 24A is an exemplary flowchart showing a process to determine if a dm_segment is otherwise occluded from a silhouette edge source, used in construction of a from-silhouette-edge visibility map backprojection employing 3D mesh traversal.
Figure 24B:
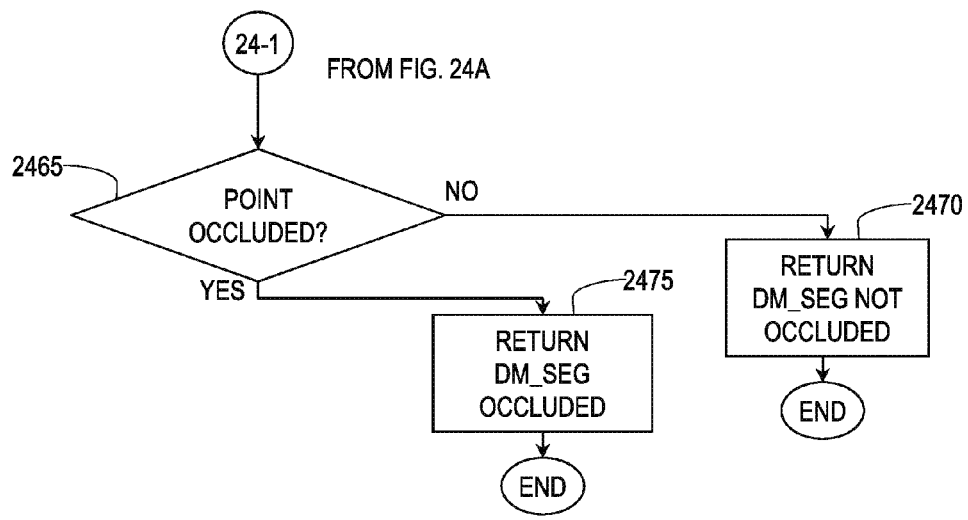
FIG. 24B is an exemplary continuation of FIG. 24A.

FIG. 24A and FIG. 24B Process to Determine if a DM_SEGMENT is Otherwise Occluded From a Silhouette Edge Source, Used in Construction of a from-Silhouette-Edge Visibility Map Backprojection Employing 3D Mesh Traversal The process shown in FIG. 24A and FIG. 24B implements the query called in step 2363 of FIG. 23, namely determining if a DM_SEG generated in the from-silhouette edge backprojection construction of an on-viewcell visibility map is otherwise occluded from the silhouette edge source.

The process of FIG. 24A and FIG. 24B follows the method shown in FIG. 21A and FIG. 21B, determining if a DM_SEG generated in the frontprojection from-viewcell construction of a from-viewcell visibility map is otherwise occluded from the viewcell source except that the in the case of FIG. 24A and FIG. 24B the source is a silhouette edge not the viewcell.

Turning now to FIG. 24 the test, in some embodiments, begins with a decision step 2410 in which a 3D shaft between the DM_SEG being tested and the silhouette edge is employed (DM_SEG-SILE shaft).

If, in decision step 2410, it is determined that there are untraversed triangles in the DM_SEG-SILE shaft, then process flow proceeds to step 2415, where the process is suspended and the main part of the frontprojection 3D mesh traversal process is jumped to the closer untraversed triangles in the DM_SEG-SILE shaft. This jump insures that all of the potentially occluding geometry that can influence the DM_SEG's status as a from-SILE occlusion boundary is identified and processed prior to conducting the backprojection test which actually determines if the DM_SEG is a from-SILE occlusion boundary (OB).

If, in decision step 2410, it is determined that no untraversed triangles exist in the DM_SEG-SILE shaft, then process flow proceeds to step 2420, where the DM_SEG is intersected with other wedges in the DM_SEG-SILE shaft. This intersection may subdivide the original DM_SEG into a plurality of DM_SUBSEGS, each having a uniform from-SILE visibility.

Process flow proceeds to step 2425 to determine if the current DM_SEG (or DM_SUBSEG) is directly connected to a DM_SEG or DM_SUBSEG for which the from-SILE visibility status (otherwise occluded or otherwise unoccluded) has been determined.

If, in decision step 2425, it is determined that the current DM_SEG or DM_SUBSEG is directly connected to a DM_SEG or DM_SUBSEG for which the from-SILE occlusion status has been definitively determined, then process flow proceeds to step 2430.

In step 2430, the occlusion status of the current DM_SEG or DM_SUBSEG is set to the same status of the DM_SEG or DM_SUBSEG having a known from-SILE visibility status and to which the current DM_SEG or DM_SUBSEG it is directly connected and this status is returned to the calling function.

If, in decision step 2425, it is determined that the current DM_SEG or DM_SUBSEG is not directly connected to a DM_SEG or DM_SUBSEG having a known from-SILE visibility status, then process flow proceeds to step 2435, where a point on the DM_SUBSEG is selected and processing proceeds to step 2440 to form a shaft is between the point selected in step 2435 and the SILE and processing proceeds to step 2445, where all wedges in the DM_SEG-SILE shaft are identified and placed in a list WLIST for later processing. These are the wedges generated in the steps 2345 and 2360 of FIG. 23, the main 3D mesh traversal process which generates the frontprojection, first-order wedges.

Process flow proceeds to step 2448, where each wedge in the WLIST is processed by subsequent steps.

Process flow proceeds to step 2450, where for each wedge in the WLIST, it is determined if the wedge is a first-order-wedge or a higher-order wedge.

The main 3D mesh traversal process of FIG. 23 generates first-order wedges using the pivot and sweep construction of wedges at steps 2345 and 2360. Higher-order wedges can optionally be constructed using the backprojection process detailed in a later part of this specification in conjunction with FIG. 22, FIG. 23, and FIG. 24.

If, in decision step 2450 it is determined that the wedge is a higher-order wedge, then process flow proceeds to step 2455.

If, on the other hand, in decision step 2450 it is determined that the wedge is a not a higher-order wedge, then process flow proceeds directly to step 2458.

In step 2455, the actual from-SILE umbral boundary polygon (UBP) corresponding to the higher-order wedge is constructed by intersecting the higher-order wedge with all other wedges and UBPS that are in both the wedge-SILE (WEDGE-SILE) shaft and the point-SILE shaft. This process effectively constructs, for a higher-order wedge identified in step 2450, that portion of the corresponding UBP that is inside the point-SILE shaft. A UBP can be constructed from the corresponding wedge by intersecting it with all other wedges/UBPs in the shaft formed between the wedge and the viewcell. In some embodiments, only a subregion of the UBP, that portion in the point-SILE shaft, is constructed in order to answer the modified point-in-polyhedron test, which the later step 2460 in the process. After step 2455, process flow proceeds to decision step 2458 to determine if the WLIST is empty. If the WLIST is not empty, then process flow returns to step 2448 where then next wedge in the WLIST is subjected to subsequent processing.

If, in decision step 2450, it is determined that the wedge is a first-order wedge, then process flow proceeds directly to step decision step 2458, described above.

If, in decision step 2458, it is determined that the WLIST is empty, then process flow proceeds to step 2460 to subject the DM_SUBSEG point selected in step 2435 to a modified point-in-polyhedron test to determine if it is otherwise occluded from the SILE.

An embodiment of this modified point-in-polyhedron test is shown in FIG. 25 and discussed in detail in conjunction with that figure. Briefly, this modified point-in-polyhedron test determines if the test-point is inside the from-SILE PAU. The test is somewhat similar to conventional point-in-polyhedron tests in that a second point known to be outside the PAU is selected, in this case a point on the SILE. A line segment is constructed between the test-point and the outside-point and the line is intersected with the polyhedron's polygons. The status (inside or outside of the polyhedron) of subsegments of the line will change based on intersections with mesh polygon fragments and UBPS that comprise the PAU. The test is simplified somewhat in the case of first-order wedges, which do not have to be intersected with other wedges to form the corresponding UBPS (since they cannot be intersected by other wedges on their unoccluded side). Moreover, in some embodiments, since only those PAU surfaces inside the test-point-viewcell shaft can be intersected by the test line segment, the entire PAU is not constructed to complete the test.

Process flow proceeds from step 2460 to process 24-1, which starts at step 2465 (FIG. 24B).

In decision step 2465, the result of the modified point-in-polyhedron test (step 2460) is examined.

If, in decision step 2465, it is determined that the test-point is occluded, then process flow proceeds to step 2475, where the overall process returns the result that the tested DM_SEG is occluded. The result is returned to step 2363 in FIG. 23.

If, in decision step 2465, it is determined that the test-point is not occluded, then processing proceeds to step 2470.

In step 2470 the overall process returns the result that the tested DM_SEG is not occluded. The result is returned to step 2363 in FIG. 23. Process flow terminates at 2470 and 2475.

Figure 24C:
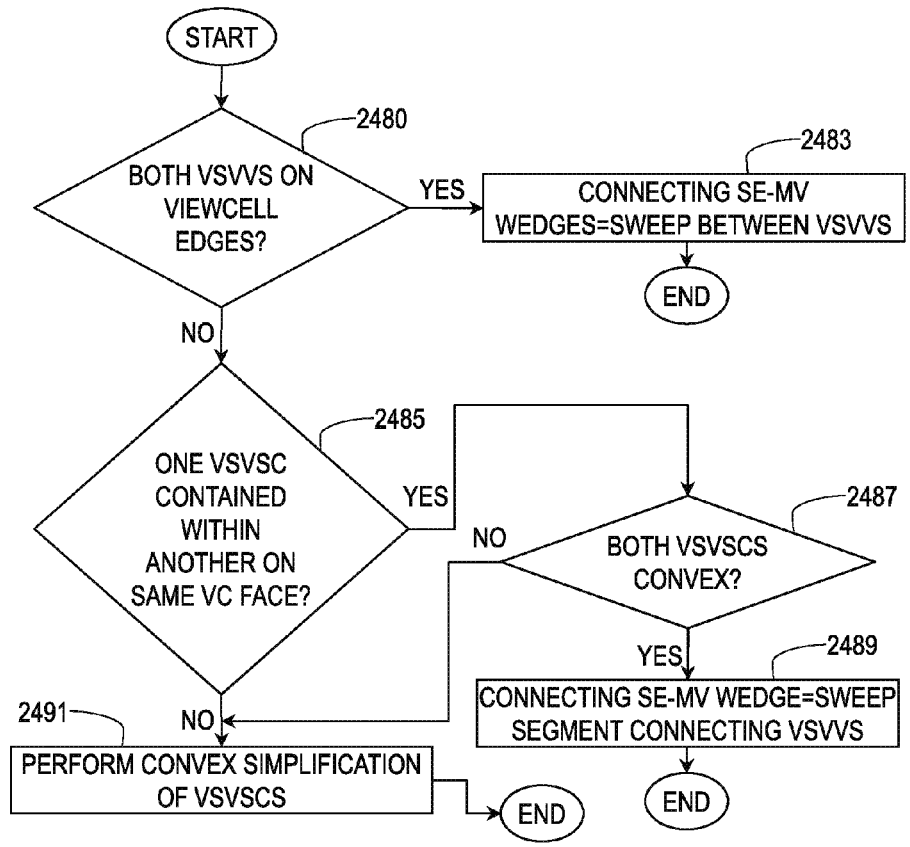
FIG. 24C is an exemplary flowchart showing a method of using the from-silhouette edge backprojection visibility map to constructive a conservative visible supporting viewcell silhouette contour (VSVSC) that contains the VSVSs corresponding to ladjacent silhouette edges.

FIG. 24C Using the From-Silhouette Edge Backprojection Visibility Map to Constructive a Conservative Visible Supporting Viewcell Silhouette Contour (VSVSC) that Contains the VSVVs Corresponding to |Adjacent Silhouette Edges.

After the from-silhouette edge backprojection visibility map is constructed for a specific silhouette edge subsegment by the processes shown in FIG. 22, FIG. 23, and FIG. 24, a VSVV is determined. The VSVV is the point visible from the silhouette edge that is a vertex of the from-SILE, on-viewcell visibility map (and so on an edge or face of the viewcell) that supports a plane pivoted from the silhouette edge to the viewcell.

Each first-order silhouette edge or subsegment thereof, if subjected to the backprojection process, will result in a corresponding adjusted, or higher-order SV-ME wedge incident on the same silhouette edge or subsegment. The higher-order SV-ME is supported by the VSVV.

In addition to producing a VSVV for each silhouette edge or subsegment to which it is applied, the from-silhouette edge backprojection also produces a visible supporting viewcell silhouette contour (VSVSC) as part of the on-viewcell visibility map.

To construct the SE-MVs that connect adjacent higher-order SV-MEs the VSVSCs produced during the from-edge backprojection of the corresponding silhouette edges are used.

As previously described, SV-ME wedges represent the restriction of visibility by occlusion along the supported silhouette edge by polygon containing the edge. In contrast SE-MV wedges do not reflect the same aspect of occlusion at supported silhouette vertex because a vertex cannot actually occlude any light/visibility from a regional source. A point cannot occlude an area light source. Instead, at an inside corner of a silhouette contour the from-region visibility is restricted by containment of the light/viewpoint on the surface of the source/viewcell. The corresponding SE-MV wedges incident on a silhouette vertex reflect the limits of this containment.

In the first-order implementations of the present visibility method, SE-MV wedges are generally only constructed at inside-corner silhouette vertices (and compound silhouette vertices which are treated as virtual inside corners). Higher-order SV-ME wedges may be connected by one or more SE-MV wedges even if the SV-ME wedges do not strictly connect at an inside corner. This situation occurs, for example, when a single first-order silhouette edge is adaptively subdivided and individual higher-order SV-ME wedges determined for each of the subsegments.

The SE-MV wedges connecting adjacent SV-MEs are derived from the VSVSCs of the adjacent higher-order wedges and particularly depend upon how the VSVSCs intersect each other. In the first-order case adjacent silhouette edges share a common SVSC, as long as the silhouette edges are first subdivided by intersection with the planes of the viewcell faces.

Therefore, the structure of the VSVSC, and its relationship to the VSVSC from adjacent silhouette edges, determines the set of SE-MVs connecting two adjacent higher-order wedges at the point connecting the two corresponding silhouette edges/subsegments.

In first-order, frontprojection, the actual supporting viewcell silhouette contour (SVSC), used to construct the "swept" first-order SE-MV wedges, is always a simple convex polyline comprised of one to at most approximately six edges of the viewcell.

In contrast, during the from-silhouette edge backprojection process the visible supporting viewcell silhouette contour (VSVSC) inscribed on the viewcell can become arbitrarily complex. Depending on the arrangement of mesh polygons in the shaft between the source silhouette edge and the viewcell; the VSVSC can become a non-convex polyline or even multiple disconnected polylines having a large number of segments.

Since the purpose of the higher-order backprojection method is to provide a simple conservative higher-order "adjustment" to SV-ME wedges and the SE-MV wedges which may connect them, the present method employs a number of techniques to minimize the complexity of the VSVSC. These techniques allow higher order visibility refinements to improve the precision of the first-order result without introducing too many additional event surfaces.

In embodiments, two strategies are employed to insure that complex VSVSCs are avoided in the backprojection process: 1) identification of cases where the VSVSCs for connected silhouette edges are each simple and they are simply related and, 2) convex simplification of complex VSVSCs. The first approach is discussed first.

The two VSVSCs corresponding to connected silhouette edges (or subdivided subsegments of the same edge) are often very simple and they are simply related. Consider two subsegments (A and B) of the same silhouette edge which has been subdivided for the purpose of higher-order refinement. The SVVs of the two are the same (definition of supporting plane). The VSVV of segment A is likely to be on an edge of the viewcell. The VSVV of connected subsegment B is also likely to be on an edge of the viewcell. If both VSVVs are on an edge of the viewcell (not necessarily the same edge), then the relevant component of the common, intersecting VSVSCs used to generate the SE-MV wedges connecting A and B is the portion of the original SVSC (edges of the viewcell) connecting the VSVV of A and the VSVV of B. In this common case the joining SE-MV wedges are constructed in a modification of the sweep process, wherein the sweep is between the two VSVVs. (FIG. 24C steps 2480 and 2483).

If, in the previously described case, the VSVVs of both A and B are on the same edge of the viewcell, and these VSVVs are both produced by the intersection of a backprojection visibility event surface arising on the same intervening (backprojection) silhouette edge, then subsegment A and subsegment B are on a region of the original frontprojection silhouette edge for which the exact from-viewcell umbral event surface is a quadric surface produced by the silhouette edge, the intervening backprojection silhouette edge, and the viewcell edge. The adaptive subdivision of this region of the frontprojection silhouette edge produces a set of SV-ME wedges and their connecting SE-MV wedges that conservatively approximate this quadric, and in the limit of the subdivision converges on the quadric surface.

If the VSVVs are on different edges of the viewcell (but produced by the same intervening backprojection silhouette edge), then the resulting SE-MV wedges (together with the adjacent SV-ME wedges) is the conservative representation of n quadrics, where n is the number of viewcell edges between the two VSVVs. These quadrics are in general joined by shared generator edges. By further subdividing the two silhouette segments and backprojecting, the set of connected quadrics could be adaptively approximated on the initial subsegments. The triple tetrahedral wedge or shaft test described by Drettakis et. al and Durand et. al [Visibility Skeleton] can optionally be used to find the exact connecting generator edge boundaries, but this is not required for the present method.

The case of subsegment A and subsegment B corresponds to a Source-EEE visibility event quadric, an event surface formed by two edges of the polygon mesh and one edge of the viewcell, described by Drettakis et. al. in their description of the complete discontinuity mesh. As specified, the present method of from-silhouette edge backprojection can easily identify cases corresponding to higher-order, S-EEE event surfaces and approximate these surfaces with a conservative polygonal approximation.

Other adjacent silhouette edges/segments may result in corresponding VSVSCs that have the corresponding VSVVs not on an edge of the viewcell but interior to a face of the viewcell. If both of the VSVSCs are convex and are on the same face of the viewcell, and one is contained within the other, then a line segment is formed connecting the two VSVVs. This line segment forms a swept triangle with the shared silhouette vertex that produces a conservative SE-MV connecting the two adjacent adjusted SV-ME wedges. (FIG. 24C steps 2485, 2487, and 2489).

While some from-silhouette edge backprojections produce relatively simple VSVSCs, others may produce VSVSCs that are complex and have the corresponding VSVV not on an edge of the viewcell, but inside one of the faces of the viewcell. Each of the VSCSVs from the backprojection of connected silhouette edges may be non-convex and may have disconnected components. Moreover the VSVSCs may not even intersect. This makes a sweep operation at the shared silhouette vertex undefined.

In this case, the SV-ME (or SE-MEs) supported by adjacent silhouette edge subsegments may be connected by a series of SE-MVs which are arbitrarily complex reflecting the complexity of the VSVC that connects the two VSVVs. Actually, the two VSVVs may not actually be connected on the VSVC, which may have more than one connected component.

In order to simplify the set of SE-MV wedges connecting the SV-ME wedges on adjacent subsegments a conservative simplification of the VSVSC corresponding to each subsegment is made. (FIG. 24C steps 2485 and 2491).

This simplification involves finding the VSVV or VSVE (visible supporting viewcell edge) for each subsegment and then extending the plane of the respectively SV-ME or SE-MV to bisect the viewcell by planes parallel to the wedges formed by the VSVV or VSVE.

This bisection of the viewcell is performed for each of the adjacent silhouette edge subsegments. Each resulting VSVSCs has a simple relationship to the original SVSC of the viewcell: the new viewcell silhouette contour is a subset of the original, cut by the plane. As a result of this cut the original SV-ME wedges incident on the silhouette edge are converted to SE-ME wedges since they are supported by a supporting viewcell structure which is parallel to the respective edge. After the bisection of viewcell, the VSVSCs typically have a simple relationship: one is a subset of the other (unless the new VSVEs intersect on the viewcell which cannot occur if they correspond to a single subdivided silhouette edge, since they would be parallel in that case).

Since SE-MEs supported by adjacent subsegments are supported by points on the supporting viewcell silhouette contour (SVSC) the SE-MEs can be joined by SE-MVs generated by segments of the SVSC that connect the corresponding SE-MEs of the two corresponding new VSVSCs, conservative silhouette contours.

However, these SE-MVs through the point shared by the two connected silhouette subsegments will each join one of the SE-MEs on edge and the other will be intersected not on edge but exactly on face.

To find the two SE-MEs the set of all SE-MVs formed between the two VSVSCs are formed from the corresponding swept triangles, the SE-MV wedges are intersected with each other and with the SE-MEs to find the continuous connecting polygonal surface. Note that these SE-MV wedges may intersect the SE-ME wedges, not just edge-to-edge but also intersect in the interior of the wedge. Likewise, the SE-MV swept wedges may also intersect each other in the interior of the wedge.

Other methods of conservatively simplifying complex VSVSCs generated by backprojection can be employed. In one method, a non-convex VSVSC may be processed by any method for convex simplification of a polyline. Disconnected components of VSVSCs corresponding to the backprojection of a single silhouette edge can be conservatively connected by forming their convex hull on the viewcell. Likewise, disconnected components of VSVSCs corresponding to the backprojection of adjacent silhouette edges be conservatively connected by forming their convex hull on the viewcell. The simplified convex VSVSCs result in simplified SE-MVs to connect the adjusted SV-MEs.

Conservative, convex simplification of the common VSVSC connecting the two VSVSVs for adjacent segments can significantly reduce the complexity of the resulting from-region visibility result (DM, VM, or PAU).

In some cases, the VSVV for two connected silhouette edges are visible from the edges (the corresponding SV-MEs are exact) but portions of the viewcell edges supporting the swept supporting triangles corresponding to the connecting SE-MVs may be occluded from the shared silhouette vertex. In this case, a VSVSC can be constructed using an on-viewcell from-point visibility map generated using the backprojection process with the shared silhouette vertex as the source. From-point backprojection employs a simplified embodiment of the method of FIG. 22, and FIG. 23. In the from-point backprojection case, all wedges are from-point UBPs and are generated using the definition of from-point silhouette edge, no sweep operation is used in the wedge construction and each DM_SEG is known to be a OB_SEG, so the test of FIG. 24A and FIG. 24B is not used.

The VSVSC is confined to the surface of the viewcell. Occlusion boundary segments may effectively span one or more faces of the viewcell, but are treated as continuous polylines on the mapping.

In one technique, to simplify the backprojection implementation, mesh silhouette edges used as backprojection sources can be first subdivided by intersecting with the viewcell face planes to form segments. For each subsegment of such segments, the corresponding VSVSC is generally confined to the same set of viewcell faces. Further, subdivision of any segment can be driven by the previously discussed error metrics, which estimate the deviation of the first-order wedge from the corresponding higher-order wedge.

It should be noted that the from-silhouette edge backprojection process itself specified herein itself employs the first-order model of visibility propagation. Consequently, it produces a guaranteed conservative, but not necessarily exact adjustment of first order frontprojection SV-ME wedges and the SE-MV wedges that connect them. It is possible to employ higher-order refinement approach in the backprojection process itself. This would approximate quadrics in the on-viewcell visibility map which correspond to NonEmitter-EEE events described by Drettakis et. al. (1994). Since these NonSource-EEE events rarely contribute significantly to the from-viewcell umbral volume; this approach can significantly complicate the implementation and is unlikely to substantially improve the precision of the first-order backprojection result. Table IX shows the types of event surfaces (using the nomenclature of table I) that are accounted for by the first-order method, the backprojection method using first-order visibility propagation in the backprojection, and the backprojection method in which higher-order visibility is used. In the latter case, portions of source the mesh silhouette edge visible from the (from-segment) mesh silhouette edge are determined by a backprojection. As previously described, the E-EV surfaces generated using the first-order model of visibility propagation in some cases correspond to the E-EV event surfaces of discontinuity meshing. In other cases, the E-EV surfaces generated by the first-order method do not correspond to any event surface constructed using the prior-art method of discontinuity meshing (in which the E-EV event surfaces do not necessarily form a continuous umbral event surface).

TABLE IX

Using First-Order Visibility Propagation Methods in Frontprojection and Backprojection to Approximate the Four Types of Visibility Event Surfaces

| | First-Order Method | Higher-Order Method (Backprojection Using First-Order Visibility Propagation From Source Mesh Silhouette Edges to Viewcell) | Higher-Order Method (Backprojection Using First-Order Visibility Propagation From Mesh Silhouette Edge to Source Silhouette Edge) |
|---|---|---|---|
| E-EV (Source Vertex-Edge Events) | Exact + Conservative | Exact + Conservative | Exact + Conservative |
| E-EEE (Source Edge-Edge-Edge Events) | Conservative, Approximate | Conservative, Approximation Improves with Refinement | Conservative, Approximation Improves with Refinement |
| NonE-EV (Non-Source Vertex Edge Events) | No | Exact + Conservative | Exact + Conservative |
| NonE-EEE (Non-Source Edge-Edge-Edge Events) | No | No | Conservative, Approximation Improves w Refinement |

In summary, the backprojection process can result in a VSVSC that is non-convex and which may have multiple disconnected components. This can substantially increase the complexity of the SE-MV wedges incident on a vertex shared by adjacent mesh silhouette edge subsegments. When the VSVSC has multiple disconnected components, then the visibility problem is no longer from-region but actually "from-multiple-regions." Thus, the methods of conservatively connecting multiple disconnected components of the VSVSC, and of convex simplification of single VSVSC is used to control the complexity of the resulting visibility map or PAU.

Once again, the present method allows the user to select the specific higher-order visibility effects that are employed in the from-viewcell visibility solution (silhouette retraction, higher-order backprojection etc.). Moreover, the use of higher-order effects for specific silhouette edges can be guided by heuristics which consider the maximal possible deviation between the first-order and higher-order result based on specific higher order effects.

Summary of 3D and 2D Mesh Traversal Algorithms for from-Region Visibility

As is clear from the previous description, the output-sensitive, mesh traversal methods of constructing visibility maps in the 3D case (e.g., from-viewcell PVS) and the 2D case (e.g., on-wedge visibility) are very similar.

Moreover, the backprojection methods for refining the first-order visibility map also employ the 3D and 2D traversal methods but using different sources, occluders, and targets.

The following tables summarize 3D and 2D mesh traversal algorithms and how they can be used in both frontprojection and backprojection modes by employing different source (view region), occluder, and target combinations. In this sense, the target is the geometry on which the visibility map occlusion boundary elements (segments in 3D algorithm and points in the 2D algorithm) are constructed.

TABLE X

Variations of 3D Mesh Traversal Algorithm For From-Viewcell Visibility

| 3D Visibility Map | Source | Occluders | Target |
|---|---|---|---|
| From-Viewcell (FIGS. 19, 20, 21) | Viewcell | All Manifold Meshes | All Manifold Meshes |
| Backprojection From-Silhouette-Edge (FIGS. 22, 23, 24) | Silhouette Edge | From-Viewcell Unoccluded Manifold Meshes and From-Viewcell Silhouette Edges all in Sihouette Edge-Viewcell Shaft | Viewcell |

TABLE XI

Variations of 2D Mesh Traversal for On-Wedge Visibility

| 2D On-Wedge Visibility Map (FIGS. 14, 15, 16) | Source | Occluders | Target |
|---|---|---|---|
| SE-MV, SV-ME, SE-ME: FrontprojectionFrom-viewcell-edge or vertex (FIGS. 14, 15, 16)) | Viewcell edge or Viewcell Vertex | All Manifold Meshes and From Viewcell Silhouette Edges | All manifold meshes |
| SBackprojection From-viewcell-edge (FIG. 17, 18, 19) | Mesh Silhoeutte Vertex | All Manifold Meshes and From Vertex Silhouette Edges | Viewcell Edges |

Table XII shows the corresponding surface and region elements for the 3D and 2D mesh traversal methods.

TABLE XII

Surface and Region Elements for
3D and 3D From-Region Visibility

| Element | 3D | 2D |
|---|---|---|
| From-Source-Feature Umbral Boundary Element | Wedge | Wedge Line (WL) |
| From-Source Umbral Boundary Element | Umbra Boundary Polygon (UBP) | Umbra Boundary Line (UBL) |
| From-Source Umbral Boundary Region | Polyhedral Aggregate Umbrae (PAU) | Polyline Aggregate Umbrae (PLAU) |

FIG. 25 Method of Point-Occlusion Test Using First-Order Wedges and Higher-Order Wedges The method of constructing a conservative, linearized, umbral visibility map shown in FIG. 19 and FIG. 20 uses a test to determine whether a point on a discontinuity mesh region is from-viewcell occluded or from-viewcell unoccluded (e.g. at step 1945 of FIG. 19). This point-occlusion test is formulated as a modified point-in-polyhedron test and is shown as the flowchart of FIG. 25.

In embodiments, process flow starts at step 2505, where a line segment is formed connecting the test point (TP) and a point on the surface of the viewcell. The point on the viewcell surface is assumed to be unoccluded from the viewcell.

Process flow proceeds to step 2510, this line segment is intersected with potentially all mesh triangles, first-order wedges, and higher-order UBPs. The mesh triangle containing the test point is not counted as an intersection point.

Note that while first-order wedges can be used in the test any higher-order wedges must first be intersected with other wedges to form the corresponding higher-order UBPs. This is required because, unlike first-order wedges, the unoccluded side of higher-order wedges can be intersected by other wedges. This fact means that the on-wedge visibility of a higher-order wedge can have a complex structure including overlapping holes caused by overlapping wedges that intersect the higher-order wedge on its unoccluded side. Consequently, the on-wedge visibility structure of a higher-order wedge is first determined by constructing the corresponding higher-order UBP. The higher-order UBP, not the higher-order wedge, is then used in the point-occlusion test.

Process flow proceeds to step 2512, where the intersection points generated in step 2510 are processed beginning at the point on the viewcell surface and proceeding to the test point.

Process flow proceeds to decision step 2515, where the type of intersection is examined to determine if it corresponds to a mesh triangle intersection.

If, in decision step 2515, it is determined that the intersection point corresponds to a mesh triangle intersection, then process flow proceeds to step 2520, where the value of a variable (LS_STATE) indicating the possible state of occlusion of the new subsegment of the line segment LS containing the intersection is set to a state "occluded".

If, in decision step 2515, it is determined that the intersection does not correspond to a mesh triangle, then process flow proceeds to step 2525 to determine if the intersection point corresponds to a first-order wedge or a higher-order UBP. In decision step 2525, if the intersection point corresponds to a first-order wedge, then process flow proceeds to step 2545 to determine if the intersection point corresponds to an intersection with the occluded or unoccluded side of the wedge when the line segment LS is considered in the direction from the viewcell surface toward the test point TP.

If, in decision step 2545, it is determined that the intersection is with the unoccluded side of the wedge, then process flow proceeds to step 2550, where the value of LS_STATE is not changed.

If, in decision step 2545, it is determined that the intersection is with the occluded side of the first-order wedge, then process flow proceeds to step 2555.

If, in decision step 2555, the current value of LS_STATE is "unoccluded," then process flow proceeds to step 2560. In step 2560 the value of LS_STATE is left unchanged.

If, in decision step 2555, the current value of LS_STATE is "occluded," then process flow proceeds to step 2565. In step 2565, the value of LS_STATE is set to "unoccluded".

If, in decision step 2525, it is determined that the intersected structure is a higher-order UBP, then process flow proceeds to step 2530 to determine if the intersection point corresponds to an intersection with the occluded side or the unoccluded side of the UBP when the line segment LS is considered in the direction from the viewcell surface toward the test point TP.

If, in decision step 2530, it is determined that the intersection is with the occluded side of the UBP, then process flow proceeds to step 2540 to set the value of LS_STATE to "unoccluded."

If, in decision step 2530, it is determined that the intersection is with the unoccluded side of the UBP, then process flow proceeds to step 2535 to set the value of LS_STATE to "occluded."

Once all of the intersection points have been processed then the from-viewcell visibility of the test point is indicated by the final value of LS_STATE. Process flow terminates at steps 2520, 2535, 2540, 2560, and 2565.

In embodiments, the point-occlusion query of FIG. 25 is used to answer both 2D and 3D occlusion queries depending upon the choice of source, occluder and target. Table XIII shows how the point-occlusion query is used for various occlusion queries encountered during 3D and 2D from-region visibility problems in both frontprojection and backprojection (higher-order).

TABLE XIII

Variations of 3D and 2D Point-Occlusion Queries

| Visibility Query | Source | Occluders | Target |
|---|---|---|---|
| 3D Frontprojection: Is Point Occluded From Viewcell? (Frontprojection Point-in-Polyhedron Test) (FIG. 25) | Viewcell | Frontprojection, From-viewcell unoccluded mesh triangle fragments and First-Order Wedges and Higher-Order UBPs | Point |

TABLE XIII-continued

Variations of 3D and 2D Point-Occlusion Queries

| Visibility Query | Source | Occluders | Target |
|---|---|---|---|
| 3D Backprojection: Is Point Occluded From Mesh Silhouette Edge Segment (Backprojection Point-in-Polyhedron Test) | Mesh Silhouette Edge | Backprojection From-Mesh-Silhouette-Edge Unoccluded Mesh-Tri Fragments and First-Order Wedges and Higher-Order UBPs (Constructed from From-Viewcell Unoccluded Manifold Meshes and From-Viewcell Silhouette Edges all in Mesh Sihouette Edge-Viewcell Shaft) | Point |
| 2D Frontprojection: Is Point Occluded from Viewcell Edge (Frontprojection Point-in-Polygon Test)(FIG. 16 step 1650) | Viewcell Edge | Frontprojection From-Viewcell-Edge Unoccluded unoccluded mesh segments and First-Order Wedge Lines and Higher-Order UBLs | Point |
| 2D Backprojection: Is Point Occluded from Mesh Silhouette Edge (SE-ME case) (Backprojection Point-in-Polygon Test) | Mesh Silhouette Edge | Frontprojection From-Viewcell-Edge Unoccluded unoccluded mesh segments and First-Order Wedge Lines and Higher-Order UBLs. (Constructed from From-viewcell-edge unoccluded segments and silhouette vertices all in mesh-silhouette-edge X viewcell-edge shaft. | Point |
| 1D: Is point Occluded From Point (Ray cast) | Point | | Point |

FIG. 26 Alternate Embodiment Method of Constructing Polyhedral Aggregate Umbrae (PAU) From Umbral Boundary Polygons (UBPs) Using 3D Mesh Traversal An alternate embodiment of the 3D mesh traversal process shown in FIG. 20 and related figures employs UBPS instead of wedges.

In this method each primary and secondary wedge constructed in steps 2045 through 2060 is intersected with other potentially intersecting wedges/UBPS to form the corresponding UBPs. This is conditioned on that each of the potentially intersecting wedges is also intersected with their potentially intersecting wedges.

Since each UBP is a boundary of the from-viewcell PAU, each segment of intersection of a UBP and a mesh polygon is an occlusion boundary (OB_SEG).

This alternate embodiment is shown as FIG. 26. The method of FIG. 26 is very similar to the 3D mesh traversal method of FIG. 20A. In both cases the traversal is initiated using the method of FIG. 19.

The method of FIG. 26 follows the exact corresponding steps described in conjunction with FIG. 20A up to step 2661. See the discussion of FIG. 20A for details of these corresponding steps.

Step 2661 is the step in which each wedge is intersected with potentially intersecting UBPs to determine which portion of the wedge is a UBP. Those wedges and UBPs that intersect the current wedge are in the shaft formed by the wedge and the viewcell. If the current wedge is a first-order wedge then the potentially intersecting wedges should already have been constructed (by virtue of step 2610 which insures that potentially occluding polygons are processed first). Step 2661 may be performed recursively to identify all UBP intersections that influence the current UBP. In embodiments, step 2661 is identical to step 2155 of FIG. 21 except that in this case it is performed for first-order and higher-order wedges.

Alternate embodiments in which the current wedge is a higher-order wedge then the traversal is jumped to closer untraversed polygons in the wedge-viewcell shaft since wedges/UBPs incident on polygons in this shaft may intersect the current higher order wedge.

In subsequent decision step 2663 it is determined if the DM_SEG of a wedge (determined in step 2655) is also a segment of the UBP constructed from the wedge.

If, in decision step 2663, it is determined that the DM_SEG is a segment of the corresponding UBP then processing proceeds to step 2668 in which the DM_SEG is added to the intersected mesh triangle as an occlusion boundary segment OB_SEG. This step is identical to the corresponding step 2068 in FIG. 20. Subsequent steps in the process of FIG. 26 are identical to the corresponding steps of FIG. 20.

The method of FIG. 26 determines whether a DM_SEG is an OB_SEG by explicit construction of the relevant UBPs. Therefore the separate test to determine if a DM_SEG is otherwise occluded from the viewcell (FIG. 21) is not required.

If UBPs are employed, then the test to determine if a point inside any PAU (step 1945) uses a conventional point-in-polyhedron test. If first-order wedges are employed (as in FIG. 20) then step 1945 employs the modified point-in-polyhedron test (shown in FIG. 25).

Estimates of the Computational Cost of Constructing CLUDM (Using Non-Output-Sensitive Method of FIG. 12) and CLUVM (Using Output-Sensitive Method of FIG. 20 & FIG. 15).

The following terms are used in the subsequent equations:
  M=number of polygons in the model
  N=number of edges in a viewcell
  S=number of first-order silhouette edges in environment
  $S_{Shaft}$=number of first-order silhouette edges in a shaft formed between a single first-order silhouette edge and the viewcell
  $M_V$=number of visible polygons in the model
  $S_V$=number of visible first-order silhouette edges in environment
  $S_{VShaft}$=number of visible first-order silhouette edges in a shaft formed between a single first-order silhouette edge and the viewcell $V_w$=number of vertices of intersection between all polygons and a single wedge $M_w$=number of mesh polygons intersecting a wedge $V_{svw}$=number of visible (from point or from edge) silhouette vertices on a wedge $Seg_{vw}$=number of on-wedge visible segments of intersection between mesh polygons and a wedge The following equations assume first-order visibility propagation with no backprojection. These equations reflect estimates of the computational cost of constructing from-region visibility solutions, they are not necessarily exact.

Equation A is an approximate expression for the upper bounds of computational cost of constructing a conservative umbral discontinuity mesh using the conventional discontinuity mesh construction approach (FIG. 12). Equation A (Output insensitive method of FIG. 12):

$$\text{Cost} = (N*S*S_{Shaft})\text{Log}M \text{ /*Intersect all wedges with}$$
$$\text{polygons*} / + (N*S*S_{Shaft})V_w*M_w/*2D \text{ On-Wedge}$$
$$\text{Visibiltiy by } 2D \text{ Weiler-Atherton*} / + (M^2*N^2*S^2*S_{Shaft}^2)$$
$$\text{Log}(N*S*S_{Shaft})/*\text{From viewcell visibility of } DM \text{ regions*} /$$

The first term of equation A is the cost of intersecting all of the mesh triangles with all wedges. This term assumes that the geometry is organized using a 3D spatial hierarchy which makes the intersections O(n Log n).

The second term is the cost of determining the visible segments of the wedge-triangle intersections using the 2D Weiler-Atherton method employed by prior-art discontinuity meshing. This term indicates that for each wedge generated, all vertices of intersecting mesh triangle segments (V) will generate a ray that must be intersected with other mesh triangles that intersect the wedge ($M_w$). $M_w$ is a (generally small) subset of all mesh triangles (M). The cost of determining the $M_w$ is expressed in the first term. As shown in the table the number of wedges generated is $N*S*S_{Shaft}$.

The third term is the cost of determining, for all of the discontinuity mesh regions created by the meshing, whether the region is from-viewcell occluded or unoccluded. For such tests a line between single point in each discontinuity mesh region and the viewcell surface must be tested against all of the wedges. Because, in general, n wedges intersect any surface to form $n^2$ regions on the surface, the first factor in the term is quadratic in the number of wedges generated by any silhouette edge. The second factor reflects the number of event surfaces which need to be tested against. Equation B (Output-Sensitive 3D and 2Dmesh Traversal Method of FIG. 20 and FIG. 15):

$$\text{Cost} = M_v*\text{Log}M /*3D \text{ shaft test between}$$
$$\text{visible triangles and other triangles*} / + N*S_V*S_{VShaft}*$$
$$(Seg_{vw}*\text{Log}M + V_{svw}*\text{Log}M)/*2D \text{ On-wedge visibility}$$
$$\text{traversal*} / + (M_V^2*N^2*S_V^2*S_{VShaft}^2)\text{Log}(N*S_V*S_{VShaft})/*$$
$$\text{From-viewcell visibility occlusion boundary polylines*} /$$

Equation B is an approximate expression for the cost of constructing a first-order, conservative, linearized, umbral visibility map using the 3D traversal method of the present invention.

The first term is the cost of testing for unprocessed triangles in the triangle-viewcell shaft of each visited/traversed mesh triangle. This term also assumes that the geometry is organized using a 3D spatial hierarchy.

The second term expresses the overall cost of the 2D mesh traversals to determine visibility of triangle segments on the wedges. Since wedges are generated only on visible silhouette edges by the 3D traversal, the cost is proportional to the number of visible silhouettes $S_V$ rather than the number of all silhouettes S, as in the second term of equation A. The cost of determining visibility on each visible wedge using the 2D mesh traversal is proportional to the number of visible silhouette vertices on the wedge ($V_{svw}$) (which produce rays that are intersected with mesh triangles M) and the number of visible mesh triangle intersection segments ($Seg_v$) (which produce 2D shafts which are checked for intersection with the mesh triangles M). Like the 3D mesh traversal itself, the 2D mesh traversal only generates intersection structures (2D shafts and rays) that are incident on visible structures (respectively segments and silhouette vertices).

The final term is the cost of determining whether the generated discontinuity mesh occlusion boundary segments are from-viewcell occluded or unoccluded. This point-occlusion test can be compared to the point-occlusion test used in the third term of equation A for non-output-sensitive discontinuity mesh method. Both of these point-occlusion tests test intersections of lines with generated wedges. An important difference is that for the 3D mesh traversal method the number of tests required is a function of the number of visible silhouette edges, not the total number of silhouette edges. Hence, for the 3D mesh traversal method the number of wedges that must be intersected for each point occlusion test is generally much lower than the prior-art method ($N*S_V*S_{Vshaft}$ vs $N*S*S_{Shaft}$).

In typical complex 3D models, the number of total silhouette edges is generally much greater than the number of visible silhouette edges and is often greater than the number of visible mesh polygons. Consequently, equation B expresses a more output-sensitive cost function than equation A. This reflects the favorable, output-sensitive, performance characteristics of the 3D/2D method of discontinuity mesh construction.

Estimate of the Computational Cost of Constructing PAU (Using Output-Sensitive Method of FIG. 26)

As previously described the construction of UBPs from wedges requires the additional steps involving wedge× wedge intersections. However the final output of this process is one or more (conservative) PAU which are comprised of the unoccluded front-facing mesh polygons that may be connected by UBPs which are only tangentially visible from the viewcell. The PAU output by the process of FIG. 26 are generally much simpler than the conservative discontinuity mesh output by the process of FIG. 12 since the antumbral boundaries are not present in the PAU. Consequently, the PAU method produces many fewer "regions" that require from-viewcell visibility testing and the testing is a simpler point-in-polyhedron test.

Equation C is an approximate expression for the upper bounds of constructing a conservative PAU using the 3D/2D mesh traversal method.

The terms are:

M=number of polygons in the model

N=number of edges in a viewcell

S=number of first-order silhouette edges in environment $S_{Shaft}$=number of first-order silhouette edges in a shaft formed between a single first-order silhouette edge and the viewcell $M_V$=number of visible polygons in the model $S_V$=number of visible first-order silhouette edges in environment $S_{VShaft}$=number of visible first-order silhouette edges in a shaft formed between a single first-order silhouette edge and the viewcell $V_{vw}$=number of vertices of intersection between all polygons and a single wedge $M_w$=number of mesh polygons intersecting a wedge $V_{svw}$=number of visible (from point or from edge) silhouette vertices on a wedge $Seg_{vw}$=number of on-wedge visible segments of intersection between mesh polygons and a wedge Equation C (Output-Sensitive Mesh Traversal Method for Constructing PAU):

$$\text{Cost} = M_v * \text{Log}M / *3D \text{ shaft test between visible triangles and other triangles} * / + N * S_{V*} S_{VShaft} * (Seg_{vw} * \text{Log}M + V_{svw} * \text{Log}M) / *$$

$$2D \text{ On-wedge traversal} * / + (N * S_V * S_{VShaft})\text{Log}(N * S_V * S_{VShaft}) / *$$

$$\text{On-}UBP \text{ intersections} * / + (M_V^2 * N^2 * S_V^3 * S_{VShaft}^2) *$$

$$\text{Log}(N * S_V * S_{VShaft}) / * \text{Point in polyhedron tests} * /$$

The first term is the cost of testing for untraversed mesh polygons in the shaft between the traversed mesh polygons and the viewcell. This term is identical to the first term in equation B for the 3D mesh traversal method of conservative discontinuity mesh construction.

The second term is the cost of determining on-wedge visibility and is also identical to the second term of equation B.

The third is the cost of constructing wedge-wedge intersections in order to form UBPs from wedges and to resolve the arrangement of the UBPs. Since the arrangement is resolved for every UBP, in some embodiments, the cost is an order of magnitude higher than for the corresponding discontinuity mesh, which does not directly compute the arrangement of occluded and visible volumes in 3 space but only on the surface of the visible mesh manifold.

The final term is the cost of determining if a manifold mesh is occluded by existing PAU. Any manifold regions that are not traversed by the overall process of 3D mesh traversal/PAU construction are either completely visible from the viewcell or completely within a PAU. The number of untraversed manifold regions will, in the general case, be much lower than the number of discontinuity mesh regions which tend to be quadratic in the number of wedges. Therefore the overall cost of the requisite point-in-polyhedron tests for the UBP method tend to be much lower than the from-viewcell visibility testing of discontinuity mesh regions.

Mesh Traversal Implementation: Shaft Intersection Optimizations and Difference Shafts In the mesh traversal method, meshes are traversed one mesh "element" at a time. In one embodiment, of the mesh traversal method shown in FIG. 20, the traversed mesh element is a polygon (triangle). Consequently, in this embodiment, shafts are formed between the traversed triangle and the viewcell in step 2010. Alternative embodiments are possible in which shaft tests use a bounding box around a cluster of traversed polygons (the potential occludees). In this embodiment, a shaft is formed between this bounding box and the viewcell. Mesh elements within this shaft may occlude the potential occludees and are traversed, according to the step 2030, prior to the traversal of the potential occludees. If no elements are within this bounding box-viewcell shaft, then the issue of potential occlusion of entire cluster of potential occludees is resolved with the single bounding box-viewcell shaft. Since the shaft intersection tests are part of the inner loop of the mesh traversal method, any optimization to these tests can significantly improve the performance of the mesh traversal.

If the clusters of potential occludee polygons are chosen carefully, then this shaft test can be further simplified. Connected mesh polygons that form a cluster may self-occlude. If self occlusion is possible within a cluster, then a simple shaft test between the cluster bounding box and the viewcell will not identify the self occlusion, since the self occlusion occurs within the bounding box. If, however, the cluster of potential occludees contains no from-region silhouette edges then self occlusion within the cluster cannot occur and the bounding box test will identify all potential occluders. In one embodiment of the mesh traversal method, clusters of polygons are defined as connected groups of polygons which do not have from-region silhouette edges. These clusters may be further organized using bounding box hierarchies, which can further accelerate the shaft tests.

The mesh traversal method can also use hierarchical bounding boxes or other hierarchical spatial subdivision structures to organize potential occluder polygons into hierarchical groups or elements. This can also significantly accelerate the shaft intersection tests (as well as wedge-mesh polygon and other intersection tests).

In the embodiment of the mesh traversal method shown in FIG. 20, when a potentially occluding element is found to intersect a shaft formed by an potential occludee element, and the viewcell then traversal "jumps" to the potentially occluding element. When such a jump occurs, traversal then proceeds to adjacent mesh polygons, in the usual flood-fill (breadth-first) pattern.

Another technique to improve the performance of shaft intersection tests employs a difference shaft. The polygon-viewcell shafts formed by adjacent polygons on a mesh can be very similar, especially if the polygons are small relative to the viewcell. In such cases it can be more efficient to perform a shaft intersection test for one polygon and then construct the difference shaft for the adjacent polygon. The difference shaft is constructed for adjacent triangles using a simple process. In this process, the polygons are assumed to be convex, in fact triangles are specified in this embodiment.

Two triangles, triangle A and triangle B share a common edge. The shaft between A and the viewcell is called shaft A, and likewise for B. If A and B are joined along their common edge, E, the result is a quadrangle Q. The shaft between Q and the viewcell (called shaft Q) is formed in the usual way using the pivot and sweep process to form the relevant SV-ME and SE-MV supporting polygons. This shaft contains no SV-ME supporting polygons incident on edge E, since E is interior to the quadrangle and to the shaft. A shaft formed between the edge E and the viewcell (again using the pivot and sweep method for constructing supporting polygons) forms the boundary of the volume that is common to both shaft A and shaft B. Therefore the difference shaft representing shaft B minus shaft A can be constructed by subtracting the shaft Q from shaft B. The supporting polygons that form shaft Q contain supporting polygons incident on both triangles A and B. In fact those supporting polygons of Q which are supporting polygons of A exactly separate the shaft Q from the delta shaft B minus A. This relationship leads to a simple and efficient process for constructing the difference shaft: B minus A, when the shaft A (or a difference shaft A minus previous shaft) has already been constructed.

For new triangle B construct, by pivot, both SV-ME supporting polygons incident on edges of triangle B not shared with triangle A. Then construct, by sweep, all SE-MV supporting polygons incident on the vertex of B that is not a vertex of edge E. Identify the single SV-ME supporting polygon of shaft A that is incident on E. Reverse the normal vector of this polygon. This SV-ME supporting polygon becomes one boundary of the B minus A shaft. The other boundary polygons are the SE-MV supporting polygons incident on edge E. These polygons are formed by sweeping from the vertices of edge E to the supporting viewcell vertices corresponding to the other SV-ME supporting polygons of B.

This process allows a simple and efficient construction of the difference shaft of two adjacent triangles by reversing the SV-ME (previously constructed) supporting polygon of the shared edge, and connecting it to SE-MV supporting polygons of the new triangle. The process completely avoids the need for a general purpose constructive solid geometry method to compute the difference of the two shafts.

Figure 27A:
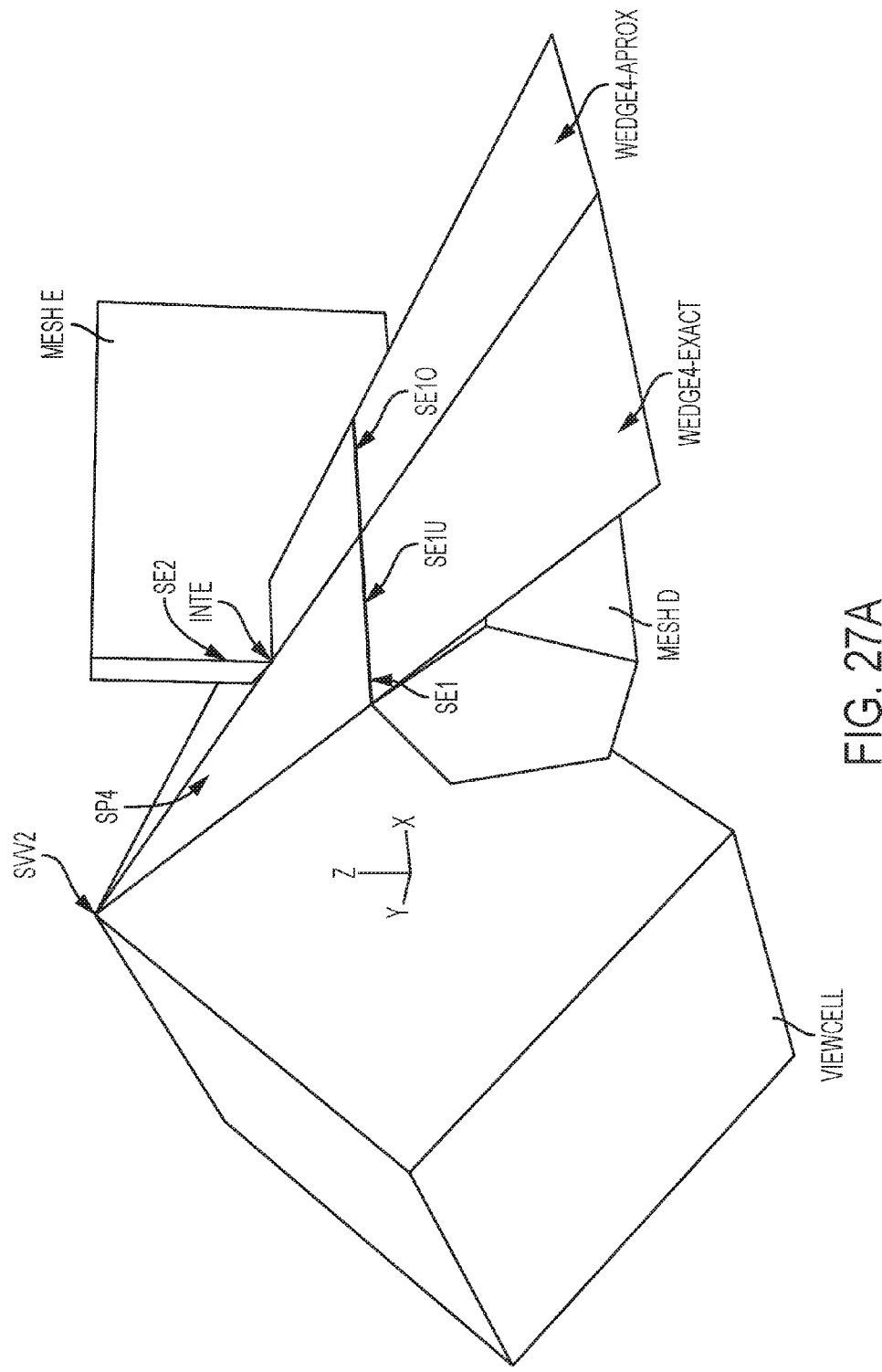
FIG. 27A is an exemplary diagram showing a viewcell and two polygon mesh objects, MESH E and MESH D.

FIG. 27A Drawing Showing Occluded Segments of Supporting Polygon and Corresponding Segments of First-Order Silhouette Edge Supporting Inexact Wedges Wedges constructed using the first-order pivot-and-sweep method described in the first embodiment are exact umbral visibility event surfaces where the corresponding supporting polygon or swept triangle are not intersected by mesh polygons.

Conversely, where the supporting polygon corresponding to a SV-ME wedge (or the swept triangle corresponding to a SE-MV wedge) is intersected by a polygon mesh then the corresponding portions of the wedge may not be the exact umbral visibility event surfaces. This is because where the supporting polygon is intersected by mesh polygons, the supporting viewcell element (vertex for SV-ME wedge, and edge for SE-MV wedge) may be occluded when viewed from the corresponding supported silhouette structure (silhouette edge for SV-ME wedge, and silhouette vertex for SE-MV wedge).

Turning now to FIG. 27A, FIG. 27A is a diagram showing a viewcell and two polygon mesh objects labeled MESH E and MESH D.

A first-order silhouette edge on MESH D with respect to the VIEWCELL is labeled is SE1 and is subdivided into two segments SE1O and SE1U.

A first-order visibility event surface incident on SE1 is labeled WEDGE4 and is subdivided into two portions WEDGE4-EXACT and WEDGE4-APROX.

A first-order SV-ME supporting triangle incident on SE1 is SP4. SP4 is the entire triangle between the point SVV2 and SE1).

SVV2 is the supporting viewcell vertex of SP4 (and WEDGE4). SP4 intersects the triangle mesh MESH E at the point INTE. SVV2 is unoccluded when viewed from segment SE1U of the supporting first-order silhouette edge. Therefore, the corresponding portion of the wedge, WEDGE4-EXACT is an exact umbral visibility event surface.

SVV2 is occluded (by MESH E) when viewed from segment SE1O (O for occluded) of the supporting first-order silhouette edge. Therefore, the corresponding portion of the wedge, WEDG4-APROX, is not an exact umbral visibility event surface but a conservative one. A first-order wedge is exact if and only if its corresponding supporting polygon does not intersect any geometry. Likewise, portions of a first-order wedge are exact if the corresponding portions of the supporting polygon do not intersect any geometry.

This relationship is employed in embodiments of the present invention as an efficient test to determine those portions of a first-order wedge that are exact and those which are approximate. This test is described in conjunction with FIG. 28. For those portions of a first-order wedge that are inexact, in some embodiments, higher-order refinement of the corresponding visibility event surface is conducted using one of the backprojection methods disclosed in the present specification.

A similar analysis applies to swept triangles and the corresponding SE-MV wedges. In this case, the occluded portion of the viewcell edge is determined, according to some embodiments, using a from-point (from-silhouette vertex) visibility method. Occluded subsegments of the swept triangle have corresponding inexact segments of the SE-MV wedges which can be refined using the higher-order backprojection method described later in this specification.

The case of a SE-ME wedge, where the supporting edge and the silhouette edge are parallel, uses a from-segment visibility method to determine those subsegments of the silhouette edge occluded from the source edge. In this case, the intersection of a mesh polygon with the quadrangular supporting polygon does not necessarily produce occlusion of any subsegment silhouette edge from the viewcell edge.

In any case, if a segment of the supporting or supported edge is occluded from the supported or supporting point then the corresponding portion of the first-order wedge is inexact. In such cases a supporting element of the viewcell (supporting viewcell vertex or edge of swept triangle) is not actually visible from the corresponding element of the mesh silhouette edge (first-order silhouette edge or first-order silhouette vertex).

In the case where the supporting viewcell vertex (SVV) is occluded from a segment of the corresponding first-order silhouette edge, the corresponding first-order SV-ME wedge is an inexact, but conservative representation of the visibility event boundary incident on that segment of the first-order silhouette edge. A more precise SV-ME wedge incident on such a first-order silhouette edge segment is obtained, in some embodiments, by subdividing the segment and identifying the visible supporting viewcell vertices (VSVVs) for each of the subsegments.

The VSVV is a point on that portion of the viewcell that is actually visible from a subsegment of the first-order silhouette edge and that is the supporting point between this visible portion of the viewcell and the first-order silhouette edge subsegment. Pivoting from the silhouette edge subsegment to the corresponding VSVV produces an "adjusted" or "higher-order" wedge, which conservatively accounts for partial visibility of the viewcell from the edge.

In embodiments, VSVV is found for a silhouette edge using the method of first-order backprojection described in conjunction with FIG. 22, FIG. 23, FIG. 24 and related figures.

Figure 27B:
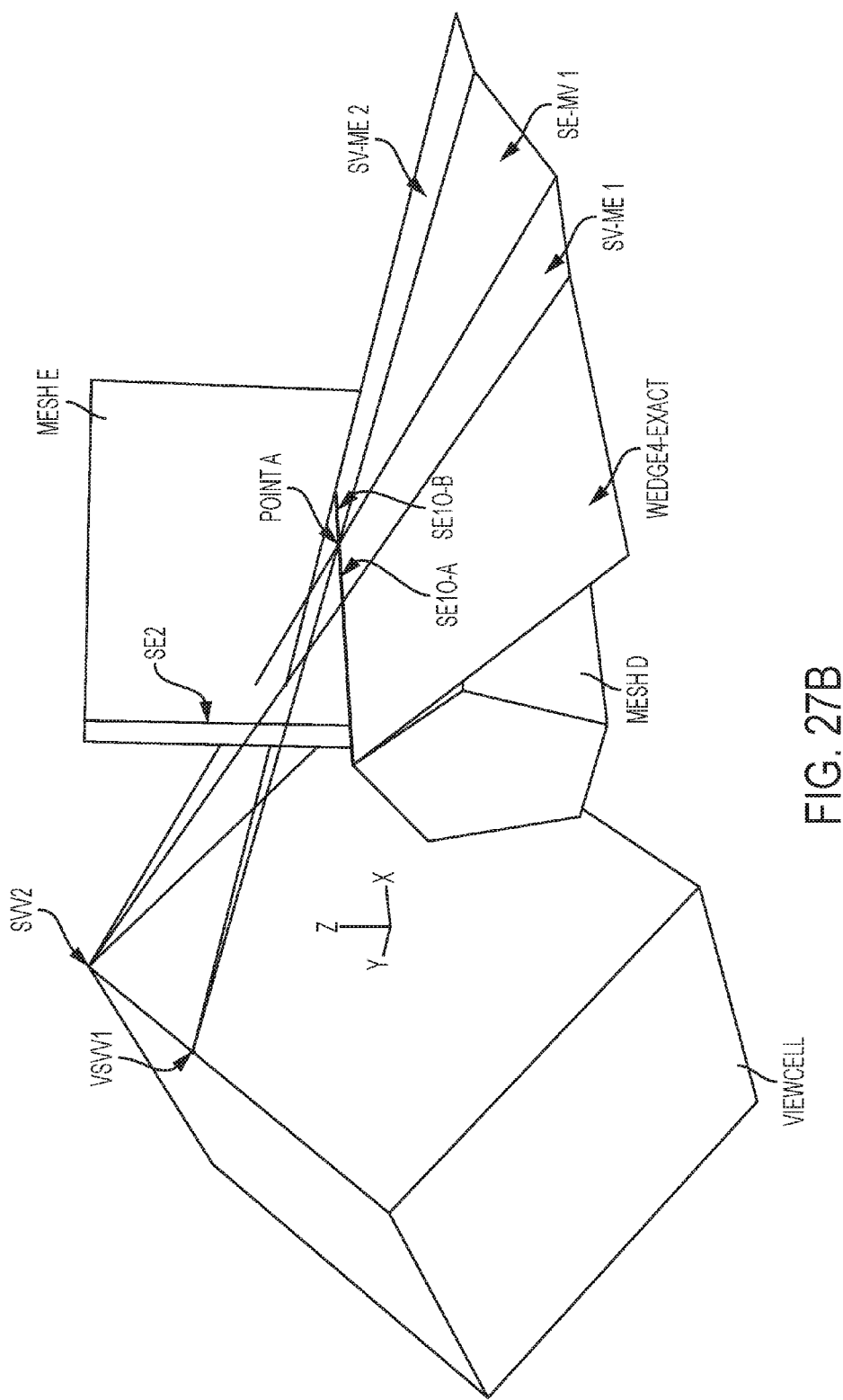
FIG. 27B is an exemplary diagram showing the same view as FIG. 27A except that the inexact portion of the first-order wedge is refined by subdividing the corresponding segment of the first-order silhouette edge and conducting first-order backprojection using the subsegments as a linear light source. The result is that the inexact portion of the wedge is replaced by two SV-ME wedges connected by a single SE-MV wedge which together form a continuous umbral surface that more precisely approximates the actual quadric umbral event surface incident on the inexact segment of the first-order silhouette edge.

FIG. 27B is a diagram showing the same view as FIG. 27A and illustrating the process of constructing higher-order umbral event wedges on the inexact first-order silhouette edge segment (SE1O) by subdividing the segment and conducting first-order backprojection on the subsegments to identify a VSVV corresponding to each of the subsegments.

The inexact first-order silhouette edge segment, labeled SE1O in FIG. 27A, is subdivided into two subsegments SE1O-A and SE1O-B in FIG. 27B.

Using subsegment SE1O-A as a linear light source or linear view region, and following the specified method of constructing first-order visibility event surfaces, a (backprojection) SV-ME wedge is formed on edge SE2 (which is also a first-order silhouette edge with respect to SE1O-A). This wedge intersects the viewcell exactly at the point SVV2. Thus, for subsegment SE1O-A the VSVV is also the SVV (SVV2). Consequently, the corresponding wedge (SV-ME 1) is in the same plane as the exact wedge WEDGE4-EXACT.

Using subsegment SE1O-B as a linear light source and following the specified method of constructing first-order visibility event surfaces, a (backprojection) SV-ME wedge is again formed on edge SE2 (which is also a first-order silhouette edge with respect to SE1O-B). This wedge intersects the viewcell exactly at the point VSVV1. The line shown between POINT A and VSVV1 intersects SE2. The corresponding wedge supported by VSVV1, SV-ME 2, is an "adjusted" or higher-order wedge.

Point A is the point of intersection of the subsegments SE1O-A and SE1O-B. The SE-MV wedges incident on POINT A are constructed using the method shown in FIG. 24C, in which the visible supporting silhouette contour (VSVSC) connecting the VSVVs for the corresponding adjacent subsegments is "swept" to generate the connecting SE-MV wedges. In the case of FIG. 27B, the two VSVVs (SVV2 for SE1O-A, and VSVV1 for SE1O-B) lie on the actual edges of the viewcell and a single SE-MV wedge, SE-MV1 is constructed by the process of FIG. 24C.

This single wedge connects SV-ME 1 and SV-ME 2 to form a continuous umbral event surface which better approximates the exact (quadric) umbral event surface incident on first-order silhouette edge segment SE1O.

Figure 27C:
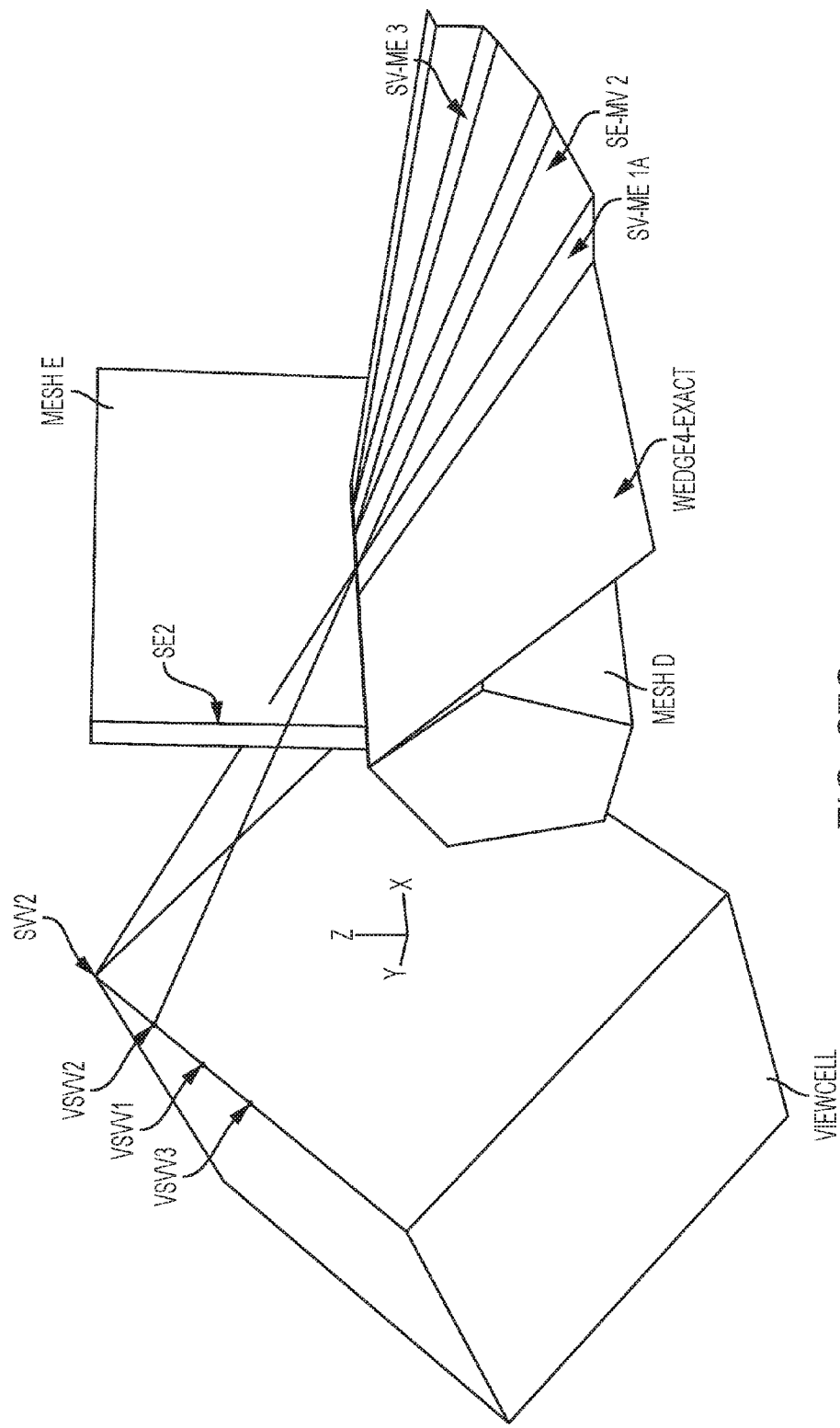
FIG. 27C is an exemplary diagram showing the same view as FIG. 27B except that the subdivision of the inexact portion of the original first-order wedge is now refined by subdividing the corresponding segment of the first-order silhouette into four subsegments instead of two, producing an even more precise approximation to the actual umbral event surface (a quadric) in this region.

FIG. 27C is a diagram showing the same view as FIG. 27B except that the subdivision of the inexact portion of the original first-order wedge is now refined by subdividing the corresponding segment of the first-order silhouette into four subsegments instead of two, producing an even more precise approximation to the actual umbral event surface (a quadric) in this region.

Using the same method as described for FIG. 27B, the VSVV for each of the four subsegments is identified by treating each subsegment as a linear light source and conducting first-order from-source visibility to identify portions of the viewcell visible from the subsegments.

In the case of FIG. 27C, the four subsegments have the four corresponding VSVVs shown. For example, the VSVV corresponding to the subsegment supporting SV-ME 3 is VSVV1. This can be verified buy a using a straight edge on the left hand edge of SV-ME 3, the extended line intersects VSVV1 and SE2.

The connecting SE-MV wedges are constructed using the sweep process between the corresponding VSVVs. For example, the wedge SE-MV 2 is constructed by sweeping between SVV2 and VSVV2, the corresponding supporting (swept) polygon is shown as the thin lines between these two points and the point connecting SV-ME1A and SE-MV 2.

By using a higher subdivision of the inexact first-order silhouette edge segment, a more precise approximation to the exact umbral event surface is obtained.

In fact, the method of subdividing inexact segments and conducting first-order, from-subsegment visibility to construct higher-order wedges amounts to a method of conservatively approximating a single exact quadric surface where the VSVVs lie on a viewcell edge and there is one intervening edge.

Unlike previous methods of quadric construction (e.g., the point-line-plane parameterization) the present method using first-order backprojection insures that the constructed surface conservatively approximates the exact quadric umbral event surface.

Figure 27D:
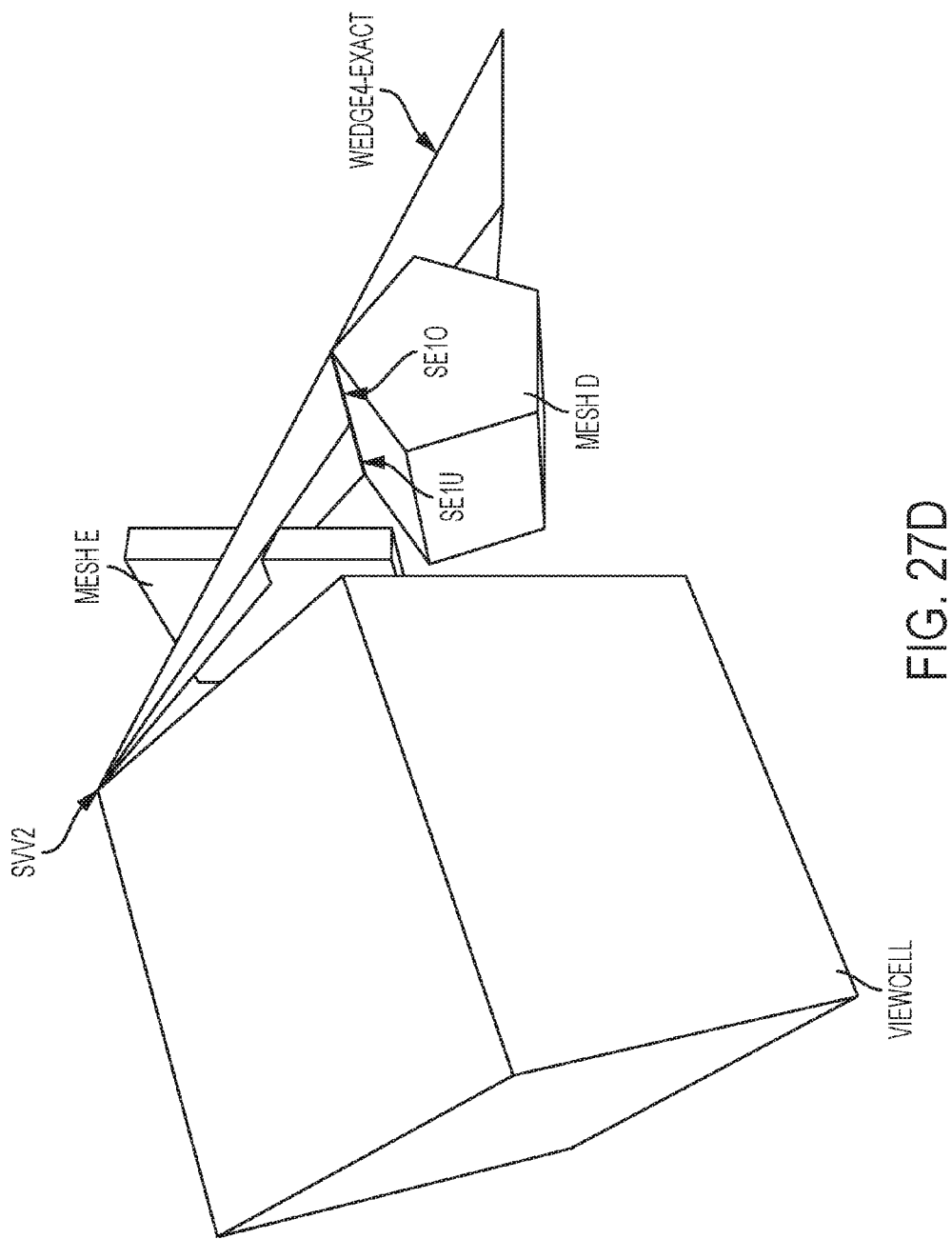
FIG. 27D is an exemplary diagram of the same structures as FIG. 27A from a different view (from slightly behind the viewcell) showing that the first-order silhouette edge having segments SE1U and SE1O is first-order visible from the viewcell.

FIG. 27D is a diagram of the same structures as FIG. 27A from a different view (from slightly behind the viewcell) showing that the first-order silhouette edge having segments SE1U and SE1O is first-order visible from the viewcell.

Figure 28:
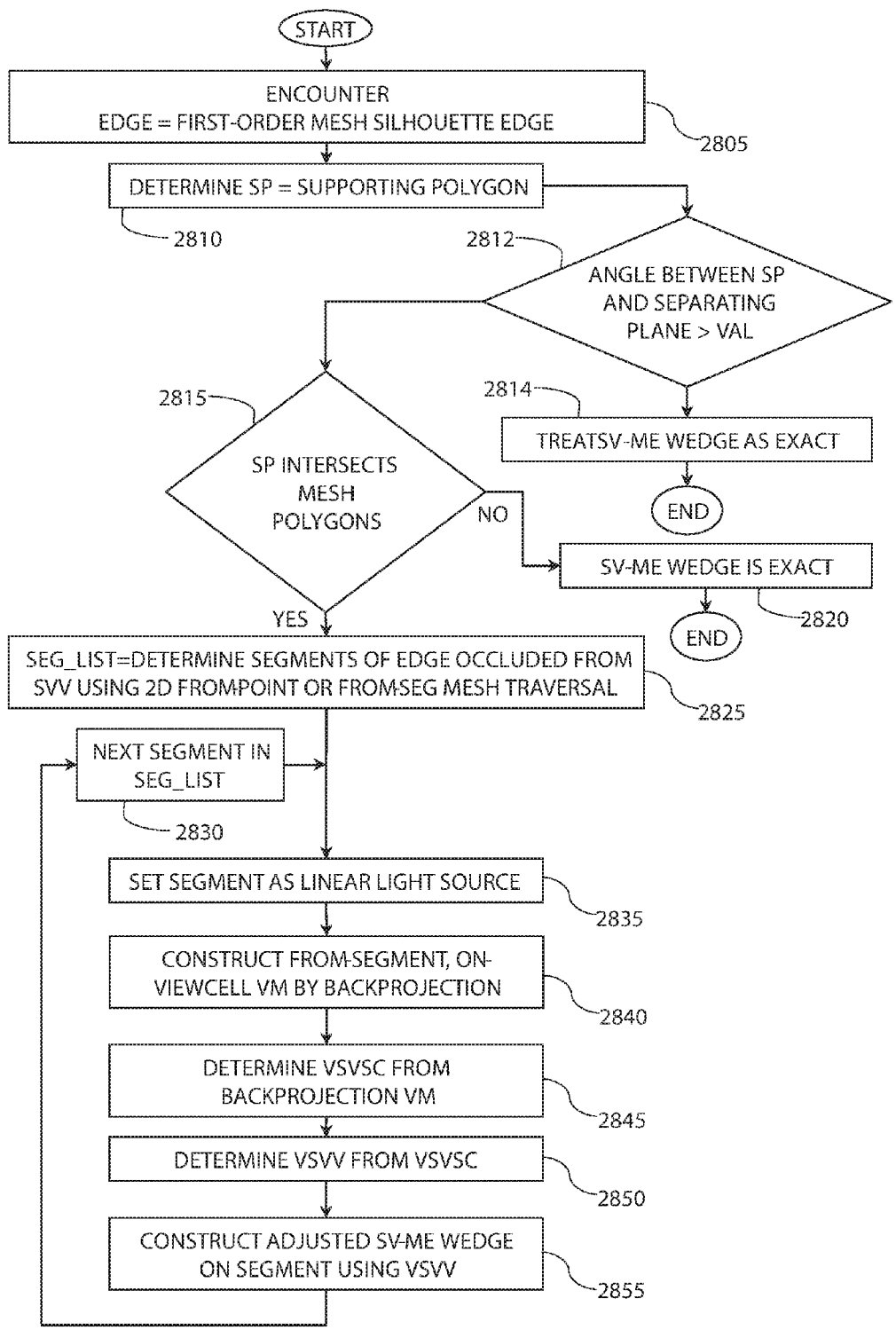
FIG. 28 is an exemplary flowchart showing a method of controlling the from-edge backprojection process by examining maximal possible deviation between first-order and exact wedge, and by identifying segments of silhouette edge for which first-order wedge is inexact.

FIG. 28 A Method of Controlling From-Edge Backprojection Process by Examining Maximal Possible Deviation Between First-Order and Exact Wedge, and by Identifying Segments of Silhouette Edge for which First-Order Wedge is Inexact FIG. 28 is a flowchart showing the overall process of identifying segments of first-order silhouette edges from which the corresponding SVV is occluded, and determining a VSVV for each of said segments by backprojection.

In embodiments, process flow starts at step 2805 upon encountering a first-order silhouette edge. This encounter may occur during the 3D traversal process shown in FIG. 20, and specifically in the step 2020.

Process flow proceeds to step 2810 to construct the supporting polygon using the process shown in FIG. 4. This step would be performed as part of the construction of initial wedges, for example in step 2045 of FIG. 20.

Process flow proceeds to decision step 2812, to determine if the angle between the supporting polygon and the separating polygon exceed a predetermined value (VAL). The separating plane incident on the first-order silhouette edge is formed by pivoting to the viewcell using the opposite pivot direction employed in constructing the supporting polygon.

According to some embodiments, using the backprojection process, the maximum possible adjustment of a SV-ME wedge that can be achieved occurs when the VSVV, calculated in the backprojection, is close to the viewcell vertex intersecting the separating plane incident on the silhouette edge.

This maximum deviation depends on the size of the viewcell and the distance of the silhouette edge from the viewcell. In general, especially for small viewcells, this maximum angular deviation decreases with distance from the viewcell as the viewcell becomes more "point-like" from silhouette edge as backprojection light source.

Thus, if, in decision step 2812, it is determined that the angle between the supporting polygon and the separating plane is less than a specified value (VAL), processing proceeds to step 2814, where the SV-ME wedge is treated as exact and no processing to "adjust" the wedge to reflect higher-order visibility is conducted.

If, on the other hand, in decision step 2812, it is determined that the angle between the supporting polygon and the separating plane is greater than a specified value (VAL), processing proceeds to decision step 2815 to determine if the supporting polygon intersects any mesh polygons. If the supporting polygon does not intersect any mesh polygons, then the corresponding first-order wedge is exact and process flow proceeds to step 2820.

In some embodiments the value of the variable VAL is selected by a user. A high value of VAL will tend to result in using first-order wedges, which may be less precise but faster to generate. A low value of VAL will bias the process toward generating higher-order wedges, which are more precise but generally take longer to construct.

Step 2820 indicates that no adjustment of the wedge is performed.

If, in decision step 2815, it is determined that the supporting polygon intersects any mesh polygons, then the process proceeds to step 2825, where the segments of the mesh silhouette edge for which the SVV is occluded are determined. If the supporting polygon is a triangle, then this problem is equivalent to identifying the segments of the silhouette edge that are occluded from the SVV. This is a 2D visibility problem that can be solved, in some embodiments, using a simplified implementation of the 2D mesh traversal process shown in FIG. 15. In this implementation, the 2D mesh traversal process employs from-point (SVV) silhouette vertices in step 1520, since an exact from-point visibility solution is required.

In some embodiments, this approach is also employed in the special case of a SE-ME quadrangular supporting polygon. In this case, the process determines the segments of the supporting viewcell element (VCE is an edge in this case) visible from the supported silhouette edge. In this case, the silhouette edge definition employed in step 1520 of FIG. 15 is from-edge. In both cases, wedge lines are constructed by pivoting to the supporting element which is either a viewcell point, in the case of SV-ME supporting polygons or a silhouette edge for SE-ME supporting polygons. In the SE-ME case the result of this determination on the supporting quadrangle is a set of subsegments of the viewcell edge comprising a backprojection visibility map from the silhouette edge onto the viewcell edge.

The occluded sub-segments identified in step 2825 are stored in the SEG_LIST.

In subsequent steps 2835-2855 the segments of the SEG_LIST are processed.

Process flow proceeds from step 2825 to step 2835, where the segment of the first-order silhouette edge for which the SVV (or, in the case of a SE-ME supporting quadrangle, segments of the supporting viewcell edge) is occluded is set to be a linear light source for the backprojection process.

Process flow proceeds to step 2840, where the from-segment, on-viewcell visibility map corresponding to the segment being processed is constructed using the linear light source of step 2835. The construction of this visibility map, in some embodiments, uses the 3D mesh traversal process for from-edge backprojection shown in shown in FIG. 22, FIG. 23, FIG. 24 and related figures.

Process flow proceeds to step 2845 to determine the from-segment visible supporting viewcell silhouette contour (VSVSC) from the VM.

Process flow proceeds to step 2850 to determine the visible supporting viewcell vertex (VSVV) corresponding to the segment as the supporting vertex of the VSVSC determined in step 2845. As before, the vertex of the VSVSC producing the smallest pivoting angle is the VSVV.

Process flow proceeds to step 2855 to adjust the first-order wedge supported by the segment such that the wedge is not supported by the VSVV instead of the SVV.

Figure 29:
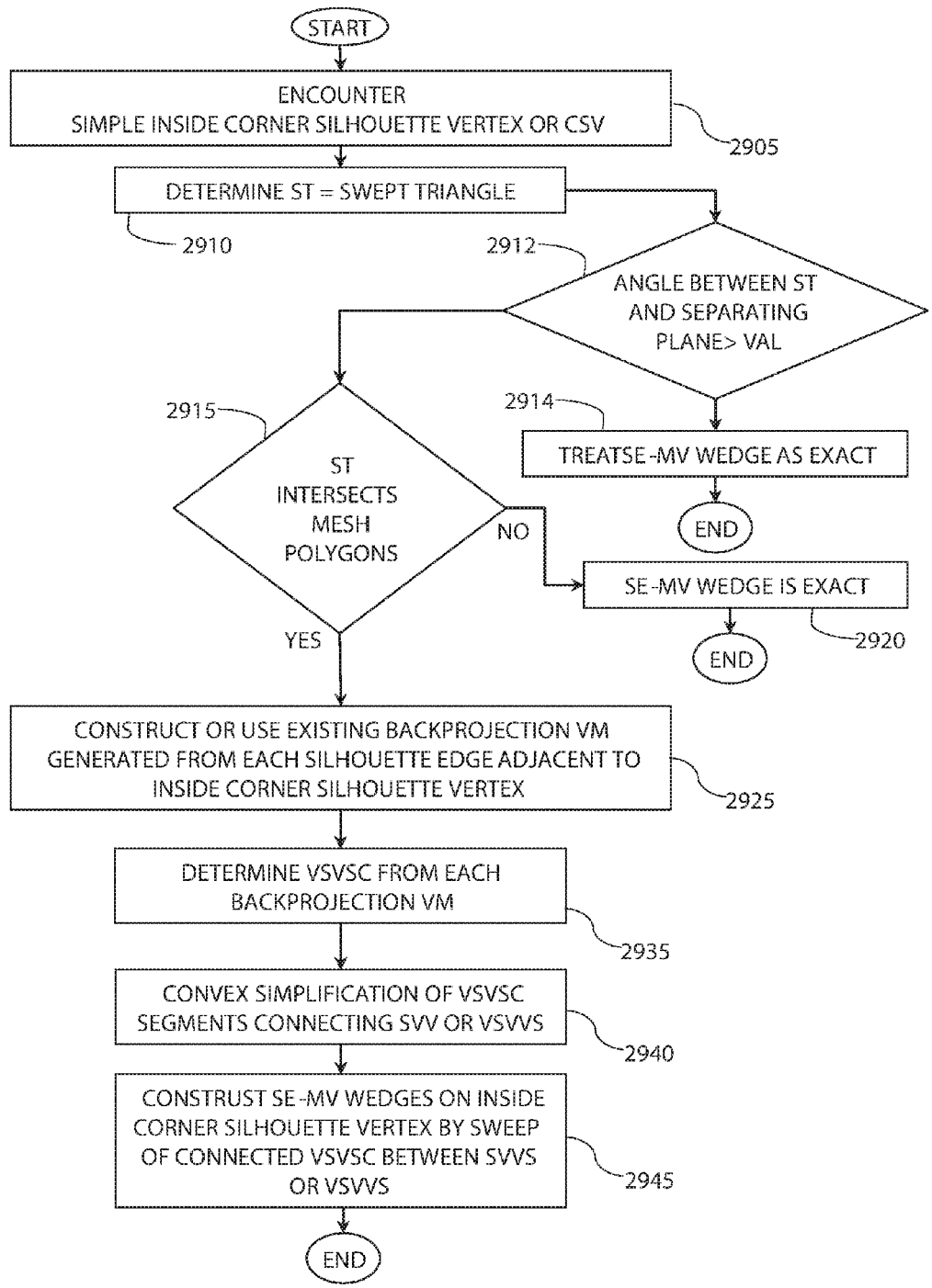
FIG. 29 is an exemplary flowchart showing control of from-edge backprojection process by examining maximal possible deviation between first-order and exact wedge, and by identifying simple and compound inside-corner silhouette vertices for which first-order se-mv wedge(s) are inexact.

FIG. 29 Flowchart Showing Control of From-Edge Backprojection Process by Examining Maximal Possible Deviation Between First-Order and Exact Wedge, and by Identifying Simple and Compound Inside-Corner Silhouette Vertices for which First-Order SE-MV Wedge(s) Are Inexact.

FIG. 29 is a flowchart showing the overall process of identifying segments of viewcell edges, which are occluded from simple or compound inside corner silhouette vertices supporting a swept triangle (a supporting polygon formed between simple or compound inside corner silhouette vertices and viewcell edges by the sweep process) between the silhouette vertex and the viewcell edge.

In embodiments, process flow starts at 2905, where an inside corner vertex of a mesh silhouette contour is encountered. As previously described, this inside corner may be a vertex of a simple silhouette contour or it may be a vertex of a compound silhouette vertex (CSV) caused by the intersection of a wedge and a mesh silhouette edge. The inside corner status is determined, as previously described, using the relative orientation of the silhouette edges forming the corner vertex.

Process flow proceeds to step 2910, to form the swept triangles between the inside corner vertex and the extremal viewcell silhouette contour as previously described using the process shown in FIG. 5A and FIG. 5B. This step would be performed as part of the construction of initial primary and secondary wedges, for example in steps 2045 and 2060 of FIG. 20.

Process flow proceeds to 2912 to determine if the angle between the supporting polygon and the separating polygon exceed a predetermined value (VAL). The separating plane incident on the first-order silhouette edge is formed by pivoting to the viewcell using the opposite pivot direction employed in constructing the supporting polygon. For SE-MV wedges, this is determined by examining the adjacent SV-ME wedge(s).

Thus if, in decision step 2912, is determined that the angle between the adjacent supporting polygon and the separating plane is less than a specified value (VAL), process flow proceeds to step 2914, where the SE-MV wedge is treated as exact and no processing to "adjust" the wedge to reflect higher-order visibility is conducted. An adjacent SV-ME supporting polygon, by definition, lies in the supporting plane formed by the corresponding first-order silhouette edge and the supporting viewcell vertex. The angle between this supporting plane and the separating plane (formed by pivoting about the same first-order silhouette edge toward the viewcell but in the opposite direction) gives that maximum possible deviation between a the corresponding first-order wedge and its corresponding higher-order or adjusted wedge.

If, on the other hand, in decision step 2912, it is determined that the angle between the supporting polygon and the separating plane is greater than a specified value (VAL), process flow proceeds to decision step 2915 to determine if the supporting polygon intersects any mesh polygons. If the supporting polygon does not intersect any mesh polygons then the corresponding first-order wedge is exact and processing proceeds to step 2920 to indicate that no adjustment of the wedge is performed. In this case, no adjustment of the wedge incident on the silhouette edge is performed.

If, in decision step 2915, it is determined that the supporting polygon intersects any mesh polygons, then process flow proceeds to step 2925, where the backprojection visibility maps VM for the silhouette edges sharing the inside corner silhouette vertex are constructed. In embodiments, the construction of this visibility map uses the 3D mesh traversal process for from-edge backprojection shown in shown in FIG. 22, FIG. 23, FIG. 24 and related figures. If the corresponding VM for one or both of the adjacent silhouette edges have already been constructed (for example by the process of FIG. 28), then process flow proceeds to step 2935, where the VSVSC are determined from the VM constructed in step 2925. The construction of each VSVSC from the VM can include, in some embodiments, a convex simplification step.

Process flow proceeds to step 2940, where the relationship between the VSVSC from the adjacent edges is examined and the conservative composite VSVSC connecting the corresponding the SVV and/or VSVV for each adjacent edge is examined. This step employs the process of FIG. 24C to determine if a convex simplification should be performed to insure a conservative visible supporting viewcell silhouette contour connecting the two corresponding SVV and/or VSVV.

Process flow proceeds to step 2945 to construct the adjusted SE-MV wedges incident on the inside corner mesh silhouette vertex by sweeping the SVV and/or VSVV corresponding to adjacent silhouette edges. This sweep connects the SVV and/or VSVV on the shared VSVSC (or a conservative simplification of the VSVSC) determined in 2940.

The resulting SE-MV wedges reflect the higher-order effects of geometry which partially occludes the viewcell as viewed from the inside corner silhouette vertex. Process flow terminates at 2945

Figure 30A:
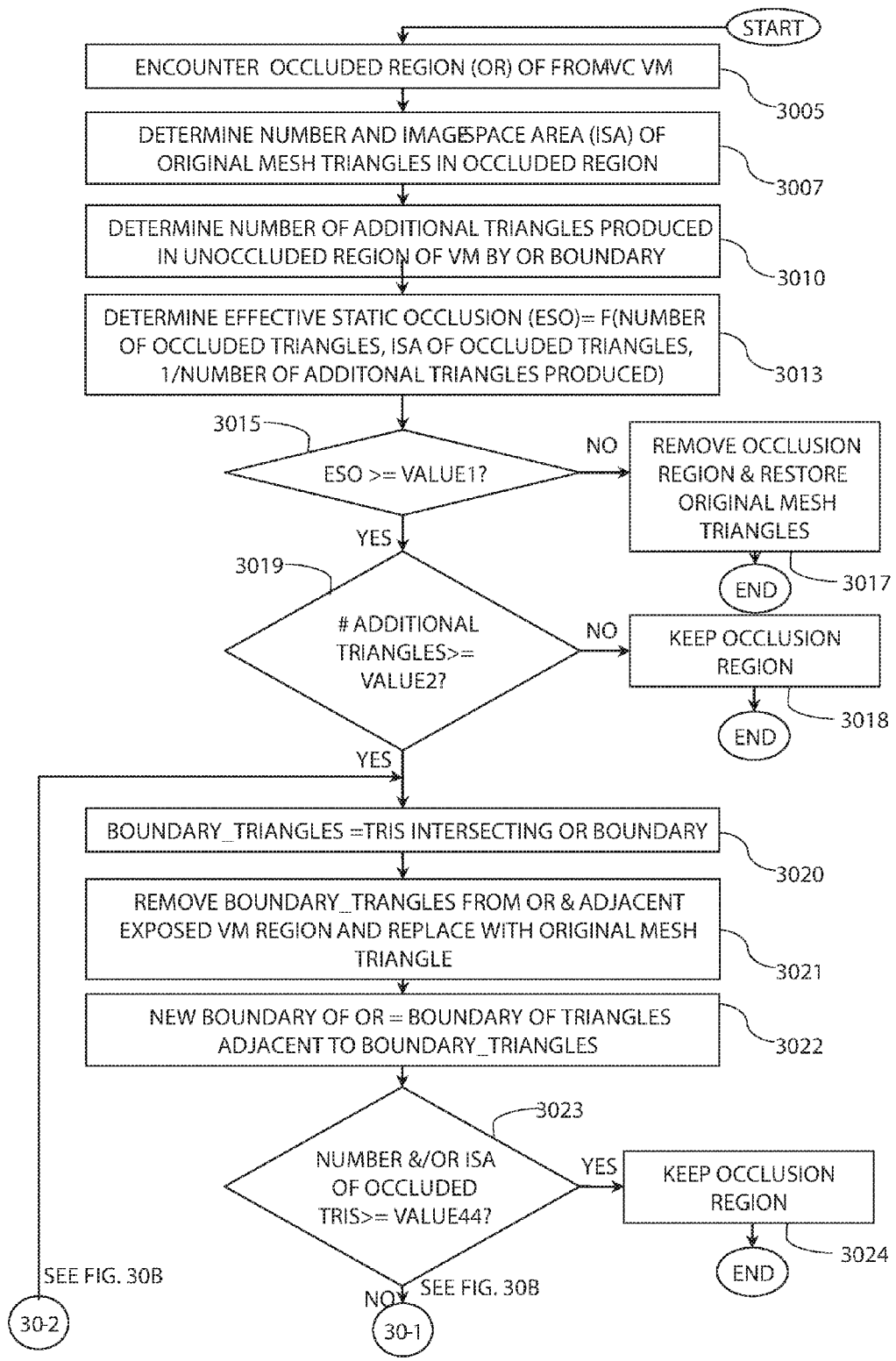
FIG. 30A is an exemplary flowchart showing method of identifying from-viewcell-occluded regions in visibility map having high effective static occlusion (ESO) and the process of conservatively simplifying both the occluded region boundary and the corresponding mesh silhouette contour.
Figure 30B:
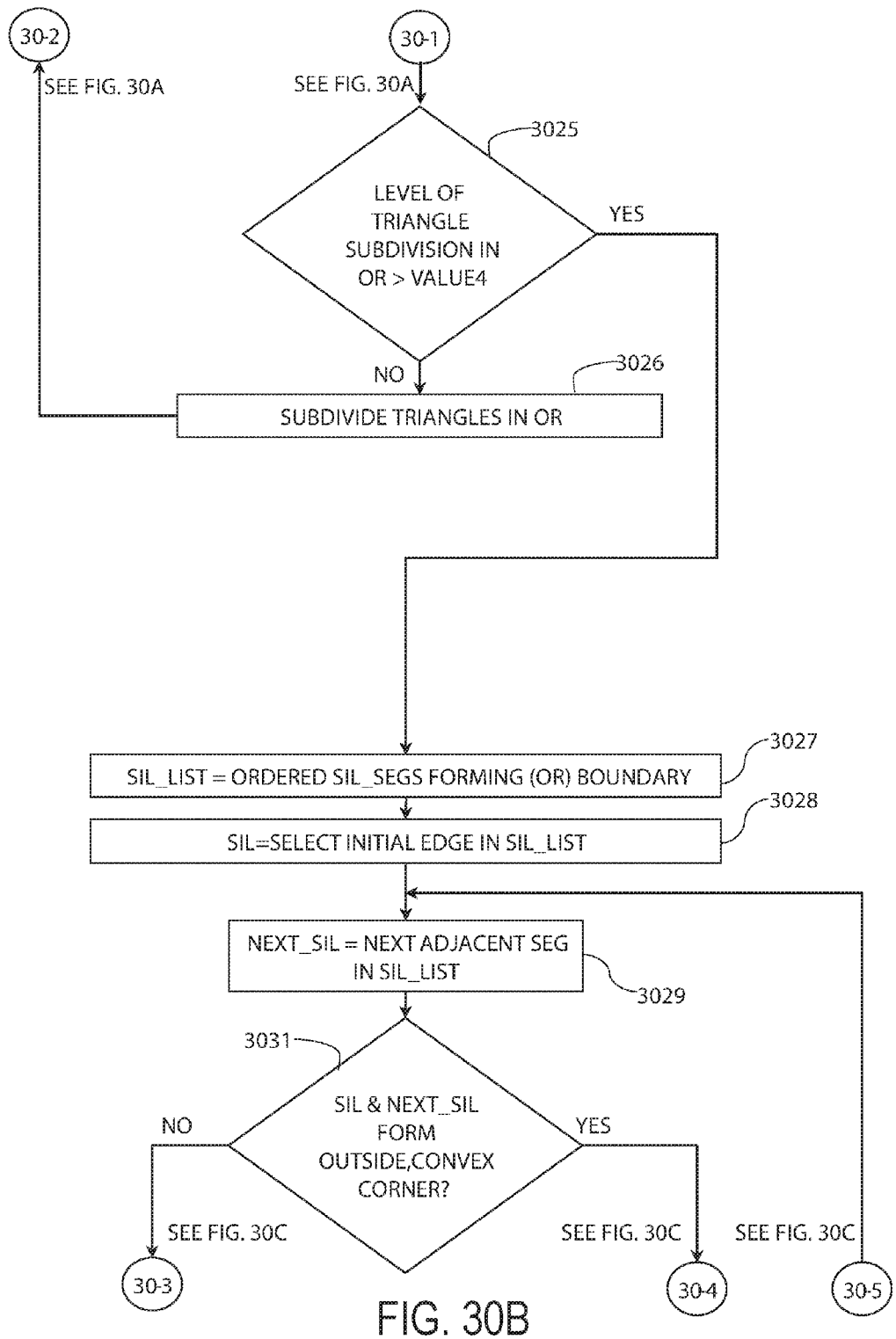
FIG. 30B is a continuation of FIG. 30A.
Figure 30C:
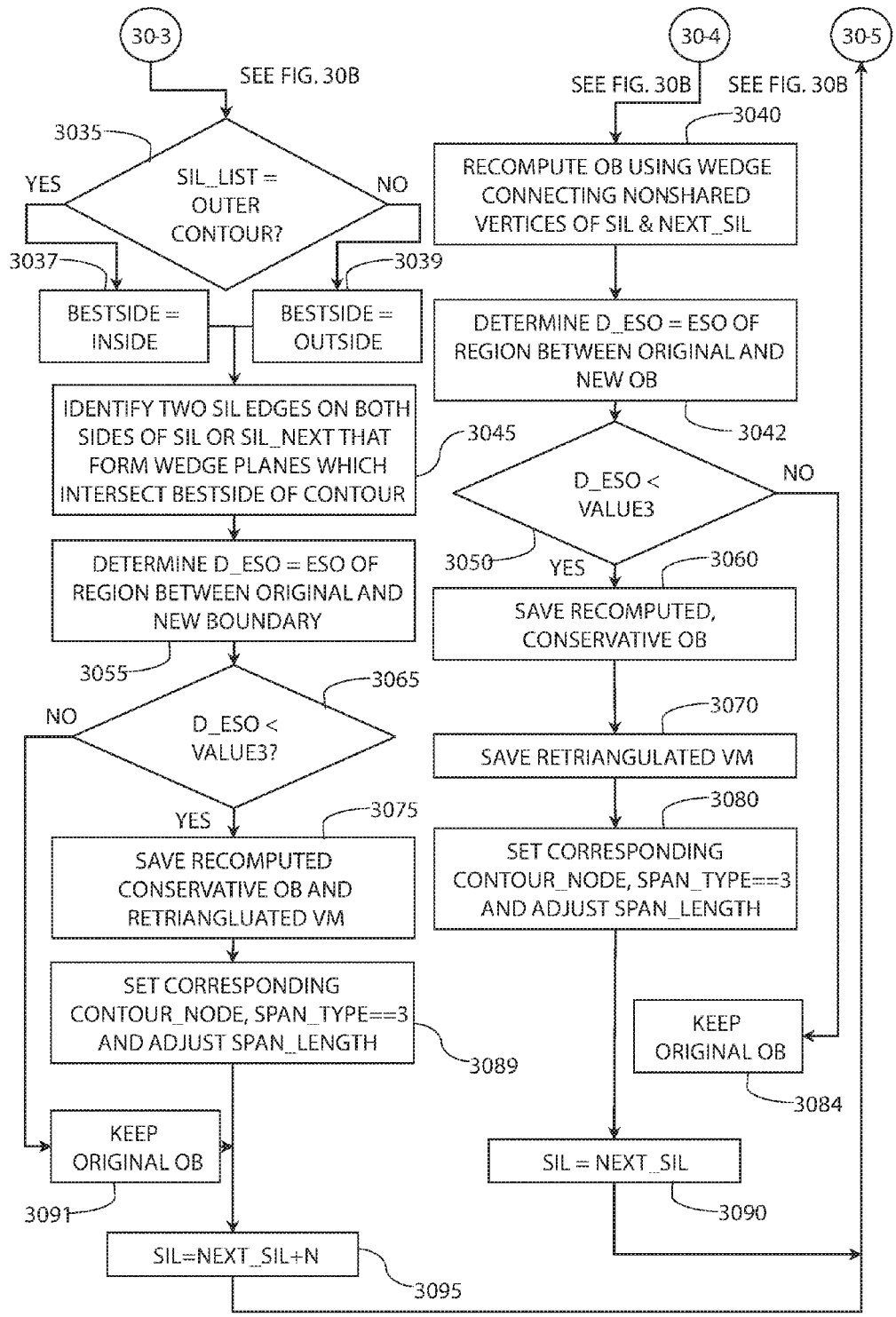
FIG. 30C is a continuation of FIG. 30B.

FIG. 30A, FIG. 30B, and FIG. 30C Comprise a Flowchart Showing Method of Identifying From-Viewcell-Occluded Regions in Visibility Map Having High Effective Static Occlusion and the Process of Conservatively Simplifying Both the Occluded Region Boundary and the Corresponding Mesh Silhouette Contour The 3D mesh traversal process (FIG. 20 and related figures) is an efficient method of constructing a conservative from-viewcell visibility map. The selective use of linearized backprojection techniques (FIG. 23 and related figures) allows the precision of the resulting visibility map (and related PVS) to be increased in regions where the linearized visibility event surfaces deviate substantially from the exact (generally quadric). This adaptive refinement comes at a cost of increasing the number of linearized event surfaces, and hence visibility map occlusion boundary (OB) segments, used.

In general, a PVS derived from a visibility map computed at a high precision results in less overdraw during runtime rendering, since more occluded polygon area is identified and removed.

However, each OB segment of the occlusion map also results in additional polygons being added to the visibility map/PVS as a consequence of retriangulation of the original triangles intersected by the OB segment. (For one method of retriangulation see M. de Berg, M. van Dreveld et. al in "Computational Geometry Algorithms and Applications, Springer c. 1997, page 45, the entire contents of which are incorporated by reference herein). This additional geometry tends to slow runtime rendering simply by increasing the number of primitives submitted to the initial geometry stages of the graphics pipeline.

In order to reduce the overall cost of runtime rendering, embodiments include a method of balancing the reduced cost of rasterization produced by an occluded region against the increased cost of geometry processing incurred because of the additional geometry introduced by the occluded region.

This method employs a heuristic called effective static occlusion (ESO) eliminate occluded regions which correspond to occluded regions of small area, especially if they introduce large numbers of additional triangles.

In a related method, the ESO is also used to guide the conservative simplification of occlusion boundaries, while attempting to maximize the surface area of the occluded region.

In some embodiments, the process of FIG. 30A-FIG. 30C is conducted as an off-line visibility precomputation. The result is an optimized from-region visibility map and related PVS. A related method of efficiently storing the results of the visibility map by labeling specific edge contours of the mesh polygons as silhouette edges associated with occluded regions having high effective occlusion is presented in conjunction with FIG. 31, FIG. 34 and related figures. In this method, the visibility map/PVS for a viewcell can be efficiently computed from the visibility map/PVS of an adjacent (or containing) viewcell at runtime using the pre-labeled silhouette edges. The method of FIG. 30A-FIG. 30C includes steps to not only simplify occlusion boundaries of the visibility map, but also store this information as the corresponding simplified silhouette contours of the original mesh objects. This process is performed as precomputation to prepare for the actual incremental construction of visibility map/PVS data using the runtime methods of FIG. 36 and related figures.

In some embodiments, process flow starts at step 3005, upon encountering an occluded region (OR) of a visibility map.

Process flow proceeds to step 3007 to determine the number of original mesh triangles completely occluded in this OR. In an alternative embodiment, the number of original mesh triangles that are partially occluded is determined. Also in step 3007, the image-space area of the completely and partially occluded original mesh triangles in this OR is estimated using a viewpoint inside the viewcell for which the visibility map was constructed.

Process flow proceeds to step 3010 to determine the number of additional triangles (in the unoccluded region bordering the current OR) that are produced by retriangulation of the original mesh triangles at the OR boundary.

Process flow proceeds to step 3013, where the measured values determined in step 3007 and 3010 are employed to determine the value of a heuristic variable called the effective static occlusion (ESO) for the entire OR.

In some embodiments the ESO is a variable that is determined to be in some proportion to the image space area (ISA) of the occluded triangles/triangle fragments in the OR. In further embodiments, the ESO heuristic also includes a coefficient of this term which, reflects the runtime cost of rasterization.

According to some embodiments, the ESO is determined to be in some inverse proportion to the number of additional unoccluded triangles produced in the mesh as a result of retriangulation at the OR border. In additional embodiments the ESO heuristic also includes a coefficient of this term, which reflects the runtime cost of geometry processing as well as another coefficient reflecting the storage and transmission cost of the additional triangles. Although using the incremental runtime PVS construction method of FIG. 36 and related figures, the storage/transmission costs of these additional triangles can be eliminated by conducting the retriangulation at runtime.

According to some embodiments, the ESO is represented by the following formula: ESO=F (number of occluded polygons, image space area of occluded polygons, 1/number of new visible polygons added at occlusion boundary). In further embodiments, the ESO can be represented by any desired function.

Other embodiments of the present method are possible which include additional variables in the determination of the "effectiveness" of a particular OR in producing occlusion that actually results in improved runtime rendering performance.

Process flow proceeds from 3013 to decision step 3015 to determine if the ESO is greater than or equal to a specified value, VALUE1. If, in decision step 3015, it is determined that the ESO is not greater than or equal to the value VALUE1, then process flow proceeds to step 3017, where the entire OR is removed from the VM and the original, unretriangulated, triangles of the polygon mesh are restored.

In this regard, in embodiments, when the ESO associated with OR is not greater than or equal to VALUE 1, the OR is not an effective occlusion boundary. For example, as the number of new triangles created by the retriangulation process increases, the ESO value decreases indicating that it may not be efficient to keep the OR, which causes the retriangulation process. Process flow terminates at 3017.

Alternate embodiments are possible in which only those original mesh triangles that are partially occluded are restored but the OR is kept. The partially occluded triangles are those which produce additional triangles by retriangulation at the boundary of the OR (the OB). By restoring only these triangles, the number of triangles in the VM is reduced but completely occluded triangles are still removed from the VM/PVS.

If, on the other hand, in decision step 3015 it is determined that the ESO is greater than or equal to the value VALUE1, then process flow proceeds to step 3019 to determine if the additional number of triangles constructed in the unoccluded region bordering the current OR as a result of the OR boundary, exceeds a number VALUE2.

If, in decision step 3019, it is determined that the additional number of triangles constructed is not greater than or equal to VALUE2, then process flow proceeds to step 3018, where the current OR (and the triangles produced by retriangulation on the boundary of the current OR) are kept unmodified. In this regard, if the number of additional triangles is small, it may be more efficient to keep the OR.

If, on the other hand, it is determined in step 3019 that the additional number of triangles constructed is greater than or equal to VALUE2, then process flow proceeds to step 3020.

Steps 3020-2026 implement a method attempting to reduce the number of additional triangles induced on the adjacent unoccluded region by conservatively removing the triangles in the OR and adjacent exposed regions of the VM that intersect the occlusion boundary of the OR. Using this approach, the triangles in the adjacent unoccluded regions that previously were restricted at the OR occlusion boundary are now considered to be completely unoccluded, and the restricted triangles are replaced with the original mesh triangles. This conservatively increases the area of the unoccluded from the corresponding viewcell and reduces the number of triangles by eliminating retriangulation at the occlusion boundary.

Process flow proceeds to step 3020, where the BOUNDARY_TRIANGLES are identified as those triangles intersecting/bordering the occlusion boundary of the VM occlusion region.

Process flow proceeds to step 3021, where the BOUNDARY_TRIANGLES are removed from the OR and the corresponding (retriangulated) boundary triangles are removed from the adjacent exposed region of the VM and replaced with the original, larger, untriangulated mesh triangles. These larger triangles include some surface area that was originally included only in the occluded region, but after the untriangulation step of 3021 the larger original triangles are considered to be completely unoccluded, even though parts of the triangles may be inside the occluded region.

Process flow proceeds to step 3022, where the new boundary between the OR and the adjacent exposed regions is set to the polyline boundary formed by the triangles of the OR that are adjacent to the original mesh triangles identified in step 3021. This step conservatively redefines the boundary of the OR to be inside the originally computed OR. It also potentially reduces the complexity of the boundary and the number of triangles in the OR by conservatively redefining the OR boundary.

Subsequent decision step 3023 is similar to decision step 3015 and in this case determines if the simple, conservative redefinition of the occlusion boundary along the edges of original mesh triangles, as determined in steps 3020-3022, has resulted in an occlusion region that occludes a sufficient number of triangles and/or occludes triangles having a sufficient image-space area.

If, in decision step 3023, it is determined that the number and/or image-space area of the occluded triangles exceeds a predetermined value (e.g. VALUE44), then process flow proceeds to step 3024, where the occlusion region and adjacent exposed regions are retained in their current state.

If, on the other hand, it is determined that the number of, or ISA (image-space surface area) of triangles in the OR do not exceed the predetermined value then process flow proceeds to process 5-1, which starts at decision step 3025 (FIG. 30B) to determine if the level of triangle subdivision in the OR exceeds a certain value (e.g. VALUE4).

If, in decision step 3025, it is determined that the level of subdivision of the triangles in the OR do not exceed the predetermined value, then process flow proceeds to step 3026, where the triangles of the OR are further subdivided (e.g., using midpoint-edge subdivision to create 4 triangles from 1). This procedure, along with the test of 3025, allows very large triangles in the OR, which also extend into adjacent exposed regions, to be progressively subdivided into smaller triangles until the number of triangles and/or ISA of triangles in the occluded region exceed the value VALUE44 (step 3023) or until the level of subdivision exceeds the VALUE4. Process flow proceeds from 3026 to process 30-2, which returns process flow to step 3020 (FIG. 30A).

If, in decision step 3025, it is determined that the level of subdivision of triangles in the OR exceeds a predetermined value, then process flow proceeds to step 3027 to conservatively simplify the ORs occlusion boundary. These simplifications are executed to increase the ESO of the OR.

In step 3027 the in-order list of silhouette edges forming the silhouette contour (from which the occlusion boundary (OB) segments comprising the boundary of the current OR were constructed) is stored as an array SIL_LIST. For any inside-corner silhouette vertex (whether simple or compound) the associated viewcell silhouette edges of the VSVSC are also stored in the SIL_LIST, since they also have corresponding wedges which contribute to the OR boundary.

Process flow proceeds to step 3028 to store the initial segment of the array in the variable SIL.

Process flow proceeds to step 3029 to store the next segment in the SIL_LIST in the variable NEXT_SIL.

Process flow proceeds to decision step, 3031 to determine if SIL and NEXT_SIL form an outside (convex) corner of the silhouette contour.

If, in decision step 3031, it is determined that SIL and NEXT_SIL form an outside (convex) corner of the silhouette contour (and corresponding OR boundary), then process flow proceeds to process 30-4, which starts at step 3040, to construct a SV-ME wedge on a line segment connecting the non-shared vertices of SIL and NEXT_SIL. Using the previously specified method of VM map construction, the wedge is intersected with the mesh polygons to form DM_SEGS which are tested for from-viewcell visibility to determine if they are valid OB_SEGS of the VM. These new conservative OB_SEGS may intersect mesh triangles and other OB_SEGS not intersected by the original OR boundary.

Process flow proceeds to step 3042 the ESO of the region between the new OB and the original OB is determined and stored in the variable D_ESO (indicating the ESO of the difference region between the old and new OBs). This ESO estimates the "effectiveness" of the occlusion region that has just been removed by the conservative repositioning of the OB.

Process flow proceeds to step 3050 to determine if the D_ESO is less than a predetermined value VALUE3.

If in decision step 3050 it is determined that the D_ESO is less than the predetermined VALUE3, then process flow proceeds to step 3060. If the D_ESO of the difference region is low, then the number of triangles occluded in the difference region is small and/or they have a relatively small surface area. Also a low D_ESO value may indicate that there are many partially occluded mesh triangles in the difference region that will cause additional geometry by retriangulation.

In step 3060, reached because the difference region has a relatively low D_ESO value, the conservative boundary of the OR recomputed in step 3040 is saved as the new OR boundary for the region of the map.

Process flow proceeds to step 3070, where the retriangulated triangles introduced by the new OR boundary are also optionally saved. Again mesh triangles that are partially occluded can be conservatively considered to be unoccluded, thereby reducing the amount of new geometry that would have been produced by retriangulation.

Process flow proceeds to step 3080, where the data for the two silhouette edges SIL and NEXT_SIL, which have been effectively collapsed into a single conservative silhouette edge is removed from the linked list representing the labeled from-viewcell silhouette contour of the mesh object. As discussed in detail, in conjunction with FIG. 31 and related figures of the embodiments, the labeled silhouette edge data is stored as a link list of data structures corresponding to simple silhouette vertices and CSVs. In step 3080, a single node of the linked list (CONTOUR_NODE) is modified to reflect the collapse of the edge.

If in decision step 3050 it is determined that the D_ESO of the difference region is not less than a predetermined value, then process flow proceeds to step 3084, where the original OB is retained since the difference region tends to effectively occlude relatively large numbers of mesh triangles or portions of mesh triangles having a relatively large surface area without introducing too many additional triangles because of retriangulation at the OR boundary.

Process flow proceeds to step 3090, where the SIL is set to NEXT_SIL and process flow proceeds to process 30-5, which returns process flow to step 3029, where the SIL_LIST is effectively incremented by setting NEXT_SIL to the next unprocessed edge in SIL_LIST.

If, in decision step 3031, it is determined that SIL and NEXT_SIL form an inside corner of the silhouette contour corresponding to the boundary of the OR, then process flow proceeds to process 30-3, which starts at step 3035 (FIG. 30C) to determine if the current contour being processed corresponding to the SIL_LIST is an outer contour of a occluded region (OR) or an inside contour of the region.

If, in decision step 3035 it determined that the current contour is an outer contour, then process flow proceeds to step 3037 to set a variable BESTSIDE to a value INSIDE.

If, in decision step 3035 it determined that the current contour is not an outer contour, then is the current contour is an inner contour and process flow proceeds to step 3039 to set a variable BESTSIDE to a value OUTSIDE.

Process flow proceeds step 3045, where two silhouette edges are identified lying on both sides of SIL or SIL_NEXT such that the edges are as close as possible on the contour (in the contour array SIL_LIST) and such that the corresponding wedge planes of the edges intersect to form a line that intersects on the BESTSIDE of the contour; where BESTSIDE is the INSIDE of the contour for outer contours and the OUTSIDE of the contour for inner contours. This insures a conservative simplification of the contour in the region of the inside corner silhouette vertex (either simple or compound). This process may "collapse" more than one edge at a time with the span designated by the variable N.

Process flow proceeds to step 3055, where the ESO of the region between the new OB and the original OB is determined and stored in the variable D_ESO (indicating the ESO of the difference region between the old and new OBs). This ESO estimates the "effectiveness" of the occlusion region that has just been removed by the conservative repositioning of the OB.

Process flow proceeds to decision step 3065 to determine if the D_ESO is less than a predetermined value VALUE3.

If in decision step 3065 it is determined that the D_ESO is less than the predetermined VALUE3, then process flow proceeds to step 3075. If the D_ESO of the difference region is low then the number of triangles occluded in the difference region is small and/or they have a relatively small surface area. Also a low D_ESO value may indicate that there are many partially occluded mesh triangles in the difference region that will cause additional geometry by retriangulation.

In step 3075, reached because the difference region has a relatively low D_ESO value, the conservative boundary of the OR recomputed in step 3045 is saved as the new OR boundary for the region of the map and the retriangulated triangles introduced by the new OR boundary are also optionally saved. Again, mesh triangles that are partially occluded can be conservatively considered to be unoccluded, thereby reducing the amount of new geometry that would have been produced by retriangulation.

Process flow proceeds to step 3089, the data for the N silhouette edges, which have been effectively collapsed into a conservative span comprising extended silhouette edges, is removed from the linked list representing the labeled from-viewcell silhouette contour of the mesh object and removed from SIL_LIST. As discussed in detail in conjunction with FIG. 31 and related figures, the labeled silhouette edge data is stored as a link list of data structures corresponding to simple silhouette vertices and CSVs. Later in the process flow, in step 3080, a node of the linked first (CONTOUR_NODE) may be modified to indicate the collapsed edge.

If in decision step 3065 it is determined that the D_ESO of the difference region is not less than a predetermined value, then process flow proceeds to step 3091, where the original OB is retained since the difference region tends to effectively occlude relatively large numbers of mesh triangles or portions of mesh triangles having a relatively large surface area without introducing too many additional triangles because of retriangulation at the OR boundary.

Process flow proceeds to step 3095, where the SIL is set to NEXT_SIL+N, N representing the span of edges replaced or collapsed by the conservative simplification process of step 3045. Process flow proceeds to process 30-5, which returns process flow to step 3029, where the SIL_LIST is effectively incremented by setting NEXT_SIL to the next unprocessed edge in SIL_LIST.

The method of FIG. 30 applies to both simple and compound silhouette contours. For compound silhouette contours the inside corner silhouette vertices may be CSVs. The method is applied as a post-process to a completed visibility map. Consequently, the silhouette edges corresponding to OB_SEGS are labeled. As previously described, during the construction of the from-viewcell visibility map a single first-order silhouette edge on a triangle mesh may ultimately be subdivided into multiple visible subsegments. In addition, each of these segments may a support an SV-ME wedge that intersects another silhouette edge to produce a CSV with its associated SE-MV swept wedges. In the present method, the SIL_LIST is comprised of the individual subsegments reflecting the visible complexity of the simple or compound silhouette contour.

Figure 30D:
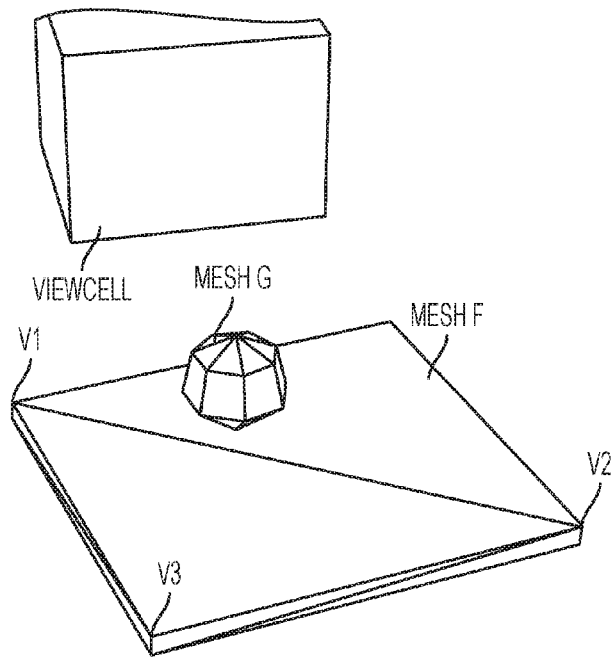
FIG. 30D is a 3D hidden-line diagram showing a viewcell and two polygon meshes.

FIG. 30D is a 3D hidden-line diagram showing a viewcell and two polygon meshes labeled MESH F and MESH G. The diagram is a perspective view, with the mesh objects positioned generally between the viewer and the viewcell.

MESH F is a triangle mesh representing a box-like object having six sides. Each rectangular face of MESH F is modeled as two triangles. There are 12 triangles in MESH F, only 6 are shown, the other 6 are occluded and not shown. One triangle of MESH F is formed by the vertices labeled V1, V2, and V3.

MESH G is a polygon mesh having 21 polygons, some of these polygons are represented as triangles while others are represented as rectangles. Some of these polygons are occluded in the view.

Figure 30E:
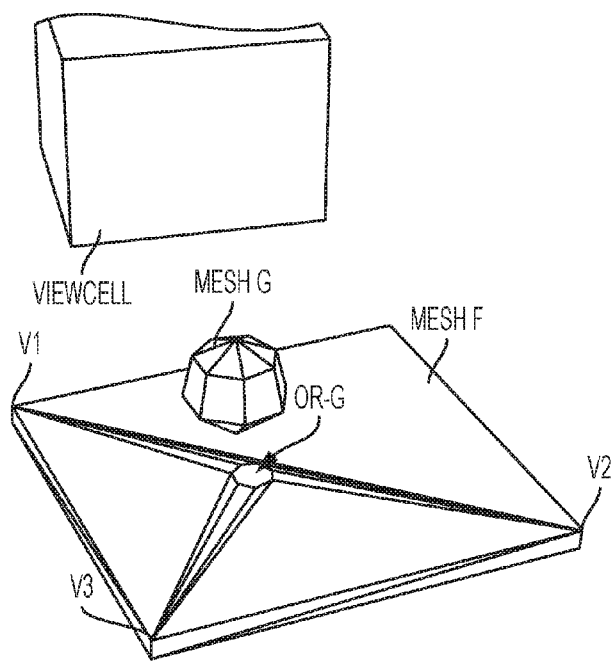
FIG. 30E is a 3D hidden-line diagram showing the same perspective view as FIG. 30D, and including an occlusion region and corresponding occlusion boundary.

FIG. 30E is a 3D hidden-line diagram showing the same perspective view as FIG. 30D. In FIG. 30E a portion of the from-viewcell visibility map, using VIEWCELL as the source, is shown. Wedges constructed on first-order silhouette edges of MESH G intersect MESH F to produce an occlusion region labeled OR-G. The wedges are not shown here. Occlusion region OR-G is bounded by an occlusion boundary consisting of 7 occlusion boundary segments. OR-G is completely inside of the original mesh triangle formed by the vertices V1, V2, and V3.

In one embodiment, the construction of the occlusion boundary segments bounding OR-F is constructed according to the 3D mesh traversal process of FIG. 20A and related figures. Specifically these occlusion boundary segments are added to the intersected polygon in step 2068 of the exemplary flowchart shown in FIG. 20A.

In another step of the 3D mesh traversal process, depicted as step 2083 in the exemplary flowchart of FIG. 20A, the triangles intersecting or containing occlusion boundary segments are re-triangulated into occluded regions and unoccluded regions. FIG. 30E shows the result of this exemplary re-triangulation of original mesh triangle V1-V2-V3 using the occlusion boundary segments of OR-G. During this re-triangulation the original triangle V1-V2-V3 is re-partitioned into 10 new triangles, one for each of the 7 occlusion boundary edges of OR-G, and 3 additional triangles that result because OR-G further partitions triangle V1-V2-V3 into 3 regions defined by vertices of OR-G.

Since occlusion region OR-G is completely inside a single original triangle (V1-V2-V3) of MESH F, it contains no complete triangles. That is, the polygon mesh (MESH G) that induces the occlusion boundary of OR-G on MESH F does not completely occlude even a single mesh polygon of MESH F, using VIEWCELL as source. Thus, the number of mesh triangles completely occluded by OR-G is 0.

Triangle V1-V2-V3 is partially occluded by MESH G. This region of partial occlusion is the area of OR-G. In this example the surface area of OR-G is small relative to the surface area of the containing triangle V1-V2-V3.

In this example OR-G occludes no mesh polygons completely, and occludes a relatively small surface area of only a single polygon. Since the effective static occlusion (ESO) of an occlusion region is in some direct proportion to the number of polygons completely occluded by the occlusion region and the surface are of completely or partially occluded polygons, the ESO of OR-G is not substantially increased by these factors.

The ESO of an occlusion region varies in some indirect proportion to the number of new polygons created by re-triangulation at the corresponding occlusion boundary. In the example of OR-G, re-triangulation at the occlusion boundary results in a single original triangle being partitioned into 10 new triangles.

Thus, in this example, both the direct proportional factors of the ESO (number of polygons completely occluded and surface area of occluded polygons) as well as the inverse proportional factors (e.g. the number of new polygons generated by re-triangulation at the occlusion boundary) will tend to produce a relatively low value for the ESO of OR-G.

As described in the exemplary flowchart of FIGS. 30A-C, in one embodiment, OR-G which has a low ESO, can be removed completely from the visibility map (step 3017). Alternatively, according to the exemplary flowchart of FIGS. 30A-C, or the occlusion boundary of OR-G can be simplified and the ESO for the simplified occlusion boundary redetermined. In one method of simplification the occlusion boundary is made smaller by equating it with the boundary of a connected set of completely occluded original mesh triangles within the occlusion region (steps 3020-3022). This results in redefining any partially occluded polygons as exposed. In this case only completely occluded polygons are eliminated from the from-viewcell visibility map and corresponding PVS. In another embodiment of simplification, the actual occlusion boundary of the occlusion region is conservatively simplified (steps 3023-3095).

A method of determining an ESO, in one embodiment as described employs factors that measure the occlusion. The determination of the ESO also includes in one embodiment factors which reflect the number of new polygons generated by re-partitioning at the corresponding occlusion boundary. The method accommodates embodiments in which the relative importance of these individual factors can be tuned based on coefficients which assign weights to each factor.

Principles of Operation: Efficient Storage of DeltaPVS Information Using Labeled Silhouette Edges and Incremental Runtime Construction of Visibility Map/PVS.

PVS data, especially if derived from high-precision visibility maps, can have high storage costs. As previously described, deltaPVS is a prior-art method of reducing storage costs for PVS data by storing only the difference between the PVS of adjacent viewcells. In the deltaPVS method of Chhugani et. al (2005), the deltaPVS is a list of polygon primitive IDs (called deltaI) stored for each viewcell boundary. Run-length encoding is used to store the deltaI, which is comprised of two components: deltaG+ (newly visible primitives), and deltaG− (newly occluded primitives). Even with this compression, however, the deltaPVS data is large. For a powerplant model of 13 million triangles and 500,000 viewcells, 7 GB is required to store the delta-PVS object IDs.

Embodiments include a method of efficiently storing DeltaPVS using an implicit scheme in which silhouette edges of the model that result in significant exposure or significant occlusion of geometry for a particular viewcell-viewcell transition are identified by comparing the corresponding visibility maps. These dynamically occluding or dynamically exposing silhouette contours are identified and labeled in an offline visibility preprocess. The labeling employs an efficient run length encoding which exploits the definition of first-order silhouette edges to achieve significant algorithmic compression. This run-length labeling method is presented in detail in conjunction with FIG. 31 and related figures.

During runtime, the visibility map/PVS for a viewcell is constructed from the visibility map/PVS of an adjacent viewcell by:

1) Conducting a modified 3D mesh traversal of the adjacent viewcell's visibility map. This fast traversal uses the labeled significantly occluding or significantly exposing silhouette contours to rapidly construct new occlusion boundaries on the newly constructed visibility map. Details are given in conjunction with FIG. 32, FIG. 33, FIG. 34 and related figures.

Using these new occlusion boundaries, the newly occluded triangles are not traversed during the runtime traversal process. Since only traversed triangles are represented in the new PVS, this approach effectively allows the generation of a PVS that has the newly occluded triangles removed Details given in conjunction with FIG. 35, FIG. 36 and related figures. This scheme significantly reduces the cost of deltaG– data storage and transmission, by eliminating the need to explicitly store deltaG– information (e.g. as large lists of newly occluded triangles) in most cases.

2) Adding newly exposed geometry as deltaG+ packets, which may include ID and/or actual geometry, associated with the particular viewcell transition wherein the newly exposed geometry is "attached" to boundaries of the VM associated with new exposure. Because the from-region visibility maps can be computed at viewcell-to-triangle-fragment precision many of the newly visible triangles may be fragments of the original mesh triangles. The present method of incremental construction of a VM from an adjacent VM at runtime accommodates the technique of retriangulating triangles during the runtime traversal/VM construction which avoids having to store triangle fragments in the deltaG+ packets.

In some embodiments, the method uses viewcells that are arranged hierarchically. Relatively large parent viewcells contain smaller child viewcells. The VM/PVS for a large viewcell is constructed from the VM/PVS for an adjacent large viewcell and additional deltaG+ data using the previously described incremental construction method. Since the deltaG+ data is for a viewcell transition between large viewcells tends to be large, the data is naturally clustered, thus reducing the number of disk accesses required to load the deltaG+.

The VM/PVS for child (contained) viewcells is derived from the VM/PVS of the parent (containing) viewcell by conducting the modified 3D mesh traversal at runtime. Because the VM/PVS of the child viewcell is a subset of the VM/PVS of the parent, the runtime 3D mesh traversal method used to construct the child VM from the parent's typically only uses labeled dynamically occluding silhouette contours to construct occlusion boundaries, which bypass the geometry occluded in the transition from parent to child. This allows construction of more precise VM/PVS for runtime display without the need for additional deltaG+ data.

The hierarchical organization of the viewcells also facilitates efficient streaming of deltaPVS data. In some embodiments, only deltaG+ data packets corresponding to the transition between relatively large parent viewcells needs to be transmitted. The VM/PVS for the corresponding child viewcells is constructed from the parent's at runtime using only deltaG– information (generated at runtime from the labeled silhouette information). Streaming only parent deltaG+ information is more efficient since typically the overall time required to seek, access, and transmit a unit of data decreases with increasing size of the packet.

Using the embedded labeled silhouette information and associated deltaPVS data packets, a precision-controlled VM/PVS is efficiently constructed from the VM/PVS of an adjacent (sibling) viewcell (using deltaG+ packets and runtime 3D mesh traversal to bypass the newly occluded triangles). For a parent viewcell to child viewcell transition, deltaG+ packets are not required since the entire VMS/PVS for the child viewcell is derivable by a retraversal of the parent's VM, using the labeled silhouette edge hint information to bypass newly occluded triangles.

According to some embodiments, the runtime process is conducted as a prefetch operation. During interactive walk-through, the location of the current viewpoint is used to predict likely future viewpoint locations based on the connectivity of the viewcells (which are also navigation cells of the model) as well as current viewpoint velocity and other factors. Using this informed speculative prefetch, the VM/PVS of parent viewcells in the reachable vicinity of the current viewcell (i.e. the viewcell containing a current actual or predicted viewpoint) are incrementally constructed and maintained. The set of viewcells that are reachable in a specified period of time from the current viewcell may be constrained factors including intrinsic navigational constraints of a viewer's motion, including such factors as the maximum actual or predicted viewpoint velocity and acceleration and turning rates and accelerations. The local structure of the modeled environment including obstacles and other collision constraints can also influence the rate at which neighboring viewcells in the reachable vicinity of a viewpoint can be visited. In some embodiments, the construction of the child viewcell VM/PVS is deferred until the viewcell is closer to the child viewcell, since the construction generally does not require streaming of deltaG+ data.

The method realizes an efficient visibility-based codec for streaming delivery of interactive content via local or remote server. The codec exploits the intrinsic dynamic or temporal visibility coherence of interactive walkthroughs to minimize the required bandwidth for on-demand streaming.

Unlike image-based streaming methods, the bandwidth required to stream the visibility event geometry and texture information is relatively independent of display resolution. In fact, the present method tends to increase runtime rendering performance at high resolutions since, at a relatively small CPU, cost of incrementally constructing VMs at runtime, it maintains a very precise PVS that improves both geometry and rasterization GPU performance. Moreover, since the codec can be implemented as a speculative prefetch; its performance is, unlike image-based streaming methods, relatively independent of client-server connection latency.

FIG. 31A, FIG. 31B, and FIG. 31C Data Structures Employed by the Method of Labeled Silhouette Edges As described in the preceding section, embodiments include a method to identify significant dynamically occluding or dynamically exposing mesh silhouette edges and labeling them in an offline preprocess; and later using the labeled silhouette edges to effect incremental VM/PVS construction during runtime.

As described in conjunction with FIG. 30, from-region silhouette contours may also be simplified based on the effective static occlusion of the corresponding occlusion boundary segments in the VM. As shown in FIG. 30, the simplified VM boundary can be stored as a simplified labeled silhouette contour (from which the simplified VM boundary will later be constructed at runtime).

FIG. 31A includes data structures used to label simple and compound silhouette contours.

In some embodiments, a simple silhouette contour of a triangle manifold mesh is a connected sequence of edges comprising a polyline. The polyline may or may not form a cycle.

Assuming that a simple silhouette contour is unoccluded, then using only the definition of first-order, from-viewcell silhouette edge; an entire simple silhouette contour can be efficiently labeled by labeling a single edge of the contour. Given a single labeled starting edge (or a data structure pointing to this edge) the entire connected first-order silhouette contour can be identified by simply finding the connected edges and determining which connected edge is a first-order silhouette edge. This fact is employed in the present method to significantly reduce the cost of storing labeled silhouette contours by identifying most silhouette contour edges at runtime.

A from-viewcell silhouette contour may be a compound silhouette contour. A compound silhouette contour results when a from-region visibility event surface (e.g., a UBP) intersects a (different) silhouette edge. This intersection is a compound silhouette vertex or CSV.

Each inside corner vertex of a contour, whether simple or compound, can give rise to more than one from-region SE-MV umbral event surface (wedge/UBP) as a result of the sweep process. Consequently, there may be more event surfaces incident on a contour than the number of edges or vertices in the contour.

The data structures used to label silhouette contours are organized, in some embodiments, as arrays of data structures corresponding to actual event surfaces incident on actual silhouette edges and vertices. Because adjacent silhouette edges can be rapidly identified at runtime and because UBPs (and the corresponding OB_SEGS of visibility maps) can be generated at runtime; many of the elements of the array do not actually need to be stored.

The reduced storage cost produced by the intrinsic algorithmic compression realized by identifying/generating contour elements at runtime can be balanced against the runtime cost of generating this information using the contour node information of FIG. 31A, discussed directly. This information is used to speed the generation the unstored data at runtime. FIG. 31A and FIG. 31B show embodiments of data structures used to label silhouette contours.

In some embodiments, a data structure "Contour" is stored for each contour. The data structure contains three fields referring to a specific mesh object, an edge of the mesh, and a vertex of the edge. In storage form, all references are integer indices to specific arrays of elements, though at runtime these may be changed to pointers. The structure "Contour" also contains the field int node_array, which is an index to a specific array of data structures of the type Contour_Node. The "struct Contour" also contains an integer field num_nodes which gives the length of the node_array for the contour.

The data structure "Contour" also contains an integer field, VMinfo, which is an index to a specific element in an array of data structures of type VM_Info. VM_info (which is described in detail in a later part of this specification) contains information providing the specific mesh and mesh triangle that is intersected by the UBP associate the Contour_Node. By precomputing this information and storing it with the initial silhouette element of a span all of the visibility map OB_SEGS associated with the entire span of silhouette elements encoded by the Contour_Node can be rapidly constructed at runtime if the associated UBPs intersect the same triangle mesh. (This process, which exploits the intrinsic coherence of intersecting polyhedral manifolds, is described in detail in conjunction with FIG. 35 and related figures.)

The data structure "Contour" also contains an integer field "last_contour" which is an index into an array of "Contour" structures indicating a specific "Contour" to which the current "Contour" is connected at its tail end. The data structure "Contour" also contains an integer field "next_contour" which is an index into an array of "Contour" structures indicating a specific "Contour" to which the current "Contour" is connected at the head end.

The data structure "Contour_Node" stores information for individual elements of the contour. As previously indicated, since many of the event surfaces incident on a contour can be generated algorithmically they do not need to be stored explicitly. Thus the array of Contour_Nodes referenced by Contour typically has many fewer elements than the actual silhouette contour has edges and umbral event surfaces.

The data structure "Contour_Node" contains a character type field "node_type" which indicates what type of silhouette contour information is contained in the node. If the node corresponds to an outside corner of a silhouette contour then the value of the field is set to 1. If the node corresponds to a simple inside corner of the silhouette contour then the value of the field is set to 2. If the node corresponds to a compound silhouette vertex (CSV) then the value of the field is set to 3.

The data structure "Contour_Node" also contains a character type field, span_type indicating the type of span corresponding to the node. If the node represents a span of outside corner silhouette edges for the contour then the value is set to 1. If the node represents a span that may contain both outside and inside corners then the value is set to 2. If the node represents a span of silhouette edges that are to be "skipped" in order to simplify the contour (as described in conjunction with FIG. 30 steps 3080 and 3089).

The data structure "Contour_Node" also contains an integer field indicating the length of the span represented. In general this corresponds to the number of umbral event surfaces generated on the silhouette edges and vertices encountered in the span and therefore may be a larger than the number of silhouette vertices in the span.

The data structure "Contour_Node" also contains an integer field, ninfo which is an index to a specific element in an array of data structures which store additional information for the node, depending on the value of the field node_type.

The data structure "OC_Info" may store additional data referenced by a Contour_Node having node_type equal to 1. The character field sysc stores a reference to an index of a specific vertex of the viewcell which supports the umbral visibility event surface (UBP) for corresponding to the first silhouette edge in the span. This optional information could speed the runtime generation of UBPs but increases the storage size. Since a single contour can be used to generate multiple UBPs at runtime corresponding to multiple viewcells, this additional data may be constructed once at runtime rather than being stored as labeled silhouette contour information with the database.

The data structure "IC_Info" may store additional data referenced by a Contour_Node having the node_type equal to 2. The optional character field ic_type is a hint which indicates which type of construction strategy (pivot-and_sweep or intersection of adjacent SV-ME planes) should be employed to generate SE-MV event surfaces incident on the inside corner at runtime. While this decision can be made at runtime using the previously described heuristics, the runtime test can be avoided using prestored data. Note that this hint data can also be stored for an entire span of silhouette vertices by storing a different value for Contour_Node, span_type (value of 4 indicates pivot-and-sweep for all inside corner silhouette vertices in span vs value of 5 indicates intersection of adjacent SV-ME planes for all inside corner silhouette vertices in span).

The data structure "IC_Info" may contain an optional character array field SVSC[4] indicating hints for the specific viewcell vertices which form the supporting viewcell silhouette contour on which the SE-MV event surfaces of the inside corner silhouette vertex are constructed.

All of the information contained in the IC_Info data structure can be generated at runtime and therefore does not actually have to be stored with the mesh database.

The data structure CSV_Info may store additional data referenced by a Contour_Node having the node_type equal to 3. The integer field "mesh" stores an index to a specific triangle mesh that is intersected by the current UBP in the contour. The integer field "edge" stores an index to a specific edge of the intersected triangle mesh. These two fields are used to define the CSV which is formed at the intersection of the UBP supported by the current element of the silhouette contour and another silhouette edge. Once again, the fields "mesh" and "edge" are optional since in about half the cases (cases in which the current contour is being processed in a direction which causes the associated UBP/VM contour to "walk off" the more distant mesh) the silhouette edge intersected by the UBP to form the CSV is easily determined. In other cases in which the contour is being processed at runtime in a direction that causes the UBPs and corresponding VM OB_SEGS are being constructed to encounter a new mesh The "mesh" and "edge" fields will substantially reduce the runtime costs of incremental construction of a new VM contour.

The data structure CSV_Info may also optionally store the x, y, z values of the CSV in the double array field point[3]. The CSV_Info structure may also contain the optional fields char ic_type and char SVSC[4] as previously described in conjunction with the data structure IC_Info.

Since all of the fields of the CSV_Info are optional not every Contour_Node may link to a CSV_Info data structure, once again reducing storage costs.

The data structure VM_Info stores information about visibility map occlusion boundary segments that are associated with the initial silhouette elements of a Contour data structure. The storage of both the mesh and edge where the UBPs associated with these silhouette elements intersect the VM can be used to rapidly compute the corresponding OB_SEG of the VM at runtime. Once the initial OB_SEG is determined, subsequent OB_SEGs of the VM occlusion boundary polyline corresponding to the silhouette Contour can be rapidly generated at runtime. This is similar to the storage of mesh and edge references in CSV_Info data structures, which is used to accelerate runtime construction of VM data.

The data structures for labeled silhouette contours shown in FIG. 31A and FIG. 31B, and FIG. 31C are also reproduced below.

```
struct Contour
{
int mesh;        // index to mesh
int edge;        // index to edge of mesh
int vertex;      // index to starting vertex of contour
int node_array;           // index to array of Contour_Nodes
int num_nodes;            // length of coutour_node array
int VMinfo;               // index to VM_Info array
int last_contour;         // index to next connected contour, head connected
int next_contour;         // index to last connected contour, tail connected
char next_edge_type       // if ==1 then next edge is next connected silhouette edge
                          // if ==0 then next edge is next previously labeled edge
char contour_type         // if == 1 dynamically occluding, if == 0 dynamically exposing
                          // if ==2 hybrid contour
};
struct Contour_Node
{
char node_type;           // 1 = outside corner, 2=simple inside corner, 3=CSV
char span_type;           // 1= run of outside corners only
                          // 2= run may contain outside and inside corners
                          // 3=skip span_length segments & connect to next vertex-
                          // forming simplified silhouette contour edge
                          // 4= construct SE-MV on all inside corners of run using pivot and sweep
                          // 5= construct all inside corner event surfaces by intersection adjacent SV-ME planes
int span_length;          // number of umbral event surfaces (UBPs) generated on contour until next node
int ninfo;                // if node_type==1 then ninfo is index to OC_Info array
                          // if node_type==2 then ninfo is index to IC_Info array
                          // if node_type==3 then ninfo is index to CSV_Info array
};
Struct VM_Info
{
int mesh;        // index to mesh containing OB_SEG corresponding to first silhouette element in run
int triangle;    // index to triangle containing OB_SEG corresponding to first silhouette element in run
int retriangulate_hint    // bitmask indicating if mesh triangles intersected by OB_SEGS for 31 -
                          // Contour_Nodes of Contour should be retriangulated at runtime 0=no, 1=yes
                          // Last Bit indicates VM dynamic boundary type: 0==occluding 1==exposing
float point[3];           // x,y,z value of initial vertex if it is formed by intersection with other OB_SEG
};
```

```
struct OC_Info         // information for an outside corner node of
{
char svsc;             // (optional) hint for specific viewcell vertex forming UBP
};
struct IC_Info
{
char ic_type;          //(optional)1= form SE-MVs by pivot and sweep
                       //(optional)2= intersect planes of adjacent SV-MEs
char SVSC[4];          // (optional) hints for specific viewcell edges forming SVSC
};
struct CSV_Info
{
int mesh;    // (optional) index to mesh containing intersected edge
int edge;    // (optional) index to intersected edge
char ic_type;          //(optional)1= hint-form SE-MVs by pivot and sweep
                       //(optional)2= hint- intersect planes of adjacent SV-MEs
char SVSC[4];          // (optional) hints for specific viewcell edges forming SVSC
double point[3];       // (optional) precomputed x,y,z values of vertex of CSV
};
struct tri_seed        // index/pointer to specific triangles of model used to initiate
                       // simplified mesh traversal (FIG. 37) to construct viewcell B visibility
                       //map from viewcell A visibility map
{
int tri_count;         // number of triangles in seed
int* mesh_array;       // sequence of mesh ids
int* tri_array;        // sequence of triangle ids
};
struct DeltaGplussubmesh_attach_polyline
// precomputed list of mesh edges for attaching submesh and original mesh
{
int contour;           // reference to a specific Contour
char attach_type;      // if ==0 free edges of submesh attached to free edges of mainmesh
                       // if ==1, free edges of submesh attached to listed edges of mainmesh
                       // if ==2, free edges of submesh linked to free edges of mainmesh
                       // if == 3, free edges of submesh linked to listed edges of mainmesh
int submesh;           // reference to attaching submesh
Int edgenumber;// number of edges in the attaching polyline
Int* submesh_edgelist;           // ordered list of edges in submesh which attach
int* mainmesh_edgelist;          // ordered list of edges in mainmesh to which attaches
};
struct Triangle
{
int global_id;         // global_id
int vertex[3];         // index of 3 vertices in DeltaGplussubmesh.vertexp array
int edge[3];           // index of 3 edges in DeltaGplussubmesh.edgep array
};
Struct Edge
{
int global_id;         // global id
int vertex[2];         // index of two vertices in DeltaGplussubmesh.vertexp array
};
struct vertex
{
int global_id;         // global id
float point[3];        // x,y,z value of vertex
};
```

FIG. 31D is a diagram showing data structures for an exemplary embodiment employing deltaG+ data.

In one embodiment, a deltaG+ packet of information may be associated with each viewcell-viewcell transition. The exemplary data structure DeltaGplus_Header includes fields indicating the starting (viewcell_start) and ending viewcell (viewcell_end) as well as a specific face (transition_face) for the associated transition. Another data element, deltaGplus_array, is a reference to an array of DeltaGplus data structures which actually contain or reference the mesh geometry. In some embodiments in which the deltaGplus_array is stored in main memory, it may be accessed through a pointer. In other instances the deltaGplus_array variable may be an index to an array of arrays, e.g. for the disc storage form of the deltaG+ data. Another field deltaGplus_count stores the number of DeltaGplus data structures in the deltaGplus_array. An additional field packet_size indicates the storage and transmission byte size of the associated information.

A DeltaGplus_Header references one or more DeltaGplus data structures, which in turn references the geometry, material, texture information for the corresponding polygon mesh. Exemplary data structures for this information are shown as data structures Triangle, Edge, vertex.

FIG. 32A, and FIG. 32B Flowchart Showing Method of Identifying Edges and Vertices of a Silhouette Contour Using Data Structures for Labeled Silhouette Contours.

The flowchart of FIG. 32 shows a method of rapidly identifying all of the edges of a simple or compound, from-viewcell silhouette contour given a few edges of the contour that have been labeled using the data structures of FIG. 31.

The method of FIG. 32 exploits the facts that silhouette contours generally form polylines on manifold meshes.

Since the meshes are represented as directed graphs with associated connectivity information (using winged-edge or similar data structures) the identification of edges connected to other edges is simplified.

Turning now to FIG. 32A, and using the data structures of FIG. 31 in which data elements are stored in arrays and accessed by indices to these arrays (alternate embodiments may cast these references as runtime pointers). In some embodiments, process flow starts at step 3205, where the current vertex c_vertex is identified using the index contour.vertex from the data structure for the current Contour. This is the edge number of the mesh contour.mesh.

Process flow proceeds to step 3207, where the current edge is similarly accessed using the indeed contour.edge. Also in step 3207 an integer used to update an index into an array of Contour_Node types, ni, is set to 0.

Process flow proceeds to step 3209 to access the current contour node, c_node using the index contour.node_array [ni].

Process flow proceeds to decision step 3211 to determine if the c_node.type is not 3. If the type is not 3, then the current node represents data for a simple contour node and process flow proceeds to step 3213 to set a counter segi to 0.

Process flow proceeds to decision step 3217 to determine if the c_node.span_type is equal to 2. If the c_node.span_type is equal to 2 then the segments of the current contour span may contain both outside corner and inside corner from-viewcell silhouette vertices and process flow proceeds to step 3220.

In decision step 3220 it is determined if the vertex shared by c_edge and next_edge is an inside-corner silhouette vertex using the method of identifying inside corner simple silhouette vertices previously specified.

If, in decision step 3220, it is determined that the two silhouette edges form an inside corner then process flow proceeds to step 3224.

In step 3224, the integer value p is set to equal the number of SE-MV wedges incident on the inside corner vertex as determined by applying the sweep construction of SE-MV wedges (step 3228).

Process flow proceeds to step 3232, where the counter segi, which represents the number of visibility event surfaces constructed for the contour span, is incremented by the number of SE-MV event surfaces incident on the CSV.

Process flow proceeds to decision step 3229 to determine if the value of segi is equal to the span length of the current contour node.

If, in decision step 3229, it is determined that the value of segi is equal to the span length, then the span has been processed and process flow proceeds to decision step 3233.

In decision step 3233, it is determined if the value of the integer variable ni, which is the index of the current contour node for the contour is equal to the number of nodes in the contour.

If in decision step 3233 it is determined that that the current node is the last node of the contour then process flow proceeds to step 3237 in which the next contour is processed. Process flow terminates at step 3237.

If, on the other hand, it is determined in decision step 3233, that the current node is not the last node of the contour then process flow proceeds to step 3245.

In step 3245, the node counter is advanced which is used in step 3209 to access the next node.

If in, decision step 3217 it is determined that the span_type of the current node indicates that no inside-corner nodes exist on the span, then process flow proceeds to step 3221.

Likewise if, in decision step 3220, it is determined that the current silhouette edge and the next silhouette edge do not form an inside corner, then process flow proceeds to step 3221.

In step 3221, the VM segments corresponding to the single SV-ME UBP incident on the current edge are formed (using the method of FIG. 36, FIG. 37 and related figures discussed in detail in a later part of this specification).

Process flow proceeds to step 3225, to increment the variable segi by 1, consistent with the single umbral visibility event surface constructed on the silhouette edge.

Process flow proceeds from step 3225 to decision step 3229, which was already described.

If, in decision step 3221, it is determined that the type of node is type 3, consistent with a compound silhouette vertex (CSV), then process flow continues to process 32-1, which starts at step 3250 (FIG. 32B).

Process flow proceeds to step 3250 to reference additional data in a CSV_Info node using an array index stored in cnode.ninfo. This information gives the mesh number of the more distant mesh containing the CSV.

Process flow proceeds to step 3255 to access the edge number of the edge intersected by the current UBP (wherein the intersection is the current CSV) is accessed through the CSV_Info.

Process flow proceeds to 3260 to calculate the CSV as the intersection of the current UBP and the C_EDGE. Alternately, this value may be precalculated and stored in the floating point CSV_Info.point[3] field of the corresponding CSV_Info structure.

Process flow proceeds step 3265 the C_Vertex is set to the index of the next vertex after the (on the unoccluded side) of the CSV, and process flow proceeds to process 32-2, which returns process flow to step 3215.

Overall, the method of FIG. 32A allows multiple edges of a silhouette contour to be identified using only a few labeled edges. Consequently, this labeling scheme uses very little storage. The method exploits the natural coherence of silhouette contours to facilitate the rapid runtime generation of VM segments from a few labeled silhouette edges and associated hint information. This runtime incremental construction of VM/PVS using the labeled silhouette edges is discussed in detail in conjunction with FIG. 36 and FIG. 37

Figure 33A:
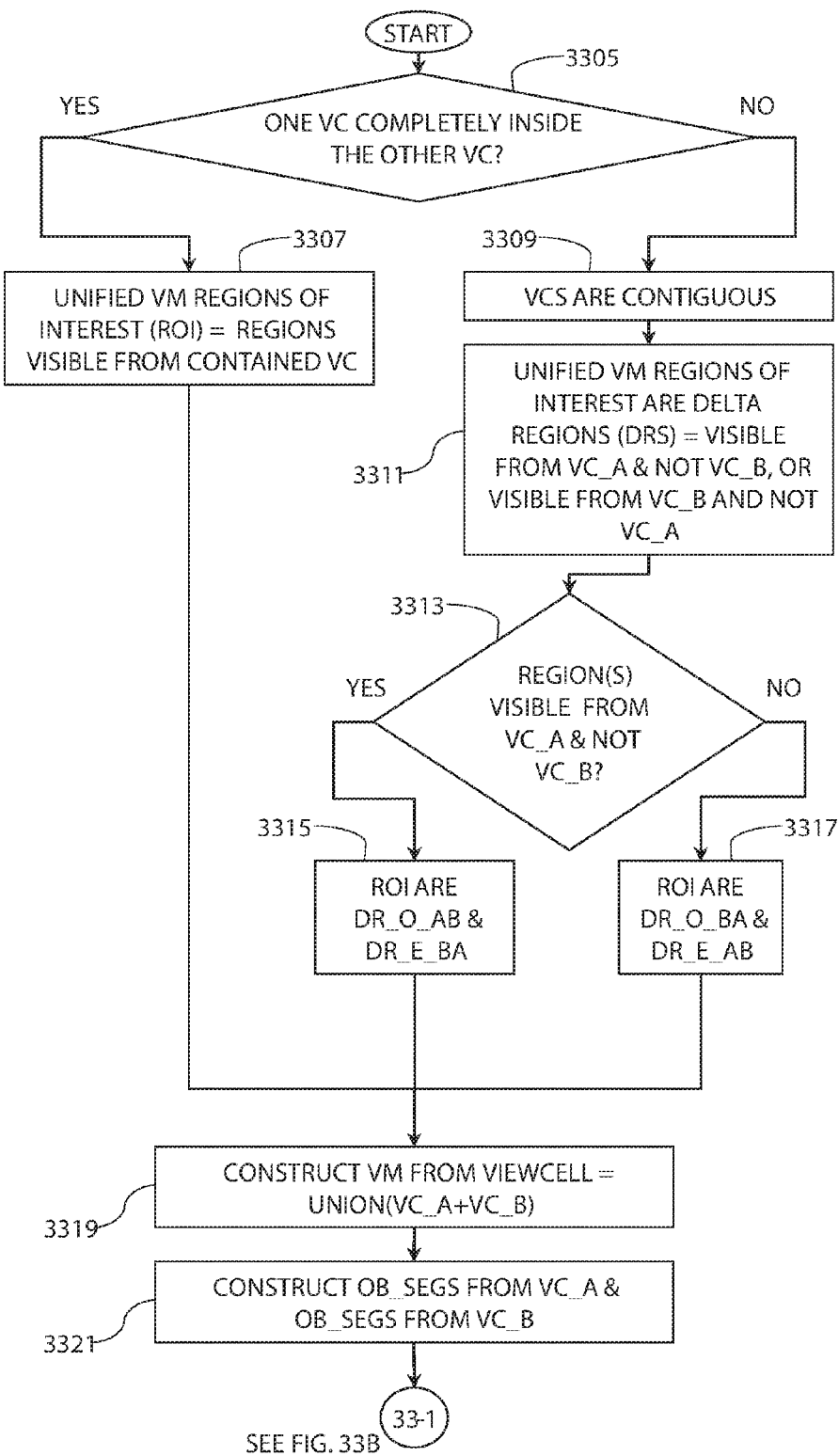
FIG. 33A is an exemplary flowchart showing the method of identifying delta regions of visibility difference for a transition from viewcell A to viewcell B.
Figure 33B:
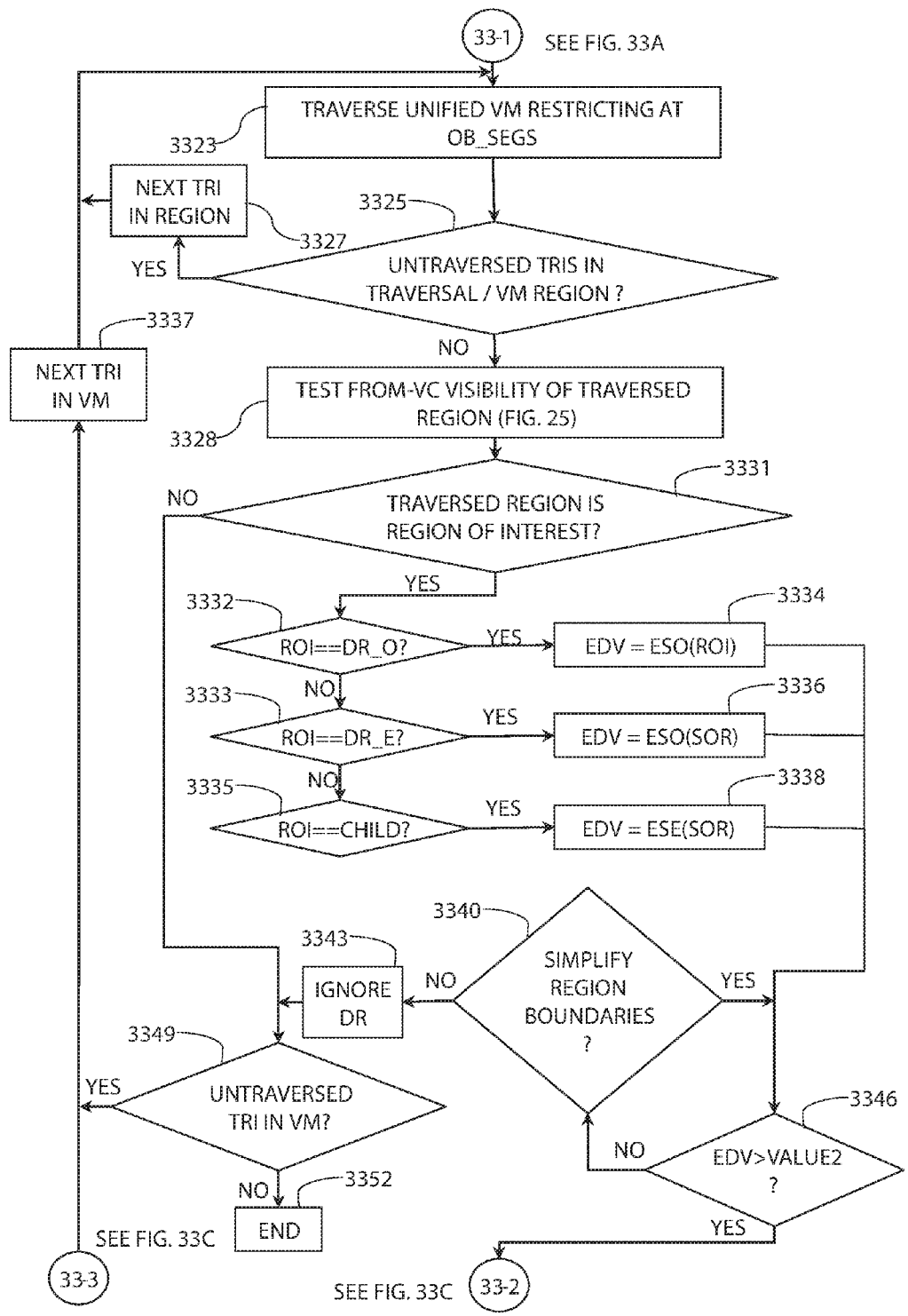
FIG. 33B is an exemplary continuation of FIG. 33A.
Figure 33C:
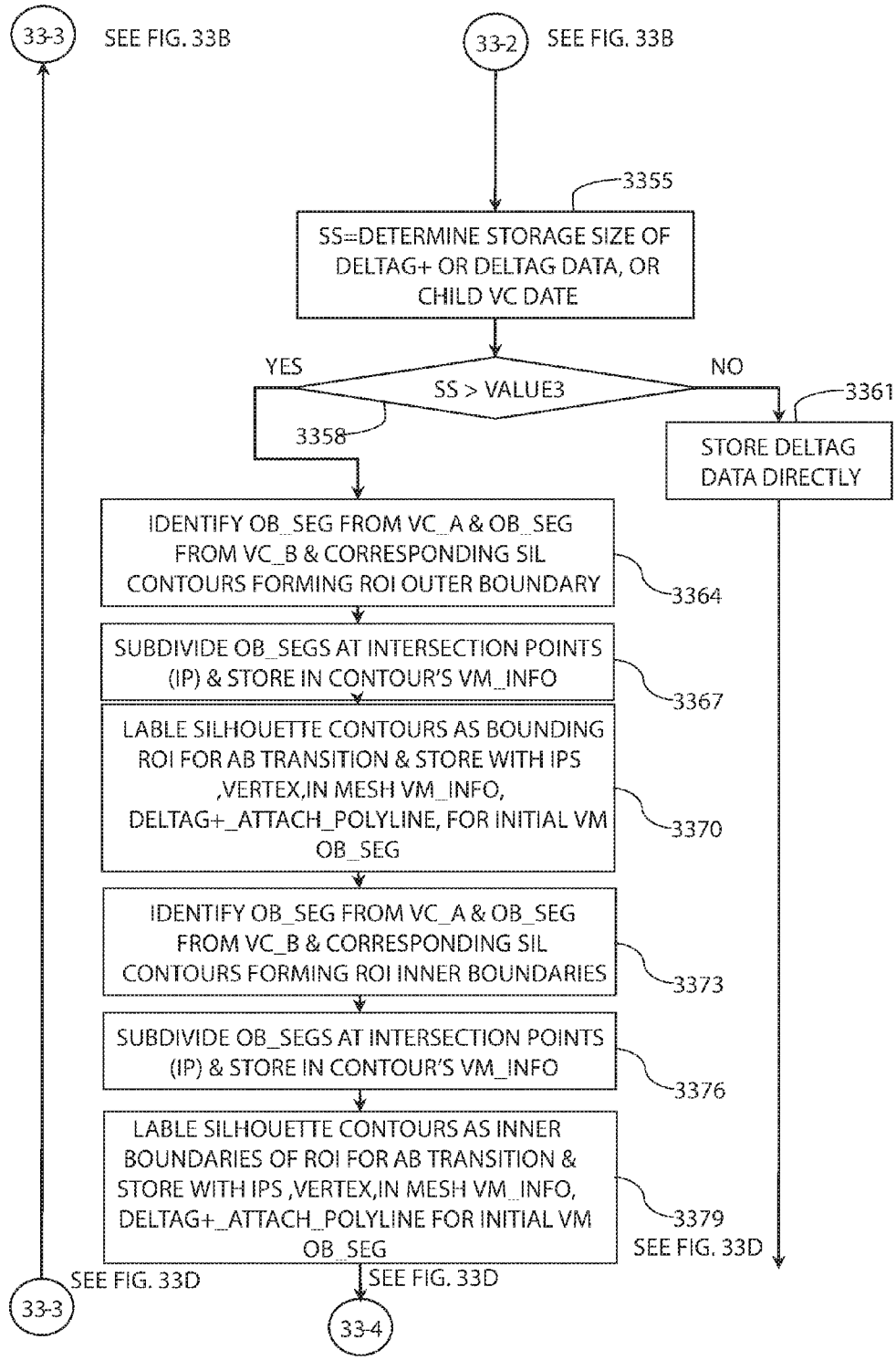
Figure 39A:
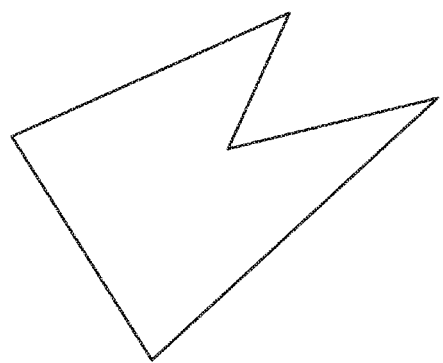
FIG. 39A shows an exemplary simple occluder.
Figure 39B:
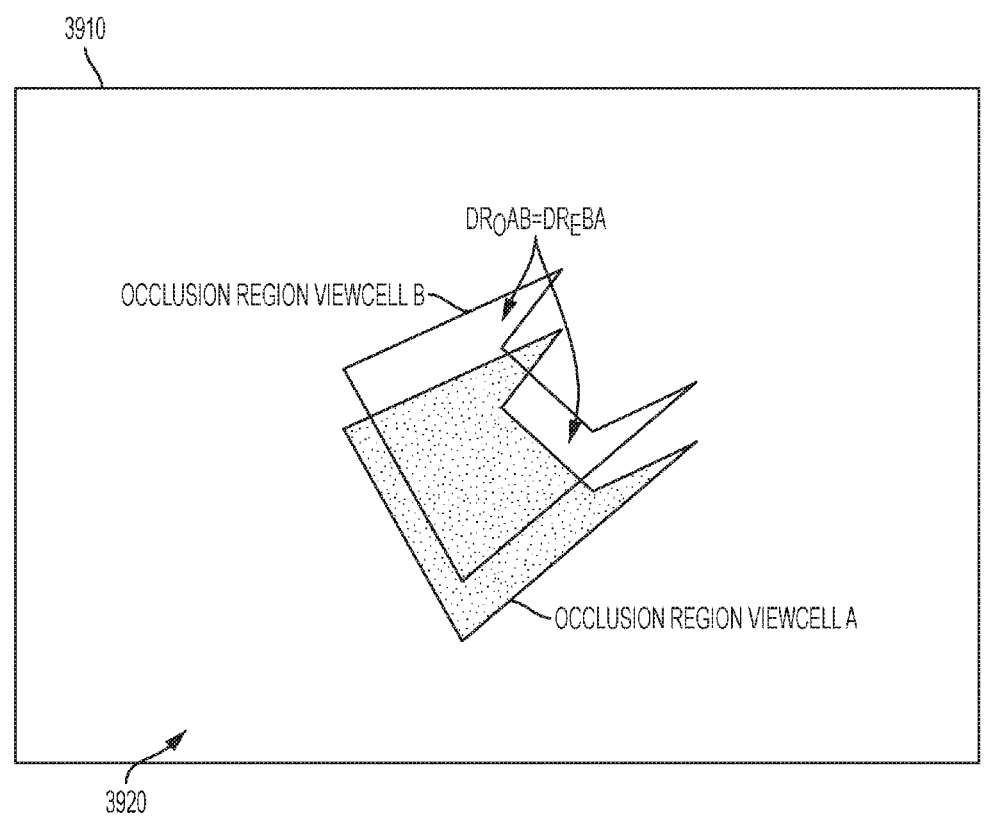
FIG. 39B shows exemplary the delta regions (DR) of occlusion formed by the simple occluder (of FIG. 39A) when viewed from connected viewcells A and B.

FIG. 39A, FIG. 39B show respectively, an example occluder, and the delta regions (DR) of occlusion formed by the simple occluder when viewed from connected viewcells A and B. The flowcharts of FIG. 33A, FIG. 33B show a method of identifying connected regions of manifold triangle meshes that are occluded when viewed from viewcell B but not occluded when viewed from viewcell A. This of course provides the solution to the problem of determining the connected regions of manifold triangle meshes that are exposed when viewed from viewcell A, but not exposed when viewed from viewcell B.

In some embodiments, connected regions of the manifold triangles meshes that are exposed from one viewcell but occluded from a contiguous (or contained) viewcell are called delta regions (DR).

A delta region corresponding to a connected region of a manifold triangle mesh that is occluded when viewed from viewcell B, but not occluded when viewed from viewcell A (i.e., is in the visibility map of viewcell A) is designated DRoAB (delta region of occlusion from A to B).

This is the same as the delta region corresponding to a connected region of a manifold triangle mesh that is exposed when viewed from viewcell A (i.e., is in the visibility map of viewcell A) but occluded when viewed from viewcell B. Such a delta region is designated as DReBA (delta region of exposure from B to A).

Of course DRoAB=DReBA.

Thus, while the method of FIG. 33A and FIG. 33B shows the determination of DRoAB, (the determination of a delta region of occlusion from viewcell A to viewcell B), the method is applied to determine a delta region of exposure by reversing the order of the viewcells being processed.

FIG. 39A shows an example polygon mesh O that acts as an occluder to occlude a larger polygon mesh in FIG. 39B.

FIG. 39B shows a visibility map induced on the surface of a simple mesh labeled 3910. 3910 is a rectangular polygon mesh formed by two triangles, the triangles are not shown to simplify the diagram.

In some embodiments, the shaded hexagonal figure labeled "OCCLUSION REGION VIEWCELL A" is the from-viewcell occlusion region of the simple occluder shown in FIG. 39A generated using viewcell A as the source and using the method of first-order visibility map construction. Note that the occlusion region has one more edge than the occluder O as a result of the SE-MV wedge generated on the only inside corner of the original 5-sided occluder O.

Similarly, the unshaded hexagonal figure labeled "OCCLUSION REGION VIEWCELL B" is the from-viewcell occlusion region of the simple occluder shown in FIG. 39A generated using viewcell B as the source and using the method of first-order visibility map construction.

The portions of the OCCLUSION REGION VIEWCELL B that are outside the OCCLUSION REGION VIEWCELL A are labeled as $DR_OAB$ (delta region of occlusion from A to B) and $DR_EBA$ (delta region of exposure from B to A).

The region labeled 3920 is outside both occlusion regions and since it is inside the region 3910, which is visible from viewcell A and viewcell B, the region 3920 is visible from both viewcell A and viewcell B and is not a delta region.

Figure 40:
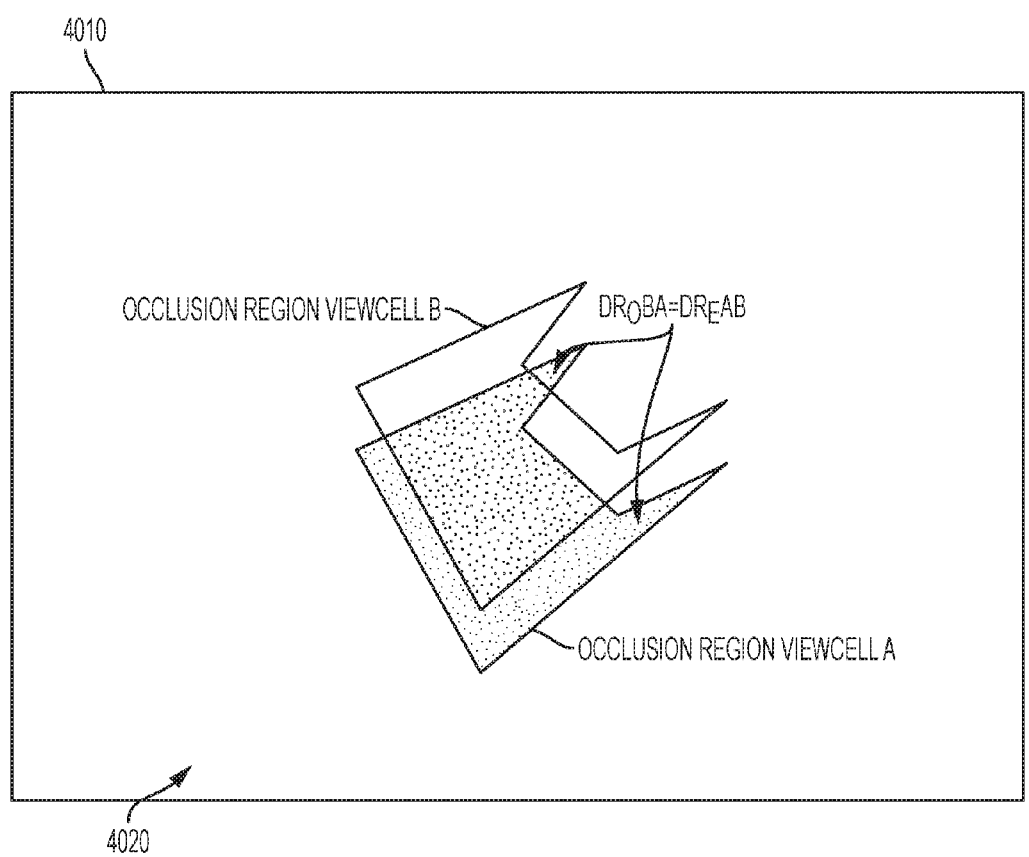
FIG. 40 shows the same unified from-region visibility map as FIG. 39B except that the portions of the OCCLUSION REGION VIEWCELL A that are outside the OCCLUSION REGION VIEWCELL B are labeled as $DR_OBA$ (delta region of occlusion from B to A) and $DR_EAB$ (delta region of exposure from A to B).

FIG. 40 shows the same unified from-region visibility map as FIG. 39B except that the portions of the OCCLUSION REGION VIEWCELL A that are outside the OCCLUSION REGION VIEWCELL B are labeled as $DR_OBA$ (delta region of occlusion from B to A) and $DR_EAB$ (delta region of exposure from A to B). Here, the mesh on which the visibility map boundaries are inscribed is labeled 4010, it is identical to 3910 in FIG. 39. The black portion of Occlusion Region Viewcell A represents the portions of Occlusion Region Viewcell A that are common with Occlusion Region Viewcell B. The region labeled 4020 is outside both occlusion regions and since it is inside the region 4010, which is visible from viewcell A and viewcell B, the region 4020 is visible from both viewcell A and viewcell B and is not a delta region.

Accordingly, in some embodiments, when moving from view region B to view region A, a delta packet would include the difference in visible portions between view region B and view region A (i.e., delta region), which is $DR_EAB$. Therefore, by transmitting delta packets that only include the delta regions, the bandwidth requirements for transmitting graphics information is reduced since the entire set of visible graphic elements for each viewcell need not be retransmitted.

FIG. 41A is a diagram showing the use of the on-wedge visibility method (FIG. 14, FIG. 15, and FIG. 16) to identify CSVs and construct wedge lines for a SV-ME wedge.

FIG. 41A illustrates details of the on-wedge visibility method of FIG. 15. Specifically FIG. 41A illustrates the use of step 1520 to identify a CSV, and steps 1545 to construct wedge lines (WL) incident on the CSV.

FIG. 41A is a top-down orthographic view showing a viewcell labeled 4101. A first-order silhouette edge of some polygon of a polygon mesh is labeled 4104. A SV-ME wedge incident on first-order silhouette edge 4104 is bounded by 4104 and edges 4105 and 4106. This wedge is constructed using the pivot method wherein the pivoting occurs on 4104 to the supporting viewcell vertex (SVV) labeled 4102.

In this example both first-order silhouette edge 4104 and viewcell vertex 4102 lie in the plane of the orthographic drawing. The other labeled viewcell vertices 4103, and 4111 are below this plane (which is not apparent in this topographic top-down view).

The SV-ME wedge intersects a different polygon mesh object. This intersection forms the polyline labeled 4107 which bounds the interior region labeled 4112 (inside the corresponding polygon mesh).

The point labeled 4108 is a from-viewcell-element (in this case from-point) silhouette vertex.

The point labeled 4108 also happens in this case to be a point on a from-viewcell silhouette edge.

The wedge line (WL) 4109 is constructed incident on the CSV 4115 using the pivoting step of 1545 of FIG. 15. (i.e. pivot to the viewcell vertex supporting the first-order silhouette edge intersecting the current wedge).

The point labeled 4108 is a CSV. This point corresponds to the intersection of the SV-ME wedge (incident on 4104 and delimited by edges 4105 and 4106) with the from-viewcell first-order silhouette edge. This first-order silhouette edge runs in and out of the plane of the drawing. This intersection occurs at point 4108.

The dashed line 4110 corresponds to an edge-on view of the first-order wedge incident on the first-order from-viewcell silhouette edge running in and out of the plane of the drawing at point 4108. This first-order wedge is an SV-ME wedge having the supporting viewcell vertex labeled 4103.

The triangular region between WL 4109 and the dashed edge 4110 is not necessarily part of the wedge. If the viewcell vertex supporting the wedge (vertex 4109) and the viewcell vertex supporting the intersecting first-order silhouette edge (vertex 4103) are not both in the same plane as the wedge; then one or more SE-MV wedges, not in the plane of the current wedge (delimited by edges 4104, 4105, and 4106) will connect the current SV-ME wedge with the other SV-ME wedge seen edge-on at dashed line 4110.

These SV-ME wedges are formed during the 3D mesh traversal process (step 2060) using the sweep method at the CSV.

Dashed line 4113 shows the boundary edges of one of the SE-MV wedges connecting the two SV-ME wedges. In this example, the SE-MV wedge is formed by a sweep from viewcell vertex 4103 to 4111. This SE-MV connects directly to the SV-ME wedge sharing edge 4110. This is the wedge intersected by the current wedge at the point 4108 (the CSV).

A second SE-MV wedge formed by sweep between 4111 and 4102 is delimited by dashed line 4113 and another line lying on top of 4109. A third SE-MV wedge connects to edge 4109 by sweeping between the line overlying line 4109 and line 4109 itself. This SE-MV wedge is seen edge-on in FIG. 14A as overlying line 4109.

In this example, three SE-MV wedges connect the current SV-ME with the SV-ME wedge intersected by the current wedge at the CSV point 4108.

In this case, the current wedge is an SV-ME wedge and the visibility problem is a from-point visibility. In this case, each on-wedge 2D discontinuity mesh point (intersection of a wedge line with a mesh polygon) corresponds to an occlusion boundary point from the VCE (a point). Thus, additional tests in step 1563 need not be performed.

FIG. 41B is a diagram showing the process of on-wedge visibility, including the construction of wedge lines for a case in which the connecting SE-MV wedges intersect the polygon mesh at the silhouette vertex, forming a cusp of the first-order silhouette contour.

FIG. 41B shows the same first-order mesh silhouette edge (labeled 4123) as FIG. 41A (where the edge is labeled 4104). The mesh polygon object 4126 is the same as the mesh polygon object 4107. The SV-ME wedges in both diagrams are supported by exactly the same point, labeled 4121 in FIGS. 42B and 4102 in FIG. 42A. As the supporting points and the supported silhouette edges are identical, the resulting SV-ME wedges are also identical.

Figure 42A:
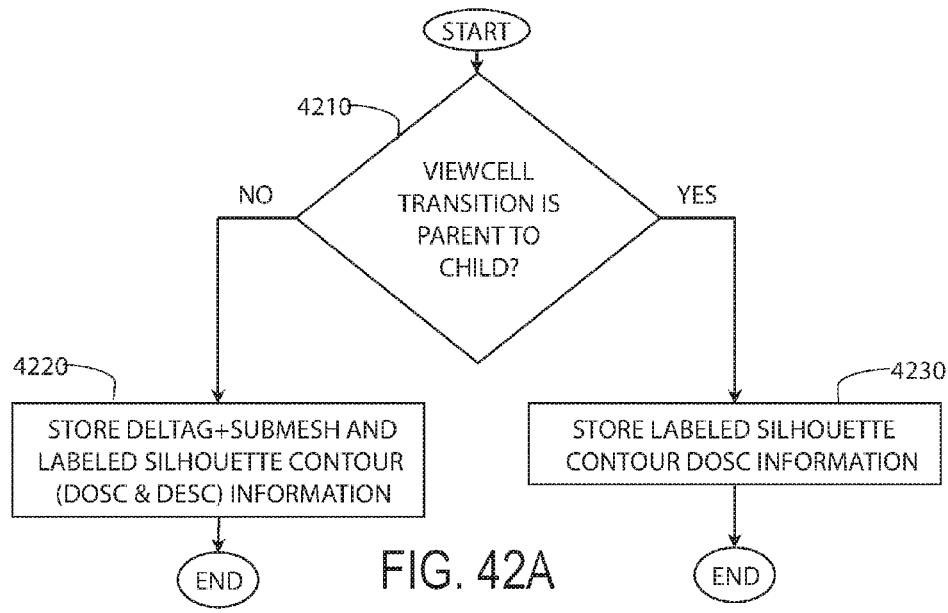
FIG. 42A is an exemplary flowchart Showing the method using hierarchical viewcells.
Figure 42B:
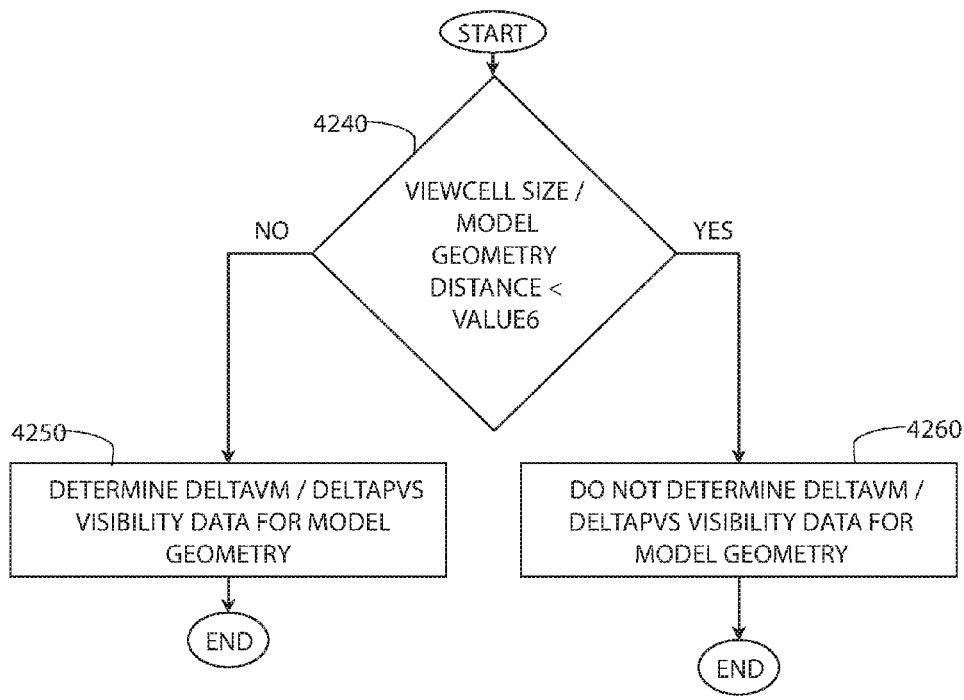
FIG. 42B is an exemplary flowchart Showing the method using hierarchical viewcells.

In the case of FIG. 42B the viewcell is larger, than in FIG. 41A.

In the case of FIG. 42B the from-viewcell-element silhouette vertex (4127) does not correspond to a from-viewcell first-order silhouette edge. Consequently, a surface formed by SE-MV wedge(s) constructed on this vertex by the sweep process intersect the polygon mesh at the vertex. This intersection is a cusp of the first-order silhouette contour. FIG. 41D shows a cusp (labeled CUSP) of a first-order silhouette contour in 3D, details are discussed in conjunction with the figure.

In the example of FIG. 42B, a SE-MV wedge is formed between WL 4129 and line 4131. This SE-MV is formed by a sweep between viewcell vertex 4121 (supporting the current wedge), and viewcell vertex 4122, supporting the SV-ME on the first-order mesh silhouette edge moving in and out of the plane of the drawing at labeled mesh vertex 4128. In other cases, this SE-MV wedge may not be in the plane of the current wedge. Clearly, this SE-MV wedge intersects the polygon mesh at the on-wedge, from-viewcell-element silhouette vertex 4127. Consequently, a discontinuity mesh boundary occurs on the polygon mesh 4126 and one segment of this boundary contains the vertex 4127 which is also an interior vertex of the current wedge. Thus, the point 4127 is both a point on the visible part of the polygon mesh and an initial point on the first-order silhouette contour, making it a cusp of the contour.

The dashed line 4130 corresponds to a SV-ME wedge that is formed on the first-order silhouette edge intersecting 4128 (moving in and out of the plane of the drawing). The from-viewcell visible portion of this wedge is, in general, connected to the current wedge by the discontinuity mesh boundary created by the intersection of the SE-MV wedge (4129-4127-4131) with the polygon mesh. In this case, the discontinuity mesh boundary on the surface of the polygon mesh connects two otherwise disconnected first order silhouette contours to form a continuous umbral event surface.

FIG. 41C illustrates the process of on-wedge visibility for a SE-ME wedge using the 2D mesh traversal process of FIG. 15 and related figures.

4165 is a viewcell. In this case an edge of the viewcell with endpoints 4163 and 4167 is a supporting viewcell edge for a first-order mesh silhouette edge 4172. In this case edge 4172 and the supporting viewcell edge are exactly parallel and form a SE-ME wedge. The SE-ME wedge is comprised of the first-order silhouette edge 4172 and the lines 4174 and 4176. The latter two lines are formed by extending the diagonal edges of the corresponding SE-ME supporting polygon.

Three mesh objects 4170, 4188, and 4186 intersect the wedge. The first-order UBLs incident on first-order silhouette vertices are shown as dashed lines 4178, 4190, and 4192.

Mesh 4188 intersects the containment boundary of the wedge at point 4193. In one embodiment of the 2D mesh traversal process the traversal is initiated at a point intersecting a previously processed wedge (e.g. another wedge sharing edge 4147, not shown here). In this case, the polyline segment of mesh 4188 containing point 4193 is the starting segment of the 2D traversal.

Traversal proceeds to the next segment, labeled 4194. The shaft between segment 4194 and the supporting viewcell edge contains segments of mesh 4170, so the traversal of mesh 4188 is suspended and traversal is jumped to 4170 (step 1510).

During the traversal of mesh 4170 the WLs 4178 and 4192 are constructed at the corresponding from-viewcell-edge silhouette vertices (step 1520 and 1545).

For each of the WLs, the intersection with the closest polygon mesh object is found by ray casting (step 1555). These intersection points, labeled 4182 and 4184 respectively are potential occlusion boundary points.

Each of these points is tested to determine if it is otherwise occluded from the supporting viewcell element (VCE) which in this case is an edge. (Step 1563). This test employs the 2D version of the modified point in polyhedron test of FIG. 25. (point in polygon test).

In the case of points 4182 and 4184, these are proven to be otherwise visible from the viewcell edge by the modified point in polyhedron/polygon test using the mesh polygon segments and other first-order WLs (including 4190). Therefore, the points are not occlusion boundary points and do not limit traversal.

Traversal is ultimately reinitiated on edge 4194 which is found (in step 1520) to have a silhouette vertex. In step 1545 the WL 4190 is constructed on this from-viewcell-edge silhouette vertex (and from viewcell silhouette edge). In step 1555, the intersection of this WL and the closest mesh polyline segment is determined to be point 4180.

In step 1563, point 4180 is determined to be not otherwise visible from the supporting viewcell edge, and therefore an occlusion boundary point. This point prevents traversal into the occluded section of the 2D mesh 4186. This occluded section is labeled 4195.

Traversal ultimately proceeds on the unoccluded side of the OB point 4180 (Steps 1583 and 1585) until the containment boundary point 4196 is encountered.

FIG. 41D is a hidden-line perspective view diagram showing a polygon mesh, a viewcell, and a portion of a first-order silhouette contour including a cusp and a compound silhouette vertex. The polygon mesh is labeled MESH-B1. In one embodiment MESH-B1 is a manifold triangle mesh. In FIG. 41D some of the mesh polygon edges are not shown in order to simplify the figure.

Three first-order silhouette edges and their associated SV-ME wedges (supporting vertex wedges) are labeled. The wedges are not shown in their entire semi-infinite extent. Wedge SV-ME-WB2 is incident on first-order silhouette edge E2. Wedge SV-ME-WB3 is incident on first-order silhouette edge E2. Both of these wedges are supported by viewcell vertex labeled SVV-B2.

A portion of another first-order silhouette edge is shown as the line segment between the mesh vertex labeled VB and a compound silhouette vertex labeled CSV-B. Another portion of this first-order silhouette edge is occluded in this view. (It is occluded by wedge SE-MV-WB12.) The wedge SV-ME-WB1 is the supporting vertex wedge incident on the entirety of this first-order silhouette edge. Wedge SV-ME-WB1 has corresponding supporting viewcell vertex labeled SVV-B1.

The mesh vertex labeled CUSP-B is an inside-corner vertex of MESH-B1. The supporting edge wedge labeled SE-MV-WB12 is incident on CUSP-B and has a corresponding supporting viewcell edge labeled SVE-B12.

The mesh polygon edge defined by the line segment between vertex VB and vertex CUSP-B is not a first-order silhouette edge since neither mesh polygon sharing the edge is backfacing with respect to all VIEWCELL vertices. Thus, the chain of connected first-order silhouette edges, which includes edges E3 and E2, ends at CUSP-B.

However, the conservative linearized umbral event surface formed by the wedges and by their intersections with mesh polygons is continuous at CUSP-B. The continuity is created, in this case, by the wedge SE-MV-WB12, incident on CUSP-B. Wedge SE-MV-WB12 intersects a mesh polygon to form an occlusion boundary segment labeled OB-B. Wedge SE-MV-WB12 also intersects the first-order silhouette edge on the line formed by VB and CSV-B. The intersection of wedge SE-MV-WB12 with this first-order silhouette edge is the compound silhouette vertex CSV-B. At CSV-B wedge SE-MV-W12 divides the intersected first-order silhouette edge into an unoccluded segment (the segment defined by VB and CSV-B) and an occluded segment (not shown).

The three line segments E2, OB-B, and CSV-B-VB, form a continuous first-order umbral contour on MESH-B1 which supports a corresponding continuous linearized umbral event surface (wedges SV-ME-WB2, SE-MV-WB12, and SV-ME-WB1).

The intersection of wedges SE-MV-WB12 (which protrudes "above" wedge SV-ME-WB1 in this view) and SV-ME-WB1 is shown as the line of intersection labeled EDGE-I. Embodiments which construct PAU corresponding to these CLUES will determine this intersection. Other embodiments, such as those that construct a from-region visibility map, may not explicitly determine this intersection.

FIG. 33A, FIG. 33B, FIG. 33C, and FIG. 33D Comprise a Flowchart Showing a Method of Identifying VM Regions of Interest (ROI) In a Unified Visibility Map Representing a Transition From One Viewcell to a Related Viewcell and A Method for Labeling the Silhouette Contours Corresponding to the Occlusion Boundaries of those ROI having a High Effective Occlusion.

Figure 33D:
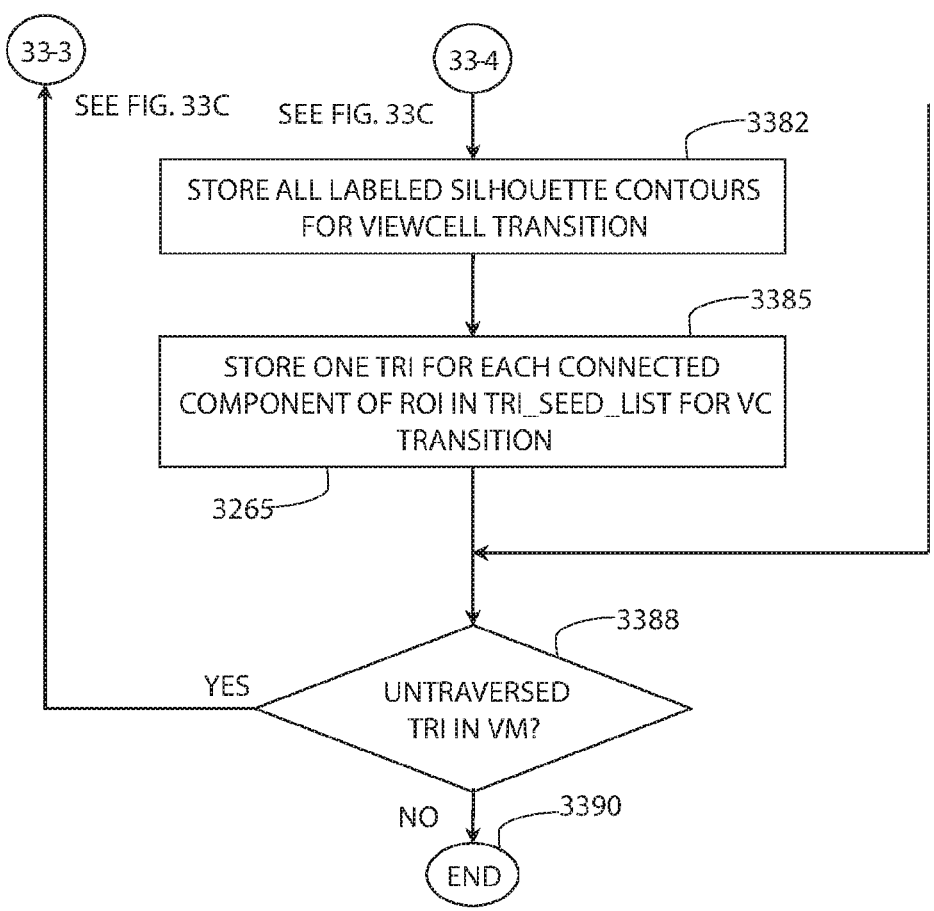

The flowchart of FIG. 33A, FIG. 33B, and FIG. 33D show an embodiment of a method of identifying connected regions of manifold triangle meshes, called regions of interest or ROI, that reflect a change in visibility during a viewcell transition (e.g., from VC A to VC B).

This flowchart also shows a method of identifying the silhouette contour(s) corresponding to the occlusion boundary (OB) or boundaries which define a ROI. Further, this flowchart shows a method of labeling these silhouette contours (using the Contour data structure and associated data structures of FIG. 31) and storing additional associated information with the contours (e.g. VM_Info data of FIG. 31A).

According to some embodiments, the method of FIG. 33A-FIG. 33D is conducted as an offline or precomputation process. The method can identify the deltaG+ and deltaG− components of the delta-PVS data, which can be used during a runtime process to incrementally construct a new PVS from an existing one. Alternatively, the method of FIG. 33A-FIG. 33D can identify and label silhouette contours corresponding to the boundaries of ROI. This labeled silhouette contour information can be later used to construct deltaG+ and deltaG− data at runtime. This approach can require considerably less storage/transmission resources than explicitly storing/transmitting the deltaG+ and deltaG− packets.

If one of the viewcells is completely contained in the other, then the ROI corresponds to the regions visible only from the contained viewcell. The labeled silhouette contours corresponding to these type of ROI are used, in some embodiments, to construct the VM of the child viewcell from the VM of the parent at runtime (using a hinted, simplified 3D mesh traversal), thereby avoiding in select cases the explicit storage of deltaG− information).

If the two viewcells share a face and one is not contained within the other (a relationship termed "contiguous"), then the ROI correspond to delta regions (DR). For a viewcell transition from VC A to VC B (called an AB transition), the DR are of two types. One type of delta region, $DR_OAB$ (delta region of occlusion from A to B) contains mesh triangle fragments visible from viewcell A but not B. The $DR_OAB$ are also $DR_EBA$ (delta region of exposure from B to A). Likewise, $DR_EAB=DR_OBA$. The $DR_OAB$ corresponds to deltaG− data for the AB transition, while the $DR_EAB$ corresponds to deltaG+ data for the AB transition. The labeled silhouette contours corresponding to the boundaries of these ROI can be used to construct the deltaG+ and or deltaG− data at runtime (also using a hinted, simplified 3D mesh traversal), thereby avoiding, in select cases, the explicit storage of deltaG+ and deltaG− polygon fragment information.

Turning now to FIG. 33A-FIG. 33D, in the first phase of the process, the type of ROI to be identified for a particular viewcell transition are specified. The ROI are specific regions of particular unified visibility map representing the viewcell transition. A unified visibility map for an AB transition is a visibility map containing the mesh triangle fragments visible from viewcell A and viewcell B, and the OB_SEGS of the from-viewcell VM for each of the viewcells.

In some embodiments, process flow starts at step, 3305, to determine if the viewcells for which the delta-visibility information for particular viewcell transition is to be determined have a parent-child (containing-contained) relationship.

If in decision step 3305, it is determined that the viewcells for which the delta visibility information is to be determined have a parent-child relationship, then process flow proceeds to step 3307.

In step 3307, the ROI to be identified are regions visible from the contained (child) viewcell for the specific viewcell transition. Since the VM for a child viewcell is always a subset of the parent viewcell, the child VM is constructed, in some embodiments, using explicit deltaG− information computed for the transition. However, if the child viewcell is significantly smaller than the parent viewcell then the corresponding deltaG− information will be relatively large. Alternatively, in the present method the regions of interest (ROI) for such a transition can be set to those regions visible only from the child viewcell. By identifying the seed triangles and boundaries of these regions, the VM/PVS of the child viewcell can often be determined from the VM of the parent using much less information by conducting the simplified hinted 3D mesh traversal on the unified visibility map starting with the seed triangles.

If, in decision step 3305, it is determined that the viewcells for which the delta visibility information is to be determined do not have a parent-child relationship, then process flow proceeds to step 3309.

Step 3309 indicates that the two viewcells are contiguous (the viewcells share a face and one is not contained within the other). Parent-child, and contiguous relationships are two special arrangements of two viewcells in which the transition from one viewcell to another occurs in a volume of space that is completely contained in the union of the two viewcells. Using these two arrangements of viewcells, the ROI, as constructed later in the process, are guaranteed to completely and conservatively reflect the newly visible and newly exposed regions (e.g., since there are no "gaps" between the related viewcells, no transiently visible geometry is missed).

Process flow proceeds to step 3311 to indicate that the ROI are delta-regions of visibility (DR).

Process flow proceeds to decision step 3313 to enumerate the various types of DR. If in decision step 3313, it is determined that the DR to be identified are visible from VC A and not visible from viewcell B then, process flow proceeds to step 3315.

In step 3315, the ROI to be identified are $DR_OAB$ and $DR_EBA$.

If in decision step 3313, it is determined that the DR to be identified are visible from VC B and not visible from viewcell A, then process flow proceeds to step 3317.

In step 3317, the ROI to be identified are $DR_EAB$ and $DR_OBA$.

In some embodiments, the steps 3305 through 3317 only enumerate the types of ROI that are to be identified for a particular viewcell transition, depending on the relationship between the transitioning viewcells and the desired use of the delta-visibility information. For a particular transition between contiguous viewcells A and B in the AB direction, both $DR_OAB$ and $DR_EAB$ ROI types are typically identified. Together, these two types of ROI completely describe the visibility change (delta-VM/delta-PVS) for the viewcell transition.

Beginning in step 3319, the actual identification of these ROI regions in the unified visibility map commences.

In step 3319, the VM for a viewcell comprising the union of viewcell A and viewcell B is determined (e.g. using any of the previously described methods of from-viewcell VM construction). Any superset of this VM can also be used as the starting VM on which the OB_SEGS corresponding to the from-viewcell visibility map of both viewcells for the transition is later constructed (step 3321). This fact allows the determination of delta-visibility information (either explicit deltaG packets or corresponding labeled contour data) to be solved using an efficient hierarchical decomposition of the from-region visibility problem. In this hierarchical approach, the triangle fragments visible from any viewcell containing both viewcell A and viewcell B can be used as the VM on which the unified VM for viewcell A and viewcell B is constructed. (This fact can also be used to reduce delta-PVS storage requirements since the delta-PVS data for many viewcell transitions can ultimately be generated from the data for a single unified visibility map corresponding to a viewcell containing the other viewcells).

Process flow proceeds to step 3321, where the OB_SEGs corresponding the from-viewcell visibility map determined from viewcell A and the OB_SEGs corresponding the from-viewcell visibility map determined from viewcell B are constructed on the triangle fragments visible from the viewcell (A+B). The set of triangle fragments visible from viewcell (A+B) together with the OB_SEGs from viewcell A and the OB_SEGs from viewcell B is called the unified visibility map for viewcell A and B. The construction of these OB_SEGS, in some embodiments, employs the previously described 3D/2D mesh traversal method (FIG. 20 and related figures) for from-viewcell VM construction.

Of course, if viewcell A is a parent of viewcell B then the visibility map from viewcell (A+B) constructed in step 3319 already contains of all of the mesh triangle fragments visible from viewcell A as well as the OB_SEGS corresponding to the from-viewcell A silhouette contours. The OB_SEGs corresponding to viewcell B are added in step 3321. In the case where the two viewcells are contiguous, and/or the starting VM being used is the superset of VM(A+B) then both sets of OB_SEGS must generally be constructed in step 3321.

Process flow proceeds from step 3321 to process 33-1, which starts at step 3323 (FIG. 33B). In step 3323, the unified visibility map is traversed to define the VM regions formed by the arrangement of OB_SEGs from both viewcell A and viewcell B. In this traversal, a triangle is selected and traversal proceeds to the boundary formed by the OB_SEGs. In this step, the traversal of the 3D mesh occurs as a breadth-first traversal of an already constructed unified visibility map. Traversal proceeds to silhouette contours and the corresponding occlusion boundaries where traversal is restricted. This simple method of traversal insures that all triangles/fragments of a particular ROI are traversed to the boundaries of the ROI, even if the ROI has interior holes or spans multiple separate triangle meshes. (The previous construction of the VM may ultimately "fuse" parts of separate triangle meshes into a single ROI with interior holes corresponding to unoccluded regions of more distant mesh triangles visible through holes in a closer triangle mesh bounded by interior silhouette contours.)

Process flow proceeds to step 3325 to determine if any untraversed triangles remain in the current traversal/VM region (i.e., untraversed triangles connected to the current triangle wherein the connection does not require crossing an occlusion boundary). If in step 3325, it is determined that untraversed triangles exist in the current traversal, then process flow proceeds to step 3327, next triangle in the traversal.

If, on the other hand, it is determined in decision step 3325 that no triangles remain in the current traversal then process flow proceeds to step 3328 as all triangles of the current VM region have been traversed.

In step 3328, it is determined if the unified VM region identified in the traversal steps 3323 and 3325 is visible from viewcell A, viewcell B, or both. In some embodiments, this is determined using the simplified point-in-polyhedron test of FIG. 25. In the case of a parent-child related viewcell transition, this test can be simplified somewhat since all of the traversed regions are visible from the parent viewcell.

Alternate embodiments are possible in which the visibility of a single point in the VM region is first determined (step 3328 and 3331)) before a traversal is initiated in the region (step 3323). This approach allows VM regions that are not ROI to be identified without a full traversal of the region.

Process flow proceeds to decision step 3331 to determine if the traversed region of the VM corresponds to a region of interest (ROI) previously established in the earlier steps 3305-3317 for the specific viewcell transition. This is determined by comparing the result of step 3328 (e.g. visible from A, from B, from both, or from neither; the latter only being possible if the VM being used is a superset of VM(A+B)); with the definition of the ROI determined in the earlier steps 3305-3317.

If, in decision step 3331, it is determined that the traversed region of the unified VM is not an ROI, then process flow proceeds to decision step 3349 to determine if there are any untraversed triangles in the VM.

If, in decision step 3349 it is determined that any untraversed triangles remain in the unified visibility map, then process flow proceeds to step 3337, where the next triangle in the unified VM (belonging a new VM region) is selected for processing.

If, in decision step 3349, it is determined that no untraversed triangles remain in the unified VM (no more unified VM regions to process) then process flow proceeds to step 3352. Process flow terminates at 3352.

If, in decision step 3331, it is determined that the traversed region of the VM is an ROI, then process flow proceeds to step 3332.

In decision step 3332, it is determined if the current ROI is a delta region of occlusion (DR_O) for the viewcell transition. If the ROI is a $DR_O$, then process flow proceeds to step 3334.

In step 3334, the effective static occlusion of the ROI is determined using the metrics previously described for an occluded region. The value of a variable called the effective dynamic visibility (EDV) is set to the ESO of the ROI.

If, in decision step 3332, it is determined that the current ROI is not a $DR_O$, then process flow proceeds to step 3333.

In decision step 3333, it is determined if the current ROI is a delta region of occlusion (DR_E) for the viewcell transition. If the ROI is a $DR_E$, then process flow proceeds to step 3336.

In step 3336, the effective static occlusion (ESO) of the occluded regions surrounding the current ROI (called the surrounding occluded regions or SOR) is determined using the metrics and previously described for an occluded region. The value of the variable called the effective dynamic visibility is set to the aggregate ESO of the SOR.

If, in decision step 3333, it is determined that the ROI is not a delta region of exposure, then process flow proceeds to step 3335.

In decision step 3335, it is determined if the current ROI corresponds to region visible from a child viewcell for the specific parent-to-child viewcell transition. If the ROI is a child region, then process flow proceeds to step 3338.

In step 3338, the effective static occlusion (ESO) of the occluded regions surrounding the current ROI (called the surrounding occluded regions or SOR) is determined using the metrics and previously described for an occluded region. The value of the variable called the effective dynamic visibility is set to the aggregate ESO of the SOR. Note that the identical processing occurs for the case of a $DR_E$ and a child ROI but they are differentiated here for the sake of exposition.

Following steps 3334, 3336, or 3338, process flow proceeds to step 3346.

In decision step 3346, it is determined if the EDV (a measure of the "effectiveness" or efficiency of the current ROI in representing delta visibility for the specific viewcell transition) for a ROI is greater than a predetermined value (e.g. VALUE2).

If, in decision step 3346, it is determined that the EDV for a ROI is not greater than a predetermined value (VALUE2), then process flow proceeds to step 3340.

In decision step 3340 it is determined if the boundary of the current region of interest (and the corresponding silhouette contour) can be significantly simplified (e.g. using the method of FIG. 30, in which the ESO is used as a metric to direct the conservative simplification of the boundary). If the ROI is a $DR_O$ then the method of FIG. 30 can be applied directly to the region. If the ROI is a $DR_E$ or Child region then the method of FIG. 30 is applied to occluded regions surrounding the current ROI (the SOR). The SOR may be defined as the occlusion regions immediately adjacent to the ROI. Optionally the SOR may include other occlusion regions connected to this set of SOR. This approach allows the conservative simplification process to spread into adjacent areas in order to ultimately achieve a sufficiently simplified ROI.

If, in decision step 3340, it is determined that the boundary can be simplified, then the EDV of the new conservative representation of the region bounded by the simplified occlusion boundary is determined in decision step 3346.

If, on the other hand, it is determined that the boundary of the current ROI cannot be simplified to achieve a target EDV value, then process flow proceeds to step 3343.

In step 3343, the current ROI is determined to have a low EDV and therefore, is ignored as a significant component of delta-visibility for the current viewcell transition. In this step if the ROI corresponds to a $DR_E$AB then the corresponding mesh triangles inside the region are conservatively included in the VM for viewcell A. The original triangles are included without the new triangles that would have been induced by the boundary segments of the DR. If the current ROI corresponds to a $DR_O$AB then the corresponding mesh triangles of the region are conservatively included in the VM for viewcell B. The original triangles are included without the new triangles that would have been induced by the boundary segments of the DR.

If the unified visibility map ROI corresponds to a parent-child viewcell transition and the EDV of the region is low, then the geometry of the surrounding occluded regions is conservatively included in the ROI, and the EDV of the expanded region can be recomputed. As with the case of a $DR_E$, the SOR region may be optionally extended into adjacent areas beyond the immediately bordering SOR. This approach can identify extreme cases in which the parent and child VM do not differ significantly. In such cases the child ROI is removed completely.

Steps 3346, 3340, and 3343 together allow the ESV of the region to be determined and if the value of the ESV is too low, attempts can be made to conservatively simplify the boundary and thereby increase the ESV. If the ESV remains below a predetermined value then the ROI is not considered to correspond to a significant region of delta-visibility for the viewcell transition and the viewcell transition can be ignored.

Using the ESV (obtained from the ESO) as metric of the effectiveness of an ROI significantly reduces the storage and compute times required for the method. This is true because in many cases small regions of occlusion or exposure would otherwise induce large numbers of new triangles surrounding the ROI because of retriangulation at the ROI boundary. These regions tend to have a low ESO and therefore would not be considered effective occluding (or exposing) regions using the present method. Instead, for example, the newly visible set of primitives for a specific AB transition are simply conservatively to the VM/PVS for viewcell A.

If, in decision step 3346, it is determined that the EDO of the current ROI exceeds a predetermined value (e.g. VALUE2), then process flow proceeds to process 33-2, which starts at step 3355.

In step 3355, the storage size of the deltaG+ and/or deltaG− (which may be deltaI-information comprising pointer or index information referencing actual newly occluded polygons), or child viewcell data (if the viewcell transition is parent-to-child) is estimated and the value of the variable SS is set in some direct proportion to this storage size. ROI containing many triangles/triangle fragments tend to have a high storage cost for the corresponding deltaG+ or deltaG− packets. The alternate storage format used by the present method replaces explicit storage of the deltaG packets with labeling of the silhouette contour/VM boundaries that define the corresponding ROI. The actual deltaG information is generated only when needed using a simplified 3D mesh traversal which employs the unified VM region boundaries generated from the labeled silhouette contour information for the specific viewcell transition.

Process flow proceeds to step 3358, where the value of SS is compared to a predetermined value (e.g. VALUE3). If, in decision step 3358 it is determined that the value of SS is not greater than VALUE3, then process flow proceeds to step 3361.

In step 3361, the deltaG data for the ROI is stored directly and process flow proceeds to decision step 3388.

Decision step 3388 is identical to the previously described step 3349.

If, in decision step 3358 it is determined that the value of SS is greater than the predetermined value VALUE3, then process flow proceeds to step 3364.

Steps 3364 through 3385 are steps to identify the silhouette contours corresponding to the OB_SEGS that form the boundaries (both outer boundaries and inner boundaries, since the ROI may contain holes) of the ROI. In these steps the corresponding silhouette contours (which are edges and vertices of the original triangle mesh plus some additional edges corresponding to SE-MV wedges at inside corner simple and compound silhouette vertices) are labeled and seed triangles, one for each connected component of a ROI is identified and stored.

Beginning at step 3364, the OB_SEGS from viewcell A and the OB_SEGS from viewcell B forming the outer boundary of the ROI and the silhouette contours corresponding to these OB_SEGS are identified.

Process flow proceeds to step 3367, where the OB_SEGS bounding the ROI are intersected with each other and the intersection points are designated as IP(S) and stored with the corresponding VM_INFO data structure for the corresponding silhouette contour (data structure given in FIG. 31A).

Process flow proceeds to step 3370, where the silhouette contours corresponding to the outer boundary of the ROI are labeled and stored with the mesh, (including optionally DeltaGplus_attach_polyline info) using the data structures previously described in conjunction with FIG. 31A and FIG. 31B and FIG. 31C.

Process flow proceeds to step 3373, where the OB_SEGS from viewcell A and the OB_SEGS from viewcell B forming the inner boundaries of the ROI and the silhouette contours corresponding to these OB_SEGS are identified.

Process flow proceeds to step 3376, where the OB_SEGS forming the inner boundaries of the ROI are intersected with each other and the intersection points are designated as IP(S) and stored with the corresponding VM_INFO data structure for the corresponding silhouette contour (data structure given in FIG. 31A).

Process flow proceeds to step 3379, where the silhouette contours corresponding to the inner boundaries of the ROI are labeled and stored with the mesh using the data structures previously described in conjunction with FIG. 31A and FIG. 31B and FIG. 31C.

Process flow proceeds from step 3379 to process 33-4, which starts at step 3382 (FIG. D). In step 3382, all of the (possibly simplified) outer and inner silhouette contours corresponding to the for the ROI corresponding the a specific viewcell transition are labeled and the labeled associated with the specific viewcell transition.

Process flow proceeds to step 3385, where one triangle for each connected component of the ROI is stored in TRI_SEED_LIST for the specific viewcell transition.

Subsequently, process flow proceeds to step 3388 and 3390 (if no untraversed triangles exist in the VM). In some embodiments, these steps are identical to the previously described steps 3349 and 3352 respectively. If there are untraversed triangle sin the VM, process flow proceeds to process 33-3, which starts at step The ROI corresponding to the parent-to-child viewcell transition is not a delta region in the sense that the seed triangles for this type of ROI are visible from both viewcells for the parent-to-child viewcell transition. Using this type of ROI, the VM/PVS for a child viewcell can be efficiently constructed from the parent VM using the outer and inner boundaries of the ROI constructed from the corresponding labeled silhouette contours. This construction uses the hinted, simplified 3D mesh traversal method of FIG. 36, and FIG. 37.

In contrast the ROI corresponding to the transition between contiguous viewcells are delta regions (DR) of visibility. Using this type of ROI, the deltaG+ and deltaG− can be efficiently constructed from the mesh triangle/fragments visible from the viewcell A+B, together with the outer and inner boundaries of the ROI constructed from the corresponding labeled silhouette contours. This construction also uses the hinted, simplified 3D mesh traversal method of FIG. 36 and FIG. 37

Figure 34A:
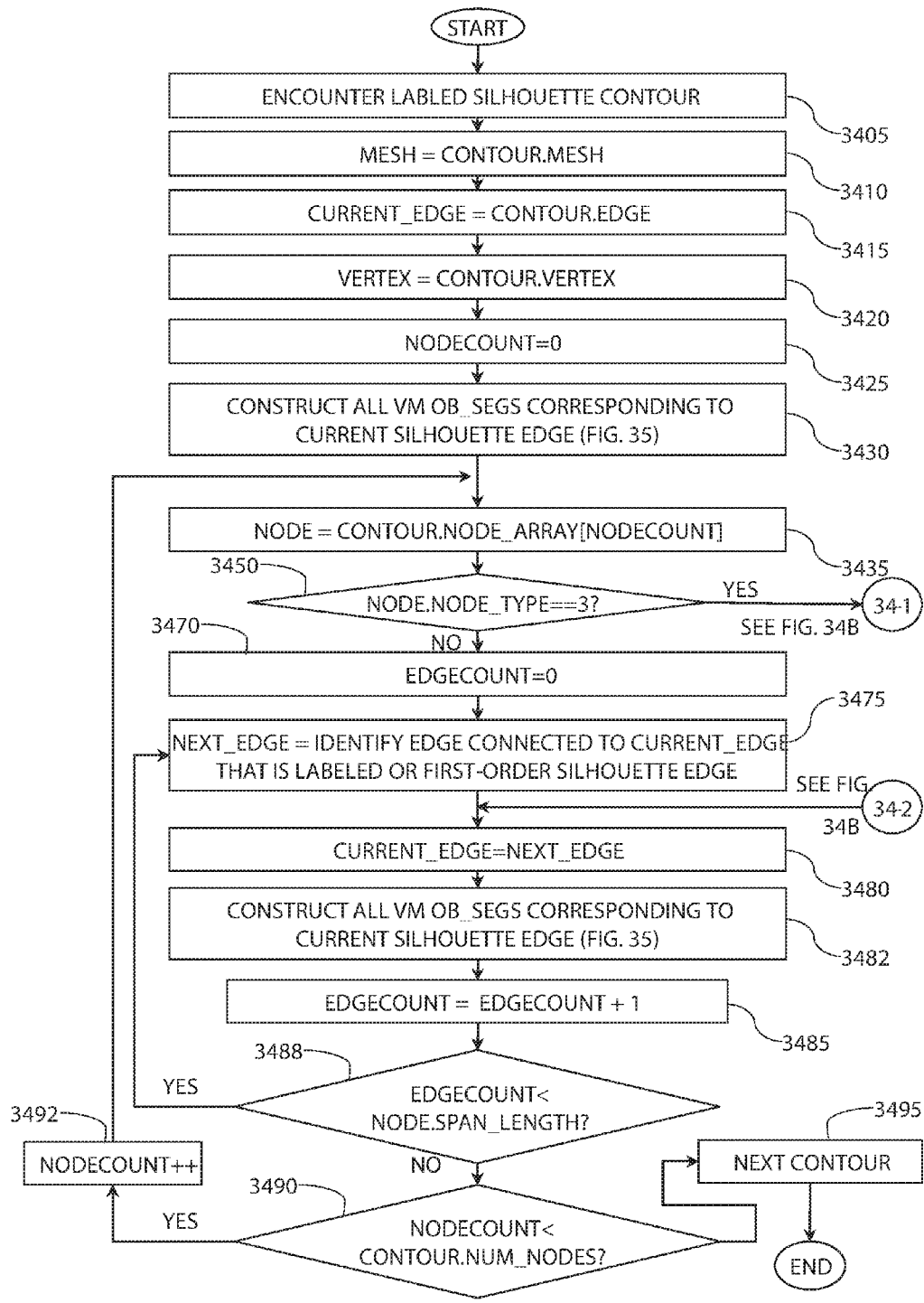
FIG. 34A is an exemplary flowchart showing a method of rapid runtime construction of visibility map occlusion boundary segments using labeled silhouette contour information for a single contour.
Figure 34B:
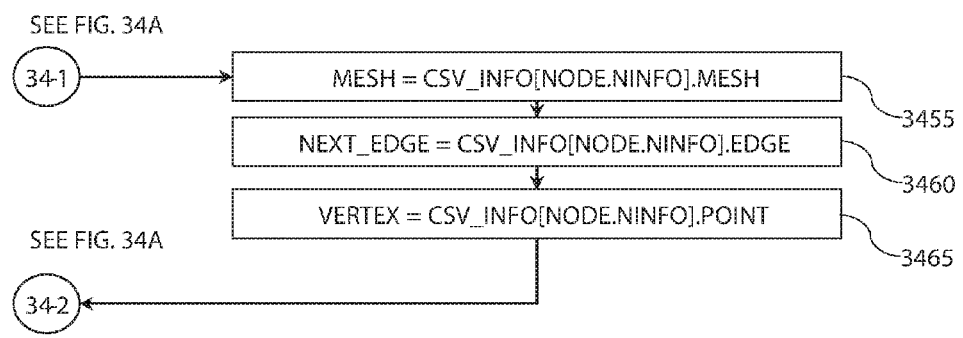
FIG. 34B is a continuation of FIG. 34A.

FIG. 34A and FIG. 34B Method of Rapid Runtime Construction of Visibility Map Occlusion Boundary Segments Using Labeled Silhouette Contour Information for a Single Contour.

As previously described, the effective delta regions (DR)s for a viewcell transition (e.g. A to B) are identified and the corresponding silhouette contours generating the DR occlusion boundaries are established (using the method of FIG. 33) and labeled using the data structures of FIG. 31A and FIG. 31B. This labeling is conducted as an offline process.

Once the labeled silhouette contour information is stored (as data associated with the triangle mesh) this data can be used at runtime to incrementally construct a visibility map corresponding to a specific viewcell from the known visibility map of a connected or containing viewcell.

FIG. 34A and FIG. 34B is a flowchart showing a method of constructing the visibility map corresponding to a specific viewcell from the known visibility map corresponding to a connected or containing viewcell using the previously stored labeled silhouette contour information for the specific viewcell transition.

In some embodiments, process flow starts at step 3405, a labeled silhouette contour (previously generated and stored for the specific viewcell transition being considered) is identified using the data structures associated with mesh for storing the labeled silhouette contour in formation (FIG. 31A and FIG. 31B) using labeling methods of FIG. 30 and FIG. 33A and FIG. 33B.

Process flow proceeds to step 3410 to set the current manifold triangle mesh (MESH) to the particular mesh referenced by the Contour.mesh field of the Contour data structure of FIG. 31A.

Process flow proceeds to step 3415 to set the CURRENT_EDGE (a manifold triangle mesh edge) to the particular edge referenced by the Contour.edge field of the Contour data structure of FIG. 31A.

Process flow proceeds to step 3420 to set the VERTEX (a manifold triangle mesh vertex) to the particular edge referenced by the Contour.vertex field of the Contour data structure of FIG. 31A.

Process flow proceeds to step 3425 to set a variable NODECOUNT to 0.

Process flow proceeds to step 3430, where all of the visibility map occlusion boundary segments (VM OB_SEGS) corresponding to the CURRENT_EDGE are constructed. These VM OB_SEGS are constructed using the process shown in FIG. 35 and discussed in detail in conjunction with that figure.

Process flow proceeds to step 3435, to set the variable NODE to reference the particular Contour_Node data structure referenced by the first node of the current contour.

Process flow proceeds to step 3450 to determine if the NODE.node_type of the current Contour_Node data structure (FIG. 31A) is type 3. If the node_type is type 3, then the node corresponds to compound silhouette vertex and processing proceeds to process 34-1, which starts at step 3455 in FIG. 34B.

In step 3455, the MESH variable (initialized in step 3410) is now set to the particular mesh referenced by the CSV_INFO[NODE.NINFO].mesh referenced by the current node, which being a node_type 3 is a compound silhouette vertex (CSV) node Process flow proceeds to step 3460, where the variable NEXT_EDGE (indicating the next edge in the silhouette contour polyline) is set to the edge referenced by the CSV_INFO[NODE.NINFO].edge field of the CSV_Info data structure referenced by the current contour node.

Process flow proceeds to step 3465, to set the variable VERTEX to the vertex referenced by CSV_INFO[NODE.NINFO].point field of the CSV_Info data structure referenced by the current contour node.

The effect of steps 3455, 3460, and 3465 is to connect together two polylines on the surface of one or more manifold triangle meshes at a single point, the compound silhouette vertex. Having set the current MESH, NEXT_EDGE, and VERTEX variables to reflect this fusion into a compound silhouette contour, process flow proceeds to process 34-2, which returns process flow to step 3480 (FIG. 34A).

If, in decision step 3450, it is determined that the NODE_TYPE is not 3 (i.e., the node does not correspond to a compound silhouette vertex), then process flow proceeds to step 3470.

In step 3470, the value of a variable EDGECOUNT is initialized to zero.

Process flow proceeds to step 3475 to set the variable NEXT_EDGE to reference the edge of the manifold triangle mesh that is connected to the current edge and that is also a (first-order, from-viewcell) silhouette edge. This edge can be easily identified based on the connectivity of the manifold mesh and on the definition of a first-order silhouette edge (see FIG. 3). Alternatively, the NEXT_EDGE is identified as the edge connected to the current edge wherein the connected edge is already labeled as a labeled silhouette contour edge. This definition of the NEXT_EDGE is used in cases in which the silhouette contour does not shift or migrate (as a result of "retraction of the silhouette edge previously described") substantially. This situation is established during the preprocessing and stored in the struct Contour data structure next_edge_type field. If the next_edge_type has value of 0, then the NEXT_EDGE is identified as the next connected edge that has been previously labeled. If, on the other hand, the next_edge_type value is 1 then the NEXT_EDGE is identified as the next connected edge that is a (first-order) silhouette edge.

Process flow proceeds step 3480, to set the CURRENT_EDGE to the NEXT_EDGE.

Process flow proceeds to step 3480, where the visibility map occlusion boundary segments (VM OB_SEGS) that result from the intersection of the umbral visibility event surface(s) that are supported by the current edge with the manifold triangle meshes. These elements of the visibility map derived from the current edge of the labeled silhouette contour are constructed using a method shown in a flowchart of FIG. 35 and discussed in detail in conjunction with that figure.

Once the VM OB_SEGS generated by the current silhouette edge are constructed (using the method shown in the flowchart of FIG. 35), then process flow proceeds to step 3485.

In step 3485, the variable EDGECOUNT is incremented.

Process flow proceeds to step 3488 to determine if the EDGECOUNT is less than the span_length for the current node (NODE.span_length) as specified in the Contour_Node data structure of FIG. 31A.

If, in decision step 3488, it is determined that the EDGECOUNT is less than the span_length, then process flow returns to step 3475, where then next edge is identified.

If, on the other hand, it is determined in decision step 3488 that the EDGECOUNT is not less than the span_length, then process flow proceeds to decision step 3490.

In decision step 3490 it is determined if the NODECOUNT is less than the number of nodes in the contour, given by the data field CONTOUR.num_nodes, where CONTOUR is a reference to the current labeled silhouette contour being processed and the data structure Contour shown in FIG. 31A is employed.

If, in decision step 3490 it is determined that the NODECOUNT is less than the CONTOUR.num_nodes, then process flow proceeds to step 3492.

In step 3492, the NODECOUNT is incremented and processing returns to step 3435, where the next node is selected and processing continues.

If, on the other hand, in decision step 3490 it is determined that the NODECOUNT is not less than the CONTOUR.num_nodes, then process flow proceeds to step 3495.

Step 3495 indicates that the labeled silhouette contour has been processed and that processing should proceed to the next labeled silhouette contour. Process flow terminates at step 3495.

The overall control of processing all of the labeled silhouette contours for a specific viewcell transition is controlled by the process shown in the flowchart of FIG. 36, and discussed in detail in conjunction with that figure.

Figure 35A:
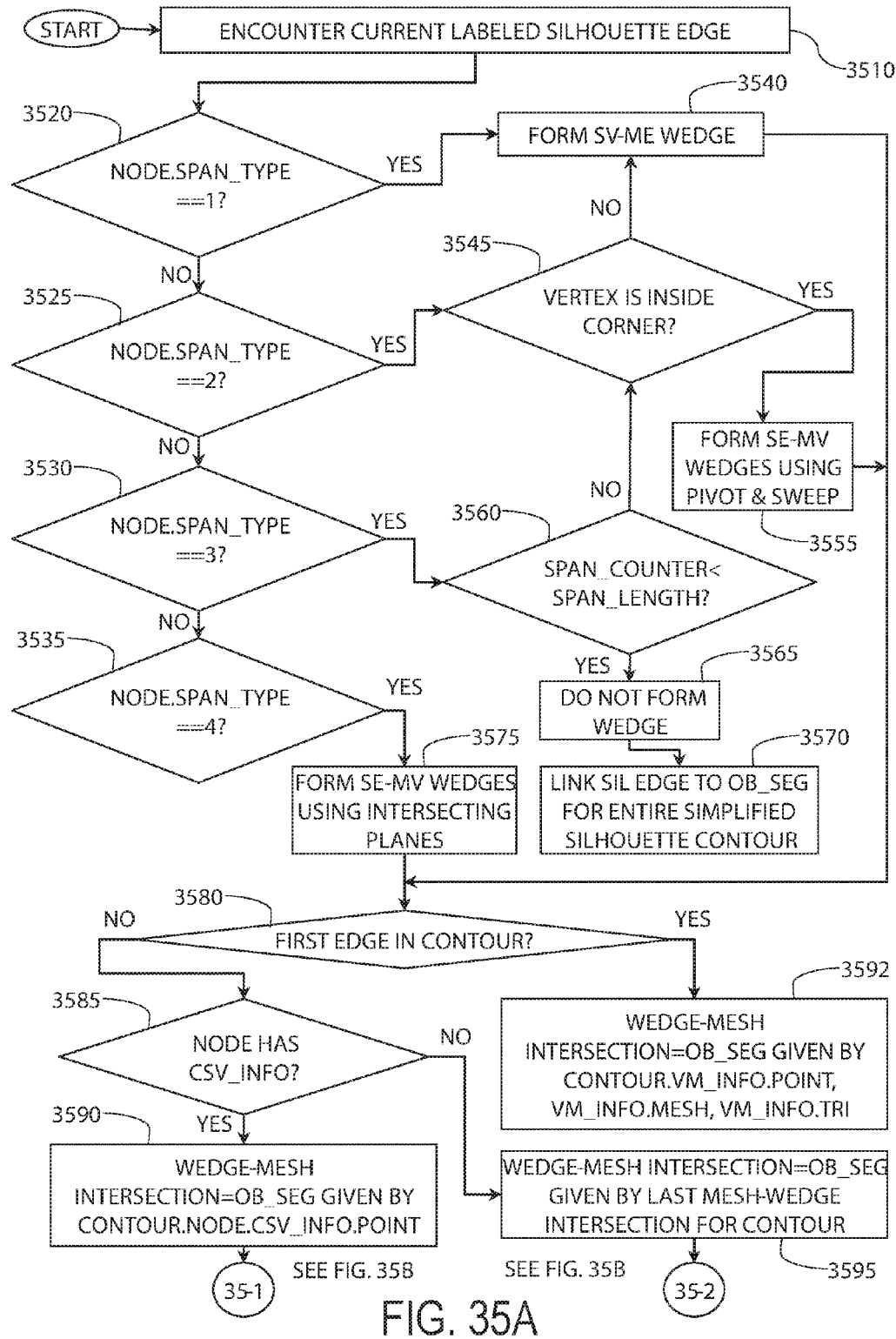
FIG. 35A is an exemplary flowchart showing a method of constructing visibility map occlusion boundary segments derived from a single silhouette edge of a labeled silhouette contour.
Figure 35B:
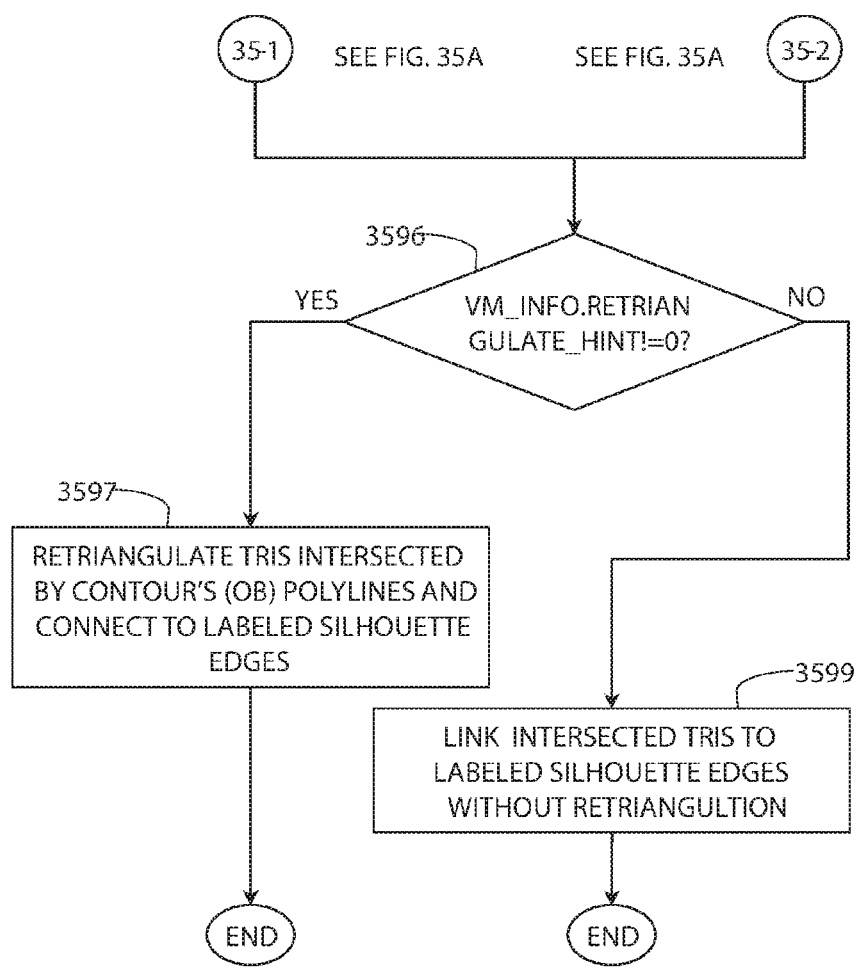
FIG. 35B is a continuation of FIG. 35A.

FIG. 35A and FIG. 35B Flowchart Showing a Method of Constructing Visibility Map Occlusion Boundary Segments Derived From a Single Silhouette Edge of a Labeled Silhouette Contour.

FIG. 34 is a flowchart for identifying the individual edges of a labeled silhouette contour given a small amount of data stored for the entire contour using the data structures of FIG.

31A. FIG. 35 is a flowchart for a process of constructing VM OB_SEGS derived from a single edge of the labeled silhouette contour.

By calling the process of FIG. 35 during the processing of a silhouette contour (FIG. 34, step 3482) the process of FIG. 34 effectively results in the construction of all VM_OBSEGs for an entire labeled silhouette contour.

In some embodiments, process flow starts at step 3510 upon encountering an edge of a labeled silhouette. This corresponds to step 3482 of the calling process of FIG. 34.

Process flow proceeds to decision step 3520 to determine if the span_type of the current labeled silhouette contour node (NODE, passed from the calling process) and specified in the Contour_Node.node_type data field specified in FIG. 31a is equal to the value of 1.

If, in decision step 3520, it is determined that the span_type of the current labeled silhouette contour node is equal to a value of 1 (indicating that the silhouette edge forms an outside corner on the labeled silhouette contour using the Contour_Node.node_type data field of FIG. 31A), then process flow proceeds to step 3540.

In step 3540, a SV-ME wedge is constructed using the pivot process previously described in conjunction with FIG. 4.

Process flow proceeds to step 3580 to determine if the current silhouette edge for which the wedge has been constructed is the first edge in the contour.

If, in decision step 3580, it is determined that the silhouette edge is the first edge in the contour, then process flow proceeds to step 3592.

In step 3592, the pre-stored wedge-mesh triangle intersection information is obtained from the CONTOUR.VMinfo.point, CONTOUR.VMinfo.mesh, and CONTOUR.VMinfo.tri data fields as specified in the data structures of FIG. 31A. This point corresponds to the precomputed and pre-stored intersection of the wedge with a specific mesh triangle wherein the intersection is the initial OB_SEG of the chain of VM OB_SEGS comprising the VM boundary associated with the labeled silhouette contour. This information was previously precomputed and stored during the offline process of identifying silhouette contours for a specific viewcell transition that produce visibility delta regions having a minimum effective dynamic occlusion value (step 3381 of FIG. 33). Thus, if the edge is the first edge in the labeled silhouette contour the step 3592 generates the first OB_SEG of the corresponding VM boundary.

If, on the other hand, it is determined in decision step 3580 that the silhouette edge being processed is not the first edge in the contour, then process flow proceeds to step 3585.

In decision step 3585, it is determined if the current node has CSV_Info associated with it, that is does the current silhouette edge support a wedge that intersects another visible silhouette edge. If so, then the Contour_Node.node_type value will be equal to 3 (FIG. 31A) and the Contour_Node.ninfo value will be the index into an array of CSV_Info data structures (FIG. 31B). In one embodiment CSV_Info data is not stored with a labeled silhouette contour but instead the initial point of each contour is defined at a CSV and therefore the corresponding data is stored in the Contour.mesh, Contour.triangle, and Contour.vertex fields.

If, in decision step 3585, it is determined that the current node has associated CSV_Info data, then process flow proceeds to step 3590.

In step 3590, the initial VM OB_SEG data is read from the CSV_Info[Contour_Node.inifo].mesh, CSV_Info[Contour_Node.inifo].edge, and CSV_Info[Contour_Node.inifo].point data structures.

If, on the other hand, it is determined in decision step 3585, that the current node does not have associated CSV_Info, then process flow proceeds to step 3595.

In step 3595, the VM OB_SEG corresponding to the current silhouette edge is constructed using VM OB_SEG mesh, triangle, and point intersection data from the last silhouette edge in the contour. Since the VM OB_SEGs form a polyline on the surface of a manifold triangle mesh the construction of a OB_SEG from an adjacent one is a straightforward piecewise construction of a polyline on a polyhedron.

Following either step 3590 or step 3595, process flow proceeds to process 35-1 and process 35-2, which starts at decision step 3596 in FIG. 35B. In decision step 3596, it is determined if the VM_INFO.RETRIANGULATE_HINT field is not equal to zero. This is a field of the VM_INFO data structure of FIG. 31A and is set to a value of 1 during the runtime construction of the visibility map if it is determined that the effective dynamic occlusion of the bordering visibility map region would be increased by retriangulating at the occlusion boundary.

If, in decision step 3596, it is determined that the value of VM_INFO.RETRIANGULATION_HINT is not equal to zero, then process flow proceeds to step 3597.

In step 3597, the triangles bordering the corresponding occlusion boundary are retriangulated at the boundary.

If, on the other hand, it is determined in decision step 3596 that the value of VM_INFO.RETRIANGULATION_HINT is equal to zero, then process flow proceeds to step 3599.

In step 3599, the triangles bordering the corresponding occlusion boundary are not retriangulated at the boundary. In this case, the triangles comprising the silhouette contour are "linked" to the partially occluded triangles without retriangulation. Process flow terminates at step 3599.

If, in decision step 3520, it is determined that the NODE.span_type is not equal to a value of 1 then process flow proceeds to step 3525.

In decision step 3525, it is determined if the NODE.span_type is equal to a value of 2, then process flow proceeds to step 3545. If the node_type is equal to a value of 2, then the contour may contain both outside and inside corner silhouette vertices. Consequently, process flow subsequently continues to 3545 to determine if the current silhouette edge is involved in an outside corner or inside corner with the next silhouette edge of the contour.

If, in decision step 3545, it is determined that the current edge and next edge of the silhouette contour form an outside corner, then process flow proceeds to step 3540, as previously described.

If, on the other hand, it is determined in decision step 3545, that the current edge and the next edge of the silhouette contour form an inside corner, then process flow proceeds to step 3555.

In step 3555, the SE-MV wedges incident on the inside corner silhouette vertex are formed using the sweep process previously described in conjunction with FIGS. 5A and 5B. Subsequently, process flow proceeds to step 3580, as previously described.

If, in decision step 3525, it is determined that the NODE.span_type is not equal to a value of 2, then process flow proceeds to step 3530.

In decision step 3530, it is determined if the value of NODE.span_type is equal to 3. If in decision step 3530 it is determined that the value of NODE.span_type is equal to 3, then process flow proceeds to step 3560. In this case, the span_type indicates that the contour should be simplified by skipping a subset of the edges of the contour during umbral wedge/VM OB_SEG construction. This information is precomputed and prestored in the corresponding Contour_Node.span_type and Contour_Node.span_length data structures during the identification of the differential effective static occlusion (also called the effective dynamic occlusion) of the DRs and simplification of the silhouette contour as shown in steps 3075 and 3089 of FIG. 30B.

In step 3560, the NODE.span_length is compared to a variable SPAN_COUNTER (which is initialized to zero before the contour is encountered) to determine between which vertices of the silhouette contour the simplified umbral visibility event surface and corresponding VM OB_SEG should be constructed. If, in decision step 3560 it is determined that the SPAN_COUNTER is less than the NODE.span_length, then process flow proceeds to step 3565, which indicates that a wedge is not formed on the current edge.

Process flow then proceeds to step 3570 in which the current silhouette edge is linked directly to the single OB_SEG for the entire silhouette contour, which is ultimately constructed in step 3540 or 3545 when the decision step 3560 directs processing toward steps 3545 or 3540.

If, in decision step 3530 it is determined that the NODE.span_type is not equal to a value of 3, then process flow proceeds to step 3535.

In decision step 3535, it is determined if the NODE.span_type is equal to a value of 3.

If, in decision step 3535, it is determined that the NODE.span_type is equal to a value of 3, then process flow proceeds to step 3575. In this case, the span_type indicates that umbral event surfaces incident on inside corner silhouette vertices of the contour should not be constructed using the sweep process, but should be constructed using the simpler method of intersecting the planes of the adjacent SV-ME wedges.

Consequently, in step 3575, the SE-MV wedges (and the corresponding VM OB_SEGs) are constructed using the intersection of the planes of the adjacent SV-ME wedges and process flow proceeds to step 3580 as previously described. FIG. 36 is a flowchart showing a process controlling the runtime process of constructing visibility map ROI using ROI boundaries constructed from pre-stored labeled silhouette contours wherein the ROI boundaries define delimit a simplified, hinted, runtime 3D mesh traversal process which traverses the ROI.

As previously described in conjunction with FIG. 33A-FIG. 33D, delta visibility data for a specific viewcell transition can be described as regions of interest (ROI) in a unified visibility map containing mesh triangle fragments visible from both viewcells and also containing the from-viewcell occlusion boundaries corresponding to both of the viewcells.

The type of delta visibility data depends on the construction of the corresponding ROI, which depends on the relationship of the two viewcells for which the viewcell transition is described.

If one of the viewcells is completely contained in the other, then the ROI can correspond to the regions visible only from the contained viewcell. The labeled silhouette contours corresponding to these type of ROI can be used to construct the VM of the child viewcell from the VM of the parent at runtime (using a hinted, simplified 3D mesh traversal), thereby avoiding in select cases the explicit storage of deltaG− information.

If the two viewcells share a face and one is not contained within the other (a relationship termed "contiguous") then the ROI correspond to delta regions (DR). For a viewcell transition from VC A to VC B (called an AB transition) the DR are of two types. One type of delta region, $DR_OAB$ (delta region of occlusion from A to B) contains mesh triangle fragments visible from viewcell A but not B. The $DR_OAB$ is also a $DR_EBA$ (delta region of exposure from B to A). Likewise $DR_EAB=DR_EBA$. The $DR_OAB$ corresponds to deltaG− data for the AB transition while the $DR_EAB$ corresponds to deltaG+ data for the AB transition. The labeled silhouette contours corresponding to the boundaries of these ROI can be used to construct the deltaG+ and or deltaG− data at runtime (also using a hinted, simplified 3D mesh traversal), thereby avoiding in select cases the explicit storage of deltaG+ and deltaG− polygon fragment information.

In some embodiments, process flow starts at step 3605, where the list of all labeled silhouette contours for the specific viewcell transition is accessed as an array LAB_CON_LIST.

Process flow proceeds to step 3610, where each of the labeled contours in the LAB_CON_LIST is subjected to further processing.

In a first step in the processing of a labeled silhouette contour in the LAB_CON_LIST, process flow proceeds to step 3615, where the edges of the labeled silhouette contour are identified using the process shown in the flowchart of FIG. 34, and the edges are stored in the LAB_SIL_EDGE_LIST.

Process flow proceeds to step 3620, where the edges of the LAB_SIL_EDGE_LIST are subjected to further processing.

In a first step, in the processing of edges in the LAB_SIL_EDGE_LIST, process flow proceeds to step 3625, where the VM OB_SEG corresponding to an edge of the LAB_SIL_EDGE_LIST is constructed using the process shown in the flowchart of FIG. 35.

Process flow proceeds to decision step 3630 to determine if the LAB_SIL_EDGE_LIST is empty. If there are more edges in the LAB_SIL_EDGE_LIST to process, then next unprocessed edge is selected and processing returns to step 3620.

If, in decision step 3630, there are no more edges in the LAB_SIL_EDGE_LIST to process, then process flow proceeds to step 3635.

In decision step 3635, it is determined if there are any more labeled contours to process in the LAB_CON_LIST. If, in decision step 3635, it is determined that there are more labeled contours to process in the LAB_CON_LIST then the next unprocessed contour in selected and process flow returns to step 3610.

If, on the other hand, in decision step 3635, it is determined that there are no more labeled contours to process in the LAB_CON_LIST, then process flow proceeds to step 3640.

In step 3640, the triangle seed list, which is a precomputed list of references to one triangle for each of the delta regions corresponding to a specific viewcell transition (precomputed and stored in step 3383 of FIG. 33B) is set to an array called TRI_SEED_LIST. In this case the triangle seed list contains one triangle from each VM region that is unoccluded from viewcell A (the containing viewcell) and unoccluded from viewcell B. One seed triangle is chosen from each VM region of VM A that is visible from viewcell A and viewcell B such that initiating the traversal on the set of seed triangles insures that the relevant (labeled) silhouette contours for the AB transition is encountered during the runtime simplified 3D mesh traversal of FIG. 37. This selection of seed triangles insures that the VM of viewcell B is constructed from the VM of viewcell A by the traversal process that "shunts" around geometry that becomes in the AB transition using the labeled silhouette contour information.

Process flow proceeds to step 3645, where the triangles of the TRI_SEED_LIST are subjected to processing.

Process flow proceeds to step 3650, where a triangle of the TRI_SEED_LIST is used to initiate a simplified manifold mesh traversal as shown in the flowchart of FIG. 37 and discussed in detail in conjunction with that figure. This traversal identifies all of the triangles visible from viewcell B by initiating traversal on a small subset of triangles (those in the TRI_SEED_LIST) visible from viewcell A.

Process flow proceeds to decision step 3660 to determine if there are any more unprocessed triangles in the TRI_SEED_LIST.

If, in decision step 3660, there are unprocessed triangles in the TRI_SEED_LIST then the next unprocessed triangle in the TRI_SEED_LIST is selected and process flow returns to step 3645.

If, on the other hand, in decision step 3660, it is determined that there no more unprocessed triangles in the TRI_SEED_LIST, then process flow proceeds to step 3665.

Step 3665 indicates that the specific ROI corresponding to the delta visibility information required has been constructed by the simplified runtime traversal. As previously discussed this delta visibility information may actually be the set of triangles/fragments visible from a child viewcell when the corresponding viewcell transition corresponds is a parent-to-child transition. Alternatively this ROI information may correspond to deltaG+ and deltaG− data for a viewcell transition between contiguous viewcells, thereby allowing the option of generating deltaG packets when needed instead of storing all deltaG packets for every viewcell transition. Process flow terminates at step 3655.

FIG. 37 Is the Main Process of Using Simplified, hinted, runtime 3D mesh traversal process to construct ROI from pre-stored labeled silhouette contour information and a list of seed triangles for the connected components of the ROI.

FIG. 37 is a flowchart showing an embodiment of the directed runtime 3D traversal process that is called in step 3650 of the controlling process shown in FIG. 36.

The process shown in the flowchart of FIG. 37 is very similar to the general 3D mesh traversal process of FIG. 20A. The process of FIG. 20A is generally conducted as an offline preprocess in order to construct visibility maps for the purpose of precomputing and storing PVS and labeled silhouette contour data.

In contrast, the 3D mesh traversal process of FIG. 37 is conducted at runtime and is employed generate ROI of unified visibility maps for specific viewcell transitions. These ROI describe changes in visibility that occur as a result of these specific viewcell transitions.

In one type of viewcell transition, from a parent viewcell to a contained child viewcell, the ROI contain only those triangle/fragments visible from the child viewcell. This type of ROI can be generated from the simplified, hinted, 3D mesh traversal process of FIG. 37 when the seed triangles supplied are a set of triangles comprising one triangle from each connected component of those ROI containing triangles visible from the child viewcell.

Using these seed triangles and the related ROI boundaries generated at from the labeled silhouette contours, causes the simplified, hinted 3D mesh traversal process to bypass or "shunt" polygons or polygon fragments that become newly occluded during a specific viewcell transition (e.g. viewcell A to viewcell B wherein viewcell B is contained within viewcell A). This allows the removal of newly occluded polygons and/or polygon fragments without explicitly storing the list of polygons to be removed. This can be more efficient than using explicit lists of polygons to be removed, if the list of polygons to be removed is large relative to the total number of visible polygons.

The hinted traversal method can also be used to directly generate both deltaG− and deltaG+ packets for a viewcell transition between two contiguous viewcells wherein one viewcell is not contained within the other but the two viewcells have a common face. In this case the starting VM must contain all the polygon or polygon fragments visible from the combined viewcell A+B. In addition the starting VM must contain the relevant occlusion boundaries for viewcell A and for viewcell B. (These can be generated from labeled silhouette edges.) Such a visibility map is called a unified visibility map. The unified visibility map for two connected viewcells contains all of the polygon fragments visible from viewcell A and visible from viewcell B (or visible from the Boolean sum viewcell A+B). In addition the unified visibility map contains the from-viewcell occlusion boundaries corresponding to both viewcell A and viewcell B.

To generate a deltaG+ packet for A-to-B transition (also called an AB transition) the corresponding unified VM is traversed using a seed triangle for each connected component of a VM region that is occluded from A but visible from B. This type of region is called a $DR_E AB$. Traversal is initiated using these seed triangles and proceeds to the occlusion boundary corresponding to viewcell A or viewcell B. The viewcell A boundary is encountered on the occluded side while the viewcell A boundary is encountered on the exposed side. This corresponds the DReAB regions shown in light gray in FIG. 40.

Table XIV summarizes the set of seed triangles needed to initiate the hinted runtime traversal for generating deltaG+ and deltaG− packets for contiguous viewcells and shows the side of the occlusion boundary encountered.

This method allows both deltaG+ and deltaG− packets to be generated from a unified VM and the corresponding VM occlusion boundary contours for the viewcell transition (which can be generated from labeled silhouette contours). Using this method the deltaG+ and deltaG− packets for each viewcell transition do not need to be stored explicitly for every viewcell transition. Rather they can be generated by the hinted traversal method at any time before the packets are needed.

Also the runtime 3D traversal method of generating delta-visibility information can be more efficient in a distributed client-server implementation. In regions of high spatio-temporal visibility coherence the same labeled contour information can frequently be used for several specific viewcell transitions in the same region. The use of runtime 3D mesh traversal based on the labeled silhouette information can thereby allow incremental visibility map/PVS computation with less transmitted data than would be required using direct deltaG− lists of polygons to remove for each viewcell transition.

Turning now to FIG. 37, in a first step of the simplified, runtime traversal, process flow starts at step 3705, where the traversal is initiated at a specific triangle in the TRI_SEED_LIST for the specific viewcell transition.

Process flow proceeds to decision step 3715 to determine if the traversed triangle contains a from-viewcell occlusion boundary. These boundaries would have been constructed in step 3620 of FIG. 36.

If, in decision step 3715 it is determined that the traversed triangle contains a from-viewcell occlusion boundary, then process flow proceeds to step 3735.

Process flow proceeds to step 3735, where traversal is interrupted at the occlusion boundary. In further embodiments, process flow proceeds from 3735 to process 37-1, which returns the process flow to step 3725.

If, on the other hand, it is determined in decision step 3715 that the current traversed triangle does not contain an occlusion boundary, then process flow proceeds to step 3720.

In decision step 3720 it is determined if the currently traversed triangle has a silhouette edge corresponding to a labeled silhouette edge for the specific viewcell transition being considered. These labeled silhouette edges correspond to inner boundaries of the corresponding ROI of the unified VM.

If, in decision step 3720, it is determined that the currently traversed triangle does not have a silhouette edge, then process flow proceeds to step 3725.

In step 3725, the next (connected) un-traversed triangle in the mesh is selected and submitted to step 3715 and subsequent steps for processing.

If, on the other hand, it is determined in decision step 3720 that the current triangle dos contain a labeled silhouette edge for the current viewcell transition, then process flow proceeds to step 3780.

In decision step 3780 it is determined if any un-processed (un-traversed) triangles exist in the current "traversal", where a traversal is defined here as the set of mesh polygons connected by non-labeled-silhouette edges and on the unoccluded side of occlusion boundaries for the specific viewcell transition as constructed in step 3625 of FIG. 36.

If, in decision step 3780, it is determined that there are un-traversed triangles in the current traversal, then process flow proceeds to step 3725, where the next triangle in the traversal is selected for processing as previously described.

If, on the other hand it is determined in decision step 3780 that no un-traversed triangles exist in the current traversal, then process flow proceeds to step 3788.

In step 3788 the traversal is continued on the unoccluded sides of the occlusion boundary segment(s) constructed in step 3625 of FIG. 36; wherein said occlusion boundary corresponds to the labeled silhouette edge encountered in step 3720. This continuation may involve continuing the traversal on triangles that were retriangulated (i.e. trimmed exactly at the occlusion boundary) or it may involve continuing the traversal on the unoccluded side of triangles that were not retriangulated at the boundary. Process flow terminates at step 3788.

Figure 38:
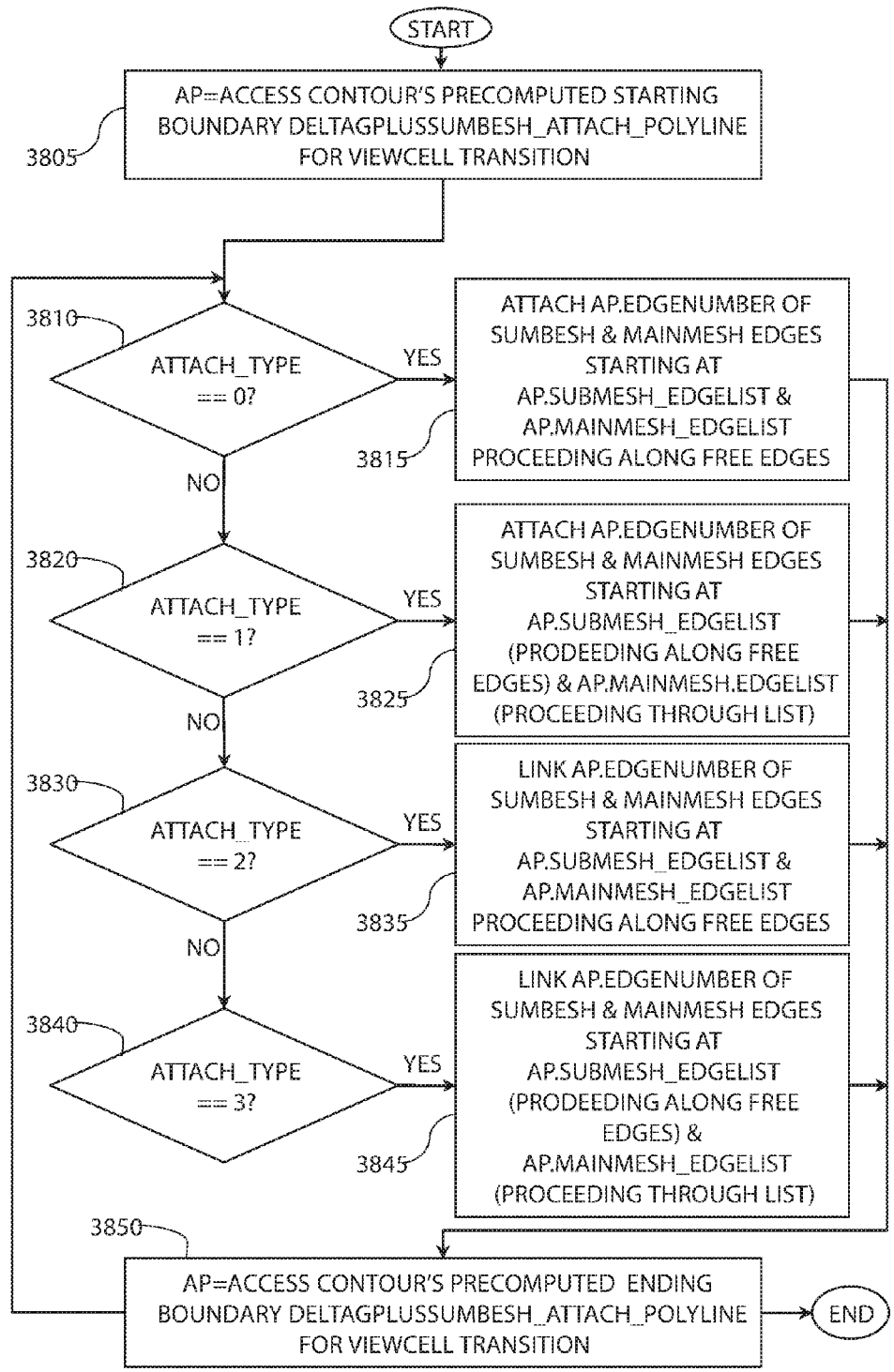
FIG. 38 is an exemplary flowchart showing a method of attaching a deltaG+ submesh corresponding to newly exposed mesh elements for a specific viewcell transition to the corresponding labeled silhouette contour's starting boundary.

FIG. 38 Method of Attaching a DeltaG+ submesh Corresponding to Newly Exposed Mesh Elements for a Specific Viewcell Transition to the Corresponding Labeled Silhouette Contour's Starting Boundary.

For any viewcell transition the polyline corresponding to the attachment curve of a newly exposed submesh can be determined and stored during the offline process of constructing the from-viewcell visibility maps and the corresponding delta-regions of visibility (FIG. 33). These polylines can be stored using the DeltaGplussumbesh_attach_polyline data structure of FIG. 31B. This data can be stored and used later during the runtime process of incremental visibility map/PVS construction described in FIG. 36 and FIG. 37. Specifically, in order to use the runtime method of determining newly occluded mesh elements by "shunting" during runtime 3D mesh traversal, any newly exposed mesh elements are connected to previously exposed elements at the attachment polyline in order to insure that a connected manifold is present for the runtime traversal.

Note that in some embodiments, the method of FIG. 38 is used when the method of FIG. 36 and FIG. 37 are used to compute newly occluded geometry at runtime by shunting.

In some embodiments, process flow proceeds to step, 3805, where the DeltaGplussumbesh_attach_polyline data structure associated with the labeled silhouette edge (starting) for the specific viewcell transition is accessed and referenced by the variable AP.

Process flow proceeds to decision step 3810, where it is determined if the attachment type corresponds to 0. It in decision step 3810, it is determined that the attachment type corresponds to 0, then process flow proceeds to step 3815.

In step 3815, the edges of the deltaG+ submesh (here simply called submesh) are directly connected to the corresponding edges of the main mesh. This connection is made between AP.edgenumber of edges starting at the single edges listed in AP.submesh_edgelist and AP.mainmesh_edgelist and proceeding along the free edges (edges having only one component polygon) of the corresponding meshes. In this mode only a single edge for each edgelist needs to be prestored.

Process flow proceeds to decision step 3820, to determine if the attachment type corresponds to 1. If, in decision step 3820, it is determined that the attachment type corresponds to 1, then process flow proceeds to step 3825.

In step 3825, the edges of the deltaG+ submesh (here simply called submesh) are directly connected to the corresponding edges of the main mesh. This connection is made between AP.edgenumber of edges starting at the first edges listed in AP.submesh_edgelist and AP.mainmesh_edgelist and proceeding through the entire list of edges in sequence.

Process flow proceeds to decision step 3830 to determine if the attachment type corresponds to 2. If, in decision step 3830, it is determined that the attachment type corresponds to 2, then process flow proceeds to step 3835.

In step 3835, the edges of the deltaG+ submesh (here simply called submesh) are "linked" to the corresponding edges of the main mesh wherein a linkage may be a one-to-many mapping from one polyline segment to another polyline. These links are identified during preprocessing such that they present a conservative representation of the corresponding mesh during runtime 3D traversal. This linkage is made between AP.edgenumber of edges starting at the single edges listed in AP.submesh_edgelist and AP.mainmesh_edgelist and proceeding along the free edges (edges having only one component polygon) of the corresponding meshes. In this mode only a single edge for each edgelist needs to be prestored.

Process flow proceeds to decision step 3840 to determine if the attachment type corresponds to 3. If, in decision step 3830, it is determined that the attachment type corresponds to 3, then process flow proceeds to step 3845.

In step 3845, the edges of the deltaG+ submesh (here simply called submesh) are "linked" to the corresponding edges of the main mesh, wherein a linkage may be a one-to-many mapping from one polyline segment to another polyline. These links are identified during preprocessing such that they present a conservative representation of the corresponding mesh during runtime 3D traversal. This linkage is made between AP.edgenumber of edges starting at the first edges listed in AP.submesh_edgelist and AP.mainmesh_edgelist and proceeding through the entire list of edges in sequence.

In any case, process flow proceeds to step 3850 for the next viewcell transition. In step 3850, the starting boundary for the next viewcell transition may be derived from the ending boundary of the current viewcell transition, and processing proceeds to decision step 3810 for the next viewcell transition. Process flow terminates at step 3850.

In addition to using deltaG+ geometry packets for newly exposed polygons, some newly exposed surfaces are reconstructed, in some embodiments, procedurally at runtime without the need for explicit deltaG+ polygons. This method, in some embodiments, is employed to generate newly visible portions of a single large polygon (or tessellated surface), a floor or ceiling for example in newly exposed delta regions. In this case, the silhouette contour is specially labeled with a label that instructs the runtime process to procedurally generate the newly exposed portion of the surface in the entire delta region.

FIG. 42A and FIG. 42B Flowcharts Showing the Method Using Hierarchical Viewcells.

The method of incrementally constructing a from-viewcell visibility map from a previous from-viewcell visibility map (FIGS. 34-38) allows the determination of newly occluded triangles by effectively bypassing or shunting the newly occluded regions of the visibility map during the simplified. This method allows the removal of newly occluded geometry without specifically storing or transmitting information for the newly occluded triangles. Instead, the labeled silhouette contour information for dynamically occluding silhouette contours (DOSCs) is used to construct a new visibility map occlusion boundary that bypasses the occluded geometry.

The labeled silhouette contours encoded using the data structures of FIG. 31A and FIG. 31B tend to have very low storage requirements for delta regions of high dynamic visibility coherence, primarily because the same contour can be reused over many viewcell transitions. Consequently, the incremental visibility map maintenance method can have substantially lower storage/transmission costs than conventional deltaPVS schemes in which information for each newly occluded triangle must be stored/transmitted for each viewcell transition.

This is particularly true when the method is employed using a hierarchical organization of viewcells in which some viewcells are adjacent to other viewcells and other viewcells are completely contained in other viewcells (that is they are child viewcells of a parent viewcell).

Using this arrangement of viewcells, the visibility map for a large viewcell is constructed from the visibility map from an adjacent large viewcell; and the visibility map of a child viewcell is constructed from the visibility map of the parent viewcell. In the latter case, the visibility map of a child viewcell can be constructed with no deltaGplus information, because upon moving from a parent viewcell to a contained child viewcell no geometry will become newly visible. The incremental construction of a visibility map corresponding to a child viewcell from the parent viewcell's visibility map requires only the determination of newly occluded geometry which can be accomplished using the runtime incremental visibility map construction (FIGS. 34-38) using only the labeled DOSC data which causes the newly occluded triangles to be "shunted".

The use of larger adjacent viewcells can also improve the efficiency of data access and transmission from the server supplying the deltaGplus and deltaGminus information to the rendering client. This is because disk access/seek times can tend to dominate the overall read time for small datapackets, making the transmission of larger data packets more efficient. Thus, storing and transmitting deltaGplus information only for large, adjacent viewcells; and computing the visibility maps of child viewcells at runtime can substantially reduce transmission bandwidth required between the rendering client and the visibility database server.

In some embodiments, process flow starts at step 4210 to determine if the viewcell transition for which the deltaVM/deltaPVS information is to be encoded (using the method of FIG. 33) is between a parent viewcell and a (contained) child viewcell.

If, in decision step 4210, it is determined that the viewcell transition corresponds to a transition from a parent viewcell to a child viewcell, then process flow proceeds to step 4230.

In step 4230 the deltaVM/deltaPVS information corresponding to the viewcell transition (determined using the method of FIG. 33 and related figures) corresponds to DOSC labeled silhouette contour information.

If, in decision step 4210, it is determined that the viewcell transition corresponds to a transition that is not from a parent viewcell to a child viewcell, then process flow proceeds to step 4220.

In step 4220 the deltaVM/deltaPVS information corresponding to the viewcell transition (determined using the method of FIG. 33 and related figures) corresponds to DOSC, DESC, and deltaG+ submesh information. Process flow terminates at step 4220 and 4230.

Embodiments employ larger, parent viewcells to compute the visibility of more distant geometry and smaller, child viewcells to compute the visibility of closer geometry. This method is efficient because changes in visibility (e.g. the rate at which newly exposed and newly occluded surfaces develop) with viewpoint motion are, in general smaller, with increasing distance from the viewpoint.

Turning now to FIG. 42B, process flow starts at step 4240 to determine if the size of the viewcell is small relative to the distance of the specific geometry for which the dynamic visibility (deltaVM/deltaPVS data for a viewcell transition) is being determined.

If, in decision step 4240, it is determined that the viewcell is small relative to the distance of the geometry, then process flow proceeds to step 4260.

In step 4260, the specific geometry at the predetermined greater distance from the viewcell is not included in the deltaVM/deltaPVS computation for a viewcell transition involving the current viewcell. This geometry may be included in the deltaVM/deltaPVS calculation for a viewcell transition involving a parent viewcell of the current viewcell.

If, in decision step 4240, it is determined that the viewcell is not small relative to the distance of the geometry, then process flow proceeds to step 4250.

In step 4250, the specific geometry at the predetermined greater distance from the viewcell is included in the deltaVM/deltaPVS computation for a viewcell transition involving the current viewcell. Process flow terminates at steps 4250 and 4260.

FIG. 43A and FIG. 43B Data Structures for Incremental VM/PVS Maintenance Using Delta VM/PVS Data.

FIG. 43A and FIG. 43B show data structures for the method of incremental visibility map/PVS maintenance conducted by a client and server process. The data structures here can be applied whether the client and server processes reside on distinct physical devices connected by a network. Alternatively these data structures can be employed in implementations in which two processes are conducted on the same compute device.

The DDL is a destination display list (and may also be called a dynamic display list). The list may be comprised of one or more lists or arrays of data structures representing polygon mesh objects. These include triangles (DDL_Tri), edges (DDL_Edge), vertices (DDL_Vertex) and potentially other associated data such as material and texture specifications. Other data structures for implementing the DDL method may be found in table XIII of U.S. Pat. No. 6,111,582. by this inventor.

In the method of U.S. Pat. No. 6,111,582, the DDL data structures are used to implement a from-viewpoint, per-image DDL scheme in which the dynamic display list for a single image is maintained. In contrast, for the present invention the DDL method is employed to maintain a set of DDLs that correspond to conservative PVSs for viewcells substantially in the vicinity of the user's current viewpoint (or in an expanding region connected to this vicinity). Nevertheless some of the data structures including those for materials, textures, procedural textures and others can be employed in both methods.

The set of DDLs are made available to a client process. The DDLs corresponds to a set of PVSs for viewcells in the vicinity of the viewpoint, as determined by a navigation prediction algorithm. The DDLs are referenced in the struct PVS data structure of FIG. 43B.

Figure 44A:
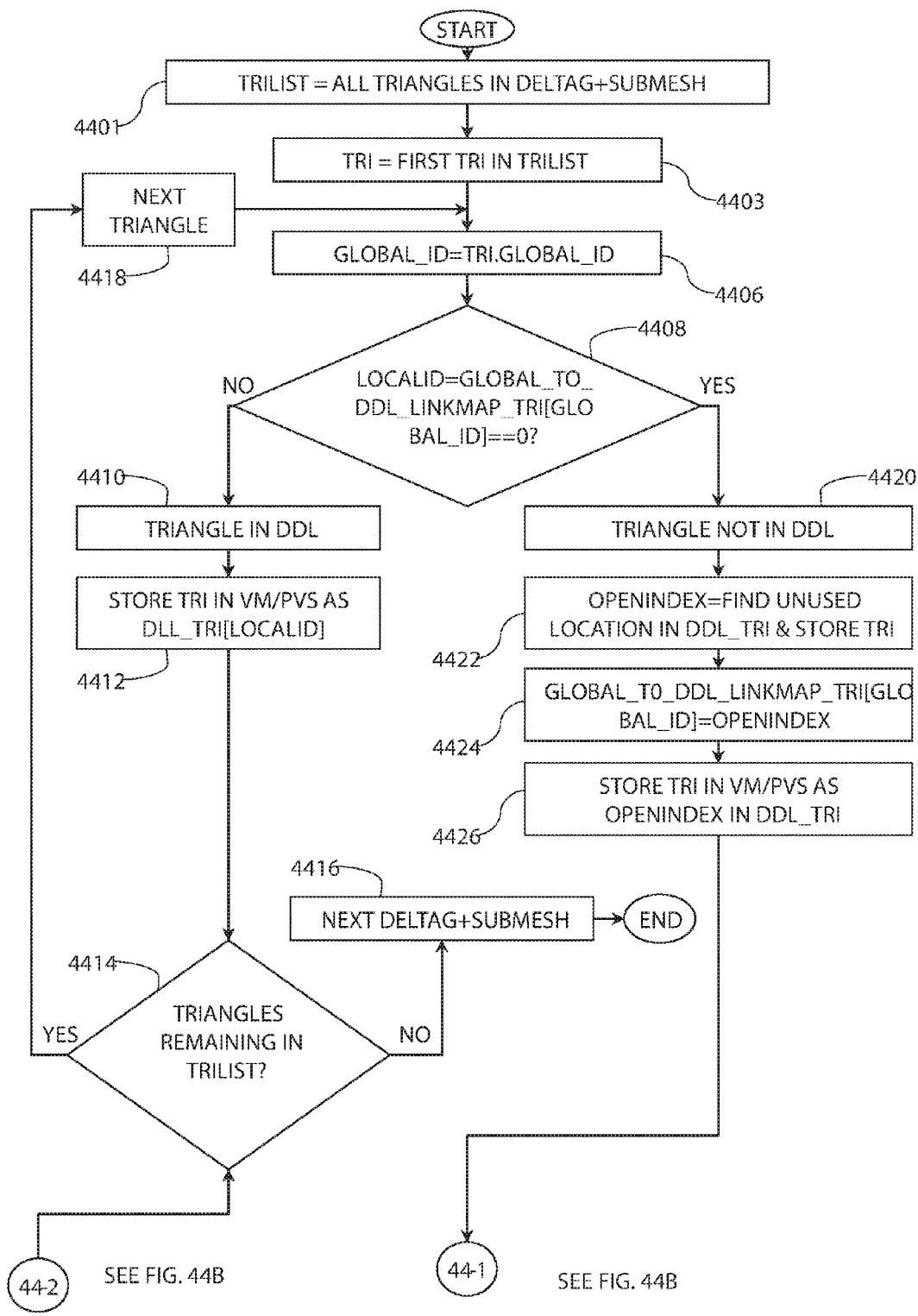
FIG. 44A is an exemplary flowchart showing a method of data storage and transmission supporting incremental VM/PVS maintenance using delta VM/PVS (DeltaG+ submesh) data sent from a remote server.
Figure 44B:
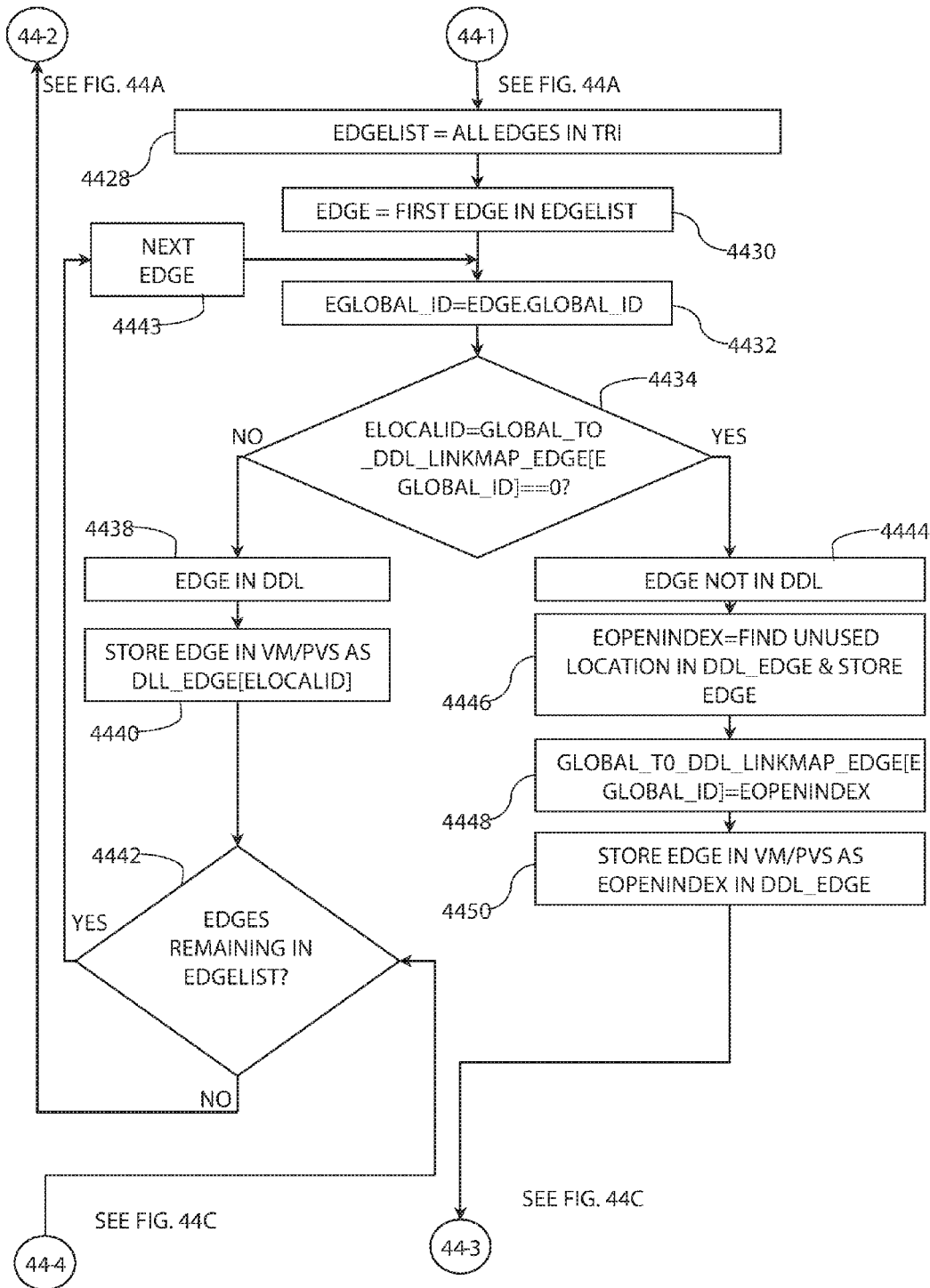
FIG. 44B is a continuation of FIG. 44A
Figure 44C:
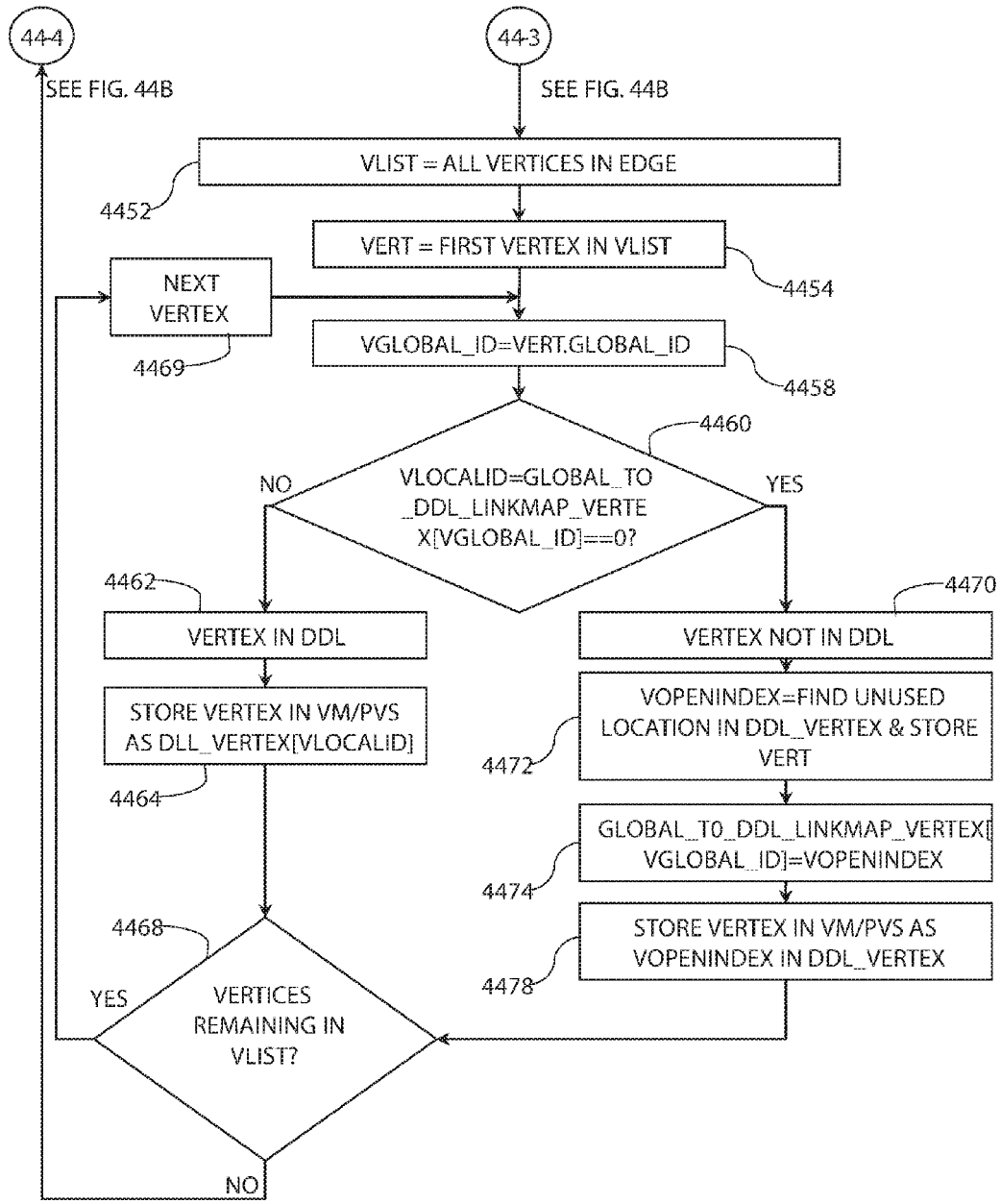

The Global_to_DDL_Linkmap_Edge, Global_to_DDL_Linkmap_Tri, Global_to_DDL_Linkmap_Vertex data structures shown in FIG. 43A are used by the method of FIG. 44A, FIG. 44B, FIG. 44C and related figures, and discussed in detail in conjunction with those figures.

FIG. 44A, FIG. 44B, and FIG. 44C Data Storage and Transmission Method Supporting Incremental VM/PVS Maintenance Using Delta VM/PVS (DeltaG+ submesh) Data Sent From a Remote Server.

In one embodiment of the present invention all data stored in permanent, non-core memory (e.g. disk storage) including deltaG+ submesh, VM_Info, deltaGplussubmesh_attach_polyline, contour and other data structures of FIG. 31A and FIG. 31B, is stored such that the stored elements reference mesh triangles, edges, and vertices using global id references. A global id is a unique integer for each element (e.g. triangle, edge, vertex) in the entire stored database representing the complete 3D model. A global id is an index into an array of elements (meshes, triangles, edges, and vertices) for the entire model. The global id of a triangle is the index of the triangle in a global array of triangles for the entire model. The global id of an edge is the index of the edge in the global array of edges for the entire model. Likewise global id of an vertex is the index of the vertex in the global array of vertices for the entire model.

The method given by the flowchart of FIG. 44A-C allows runtime rendering by a client process/machine which at any one time stores only a small subset of the entire graphic database in data structures called destination display lists (DDLs). The DDLs contain the graphical elements (geometry and texture information) referenced by all of the VM/PVS for the viewcells that are currently stored on the client. The method of FIG. 44A-C is conducted by a server process for all deltaG+ submesh data read by the server process. The method of FIG. 44A-C has two primary functions: 1) convert global id references to direct DDL references, 2) prevent redundant transmission of data to client DDLs.

A general description of the method is now given, followed by a detailed description of the method based on the flowchart of FIG. 44A, FIG. 44B, and FIG. 44C.

The server process receives viewpoint location data from the client and based on speculative navigational prefetch, reads the prestored delta-VM/PVS data corresponding to specific viewcell transitions. The server maintains a set of DDLs that are referenced by the current set of VM/PVS data that are maintained on the client process using delta VM/PVS packets sent to the client process by the server process. Prior to sending delta VM/PVS data to the client process, the server process converts all global ids to local ids that are direct indices or other references to the DDLs. In addition, the server process also checks each accessed deltaG+ submesh packet against the DDL to determine if a triangle or other graphic element in a deltaG+ submesh packet is already present in the corresponding DDL. If the element is already present in the corresponding DDL then it need not be added to the DDL.

If the server process and the client process are located on physically distinct compute devices (e.g. connected by a network protocol) then the client DDL is a mirror of the DDL maintained by the server. In this case the aforementioned method in which the server checks elements in deltaG+ submesh packets to determine if they are already present in the DDL can eliminate redundant transmission from the server to the client and thereby substantially reduce the connection bandwidth required for the server to maintain an up-to-date copy of the DDL.

For embodiments in which the client and server process are performed on the same physical computing device (sharing processing means, core, and out-of-core memory) a single copy of the DDL may be maintained. In this case the DDL reduces the in-core memory storage costs, because a single element (e.g. triangle) is likely to be present in several of the VM/PVS for the viewcells currently stored in core memory since the in-core stored viewcells tend to be in the same vicinity of the model. Thus the use of DDLs to store the graphical elements shared by several VM/PMS data structures generally has a lower storage cost than if each element was stored independently for each VM/PVS.

The process of FIG. 44A through FIG. 44C is conducted by the server process for all deltaG+ submesh data that is accessed from out-of-core memory during a viewcell transition. In general the client process controls the viewpoint navigation through real-time input from a user via mouse, gamepad controller etc. The server process receives data about the current location of the viewpoint and uses this to conduct a speculative navigation of the surrounding viewcells using navigational prediction methods including dead-reckoning and collision constraints. This predicted navigation drives a speculative access of deltaG+ submesh data based on the corresponding viewcell boundaries (i.e. viewcell transitions) that are encountered during the predicted navigation.

Turning now to FIG. 44, in some embodiments, process flow starts at 4401, where all of the triangles of a deltaG+ submesh are placed in a list called the TRILIST. The triangles of a deltaG+ submesh are typically read from non-core (disk) storage [for example in a distributed client-server implementation (FIG. 46 labeled storage 4605), or in an implementation in which the client and server runs on the same physical machine (FIG. 47 labeled storage 4705)].

Process flow proceeds to step 4403 to set the first triangle in the TRILIST to the variable reference TRI.

Process flow proceeds to step 4406, where the global id of the triangle (as stored in the Triangle data structure of FIG. 31C) is read into the variable GLOBAL_ID.

Process flow proceeds to decision step 4408 to determine if the DDL id of the TRI (determined from the Global_to_DDL_Linkmap_Tri data structure of FIG. 43A) is equal to a value of zero. A value of zero indicates that TRI is not currently stored in the triangle DDL, comprising an array of data structures of the type DDL_Tri (FIG. 43A). This is true because all of the values on the Global_to_DDL_Linkmap_Tri array are initialized to a value of zero.

If, in decision step 4408, it is determined that the value of GLOBAL_to_DDL_Linkmap_Tri array for the current TRI is not zero, this corresponds to a situation in which the current TRI is already stored in the DDL_Tri array (at index LOCALID) and process flow proceeds to step 4410 and 4412.

In step 4412, the current TRI of the deltaG+ submesh is stored in the VM/PVS for the corresponding viewcell storing the LOCALID, which is an index to the array of DDL_Tri data structures that comprises the triangle DDL.

Process flow proceeds to decision step 4414 to determine if any unprocessed triangles remain in the TRILIST.

If, in decision step 4414, it is determined that no unprocessed triangles remain in the TRILIST then process flow proceeds to step 4416 in which the next deltaG+ submesh is processed.

If, on the other hand, it is determined in decision step 4414 that unprocessed triangles remain in the TRILIST, then process flow proceeds to step 4418 in which the next triangle in the TRILIST is selected for processing.

If, in decision step 4408 it is determined that the value of the Global_to_DDL_Linkmap_Tri array for the current TRI is zero, then this corresponds to a situation in which the current TRI is not already stored in the DDL_Tri array and process flow proceeds to step 4420 and 4422.

In step 4422 an unused location in the array of DDL_Tri structures (comprising the triangle DDL) is identified and the variable OPENINDEX is set to the index of this unused array element.

In a subsequent step 4424 the value of Global_to_DDL_Linkmap_Tri[GLOBAL_ID] is set to OPENINDEX, thus indicating that the current TRI is to be stored in the OPENINDEX index of the triangle DDL.

In a subsequent step 4426 the TRI data is stored in the array of DDL_Tri data structures and index OPENINDEX and the triangle, added to the VM/PVS data for the corresponding viewcell using the deltaG+ submesh data is set to reference the DDL_Tri data and process flow continues to process 44-1, which starts at step 4428 of FIG. 44B.

In step 4428 the edges of the current TRI are stored in EDGELIST.

In subsequent step 4430 the variable EDGE is set to reference the first edge of EDGELIST.

In subsequent step 4432 the variable EGLOBAL_ID is set to the global id of the edge by referencing the Edge.global_id field of the edge data structure comprising the deltaG+ submesh data structure, both data structures being specified in FIG. 31C.

In subsequent decision step 4434 it is determined if the DDL id of the EDGE (determined from an array of the Global_to_DDL_Linkmap_Edge data structures of FIG. 43A) is equal to a value of zero. A value of zero indicates that EDGE is not currently stored in the edge DDL, comprising an array of data structures of the type DDL_Edge (FIG. 43A). This is true because all of the values on the Global_to_DDL_Linkmap_Edge array are initialized to a value of zero.

If, in decision step 4434, it is determined that the value of GLOBAL_to_DDL_Linkmap_Edge array for the current Edge is not zero, this corresponds to a situation in which the current Edge is already stored in the DDL_Edge array (at index ELOCALID) and process flow proceeds to step 4438 and 4440.

In step 4440 the current EDGE of the deltaG+ submesh is stored in the VM/PVS for the corresponding viewcell storing the ELOCALID, which is an index to the array of DDL_Edge data structures that comprises the edge DDL.

In a subsequent decision step 4442 it is determined if any unprocessed edges remain in the EDGELIST.

If, in decision step 4442, it is determined that no unprocessed edges remain in the EDGELIST then processing returns to step 4414 in which is determined if any unprocessed triangles remain in the TRILIST.

If, on the other hand, it is determined in decision step 4442 that unprocessed edges remain in the EDGELIST then process flow proceeds to step 4443 in which the next edge in the EDGELIST is selected for processing.

If, in decision step 4434 it is determined that the value of the Global_to_DDL_Linkmap_Edge array for the current Edge is zero then this corresponds to a situation in which the current EDGE is not already stored in the DDL_Edge array and process flow proceeds to step 4444 and 4446.

In step 4446 an unused location in the array of DDL_Edge structures (comprising the edge DDL) is identified and the variable EOPENINDEX is set to the index of this unused array element.

In a subsequent step 4448 the value of Global_to_DDL_Linkmap_Edge[EGLOBAL_ID] is set to EOPENINDEX, thus indicating that the current EDGE is to be stored in the EOPENINDEX index of the edge DDL.

In a subsequent step 4450 the EDGE data is stored in the array of DDL_Edge data structures and index EOPENINDEX, and the VM/PVS to which the delta VM/PVS data (in the form of deltaGplussubmesh_edge data) has been added is set to reference the corresponding DDL_Edge array.

Subsequently, process flow continues to process 44-3, which starts at step 4452 of FIG. 44C.

In step 4452 the vertices of the current EDGE are stored in VLIST.

In subsequent step 4454 the variable VERT is set to reference the first vertex of VLIST.

In subsequent step 4458 the variable VGLOBAL_ID is set to the global id of the VERT by referencing the Vertex.global_id field of the Vertex data structure comprising the deltaG+ submesh data structure, both data structures being specified in FIG. 31C.

In subsequent decision step 4460 it is determined if the DDL id of the VERT (determined from an array of the Global_to_DDL_Linkmap_Vertex data structures of FIG. 43A) is equal to a value of zero. A value of zero indicates that VERT is not currently stored in the vertex DDL, comprising an array of data structures of the type DDL_Vertex (FIG. 43A). This is true because all of the values on the Global_to_DDL_Linkmap_Vertex array are initialized to a value of zero.

If, in decision step 4460, it is determined that the value of GLOBAL_to_DDL_Linkmap_Vertex array for the current VERT is not zero, this corresponds to a situation in which the current VERT is already stored in the DDL_Vertex array (at index VLOCALID) and process flow proceeds to step 4462 and 4464.

In step 4464 the current VERTEX of the deltaG+ submesh is stored in the VM/PVS for the corresponding viewcell storing the VLOCALID, which is an index to the array of DDL_Vertex data structures that comprises the vertex DDL.

In a subsequent decision step 4468 it is determined if any unprocessed edges remain in the VLIST.

If, in decision step 4468, it is determined that no unprocessed vertices remain in the VLIST then process flow proceeds to process 44-2, which returns the process flow to step 4442 in which is determined if any unprocessed edges remain in the EDGELIST.

If, on the other hand, it is determined in decision step 4468 that unprocessed vertices remain in the VLIST then process flow proceeds to step 4469 in which the next vertex in the VLIST is selected for processing.

If, in decision step 4460 it is determined that the value of the Global_to_DDL_Linkmap_Edge array for the current Edge is zero then this corresponds to a situation in which the current VERT is not already stored in the DDL_Vertex array and process flow proceeds to step 4470 and 4472.

In step 4472 an unused location in the array of DDL_Vertex structures (comprising the vertex DDL) is identified and the variable VOPENINDEX is set to the index of this unused array element.

In a subsequent step 4474 the value of Global_to_DDL_Linkmap_Vertex[VGLOBAL_ID] is set to VOPENINDEX, thus indicating that the current VERT is to be stored in the VOPENINDEX index of the vertex DDL.

In a subsequent step 4478 the VERT data is stored in the array of DDL_Vert data structures and index VOPENINDEX, and the VERT data added to the VM/PVS is set to reference the corresponding DDL_Vert array at VOPENINDEX.

Subsequently process flow proceeds to step 4468, which was previously described.

The method of FIG. 44A-C shows deltaG+ submesh data corresponding to triangles, edges, and vertices of a triangle mesh. Other graphical elements such as textures are managed similarly using additional data structures incorporated in XIII of U.S. Pat. No. 6,111,582, incorporated herein by reference.

Figure 45A:
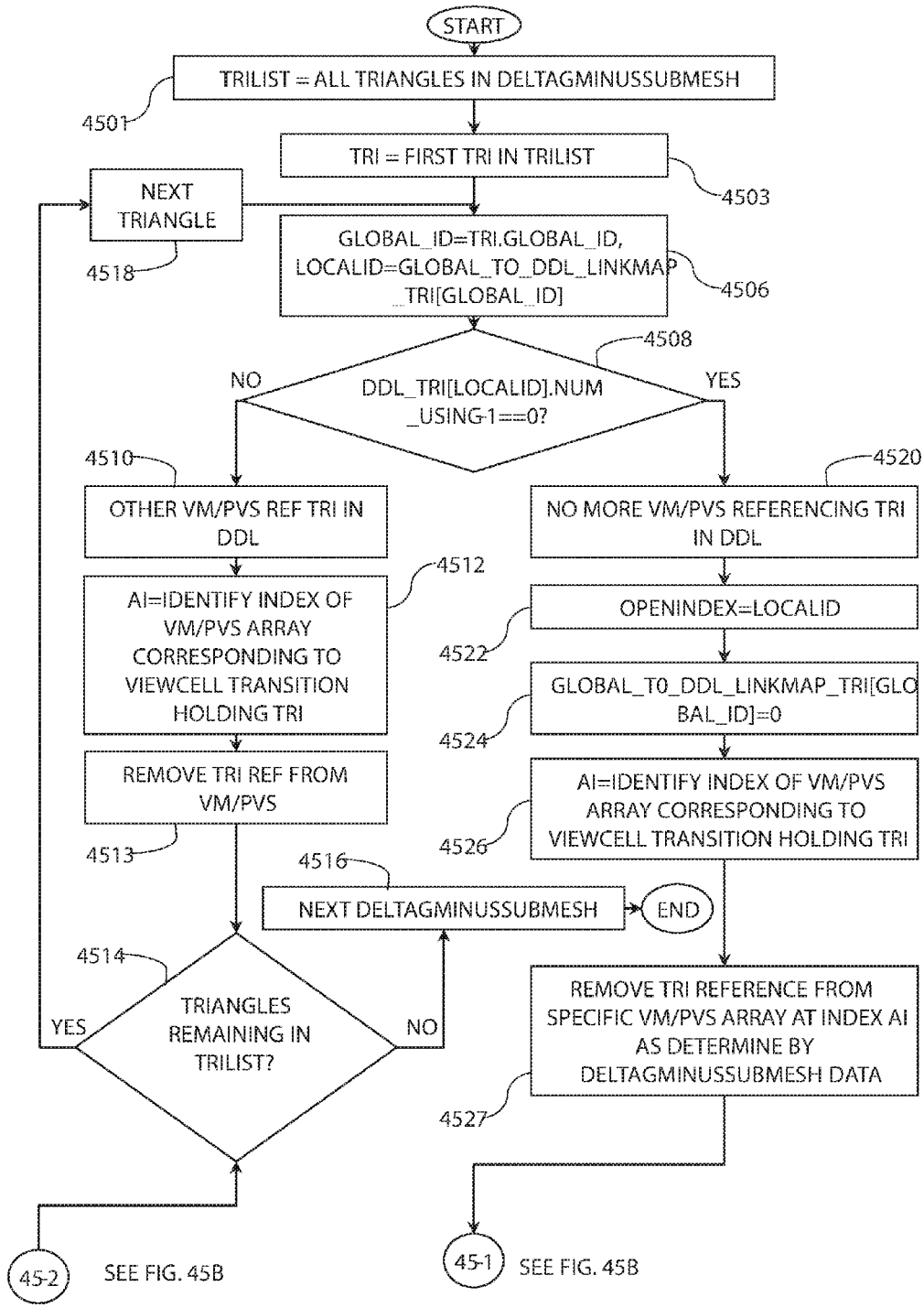
FIG. 45A is an exemplary flowchart showing a method data storage and transmission supporting incremental VM/PVS maintenance using delta VM/PVS (DeltaGminus-submesh) data sent from a remote server.
Figure 45B:
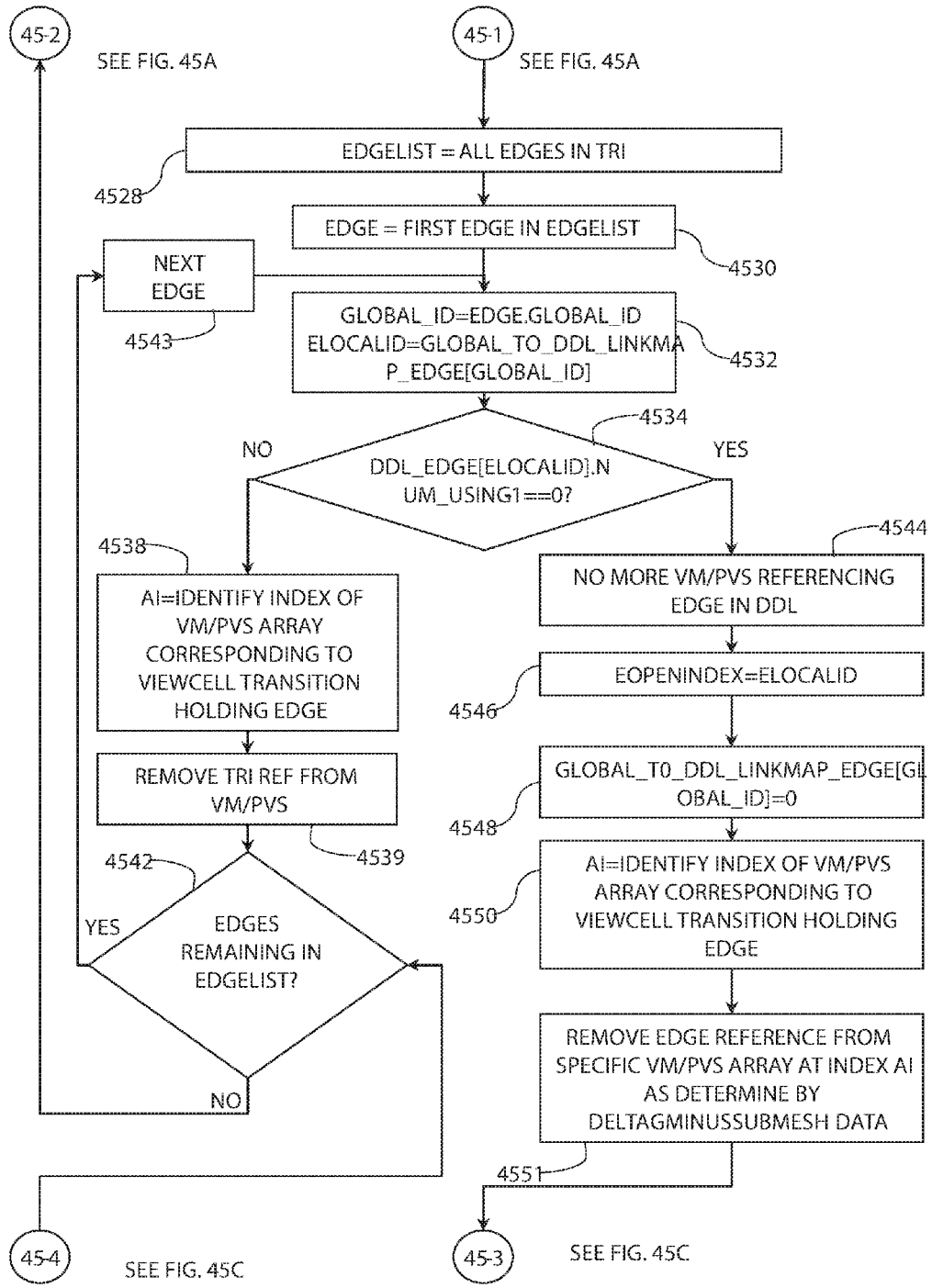
FIG. 45B is a continuation of FIG. 45A.
Figure 45C:
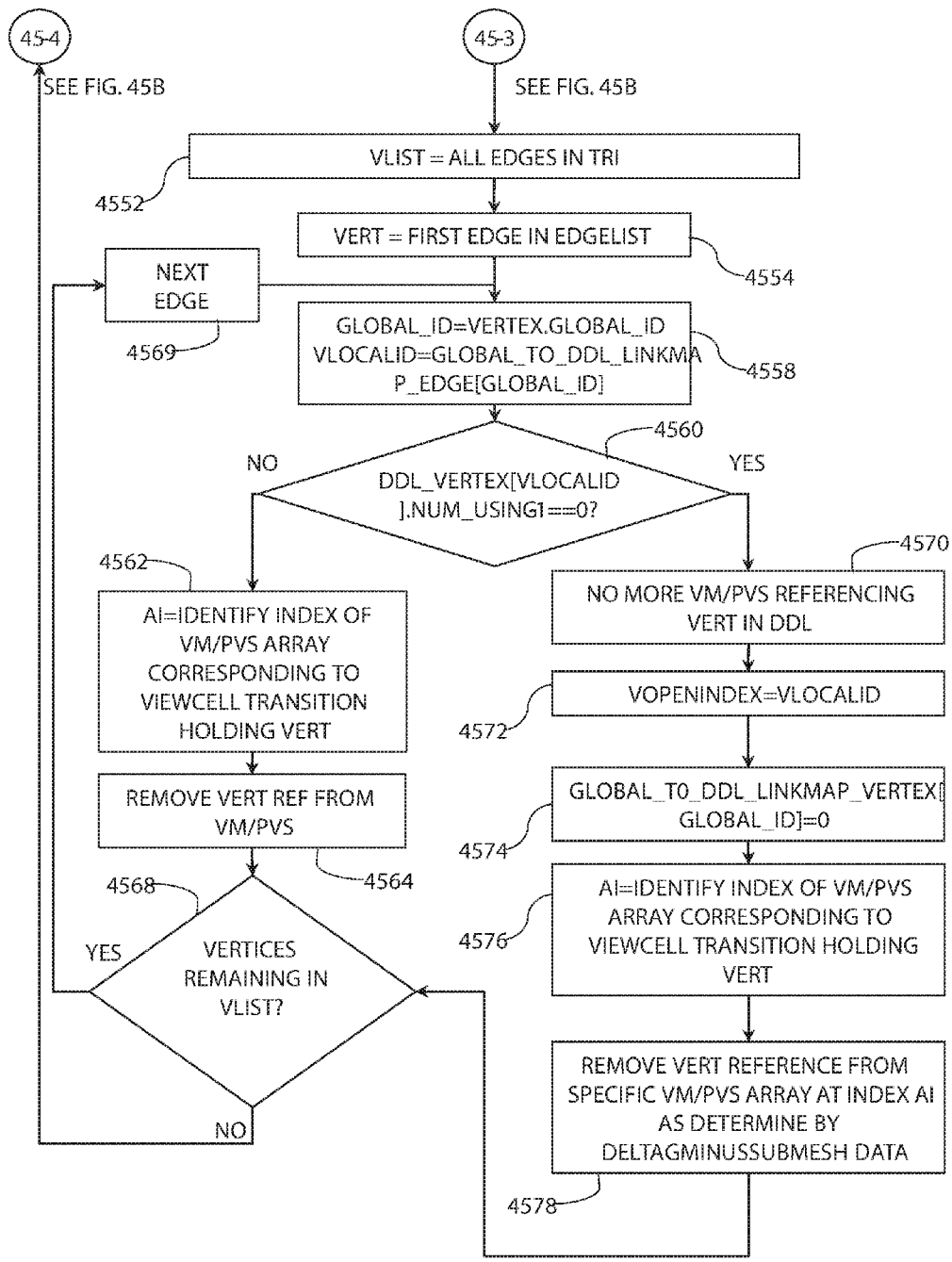
FIG. 45C is a continuation of FIG. 45B.

FIG. 45A, FIG. 45B, and FIG. 45C Data Storage and Transmission Method Supporting Incremental VM/PVS Maintenance Using Delta VM/PVS (DeltaGminussubmesh) Data Sent From a Remote Server.

DeltaG-submesh data correspond to the prestored Global ids of graphic elements that become newly occluded for a specific viewcell transition. These global ids are converted to DDL indices in step 4715 (or 4725) This prestored deltaG– submesh information can be used in addition to or instead of the determination of newly occluded graphic elements by the previously described method of using labeled silhouette contours to "shunt" occluded elements at runtime.

FIG. 45A-C illustrate a flowchart showing the use of prestored deltaGminussubmesh information associated with specific viewcell transitions to update VM/PVS data by removing specific graphic elements that become occluded during the corresponding viewcell transition.

Turning now to FIG. 45A, in some embodiments, process flow starts at 4501, where all of the triangles of a deltaGminussubmesh are placed in a list called the TRILIST. The triangles of a deltaGminussubmesh are typically read from non-core (disk) storage. For example, in a distributed client-server implementation (FIG. 46 labeled storage 4605), or in an implementation in which the client and server runs on the same physical machine (FIG. 47 labeled storage 4705).

In a subsequent step 4503 the first triangle in the TRILIST is set to the variable reference TRI.

In a subsequent step 4506 the global id of the triangle (as stored in the Triangle data structure of FIG. 31C) is read into the variable GLOBAL_ID.

In subsequent decision step 4508 it is determined if the specific TRI to be removed, as stored in the DDL_TRI array will still be referenced by other VM/PVS arrays (determined using the DDL_TRI[LOCALID].num_using field which is maintained to equal the number of VM/PVS data structures currently referencing the specific TRI in the DDL_TRI array. The value of this variable for the DDL_TRI is incremented when a triangle is newly referenced by a VM/PVS datum (newly exposed) and decremented when the corresponding triangle is newly unreferenced by a VM/PVS datum (newly occluded).

If, in decision step 4508, it is determined that the value of DDL_TRI[LOCALID].NUM_USING−1 (decremented value) is not equal to zero then process flow proceeds to step 4510. This corresponds to the condition that the even after the TRI is removed from a specific VM/PVS, it is still present in other VM/PVS.

In step 4512 the index of the TRI in the specific VM/PVS is identified and read to the variable AI.

In subsequent step 4513 the triangle TRI is removed from the specific VM/PVS array by indicating the element of the array at index AI as null or empty.

In a subsequent decision step 4514 it is determined if any unprocessed triangles remain in the TRILIST.

If, in decision step 4514, it is determined that no unprocessed triangles remain in the TRILIIST then process flow proceeds to step 4516 in which the next deltaGminussubmesh is processed.

If, on the other hand, it is determined in decision step 4514 that unprocessed triangles remain in the TRILIST then process flow proceeds to step 4518 in which the next triangle in the TRILIST is selected for processing.

If, in decision step 4508 it is determined that the value of DDL_TRI[LOCALID].NUM_USING−1 (decremented value) is equal to zero then process flow proceeds to step 4520.

Step 4520 corresponds to the condition that the after the TRI is removed from a specific VM/PVS, it is no longer referenced by any other VM/PVS.

In step 4522 the value of OPENINDEX is set to the index of the DDL_TRI for the TRI, indicating that this particular array element of the DDL_TRI is now unused.

In subsequent step 4524 the value of the array element: GLOBAL_TO_DDL_LINKMAP_TRI[GLOBALID] is set to zero indicating that the specific TRI is no longer represented in the array of DDL_TRI elements.

In subsequent step 4526 the index of the TRI in the specific VM/PVS is identified and read to the variable AI.

In subsequent step 4527 the triangle TRI is removed from the specific VM/PVS array by indicating the element of the array at index AI as null or empty.

Process flow proceeds from step 4527 to process 45-1, which starts at step 45-1 (FIG. 4B). In step, 4528, all of the edges of the triangle TRI are placed in a list called the EDGELIST.

In a subsequent step 4530 the first edge in the EDGELIST is set to the variable reference EDGE.

In a subsequent step 4532 the global id of the edge (as stored in the Edge data structure of FIG. 31C) is read into the variable GLOBAL_ID.

In subsequent decision step 4534 it is determined if the specific EDGE to be removed, as stored in the DDL_EDGE array will still be referenced by other VM/PVS arrays (determined using the DDL_EDGE[LOCALID].num_using field which is maintained to equal the number of VM/PVS data structures currently referencing the specific EDGE in the DDL_EDGE array. The value of this variable for the DDL_EDGE is incremented when an edge is newly referenced by a VM/PVS datum (newly exposed) and decremented when the corresponding edge is newly unreferenced by a VM/PVS datum (newly occluded).

If, in decision step 4534, it is determined that the value of DDL_EDGE[LOCALID].NUM_USING−1 (decremented value) is not equal to zero then process flow proceeds to step 4538. This corresponds to the condition that the even after the EDGE is removed from a specific VM/PVS, it is still present in other VM/PVS.

In step 4538 the index of the EDGE in the specific VM/PVS is identified and read to the variable AI.

In subsequent step 4539 the edge EDGE is removed from the specific VM/PVS array by indicating the element of the array at index AI as null or empty.

In a subsequent decision step 4542 it is determined if any unprocessed edges remain in the EDGELIST.

If, in decision step 4542, it is determined that no unprocessed edges remain in the EDGELIIST then processing returns to step 4514.

If, on the other hand, it is determined in decision step 4542 that unprocessed edges remain in the EDGELIST then process flow proceeds to step 4543 in which the next edge in the EDGELIST is selected for processing.

If, in decision step 4534 it is determined that the value of DDL_EDGE[LOCALID].NUM_USING−1 (decremented value) is equal to zero then process flow proceeds to step 4544.

Step 4544 corresponds to the condition that the after the EDGE is removed from a specific VM/PVS, it is no longer referenced by any other VM/PVS.

In step 4546 the value of OPENINDEX is set to the index of the DDL_EDGE for the EDGE, indicating that this particular array element of the DDL_EDGE is now unused.

In subsequent step 4548 the value of the array element: GLOBAL_TO_DDL_LINKMAP_EDGE[GLOBALID] is set to zero indicating that the specific EDGE is no longer represented in the array of DDL_EDGE elements.

In subsequent step 4550 the index of the EDGE in the specific VM/PVS is identified and read to the variable AI.

In subsequent step 4551 the edge EDGE is removed from the specific VM/PVS array by indicating the element of the array at index AI as null or empty.

Process flow proceeds from step 4551 to process 45-3, which starts at step 4552. In step, 4552, all of the vertices of the triangle TRI are placed in a list called the VLIST.

In a subsequent step 4554 the first edge in the VLIST is set to the variable reference VERT.

In a subsequent step 4558 the global id of the vertex (as stored in the Vertex data structure of FIG. 31C) is read into the variable GLOBAL_ID.

In subsequent decision step 4560 it is determined if the specific VERT to be removed, as stored in the DDL_VERTEX array will still be referenced by other VM/PVS arrays (determined using the DDL_VERTEX[LOCALID].num_using field which is maintained to equal the number of VM/PVS data structures currently referencing the specific VERTEX in the DDL_VERTEX array. The value of this variable for the DDL_VERTEX is incremented when a vertex is newly referenced by a VM/PVS datum (newly exposed) and decremented when the corresponding vertex is newly unreferenced by a VM/PVS datum (newly occluded).

If, in decision step 4560, it is determined that the value of DDL_VERTEX[LOCALID].NUM_USING−1 (decremented value) is not equal to zero then process flow proceeds to step 4562. This corresponds to the condition that the even after the VERT is removed from a specific VM/PVS, it is still present in other VM/PVS.

In step 4562 the index of the VERT in the specific VM/PVS is identified and read to the variable AI.

In subsequent step 4564 the vertex VERT is removed from the specific VM/PVS array by indicating the element of the array at index AI as null or empty.

In a subsequent decision step 4568 it is determined if any unprocessed vertices remain in the VLIST.

If, in decision step 4568, it is determined that no unprocessed vertices remain in the VLIST then processing returns to step 4542.

If, on the other hand, it is determined in decision step 4568 that unprocessed vertices remain in the VLIST then process flow proceeds to step 4569 in which the next vertex in the VLIST is selected for processing.

If, in decision step 4560 it is determined that the value of DDL_VERTEX[LOCALID].NUM_USING−1 (decremented value) is equal to zero then process flow proceeds to step 4570.

Step 4570 corresponds to the condition that the after the VERT is removed from a specific VM/PVS, it is no longer referenced by any other VM/PVS.

In step 4572 the value of OPENINDEX is set to the index of the DDL_VERTEX for the VERT, indicating that this particular array element of the DDL_VERTEX is now unused.

In subsequent step 4574 the value of the array element: GLOBAL_TO_DDL_LINKMAP_VERTEX[GLOBALID] is set to zero indicating that the specific VERT is no longer represented in the array of DDL_VERTEX elements.

In subsequent step 4576 the index of the VERT in the specific VM/PVS is identified and read to the variable AI.

In subsequent step 4578 the vertex VERT is removed from the specific VM/PVS array by indicating the element of the array at index AI as null or empty.

After step 4578 process flow proceeds to decision step 4568 which was already described.

The method of FIG. 45A-C shows deltaGminussubmesh data corresponding to triangles, edges, and vertices of a triangle mesh. Other graphical elements such as textures are managed similarly using additional data structures incorporated in table XIII of U.S. Pat. No. 6,111,582, incorporated herein by reference.

Figure 46:
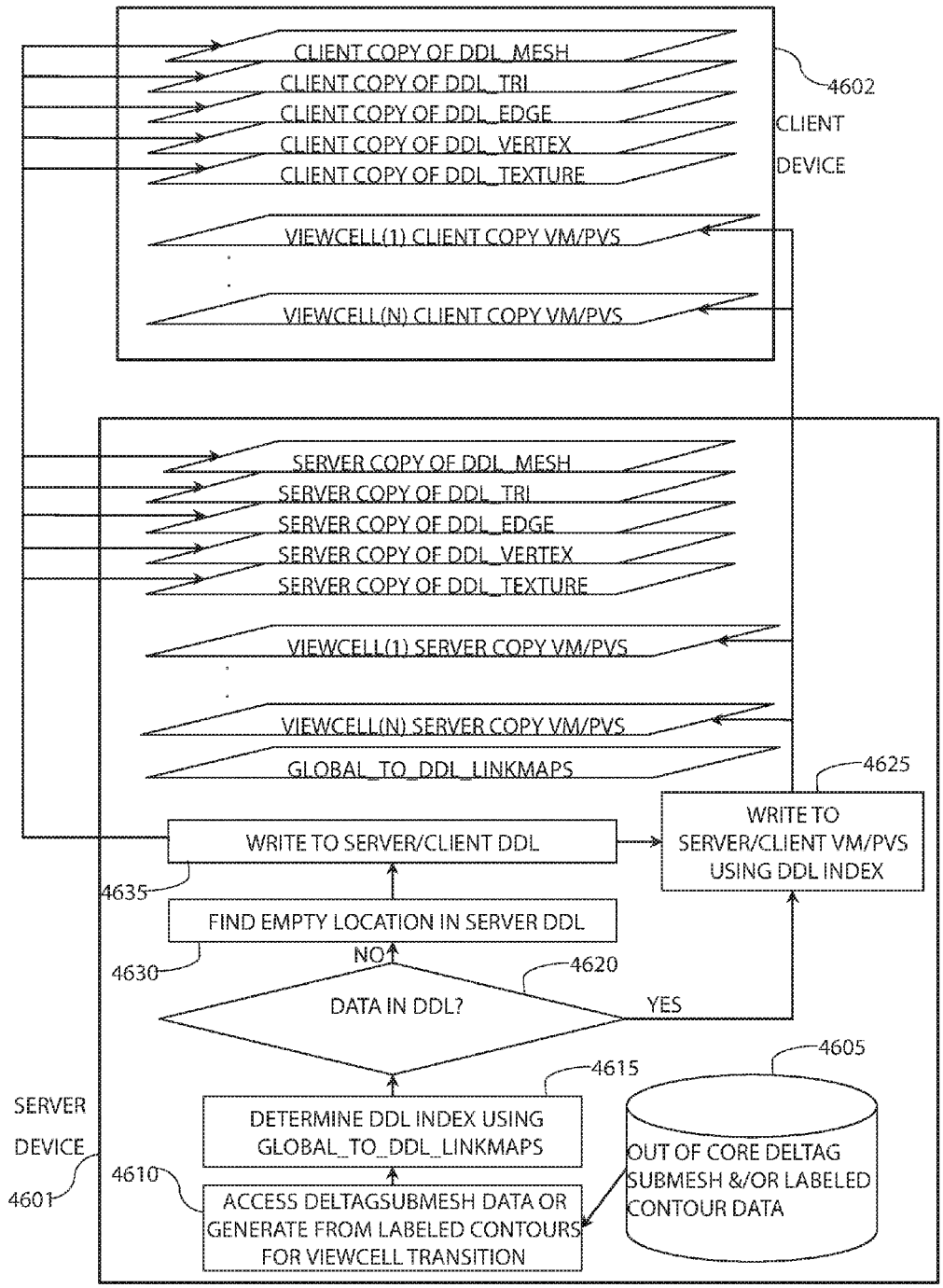
FIG. 46 is an exemplary block diagram/flowchart showing a distributed client-server implementation in which server accesses stored out-of-core DelteGSubmesh data, converts global IDs to DDL IDs and maintains DDL, VM/PVS data on both server and client.
Figure 47:
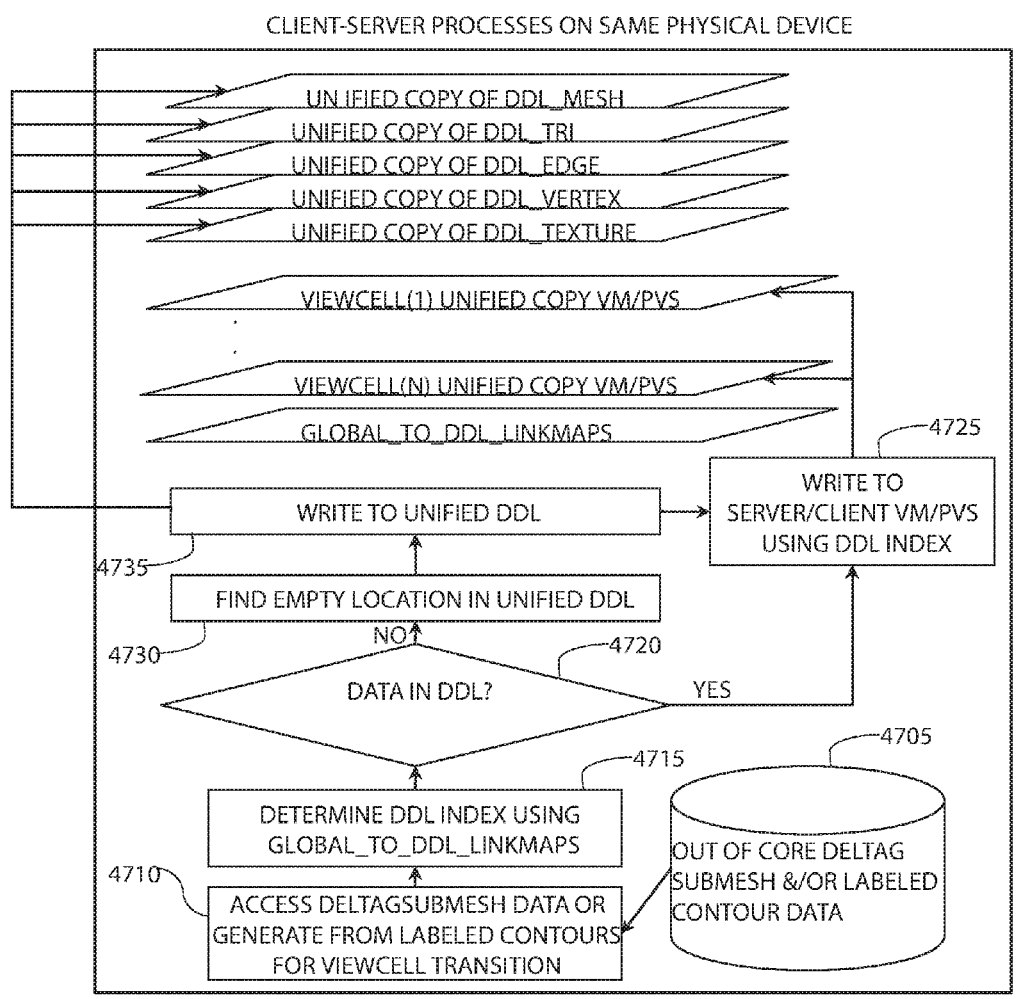
FIG. 47 is an exemplary block diagram/flowchart showing arrangement in which server process and client process are located on the same device and use a single copy of DDLs.

FIG. 46 Distributed Client-Server Implementation in Which Server Accesses Stored Out-of-Core DelteGSubmesh Data, Converts Global IDs to DDL IDs and Maintains DDL, VM/PVS Data on Both Server and Client.

FIG. 46 is a diagram showing an embodiment of a server process executed on a server device and a client process executed on a separate client device. FIG. 46 shows data being sent from the server device to the client device. In some embodiments, this data is delivered by a local network connection or distributed network connection such as internet.

The server device is indicated by the dark rectangle labeled 4601. The client device is indicated by the dark rectangle labeled 4602.

The out-of-core or disk storage is in the server device and is labeled 4605. This storage device stores the deltaGsubmesh data (both deltaG+ submesh data and deltaG− submesh data) that comprises the delta VM/PVS data corresponding to specific viewcell transitions. In additional embodiments, labeled silhouette contour information is stored and used to generate deltaG+ or deltaG− submesh data using the simplified traversal method of FIG. 36 and FIG. 37 from the corresponding unified visibility map.

When the speculative navigation algorithm (executed by the server), which is guided by the current viewpoint location (sent from the client to the server) encounters a viewcell transition, then the corresponding deltaG+ submesh data (corresponding to newly exposed graphical elements) and the deltaG− submesh data (corresponding to newly occluded graphical elements) is accessed from out-of-core storage as shown in step 4610. In addition and/or alternatively the deltaG+ and/or deltaG− submesh, data may be generated during the prefetch using labeled silhouette contour information (which was generated and stored as OUT OF CORE data as a precomputation using the method of FIG. 33). In some embodiments, deltaG+ and deltaG− submesh data is generated from the labeled contour information using the simplified mesh traversal process of FIG. 37.

Applying the simplified traversal method of FIG. 37 to a given unified visibility map (containing silhouette contours/occlusion boundaries for two connected viewcells e.g., A and B) a deltaG+ submesh is constructed, according to some embodiments, using one set of seed triangles, while the deltaG− submesh is constructed using the complementary set of seed triangles.

For example, consider a particular unified visibility map containing silhouette contours and the corresponding occlusion boundary polylines for two connected viewcells A and B. The following table shows how the deltaG+ and deltaG− submeshes can be generated or bypassed using the labeled contours depending on the selection of the seed triangle set/list.

TABLE XIV

Generation of DeltaG+ and DeltaG− Submesh
Data from Unified Visibility Map For Viewcell A
and Viewcell B Using Method of FIG. 36 and FIG. 37

| Seed | Mesh Traversed | Occlusion Boundary Encountered |
|---|---|---|
| Triangles Occluded from A But Not Occluded from B | DRoBA = deltaG − BA DReAB = deltaG + AB | Occluded Side of A Boundary & Exposed Side of B Boundary |
| Triangles Occluded from B But Not Occluded from A | DRoAB = deltaG − AB DReBA = deltaG + BA | Occluded Side of B Boundary & Exposed Side of A Boundary |

Thus, the deltaG+ (and deltaG−) submesh data need not be stored since it can be generated from the labeled silhouette contours for the corresponding viewcell transition at runtime. This approach can substantially reduce the overall storage requirements since the labeled contour information can, in many cases, have a much lower storage cost than the deltaG submesh data. This is particularly true when the silhouette contours selected are reused for several viewcell transitions, which is true where the effective dynamic occlusion (EDO) is locally high, corresponding to regions of the model where the local dynamic visibility coherence is high. This is also true when the number of newly exposed or newly occluded triangles in the deltaG packet is very large (relative to the complexity of the occlusion boundaries defining the corresponding delta regions).

According to some embodiments, in order to generate the deltaG+ or deltaG− submesh information for viewcell transitions at runtime, all of the polygon mesh data (visible from the specific viewcells) and the labeled silhouette contour information (corresponding to the specific viewcell transitions) are present in a rapidly accessible (in core) memory.

To insure that this information is pre-loaded from out of core memory prior to the deltaG submesh generation process, the server process directly accesses the set of polygons or polygon fragments visible from a larger viewcell containing the specific viewcells for which the deltaG submesh data is to be generated. This data amounts to direct PVS data for a viewcell, but the storage requirements are minimized by precomputing and storing these direct PVS data for a relative small number of large viewcells, from which the PVS for a much larger number of contained viewcells is generated using the simplified mesh traversal process and labeled silhouette contour information during the prefetch. Alternatively, the PVS for the large, parent viewcell can itself be constructed from an existing VM/PVS previously constructed for a neighboring large viewcell (itself a parent of other child viewcells) by accessing deltaG submesh data for the parent-to-parent viewcell transition.

In addition, the server process also accesses the labeled silhouette contour information for the specific child viewcells for which the deltaG submesh information is to be generated.

Once the polygon mesh information and the labeled silhouette contour information used to construct the deltaG submesh data are present in core memory, the generation of the deltaG submesh data by the server proceeds uninterrupted by out-of-core memory accesses.

This use of parent and child viewcell data is an example of exploiting the simple visibility hierarchy that is exists between hierarchical cells: all polygons/fragments visible from a child viewcell are also visible from the containing parent viewcell. In this application of parent viewcells, it is important to include all the polygon/fragments that are actually inside the parent viewcell. Ultimately, the terminal leaf child viewcells are typically constructed as to contain little or no geometry, making their VM/PVS exclusively "from-viewcell" and less "contained in viewcell".

The method of labeled silhouette contours is easily adapted to tessellated surfaces, as the level of tessellation for any mesh from any viewcell can be predetermined.

Figure 52:
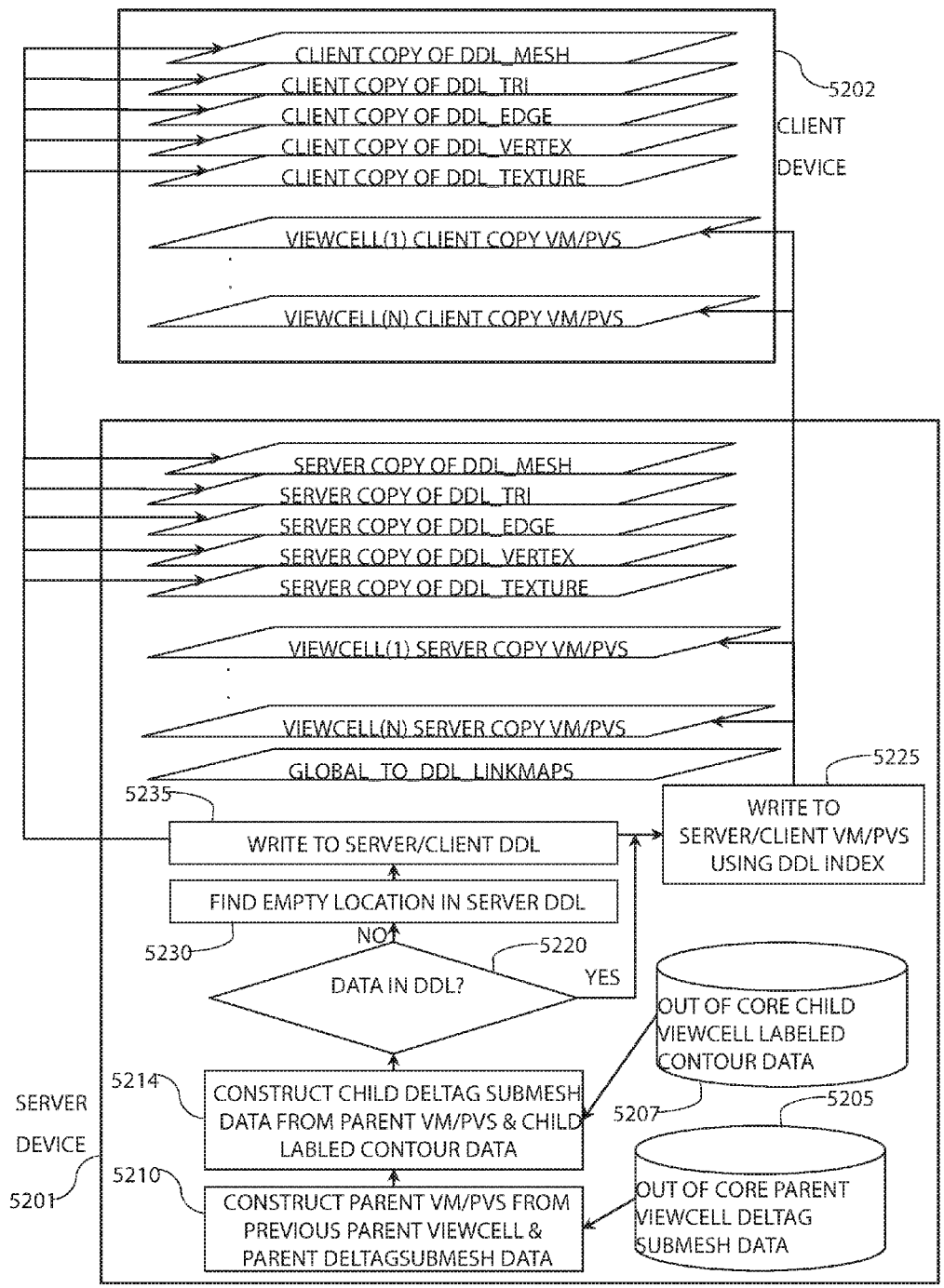
FIG. 52 is an exemplary flowchart/block diagram showing a client and server process in which the server accesses prestored deltaG submesh for parent viewcells and uses this information to construct a visibility map/PVS for a parent viewcell which is then used, along with prestored silhouette contour information for child viewcell transitions, to construct the deltaG submesh data for the child viewcell transitions.
Figure 53:
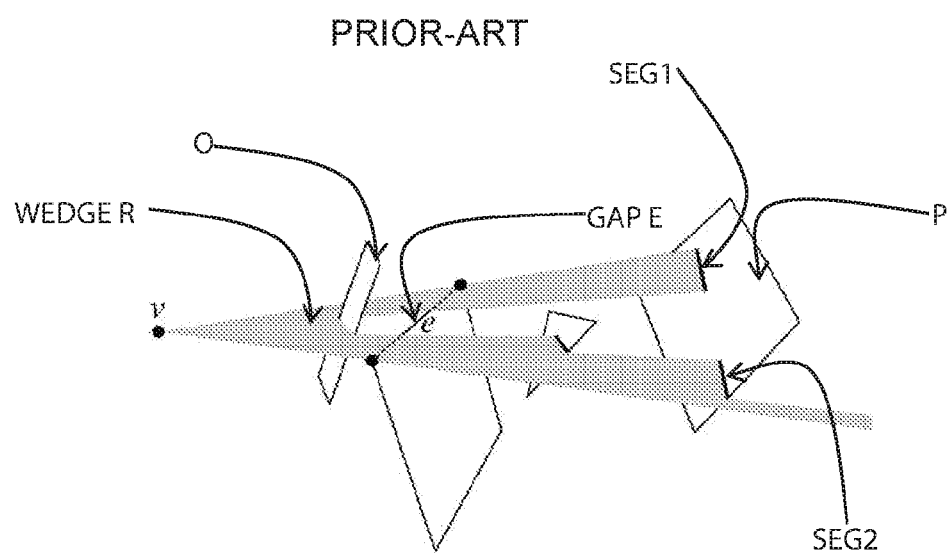
FIG. 53 shows a prior-art drawing of an incomplete discontinuity mesh wedge.

Further details of this hierarchical process are presented in conjunction with FIG. 52.

In a subsequent step 4615, the DDL index of each of the accessed elements is determined using the appropriate Global_to_DDL_Linkmap.

In decision step 4620 it is determined if the newly accessed data is already present in the corresponding DDL (see steps 4408, 4434, and 4460 in FIG. 44 for details for geometric elements).

If in decision step 4620 it is determined that the accessed data is already present in the corresponding DDL then process flow proceeds directly to step 4625.

In step 4625 the accessed data is written to both the server and client copy of the appropriate VM/PVS data using the preexisting DDL index of the data.

If, on the other hand it is determined in decision step 4620 that the accessed data is not already present in the corresponding DDL then process flow proceeds to step 4630.

In step 4630 an empty location in the server copy of the corresponding DDL is identified and in step 4635 the accessed data is written to this location on both the server and client copy of the DDL (see for example steps 4420-4426 FIG. 44).

A specific graphical element in the DDL (e.g. triangle or texture) is often present in more than one of the VM/PVS data sets stored on a client device at any one time. This is because using the speculative navigational prefetch method the client tends to store VM/PVS data sets corresponding to viewcells that are near to each other.

Because the server process first checks to determine if an accessed deltaGsubmesh datum is already present in the appropriate DDL before sending the data to the client;

redundant transmission is avoided. This substantially reduces the required connection bandwidth between the client and the server.
FIG. 47 Block Diagram/Flowchart Showing Arrangement in Which Server Process and Client Process are Located on the Same Device and Use a Single Copy of DDLs.

FIG. 47 is a diagram showing a server process which is executed on the same computing device as the client process. This configuration is similar to the configuration of FIG. 46 except that the deltaG+ submesh and deltaG− submesh out-of-core data is stored on the same device as the client rendering system.

This configuration eliminates the need for client and server copies of DDL and VM/PVS data. The processes of 4710-4725 are otherwise identical except that only one copy of the corresponding data needs to be written.

Figure 48A:
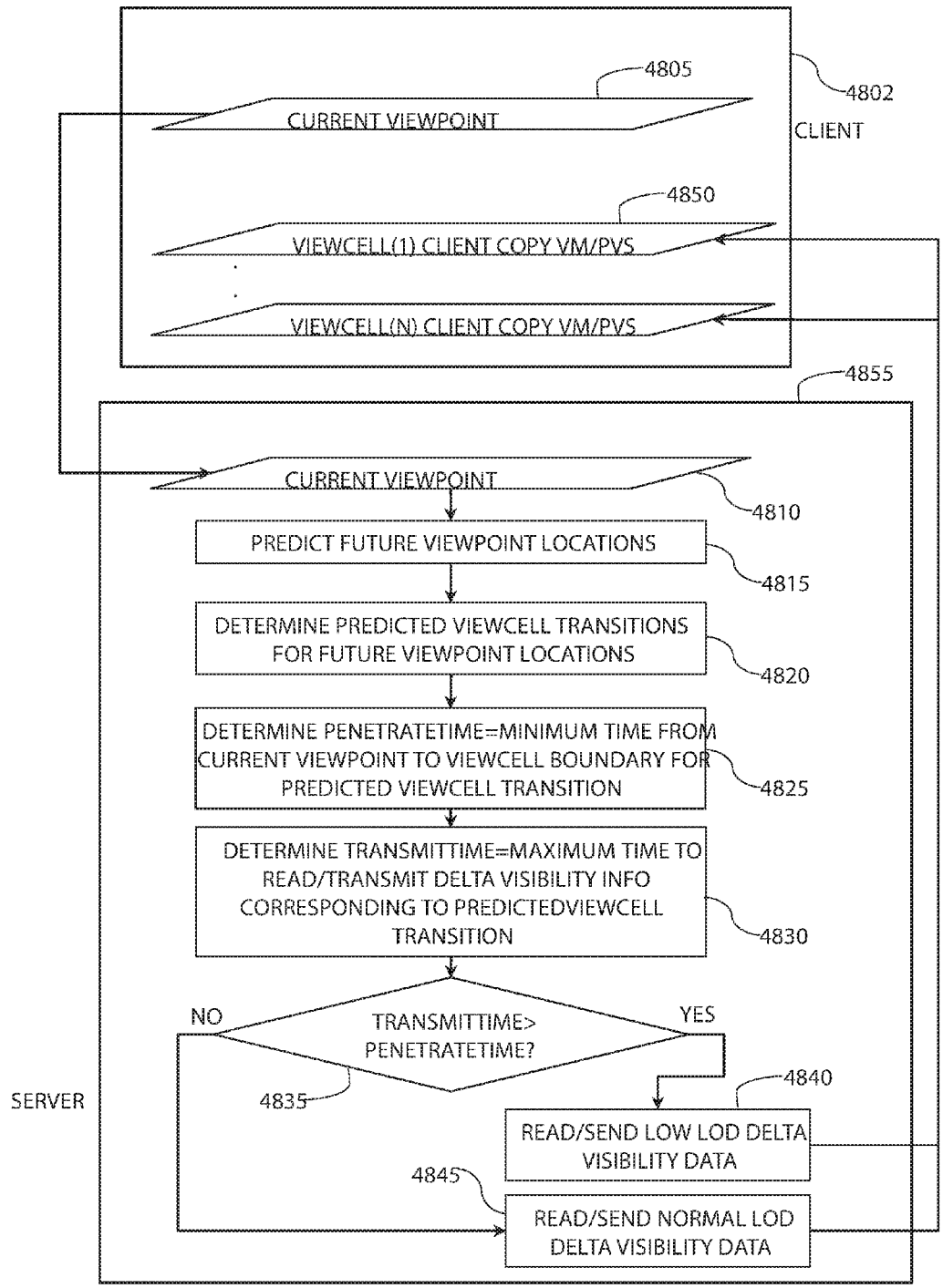
FIG. 48A is an exemplary block diagram/flowchart showing server process sending reduced level of detail delta visibility information in case current viewpoint will soon penetrate viewcell boundary for which delta visibility information has not yet been read/sent.

In this case the primary function of the DDL is to reduce the storage costs of the VM/PVS data and to simplify the conversion of global ids to local array (DDL) indices.
FIG. 48A Block Diagram/Flowchart Showing Server Process Sending Reduced Level of Detail Delta Visibility Information In Case Current Viewpoint Will Soon Penetrate Viewcell Boundary for Which Delta Visibility Information Has Not Yet Been Read/Sent.

The block diagram/flowchart of FIG. 48A shows additional detail of the client-server process of delivering delta visibility information. These steps can be implemented whether the client and server are implemented in different physical devices connected by a network connection (as in FIG. 46), or if the client and server processes are implemented on the same physical device (as in FIG. 47).

In FIG. 48A the block diagram separates the client and server functions into different processes, without regard to whether these processes are executed on different physical devices.

The block labeled 4802 contains the client process and the block labeled 4855 contains the server process.

In a first step the client process obtains and stores the current viewpoint in data location 4805. Data giving the current viewpoint location can be modified by an input device connected to the client process including mouse, joystick, game controller pad or other input device to modify the current viewpoint location.

The client process provides access to data location 4805 to the server process which copies the data into data location 4810. This copying may occur in a local memory or across a network.

In step 4815 the server process uses the current viewpoint data to predict future locations of the viewpoint. This prediction can employ dead-reckoning and collision constraints, velocity and acceleration limits, and other methods of predicting future viewpoint locations from the current viewpoint location, such as prior-art methods of pathfinding commonly used to determine the navigation of non-player combatants or artificial intelligence agents in computer games or other simulations. (See "Tactical Pathfinding Using A*", Van Der Sterren, William in Game Programming Gems 3, Charles River Media 2002, the entire contents of which are incorporated herein by reference).

In step 4820 the predicted future viewpoint locations are used to determine predicted viewcell transitions, a viewcell transition being a crossing of a viewcell boundary. This step employs both the data from step 4815 and the known arrangement of viewcells for the model. Delta visibility data (also called visibility event information) corresponding to each crossed viewcell boundary, i.e. each viewcell transition, will be read by the server process in later steps.

In step 4825 the minimum time for the current viewpoint to reach the viewcell boundary corresponding to the predicted viewcell transition being processed is determined. This time is a function of the current viewpoint location and velocity, maximum possible acceleration and velocity, as well as local collision and other navigational constraints. This value is stored in the variable PENETRATETIME.

In step 4830 the maximum time to read and transmit the delta visibility information corresponding to the future viewcell transition being processed is determined. This time is determined based on the size of the corresponding delta visibility packet, available transmission bandwidth to client, and possible other factors. This value is stored in the variable TRANSMITTIME.

In subsequent decision step 4835 it is determined if the variable TRANSMITTIME is greater than the variable PENETRATETIME. If, in decision step 4835, it is determined that the variable PENETRATETIME is greater than TRANSMITTIME then process flow proceeds to step 4840.

In step 4840 a low level-of-detail (LOD) version of the delta visibility data (e.g. deltaG+ submesh data) is read from the out-of-core storage and made available to the client process, which uses this data to update visibility map/PVS data corresponding to the viewcell and stored in data location labeled 4850. In embodiments, this relatively low level-of-detail delta visibility data includes data having a relatively lower level of geometric detail, lower level of texture resolution, or other methods of reduced detail. Further embodiments include filters applied to such lower level-of-detail information to mask the low level-of-detail features. As an example, a regular model may include a polygon mesh composed of over one million mesh triangles. In some embodiments, the low level-of-detail version of the regular image would include only 10% of the mesh triangles. For existing methods of generating models at multiple levels of detail see Leubke, David; Reddy, Martin et. al, "Level of Detail for 3D Graphics" Morgan Kauffman 2003, ISBN: 1-55860-838-9, the entire contents of which are incorporated herein by reference.

If, in decision step 4835, it is determined that the variable TRANSMITTIME is not greater than the variable PENETRATETIME then process flow proceeds to step 4845.

In step 4845 a higher level-of-detail version of the delta visibility data (e.g. deltaG+ submesh data) is read from the out-of-core storage and made available to the client process, which uses this data to update visibility map/PVS data corresponding to the viewcell and stored in data location labeled 4850.

The steps 4815 through 4840 insure that relatively low level-of-detail geometric and/or texture information in delta visibility packets are employed only when the current viewpoint is likely to enter a viewcell before all of the delta visibility information needed to update the PVS for that viewcell has been received by the client process.

The use of lower level-of-detail information in this situation reduces the time required to read and transmit the delta visibility information to the client process; and thereby reduces the chance that the viewpoint will enter a viewcell before all of the delta visibility information required to incrementally construct the PVS for that viewcell has been read/transmitted.

Moreover, the use of this lower level-of-detail information in this situation is not likely to be detected by the user. This is because the delta visibility information supplied (e.g., deltaG+ submesh information) correspond to newly exposed surfaces, which, in this situation have been exposed for a very brief time; and it is well known that the human visual system has low visual acuity for surfaces that have been exposed for brief times.

Figure 49:
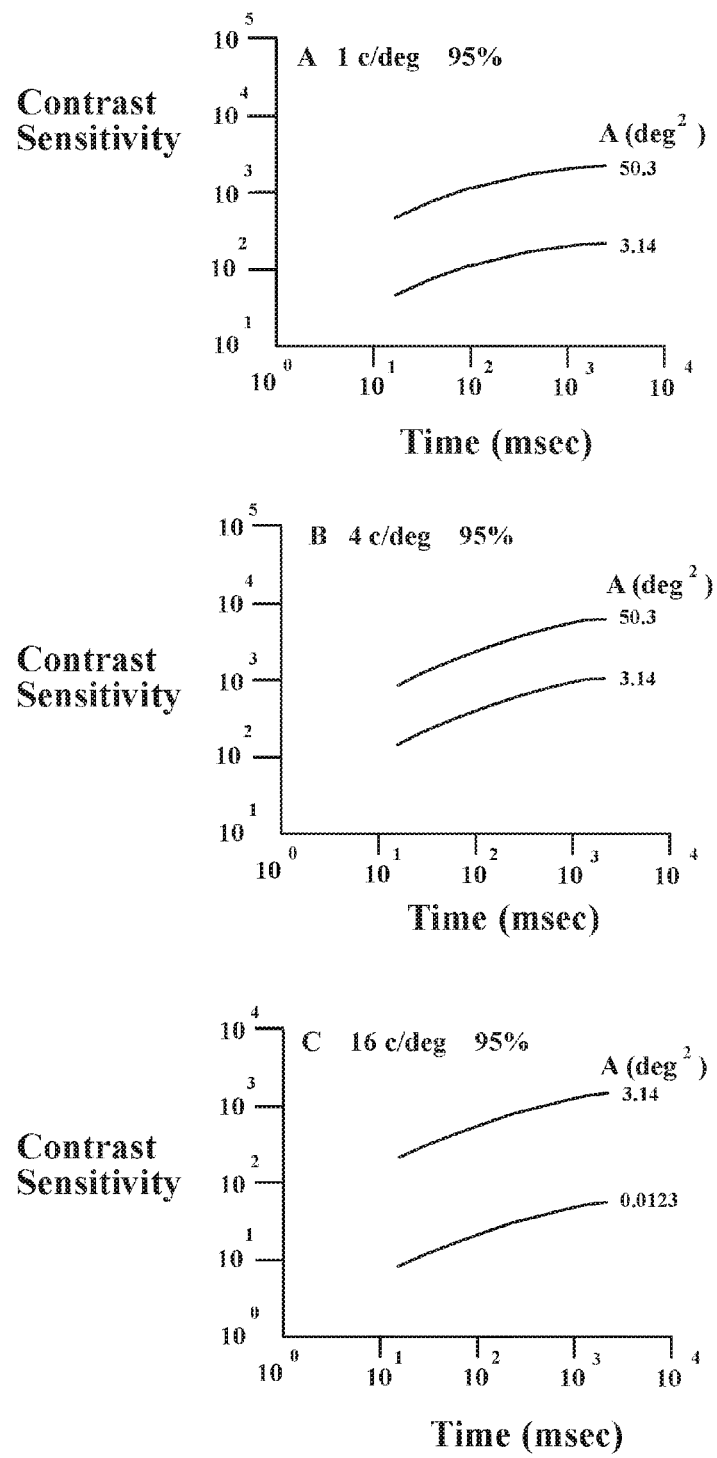
FIG. 49 is an exemplary diagram showing the effect of exposure time on ability of human subjects to resolve spatial detail.

FIG. 49 is diagram showing the contrast sensitivity (a measure of visual acuity) as a function of exposure time and exposure area and is discussed in detail in conjunction with that figure.

Thus, the present method is a method of initially using relatively low level-of-detail delta visibility information to update the PVS of viewcells for which the current viewpoint is likely to penetrate before the corresponding higher level-of-detail could be supplied. In embodiments, the relatively higher level-of-detail delta visibility information is sent at a later time as the exposure time of the deltaG+ submesh surfaces increases, corresponding to an exposure time for which the time-dependent spatial acuity of the user's visual system would allow the user to appreciate the higher level-of-detail geometry and/or texture information. In some embodiments, the time to send the higher level-of-detail visibility information is bounded by a human's ability to perceive objects.

Low level-of-detail graphics information is delivered more quickly to the client unit than higher level-of-detail information. By delivering relatively low level-of-detail information during transient periods when late arrival of graphics information to the client is threatened, the present method substantially prevents late arrival of graphics information. Late arrival of graphics information can be considered a perceptually undesirable failure of a visibility-based prefetch system, since the missing graphic elements (or their sudden reappearance later on) is easily perceived by a viewer and is visually objectionable.

By initially delivering low level-of-detail graphics information during these periods and subsequently sending additional graphics information that can be used to increase the level-of-detail of the initial graphics information, the method can prevent late arrival of graphics information and still achieve a perceptually lossless performance degradation if the substitution schedule matches or exceeds the visual acuity vs. exposure time curve shown in FIG. 49.

If the substitution schedule approximates the visual acuity vs. exposure time curve shown in FIG. 49, then a perceptually graceful performance degradation will be experienced by the user. This performance degradation will be experienced as a discrete substitution event during the substitution of higher level-of-detail graphics information for lower level-of-detail graphics information. As the substitution schedule approaches the visual acuity vs. exposure time curve of FIG. 49, this substitution event will become more difficult for the user to perceive. In any case, the substitution event is preferable to the late arrival of graphics information (and subsequent sudden appearance) that would be caused by late arrival of graphics information.

Consequently, this method produces a perceptually lossless or perceptually graceful degradation of performance in the case of transiently low spatiotemporal visibility coherence during the visualization. This transiently low spatiotemporal visibility coherence of the visualization may be caused by transiently high viewpoint velocity or locally low visibility coherence in regions of the model where the visibility tends to change at a high rate (e.g. regions near doors moving indoors to outdoors). This method also is useful in dealing with situations in which the available transmission bandwidth is transiently diminished, or server performance is transiently diminished.

In one important situation, the situation of high viewpoint velocity, the exposure time of deltaG+ submesh surfaces may not increase to a duration which allows the user to fully resolve the newly exposed surfaces. This is because at high viewpoint velocity the time during which the newly exposed surfaces remain in the viewport can be brief.

Because the method of FIG. 46 and FIG. 47 employ speculative prefetch of delta visibility information based on predicted future viewpoint locations, a high viewpoint velocity would tend to produce performance degradation, since for high viewpoint velocities the amount of delta visibility information that must be read and transmitted could exceed the read capabilities of the server or the available transmission bandwidth.

The present method of FIG. 48A minimizes these performance degradations by matching the performance of the method to the performance of the human visual system in a way that naturally makes performance degradations of the method relatively imperceptible.

Because the present method employs a prefetch and caching of visibility event data based on navigation prediction, the visibility event packets are typically sent from the server unit to the client unit as a result of a viewcell transition boundary that is crossed by an agent of the navigation prediction algorithm, acting to predict the user's viewpoint, rather than the user's viewpoint itself actually crossing a viewcell transition boundary.

As a result of this speculative prefetch, many transient periods of low temporal visibility coherence as measured from the user's viewpoint would not actually produce late arrival of visibility event packets, since these same packets would already have been sent and cached as a result of the navigation-based speculative prefetch (also called visibility-based prefetch).

It is only when late visibility event packet arrival is actually predicted, as determined for example in steps 4820-4830 of FIG. 48A, that the present method sends lower level-of-detail information in order to prevent late packet arrival.

FIG. 49 is a diagram showing the effect of exposure time on ability of human subjects to resolve spatial detail.

FIG. 49 is data reproduced by a study of human visual performance (Luntinen, O., et. al. (1995). Modeling the Increase of Contrast Sensitivity with Gating Area and Exposure time. Vision Res. Vol. 35, No. 16, pp. 2339-2346. Elsevier Science Ltd.).

This study shows the pronounced effect of exposure time on contrast sensitivity, particularly for high spatial frequencies up to 1000 ms.

FIG. 49 shows four graphs (A through C) in which contrast sensitivity is plotted as a function of exposure time from 0 to 10 seconds. In each graph the relationship is plotted for different total exposure areas of the viewed surface (a grating pattern). Each graph represents the relationship for one of four spatial frequencies as indicated. This study shows that contrast sensitivity is decreased by low exposure time and low exposure area. Note that the increase in contrast sensitivity with increasing spatial frequency in this case is because the measured low frequencies are below the "peak" spatial frequency on the spatial contrast sensitivity curve under the employed experimental conditions. From this data is clear that the ability of the human visual system to resolve high spatial frequency data is a function of exposure time even beyond 1000 ms. This would allow the use of a low level-of-detail delta visibility information to be used initially and subsequently replaced with a relatively higher level-of-detail delta visibility information as exposure time of the corresponding deltaG+ submesh data increased.

The method of FIG. 48A, in which low level-of-detail delta visibility data is read/transmitted for geometry/textures that have low exposure times can exploit the acuity vs. exposure relationship data given by FIG. 49 in order to determine if and when relatively higher level-of-detail delta visibility data should be read/transmitted at a later time.

Figure 50A:
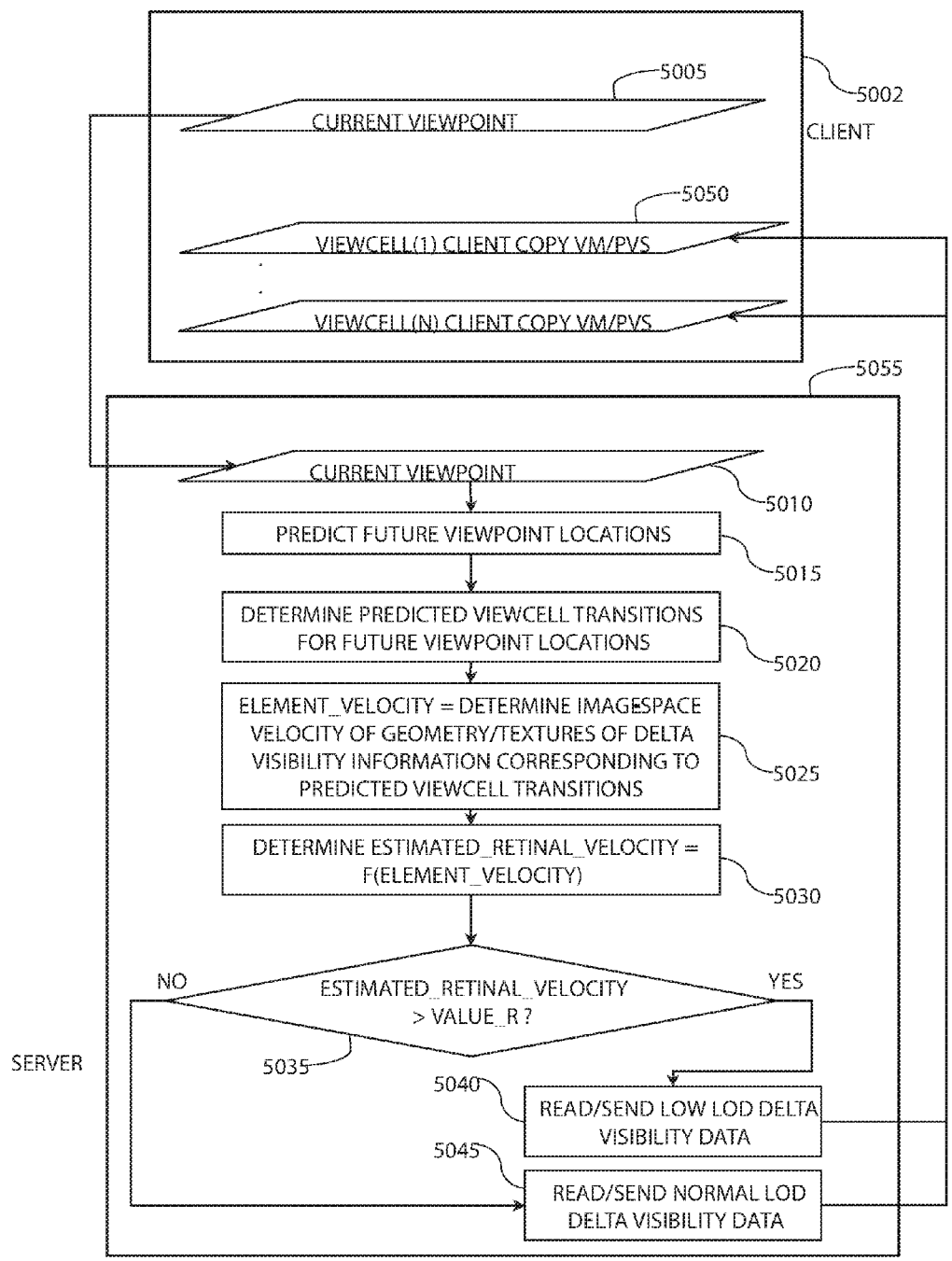
FIG. 50A is an exemplary block diagram/flowchart showing server process sending reduced level-of-detail delta visibility information in case the image-space velocity of newly visible geometry and/or textures corresponding to delta-visibility information is high enough to caused reduced visual acuity for the moving geometry and/or texture.

FIG. 50A is a Block Diagram/Flowchart Showing Server Process Sending Reduced Level-of-Detail Delta Visibility Information In Case the Image-Space Velocity of Newly Visible Geometry and/or Textures Corresponding to Delta-Visibility Information is High Enough to Caused Reduced Visual Acuity for The Moving Geometry and/or Texture.

The block diagram/flowchart of FIG. 50A shows additional detail of the client-server process of delivering delta visibility information. These steps can be implemented whether the client and server are implemented in different physical devices connected by a network connection (as in FIG. 46), or if the client and server processes are implemented on the same physical device (as in FIG. 47).

In FIG. 50A the block diagram separates the client and server functions into different processes, without regard to whether these processes are executed on different physical devices.

The block labeled 5002 contains the client process and the block labeled 5055 contains the server process.

In a first step the client process obtains and stores the current viewpoint in data location 5005. Data giving the current viewpoint location can be modified by an input device connected to the client process including mouse, joystick, game controller pad or other input device to modify the current viewpoint location.

The client process provides access to data location 5005 to the server process which copies the data into data location 5010. This copying may occur in a local memory or across a network.

In step 5015 the server process uses the current viewpoint data to predict future locations of the viewpoint. This prediction can employ dead-reckoning and collision constraints, velocity and acceleration limits, and other methods of predicting future viewpoint locations from the current viewpoint location.

In step 5020 the predicted future viewpoint locations are used to determine predicted viewcell transitions, a viewcell transition being a crossing of a viewcell boundary. This step employs both the data from step 5015 and the known arrangement of viewcells for the model. Delta visibility data corresponding to each crossed viewcell boundary, i.e. each viewcell transition, will be read by the server process in later steps.

In step 5025 the image-space velocity of geometry elements corresponding to delta visibility information (e.g. deltaG+ submesh data for a specific viewcell transition) is determined and the variable ELEMENT_VELOCITY is used to store the result.

In subsequent step 5030 the estimated retinal velocity of the element is determined as being a function of the image space velocity and the variable ESTIMATED_RETINAL_VELOCITY is used to store the result. Known transfer functions for predicting the retinal velocity of an element as a function of the image-space velocity of the element and other factors (e.g. image-space acceleration, predictability of motion, and possible others) may be employed to estimate the retinal velocity.

In subsequent decision step 5035 it is determined if the variable ESTIMATED_RETINAL_VELOCITY is greater than the predetermined variable VALUE_R. If, in decision step 5035, it is determined that the variable ESTIMATED_RETINAL_VELOCITY is greater than VALUE_R then process flow proceeds to step 5840.

In step 5840 a low level-of-detail (LOD) version of the delta visibility data (e.g. deltaG+ submesh data) is read from the out-of-core storage and made available to the client process, which uses this data to update visibility map/PVS data corresponding to the viewcell and stored in data location labeled 5850.

If, in decision step 5835, it is determined that the variable ESTIMATED_RETINAL_VELOCITY is not greater than the variable VALUE_R then process flow proceeds to step 5845.

In step 5845 a higher level-of-detail version of the delta visibility data (e.g. deltaG+ submesh data) is read from the out-of-core storage and made available to the client process, which uses this data to update visibility map/PVS data corresponding to the viewcell and stored in data location labeled 5850.

The steps 4815 through 4840 insure that relatively low level-of-detail geometric and/or texture information in delta visibility packets are employed only when the newly visible geometry and/or textures have an image-space velocity which results in a retinal velocity that reduces the viewer's spatial visual acuity for the newly visible elements.

High image-space velocity of geometric elements can be produced by high viewpoint velocity. As previously discussed, in the case of high viewpoint velocity the current viewpoint is likely to enter a viewcell before all of the delta visibility information needed to update the PVS for that viewcell has been received by the client process.

The use of lower level-of-detail information in this situation reduces the time required to read and transmit the delta visibility information to the client process; and thereby reduces the chance that the viewpoint will enter a viewcell before all of the delta visibility information required to incrementally construct the PVS for that viewcell has been read/transmitted.

Figure 51:
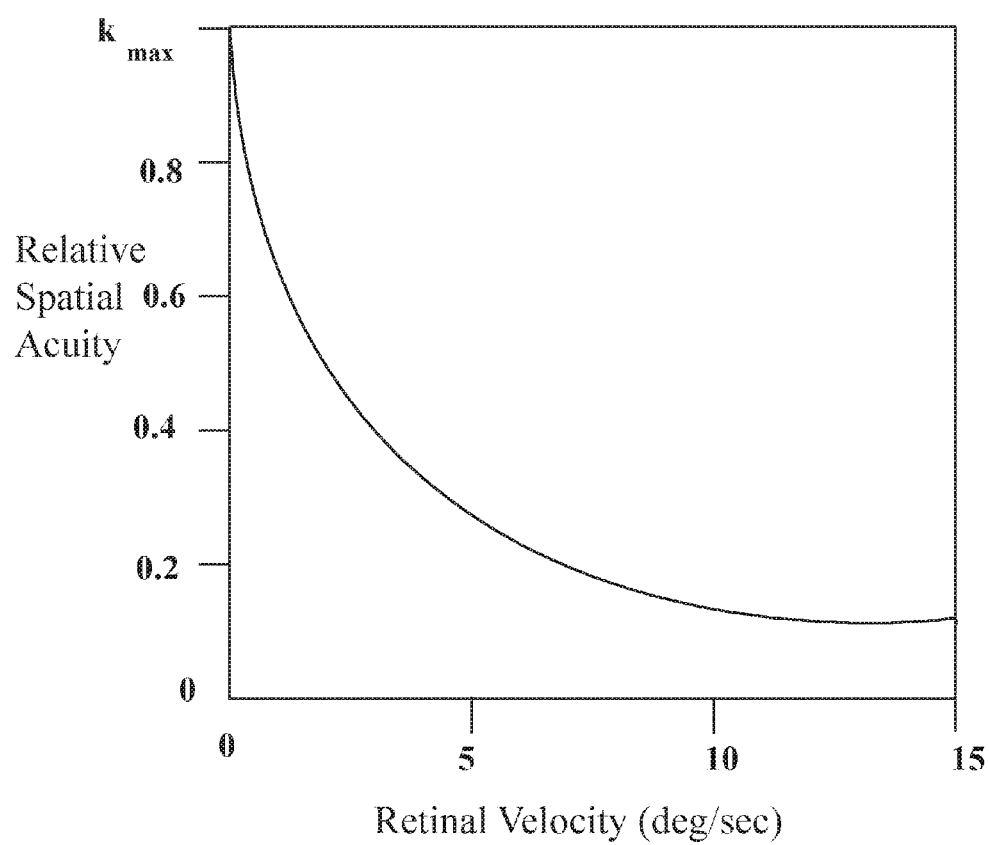
FIG. 51 is an exemplary diagram showing the relative spatial visual acuity as a function of retinal velocity.

Moreover, the use of this lower level-of-detail information in this situation is not likely to be detected by the user. This is because the delta visibility information supplied (e.g. deltaG+ submesh information) corresponds to geometric and/or texture elements with high image-space velocity and a corresponding high predicted retinal velocity, which reduces the viewer's ability to resolve spatial detail as shown in FIG. 51.

Figure 50B:
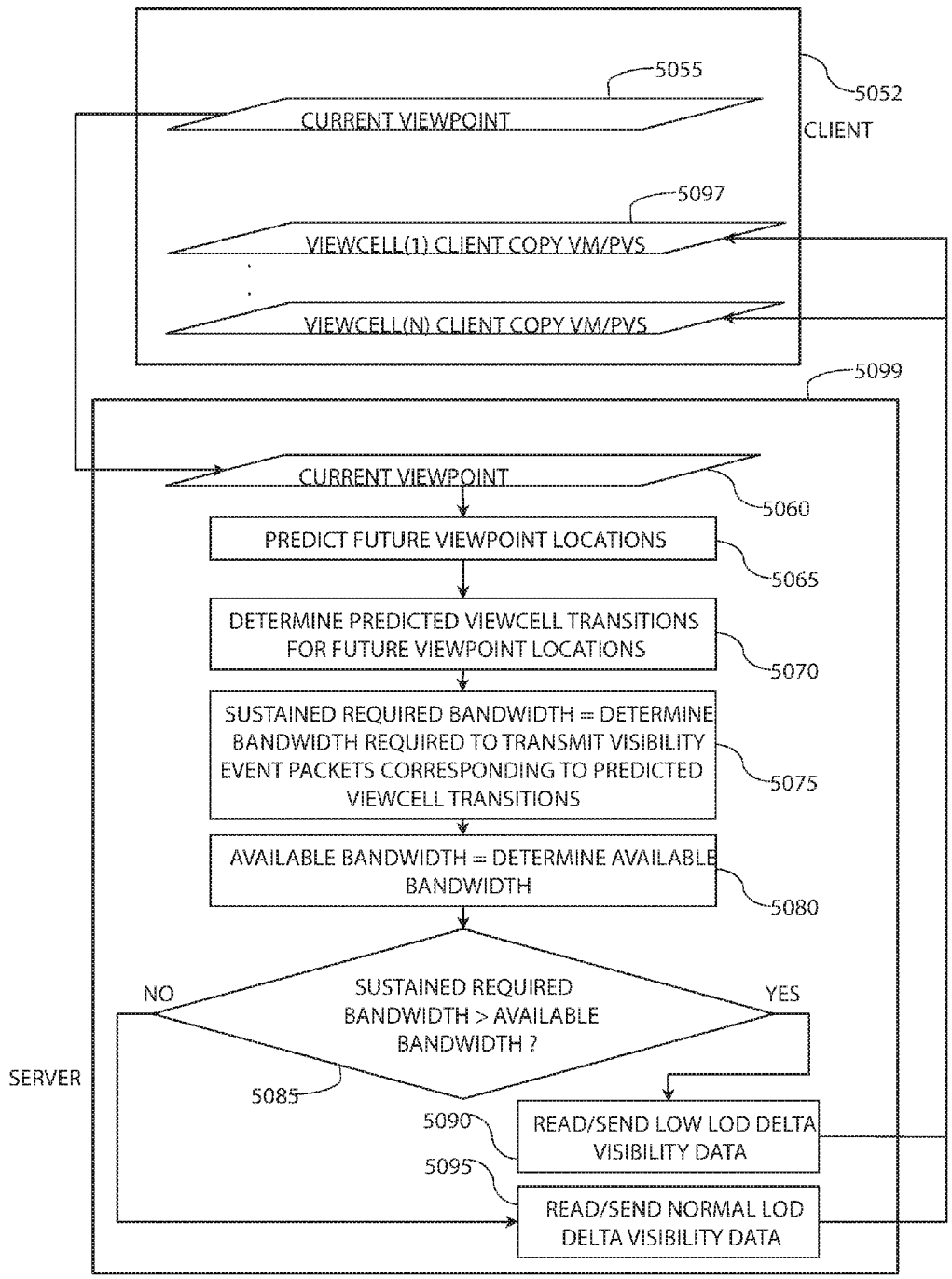
FIG. 50B is an exemplary block diagram/flowchart showing an alternate embodiment of a server process sending reduced level-of-detail visibility event information in case the required transmission bandwidth exceeds the available transmission bandwidth.

FIG. 50B is an alternate embodiment of the method shown in FIG. 50A. In FIG. 50B the process uses a different test to decide when to decrease the level-of-detail of the graphics information being sent. In this embodiment the test used is not based on estimated retinal velocity, but on a comparison of the bandwidth required to send the visibility event data with the available bandwidth In FIG. 50A the block diagram separates the client and server functions into different processes, without regard to whether these processes are executed on different physical devices.

The block labeled 5052 contains the client process and the block labeled 5099 contains the server process.

In a first step the client process obtains and stores the current viewpoint in data location 5055. Data giving the current viewpoint location can be modified by an input device connected to the client process including mouse, joystick, game controller pad or other input device to modify the current viewpoint location.

The client process provides access to data location 5055 to the server process which copies the data into data location 5060. This copying may occur in a local memory or across a network.

In step 5065 the server process uses the current viewpoint data to predict future locations of the viewpoint. This prediction can employ dead-reckoning and collision constraints, velocity and acceleration limits, and other methods of predicting future viewpoint locations from the current viewpoint location.

In step 5070 the predicted future viewpoint locations are used to determine predicted viewcell transitions, a viewcell transition being a crossing of a viewcell boundary. This step employs both the data from step 5065 and the known arrangement of viewcells for the model. Delta visibility data (i.e. visibility event packets) corresponding to each crossed viewcell boundary, i.e. each viewcell transition, will be read by the server process in later steps.

In step 5075 the sustained bandwidth required to transmit the visibility event data based on the future predicted viewpoint locations determined in step 5070 is determined. This can be determined from the known packet sizes of the visibility event data corresponding to the viewcell transitions together with the rate at which viewcell boundaries are penetrated by the navigation prediction algorithm.

In step 5080 the available bandwidth is determined.

In subsequent decision step 5085 the sustained bandwidth requirement is compared to the available bandwidth.

If, in step 5085, it is determined that the sustained required bandwidth exceeds the available bandwidth then process flow proceeds to step 5090.

In step 5090 the server sends the delta visibility data (visibility event data) at a substantially lower level of detail. This will decrease the sustained required bandwidth and mitigates late packet arrival.

If, in decision step 5085, it is determined that the sustained required bandwidth does not exceed the available bandwidth then process flow proceeds to step 5095.

In step 5095 the visibility event data is sent at a relatively higher or normal level-of-detail The sustained required bandwidth for visibility event streaming tends to increase in proportion to the inverse of the temporal visibility coherence of the visualization. Sustained conditions of low temporal visibility coherence can result from a relatively high user viewpoint velocity, which tends to produce relatively high retinal image velocity for the visualized graphic elements as discussed in conjunction with FIG. 50A.

As in the case of transiently low temporal visibility coherence, discussed in conjunction with FIG. 48A and FIG. 49, once the sustained visibility coherence increases the graphics information initially transmitted at a low level-of-detail can be retransmitted at a higher level-of-detail. Alternatively, additional graphics information can be send to increase the level-of-detail of previously transmitted graphics elements using lossless, progressive geometric and texture compression methods.

Once again, since the present method employs a visibility-based prefetch scheme driven by a navigation prediction algorithm in which substantial data may be cached on the client unit, graphics information may initially be sent at a low level-of-detail and then substituted before it becomes visible to the user.

FIG. 51 is diagram showing the relative spatial visual acuity as a function of retinal velocity and is discussed in detail in conjunction with that figure.

Thus the present method is a method of using relatively low level-of-detail delta visibility information corresponding to newly visible elements having a high predicted retinal velocity.

Because the method of FIG. 46 and FIG. 47 employ speculative prefetch of delta visibility information based on predicted future viewpoint locations, a high viewpoint velocity would tend to produce performance degradation, since for high viewpoint velocities the amount of delta visibility information that must be read and transmitted could exceed the read capabilities of the server or the available transmission bandwidth.

The present method of FIG. 50A minimizes these performance degradations by matching the performance of the method to another performance limitation of the human visual system, dynamic visual acuity. Dynamic visual acuity reflects the reduced spatial acuity for elements having relatively high retinal velocity. Consequently this method tends to produce graceful performance degradations.

Figure 48B:
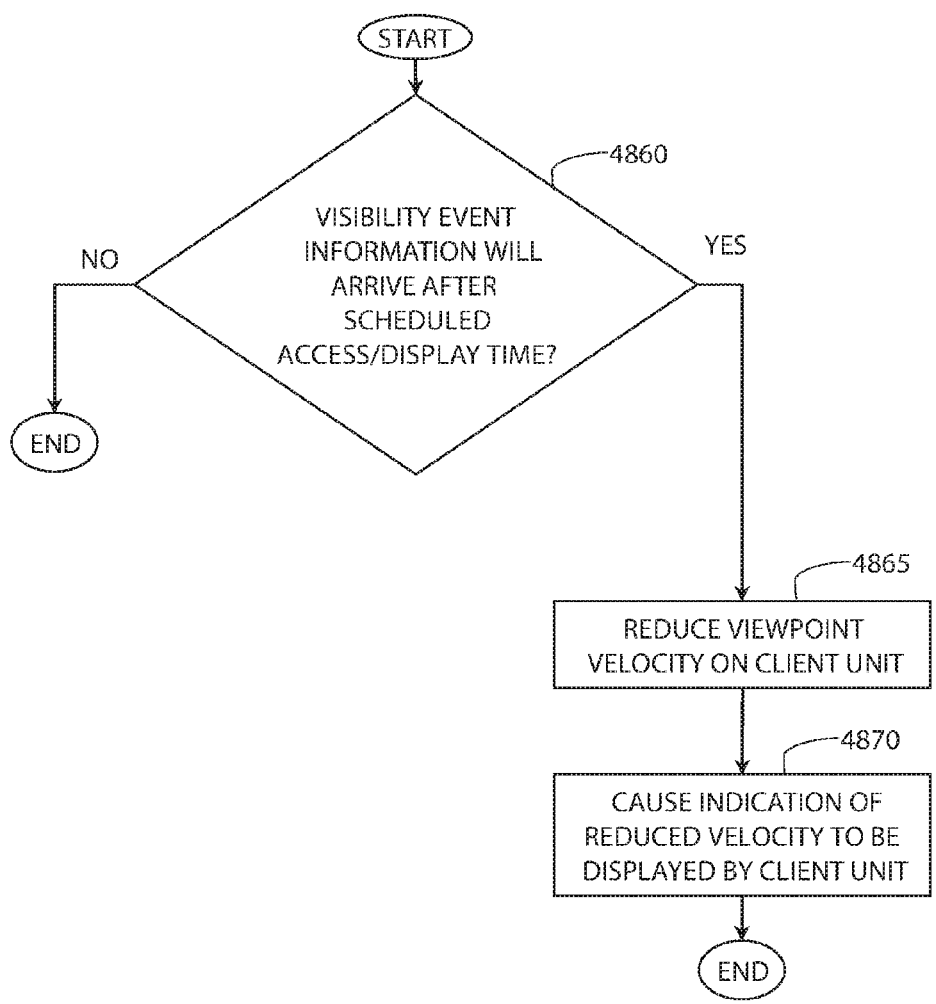
FIG. 48B is an exemplary flow diagram showing a method of preventing late arrival of visibility event information by decreasing allowed viewpoint velocity.

FIG. 48B Method of Using Navigational Limitations to Avoid Delayed Visibility Event Packets and Restore Client VM/PVS or DeltaG Data.

The methods of FIG. 48A and FIGS. 50A and 50B, functions to help prevent perceived packet delay by sending low level-of-detail packets during periods of low temporal visibility coherence. In general the methods specified herein employ a navigational-based prefetch of visibility-event packets (e.g. deltaG packets). An alternative method of preventing delayed arrival of packets is to regulate the velocity of viewer navigation. By slowing the viewpoint velocity temporal visibility coherence can be increased.

During a walkthrough type application several factors may naturally limit navigational velocity. Factors such as muscular fatigue, engine overheating, availability of energy source (e.g. solar, wind), and battery charge can all limit navigational velocity during the exploration of a 3D database. Factors such as muscular fatigue, engine overheating, or insufficient reception of a remote signal for controlling navigation (e.g. of a remotely controlled vehicle or avatar) naturally tend to limit velocity during and immediately after periods of high velocity navigation. These periods of high velocity navigation correspond to periods of low temporal visibility coherence during which viewpoint navigation may exceed the limits of the prefetched visibility event packets; causing delayed delivery of packets or depletion of the client VM/PVS data cache. In the present methods these factors can be used to seamlessly modulate viewpoint velocity in a way that tends to prevent visibility event packet delay and restore the client cache of VM/PVS or deltaG data.

FIG. 48B is an exemplary flowchart showing a method of imposing navigational limitations in order to prevent late arrival of visibility event packets.

Turning now to FIG. 48B, in some embodiments process flow starts with decision step 4850 where it is determined if the visibility event data will arrive after it should be accessed and displayed by a client unit.

If, in decision step 4860, it is determined that the visibility event information will not arrive late then the process is ended.

If, on the other hand, it is determined that the visibility event information will arrive after it is scheduled to be accessed/displayed by the client unit, then process flow proceeds to step 4865 in which the viewpoint velocity is decreased. The reduction in viewpoint velocity allowed on the client unit decreases the rate at which visibility event information corresponding to newly visible graphics information must be transmitted to the client unit and thereby tends to prevent late packet arrival.

Process flow proceeds to optional step 4870 in which an indicator of reduced velocity is caused to be displayed by the client unit. This indicator may include an indicator of physical fatigue, engine fatigue, insufficient power, or impediments to navigation such as obstacles or poor road conditions. The display of a reduced velocity state makes the change in velocity appear more natural and predictable to a client end user.

In alternate embodiment, the method of the exemplary flowchart of FIG. 48B may be conducted by a server unit or a client unit. or both units working together.

FIG. 51 is diagram showing the relative spatial visual acuity as a function of retinal velocity.

The diagram of FIG. 51 is reproduced from data given in: Eckert, M. P. and Buchsbaum, G. (1993). The Significance of Eye Movements and Image Acceleration for Coding Television Image Sequences. In Digital Images and Human Vision, Watson, A. B. (Ed.), MIT Press, chapter 8, pp. 89-98.

This data shows significant reduction in the ability of the human visual system to resolve detail of elements having high retinal velocity.

The dynamic visual acuity is a spatio-temporal limit of the human visual system (see Brown, B. (1972b) Dynamic Visual Acuity, Eye Movements and Peripheral Acuity for moving targets. Vision Res. Vol. 12, pp. 305-321. Pergamon Press 1972) which expresses the acuity of the visual system for moving objects. Image elements that undergo optical flow on the retinal receptor surface produce transient stimulation of retinal and higher processing elements that may not meet the integrational time required to completely resolve the moving image elements. As a result, objects with a high retinal image velocity are poorly resolved by the visual system.

Eye movements tend to reduce the retinal image velocity of tracked image elements through the oculomotor strategies of pursuit and fixation. Nevertheless for objects with high image-space velocity, high image-space acceleration, or unpredictable image-space motion, oculomotor tracking is not completely accurate and results in retinal image motion that decreases the resolvability of the moving elements. Relationships describing the efficacy of oculomotor pursuit such as (Lisberger et al. (1987) Annual Review of Neuroscience 1987, 10:97-129) which relates retinal image velocity as a function of image-space acceleration and predictability are known and can be used to estimate retinal velocity based on image-space velocity and/or acceleration of the tracked elements.

FIG. 52 is a flowchart/block diagram showing a client and server process in which the server accesses prestored deltaG submesh for parent viewcells and uses this information to construct a visibility map/PVS for a parent viewcell which is then used, along with prestored silhouette contour information for child viewcell transitions, to construct the deltaG submesh data for the child viewcell transitions.

The delta-PVS storage scheme using deltaG+ submesh and deltaG− submesh data described in this specification has substantially lower storage costs than storing a PVS for each viewcell. Nevertheless, even using the precision control heuristics based on the effective static occlusion (ESO) and effective dynamic occlusion (EDO), storage costs for delta-PVS data tend to be very large for a large database with many viewcells.

One approach to reduce the size of the precomputed delta-PVS database is to store deltaG submesh data only for relatively large "parent" viewcells and use prestored labeled silhouette contour information to generate the deltaG submesh data for child viewcells at runtime.

This scheme was introduced in conjunction with the discussion of FIG. 46 and FIG. 47 and additional detail is presented here.

Turning now to FIG. 52, FIG. 52 is a diagram showing a server process executed on a server device and a client process executed on a separate client device. FIG. 52 is very similar to FIG. 46, except that whereas in the method of FIG. 46 all deltaG submesh can be read directly from out of core memory, in the method of FIG. 52 only deltaG submesh data for parent viewcells is read directly from memory. This parent deltaG submesh data is used, together with a previous parent VM/PVS, to construct a VM/PVS for the current parent viewcell. This new parent VM/PVS is used, together with labeled silhouette contour information for child viewcell transitions, to generate the deltaG submesh data for child cell transitions at runtime.

The labeled silhouette contour information, using the data structures of FIG. 31 and related algorithms (FIG. 32.-FIG. 37), can have much lower storage costs than directly storing deltaG submesh data for each child viewcell transition. Moreover the simplified 3D mesh traversal algorithm of FIG. 37 insures that the corresponding deltaG submesh data for child cells can be constructed quickly at runtime. Using this approach, an optimal balance between storage cost and runtime compute cost can be achieved.

Turning now to FIG. 52, the server is indicated by the dark rectangle labeled 5201. The client device is indicated by the dark rectangle labeled 5202.

The out-of-core or disk storage in the server device and is labeled 5205 and 5207. Storage 5205 stores the deltaG submesh data (both deltaG+ submesh and deltaG− submesh data) for specific parent viewcell transitions.

This data is used in step 5210 to construct a parent visibility map (VM) from a previous parent viewcell VM.

The out-of-core or disk storage labeled 5207 stores labeled silhouette contour information for viewcell transitions of child viewcells.

This data is used in step 5214 to construct the deltaG+ submesh and deltaG− submesh data for the child viewcell transitions using the VM of the parent viewcell and the method of FIG. 37, simplified 3D mesh traversal and in conjunction with Table XIV.

Applying the simplified 3D polygon mesh traversal method of FIG. 36 and FIG. 37 to a given unified visibility map (containing silhouette contours/occlusion boundaries for two connected viewcells e.g. A and B) a deltaG+ submesh may be constructed using one set of seed triangles while the deltaG− submesh may be constructed using the complementary set of seed triangles.

For example, consider a particular unified visibility map containing silhouette contours and the corresponding occlusion boundary polylines for two connected viewcells A and B. The following table shows how the deltaG+ and deltaG− submeshes can be generated or bypassed using the labeled contours depending on the selection of the seed triangle set/list.

Thus, the deltaG+(and deltaG−) submesh data need not be stored since it can be generated from the labeled silhouette contours for the corresponding viewcell transition at runtime. This approach can substantially reduce the overall storage requirements for out-of-core data since the labeled contour information typically has a much lower storage cost than the deltaG submesh data. This particularly true when the silhouette contours selected are reused for several viewcell transitions, which is true where the effective dynamic occlusion (EDO) is locally high, corresponding to regions of the model where the local dynamic visibility coherence is high.

In order to generate the deltaG+ or deltaG− submesh information for viewcell transitions at runtime, it is important that all of the polygon mesh data (visible from the specific viewcells) and the labeled silhouette contour information (corresponding to the specific viewcell transitions) be already present in a rapidly accessible (in core) memory.

To insure that this information is pre-loaded from out-of-core memory prior to the deltaG submesh generation process the server process can directly accesses the set of polygons or polygon fragments visible from a larger viewcell containing the specific viewcells for which the deltaG submesh data is to be generated. This data amounts to direct PVS data for a viewcell, but the storage requirements are minimized by precomputing and storing these direct PVS data for a relative small number of large viewcells, from which the PVS for a much larger number of contained viewcells is generated using the simplified mesh traversal process and labeled silhouette contour information during the prefetch. Alternatively the PVS for the large, parent viewcell can itself be constructed from an existing VM/PVS previously constructed for a neighboring large viewcell (itself a parent of other child viewcells) by accessing deltaG submesh data for the parent-to-parent viewcell transition.

In addition, the server process also accesses the labeled silhouette contour information for the specific child viewcells for which the deltaG submesh information is to be generated.

Once the polygon mesh information and the labeled silhouette contour information needed to construct the deltaG submesh data are present in core memory the generation of the deltaG submesh data by the server can proceed uninterrupted by out-of-core memory accesses.

This use of parent and child viewcell data is an example of exploiting the simple visibility hierarchy that is exists between hierarchical cells: all polygons/fragments visible from a child viewcell are also visible from the containing parent viewcell. In this application of parent viewcells it is important to include all the polygon/fragments that are actually inside the parent viewcell. Ultimately the terminal leaf child viewcells are typically constructed as to contain little or no geometry, making their VM/PVS exclusively "from-viewcell" and less "contained in viewcell".

Steps 5220 and higher are identical to the steps 4620 and higher shown in FIG. 46.

As previously described, the deltaPVS scheme of the present method employs explicit delta visibility information for viewcell transitions between adjacent viewcells (e.g. adjacent parent viewcells) and between parent and child viewcells.

In one embodiment, delta visibility information for parent-to-parent viewcell transitions uses explicit deltaG+ and/or deltaG− datasets; while visibility information for parent-to-child and/or child-to-child viewcell transitions use the intermediate labeled silhouette contour information. This arrangement allows a balance between storage size and runtime transmission/processing costs. A multi-level hierarchy of these arrangements can further reduce storage costs.

In addition the client-server implementation of FIG. 52 is amenable to an alternative embodiment in which the client process and server process are present in the same device (similar to FIG. 47). This embodiment has utility in computer games and other applications in which the entire database is stored in out-of-core storage that is on the same computing device as the client.

Figure 54:
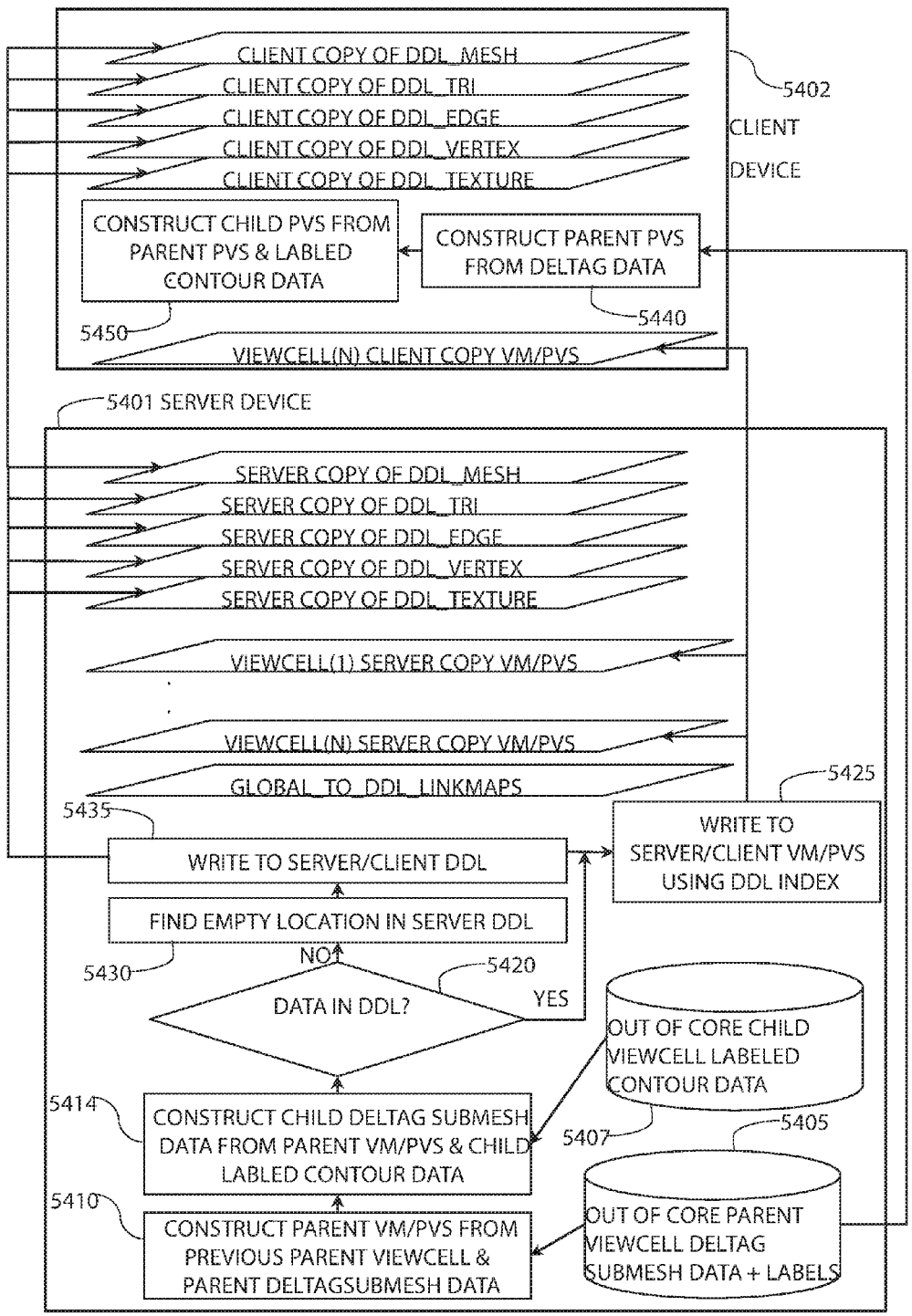
FIG. 54 is an exemplary flowchart/block diagram showing a client and a server process in which the client receives deltaG data and labeled silhouette contour data and uses this data to generate PVS and/or deltaPVS data.

FIG. 54 is a flowchart/block diagram showing a client and server process in which the server accesses prestored deltaG submesh for parent viewcells and uses this information to construct a visibility map/PVS for a parent viewcell which is then used, along with prestored silhouette contour information for child viewcell transitions, to construct the deltaG submesh data for the child viewcell transitions, in this embodiment the server optionally supplies deltaG data containing labeled silhouette contours directly to the client.

FIG. 54 shows one embodiment that is similar to the embodiment of FIG. 52.

Out-of-core storage area labeled 5405 contains deltaG information together with labeled silhouette contour information for the corresponding deltaG data (e.g. labeled silhouette contour information stored with deltaG+ data).

In the embodiment of FIG. 54 this data may optionally be sent directly to the remote client process.

In step 5440 the client process constructs PVS data from the corresponding deltaG data.

In step 5450 the client process constructs child PVS data from the parent PVS data using the simplified, hinted, 3D mesh traversal process of FIG. 36 and FIG. 37, which uses the included labeled silhouette contour information.

Otherwise the corresponding labeled steps and storage areas are identical to FIG. 52.

The embodiment of FIG. 54 can reduce the transmission costs by transmitting fewer, relatively large deltaG packets with labeled silhouette contour information included. In this method the client process constructs the PVS of the smaller, child viewcells, thus eliminating the need to send the corresponding deltaG packets for the child viewcells. In many cases the labeled silhouette contour information has a much lower storage and transmission costs than the corresponding deltaG packets for the child viewcells.

In this embodiment the transmission cost is reduced at the expense of additional client runtime processing to generate the child PVS data from the labeled contour information. In cases when available transmission bandwidth is limiting this method can be employed to speed the delivery of visibility event information to the client.

Method of Reusing Labeled Silhouette Contours for Multiple Viewcell Transitions

In regions of a model having high visibility coherence the first-order silhouette contours for several adjacent viewcells may be the same or very similar. Where the corresponding labeled contours are identical for several viewcell transitions a single labeled contour can simply be reused.

Where the labeled contours are sufficiently similar the most conservative one can be stored and used, thereby reducing storage and transmission costs.

Alternatively the difference between two silhouette contours can be encoded (e.g. by labeling only the polyline segments that are different) and this information used to incrementally construct one silhouette contour from an existing silhouette contour during runtime/prefetch phase.

Method of Using Smaller Delta Visibility Packets when the Client is Predicted to have Insufficient Visibility Event Data Overall, large delta-visibility packets tend to reduce overall storage size, reduce repeated transmission of elements, and minimize seek time. This tends to improve throughput at the expense of higher latency to deliver the delta-visibility data. Conversely, small delta visibility packets generally have higher storage costs, increased repeated transmission and higher seek times; but they can be delivered at lower latency.

In the client-server implementations of the present method, the packet size of the delta visibility data can be dynamically selected based on the instantaneous latency requirements of the current visibility event stream. Specifically if the current viewpoint is predicted (by the navigation-based speculative prefetch of the server) to penetrate a specific viewcell before the corresponding delta-visibility data can be transmitted to the client then the server can provide delta-visibility information corresponding to a transition to a smaller viewcell (e.g. a child viewcell). This packet can be generated by the server (e.g. using a parent-to-child labeled silhouette contour to "bypass" specific polygons) as needed. The corresponding smaller delta-visibility packet is then sent to the client. If transmission bandwidth is limiting, this method can effectively reduce the time to deliver the packet.

This method can be used in conjunction with the method of reducing level-of-detail during these periods when low visibility coherence of the walkthrough stresses the available connection.

Method to Improve Robustness of the Implementations

The various polygon-polygon and other geometric intersection determinations required by the present methods are subject to the same numerical precision limitations encountered in most floating-point geometric computations. One of these limitations is related to the decidability of intersection in degenerate cases (e.g. the edge of one polygon lies on the plane and interior of another polygon).

Because the present methods determine a conservative result, such degenerate cases can be effectively eliminated by slightly enlarging the viewcell by some epsilon value. In general, this will remove the degeneracy while preserving a conservative solution.

Method to Improve Efficiency of the Implementations by Using Hierarchical Visibility The conservative linearized umbral discontinuity mesh, visibility map, and PAU from a child viewcell is the subset of the linearized umbral discontinuity mesh determined from a parent viewcell containing the child viewcell.

Consequently the visible set of polygons/polygon fragments used to determine the set of polygons/fragments visible from a child viewcell by any of these methods can be limited to those polygons/polygon fragments visible from the containing parent viewcell.

Method to Improve Efficiency of the Visibility Precomputation by Using Occluder Selection The previously described method of using the ESO metric to guide the simplification of the resulting visibility map is applied after the visibility map has been constructed.

Another method of simplifying the visibility map is applied before construction of the map. In this method the occluding potential of individual mesh objects (or closely spaced groups of mesh objects) is estimated using simple metrics. These metrics may include the maximum subtended angle of the object or its bounding box. Alternatively the metric may be an estimate of the simple PAU formed between the viewcell and the mesh object's bounding box. Using such estimates of the occluding potential of a mesh object, many inefficient occluders may be removed prior to construction of the visibility map.

We note that this type of occluder selection based on the occluding potential of an individual mesh object may not account for a larger aggregate occlusion that is caused by a larger PAU produced when a particular mesh object occluder is fused to other mesh object occluders. Thus, the occluder selection heuristic becomes more effective when examining the proximity and position of other nearby occluders.

Method Using Virtual Occluders Derived from PAU

In a modification of the method of constructing from-viewcell PAU shown in FIG. 26; the PAU are intersected with one or more planes. The intersection of the PAU with the planes define simple polygonal virtual occluders. These virtual occluders can be used in a manner similar to Koltun et al. (2000) to construct a PVS at runtime.

The advantage of the present method is that it realizes a full 3D implementation, whereas the method of Koltun et al. (2000) is 2.5D.

The method of using polygonal virtual occluders is an alternative to the previously described method in which labeled silhouette contours (including conservatively simplified contours) effectively serve to delimit virtual occluders.

Obviously, numerous modifications and variations of the present advancements are possible in light of the above teachings. It is therefore to be understood that within the scope of the appended claims, the advancements may be practiced otherwise than as specifically described herein.

The invention claimed is:

1. A method of determining a set of mesh polygons or fragments of said mesh polygons visible from a view region having a plurality of view region vertices, said mesh polygons forming polygon meshes, the method comprising:
   a) determining, using processing circuitry, at least one first-order silhouette edge of said polygon meshes, wherein said at least one first-order silhouette edge includes:
      first and second polygons sharing said at least one first-order silhouette edge,
      the first polygon backfacing to each view region vertex from the plurality of view region vertices,
      the second polygon front-facing to at least one view region vertex from the plurality of view region vertices, and
      the first and second polygons having a backfacing orientation with respect to each other;
   b) determining, using the processing circuitry, at least one supporting polygon between said view region and said at least one first-order silhouette edge wherein said at least one supporting polygon is a conservative supporting polygon that is constructed regardless of any mesh polygon intersecting said supporting polygon between said view region and said at least one first-order silhouette edge;
   c) constructing, using the processing circuitry, at least one wedge from said at least one supporting polygon, said at least one wedge extending away from said view region beyond said at least one first-order silhouette edge;
   d) determining, using the processing circuitry, one or more intersections of said wedges with said mesh polygons; and
   e) determining, using the processing circuitry, said set of said mesh polygons or fragments of said mesh polygons visible from said view region using said determined one or more intersections of said at least one wedge with said polygon meshes; and
   f) outputting, using processing circuitry, said set of said mesh polygons or fragments of said mesh polygons visible from said view region as a conservative approximate of exact surfaces visible from said view region.

2. The method of claim 1, wherein the step b) of determining at least one supporting polygon further comprises:

determining, for said at least one first-order silhouette edge, using the processing circuitry, a supporting view region vertex defined as a first view region vertex from said plurality of view region vertices encountered in pivoting a plane about said first-order silhouette edge toward said view region, said pivoted plane incident on said first-order silhouette edge and not front-facing with respect to each view region vertex from the plurality of view region vertices.

3. The method of claim 1, wherein the step b) of determining at least one supporting polygon further comprises:
determining, for said at least one first-order silhouette edge, using the processing circuitry, a supporting view region vertex from said plurality of view region vertices, said supporting view region vertex forming a plane with said first-order silhouette edge, said plane having a same sidedness orientation as said first polygon sharing said first-order silhouette edge, and said plane not front-facing with respect to each view region vertex from said plurality of view region vertices.

4. A method of determining a set of mesh polygons or fragments of said mesh polygons visible from a view region having a plurality of view region vertices, said mesh polygons forming polygon meshes, the method comprising:
a) determining, using processing circuitry, at least one first-order silhouette edge of said polygon meshes, wherein said at least one first-order silhouette edge includes:
  first and second polygons sharing said at least one first-order silhouette edge,
  the first polygon backfacing to each view region vertex from the plurality of view region vertices,
  the second polygon front-facing to at least one view region vertex from the plurality of view region vertices, and
  the first and second polygons having a backfacing orientation with respect to each other;
b) determining, using the processing circuitry, if said at least one first-order silhouette edge and another first-order silhouette edge share a vertex forming an inside corner vertex of said polygon mesh;
c) upon determination that said at least one first-order silhouette edge and another first-order silhouette edge share a vertex forming an inside corner vertex of said polygon mesh, determining, using the processing circuitry, at least one supporting polygon between said view region and said at least one first-order silhouette edge, wherein the at least one supporting polygon is formed by said inside corner vertex and at least two view region vertices from said plurality of view region vertices, said at least two view region vertices and said inside corner vertex forming a plane,
  said plane having a same sidedness orientation as said first polygon sharing said at least one first-order silhouette edge, and
  said plane not front-facing with respect to each view region vertex from said plurality of view region vertices;
d) constructing, using the processing circuitry, at least one wedge from said at least one supporting polygon, said at least one wedge extending away from said view region beyond said at least one first-order silhouette edge;
e) determining, using the processing circuitry, one or more intersections of said wedges with said mesh polygons;

f) determining, using the processing circuitry, said set of said mesh polygons or fragments of said mesh polygons visible from said view region using said determined one or more intersections of said at least one wedge with said polygon meshes; and
g) outputting, using processing circuitry, said set of said mesh polygons or fragments of said mesh polygons visible from said view region as a conservative approximate of exact surfaces visible from said view region.

5. The method of claim 4, wherein said polygon meshes comprise manifold triangle meshes.

6. The method of claim 4, wherein said at least one supporting polygon is a conservative supporting polygon that is constructed regardless of any intervening polygon meshes between said view region and said at least one first-order silhouette edge.

7. The method of claim 4, wherein said polygon meshes comprise non-convex polygon meshes.

8. The method of claim 4, wherein said at least one first-order silhouette edge is not an edge of a portal.

9. A method of determining a set of mesh polygons or fragments of said mesh polygons visible from a view region having a plurality of view region vertices, said mesh polygons forming polygon meshes, the method comprising:
a) determining, using processing circuitry, at least one first-order silhouette edge of said polygon meshes, wherein said at least one first-order silhouette edge includes:
  first and second polygons sharing said at least one first-order silhouette edge,
  the first polygon backfacing to each view region vertex from the plurality of view region vertices,
  the second polygon front-facing to at least one view region vertex from the plurality of view region vertices, and
  the first and second polygons having a backfacing orientation with respect to each other;
b) determining, using the processing circuitry, at least one supporting polygon between said view region and at least one first-order silhouette edge;
c) constructing, using the processing circuitry, at least one wedge from said at least one supporting polygon, said at least one wedge extending away from said view region beyond said at least one first-order silhouette edge;
d) determining, using the processing circuitry, one or more intersections of said wedges with said mesh polygons;
e) determining, using the processing circuitry, if said at least one wedge intersects at least one second first-order silhouette edge, said intersection forming a compound silhouette vertex;
f) upon determination that said at least one wedge intersects said at least one first-order silhouette edge forming a compound silhouette vertex, forming at least one second wedge, wherein said at least one second wedge is formed by said compound silhouette vertex and at least two view region vertices from said plurality of view region vertices, said at least two view region vertices and said compound silhouette vertex forming a plane, said plane not front-facing with respect to each view region vertex from said plurality of view region vertices;
g) determining, using the processing circuitry, said set of said mesh polygons or fragments of said mesh polygons visible from said view region using said determined one or more intersections of said at least one wedge with said polygon meshes; and h) outputting, using processing circuitry, said set of said mesh polygons or fragments of said mesh polygons visible from said view region as a conservative approximate of exact surfaces visible from said view region.

10. The method of claim 9, wherein said view region is a volume.

11. The method of claim 9, wherein said polygon meshes comprise manifold triangle meshes.

12. The method of claim 9, wherein said at least one supporting polygon is a conservative supporting polygon that is constructed regardless of any mesh polygon intersecting said supporting polygon between said view region and said at least one first-order silhouette edge.

13. The method of claim 9, wherein said polygon meshes comprise non-convex polygon meshes.

14. The method of claim 9, wherein said at least one first-order silhouette edge is not an edge of a portal.

15. A method of determining a set of mesh polygons or fragments of said mesh polygons visible from a view region having a plurality of view region vertices, said mesh polygons forming polygon meshes, the method comprising:

a) determining, using processing circuitry, at least one first-order silhouette edge of said polygon meshes, wherein said at least one first-order silhouette edge includes:
  first and second polygons sharing said at least one first-order silhouette edge,
  the first polygon backfacing to each view region vertex from the plurality of view region vertices,
  the second polygon front-facing to at least one view region vertex from the plurality of view region vertices, and
  the first and second polygons having a backfacing orientation with respect to each other;

b) determining, using the processing circuitry, at least one supporting polygon between said view region and at least one first-order silhouette edge, said determining at least one supporting polygon comprising determining, for said at least one first-order silhouette edge, a supporting view region vertex defined as a first view region vertex from said plurality of view region vertices encountered in pivoting a plane about said first-order silhouette edge toward said view region, said pivoted plane incident on said first-order silhouette edge and not front-facing with respect to each view region vertex from the plurality of view region vertices;

c) constructing, using the processing circuitry, at least one wedge from said at least one supporting polygon, said at least one wedge extending away from said view region beyond at least said polygon meshes; said constructing of said at least one wedge comprising:
  c1) determining a plane of said at least one supporting polygon,
  c2) constructing said at least one wedge, said at least one wedge including said plane of said at least one supporting polygon, and
  c3) restricting said at least one wedge, formed in the step c2) of constructing, by intersecting said at least one wedge with at least a second wedge, said at least second wedge and said at least one wedge sharing a vertex of said mesh polygons;

d) determining, using the processing circuitry, one or more intersections of said wedges with said mesh polygons;

e) determining, using the processing circuitry, said set of said mesh polygons or fragments of said mesh polygons visible from said view region using said determined one or more intersections of said at least one wedge with said polygon meshes; and f) outputting, using processing circuitry, said set of said mesh polygons or fragments of said mesh polygons visible from said view region as a conservative approximate of exact surfaces visible from said view region.

16. A method of determining a set of mesh polygons or fragments of said mesh polygons visible from a view region having a plurality of view region vertices, said mesh polygons forming polygon meshes, the method comprising:

a) determining, using processing circuitry, at least one first-order silhouette edge of said polygon meshes, wherein said at least one first-order silhouette edge includes:
  first and second polygons sharing said at least one first-order silhouette edge,
  the first polygon backfacing to each view region vertex from the plurality of view region vertices,
  the second polygon front-facing to at least one view region vertex from the plurality of view region vertices, and
  the first and second polygons having a backfacing orientation with respect to each other;

b) determining, using the processing circuitry, at least one supporting polygon between said view region and at least one first-order silhouette edge, said determining at least one supporting polygon comprising determining for said at least one first-order silhouette edge, a supporting view region vertex from said plurality of view region vertices, said supporting view region vertex forming a plane with said first-order silhouette edge, said plane having a same sidedness orientation as said first polygon sharing said first-order silhouette edge, and said plane not front-facing with respect to each view region vertex from said plurality of view region vertices;

c) constructing, using the processing circuitry, at least one wedge from said at least one supporting polygon, said at least one wedge extending away from said view region beyond at least said polygon meshes; said constructing of said at least one wedge comprising:
  c1) determining a plane of said at least one supporting polygon,
  c2) constructing said at least one wedge, said at least one wedge including the plane of said at least one supporting polygon, and
  c3) restricting said at least one wedge, formed in the step c2) of constructing, by intersecting said at least one wedge with at least a second wedge, said at least second wedge and said at least one wedge sharing a vertex of said mesh polygons;

d) determining, using the processing circuitry, one or more intersections of said wedges with said mesh polygons;

e) determining, using the processing circuitry, said set of said mesh polygons or fragments of said mesh polygons visible from said view region using said determined one or more intersections of said at least one wedge with said polygon meshes; and f) outputting, using processing circuitry, said set of said mesh polygons or fragments of said mesh polygons visible from said view region as a conservative approximate of exact surfaces visible from said view region.

17. A method of determining a set of mesh polygons or fragments of said mesh polygons visible from a view region having a plurality of view region vertices, said mesh polygons forming polygon meshes, the method comprising:
   a) determining, using processing circuitry, at least one first-order silhouette edge of said polygon meshes, wherein said at least one first-order silhouette edge includes:
   first and second polygons sharing said at least one first-order silhouette edge, the first polygon backfacing to each view region vertex from the plurality of view region vertices,
   the second polygon front-facing to at least one view region vertex from the plurality of view region vertices, and
   the first and second polygons having a backfacing orientation with respect to each other;
   b) determining, using the processing circuitry, if said at least one first-order silhouette edge has at least one cusp vertex, said cusp vertex being defined as a vertex of said first-order silhouette edge that is not a vertex for any other first-order silhouette edge;
   c) upon determination that said at least one first-order silhouette edge has at least one cusp vertex, determining, using the processing circuitry, at least one supporting polygon between said view region and said at least one first-order silhouette edge, wherein said at least one supporting polygon is formed by said cusp vertex and at least two view region vertices from said plurality of view region vertices, said at least two view region vertices and said inside corner vertex forming a plane, said plane having a same sidedness orientation as said first polygon sharing said at least one first-order silhouette edge, and said plane not front-facing with respect to each view region vertex from said plurality of view region vertices;
   d) constructing, using the processing circuitry, at least one wedge from said at least one supporting polygon, said at least one wedge sharing said cusp vertex and extending away from said view region beyond said at least one first-order silhouette edge;
   e) determining, using the processing circuitry, one or more intersections of said at least one wedge with said mesh polygons;
   f) determining, using the processing circuitry, said set of said mesh polygons or fragments of said mesh polygons visible from said view region using said determined one or more intersections of said at least one wedge with said polygon meshes; and
   g) outputting, using processing circuitry, said set of said mesh polygons or fragments of said mesh polygons visible from said view region as a conservative approximate of exact surfaces visible from said view region.

18. A method of determining a set of mesh polygons or fragments of said mesh polygons visible from a view region having a plurality of view region vertices, said mesh polygons forming polygon meshes, the method comprising:
   a) determining, using processing circuitry, at least one first-order silhouette edge of said polygon meshes, wherein said at least one first-order silhouette edge includes:
   first and second polygons sharing said at least one first-order silhouette edge,
   the first polygon backfacing to each view region vertex from the plurality of view region vertices,
   the second polygon front-facing to at least one view region vertex from the plurality of view region vertices, and
   the first and second polygons having a backfacing orientation with respect to each other;
   b) determining, using the processing circuitry, at least one supporting polygon between said view region and at least one first-order silhouette edge, said determining at least one supporting polygon comprising determining a higher-order supporting polygon, wherein said higher-order supporting polygon is defined by said at least one first-order silhouette edge and a visible supporting view region vertex defined as a first visible view region vertex encountered in pivoting a plane about said first-order silhouette edge toward said view region, said pivoted plane incident on said first-order silhouette edge and not front-facing with respect to each visible view region vertex, said visible view region vertex visible from said first-order silhouette edge;
   c) constructing, using the processing circuitry, at least one wedge from said at least one higher-order supporting polygon, said at least one wedge extending away from said view region beyond at least one first-order silhouette edge;
   d) determining, using the processing circuitry, one or more intersections of said wedges with said mesh polygons;
   e) determining, using the processing circuitry, said set of said mesh polygons or fragments of said mesh polygons visible from said view region using said determined one or more intersections of said at least one wedge with said polygon meshes; and
   f) outputting, using processing circuitry, said set of said mesh polygons or fragments of said mesh polygons visible from said view region as an adaptive, conservative approximate of exact surfaces visible from said view region.

19. A method of determining a set of mesh polygons or fragments of said mesh polygons visible from a view region having a plurality of view region vertices, said mesh polygons forming polygon meshes, the method comprising:
   a) determining, using processing circuitry, at least one first-order silhouette edge of said polygon meshes, wherein said at least one first-order silhouette edge includes:
   first and second polygons sharing said at least one first-order silhouette edge,
   the first polygon backfacing to each view region vertex from the plurality of view region vertices,
   the second polygon front-facing to at least one view region vertex from the plurality of view region vertices, and
   the first and second polygons having a backfacing orientation with respect to each other;
   b) determining, using the processing circuitry, at least one supporting polygon between said view region and at least one first-order silhouette edge, said determining at least one supporting polygon comprising determining at least one higher-order supporting polygon, wherein said higher-order supporting polygon is defined by said at least one first-order silhouette edge and a visible supporting view region vertex defined as a first visible view region vertex encountered in pivoting a plane about said first-order silhouette edge toward said view region, said pivoted plane incident on said first-order silhouette edge and not front-facing with respect to each visible view region vertex, said visible view region vertex visible from said first-order silhouette edge, said visible supporting view region determined by:
  b1) using said at least one first-order silhouette edge as a lineal view region;
  b2) determining at least one backprojection first-order silhouette edge of said polygon meshes in a shaft formed between said lineal view region and said view region, said at least one backprojection first-order silhouette edge further including:
    first and second polygons sharing said at least one backprojection first-order silhouette edge,
    the first polygon backfacing to each lineal view region vertex of said lineal view region,
    the second polygon front-facing to at least one lineal view region vertex of said lineal view region, and
    the first and second polygons having a backfacing orientation with respect to each other;
  b3) determining at least one backprojection supporting polygon between said lineal view region and at least one vertex of said at least one backprojection first-order silhouette edge;
  b4) constructing at least one backprojection wedge from said at least one backprojection supporting polygon;
  b5) determining one or more intersections of said at least one backprojection wedge with polygons of said view region; and
  b6) determining said at least one visible view region vertex using said one or more intersections of said at least one backprojection wedge with said polygons of said view region;
c) constructing, using the processing circuitry, at least one wedge from said at least one higher-order supporting polygon, said at least one wedge extending away from said view region beyond at least said at least one first-order silhouette edge;
d) determining, using the processing circuitry, one or more intersections of said wedges with said mesh polygons;
e) determining, using the processing circuitry, said set of said mesh polygons or fragments of said mesh polygons visible from said view region using said determined one or more intersections of said at least one wedge with said polygon meshes; and
f) outputting, using processing circuitry, said set of said mesh polygons or fragments of said mesh polygons visible from said view region as an adaptive, conservative approximate of exact surfaces visible from said view region.

20. A method of determining a set of mesh polygons or fragments of said mesh polygons visible from a view region having a plurality of view region vertices, said mesh polygons forming polygon meshes, the method comprising:
a) determining, using processing circuitry, at least one first-order silhouette edge of said polygon meshes, wherein said at least one first-order silhouette edge includes:
  first and second polygons sharing said at least one first-order silhouette edge,
  the first polygon backfacing to each view region vertex from the plurality of view region vertices,
  the second polygon front-facing to at least one view region vertex from the plurality of view region vertices, and
  the first and second polygons having a backfacing orientation with respect to each other;
b) determining, using the processing circuitry, if said at least one first-order silhouette edge and another first-order silhouette edge share a vertex forming an inside corner vertex of said polygon mesh;
c) upon determination that said at least one first-order silhouette edge and another first-order silhouette edge share a vertex forming an inside corner vertex of said polygon mesh, determining, using the processing circuitry, at least one supporting polygon between said view region and said at least one first-order silhouette edge, wherein said at least one supporting polygon is formed by said inside corner vertex and at least two view region vertices from said plurality of view region vertices, said at least two view region vertices and said inside corner vertex forming a plane,
  said plane having a same sidedness orientation as said first polygon sharing said at least one first-order silhouette edge, and
  said plane not front-facing with respect to each view region vertex from said plurality of view region vertices;
d) constructing, using the processing circuitry, at least one wedge from said at least one supporting polygon, said at least one wedge extending away from said view region beyond said at least one first-order silhouette edge;
e) determining, using the processing circuitry, one or more intersections of said wedges with said mesh polygons, said intersections defining at least one from view region occlusion boundary incident on said mesh polygons, said at least one from view region occlusion boundary having an unoccluded side and an occluded side;
f) determining, using the processing circuitry, a number of mesh polygons added to said set of mesh polygons or fragments of said mesh polygons visible from said view region, said mesh polygons added by repartitioning, at an intersection between a polygon mesh and said at least one from view region occlusion boundary on said unoccluded side, a surface of said intersected polygon mesh;
g) determining, using the processing circuitry, a number of mesh polygons occluded by said at least one from view region occlusion boundary;
h) removing, using the processing circuitry, said at least one from view region occlusion boundary upon determination that said number of mesh polygons added exceeds said number of mesh polygons occluded by a predetermined threshold; and
i) outputting, using processing circuitry, said set of said mesh polygons or fragments of said mesh polygons visible from said view region, excluding said removed at least one from view region occlusion boundary, as a conservative approximate of exact surfaces visible from said view region.

* * * * *